US011669896B2

(12) United States Patent
Van Os et al.

(10) Patent No.: US 11,669,896 B2
(45) Date of Patent: Jun. 6, 2023

(54) USER INTERFACES FOR MANAGING AN ACCOUNT

(71) Applicant: Apple Inc., Cupertino, CA (US)

(72) Inventors: Marcel Van Os, San Francisco, CA (US); Jae Woo Chang, San Jose, CA (US); Teofila Connor, San Francisco, CA (US); Alan C. Dye, San Francisco, CA (US); Jarad M. Fisher, Millbrae, CA (US); Corey Fugman, Saratoga, CA (US); Richard W. Heard, San Francisco, CA (US); Mischa McLachlan, San Francisco, CA (US); Aaron Melim, San Francisco, CA (US); Ashish C. Nagre, Sunnyvale, CA (US); Glen W. Steele, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/557,655

(22) Filed: Dec. 21, 2021

(65) Prior Publication Data

US 2022/0114658 A1 Apr. 14, 2022

Related U.S. Application Data

(63) Continuation of application No. 16/549,862, filed on Aug. 23, 2019, now Pat. No. 11,328,352.

(Continued)

(51) Int. Cl.

*G06F 3/048* (2013.01)
*G06Q 40/02* (2023.01)

(Continued)

(52) U.S. Cl.

CPC .......... *G06Q 40/02* (2013.01); *G06F 3/0484* (2013.01); *G06F 3/04845* (2013.01);

(Continued)

(58) Field of Classification Search

None

See application file for complete search history.

(56) References Cited

U.S. PATENT DOCUMENTS

| | | |
|---|---|---|
| 3,586,261 A | 6/1971 | Paine et al. |
| 4,516,207 A | 5/1985 | Moriyama et al. |

(Continued)

FOREIGN PATENT DOCUMENTS

| | | |
|---|---|---|
| AU | 2005256796 A1 | 1/2006 |
| AU | 2015100708 A4 | 7/2015 |

(Continued)

OTHER PUBLICATIONS

Supplemental Notice of Allowance received for U.S. Appl. No. 17/027,274, dated Nov. 7, 2022, 3 pages.

(Continued)

*Primary Examiner* — Thanh T Vu

(74) *Attorney, Agent, or Firm* — DLA Piper LLP (US)

(57) ABSTRACT

In some embodiments, exemplary user interfaces for provisioning an electronic device with an account are described. In some embodiments, exemplary user interfaces for providing usage information of an account are described. In some embodiments, exemplary user interfaces for providing visual feedback on a representation of an account are described. In some embodiments, exemplary user interfaces for managing the tracking of a category are described. In some embodiments, exemplary user interfaces for managing a transfer of items are described. In some embodiments, exemplary user interfaces for managing an authentication credential connected with an account are described. In some embodiments, exemplary user interfaces for activating a physical account object are described. In some embodiments, exemplary user interfaces for managing balance transfers are described.

57 Claims, 199 Drawing Sheets

Related U.S. Application Data

(60) Provisional application No. 62/855,588, filed on May 31, 2019, provisional application No. 62/822,964, filed on Mar. 24, 2019.

(51) Int. Cl.

| | |
|---|---|
| ***G06Q 20/40*** | (2012.01) |
| ***G06Q 20/10*** | (2012.01) |
| ***G06Q 20/38*** | (2012.01) |
| ***G06F 3/04845*** | (2022.01) |
| ***H04M 3/00*** | (2006.01) |
| ***G06F 3/0484*** | (2022.01) |
| *G06F 3/04817* | (2022.01) |

(52) U.S. Cl.

CPC ..... *G06Q 20/105* (2013.01); *G06Q 20/38215* (2013.01); *G06Q 20/401* (2013.01); *G06Q 20/405* (2013.01); *H04M 3/00* (2013.01); *G06F 3/04817* (2013.01)

(56) References Cited

U.S. PATENT DOCUMENTS

| | | | |
|---|---|---|---|
| 5,237,159 | A | 8/1993 | Stephens et al. |
| 5,265,007 | A | 11/1993 | Barnhard, Jr. et al. |
| 5,484,988 | A | 1/1996 | Hills et al. |
| 5,691,524 | A | 11/1997 | Josephson |
| 5,717,868 | A | 2/1998 | James |
| 5,783,808 | A | 7/1998 | Josephson |
| 5,802,208 | A | 9/1998 | Podilchuk et al. |
| 5,815,657 | A | 9/1998 | Williams et al. |
| 5,910,989 | A | 6/1999 | Naccache |
| 5,917,913 | A | 6/1999 | Wang |
| 5,983,197 | A | 11/1999 | Enta |
| 6,016,484 | A | 1/2000 | Williams et al. |
| 6,076,928 | A | 6/2000 | Fateh et al. |
| 6,164,528 | A | 12/2000 | Hills et al. |
| 6,189,785 | B1 | 2/2001 | Lowery |
| 6,193,152 | B1 | 2/2001 | Fernando et al. |
| 6,212,548 | B1 | 4/2001 | Desimone et al. |
| 6,230,148 | B1 | 5/2001 | Pare, Jr. et al. |
| 6,256,129 | B1 | 7/2001 | Kim et al. |
| 6,260,027 | B1 | 7/2001 | Takahashi et al. |
| 6,282,656 | B1 | 8/2001 | Wang |
| 6,328,207 | B1 | 12/2001 | Gregoire et al. |
| 6,398,646 | B1 | 6/2002 | Wei et al. |
| 6,408,087 | B1 | 6/2002 | Kramer |
| 6,581,042 | B2 | 6/2003 | Pare, Jr. et al. |
| 6,612,928 | B1 | 9/2003 | Bradford et al. |
| 6,644,546 | B2 | 11/2003 | George et al. |
| 6,662,166 | B2 | 12/2003 | Pare, Jr. et al. |
| 6,822,769 | B1 | 11/2004 | Drinkwater et al. |
| 6,950,810 | B2 | 9/2005 | Lapsley et al. |
| 6,970,855 | B2 | 11/2005 | Das et al. |
| 6,993,489 | B1 | 1/2006 | Miglautsch |
| 7,079,652 | B1 | 7/2006 | Harris |
| 7,099,845 | B2 | 8/2006 | Higgins et al. |
| 7,099,850 | B1 | 8/2006 | Mann, II et al. |
| 7,155,411 | B1 | 12/2006 | Blinn et al. |
| 7,305,350 | B1 | 12/2007 | Bruecken |
| 7,356,516 | B2 | 4/2008 | Richey et al. |
| 7,359,880 | B2 | 4/2008 | Abel et al. |
| 7,430,537 | B2 | 9/2008 | Templeton et al. |
| 7,496,527 | B2 | 2/2009 | Silverstein et al. |
| 7,529,563 | B1 | 5/2009 | Pitroda |
| 7,535,344 | B2 | 5/2009 | Obradovich |
| 7,644,019 | B2 | 1/2010 | Woda et al. |
| 7,657,441 | B2 | 2/2010 | Richey et al. |
| 7,664,638 | B2 | 2/2010 | Cooper et al. |
| 7,689,508 | B2 | 3/2010 | Davis et al. |
| 7,818,399 | B1 | 10/2010 | Ross, Jr. et al. |
| RE42,574 | E | 7/2011 | Cockayne |
| 8,050,997 | B1 | 11/2011 | Nosek et al. |
| 8,121,945 | B2 | 2/2012 | Rackley, III et al. |
| 8,126,806 | B1 | 2/2012 | Dimartino et al. |
| 8,157,164 | B1 | 4/2012 | Billman |
| 8,195,507 | B2 | 6/2012 | Postrel |
| 8,195,576 | B1 | 6/2012 | Grigg et al. |
| 8,254,647 | B1 | 8/2012 | Nechyba et al. |
| 8,392,259 | B2 | 3/2013 | Macgillivray et al. |
| 8,396,265 | B1 | 3/2013 | Ross et al. |
| 8,452,654 | B1 | 5/2013 | Wooters et al. |
| 8,452,978 | B2 | 5/2013 | Alward et al. |
| 8,453,940 | B2 | 6/2013 | Diamond |
| 8,554,694 | B1 | 10/2013 | Ward et al. |
| 8,560,004 | B1 | 10/2013 | Tsvetkov et al. |
| 8,571,937 | B2 | 10/2013 | Rose et al. |
| 8,583,549 | B1 | 11/2013 | Mohsenzadeh |
| 8,606,512 | B1 | 12/2013 | Bogovich et al. |
| 8,606,640 | B2 | 12/2013 | Brody et al. |
| 8,706,628 | B2 | 4/2014 | Phillips |
| 8,762,272 | B1 | 6/2014 | Cozens et al. |
| 8,763,896 | B2 | 7/2014 | Kushevsky et al. |
| 8,827,153 | B1 | 9/2014 | Rhoades et al. |
| 8,831,677 | B2 | 9/2014 | Villa-real |
| 8,880,055 | B1 | 11/2014 | Clement et al. |
| 8,892,474 | B1 | 11/2014 | Inskeep et al. |
| 8,924,259 | B2 | 12/2014 | Neighman et al. |
| 8,924,292 | B1 | 12/2014 | Ellis et al. |
| 8,931,703 | B1 | 1/2015 | Mullen et al. |
| 8,942,420 | B2 | 1/2015 | Kim et al. |
| 8,949,902 | B1 | 2/2015 | Fabian-Isaacs et al. |
| 8,959,360 | B1 | 2/2015 | Barra |
| 8,963,806 | B1 | 2/2015 | Starner et al. |
| 9,053,293 | B2 | 6/2015 | Latzina |
| 9,117,242 | B1 | 8/2015 | Ellis et al. |
| 9,123,272 | B1 | 9/2015 | Baldwin et al. |
| 9,177,130 | B2 | 11/2015 | Nechyba et al. |
| 9,189,778 | B1 | 11/2015 | Sh. Al-rashidi |
| 9,253,375 | B2 | 2/2016 | Milanfar et al. |
| 9,305,310 | B2 | 4/2016 | Radhakrishnan et al. |
| 9,324,067 | B2 | 4/2016 | Van Os et al. |
| 9,349,035 | B1 | 5/2016 | Gerber et al. |
| 9,355,393 | B2 | 5/2016 | Purves et al. |
| 9,411,460 | B2 | 8/2016 | Dumont et al. |
| 9,477,872 | B2 | 10/2016 | Sarve et al. |
| 9,483,763 | B2 | 11/2016 | Van Os et al. |
| 9,519,901 | B1 | 12/2016 | Dorogusker |
| 9,526,127 | B1 | 12/2016 | Taubman et al. |
| 9,558,636 | B1 | 1/2017 | Burdick |
| 9,569,605 | B1 | 2/2017 | Schneider et al. |
| 9,584,463 | B2 | 2/2017 | Ji et al. |
| 9,716,825 | B1 | 7/2017 | Manzari et al. |
| 9,779,585 | B2 | 10/2017 | Dupuis et al. |
| 9,817,549 | B2 | 11/2017 | Chandrasekaran |
| 9,825,934 | B1 | 11/2017 | Alexander |
| 9,842,330 | B1 | 12/2017 | Van Os et al. |
| 9,851,214 | B1 | 12/2017 | Chintakindi |
| 9,880,717 | B1 | 1/2018 | Persson et al. |
| 9,881,198 | B2 | 1/2018 | Lee et al. |
| 9,922,327 | B2 | 3/2018 | Johnson et al. |
| 9,923,930 | B2 | 3/2018 | Zhang et al. |
| 9,930,475 | B1 | 3/2018 | Eidam |
| 9,953,149 | B2 | 4/2018 | Tussy |
| 9,965,808 | B1 | 5/2018 | Kunz et al. |
| 10,003,738 | B2 | 6/2018 | Lautenbach et al. |
| 10,019,904 | B1 | 7/2018 | Chan et al. |
| 10,032,100 | B2 | 7/2018 | Mullen et al. |
| 10,073,541 | B1 | 9/2018 | Baldwin |
| 10,223,631 | B2 | 3/2019 | Mullen et al. |
| 10,255,545 | B2 | 4/2019 | Mullen et al. |
| 10,319,203 | B1 | 6/2019 | Testanero et al. |
| 10,482,461 | B2 | 11/2019 | Van Os et al. |
| 10,580,059 | B2 | 3/2020 | Nair et al. |
| 10,581,611 | B1 | 3/2020 | Osborn et al. |
| 10,783,576 | B1 | 9/2020 | Van Os et al. |
| 11,030,626 | B2 * | 6/2021 | Nuzzi ................ G06Q 20/4037 |
| 11,386,223 | B1 * | 7/2022 | Fakhraie ................ G06F 9/547 |
| 2002/0004760 | A1 | 1/2002 | Yoshida et al. |
| 2002/0023215 | A1 | 2/2002 | Wang et al. |
| 2002/0029169 | A1 | 3/2002 | Oki et al. |
| 2002/0046064 | A1 | 4/2002 | Maury et al. |
| 2002/0065774 | A1 | 5/2002 | Young et al. |

(56) References Cited

U.S. PATENT DOCUMENTS

| | | | |
|---|---|---|---|
| 2003/0006280 | A1 | 1/2003 | Seita et al. |
| 2003/0061157 | A1 | 3/2003 | Hirka et al. |
| 2003/0142227 | A1 | 7/2003 | Van Zee |
| 2003/0181201 | A1 | 9/2003 | Bomze et al. |
| 2003/0200184 | A1 | 10/2003 | Dominguez et al. |
| 2003/0236746 | A1 | 12/2003 | Turner et al. |
| 2004/0006479 | A1 | 1/2004 | Tanaka |
| 2004/0122685 | A1 | 6/2004 | Bunce |
| 2004/0143553 | A1 | 7/2004 | Torget et al. |
| 2004/0169722 | A1 | 9/2004 | Pena |
| 2004/0215572 | A1 | 10/2004 | Uehara et al. |
| 2004/0225609 | A1 | 11/2004 | Greene |
| 2004/0254891 | A1 | 12/2004 | Blinn et al. |
| 2005/0131816 | A1 | 6/2005 | Britto et al. |
| 2005/0187873 | A1 | 8/2005 | Labrou et al. |
| 2005/0210394 | A1 | 9/2005 | Crandall et al. |
| 2005/0219223 | A1 | 10/2005 | Kotzin et al. |
| 2005/0244059 | A1 | 11/2005 | Turski |
| 2005/0250538 | A1 | 11/2005 | Narasimhan et al. |
| 2005/0253814 | A1 | 11/2005 | Ghassabian |
| 2006/0000900 | A1 | 1/2006 | Fernandes et al. |
| 2006/0021003 | A1 | 1/2006 | Fisher et al. |
| 2006/0056664 | A1 | 3/2006 | Iwasaki |
| 2006/0064313 | A1 | 3/2006 | Steinbarth et al. |
| 2006/0064372 | A1 | 3/2006 | Gupta |
| 2006/0120707 | A1 | 6/2006 | Kusakari et al. |
| 2006/0149546 | A1 | 7/2006 | Runge |
| 2006/0165060 | A1 | 7/2006 | Dua et al. |
| 2006/0173749 | A1 | 8/2006 | Ward et al. |
| 2006/0179404 | A1 | 8/2006 | Yolleck et al. |
| 2006/0192868 | A1 | 8/2006 | Wakamori |
| 2006/0208065 | A1 | 9/2006 | Mendelevich et al. |
| 2006/0234764 | A1 | 10/2006 | Gamo et al. |
| 2006/0294007 | A1 | 12/2006 | Barthelemy |
| 2006/0294025 | A1 | 12/2006 | Mengerink |
| 2007/0096765 | A1 | 5/2007 | Kagan |
| 2007/0131759 | A1 | 6/2007 | Cox et al. |
| 2007/0192168 | A1 | 8/2007 | Van |
| 2007/0194110 | A1 | 8/2007 | Esplin et al. |
| 2007/0194113 | A1 | 8/2007 | Esplin et al. |
| 2007/0219901 | A1 | 9/2007 | Garbow et al. |
| 2007/0254712 | A1 | 11/2007 | Chitti |
| 2007/0255564 | A1 | 11/2007 | Yee et al. |
| 2007/0260558 | A1 | 11/2007 | Look |
| 2008/0040265 | A1 | 2/2008 | Rackley, III et al. |
| 2008/0041936 | A1 | 2/2008 | Vawter |
| 2008/0052181 | A1 | 2/2008 | Devitt-Carolan et al. |
| 2008/0054081 | A1 | 3/2008 | Mullen |
| 2008/0059351 | A1 | 3/2008 | Richey et al. |
| 2008/0078831 | A1 | 4/2008 | Johnson et al. |
| 2008/0120707 | A1 | 5/2008 | Ramia et al. |
| 2008/0208681 | A1 | 8/2008 | Hammad et al. |
| 2008/0231429 | A1 | 9/2008 | Leonard et al. |
| 2008/0275779 | A1 | 11/2008 | Lakshminarayanan |
| 2008/0319875 | A1 | 12/2008 | Levchin et al. |
| 2009/0005011 | A1 | 1/2009 | Christie et al. |
| 2009/0030793 | A1 | 1/2009 | Fordyce, III |
| 2009/0036165 | A1 | 2/2009 | Brede |
| 2009/0037326 | A1 | 2/2009 | Chitti et al. |
| 2009/0048959 | A1 | 2/2009 | Omura et al. |
| 2009/0050687 | A1 | 2/2009 | Kon et al. |
| 2009/0057396 | A1 | 3/2009 | Barbour et al. |
| 2009/0083850 | A1 | 3/2009 | Fadell et al. |
| 2009/0094134 | A1 | 4/2009 | Toomer et al. |
| 2009/0119678 | A1 | 5/2009 | Shih et al. |
| 2009/0159696 | A1 | 6/2009 | Mullen |
| 2009/0160609 | A1 | 6/2009 | Lin et al. |
| 2009/0173784 | A1 | 7/2009 | Yang et al. |
| 2009/0182674 | A1 | 7/2009 | Patel et al. |
| 2009/0195469 | A1 | 8/2009 | Lim et al. |
| 2009/0210308 | A1 | 8/2009 | Toomer et al. |
| 2009/0222842 | A1 | 9/2009 | Narayanan et al. |
| 2009/0227296 | A1 | 9/2009 | Kim |
| 2009/0234876 | A1 | 9/2009 | Schigel et al. |
| 2009/0307139 | A1 | 12/2009 | Mardikar et al. |
| 2010/0001980 | A1 | 1/2010 | Kim et al. |
| 2010/0008535 | A1 | 1/2010 | Abulafia et al. |
| 2010/0023449 | A1 | 1/2010 | Skowronek et al. |
| 2010/0026453 | A1 | 2/2010 | Yamamoto et al. |
| 2010/0027854 | A1 | 2/2010 | Chatterjee et al. |
| 2010/0042517 | A1 | 2/2010 | Paintin et al. |
| 2010/0058333 | A1 | 3/2010 | Peterson |
| 2010/0064259 | A1 | 3/2010 | Alexanderovitc et al. |
| 2010/0078471 | A1 | 4/2010 | Lin et al. |
| 2010/0078472 | A1 | 4/2010 | Lin et al. |
| 2010/0082445 | A1 | 4/2010 | Hodge et al. |
| 2010/0082462 | A1 | 4/2010 | Yuan et al. |
| 2010/0082481 | A1 | 4/2010 | Lin et al. |
| 2010/0082485 | A1 | 4/2010 | Lin et al. |
| 2010/0114731 | A1 | 5/2010 | Kingston et al. |
| 2010/0131303 | A1 | 5/2010 | Collopy et al. |
| 2010/0153265 | A1 | 6/2010 | Hershfield et al. |
| 2010/0161434 | A1 | 6/2010 | Herwig et al. |
| 2010/0164864 | A1 | 7/2010 | Chou et al. |
| 2010/0191570 | A1 | 7/2010 | Michaud et al. |
| 2010/0205091 | A1 | 8/2010 | Graziano et al. |
| 2010/0216425 | A1 | 8/2010 | Smith |
| 2010/0217808 | A1 | 8/2010 | Benninger |
| 2010/0223145 | A1 | 9/2010 | Dragt |
| 2010/0225607 | A1 | 9/2010 | Kim |
| 2010/0243741 | A1 | 9/2010 | Eng |
| 2010/0251243 | A1 | 9/2010 | Gill et al. |
| 2010/0267362 | A1 | 10/2010 | Smith et al. |
| 2010/0273457 | A1 | 10/2010 | Freeman et al. |
| 2010/0275259 | A1 | 10/2010 | Adams et al. |
| 2010/0306107 | A1 | 12/2010 | Nahari et al. |
| 2010/0311397 | A1 | 12/2010 | Li |
| 2011/0055763 | A1 | 3/2011 | Utsuki et al. |
| 2011/0078025 | A1 | 3/2011 | Shrivastav et al. |
| 2011/0099079 | A1 | 4/2011 | White et al. |
| 2011/0122294 | A1 | 5/2011 | Suh et al. |
| 2011/0145049 | A1 | 6/2011 | Hertel et al. |
| 2011/0159959 | A1 | 6/2011 | Mallinson et al. |
| 2011/0161116 | A1 | 6/2011 | Peak et al. |
| 2011/0166992 | A1 | 7/2011 | Dessert et al. |
| 2011/0179126 | A1 | 7/2011 | Wetherell et al. |
| 2011/0184820 | A1 | 7/2011 | Mon et al. |
| 2011/0201306 | A1 | 8/2011 | Ali Al-harbi |
| 2011/0202417 | A1 | 8/2011 | Dewakar et al. |
| 2011/0218849 | A1 | 9/2011 | Rutigliano et al. |
| 2011/0225057 | A1 | 9/2011 | Webb et al. |
| 2011/0230769 | A1 | 9/2011 | Yamazaki |
| 2011/0244796 | A1 | 10/2011 | Khan et al. |
| 2011/0251892 | A1 | 10/2011 | Laracey |
| 2011/0282697 | A1 | 11/2011 | Fitzgerald et al. |
| 2012/0023185 | A1 | 1/2012 | Holden et al. |
| 2012/0028609 | A1 | 2/2012 | Hruska et al. |
| 2012/0036029 | A1 | 2/2012 | Esplin et al. |
| 2012/0036433 | A1 | 2/2012 | Zimmer et al. |
| 2012/0078751 | A1 | 3/2012 | Macphail et al. |
| 2012/0078788 | A1 | 3/2012 | Gandhi |
| 2012/0084210 | A1 | 4/2012 | Farahmand |
| 2012/0089507 | A1 | 4/2012 | Zhang et al. |
| 2012/0095918 | A1 | 4/2012 | Jurss |
| 2012/0101881 | A1 | 4/2012 | Taylor et al. |
| 2012/0101887 | A1 | 4/2012 | Harvey et al. |
| 2012/0109764 | A1 | 5/2012 | Martin et al. |
| 2012/0110456 | A1 | 5/2012 | Larco et al. |
| 2012/0123806 | A1 | 5/2012 | Schumann et al. |
| 2012/0123937 | A1 | 5/2012 | Spodak et al. |
| 2012/0136780 | A1 | 5/2012 | El-awady et al. |
| 2012/0136781 | A1 | 5/2012 | Fridman et al. |
| 2012/0150750 | A1 | 6/2012 | Law et al. |
| 2012/0185397 | A1 | 7/2012 | Levovitz |
| 2012/0191603 | A1 | 7/2012 | Nuzzi |
| 2012/0197740 | A1 | 8/2012 | Grigg et al. |
| 2012/0197743 | A1 | 8/2012 | Grigg et al. |
| 2012/0203605 | A1 | 8/2012 | Morgan et al. |
| 2012/0209748 | A1 | 8/2012 | Small |
| 2012/0215553 | A1 | 8/2012 | Leston |
| 2012/0215647 | A1 | 8/2012 | Powell et al. |
| 2012/0221464 | A1 | 8/2012 | Pasquero et al. |
| 2012/0232968 | A1 | 9/2012 | Caiman et al. |
| 2012/0238363 | A1 | 9/2012 | Watanabe et al. |

(56) References Cited

U.S. PATENT DOCUMENTS

2012/0245941 A1 9/2012 Cheyer
2012/0245985 A1 9/2012 Cho et al.
2012/0245986 A1 9/2012 Regan et al.
2012/0267432 A1 10/2012 Kuttuva
2012/0271712 A1 10/2012 Katzin et al.
2012/0280917 A1 11/2012 Toksvig et al.
2012/0284185 A1 11/2012 Mettler et al.
2012/0290376 A1 11/2012 Dryer et al.
2012/0290449 A1 11/2012 Mullen et al.
2012/0290472 A1 11/2012 Mullen et al.
2012/0310760 A1 12/2012 Phillips et al.
2012/0316933 A1 12/2012 Pentland et al.
2012/0317023 A1 12/2012 Moon et al.
2012/0322370 A1 12/2012 Lee
2012/0322371 A1 12/2012 Lee
2012/0330830 A1 12/2012 Mason et al.
2013/0006746 A1 1/2013 Moore et al.
2013/0006848 A1 1/2013 Kuttuva
2013/0013499 A1 1/2013 Kalgi
2013/0019204 A1 1/2013 Kotler et al.
2013/0024364 A1 1/2013 Shrivastava et al.
2013/0024371 A1 1/2013 Hariramani et al.
2013/0030934 A1 1/2013 Bakshi et al.
2013/0047034 A1 2/2013 Salomon et al.
2013/0047236 A1 2/2013 Singh
2013/0050263 A1 2/2013 Khoe et al.
2013/0054336 A1 2/2013 Graylin
2013/0060678 A1 3/2013 Oskolkov et al.
2013/0073321 A1 3/2013 Hofmann et al.
2013/0080272 A1 3/2013 Ronca et al.
2013/0080275 A1 3/2013 Ronca et al.
2013/0085931 A1 4/2013 Runyan
2013/0085936 A1 4/2013 Law et al.
2013/0091443 A1 4/2013 Park et al.
2013/0103519 A1 4/2013 Kountotsis et al.
2013/0110719 A1 5/2013 Carter et al.
2013/0122866 A1 5/2013 Huang
2013/0124319 A1 5/2013 Hodge et al.
2013/0124423 A1 5/2013 Fisher
2013/0144706 A1 6/2013 Qawami et al.
2013/0151360 A1 6/2013 Scipioni et al.
2013/0151414 A1 6/2013 Zhu et al.
2013/0151636 A1 6/2013 Majeti et al.
2013/0159178 A1 6/2013 Colon et al.
2013/0166325 A1 6/2013 Ganapathy et al.
2013/0179304 A1 7/2013 Swist et al.
2013/0189953 A1 7/2013 Mathews
2013/0198112 A1 8/2013 Bhat et al.
2013/0200146 A1 8/2013 Moghadam et al.
2013/0212655 A1 8/2013 Hoyos et al.
2013/0216108 A1 8/2013 Hwang et al.
2013/0218721 A1 8/2013 Borhan et al.
2013/0222323 A1 8/2013 Mckenzie
2013/0223696 A1 8/2013 Azar et al.
2013/0226792 A1 8/2013 Kushevsky et al.
2013/0232073 A1 9/2013 Sheets et al.
2013/0238455 A1 9/2013 Laracey
2013/0243264 A1 9/2013 Aoki
2013/0246202 A1 9/2013 Tobin et al.
2013/0246954 A1 9/2013 Gray et al.
2013/0275300 A1 10/2013 Killian et al.
2013/0282533 A1 10/2013 Foran-owens et al.
2013/0282577 A1 10/2013 Milne
2013/0290187 A1 10/2013 Itwaru
2013/0297414 A1 11/2013 Goldfarb et al.
2013/0304514 A1 11/2013 Hyde et al.
2013/0304651 A1 11/2013 Smith et al.
2013/0320080 A1 12/2013 Olson et al.
2013/0326563 A1 12/2013 Mulcahy et al.
2013/0332358 A1 12/2013 Zhao
2013/0332364 A1 12/2013 Templeton et al.
2013/0336527 A1 12/2013 Nechyba et al.
2013/0336545 A1 12/2013 Pritikin et al.
2013/0346273 A1 12/2013 Stockton et al.
2013/0346302 A1 12/2013 Purves et al.
2014/0003677 A1 1/2014 Han et al.
2014/0006285 A1 1/2014 Chi et al.
2014/0019352 A1 1/2014 Shrivastava
2014/0020068 A1 1/2014 Desai et al.
2014/0025513 A1 1/2014 Cooke et al.
2014/0025520 A1 1/2014 Mardikar et al.
2014/0036099 A1 2/2014 Balassanian
2014/0040120 A1 2/2014 Cho et al.
2014/0043547 A1 2/2014 Marhefka
2014/0052553 A1 2/2014 Uzo
2014/0052794 A1 2/2014 Tucker et al.
2014/0058860 A1 2/2014 Roh et al.
2014/0058935 A1 2/2014 Mijares
2014/0058939 A1 2/2014 Savla
2014/0058941 A1 2/2014 Moon et al.
2014/0061299 A1 3/2014 Scipioni
2014/0067654 A1 3/2014 Hanson et al.
2014/0068740 A1 3/2014 Lecun et al.
2014/0070957 A1 3/2014 Longinotti-buitoni et al.
2014/0074407 A1 3/2014 Hernandez-silveira et al.
2014/0074569 A1 3/2014 Francis et al.
2014/0074635 A1 3/2014 Reese et al.
2014/0074716 A1 3/2014 Ni
2014/0074717 A1 3/2014 Evans et al.
2014/0081854 A1 3/2014 Sanchez et al.
2014/0094124 A1 4/2014 Dave et al.
2014/0094143 A1 4/2014 Ayotte
2014/0095225 A1 4/2014 Williams et al.
2014/0099886 A1 4/2014 Monroe et al.
2014/0101056 A1 4/2014 Wendling
2014/0108263 A1 4/2014 Ortiz et al.
2014/0109018 A1 4/2014 Casey et al.
2014/0118519 A1 5/2014 Sahin
2014/0122331 A1 5/2014 Vaish et al.
2014/0128035 A1 5/2014 Sweeney
2014/0129435 A1 5/2014 Pardo et al.
2014/0129441 A1 5/2014 Blanco et al.
2014/0130035 A1 5/2014 Desai et al.
2014/0134947 A1 5/2014 Stouder-studenmund
2014/0138435 A1 5/2014 Khalid
2014/0140587 A1 5/2014 Ballard et al.
2014/0143145 A1 5/2014 Kortina et al.
2014/0149198 A1 5/2014 Kim et al.
2014/0156531 A1 6/2014 Poon et al.
2014/0164082 A1 6/2014 Sun et al.
2014/0164241 A1 6/2014 Neuwirth et al.
2014/0172533 A1 6/2014 Andrews et al.
2014/0181747 A1 6/2014 Son
2014/0187163 A1 7/2014 Fujita
2014/0187856 A1 7/2014 Holoien et al.
2014/0188673 A1 7/2014 Graham et al.
2014/0197234 A1 7/2014 Hammad
2014/0207659 A1 7/2014 Erez et al.
2014/0207679 A1 7/2014 Cho
2014/0207680 A1 7/2014 Rephlo
2014/0214644 A1 7/2014 Rephlo et al.
2014/0215361 A1 7/2014 Hwang et al.
2014/0222664 A1 8/2014 Milne
2014/0236840 A1 8/2014 Islam
2014/0244365 A1 8/2014 Price et al.
2014/0244493 A1 8/2014 Kenyon et al.
2014/0244494 A1 8/2014 Davis et al.
2014/0244495 A1 8/2014 Davis et al.
2014/0254891 A1 9/2014 Lee et al.
2014/0257871 A1 9/2014 Christensen et al.
2014/0279442 A1 9/2014 Luoma et al.
2014/0279474 A1 9/2014 Evans et al.
2014/0279497 A1 9/2014 Qaim-maqami et al.
2014/0279530 A1 9/2014 Douglas et al.
2014/0279543 A1 9/2014 Ruhrig
2014/0279556 A1 9/2014 Priebatsch et al.
2014/0282987 A1 9/2014 Narendra et al.
2014/0292396 A1 10/2014 Bruwer et al.
2014/0293079 A1 10/2014 Milanfar et al.
2014/0297385 A1 10/2014 Ryan
2014/0298478 A1 10/2014 Kim et al.
2014/0337207 A1 11/2014 Ye et al.
2014/0344082 A1 11/2014 Soundararajan
2014/0344896 A1 11/2014 Pak et al.

(56) References Cited

U.S. PATENT DOCUMENTS

2014/0359456 A1 12/2014 Thiele et al.
2014/0372920 A1 12/2014 Choi et al.
2014/0375835 A1 12/2014 Bos
2014/0379341 A1 12/2014 Seo et al.
2015/0002696 A1 1/2015 He et al.
2015/0003595 A1 1/2015 Yaghi et al.
2015/0005039 A1 1/2015 Liu et al.
2015/0006207 A1 1/2015 Jarvis
2015/0006376 A1 1/2015 Paulson et al.
2015/0012417 A1 1/2015 Joao et al.
2015/0012425 A1 1/2015 Mathew
2015/0014141 A1 1/2015 Myers et al.
2015/0019418 A1 1/2015 Hotard et al.
2015/0039494 A1 2/2015 Sinton et al.
2015/0043790 A1 2/2015 Ono et al.
2015/0044964 A1 2/2015 Khan et al.
2015/0044965 A1 2/2015 Kurimoto et al.
2015/0046989 A1 2/2015 Oberheide et al.
2015/0051846 A1 2/2015 Masuya
2015/0054764 A1 2/2015 Kim et al.
2015/0056957 A1 2/2015 Mardikar et al.
2015/0058146 A1 2/2015 Aissi et al.
2015/0066758 A1 3/2015 Denardis et al.
2015/0074418 A1 3/2015 Lee et al.
2015/0074615 A1 3/2015 Han et al.
2015/0077362 A1 3/2015 Seo
2015/0095174 A1 4/2015 Dua
2015/0098309 A1 4/2015 Adams et al.
2015/0115028 A1 4/2015 Montealegre
2015/0121405 A1 4/2015 Ates et al.
2015/0124053 A1 5/2015 Tamura et al.
2015/0127539 A1 5/2015 Ye et al.
2015/0127550 A1 5/2015 Khan
2015/0135278 A1 5/2015 Corda et al.
2015/0178878 A1 6/2015 Huang
2015/0186152 A1 7/2015 Jothiswaran et al.
2015/0186871 A1 7/2015 Laracey
2015/0187019 A1 7/2015 Fernandes et al.
2015/0208244 A1 7/2015 Nakao
2015/0213244 A1 7/2015 Lymberopoulos et al.
2015/0213560 A1 7/2015 Aabye et al.
2015/0220924 A1 8/2015 Bakker
2015/0227922 A1 8/2015 Filler
2015/0235018 A1 8/2015 Gupta et al.
2015/0235055 A1 8/2015 An et al.
2015/0257004 A1 9/2015 Shanmugam et al.
2015/0264111 A1 9/2015 Aleksandrov
2015/0278814 A1 10/2015 Jaffe
2015/0302493 A1 10/2015 Batstone et al.
2015/0302510 A1 10/2015 Godsey et al.
2015/0324113 A1 11/2015 Kapp et al.
2015/0334567 A1 11/2015 Chen et al.
2015/0339652 A1 11/2015 Park et al.
2015/0340025 A1 11/2015 Shima
2015/0346845 A1 12/2015 Di Censo et al.
2015/0348001 A1 12/2015 Van Os et al.
2015/0348002 A1 12/2015 Van et al.
2015/0348009 A1 12/2015 Rosen et al.
2015/0348014 A1 12/2015 Van Os et al.
2015/0348018 A1 12/2015 Campos et al.
2015/0348029 A1 12/2015 Van Os et al.
2015/0358207 A1 12/2015 Baldock et al.
2015/0363632 A1 12/2015 Ahn et al.
2016/0005028 A1 1/2016 Mayblum et al.
2016/0011768 A1 1/2016 Mm et al.
2016/0012465 A1 1/2016 Sharp
2016/0019536 A1 1/2016 Ortiz et al.
2016/0021003 A1 1/2016 Pan
2016/0047666 A1 2/2016 Fuchs
2016/0055487 A1 2/2016 Votaw et al.
2016/0063235 A1 3/2016 Tussy
2016/0063298 A1 3/2016 Tuneld et al.
2016/0078281 A1 3/2016 Gongaware et al.
2016/0080525 A1 3/2016 Ward
2016/0086166 A1 3/2016 Pomeroy et al.
2016/0100156 A1 4/2016 Zhou et al.
2016/0104159 A1 4/2016 Butterfield et al.
2016/0104228 A1 4/2016 Sundaresan
2016/0117670 A1 4/2016 Davis
2016/0127358 A1 5/2016 Engelking
2016/0147987 A1 5/2016 Jang et al.
2016/0148384 A1 5/2016 Bud et al.
2016/0156574 A1 6/2016 Hum et al.
2016/0165205 A1 6/2016 Liu et al.
2016/0171481 A1 6/2016 Mcelmurry et al.
2016/0180305 A1 6/2016 Dresser et al.
2016/0180316 A1 6/2016 Wang et al.
2016/0180325 A1 6/2016 Davis et al.
2016/0180578 A1 6/2016 Vegesna
2016/0188860 A1 6/2016 Lee et al.
2016/0189717 A1 6/2016 Kannan et al.
2016/0203483 A1 7/2016 Bridgewater et al.
2016/0210623 A1 7/2016 Voege
2016/0224966 A1 8/2016 Van Os et al.
2016/0224973 A1 8/2016 Van Os et al.
2016/0225371 A1 8/2016 Agrawal et al.
2016/0232513 A1 8/2016 Purves et al.
2016/0232516 A1 8/2016 Dayan et al.
2016/0239701 A1 8/2016 Lee et al.
2016/0239886 A1 8/2016 Susilo et al.
2016/0253665 A1 9/2016 Van Os et al.
2016/0260031 A1 9/2016 Pace et al.
2016/0267447 A1 9/2016 Davis et al.
2016/0275281 A1 9/2016 Ranjit et al.
2016/0277342 A1 9/2016 Shi
2016/0277396 A1 9/2016 Gardiner et al.
2016/0292525 A1 10/2016 Aoki
2016/0294557 A1 10/2016 Baldwin et al.
2016/0300100 A1 10/2016 Shen et al.
2016/0308859 A1 10/2016 Barry et al.
2016/0314290 A1 10/2016 Baca et al.
2016/0335495 A1 11/2016 Kim et al.
2016/0342832 A1 11/2016 Newell et al.
2016/0352667 A1 12/2016 Pickett et al.
2016/0358133 A1 12/2016 Van Os et al.
2016/0358134 A1 12/2016 Van Os et al.
2016/0358167 A1 12/2016 Van Os et al.
2016/0358168 A1 12/2016 Van Os et al.
2016/0358180 A1 12/2016 Van Os et al.
2016/0358199 A1 12/2016 Van Os et al.
2016/0364561 A1 12/2016 Lee et al.
2016/0364591 A1 12/2016 El-khoury et al.
2016/0364600 A1 12/2016 Shah et al.
2016/0364715 A1 12/2016 Cho et al.
2016/0378186 A1 12/2016 Kim
2016/0378966 A1 12/2016 Alten
2017/0004484 A1 1/2017 Seol et al.
2017/0004507 A1 1/2017 Henderson et al.
2017/0017834 A1 1/2017 Sabitov et al.
2017/0017958 A1 1/2017 Scott et al.
2017/0032375 A1 2/2017 Van Os et al.
2017/0039544 A1 2/2017 Park et al.
2017/0046111 A1 2/2017 Chu et al.
2017/0046508 A1 2/2017 Shin
2017/0061405 A1 3/2017 Bryant
2017/0063851 A1 3/2017 Kim et al.
2017/0063852 A1 3/2017 Azar et al.
2017/0070680 A1 3/2017 Kobayashi
2017/0091745 A1 3/2017 Castinado et al.
2017/0123498 A1 5/2017 Dillon et al.
2017/0169202 A1 6/2017 Duggan et al.
2017/0180637 A1 6/2017 Lautenbach et al.
2017/0180813 A1 6/2017 Kang et al.
2017/0185760 A1 6/2017 Wilder
2017/0193214 A1 7/2017 Shim et al.
2017/0193314 A1 7/2017 Kim et al.
2017/0193501 A1 7/2017 Cole et al.
2017/0228704 A1 8/2017 Zhou et al.
2017/0235935 A1 8/2017 Song et al.
2017/0235936 A1 8/2017 De Los Rios et al.
2017/0237692 A1 8/2017 Sheth et al.
2017/0244703 A1 8/2017 Lee et al.
2017/0300897 A1 10/2017 Ferenczi et al.
2017/0329949 A1 11/2017 Civelli

(56) References Cited

U.S. PATENT DOCUMENTS

2017/0339347 A1 11/2017 Cho et al.
2017/0344251 A1 11/2017 Hajimusa et al.
2017/0344526 A1 11/2017 Smith et al.
2017/0357443 A1 12/2017 Paek et al.
2017/0357972 A1 12/2017 Van Os et al.
2018/0004924 A1 1/2018 Tieu
2018/0021954 A1 1/2018 Fischer et al.
2018/0053157 A1 2/2018 Roffey
2018/0053169 A1 2/2018 James
2018/0068313 A1 3/2018 Van Os et al.
2018/0082282 A1 3/2018 Van Os et al.
2018/0082285 A1 3/2018 Prabhakar et al.
2018/0107372 A1 4/2018 Van Damme et al.
2018/0109482 A1 4/2018 Deluca et al.
2018/0117944 A1 5/2018 Lee
2018/0150627 A1 5/2018 Rodefer
2018/0157395 A1 6/2018 Mhun et al.
2018/0158066 A1 6/2018 Van Os et al.
2018/0218359 A1 8/2018 Kim et al.
2018/0240086 A1 8/2018 Sobotka
2018/0276673 A1 9/2018 Van Os et al.
2018/0300101 A1 10/2018 Liu et al.
2018/0335928 A1 11/2018 Van Os et al.
2018/0336543 A1 11/2018 Van Os et al.
2018/0374096 A1 12/2018 Demaret et al.
2019/0018974 A1 1/2019 Chae et al.
2019/0050867 A1 2/2019 Van Os et al.
2019/0080066 A1 3/2019 Van Os et al.
2019/0080070 A1 3/2019 Van Os et al.
2019/0080071 A1 3/2019 Van Os et al.
2019/0080072 A1 3/2019 Van Os et al.
2019/0080189 A1 3/2019 Van Os et al.
2019/0095883 A1 3/2019 Robinson et al.
2019/0141021 A1 5/2019 Isaacson et al.
2019/0149539 A1 5/2019 Scruby
2019/0173814 A1 6/2019 Mcneill
2019/0370583 A1 12/2019 Van Os et al.
2019/0370781 A1 12/2019 Van Os et al.
2019/0370805 A1 12/2019 Van Os et al.
2020/0065821 A1 2/2020 Van Os et al.
2020/0143353 A1 5/2020 Van Os et al.
2020/0184434 A1* 6/2020 Evans .................. G06Q 20/102
2020/0184472 A1 6/2020 Van Os et al.
2020/0211047 A1 7/2020 Van Os et al.
2020/0302517 A1 9/2020 Van Os et al.
2020/0302519 A1 9/2020 Van Os et al.
2020/0372514 A1 11/2020 Van Os et al.
2020/0410820 A1* 12/2020 Ellis ..................... G06Q 20/108
2021/0004897 A1 1/2021 Van Os et al.
2021/0027269 A1 1/2021 Van Os et al.
2021/0042549 A1 2/2021 Van Os et al.
2021/0073823 A1 3/2021 Van Os
2021/0096886 A1 4/2021 Mclachlan et al.
2021/0125173 A1 4/2021 Van Os et al.
2021/0166260 A1* 6/2021 Ho .................... G06Q 30/0233
2021/0192475 A1 6/2021 Van Os et al.
2021/0192530 A1 6/2021 Van Os et al.
2021/0201288 A1 7/2021 Van Os et al.
2021/0224785 A1 7/2021 Van Os et al.
2021/0272092 A1 9/2021 Van Os et al.
2021/0374744 A1 12/2021 Mclachlan

FOREIGN PATENT DOCUMENTS

AU 2015100709 A4 7/2015
AU 2016100796 A4 6/2016
AU 2017100556 A4 6/2017
AU 2017101425 A4 11/2017
CN 101171604 A 4/2008
CN 101730907 A 6/2010
CN 101796764 A 8/2010
CN 101809581 A 8/2010
CN 102004908 A 4/2011
CN 102096546 A 6/2011
CN 102282578 A 12/2011
CN 102394838 A 3/2012
CN 102541438 A 7/2012
CN 102663303 A 9/2012
CN 102982144 A 3/2013
CN 103001856 A 3/2013
CN 103067248 A 4/2013
CN 103188280 A 7/2013
CN 103413218 A 11/2013
CN 103577982 A 2/2014
CN 103701605 A 4/2014
CN 103778533 A 5/2014
CN 104038256 A 9/2014
CN 104077534 A 10/2014
CN 104252675 A 12/2014
CN 104361302 A 2/2015
CN 104539924 A 4/2015
CN 104813354 A 7/2015
CN 105190659 A 12/2015
CN 105320864 A 2/2016
CN 105389491 A 3/2016
CN 105531730 A 4/2016
CN 105787718 A 7/2016
CN 105844468 A 8/2016
CN 105868613 A 8/2016
CN 105893814 A 8/2016
CN 106020436 A 10/2016
CN 106095247 A 11/2016
CN 106156566 A 11/2016
CN 106164934 A 11/2016
CN 106355058 A 1/2017
CN 106462383 A 2/2017
CN 106485123 A 3/2017
CN 106503514 A 3/2017
CN 106778222 A 5/2017
CN 109769397 A 5/2019
EP 2309410 A1 4/2011
EP 2568693 A2 3/2013
EP 2654275 A1 10/2013
EP 2674889 A2 12/2013
EP 2701107 A1 2/2014
EP 2713298 A1 4/2014
EP 2725537 A1 4/2014
EP 2980741 A1 2/2016
EP 2993619 A1 3/2016
EP 3057024 A1 8/2016
EP 3062271 A1 8/2016
EP 3076334 A1 10/2016
EP 3096275 A1 11/2016
EP 3047622 B1 8/2017
EP 3349400 A1 7/2018
EP 3605423 A1 2/2020
GB 2500321 A 9/2013
GB 2528948 A 2/2016
JP 6-284182 A 10/1994
JP 11-39385 A 2/1999
JP 11-73530 A 3/1999
JP 2002-99854 A 4/2002
JP 2003-16398 A 1/2003
JP 2003-67210 A 3/2003
JP 2003-141541 A 5/2003
JP 2003-178244 A 6/2003
JP 2003-346059 A 12/2003
JP 2004-37998 A 2/2004
JP 2004-252736 A 9/2004
JP 2004-258738 A 9/2004
JP 2004-287592 A 10/2004
JP 2004-355484 A 12/2004
JP 2005-31972 A 2/2005
JP 2005-521961 A 7/2005
JP 2005-523505 A 8/2005
JP 2005-317049 A 11/2005
JP 2006-31182 A 2/2006
JP 2006-93912 A 4/2006
JP 2006-114018 A 4/2006
JP 2006-163960 A 6/2006
JP 2006-197071 A 7/2006
JP 2006-221468 A 8/2006
JP 2006-277670 A 10/2006
JP 2007-34637 A 2/2007

(56) References Cited

FOREIGN PATENT DOCUMENTS

| | | | |
|---|---|---|---|
| JP | 2007-507011 | A | 3/2007 |
| JP | 2007-226794 | A | 9/2007 |
| JP | 2007-334637 | A | 12/2007 |
| JP | 2008-70926 | A | 3/2008 |
| JP | 2009-9434 | A | 1/2009 |
| JP | 2009-49878 | A | 3/2009 |
| JP | 2009-80580 | A | 4/2009 |
| JP | 2009-99076 | A | 5/2009 |
| JP | 2009-134521 | A | 6/2009 |
| JP | 2009-258991 | A | 11/2009 |
| JP | 2010-102718 | A | 5/2010 |
| JP | 2010-517390 | A | 5/2010 |
| JP | 2010-152506 | A | 7/2010 |
| JP | 2010-524051 | A | 7/2010 |
| JP | 2010-211577 | A | 9/2010 |
| JP | 2010-211579 | A | 9/2010 |
| JP | 2011-503711 | A | 1/2011 |
| JP | 2011-97287 | A | 5/2011 |
| JP | 2011-519439 | A | 7/2011 |
| JP | 2012-8985 | A | 1/2012 |
| JP | 2012-504273 | A | 2/2012 |
| JP | 2012-73724 | A | 4/2012 |
| JP | 2012-508930 | A | 4/2012 |
| JP | 2012-99025 | A | 5/2012 |
| JP | 2012-114676 | A | 6/2012 |
| JP | 2012-198625 | A | 10/2012 |
| JP | 2012-215981 | A | 11/2012 |
| JP | 2012-529699 | A | 11/2012 |
| JP | 2013-20496 | A | 1/2013 |
| JP | 2013-34322 | A | 2/2013 |
| JP | 2013-58828 | A | 3/2013 |
| JP | 2013-114317 | A | 6/2013 |
| JP | 2013-530445 | A | 7/2013 |
| JP | 2013-149206 | A | 8/2013 |
| JP | 2013-157959 | A | 8/2013 |
| JP | 2013-533532 | A | 8/2013 |
| JP | 5267966 | B2 | 8/2013 |
| JP | 2013-218663 | A | 10/2013 |
| JP | 2013-222410 | A | 10/2013 |
| JP | 2013-229656 | A | 11/2013 |
| JP | 2014-41616 | A | 3/2014 |
| JP | 2014-44719 | A | 3/2014 |
| JP | 2014-44724 | A | 3/2014 |
| JP | 2014-75155 | A | 4/2014 |
| JP | 2014-102845 | A | 6/2014 |
| JP | 2014-517366 | A | 7/2014 |
| JP | 2014-520296 | A | 8/2014 |
| JP | 2014-191653 | A | 10/2014 |
| JP | 2014-528601 | A | 10/2014 |
| JP | 2015-506040 | A | 2/2015 |
| JP | 2015-43233 | A | 3/2015 |
| JP | 2015-75877 | A | 4/2015 |
| JP | 2015-187783 | A | 10/2015 |
| JP | 2015-534664 | A | 12/2015 |
| JP | 2016-1511 | A | 1/2016 |
| JP | 2016-53766 | A | 4/2016 |
| JP | 2016-71655 | A | 5/2016 |
| JP | 2016-521403 | A | 7/2016 |
| JP | 2016-224960 | A | 12/2016 |
| JP | 2017-16170 | A | 1/2017 |
| JP | 2017-500656 | A | 1/2017 |
| JP | 2017-41098 | A | 2/2017 |
| JP | 2017-91129 | A | 5/2017 |
| JP | 2017-102952 | A | 6/2017 |
| JP | 2017-138846 | A | 8/2017 |
| JP | 2018-506103 | A | 3/2018 |
| JP | 2018-524679 | A | 8/2018 |
| JP | 2019-20682 | A | 2/2019 |
| JP | 6917391 | B2 | 8/2021 |
| KR | 10-0403196 | B1 | 10/2003 |
| KR | 10-2004-0027236 | A | 4/2004 |
| KR | 10-2004-0049502 | A | 6/2004 |
| KR | 10-2004-0067514 | A | 7/2004 |
| KR | 10-2006-0098024 | A | 9/2006 |
| KR | 10-2008-0064395 | A | 7/2008 |
| KR | 10-2010-0045059 | A | 5/2010 |
| KR | 10-2011-0056561 | A | 5/2011 |
| KR | 10-2011-0067750 | A | 6/2011 |
| KR | 10-2012-0013867 | A | 2/2012 |
| KR | 10-2012-0040693 | A | 4/2012 |
| KR | 10-1184865 | B1 | 9/2012 |
| KR | 10-2013-0027326 | A | 3/2013 |
| KR | 10-2013-0112339 | A | 10/2013 |
| KR | 10-2013-0116905 | A | 10/2013 |
| KR | 10-1330962 | B1 | 11/2013 |
| KR | 10-2013-0138659 | A | 12/2013 |
| KR | 10-2014-0001515 | A | 1/2014 |
| KR | 10-2014-0018019 | A | 2/2014 |
| KR | 10-2014-0018044 | A | 2/2014 |
| KR | 10-2014-0026263 | A | 3/2014 |
| KR | 10-2014-0027029 | A | 3/2014 |
| KR | 10-2014-0055429 | A | 5/2014 |
| KR | 10-2014-0070877 | A | 6/2014 |
| KR | 10-2014-0096208 | A | 8/2014 |
| KR | 10-2014-0105309 | A | 9/2014 |
| KR | 10-2014-0121764 | A | 10/2014 |
| KR | 10-2014-0131093 | A | 11/2014 |
| KR | 10-2014-0139982 | A | 12/2014 |
| KR | 10-2015-0002170 | A | 1/2015 |
| KR | 10-2015-0013264 | A | 2/2015 |
| KR | 10-2015-0014788 | A | 2/2015 |
| KR | 10-2016-0012636 | A | 2/2016 |
| KR | 10-2016-0026791 | A | 3/2016 |
| KR | 10-2016-0048215 | A | 5/2016 |
| KR | 10-2016-0054573 | A | 5/2016 |
| KR | 10-2016-0076201 | A | 6/2016 |
| KR | 10-2016-0099397 | A | 8/2016 |
| KR | 10-2016-0099432 | A | 8/2016 |
| KR | 10-2016-0105279 | A | 9/2016 |
| KR | 10-2017-0011784 | A | 2/2017 |
| KR | 10-2017-0103997 | A | 9/2017 |
| KR | 10-2018-0051556 | A | 5/2018 |
| WO | 2003/038698 | A1 | 5/2003 |
| WO | 2003/083793 | A2 | 10/2003 |
| WO | 2007/000012 | A1 | 1/2007 |
| WO | 2007/110952 | A1 | 10/2007 |
| WO | 2007/116521 | A1 | 10/2007 |
| WO | 2008/147457 | A1 | 12/2008 |
| WO | 2009/042392 | A2 | 4/2009 |
| WO | 2010/039337 | A2 | 4/2010 |
| WO | 2010/056484 | A2 | 5/2010 |
| WO | 2010/077960 | A2 | 7/2010 |
| WO | 2011/037134 | A1 | 3/2011 |
| WO | 2012/083113 | A2 | 6/2012 |
| WO | 2012/129231 | A1 | 9/2012 |
| WO | 2012/135796 | A1 | 10/2012 |
| WO | 2013/023224 | A2 | 2/2013 |
| WO | 2013/066659 | A1 | 5/2013 |
| WO | 2013/090624 | A1 | 6/2013 |
| WO | 2013/103912 | A1 | 7/2013 |
| WO | 2013/169877 | A2 | 11/2013 |
| WO | 2013/177548 | A1 | 11/2013 |
| WO | 2013/184840 | A2 | 12/2013 |
| WO | 2014/033939 | A1 | 3/2014 |
| WO | 2014/074407 | A1 | 5/2014 |
| WO | 2014/172757 | A1 | 10/2014 |
| WO | 2015/009581 | A1 | 1/2015 |
| WO | 2015/009765 | A1 | 1/2015 |
| WO | 2015/013522 | A1 | 1/2015 |
| WO | 2015/030912 | A1 | 3/2015 |
| WO | 2015/051361 | A1 | 4/2015 |
| WO | 2015/057320 | A1 | 4/2015 |
| WO | 2015/062382 | A1 | 5/2015 |
| WO | 2015/065561 | A1 | 5/2015 |
| WO | 2015/120019 | A1 | 8/2015 |
| WO | 2015/187608 | A1 | 12/2015 |
| WO | 2016/032534 | A1 | 3/2016 |
| WO | 2016/111808 | A1 | 7/2016 |
| WO | 2016/123309 | A1 | 8/2016 |
| WO | 2016/126374 | A1 | 8/2016 |
| WO | 2016/126775 | A1 | 8/2016 |
| WO | 2016/129938 | A1 | 8/2016 |
| WO | 2016/201037 | A1 | 12/2016 |
| WO | 2017/030223 | A1 | 2/2017 |

(56) References Cited

FOREIGN PATENT DOCUMENTS

| | | | |
|---|---|---|---|
| WO | 2017/030642 | A1 | 2/2017 |
| WO | 2017/041641 | A1 | 3/2017 |
| WO | 2017/072589 | A2 | 5/2017 |
| WO | 2017/078792 | A1 | 5/2017 |
| WO | 2017/218094 | A1 | 12/2017 |
| WO | 2018/226265 | A1 | 12/2018 |

OTHER PUBLICATIONS

Applicant-Initiated Interview Summary received for U.S. Appl. No. 17/027,274, dated Sep. 22, 2022, 3 pages.
Office Action received for Australian Patent Application No. 2020247707, dated Sep. 19, 2022, 3 pages.
Examiner's Answer to Appeal Brief received for U.S. Appl. No. 16/581,614, dated Jun. 29, 2022, 28 pages.
Final Office Action received for U.S. Appl. No. 17/027,274, dated Jun. 16, 2022, 25 pages.
Liu et al., "A Survey of Payment Card Industry Data Security Standard", IEEE Communications Surveys & Tutoriais, vol. 12, No. 3, Third Quarter 2010, 2010, pp. 287-303.
Applicant-Initiated Interview Summary received for U.S. Appl. No. 17/027,274, dated Mar. 22, 2022, 3 pages.
Notice of Allowance received for U.S. Appl. No. 16/549,862, dated Feb. 7, 2022, 8 pages.
Monirzadeh et al., "Detection of Violations in Credit Cards of Banks and Financial Institutions based on Artificial Neural Network and Metaheuristic Optimization Algorithm", (IJACSA) International Journal of Advanced Computer Science and Applications, vol. 9, No. 1, 2018, pp. 176-182.
Notice of Allowance received for U.S. Appl. No. 17/027,274, dated Oct. 17, 2022, 25 pages.
Adractas et al., "The road to mobile payments services", McKinsey on Payments, Online available at: https://www.mckinsey.com.br/~/media/mckinsey/dotcom/client_service/financial%20services/latest%20thinking/reports/the_road_to_mobile_payments_services.pdf, Sep. 2011, pp. 45-52.
Adrianisen, "Samsung Galaxy S8 Face Recognition—Register Your Face Review!", Retrieved from < https://www.youtube.com/watch?v=04KVPaCJq94>, Apr. 27, 2017, 1 page.
Advisory Action received for U.S. Appl. No. 14/503,296, dated Oct. 2, 2015, 3 pages.
Advisory Action received for U.S. Appl. No. 14/869,715, dated Feb. 8, 2017, 3 pages.
Advisory Action received for U.S. Appl. No. 14/869,715, dated May 18, 2017, 6 pages.
Advisory Action received for U.S. Appl. No. 14/869,877, dated Jan. 5, 2017, 3 pages.
Advisory Action received for U.S. Appl. No. 14/870,793, dated Apr. 13, 2017, 3 pages.
Advisory Action received for U.S. Appl. No. 15/137,944, dated May 11, 2017, 6 pages.
Advisory Action received for U.S. Appl. No. 15/274,910, dated Aug. 12, 2019, 3 pages.
Advisory Action received for U.S. Appl. No. 16/164,561, dated Nov. 14, 2019, 2 pages.
Advisory Action received for U.S. Appl. No. 16/581,614, dated Sep. 11, 2020, 8 pages.
Applicant-Initiated Interview Summary received for U.S. Appl. No. 15/274,910, dated Jul. 9, 2020, 3 pages.
Applicant-Initiated Interview Summary received for U.S. Appl. No. 15/351,230, dated Nov. 22, 2019, 5 pages.
Applicant-Initiated Interview Summary received for U.S. Appl. No. 15/823,269, dated Sep. 17, 2020, 3 pages.
Applicant-Initiated Interview Summary received for U.S. Appl. No. 15/884,195, dated Apr. 28, 2020, 5 pages.
Applicant-Initiated Interview Summary received for U.S. Appl. No. 15/884,195, dated Aug. 17, 2021,4 pages.
Applicant-Initiated Interview Summary received for U.S. Appl. No. 15/884,195, dated Dec. 17, 2020, 3 pages.
Applicant-Initiated Interview Summary received for U.S. Appl. No. 15/981,817, dated Apr. 22, 2020, 5 pages.
Applicant-Initiated Interview Summary received for U.S. Appl. No. 16/125,267, dated Feb. 8, 2021, 3 pages.
Applicant-Initiated Interview Summary received for U.S. Appl. No. 16/125,267, dated Jun. 25, 2021, 5 pages.
Applicant-Initiated Interview Summary received for U.S. Appl. No. 16/125,267, dated Sep. 14, 2020, 5 pages.
Applicant-Initiated Interview Summary received for U.S. Appl. No. 16/147,023, dated Oct. 29, 2019, 3 pages.
Applicant-Initiated Interview Summary received for U.S. Appl. No. 16/152,139, dated Aug. 10, 2020, 3 pages.
Applicant-Initiated Interview Summary received for U.S. Appl. No. 16/152,139, dated Jan. 13, 2021, 3 pages.
Applicant-Initiated Interview Summary received for U.S. Appl. No. 16/428,875, dated Oct. 20, 2020, 6 pages.
Applicant-Initiated Interview Summary received for U.S. Appl. No. 16/549,862, dated May 21, 2021, 2 pages.
Applicant-Initiated Interview Summary received for U.S. Appl. No. 16/581,569, dated May 1, 2020, 3 pages.
Applicant-Initiated Interview Summary received for U.S. Appl. No. 16/581,614, dated Apr. 30, 2020, 4 pages.
Applicant-Initiated Interview Summary received for U.S. Appl. No. 16/581,614, dated Aug. 26, 2020, 3 pages.
Applicant-Initiated Interview Summary received for U.S. Appl. No. 16/581,614, dated May 18, 2021, 2 pages.
Applicant-Initiated Interview Summary received for U.S. Appl. No. 16/667,271, dated Apr. 8, 2020, 3 pages.
Applicant-Initiated Interview Summary received for U.S. Appl. No. 16/736,704, dated Aug. 27, 2020, 5 pages.
Applicant-Initiated Interview Summary received for U.S. Appl. No. 16/736,704, dated Dec. 11, 2020, 4 pages.
Applicant-Initiated Interview Summary received for U.S. Appl. No. 16/786,694, dated Dec. 17, 2020, 6 pages.
Applicant-Initiated Interview Summary received for U.S. Appl. No. 16/814,226, dated Aug. 30, 2021,3 pages.
Bank of Queensland, "Logging on to BOQ Internet Banking", Available Online at: https://www.youtube.com/watch?v=afK0EiQq-4Q, May 29, 2013, 3 pages.
Bank of Queensland, "Online Banking Video Tutorials", Available Online at: https://www.boq.com.au/help-and-support/online-banking/ob-video-tutorials, 2020, 1 page.
Bank of Queensland, "Paying a Bill via BPAY with BOQ Internet Banking", Available Online at: https://www.youtube.com/watch?v=f8-5Z00o2to, May 29, 2013, 3 pages.
Bank of Queensland, "Transferring Funds to a 3rd Party (Pay Anyone) with BOQ Internet Banking", Available Online at: https://www.youtube.com/watch?v=-_7FeV8mm-o, May 29, 2013, 3 pages.
Bao et al., "Location-based and Preference-Aware Recommendation Using Sparse Geo-Social Networking Data", ACM SIGSPATIAL GIS '12, Redondo Beach, CA, USA, Online available at :https://www.microsoft.com/en-us/research/wp-content/uploads/2016/02/LocationRecommendation.pdf, Nov. 6-9, 2012, 10 pages.
Brief Communication Regarding Oral Proceedings received for European Patent Application No. 15727291.5, dated Jun. 9, 2020, 12 pages.
Brief Communication Regarding Oral Proceedings received for European Patent Application No. 16201159.7, dated Jun. 29, 2021, 13 pages.
Brief Communication Regarding Oral Proceedings received for European Patent Application No. 16201205.8, dated May 29, 2020, 29 pages.
Brief Communication Regarding Oral Proceedings received for European Patent Application No. 16804040.0, dated May 28, 2020, 15 pages.
Brief Communication Regarding Oral Proceedings received for European Patent Application No. 18830326.7, dated Jun. 30, 2021, 2 pages.
Brief Communication Regarding Oral Proceedings received for European Patent Application No. 19171661.2, dated May 28, 2020, 2 pages.

(56) References Cited

OTHER PUBLICATIONS

Brief Communication Regarding Oral Proceedings received for European Patent Application No. 19171661.2, dated Sep. 3, 2020, 2 pages.
Certificate of Examination received for Australian Patent Application No. 2019100592, dated Feb. 6, 2020, 2 pages.
Certificate of Examination received for Australian Patent Application No. 2020100388, dated Sep. 28, 2020, 2 pages.
Corrected Notice of Allowance received for U.S. Appl. No. 14/870,793, dated Feb. 25, 2021, 19 pages.
Corrected Notice of Allowance received for U.S. Appl. No. 14/870,793, dated Mar. 8, 2021, 19 pages.
Corrected Notice of Allowance received for U.S. Appl. No. 15/137,944, dated Jan. 11, 2018, 2 pages.
Corrected Notice of Allowance received for U.S. Appl. No. 15/137,944, dated Jan. 19, 2018, 2 pages.
Corrected Notice of Allowance received for U.S. Appl. No. 15/294,439, dated Mar. 13, 2019,4 pages.
Corrected Notice of Allowance received for U.S. Appl. No. 15/866,341, dated Aug. 21, 2019, 3 pages.
Corrected Notice of Allowance received for U.S. Appl. No. 15/866,341, dated Aug. 26, 2019, 3 pages.
Corrected Notice of Allowance received for U.S. Appl. No. 16/549,862, dated Dec. 2, 2021, 2 pages.
CV Meerkat, "Extracting Face Orientation in Real-time", Available online at: <https://www.youtube.com/watch?v=Ugwfnjx6UYw>, Jul. 22, 2016, 3 pages.
Decision on Appeal received for Korean Patent Application No. 10-2016-0152210, dated Jun. 23, 2020, 20 pages.
Decision on Appeal received for Korean Patent Application No. 10-2018-7019643, dated Jun. 9, 2020, 27 pages.
Decision on Appeal received for U.S. Appl. No. 14/869,831, dated Nov. 2, 2020, 8 pages.
Decision on Appeal received for U.S. Appl. No. 14/869,877, dated Mar. 18, 2021, 12 pages.
Decision on Appeal received for U.S. Appl. No. 14/870,793, dated Nov. 3, 2020, 11 pages.
Decision on Request for Rehearing received for U.S. Appl. No. 14/869,831, dated Mar. 8, 2021, 9 pages.
Decision to Grant received for Danish Patent Application No. PA201670042, dated Mar. 19, 2018, 2 pages.
Decision to Grant received for Danish Patent Application No. PA201770502, dated Feb. 25, 2021, 2 pages.
Decision to Grant received for Danish Patent Application No. PA201770503, dated Feb. 14, 2020, 2 pages.
Decision to Grant received for Danish Patent Application No. PA201770715, dated Feb. 15, 2019, 2 pages.
Decision to Grant received for Danish Patent Application No. PA201870370, dated Mar. 29, 2019, 2 pages.
Decision to Grant received for Danish Patent Application No. PA201870371, dated Mar. 29, 2019, 2 pages.
Decision to Grant received for Danish Patent Application No. PA201870855, dated Oct. 20, 2020, 2 pages.
Decision to Grant received for Danish Patent Application No. PA201970127, dated Aug. 20, 2020, 2 pages.
Decision to Refuse Application received for the European Patent Application No. 16803996.4, dated Apr. 3, 2020, 25 pages.
Decision to Refuse received for European Patent Application No. 15727291.5, dated Jun. 30, 2020, 21 pages.
Decision to Refuse received for European Patent Application No. 15728352.4, dated May 28, 2020, 25 pages.
Decision to Refuse received for European Patent Application No. 16201195.1, dated Mar. 4, 2019, 23 pages.
Decision to Refuse received for European Patent Application No. 16201205.8, dated Jun. 30, 2020, 29 pages.
Decision to Refuse received for European Patent Application No. 16703893.4, dated Jul. 24, 2019, 22 pages.
Decision to Refuse received for European Patent Application No. 16804040.0, dated Nov. 4, 2020, 18 pages.
Decision to Refuse received for European Patent Application No. 18154163.2, dated May 17, 2019, 22 pages.
Decision to Refuse received for European Patent Application No. 19171661.2, dated Oct. 22, 2020, 7 pages.
Decision to Refuse received for the European Patent Application No. 16803996.4, dated Apr. 14, 2020, 28 pages.
Does Apple Pay change payment?, Mac Fan, Japan, Mynavi Publishing Corporation, vol. 22, No. 11 common No. 381, Nov. 1, 2014, 11 pages.
Drareni Jamil, "Face Tracking and Head Pose Estimation with Open CV", Available online at: <https://www.youtube.com/watch?v=Etj_aktbnwM>, Jun. 9, 2013, 3 pages.
European Search Report received for European Patent Application No. 19171661.2, dated Jul. 17, 2019, 6 pages.
European Search Report received for European Patent Application No. 20180033.1, dated Jul. 6, 2020, 4 pages.
European Search Report received for European Patent Application No. 20204436.8, dated Mar. 9, 2021, 5 pages.
European Search Report received for European Patent Application No. 21150414.7, dated Apr. 21, 2021, 4 pages.
European Search Report received for European Patent Application No. 21150992.2, dated Jun. 23, 2021, 6 pages.
Ex Parte Quayle Action received for U.S. Appl. No. 14/869,831, dated May 28, 2021, 16 pages.
Examiner's Answer to Appeal Brief received for U.S. Appl. No. 14/870,793, dated Apr. 16, 2018, 15 pages.
Examiner's Answer to Appeal Brief received for U.S. Appl. No. 14/869,831, dated Aug. 12, 2019, 16 pages.
Examiner's Answer to Appeal Brief received for U.S. Appl. No. 14/869,877, dated Jun. 26, 2020, 14 pages.
Extended European Search Report received for European Patent Application No. 16201159.7, dated Mar. 27, 2017, 12 pages.
Extended European Search Report received for European Patent Application No. 16201195.1, dated Feb. 7, 2017, 13 pages.
Extended European Search Report received for European Patent Application No. 16201205.8, dated Jan. 5, 2017, 12 pages.
Extended European Search Report received for European Patent Application No. 16803996.4, dated Feb. 7, 2018, 8 pages.
Extended European Search Report received for European Patent Application No. 16804040.0, dated Feb. 26, 2018, 9 pages.
Extended European Search Report received for European Patent Application No. 17810682.9, dated Mar. 26, 2019, 7 pages.
Extended European Search Report received for European Patent Application No. 17835789.3, dated Jun. 23, 2020, 12 pages.
Extended European Search Report received for European Patent Application No. 18154163.2, dated Mar. 2, 2018, 4 pages.
Extended European Search Report received for European Patent Application No. 19160344.8, dated Jun. 14, 2019, 7 pages.
Extended European Search Report received for European Patent Application No. 19160348.9, dated Jul. 19, 2019, 6 pages.
Extended European Search Report received for European Patent Application No. 19194828.0, dated Dec. 19, 2019, 7 pages.
Extended European Search Report received for European Patent Application No. 20186286.9, dated Nov. 2, 2020, 9 pages.
Extended European Search Report received for European Patent Application No. 20198076.0, dated Jan. 13, 2021, 8 pages.
Final Office Action received for U.S. Appl. No. 14/503,072, dated Mar. 2, 2017, 9 pages.
Final Office Action received for U.S. Appl. No. 14/503,072, dated Sep. 1, 2015, 16 pages.
Final Office Action received for U.S. Appl. No. 14/503,296, dated Apr. 24, 2019, 5 pages.
Final Office Action received for U.S. Appl. No. 14/503,296, dated Jul. 2, 2015, 7 pages.
Final Office Action received for U.S. Appl. No. 14/503,296, dated Jun. 4, 2018, 8 pages.
Final Office Action received for U.S. Appl. No. 14/869,715, dated Jun. 17, 2016, 35 pages.
Final Office Action received for U.S. Appl. No. 14/869,715, dated Mar. 7, 2017, 41 pages.
Final Office Action received for U.S. Appl. No. 14/869,715, dated Oct. 6, 2016, 37 pages.

(56) References Cited

OTHER PUBLICATIONS

Final Office Action received for U.S. Appl. No. 14/869,831, dated Aug. 2, 2016, 14 pages.
Final Office Action received for U.S. Appl. No. 14/869,831, dated Jul. 30, 2018, 31 pages.
Final Office Action received for U.S. Appl. No. 14/869,831, dated May 19, 2017, 20 pages.
Final Office Action received for U.S. Appl. No. 14/869,877, dated Apr. 26, 2018, 18 pages.
Final Office Action received for U.S. Appl. No. 14/869,877, dated Aug. 3, 2016, 13 pages.
Final Office Action received for U.S. Appl. No. 14/869,877, dated Jun. 11, 2019, 35 pages.
Final Office Action received for U.S. Appl. No. 14/870,726, dated Apr. 19, 2017, 17 pages.
Final Office Action received for U.S. Appl. No. 14/870,793, dated Jan. 19, 2017, 16 pages.
Final Office Action received for U.S. Appl. No. 14/871,635, dated Jan. 18, 2018, 33 pages.
Final Office Action received for U.S. Appl. No. 14/871,635, dated May 3, 2019, 32 pages.
Final Office Action received for U.S. Appl. No. 14/871,654, dated Nov. 16, 2017, 32 pages.
Final Office Action received for U.S. Appl. No. 15/137,944, dated Feb. 27, 2017, 10 pages.
Final Office Action received for U.S. Appl. No. 15/274,910, dated May 31, 2019, 31 pages.
Final Office Action received for U.S. Appl. No. 15/274,910, dated Oct. 16, 2020, 34 pages.
Final Office Action received for U.S. Appl. No. 15/351,230, dated Nov. 4, 2019, 6 pages.
Final Office Action received for U.S. Appl. No. 15/866,341, dated May 14, 2019,10 pages.
Final Office Action received for U.S. Appl. No. 15/884,195, dated Feb. 22, 2021, 26 pages.
Final Office Action received for U.S. Appl. No. 15/884,195, dated Sep. 29, 2020, 20 pages.
Final Office Action received for U.S. Appl. No. 16/125,267, dated Aug. 26, 2021, 22 pages.
Final Office Action received for U.S. Appl. No. 16/125,267, dated Dec. 10, 2020, 20 pages.
Final Office Action received for U.S. Appl. No. 16/147,023, dated Jul. 23, 2019, 18 pages.
Final Office Action received for U.S. Appl. No. 16/147,115, dated Jun. 19, 2019, 14 pages.
Final Office Action received for U.S. Appl. No. 16/152,139, dated Nov. 20, 2020, 9 pages.
Final Office Action received for U.S. Appl. No. 16/164,561, dated Sep. 5, 2019, 12 pages.
Final Office Action received for U.S. Appl. No. 16/581,614, dated Aug. 27, 2021, 18 pages.
Final Office Action received for U.S. Appl. No. 16/581,614, dated Jul. 10, 2020, 21 pages.
Final Office Action received for U.S. Appl. No. 16/736,704, dated Oct. 13, 2020, 62 pages.
Final Office Action received for U.S. Appl. No. 14/870,694, dated Apr. 7, 2017, 16 pages.
Giving Apple Pay a Try, The Consumer Credit Monthly, Kinzai Institute for Financial Affairs, Inc, vol. 33, No. 1, ISSN: 0288-8122, 2015, 7 pages.
Hartl et al., "Efficient Verification of Holograms Using Mobile Augmented Reality", IEEE Transactions on Visualization and Computer Graphics, vol. 22, No. 7, Online available at: https://arbook.icg.tugraz.at/schmalstieg/Schmalstieg_302.pdf, 2015, 9 pages.
How To Smartphone, "Samsung Galaxy S7—screen rotation on / off", Available Online at <https://www.youtube.com/watch?v=np54sEEI11E >, see video from 1:10 to 1:30., Dec. 12, 2016, 3 pages.
Intention to Grant received for Danish patent Application No. PA201670042, dated Jan. 29, 2018, 2 pages.
Intention to Grant received for Danish Patent Application No. PA201770502, dated Oct. 6, 2020, 2 pages.
Intention to Grant received for Danish Patent Application No. PA201770503, dated Nov. 11, 2019, 2 pages.
Intention to Grant received for Danish Patent Application No. PA201770714, dated Feb. 15, 2019, 2 pages.
Intention to Grant received for Danish Patent Application No. PA201770714, dated Nov. 2, 2018, 2 pages.
Intention to Grant received for Danish Patent Application No. PA201770715, dated Nov. 13, 2018, 2 pages.
Intention to Grant received for Danish Patent Application No. PA201870370, dated Jan. 2, 2019, 2 pages.
Intention to Grant received for Danish Patent Application No. PA201870371, dated Jan. 2, 2019, 2 pages.
Intention to Grant received for Danish Patent Application No. PA201870855, dated Jul. 13, 2020, 2 pages.
Intention to Grant received for Danish Patent Application No. PA201970127, dated Apr. 21, 2020, 2 pages.
Intention to Grant received for European Patent Application No. 18830326.7, dated Sep. 15, 2021, 11 pages.
International Preliminary Report on Patentability received for PCT Patent Application No. PCT/US2018/049289, dated Mar. 19, 2020, 9 pages.
International Preliminary Report on Patentability received for PCT Patent Application No. PCT/US2015/033326, dated Dec. 8, 2016, 11 pages.
International Preliminary Report on Patentability received for PCT Patent Application No. PCT/US2015/033380, dated Dec. 8, 2016, 10 pages.
International Preliminary Report on Patentability received for PCT Patent Application No. PCT/US2016/015316, dated Aug. 10, 2017, 10 pages.
International Preliminary Report on Patentability received for PCT Patent Application No. PCT/US2016/033751, dated Dec. 14, 2017,11 pages.
International Preliminary Report on Patentability received for PCT Patent Application No. PCT/US2016/034175, dated Dec. 14, 2017, 14 pages.
International Preliminary Report on Patentability received for PCT Patent Application No. PCT/US2017/031748, dated Dec. 20, 2018, 10 pages.
International Preliminary Report on Patentability received for PCT Patent Application No. PCT/US2017/49500, dated Mar. 21, 2019, 14 pages.
International Preliminary Report on Patentability received for PCT Patent Application No. PCT/US2018/015603, dated Mar. 19, 2020, 8 pages.
International Preliminary Report on Patentability received for PCT Patent Application No. PCT/US2018/033054, dated Nov. 28, 2019, 21 pages.
International Preliminary Report on Patentability received for PCT Patent Application No. PCT/US2019/024702, dated Dec. 17, 2020, 12 pages.
International Preliminary Report on Patentability received for PCT Patent Application No. PCT/US2019/035064, dated Dec. 17, 2020, 9 pages.
International Preliminary Report on Patentability received for PCT Patent Application No. PCT/US2020/020414, dated Oct. 7, 2021, 18 pages.
International Search Report and Written Opinion received for PCT Patent Application No. PCT/US2018/033054, dated Oct. 30, 2018, 32 pages.
International Search Report and Written Opinion received for PCT Patent Application No. PCT/US2015/033326, dated Aug. 10, 2015, 13 pages.
International Search Report and Written Opinion received for PCT Patent Application No. PCT/US2015/033380, dated Aug. 10, 2015, 13 pages.
International Search Report and Written Opinion received for PCT Patent Application No. PCT/US2016/033751, dated Oct. 5, 2016, 14 pages.

(56) References Cited

OTHER PUBLICATIONS

International Search Report and Written Opinion received for PCT Patent Application No. PCT/US2016/034175, dated Oct. 7, 2016, 17 pages.
International Search Report and Written Opinion received for PCT Patent Application No. PCT/US2017/031748, dated Aug. 29, 2017, 14 pages.
International Search Report and Written Opinion received for PCT Patent Application No. PCT/US2017/49500, dated Jan. 18, 2018, 18 pages.
International Search Report and Written Opinion received for PCT Patent Application No. PCT/US2018/015603, dated Jun. 22, 2018, 13 pages.
International Search Report and Written Opinion received for PCT Patent Application No. PCT/US2018/049289, dated Feb. 19, 2019, 12 pages.
International Search Report and Written Opinion received for PCT Patent Application No. PCT/US2019/024702, dated Sep. 13, 2019, 17 pages.
International Search Report and Written Opinion received for PCT Patent Application No. PCT/US2019/035064, dated Aug. 9, 2019, 12 pages.
International Search Report and Written Opinion received for PCT Patent Application No. PCT/US2020/020414, dated Jul. 27, 2020, 27 pages.
International Search Report and Written Opinion received for PCT Patent Application No. PCT/US2020/048799, dated Jan. 19, 2021, 19 pages.
International Search Report and Written Opinion received for PCT Patent Application No. PCT/US2016/015316, dated Mar. 8, 2016, 13 pages.
Invitation to Pay Additional Fee received for PCT Patent Application No. PCT/US2017/031748, dated Jun. 21, 2017, 2 pages.
Invitation to Pay Additional Fee received for PCT Patent Application No. PCT/US2017/49500, dated Nov. 14, 2017, 3 pages.
Invitation to Pay Additional Fees received for PCT Patent Application No. PCT/US2016/033751, dated Jul. 22, 2016, 2 pages.
Invitation to Pay Additional Fees received for PCT Patent Application No. PCT/US2016/034175, dated Aug. 11, 2016, 3 pages.
Invitation to Pay Additional Fees received for PCT Patent Application No. PCT/US2018/033054, dated Sep. 4, 2018, 25 pages.
Invitation to Pay Additional Fees received for PCT Patent Application No. PCT/US2019/024702, dated Jul. 22, 2019, 11 pages.
Invitation to Pay Additional Fees received for PCT Patent Application No. PCT/US2020/020414, dated Jun. 4, 2020, 24 pages.
Invitation to Pay Additional Fees received for PCT Patent Application No. PCT/US2020/048799, dated Nov. 20, 2020, 13 pages.
Invitation to Pay Search Fees received for European Patent Application No. 18730556.0, dated Mar. 2, 2020, 3 pages.
IOS Security, White Paper, Available online at: https://web.archive.org/web/20150526223200/http://www.apple.com/business/docs/iOS_Security_Guide.pdf, Apr. 2015, 55 pages.
Kawai Yasuhiro, "Resolving anxieties regarding card payment abuse by authentication—overcoming cumbersomeness by cooperation with mobile phones", Nikkei Internet Solutions No. 78, Japan, Nikkei BP, No. 78, Dec. 22, 2003, pp. 28-31.
Komachi Aneem, "Time Attendance—Face Recognition—Biometrics", Available at <https://www.youtube.com/watch?v=asclTiiiSbc>, Feb. 9, 2010, 1 page.
Lu Haiyun, "Recommendations Based on Purchase Patterns", International Journal of Machine Learning and Computing, vol. 4, No. 6, Online available at: http://www.ijmlc.org/papers/462-C015.pdf, Dec. 2014, pp. 501-504.
Mahindra Comviva, "The Evolution of Digital and Mobile Wallets", Online available at: https://www.paymentscardsandmobile.com/wp-content/uploads/2016/10/The-Evolution-of-Digital-and-Mobile-Wallets.pdf, Aug. 2016, 24 pages.
Microsoft, "Pair a Bluetooth device in Windows", Online available at: https://support.microsoft.com/en-us/windows/pair-a-bluetooth-device-in-windows-2be7b51f-6ae9-b757-a3b9-95ee40c3e242, 2021, 5 pages.
Minutes of Oral Proceeding received for European Patent Application No. 16703893.4, dated Jul. 22, 2019, 9 pages.
Minutes of the Oral Proceedings received for European Patent Application No. 15727291.5, dated Jun. 29, 2020, 8 pages.
Minutes of the Oral Proceedings received for European Patent Application No. 15728352.4, dated May 27, 2020, 3 pages.
Minutes of the Oral Proceedings received for European Patent Application No. 16201205.8, dated Jun. 29, 2020, 6 pages.
Minutes of the Oral Proceedings received for European Patent Application No. 16804040.0, dated Nov. 2, 2020, 6 pages.
Minutes of the Oral Proceedings received for European Patent Application No. 18154163.2, dated May 17, 2019, 7 pages.
Minutes of the Oral Proceedings received for European Patent Application No. 19171661.2, dated Oct. 15, 2020, 5 pages.
Naver Blog, "How to Use Smart Wallet and Registered Card", Online Available at <http://feena74.blog.me/140185758401>, Mar. 29, 2013, 20 pages.
Nhdanh—Protocol Corp, "How To Enroll Face Enbioaccess T9 Nitgen Korea—Đăng Ký Khuôn Mặt Enbioaccess T9 Nitgen", Available online at: https://www.youtube.com/watch?v=mFn03PD4NIE, Mar. 30, 2017, 1 page.
Nomad Studio, "Hajimete-no smartphone-no-komatta-wo-sakutto-kaiketsu (Easy solution to troubles at your first smartphone)", Kazukuni Saito of Shuwa System Co., Ltd., 1st Ed, Jul. 1, 2016, 20 pages.
Non-Final Office Action received for U. S. U.S. Appl. No. 14/869,715, dated Jan. 29, 2016, 62 pages.
Non-Final Office Action received for U.S. Appl. No. 17/037,085, dated Jul. 8, 2021, 37 pages.
Non-Final Office Action received for U.S. Appl. No. 14/503,072, dated Jan. 26, 2015, 12 pages.
Non-Final Office Action received for U.S. Appl. No. 14/503,072, dated Jun. 17, 2016, 19 pages.
Non-Final Office Action received for U.S. Appl. No. 14/503,296, dated Aug. 28, 2017, 14 pages.
Non-Final Office Action received for U.S. Appl. No. 14/503,296, dated Jan. 30, 2015, 16 pages.
Non-Final Office Action received for U.S. Appl. No. 14/503,296, dated Oct. 5, 2016, 11 pages.
Non-Final Office Action received for U.S. Appl. No. 14/503,296, dated Sep. 18, 2018, 20 pages.
Non-Final Office Action received for U.S. Appl. No. 14/503,381, dated May 13, 2015, 13 pages.
Non-Final Office Action received for U.S. Appl. No. 14/869,715, dated Oct. 11, 2016, 37 pages.
Non-Final Office Action received for U.S. Appl. No. 14/869,877, dated Jan. 29, 2016, 18 pages.
Non-Final Office Action received for U.S. Appl. No. 14/869,877, dated Jun. 16, 2017, 17 pages.
Non-Final Office Action received for U.S. Appl. No. 14/869,877, dated Oct. 5, 2018, 19 pages.
Non-Final Office Action received for U.S. Appl. No. 14/870,726, dated Sep. 16, 2016, 12 pages.
Non-Final Office Action received for U.S. Appl. No. 14/870,793, dated Apr. 19, 2016, 17 pages.
Non-Final Office Action received for U.S. Appl. No. 14/871,635, dated May 5, 2017, 23 pages.
Non-Final Office Action Received for U.S. Appl. No. 14/871,635, dated Nov. 16, 2018, 36 pages.
Non-Final Office Action Received for U.S. Appl. No. 14/871,654, dated May 4, 2017, 23 pages.
Non-Final Office Action received for U.S. Appl. No. 15/137,944, dated Jul. 27, 2017, 13 pages.
Non-Final Office Action received for U.S. Appl. No. 15/137,944, dated Oct. 18, 2016, 10 pages.
Non-Final Office Action received for U.S. Appl. No. 15/274,086, dated Jan. 11, 2017, 21 pages.
Non-Final Office Action received for U.S. Appl. No. 15/274,910, dated Apr. 6, 2020, 33 pages.

(56) References Cited

OTHER PUBLICATIONS

Non-Final Office Action received for U.S. Appl. No. 15/274,910, dated Oct. 18, 2018, 26 pages.
Non-Final Office Action received for U.S. Appl. No. 15/294,439, dated Jan. 26, 2018, 18 pages.
Non-Final Office Action received for U.S. Appl. No. 15/351,230, dated Apr. 18, 2019, 16 pages.
Non-Final Office Action received for U.S. Appl. No. 15/823,269, dated Jun. 23, 2020, 14 pages.
Non-Final Office Action received for U.S. Appl. No. 15/866,341, dated Nov. 13, 2018, 11 pages.
Non-Final Office Action received for U.S. Appl. No. 15/884,195, dated Feb. 27, 2020, 18 pages.
Non-Final Office Action received for U.S. Appl. No. 15/884,195, dated May 18, 2021, 26 pages.
Non-Final Office Action received for U.S. Appl. No. 15/894,221, dated Jul. 25, 2018, 21 pages.
Non-Final Office Action received for U.S. Appl. No. 15/903,456, dated Sep. 6, 2018, 20 pages.
Non-Final Office Action received for U.S. Appl. No. 15/981,817, dated Jan. 2, 2020, 31 pages.
Non-Final Office Action received for U.S. Appl. No. 15/992,722, dated Aug. 6, 2020, 7 pages.
Non-Final Office Action received for U.S. Appl. No. 16/125,267, dated Jul. 2, 2020, 20 pages.
Non-Final Office Action received for U.S. Appl. No. 16/125,267, dated Mar. 26, 2021, 20 pages.
Non-Final Office Action received for U.S. Appl. No. 16/147,023, dated Dec. 26, 2018, 17 pages.
Non-Final Office Action received for U.S. Appl. No. 16/147,115, dated Dec. 13, 2018, 12 pages.
Non-Final Office Action received for U.S. Appl. No. 16/152,139, dated May 20, 2020, 9 pages.
Non-Final Office Action received for U.S. Appl. No. 16/164,561, dated Jan. 4, 2019, 14 pages.
Non-Final Office Action received for U.S. Appl. No. 16/428,875, dated Jul. 28, 2020, 30 pages.
Non-Final Office Action received for U.S. Appl. No. 16/542,084, dated Jan. 24, 2020, 21 pages.
Non-Final Office Action received for U.S. Appl. No. 16/549,862, dated Mar. 8, 2021, 23 pages.
Non-Final Office Action received for U.S. Appl. No. 16/581,569, dated Feb. 13, 2020, 32 pages.
Non-Final Office Action received for U.S. Appl. No. 16/581,614, dated Feb. 4, 2021, 18 pages.
Non-Final Office Action received for U.S. Appl. No. 16/581,614, dated Jan. 29, 2020, 13 pages.
Non-Final Office Action received for U.S. Appl. No. 16/667,271, dated Dec. 13, 2019, 8 pages.
Non-Final Office Action received for U.S. Appl. No. 16/736,704, dated May 1, 2020, 41 pages.
Non-Final Office Action received for U.S. Appl. No. 16/786,694, dated Oct. 5, 2020, 23 pages.
Non-Final Office Action received for U.S. Appl. No. 16/789,132, dated Aug. 5, 2021, 25 pages.
Non-Final Office Action received for U.S. Appl. No. 16/814,226, dated Jul. 13, 2021, 17 pages.
Non-Final Office Action received for U.S. Appl. No. 16/990,974, dated Oct. 15, 2020, 6 pages.
Non-Final Office Action received for U.S. Appl. No. 14/503,364, dated Feb. 3, 2016, 16 pages.
Non-Final Office Action received for U.S. Appl. No. 14/869,831, dated Jan. 29, 2016, 18 pages.
Non-Final Office Action received for U.S. Appl. No. 14/869,831, dated Nov. 22, 2017, 17 pages.
Non-Final Office Action received for U.S. Appl. No. 14/870,694, dated Sep. 23, 2016, 13 pages.
Notice of Acceptance received for Australian Patent Application No. 2018200628, dated Jun. 13, 2019, 3 pages.
Notice of Acceptance received for Australian Patent Application No. 2015266650, dated Jan. 18, 2018, 3 pages.
Notice of Acceptance received for Australian Patent Application No. 2015266693, dated Jan. 19, 2018, 3 pages.
Notice of Acceptance received for Australian Patent Application No. 2016211504, dated Oct. 17, 2017, 3 pages.
Notice of Acceptance received for Australian Patent Application No. 2017201064, dated Feb. 20, 2018, 3 pages.
Notice of Acceptance received for Australian Patent Application No. 2018202559, dated Oct. 21, 2019, 3 pages.
Notice of Acceptance received for Australian Patent Application No. 2018269512, dated Jan. 28, 2020, 3 pages.
Notice of Acceptance received for Australian Patent Application No. 2018279788, dated Nov. 6, 2019, 3 pages.
Notice of Acceptance received for Australian Patent Application No. 2018312629, dated Nov. 7, 2019, 4 pages.
Notice of Acceptance received for Australian Patent Application No. 2019200360, dated Mar. 15, 2019, 3 pages.
Notice of Acceptance received for Australian Patent Application No. 2019201101, dated May 6, 2019, 3 pages.
Notice of Acceptance received for Australian Patent Application No. 2020200685, dated Oct. 29, 2020, 3 pages.
Notice of Acceptance received for Australian Patent Application No. 2020200795, dated Feb. 28, 2020, 3 pages.
Notice of Acceptance received for Australian Patent Application No. 2020201306, dated Mar. 12, 2020, 3 pages.
Notice of Acceptance received for Australian Patent Application No. 2020239783, dated Mar. 2, 2021, 3 pages.
Notice of Allowance received for Chinese Patent Application No. 201520357381.9, dated Jul. 29, 2015, 4 pages.
Notice of Allowance received for Chinese Patent Application No. 201520358683.8, dated Mar. 10, 2016, 5 pages.
Notice of Allowance received for Chinese Patent Application No. 201610069731.0, dated Sep. 6, 2019, 2 pages.
Notice of Allowance received for Chinese Patent Application No. 201610371774.4, dated Jun. 4, 2020, 2 pages.
Notice of Allowance received for Chinese Patent Application No. 201610371856.9, dated May 11, 2020, 2 pages.
Notice of Allowance received for Chinese Patent Application No. 201620480708.6, dated Apr. 20, 2017, 3 pages.
Notice of Allowance received for Chinese Patent Application No. 201620480846.4, dated Apr. 20, 2017, 3 pages.
Notice of Allowance received for Chinese Patent Application No. 201710093861.2, dated Sep. 24, 2019, 4 pages.
Notice of Allowance received for Chinese Patent Application No. 201910354714.5, dated Oct. 14, 2020, 2 pages.
Notice of Allowance received for Chinese Patent Application No. 201910744886.3, dated Jun. 3, 2021, 2 pages.
Notice of Allowance received for Japanese Patent Application No. 2016-224506, dated Jan. 24, 2020, 4 pages.
Notice of Allowance received for Japanese Patent Application No. 2016-224507, dated Mar. 26, 2019, 3 pages.
Notice of Allowance received for Japanese Patent Application No. 2016-224508, dated Jun. 20, 2017, 3 pages.
Notice of Allowance received for Japanese Patent Application No. 2016-558332, dated Jan. 11, 2019, 4 pages.
Notice of Allowance received for Japanese Patent Application No. 2016-569665, dated Feb. 22, 2019, 4 pages.
Notice of Allowance received for Japanese Patent Application No. 2017-540616, dated Apr. 23, 2019, 4 pages.
Notice of Allowance received for Japanese Patent Application No. 2017-562050, dated Jun. 1, 2020, 4 pages.
Notice of Allowance received for Japanese Patent Application No. 2017-562330, dated Sep. 20, 2019, 4 pages.
Notice of Allowance received for Japanese Patent Application No. 2018-008937, dated Jul. 2, 2018, 4 pages.
Notice of Allowance received for Japanese Patent Application No. 2018-158482, dated Sep. 7, 2020, 4 pages.
Notice of Allowance received for Japanese Patent Application No. 2018-504997, dated Aug. 3, 2018, 4 pages.
Notice of Allowance received for Japanese Patent Application No. 2018-551159, dated Jun. 15, 2020, 4 pages.

(56) References Cited

OTHER PUBLICATIONS

Notice of Allowance received for Japanese Patent Application No. 2019-053379, dated Nov. 16, 2020, 4 pages.
Notice of Allowance received for Japanese Patent Application No. 2019-096220, dated Nov. 25, 2019, 4 pages.
Notice of Allowance received for Japanese Patent Application No. 2019-107235, dated May 15, 2020, 4 pages.
Notice of Allowance received for Japanese Patent Application No. 2019-191137, dated Mar. 8, 2021,4 pages.
Notice of Allowance received for Japanese Patent Application No. 2019-510416, dated Oct. 12, 2020, 4 pages.
Notice of Allowance received for Japanese Patent Application No. 2020-126751, dated Aug. 16, 2021,4 pages.
Notice of Allowance received for Korean Patent Application No. 10-2017-0022365, dated Mar. 27, 2018, 4 pages.
Notice of Allowance received for Korean Patent Application No. 10-2017-0022546, dated Feb. 27, 2018, 4 pages.
Notice of Allowance received for Korean Patent Application No. 10-2017-0022582, dated Feb. 27, 2020, 5 pages.
Notice of Allowance received for Korean Patent Application No. 10-2017-7024513, dated Apr. 20, 2018, 5 pages.
Notice of Allowance received for Korean Patent Application No. 10-2017-7034677, dated May 27, 2019, 5 pages.
Notice of Allowance received for Korean Patent Application No. 10-2018-7001854, dated Aug. 21, 2018, 4 pages.
Notice of Allowance received for Korean Patent Application No. 10-2019-7003374, dated Oct. 4, 2019, 9 pages.
Notice of Allowance received for Korean Patent Application No. 10-2019-7003836, dated Oct. 4, 2019, 4 pages.
Notice of Allowance received for Korean Patent Application No. 10-2019-7004734, dated Oct. 24, 2019, 6 pages.
Notice of Allowance received for Korean Patent Application No. 10-2019-7005925,dated Jan. 21, 2020, 6 pages.
Notice of Allowance received for Korean Patent Application No. 10-2019-7025322, dated Nov. 20, 2019, 5 pages.
Notice of Allowance received for Korean Patent Application No. 10-2019-7033768, dated Jun. 3, 2020, 6 pages.
Notice of Allowance received for Korean Patent Application No. 10-2019-7038021, dated May 2, 2020, 5 pages.
Notice of Allowance received for Korean Patent Application No. 10-2019-7038235, dated Feb. 9, 2021, 4 pages.
Notice of Allowance received for Korean Patent Application No. 10-2020-0048600, dated Apr. 30, 2020, 5 pages.
Notice of Allowance received for Korean Patent Application No. 10-2020-0097418, dated Apr. 27, 2021, 5 pages.
Notice of Allowance received for Korean Patent Application No. 10-2020-7004737, dated Mar. 31, 2020, 4 pages.
Notice of Allowance received for Korean Patent Application No. 10-2020-7011172, dated Aug. 25, 2020, 7 pages.
Notice of Allowance received for Korean Patent Application No. 10-2020-7025711, dated Jan. 19, 2021, 6 pages.
Notice of Allowance received for Korean Patent Application No. 10-2020-7027862, dated Jun. 29, 2021, 5 pages.
Notice of Allowance received for Korean Patent Application No. 10-2021-7011434, dated Jul. 29, 2021, 5 pages.
Notice of Allowance received for Taiwanese Patent Application No. 104117508, dated Sep. 18, 2019, 5 pages.
Notice of Allowance received for the U.S. Appl. No. 14/503,381, dated Dec. 16, 2015, 8 pages.
Notice of Allowance received for U.S. Appl. No. 14/503,072, dated Jun. 4, 2018, 6 pages.
Notice of Allowance received for U.S. Appl. No. 14/503,072, dated Mar. 26, 2018, 6 pages.
Notice of Allowance received for U.S. Appl. No. 14/503,296, dated Aug. 28, 2019, 12 pages.
Notice of Allowance received for U.S. Appl. No. 14/503,364, dated Jun. 16, 2016, 11 pages.
Notice of Allowance received for U.S. Appl. No. 14/869,715, dated Dec. 19, 2017, 32 pages.
Notice of Allowance received for U.S. Appl. No. 14/869,831, dated Jul. 2, 2021, 9 pages.
Notice of Allowance received for U.S. Appl. No. 14/870,694, dated Dec. 11, 2018, 6 pages.
Notice of Allowance received for U.S. Appl. No. 14/870,694, dated Jul. 31, 2018, 7 pages.
Notice of Allowance received for U.S. Appl. No. 14/870,726, dated Sep. 11, 2018, 9 pages.
Notice of Allowance received for U.S. Appl. No. 14/870,793, dated Jan. 22, 2021, 24 pages.
Notice of Allowance received for U.S. Appl. No. 14/870,793, dated Mar. 31, 2021, 19 pages.
Notice of Allowance received for U.S. Appl. No. 14/871,635, dated Feb. 3, 2020, 3 pages.
Notice of Allowance received for U.S. Appl. No. 14/871,635, dated Jan. 15, 2020, 3 pages.
Notice of Allowance Received for U.S. Appl. No. 14/871,635, dated Nov. 14, 2019, 14 pages.
Notice of Allowance received for U.S. Appl. No. 14/871,654, dated May 22, 2018, 22 pages.
Notice of Allowance received for U.S. Appl. No. 15/137,944, dated Dec. 21, 2017, 8 pages.
Notice of Allowance received for U.S. Appl. No. 15/274,086, dated Jun. 7, 2017, 8 pages.
Notice of Allowance received for U.S. Appl. No. 15/274,086, dated Oct. 19, 2017, 9 pages.
Notice of Allowance received for U.S. Appl. No. 15/294,439, dated Jan. 8, 2019, 8 pages.
Notice of Allowance received for U.S. Appl. No. 15/294,439, dated Sep. 10, 2018, 9 pages.
Notice of Allowance received for U.S. Appl. No. 15/351,230, dated Dec. 11, 2019, 11 pages.
Notice of Allowance received for U.S. Appl. No. 15/823,269, dated Dec. 10, 2020, 10 pages.
Notice of Allowance received for U.S. Appl. No. 15/823,269, dated Feb. 22, 2021, 7 pages.
Notice of Allowance received for U.S. Appl. No. 15/823,269, dated Jun. 3, 2021, 6 pages.
Notice of Allowance received for U.S. Appl. No. 15/823,269, dated Mar. 10, 2021, 6 pages.
Notice of Allowance received for U.S. Appl. No. 15/823,269, dated Mar. 31, 2021, 9 pages.
Notice of Allowance received for U.S. Appl. No. 15/866,341, dated Jul. 26, 2019, 8 pages.
Notice of Allowance received for U.S. Appl. No. 15/894,221, dated Apr. 11, 2019, 5 pages.
Notice of Allowance received for U.S. Appl. No. 15/894,221, dated Aug. 13, 2019, 2 pages.
Notice of Allowance received for U.S. Appl. No. 15/894,221, dated Feb. 1, 2019, 5 pages.
Notice of Allowance received for U.S. Appl. No. 15/894,221, dated Mar. 4, 2019, 2 pages.
Notice of Allowance received for U.S. Appl. No. 15/903,456, dated May 1, 2019, 6 pages.
Notice of Allowance received for U.S. Appl. No. 15/981,817, dated May 28, 2020, 16 pages.
Notice of Allowance received for U.S. Appl. No. 15/992,722, dated Oct. 19, 2020, 5 pages.
Notice of Allowance received for U.S. Appl. No. 16/147,023, dated Apr. 3, 2020, 2 pages.
Notice of Allowance received for U.S. Appl. No. 16/147,023, dated Aug. 13, 2020, 2 pages.
Notice of Allowance received for U.S. Appl. No. 16/147,023, dated Feb. 27, 2020, 2 pages.
Notice of Allowance received for U.S. Appl. No. 16/147,023, dated Jan. 31, 2020, 7 pages.
Notice of Allowance received for U.S. Appl. No. 16/147,023, dated Jul. 2, 2020, 2 pages.
Notice of Allowance received for U.S. Appl. No. 16/147,023, dated Jul. 21, 2020, 2 pages.
Notice of Allowance received for U.S. Appl. No. 16/147,023, dated Jun. 1, 2020, 2 pages.

(56) References Cited

OTHER PUBLICATIONS

Notice of Allowance received for U.S. Appl. No. 16/147,023, dated Jun. 18, 2020, 2 pages.
Notice of Allowance received for U.S. Appl. No. 16/147,023, dated Mar. 27, 2020, 2 pages.
Notice of Allowance received for U.S. Appl. No. 16/147,023, dated May 5, 2020, 2 pages.
Notice of Allowance received for U.S. Appl. No. 16/147,023, dated May 20, 2020, 7 pages.
Notice of Allowance received for U.S. Appl. No. 16/147,115, dated Oct. 30, 2019, 10 pages.
Notice of Allowance received for U.S. Appl. No. 16/152,139, dated Feb. 23, 2021, 9 pages.
Notice of Allowance received for U.S. Appl. No. 16/152,139, dated May 26, 2021, 7 pages.
Notice of Allowance received for U.S. Appl. No. 16/164,561, dated Apr. 8, 2020, 5 pages.
Notice of Allowance received for U.S. Appl. No. 16/428,875, dated Dec. 2, 2020, 11 pages.
Notice of Allowance received for U.S. Appl. No. 16/542,084, dated May 20, 2020, 7 pages.
Notice of Allowance received for U.S. Appl. No. 16/549,862, dated Aug. 13, 2021, 7 pages.
Notice of Allowance received for U.S. Appl. No. 16/549,862, dated Aug. 26, 2021, 2 pages.
Notice of Allowance received for U.S. Appl. No. 16/549,862, dated Oct. 20, 2021, 7 pages.
Notice of Allowance received for U.S. Appl. No. 16/581,569, dated May 27, 2020, 43 pages.
Notice of Allowance received for U.S. Appl. No. 16/667,271, dated May 12, 2020, 11 pages.
Notice of Allowance received for U.S. Appl. No. 16/736,704, dated Feb. 23, 2021, 11 pages.
Notice of Allowance received for U.S. Appl. No. 16/786,694, dated Mar. 26, 2021, 11 pages.
Notice of Allowance received for U.S. Appl. No. 16/786,694, dated Sep. 14, 2021, 10 pages.
Notice of Allowance received for U.S. Appl. No. 16/990,974, dated Apr. 28, 2021, 5 pages.
Notice of Allowance received for U.S. Appl. No. 16/990,974, dated Jan. 22, 2021, 7 pages.
Notice of Allowance received for U.S. Appl. No. 17/015,429, dated Jun. 17, 2021, 10 pages.
Notice of Allowance received for U.S. Appl. No. 17/015,429, dated Sep. 22, 2021,6 pages.
Office Action received for Australian Patent Application No. 2017100558, dated Feb. 27, 2018, 3 pages.
Office Action received for European Patent Application No. 15728352.4, dated Jan. 25, 2018, 10 pages.
Office Action received for Japanese Patent Application No. 2016-224507, dated Dec. 1, 2017, 14 pages.
Office Action received for Australian Patent Application No. 2015100708, dated Sep. 8, 2015, 4 pages.
Office Action received for Australian Patent Application No. 2015100709, dated Sep. 9, 2015 (Examination Report 1), 4 pages.
Office Action received for Australian Patent Application No. 2015100709, dated Sep. 9, 2015 (Examination Report 2), 4 pages.
Office Action received for Australian Patent Application No. 2015266650, dated Apr. 10, 2017, 4 pages.
Office Action received for Australian Patent Application No. 2015266693, dated Apr. 10, 2017, 4 pages.
Office Action received for Australian Patent Application No. 2016100090, dated Apr. 13, 2016, 7 pages.
Office Action received for Australian Patent Application No. 2016100090, dated Oct. 7, 2016, 3 pages.
Office Action received for Australian Patent Application No. 2016100367, dated May 25, 2016, 3 pages.
Office Action received for Australian Patent Application No. 2016100367, dated Oct. 26, 2016, 3 pages.
Office Action received for Australian Patent Application No. 2016100383, dated Jun. 9, 2016, 2 pages.
Office Action received for Australian Patent Application No. 2016100383, dated Nov. 11, 2016, 3 pages.
Office Action received for Australian Patent Application No. 2016100795, dated Aug. 12, 2016, 6 pages.
Office Action received for Australian Patent Application No. 2016100795, dated Feb. 6, 2017, 3 pages.
Office Action received for Australian Patent Application No. 2016100796, dated Aug. 26, 2016, 6 pages.
Office Action received for Australian Patent Application No. 2016100796, dated Feb. 13, 2017, 4 pages.
Office Action received for Australian Patent Application No. 2016102031, dated Feb. 28, 2017, 4 pages.
Office Action received for Australian Patent Application No. 2016270323, dated May 29, 2019, 4 pages.
Office Action received for Australian Patent Application No. 2016270323, dated Nov. 26, 2018, 4 pages.
Office Action received for Australian Patent Application No. 2016270775, dated May 29, 2019, 3 pages.
Office Action received for Australian Patent Application No. 2016270775, dated Nov. 26, 2018, 5 pages.
Office Action received for Australian Patent Application No. 2016270775, dated Nov. 26, 2019, 3 pages.
Office Action received for Australian Patent Application No. 2017100070, dated Mar. 16, 2017, 6 pages.
Office Action received for Australian Patent Application No. 2017100231, dated Apr. 13, 2017, 3 pages.
Office Action received for Australian Patent Application No. 2017100328, dated May 16, 2017, 3 pages.
Office Action received for Australian Patent Application No. 2017100328, dated Oct. 16, 2017, 6 pages.
Office Action received for Australian Patent Application No. 2017100558, dated Sep. 1, 2017, 5 pages.
Office Action received for Australian Patent Application No. 2017101375, dated Dec. 1, 2017, 3 pages.
Office Action received for Australian Patent Application No. 2017101375, dated Feb. 19, 2018, 4 pages.
Office Action received for Australian Patent Application No. 2017201064, dated Mar. 9, 2017, 2 pages.
Office Action received for Australian Patent Application No. 2017201068, dated Jan. 17, 2018, 5 pages.
Office Action received for Australian Patent Application No. 2017201068, dated Mar. 10, 2017, 2 pages.
Office Action received for Australian Patent Application No. 2017324176, dated Apr. 21, 2020, 3 pages.
Office Action received for Australian Patent Application No. 2017324176, dated Aug. 17, 2020, 5 pages.
Office Action received for Australian Patent Application No. 2017324176, dated Feb. 25, 2021, 6 pages.
Office Action received for Australian Patent Application No. 2017324176, dated Feb. 27, 2020, 3 pages.
Office Action received for Australian Patent Application No. 2017324176, dated Jan. 14, 2021, 6 pages.
Office Action received for Australian Patent Application No. 2018200485, dated Feb. 20, 2019, 6 pages.
Office Action received for Australian Patent Application No. 2018200485, dated Mar. 15, 2018, 3 pages.
Office Action received for Australian Patent Application No. 2018200485, dated Mar. 15, 2019, 4 pages.
Office Action received for Australian Patent Application No. 2018200628, dated Jan. 24, 2019, 3 pages.
Office Action received for Australian Patent Application No. 2018202559, dated Apr. 8, 2019, 4 pages.
Office Action Received for Australian Patent Application No. 2018202559, dated Jan. 16, 2019, 6 pages.
Office Action received for Australian Patent Application No. 2018202559, dated Jul. 19, 2019, 5 pages.
Office Action received for Australian Patent Application No. 2018279788, dated Feb. 8, 2019, 4 pages.
Office Action received for Australian Patent Application No. 2018312629, dated Feb. 25, 2019, 4 pages.

(56) References Cited

OTHER PUBLICATIONS

Office Action received for Australian Patent Application No. 2019100592, dated Aug. 21, 2019, 4 pages.
Office Action received for Australian Patent Application No. 2019100592, dated Nov. 25, 2019, 3 pages.
Office Action received for Australian Patent Application No. 2019201101, dated Feb. 28, 2019, 3 pages.
Office Action received for Australian Patent Application No. 2019271921, dated Jun. 3, 2021, 6 pages.
Office Action received for Australian Patent Application No. 2019271921, dated Oct. 6, 2020, 5 pages.
Office Action received for Australian Patent Application No. 2019271927, dated Feb. 10, 2021, 5 pages.
Office Action received for Australian Patent Application No. 2019271927, dated Sep. 8, 2021, 4 pages.
Office Action received for Australian Patent Application No. 2019281961, dated Jun. 16, 2021, 2 pages.
Office Action received for Australian Patent Application No. 2020100388, dated May 7, 2020, 5 pages.
Office Action received for Australian Patent Application No. 2020102130, dated Dec. 7, 2020, 7 pages.
Office Action received for Australian Patent Application No. 2020102130, dated Jun. 7, 2021, 3 pages.
Office Action received for Australian Patent Application No. 2020102130, dated Mar. 29, 2021, 4 pages.
Office Action received for Australian Patent Application No. 2020200685, dated Apr. 20, 2020, 3 pages.
Office Action received for Australian Patent Application No. 2020200685, dated Aug. 12, 2020, 3 pages.
Office Action received for Australian Patent Application No. 2020200685, dated Feb. 10, 2020, 4 pages.
Office Action received for Australian Patent Application No. 2020202953, dated Mar. 29, 2021, 4 pages.
Office Action received for Australian Patent Application No. 2020203899, dated May 5, 2021, 10 pages.
Office Action received for Australian Patent Application No. 2020204256, dated Jun. 21, 2021, 2 pages.
Office Action received for Australian Patent Application No. 2020239783, dated Oct. 13, 2020, 4 pages.
Office Action received for Australian Patent Application No. 2020289822, dated Aug. 24, 2021, 7 pages.
Office Action received for Chinese Patent Application No. 201510284715.9, dated Apr. 14, 2020, 19 pages.
Office Action received for Chinese Patent Application No. 201510284715.9, dated Dec. 18, 2019, 24 pages.
Office Action received for Chinese Patent Application No. 201510284715.9, dated Dec. 21, 2018, 22 pages.
Office Action received for Chinese Patent Application No. 201510284715.9, dated Jun. 19, 2019, 26 pages.
Office Action received for Chinese Patent Application No. 201510284896.5, dated Jun. 28, 2018,15 pages.
Office Action received for Chinese Patent Application No. 201510284896.5, dated Mar. 6, 2019, 13 pages.
Office Action received for Chinese Patent Application No. 201510284896.5, dated Sep. 3, 2019, 9 pages.
Office Action received for Chinese Patent Application No. 201520358683.8, dated Sep. 2, 2015, 4 pages.
Office Action received for Chinese Patent Application No. 201610069731.0, dated Mar. 5, 2019, 10 pages.
Office Action received for Chinese Patent Application No. 201610371774.4, dated Dec. 2, 2019, 6 pages.
Office Action received for Chinese Patent Application No. 201610371774.4, dated Dec. 19, 2018, 13 pages.
Office Action received for Chinese Patent Application No. 201610371774.4, dated Jul. 8, 2019, 6 pages.
Office Action received for Chinese Patent Application No. 201610371856.9, dated Dec. 18, 2019, 6 pages.
Office Action received for Chinese Patent Application No. 201610371856.9, dated Dec. 19, 2018, 12 pages.
Office Action received for Chinese Patent Application No. 201610371856.9, dated Jul. 10, 2019, 6 pages.
Office Action received for Chinese Patent Application No. 201620101636.X, dated May 25, 2016, 3 pages.
Office Action received for Chinese Patent Application No. 201620101636.X, dated Oct. 13, 2016, 3 pages.
Office Action received for Chinese Patent Application No. 201620480708.6, dated Jan. 9, 2017, 3 pages.
Office Action received for Chinese Patent Application No. 201620480708.6, dated Sep. 14, 2016, 3 pages.
Office Action received for Chinese Patent Application No. 201620480846.4, dated Jan. 9, 2017, 3 pages.
Office Action received for Chinese Patent Application No. 201620480846.4, dated Sep. 14, 2016, 3 pages.
Office Action received for Chinese Patent Application No. 201620509362.8, dated Feb. 10, 2017, 2 pages.
Office Action received for Chinese Patent Application No. 201620509362.8, dated Oct. 21, 2016, 3 pages.
Office Action received for Chinese Patent Application No. 201620509515.9, dated Nov. 9, 2016, 2 pages.
Office Action received for Chinese Patent Application No. 201710093861.2, dated Mar. 5, 2019, 6 pages.
Office Action received for Chinese Patent Application No. 201710093861.2, dated Sep. 14, 2018, 15 pages.
Office Action received for Chinese Patent Application No. 201710094150.7, dated Dec. 19, 2018, 12 pages.
Office Action received for Chinese Patent Application No. 201710094150.7, dated Jul. 31, 2019, 6 pages.
Office Action received for Chinese Patent Application No. 201780002648.4, dated Dec. 5, 2018, 13 pages.
Office Action received for Chinese Patent Application No. 201780002648.4, dated Jun. 12, 2019, 11 pages.
Office Action received for Chinese Patent Application No. 201780002648.4, dated Nov. 26, 2019, 10 pages.
Office Action received for Chinese Patent Application No. 201810094316.X, dated Apr. 28, 2019, 9 pages.
Office Action received for Chinese Patent Application No. 201810094316.X, dated Aug. 5, 2019, 9 pages.
Office Action received for Chinese Patent Application No. 201810094316.X, dated Oct. 29, 2018, 12 pages.
Office Action received for Chinese Patent Application No. 201811330077.X, dated May 18, 2020, 9 pages.
Office Action received for Chinese Patent Application No. 201811330077.X, dated Nov. 13, 2019, 14 pages.
Office Action received for Chinese Patent Application No. 201811330077.X, dated Nov. 26, 2020, 8 pages.
Office Action received for Chinese Patent Application No. 201910070375.8, dated Dec. 4, 2019, 23 pages.
Office Action received for Chinese Patent Application No. 201910070375.8, dated Sep. 3, 2020, 8 pages.
Office Action received for Chinese Patent Application No. 201910109868.8, dated Jun. 30, 2020,15 pages.
Office Action received for Chinese Patent Application No. 201910109868.8, dated Mar. 16, 2020, 19 pages.
Office Action received for Chinese Patent Application No. 201910109868.8, dated Sep. 19, 2019, 23 pages.
Office Action received for Chinese Patent Application No. 201910246439.5, dated Apr. 23, 2020, 14 pages.
Office Action received for Chinese Patent Application No. 201910246439.5, dated Oct. 15, 2019, 17 pages.
Office Action received for Chinese Patent Application No. 201910246439.5, dated Sep. 2, 2020, 15 pages.
Office Action received for Chinese Patent Application No. 201910354714.5, dated Feb. 3, 2020, 12 pages.
Office Action received for Chinese Patent Application No. 201910744886.3, dated Jan. 18, 2021, 7 pages.
Office Action received for Chinese Patent Application No. 201911199010.1, dated Mar. 29, 2021, 14 pages.
Office Action received for Chinese Patent Application No. 201911199010.1, dated Nov. 4, 2020, 20 pages.
Office Action received for Chinese Patent Application No. 202010174749.3, dated Jun. 2, 2021, 19 pages.

(56) References Cited

OTHER PUBLICATIONS

Office Action received for Chinese Patent Application No. 202010174749.3, dated Nov. 6, 2020, 9 pages.
Office Action received for Chinese Patent Application No. 202011206499.3, dated May 21, 2021, 20 pages.
Office Action Received for Danish Patent Application No. PA 201670709, dated Jul. 21, 2017, 4 pages.
Office Action Received for Danish Patent Application No. PA 201670709, dated Nov. 30, 2016, 10 pages.
Office Action received for Danish Patent Application No. PA201670042, dated Feb. 15, 2017, 3 pages.
Office Action received for Danish Patent Application No. PA201670042, dated Jun. 23, 2016, 5 pages.
Office Action received for Danish Patent Application No. PA201670042, dated Mar. 31, 2016, 10 pages.
Office Action received for Danish Patent Application No. PA201670042, dated Sep. 25, 2017, 2 pages.
Office Action received for Danish Patent Application No. PA201670362, dated Jan. 29, 2018, 3 pages.
Office Action received for Danish Patent Application No. PA201670362, dated Jun. 1, 2017, 6 pages.
Office Action received for Danish Patent Application No. PA201670362, dated Nov. 21, 2016, 11 pages.
Office Action received for Danish Patent Application No. PA201670363, dated Feb. 12, 2018, 2 pages.
Office Action received for Danish Patent Application No. PA201670363, dated Jun. 1, 2017, 5 pages.
Office Action received for Danish Patent Application No. PA201670363, dated Nov. 4, 2016, 11 pages.
Office Action received for Danish Patent Application No. PA201670710, dated Dec. 8, 2016, 10 pages.
Office Action received for Danish Patent Application No. PA201670710, dated Sep. 25, 2017, 6 pages.
Office Action received for Danish Patent Application No. PA201670749, dated Jan. 30, 2017, 11 pages.
Office Action received for Danish Patent Application No. PA201670749, dated Oct. 3, 2017, 3 pages.
Office Action received for Danish Patent Application No. PA201670751, dated Jan. 13, 2017, 9 pages.
Office Action received for Danish Patent Application No. PA201670751, dated Nov. 13, 2017, 2 pages.
Office Action received for Danish Patent Application No. PA201770292, dated Apr. 24, 2018, 3 pages.
Office Action received for Danish Patent Application No. PA201770292, dated Jun. 6, 2017, 7 pages.
Office Action received for Danish Patent Application No. PA201770292, dated Nov. 9, 2018, 3 pages.
Office Action received for Danish Patent Application No. PA201770292, dated Sep. 6, 2017, 4 pages.
Office Action received for Danish Patent Application No. PA201770502, dated Dec. 14, 2018, 7 pages.
Office Action received for Danish Patent Application No. PA201770502, dated Jan. 20, 2020, 2 pages.
Office Action received for Danish Patent Application No. PA201770502, dated May 7, 2020, 5 pages.
Office Action received for Danish Patent Application No. PA201770502, dated Sep. 9, 2019, 2 pages.
Office Action received for Danish Patent Application No. PA201770503, dated Dec. 19, 2018, 6 pages.
Office Action received for Danish Patent Application No. PA201770503, dated Nov. 24, 2017, 10 pages.
Office Action received for Danish Patent Application No. PA201770503, dated Sep. 20, 2019, 5 pages.
Office Action received for Danish Patent Application No. PA201770505, dated Aug. 18, 2021,2 pages.
Office Action received for Danish Patent Application No. PA201770505, dated Jan. 17, 2020, 7 pages.
Office Action received for Danish Patent Application No. PA201770505, dated Jul. 27, 2018, 4 pages.
Office Action received for Danish Patent Application No. PA201770505, dated May 20, 2019, 7 pages.
Office Action received for Danish Patent Application No. PA201770505, dated Sep. 19, 2017, 10 pages.
Office Action received for Danish Patent Application No. PA201770712, dated Jul. 20, 2018, 4 pages.
Office Action received for Danish Patent Application No. PA201770712, dated Mar. 1, 2019, 3 pages.
Office Action received for Danish Patent Application No. PA201770713, dated Apr. 18, 2018, 4 pages.
Office Action received for Danish Patent Application No. PA201770713, dated Jun. 7, 2019, 4 pages.
Office Action received for Danish Patent Application No. PA201770713, dated Nov. 13, 2018, 3 pages.
Office Action received for Danish Patent Application No. PA201770714, dated Aug. 17, 2018, 6 pages.
Office Action received for Danish Patent Application No. PA201770714, dated Feb. 21, 2018, 3 pages.
Office Action received for Danish Patent Application No. PA201770714, dated Oct. 13, 2017, 9 pages.
Office Action received for Danish Patent Application No. PA201770715, dated Mar. 8, 2018, 4 pages.
Office Action received for Danish Patent Application No. PA201770715, dated Oct. 29, 2018, 4 pages.
Office Action received for Danish Patent Application No. PA201870370, dated Nov. 9, 2018, 4 pages.
Office Action received for Danish Patent Application No. PA201870371, dated Nov. 20, 2018, 3 pages.
Office Action received for Danish Patent Application No. PA201870855, dated May 14, 2020, 4 pages.
Office Action received for Danish Patent Application No. PA201870855, dated Nov. 7, 2019, 4 pages.
Office Action received for Danish Patent Application No. PA201970127, dated Dec. 20, 2019, 3 pages.
Office Action received for Danish Patent Application No. PA201970127, dated Feb. 24, 2020, 2 pages.
Office Action received for European Patent Application No. 15727291.5, dated Jan. 15, 2018, 8 pages.
Office Action received for European Patent Application No. 16201159.7, dated Jun. 12, 2019, 10 pages.
Office Action Received for European Patent Application No. 16201195.1, dated Feb. 14, 2018, 12 pages.
Office Action received for European Patent Application No. 16201205.8, dated Feb. 16, 2018, 12 pages.
Office Action received for European Patent Application No. 16703893.4, dated Sep. 17, 2018, 7 pages.
Office Action received for European Patent Application No. 16803996.4, dated Nov. 29, 2018, 12 pages.
Office Action received for European Patent Application No. 16804040.0, dated May 13, 2019, 12 pages.
Office Action received for European Patent Application No. 17810682.9, dated Mar. 26, 2021, 8 pages.
Office Action received for European Patent Application No. 17835789.3, dated Jan. 20, 2021, 14 pages.
Office Action received for European Patent Application No. 18154163.2, dated Apr. 11, 2018, 6 pages.
Office Action received for European Patent Application No. 18713408.5, dated May 20, 2019, 5 pages.
Office Action received for European Patent Application No. 18713408.5, dated May 26, 2020, 5 pages.
Office Action received for European Patent Application No. 18713408.5, dated Nov. 4, 2020, 6 pages.
Office Action received for European Patent Application No. 18713408.5, dated Nov. 20, 2019, 4 pages.
Office Action received for European Patent Application No. 18730556.0, dated Dec. 16, 2020, 7 pages.
Office Action received for European Patent Application No. 18730556.0, dated Jun. 23, 2020, 11 pages.
Office Action received for European Patent Application No. 18830326.7, dated Apr. 30, 2020, 5 pages.
Office Action received for European Patent Application No. 18830326.7, dated Aug. 13, 2020, 6 pages.

(56) References Cited

OTHER PUBLICATIONS

Office Action received for European Patent Application No. 18830326.7, dated Aug. 27, 2019, 6 pages.
Office Action received for European Patent Application No. 18830326.7, dated Nov. 22, 2019, 8 pages.
Office Action received for European Patent Application No. 18830326.7, dated Sep. 16, 2019, 6 pages.
Office Action received for European Patent Application No. 19160344.8, dated Mar. 26, 2021, 7 pages.
Office Action received for European Patent Application No. 19160348.9, dated May 14, 2020, 4 pages.
Office Action received for European Patent Application No. 19160348.9, dated Nov. 17, 2020, 6 pages.
Office Action received for European Patent Application No. 19171661.2, dated Aug. 7, 2019, 7 pages.
Office Action received for European Patent Application No. 19194828.0, dated May 10, 2021,6 pages.
Office Action received for European Patent Application No. 19194828.0, dated Oct. 15, 2020, 7 pages.
Office Action received for European Patent Application No. 20180033.1, dated Jul. 17, 2020, 7 pages.
Office Action received for European Patent Application No. 20186286.9, dated Jul. 29, 2021, 8 pages.
Office Action received for European Patent Application No. 20204436.8, dated Mar. 22, 2021, 10 pages.
Office Action received for European Patent Application No. 21150414.7, dated May 3, 2021, 8 pages.
Office Action received for European Patent Application No. 21150992.2, dated Jul. 6, 2021, 6 pages.
Office Action received for German Patent Application No. 202015004267.8, dated Nov. 4, 2015, 4 pages.
Office Action received for Indian Patent Application No. 201617039493, dated Oct. 21, 2019, 6 pages.
Office Action received for Japanese Patent Application No. 2016-224506, dated May 14, 2019, 22 pages.
Office Action received for Japanese Patent Application No. 2016-224507, dated Jun. 16, 2017, 16 pages.
Office Action received for Japanese Patent Application No. 2016-558332, dated Dec. 8, 2017, 12 pages.
Office Action received for Japanese Patent Application No. 2016-558332, dated Jul. 27, 2018, 9 pages.
Office Action received for Japanese Patent Application No. 2016-569665, dated Aug. 20, 2018, 9 pages.
Office Action received for Japanese Patent Application No. 2016-569665, dated Jan. 19, 2018, 10 pages.
Office Action received for Japanese Patent Application No. 2017-540616, dated Jan. 12, 2018, 24 pages.
Office Action received for Japanese Patent Application No. 2017-540616, dated Jul. 27, 2018, 20 pages.
Office Action received for Japanese Patent Application No. 2017-562050, dated Feb. 1, 2019, 15 pages.
Office Action received for Japanese Patent Application No. 2017-562050, dated Sep. 30, 2019, 5 pages.
Office Action received for Japanese Patent Application No. 2017-562330, dated Jan. 18, 2019, 11 pages.
Office Action received for Japanese Patent Application No. 2018-158482, dated Jan. 10, 2020, 9 pages.
Office Action received for Japanese Patent Application No. 2018-551159, dated Jan. 27, 2020, 8 pages.
Office Action received for Japanese Patent Application No. 2018-551159, dated Sep. 30, 2019, 6 pages.
Office Action received for Japanese Patent Application No. 2019-053379, dated May 29, 2020, 11 pages.
Office Action received for Japanese Patent Application No. 2019-053379, dated Oct. 18, 2019, 11 pages.
Office Action received for Japanese Patent Application No. 2019-096220, dated Sep. 9, 2019, 8 pages.
Office Action received for Japanese Patent Application No. 2019-107235, dated Oct. 18, 2019, 8 pages.
Office Action received for Japanese Patent Application No. 2019-191137, dated Nov. 20, 2020, 9 pages.
Office Action received for Japanese Patent Application No. 2019-510416, dated May 15, 2020, 4 pages.
Office Action received for Japanese Patent Application No. 2019-510416, dated Oct. 18, 2019, 4 pages.
Office Action received for Japanese Patent Application No. 2019-572834, dated Dec. 4, 2020, 7 pages.
Office Action received for Japanese Patent Application No. 2019-572834, dated Jul. 17, 2020, 13 pages.
Office Action received for Japanese Patent Application No. 2019-572834, dated Jun. 7, 2021, 5 pages.
Office Action received for Japanese Patent Application No. 2020-010992, dated May 24, 2021, 9 pages.
Office Action received for Japanese Patent Application No. 2020-028315, dated Jul. 6, 2020, 18 pages.
Office Action received for Japanese Patent Application No. 2020-028315, dated Nov. 9, 2020, 11 pages.
Office Action received for Japanese Patent Application No. 2020-126751, dated Jan. 5, 2021, 8 pages.
Office Action received for Japanese Patent Application No. 2020-159979, dated May 10, 2021, 9 pages.
Office Action received for Korean Patent Application No. 10-2016-0152210, dated Jan. 29, 2019, 7 pages.
Office Action received for Korean Patent Application No. 10-2016-0152210, dated May 14, 2018, 13 pages.
Office Action received for Korean Patent Application No. 10-2016-0152210, dated May 30, 2019, 8 pages.
Office Action received for Korean Patent Application No. 10-2017-0022365, dated Jun. 26, 2017, 10 pages.
Office Action received for Korean Patent Application No. 10-2017-0022546, dated Jun. 21, 2017, 12 pages.
Office Action received for Korean Patent Application No. 10-2017-0022582, dated Jul. 31, 2019, 5 pages.
Office Action received for Korean Patent Application No. 10-2017-0022582, dated Sep. 19, 2018, 6 pages.
Office Action received for Korean Patent Application No. 10-2017-7034558, dated Dec. 15, 2018, 15 pages.
Office Action received for Korean Patent Application No. 10-2017-7034558, dated Jun. 4, 2019, 7 pages.
Office Action received for Korean Patent Application No. 10-2017-7034558, dated Sep. 25, 2019, 9 pages.
Office Action received for Korean Patent Application No. 10-2017-7034677, dated Nov. 1, 2018, 5 pages.
Office Action received for Korean Patent Application No. 10-2018-7001854, dated Apr. 2, 2018, 13 pages.
Office Action received for Korean Patent Application No. 10-2018-7019643, dated Jan. 6, 2020, 7 pages.
Office Action received for Korean Patent Application No. 10-2018-7019643, dated Jul. 2, 2019, 12 pages.
Office Action received for Korean Patent Application No. 10-2019-7003374, dated Jun. 10, 2019, 7 pages.
Office Action received for Korean Patent Application No. 10-2019-7003836, dated Jun. 14, 2019, 7 pages.
Office Action received for Korean Patent Application No. 10-2019-7004734, dated Jul. 4, 2019, 7 pages.
Office Action received for Korean Patent Application No. 10-2019-7005925, dated Jul. 4, 2019, 24 pages.
Office Action received for Korean Patent Application No. 10-2019-7006639, dated Dec. 21, 2020, 20 pages.
Office Action received for Korean Patent Application No. 10-2019-7006639, dated Jun. 15, 2021, 8 pages.
Office Action received for Korean Patent Application No. 10-2019-7033768, dated Mar. 13, 2020, 6 pages.
Office Action received for Korean Patent Application No. 10-2019-7038235, dated Mar. 9, 2020, 15 pages.
Office Action received for Korean Patent Application No. 10-2020-0097418, dated Aug. 28, 2020, 6 pages.
Office Action received for Korean Patent Application No. 10-2020-7010007, dated Aug. 26, 2020, 12 pages.
Office Action received for Korean Patent Application No. 10-2020-7010007, dated Jun. 21, 2021, 7 pages.

(56) References Cited

OTHER PUBLICATIONS

Office Action received for Korean Patent Application No. 10-2020-7010007, dated Mar. 15, 2021, 7 pages.
Office Action received for Korean Patent Application No. 10-2020-7022596, dated Jul. 28, 2021, 26 pages.
Office Action received for Korean Patent Application No. 10-2020-7025711, dated Sep. 11, 2020, 12 pages.
Office Action received for Korean Patent Application No. 10-2020-7027862, dated Jan. 29, 2021, 8 pages.
Office Action received for Korean Patent Application No. 10-2020-7034180, dated Aug. 17, 2021, 15 pages.
Office Action received for Korean Patent Application No. 10-2021-7011434, dated Apr. 28, 2021, 6 pages.
Office Action received for Korean Patent Application No. 10-2021-7014009, dated Jul. 22, 2021, 12 pages.
Office Action received for Taiwanese Patent Application No. 104117508, dated Jul. 14, 2017, 9 pages.
Office Action received for Taiwanese Patent Application No. 104117508, dated Jul. 20, 2016, 19 pages.
Office Action received for Taiwanese Patent Application No. 104117508, dated Mar. 20, 2017, 22 pages.
Office Action received for Taiwanese Patent Application No. 104117508, dated Jan. 25, 2019, 24 pages.
Office Action received for Taiwanese Patent Application No. 104117508, dated May 22, 2019, 7 pages.
Okazolab, "Kinect Based 3D Head Tracking in Behavioral Research", Available online at: <https://www.youtube.com/watch?v=nigRvT9beQw>, Aug. 8, 2012, 3 pages.
Onefacein,"[How It Works] Securing Your Smartphone with OneFaceIn", Biometric Password Manager, Available at <https://www.youtube.com/watch?v=h-JG5SPxBQ0>, Dec. 2, 2016, 1 page.
Page Sebastien, "Leaked iOS 11 GM details how you will set up Face ID on your iPhone 8", Online available at: https://www.idownloadblog.com/2017/09/08/leaked-ios-11-gm-details-how-you-will-set-up-face-id-on-your-iphone-8/, Sep. 8, 2017, 9 pages.
Phonebuff, "How to Use Face Unlock On Android 4.0 ICS", Retrieved from <https://www.youtube.com/watch?v=0ASf6jkpFKE>, Dec. 15, 2011, 1 page.
Pre-Brief Appeal Conference decision received for U.S. Appl. No. 14/869,831, dated Jan. 18, 2019, 3 pages.
Preliminary Opinion before oral proceedings received for European Patent Application No. 18154163.2, dated Apr. 16, 2019, 12 pages.
PSP Security Ltd, "AccuFACE features", Available online at: https://www.youtube.com/watch?v=p3jvGoEbioY>, Oct. 14, 2009, 1 page.
PSP Security Ltd, "PSP Security—AccuFACE Step By Step Enrollment Process", Available online at <https://www.youtube.com/watch?v=0IIF5OOdya0>, Oct. 14, 2009, 1 page.
Real Solution of two-step-authentication Password Management for Authentication Enhancement, Fukuda Takao, Nikkei PC, JPN, Nikkei Business Publications, Inc., No. 694, Mar. 24, 2014, 11 pages.
Record of Oral Hearing received for U.S. Appl. No. 14/869,831, dated Oct. 6, 2020, 12 pages.
Record of Oral Hearing received for U.S. Appl. No. 14/869,877, dated Apr. 1, 2021, 10 pages.
Record of Oral Hearing received for U.S. Appl. No. 14/870,793, dated Nov. 3, 2020, 24 pages.
Result of Consultation received for European Patent Application No. 16703893.4, dated Jun. 7, 2019, 3 pages.
Result of Consultation received for European Patent Application No. 16803996.4, dated Feb. 17, 2020,14 pages.
Result of Consultation received for European Patent Application No. 18713408.5, dated Aug. 30, 2021, 5 pages.
Result of Consultation received for European Patent Application No. 18830326.7, dated Jun. 21, 2021, 5 pages.
Schofield Tim, "Face Unlock Demonstration on the HTC EVO 4G LTE", Retrieved from: https://www.youtube.com/watch?v=TNL9Or_9SWg, May 31, 2012, 1 page.
Search Report and Opinion received for Danish Patent Application No. PA201770502, dated Nov. 10, 2017, 10 pages.
Search Report and Opinion received for Danish Patent Application No. PA201770712, dated Oct. 25, 2017, 10 pages.
Search Report and Opinion received for Danish Patent Application No. PA201770713, dated Oct. 31, 2017, 9 pages.
Search Report and Opinion received for Danish Patent Application No. PA201770715, dated Nov. 9, 2017, 10 pages.
Search Report and Opinion received for Danish Patent Application No. PA201870370, dated Sep. 7, 2018, 11 pages.
Search Report and Opinion received for Danish Patent Application No. PA201870371, dated Sep. 14, 2018, 14 pages.
Search Report and Opinion received for Danish Patent Application No. PA201870855, dated Apr. 3, 2019, 12 pages.
Search Report and Opinion received for Danish Patent Application No. PA201970127, dated Oct. 4, 2019, 9 pages.
Sensory Trulysecure, "AppLock Face/oice Recognition", Available at: https://www.youtube.com/watch?v=odax5O51aT0, May 27, 2015, 1 page.
Smart Card Alliance, "Security of Proximity Mobile Payments", Online Available at: https://www.securetechalliance.org/resources/pdf/Security_of_Proximity_Mobile_Payments.pdf, May 2009, pp. 1-39.
Summons to Attend Oral Proceedings received for European Patent Application No. 15727291.5, dated Jan. 28, 2020, 13 pages.
Summons to Attend Oral Proceedings received for European Patent Application No. 15728352.4, dated May 12, 2020, 25 pages.
Summons to Attend Oral Proceedings received for European Patent Application No. 15728352.4, dated Nov. 18, 2019, 15 pages.
Summons to Attend Oral Proceedings received for European Patent Application No. 16201159.7, dated Feb. 4, 2021, 12 pages.
Summons to Attend Oral Proceedings received for European Patent Application No. 16201195.1, dated Sep. 4, 2018, 21 pages.
Summons to Attend Oral Proceedings received for European Patent Application No. 16201205.8, dated Jan. 28, 2020, 18 pages.
Summons to Attend Oral Proceedings received for European Patent Application No. 16703893.4, dated Mar. 26, 2019, 14 pages.
Summons to Attend Oral Proceedings received for European Patent Application No. 16803996.4, dated Oct. 2, 2019, 16 pages.
Summons to Attend Oral Proceedings received for European Patent Application No. 16804040.0, dated Jan. 24, 2020, 11 pages.
Summons to Attend Oral Proceedings received for European Patent Application No. 18154163.2, dated Nov. 29, 2018, 9 pages.
Summons to Attend Oral Proceedings received for European Patent Application No. 18713408.5, dated Apr. 30, 2021, 5 pages.
Summons to Attend Oral Proceedings received for European Patent Application No. 18830326.7, dated Feb. 25, 2021,6 pages.
Summons to Attend Oral Proceedings received for European Patent Application No. 19171661.2, dated Apr. 16, 2020, 12 pages.
Summons to Attend Oral Proceedings received for European Patent Application No. 19171661.2, dated Jun. 2, 2020, 13 pages.
Supplemental Notice of Allowance received for U.S. Appl. No. 14/869,831, dated Aug. 20, 2021, 2 pages.
Supplemental Notice of Allowance received for U.S. Appl. No. 14/870,694, dated Jan. 17, 2019, 3 pages.
Supplemental Notice of Allowance received for U.S. Appl. No. 14/870,726, dated Mar. 6, 2019, 6 pages.
Supplemental Notice of Allowance received for U.S. Appl. No. 16/786,694, dated Apr. 28, 2021, 2 pages.
Supplemental Notice of Allowance received for U.S. Appl. No. 16/786,694, dated Sep. 20, 2021, 3 pages.
Teather et al., "Assessing the Effects of Orientation and Device on (Constrained) 3D Movement Techniques", IEEE Symposium on 3D User Interfaces. Reno, Nevada, USA., Mar. 8-9, 2008, 8 pages.
Techboomers, "How to Use Skype Course", Available Online at: https://techboomers.com/p/skype, Apr. 25, 2017, 17 pages.
Thanakulmas Thanit, "MasterCard Identity Check Facial Recognition Biometrics", Available at <https://www.youtube.com/watch?v=g4sMbrkt1gl>, Oct. 10, 2016, 1 page.
Use NFC with Screen Off or in Lock Screen on Galaxy Nexus, Available online at: https://www.xda-developers.com/use-nfc-with-screen-off-or-in-lock-screen-on-galaxy-nexus/, Jun. 14, 2012, 4 pages.
Wang Na, "Research of Face Detection System Based on Mobile Phone Platform", Video Engineering, vol. 36, No. 11, Nov. 2012, 5 pages.

(56) References Cited

OTHER PUBLICATIONS

Whatsupcoders, "Flutter Tutorial—Upload Images using Firebase Storage", Online available at: https://www.youtube.com/watch?v=7uqmY6le4xk, Apr. 19, 2019, 4 pages.
Advisory Action received for U.S. Appl. No. 16/581,614, dated Nov. 4, 2021, 4 pages.
Applicant-Initiated Interview Summary received for U.S. Appl. No. 16/125,267, dated Oct. 25, 2021, 4 pages.
Applicant-Initiated Interview Summary received for U.S. Appl. No. 16/789,132, dated Nov. 29, 2021, 5 pages.
Applicant-Initiated Interview Summary received for U.S. Appl. No. 17/037,085, dated Sep. 27, 2021, 4 pages.
Board Decision received for Chinese Patent Application No. 201510284896.5, dated Nov. 19, 2021, 14 pages (1 page of English Translation and 13 pages of Official Copy).
Board Decision received for Chinese Patent Application No. 201810094316.X, dated Dec. 3, 2021, 18 pages (1 page of English Translation and 17 pages of Official Copy).
Board Opinion received for Chinese Patent Application No. 201810094316.X, dated Sep. 30, 2021, 11 pages (3 pages of English Translation and 8 pages of Official Copy).
Brief Communication Regarding Oral Proceedings received for European Patent Application No. 18713408.5, dated Sep. 28, 2021, 2 pages.
Corrected Notice of Allowance received for U.S. Appl. No. 16/814,226, dated Jan. 18, 2022, 21 pages.
Decision to Grant received for European Patent Application No. 18830326.7, dated Nov. 11, 2021, 3 pages.
Decision to Refuse received for European Patent Application No. 16201159.7, dated Sep. 27, 2021, 22 pages.
Examiner-Initiated Interview Summary received for U.S. Appl. No. 16/814,226, dated Nov. 15, 2021, 2 pages.
Final Office Action received for U.S. Appl. No. 16/814,226, dated Oct. 28, 2021, 19 pages.
Intention to Grant received for European Patent Application No. 18713408.5, dated Oct. 28, 2021, 10 pages.
International Search Report and written Opinion received for PCT Patent Application No. PCT/US2021/032299, dated Sep. 3, 2021, 15 pages.
Minutes of the Oral Proceedings received for European Patent Application No. 16201159.7, dated Sep. 23, 2021, 6 pages.
Non-Final Office Action received for U.S. Appl. No. 15/274,910, dated Dec. 24, 2021, 35 pages.
Non-Final Office Action received for U.S. Appl. No. 16/125,267, dated Nov. 23, 2021, 21 pages.
Non-Final Office Action received for U.S. Appl. No. 17/027,274, dated Jan. 4, 2022, 23 pages.
Notice of Acceptance received for Australian Patent Application No. 2019281961, dated Sep. 27, 2021, 3 pages.
Notice of Acceptance received for Australian Patent Application No. 2020202953, dated Oct. 1, 2021, 3 pages.
Notice of Acceptance received for Australian Patent Application No. 2020204256, dated Oct. 9, 2021, 3 pages.
Notice of Acceptance received for Australian Patent Application No. 2020289822, dated Dec. 22, 2021, 3 pages.
Notice of Allowance received for Chinese Patent Application No. 202010174749.3, dated Oct. 28, 2021, 4 pages (3 pages of English Translation and 1 page of Official Copy).
Notice of Allowance received for Japanese Patent Application No. 2019-572834, dated Nov. 1, 2021, 5 pages (1 page of English Translation and 4 pages of Official Copy).
Notice of Allowance received for Japanese Patent Application No. 2020-103213, dated Oct. 25, 2021, 4 pages (1 page of English Translation and 3 pages of Official Copy).
Notice of allowance received for Japanese Patent Application No. 2020-159979, dated Nov. 8, 2021, 4 pages (1 page of English Translation and 3 pages of Official Copy).
Notice of Allowance received for Korean Patent Application No. 10-2021-0099243, dated Oct. 30, 2021, 4 pages (1 page of English Translation and 3 pages of Official Copy).
Notice of Allowance received for Korean Patent Application No. 10-2021-7014009, dated Jan. 4, 2022, 4 pages (2 pages of English Translation and 2 pages of Official Copy).
Notice of Allowance received for Korean Patent Application No. 10-2021-7030343, dated Dec. 9, 2021, 6 pages (2 pages of English Translation and 4 pages of Official Copy).
Notice of Allowance received for Korean Patent Application No. 10-2021-7035417, dated Jan. 3, 2022, 5 pages (1 page of English Translation and 4 pages of Official Copy).
Notice of Allowance received for U.S. Appl. No. 15/884,195, dated Nov. 17, 2021, 19 pages.
Notice of Allowance received for U.S. Appl. No. 16/814,226, dated Dec. 30, 2021, 24 pages.
Notice of Allowance received for U.S. Appl. No. 17/015,429, dated Dec. 13, 2021, 2 pages.
Notice of Allowance received for U.S. Appl. No. 17/015,429, dated Dec. 24, 2021, 2 pages.
Notice of Allowance received for U.S. Appl. No. 17/015,429, dated Nov. 24, 2021, 2 pages.
Notice of Allowance received for U.S. Appl. No. 17/015,429, dated Oct. 8, 2021, 5 pages.
Notice of Allowance received for U.S. Appl. No. 17/015,429, dated Oct. 22, 2021, 2 pages.
Notice of Allowance received for U.S. Appl. No. 17/037,085, dated Nov. 10, 2021, 10 pages.
Office Action received for Australian Patent Application No. 2019271927, dated Dec. 17, 2021, 4 pages.
Office Action received for Australian Patent Application No. 2020203899, dated Nov. 26, 2021, 4 pages.
Office Action received for Australian Patent Application No. 2021103164, dated Dec. 2, 2021, 3 pages.
Office Action received for Australian Patent Application No. 2021103164, dated Sep. 16, 2021, 5 pages.
Office Action received for Chinese Patent Application No. 201710094150.7, dated Jan. 10, 2022, 6 pages (3 pages of English Translation and 3 pages of Official Copy).
Office Action received for Chinese Patent Application No. 201780033622.6, dated Sep. 3, 2021, 11 pages (5 pages of English Translation and 6 pages of Official Copy).
Office Action received for Chinese Patent Application No. 201911199010.1, dated Sep. 3, 2021, 12 pages (7 pages of English Translation and 5 pages of Official Copy).
Office Action received for Chinese Patent Application No. 202011206499.3, dated Sep. 28, 2021, 7 pages (4 pages of English Translation and 3 pages of Official Copy).
Office Action received for European Patent Application No. 19160344.8, dated Oct. 7, 2021, 8 pages.
Office Action received for European Patent Application No. 20198076.0, dated Sep. 22, 2021, 6 pages.
Office Action received for Indian Patent Application No. 201817036875, dated Oct. 29, 2021, 8 pages.
Office Action received for Indian Patent Application No. 201917024374, dated Dec. 30, 2021, 10 pages.
Office Action received for Indian Patent Application No. 201918003782, dated Nov. 18, 2021, 8 pages.
Office Action received for Indian Patent Application No. 202018014786, dated Nov. 9, 2021, 7 pages.
Office Action received for Indian Patent Application No. 202018041558, dated Dec. 3, 2021, 7 pages.
Office Action received for Korean Patent Application No. 10-2019-7006639, dated Sep. 16, 2021, 20 pages (10 pages of English Translation and 10 pages of Official Copy).
Office Action received for Korean Patent Application No. 10-2020-7034424, dated Dec. 3, 2021, 13 pages (6 pages of English Translation and 7 pages of Official Copy).
Summons to Attend Oral Proceedings received for European Patent Application No. 20180033.1, dated Oct. 4, 2021,9 pages.
Supplemental Notice of Allowance received for U.S. Appl. No. 15/884,195, dated Dec. 16, 2021, 3 pages.
Supplemental Notice of Allowance received for U.S. Appl. No. 16/786,694, dated Oct. 18, 2021, 2 pages.
Decision on Appeal received for U.S. Appl. No. 16/581,614, dated Dec. 15, 2022, 9 pages.

(56) References Cited

OTHER PUBLICATIONS

Notice of Acceptance received for Australian Patent Application No. 2020247707, dated Dec. 14, 2022, 3 pages.
Record of Oral Hearing received for U.S. Appl. No. 16/581,614, dated Dec. 21, 2022, 12 pages.
Office Action received for Japanese Patent Application No. 2021-557288, dated Nov. 21, 2022, 6 pages (3 pages of English Translation and 3 pages of Official Copy).
Notice of Allowance received for Japanese Patent Application No. 2021-557288, dated Mar. 3, 2023, 4 pages (1 page of English Translation and 3 pages of Official Copy).
Notice of Allowance received for U.S. Appl. No. 16/581,614, dated Jan. 19, 2023, 13 pages.
Notice of Allowance received for U.S. Appl. No. 16/581,614, dated Mar. 23, 2023, 13 pages.
Supplemental Notice of Allowance received for U.S. Appl. No. 17/027,274, dated Jan. 17, 2023, 3 pages.

* cited by examiner

Figure 12B:
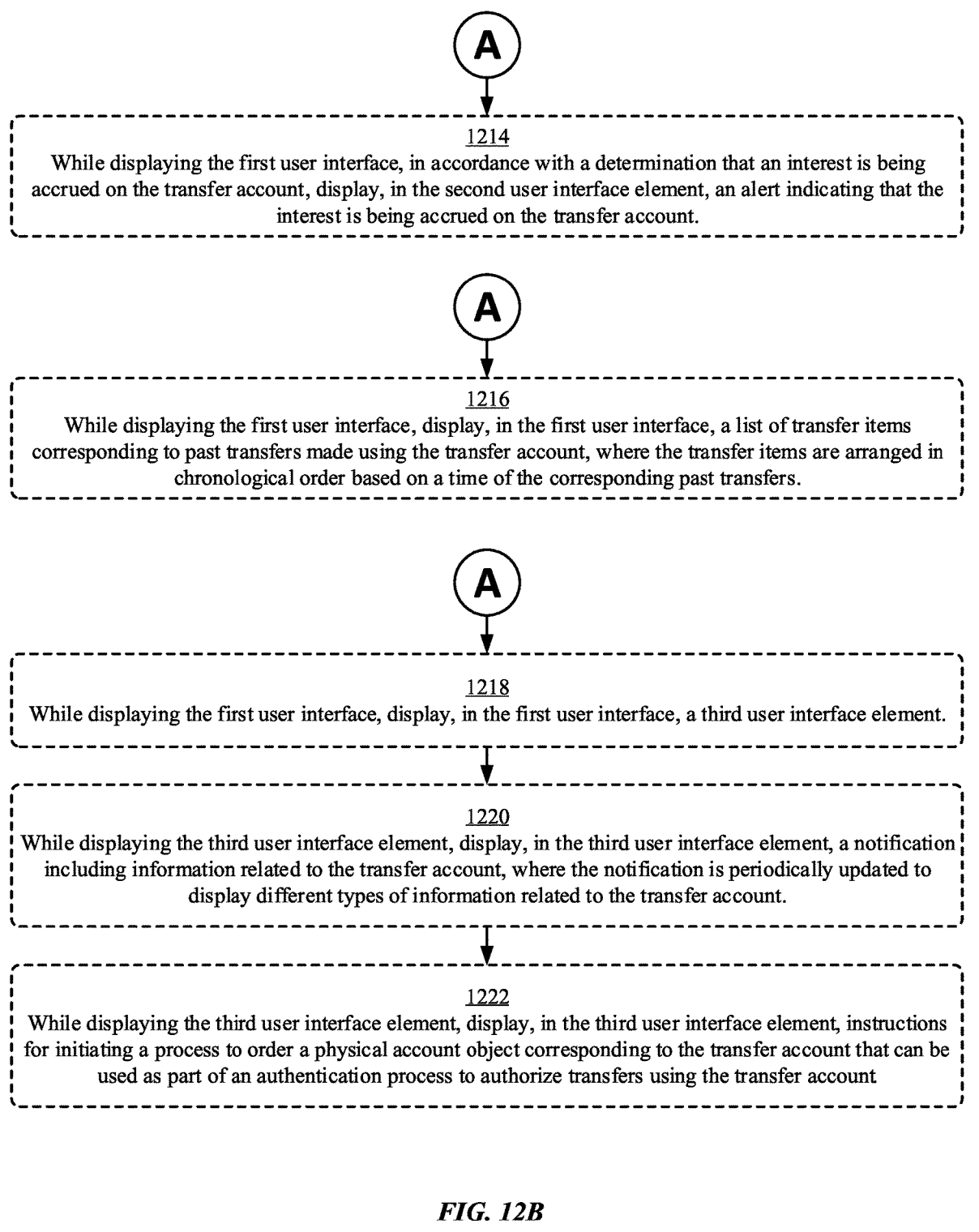

A

1214
While displaying the first user interface, in accordance with a determination that an interest is being accrued on the transfer account, display, in the second user interface element, an alert indicating that the interest is being accrued on the transfer account.

A

1216
While displaying the first user interface, display, in the first user interface, a list of transfer items corresponding to past transfers made using the transfer account, where the transfer items are arranged in chronological order based on a time of the corresponding past transfers.

A

1218
While displaying the first user interface, display, in the first user interface, a third user interface element.

1220
While displaying the third user interface element, display, in the third user interface element, a notification including information related to the transfer account, where the notification is periodically updated to display different types of information related to the transfer account.

1222
While displaying the third user interface element, display, in the third user interface element, instructions for initiating a process to order a physical account object corresponding to the transfer account that can be used as part of an authentication process to authorize transfers using the transfer account

Figure 12D:
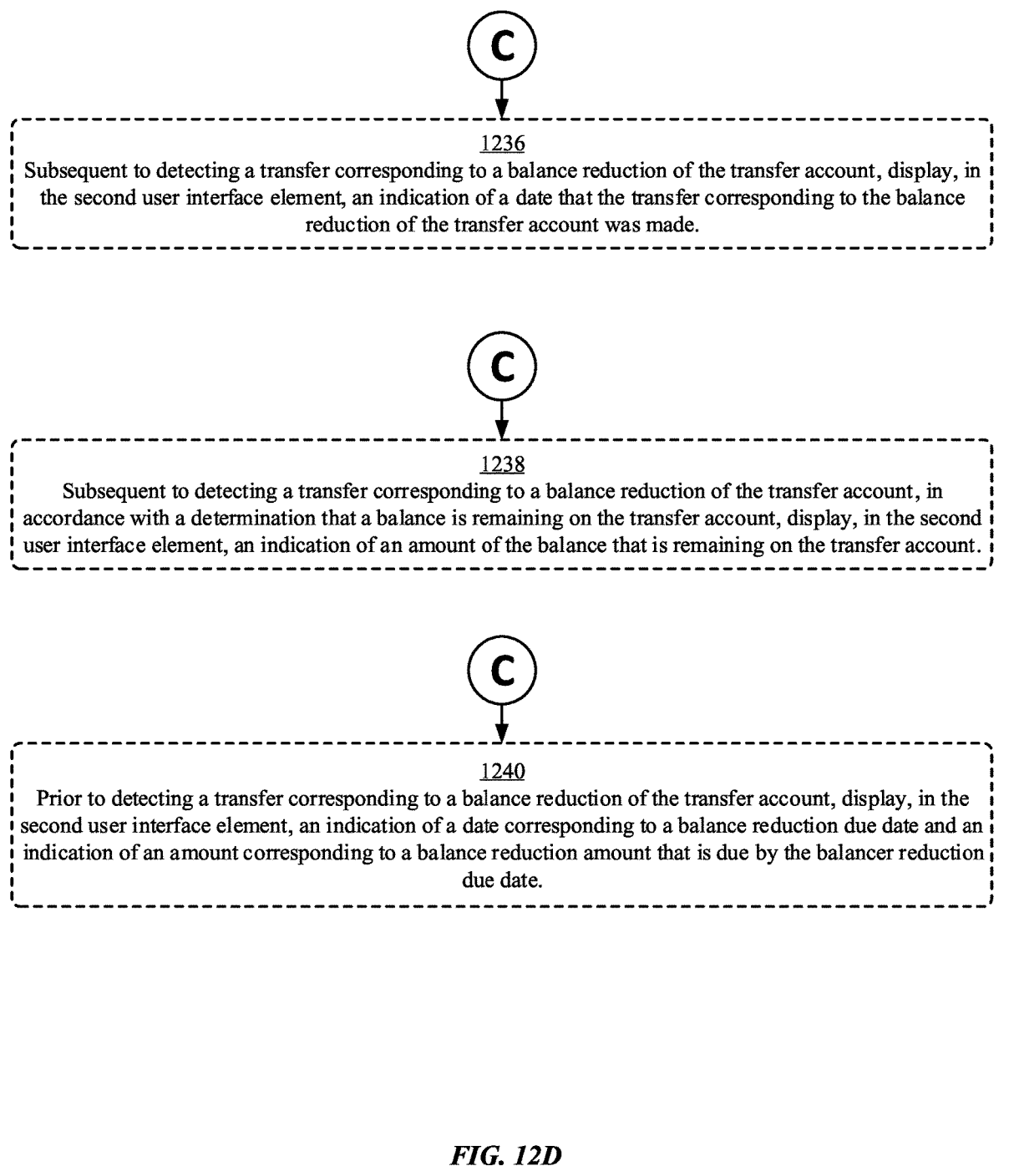

1236
Subsequent to detecting a transfer corresponding to a balance reduction of the transfer account, display, in the second user interface element, an indication of a date that the transfer corresponding to the balance reduction of the transfer account was made.

C

1238
Subsequent to detecting a transfer corresponding to a balance reduction of the transfer account, in accordance with a determination that a balance is remaining on the transfer account, display, in the second user interface element, an indication of an amount of the balance that is remaining on the transfer account.

C

1240
Prior to detecting a transfer corresponding to a balance reduction of the transfer account, display, in the second user interface element, an indication of a date corresponding to a balance reduction due date and an indication of an amount corresponding to a balance reduction amount that is due by the balancer reduction due date.

Figure 12E:
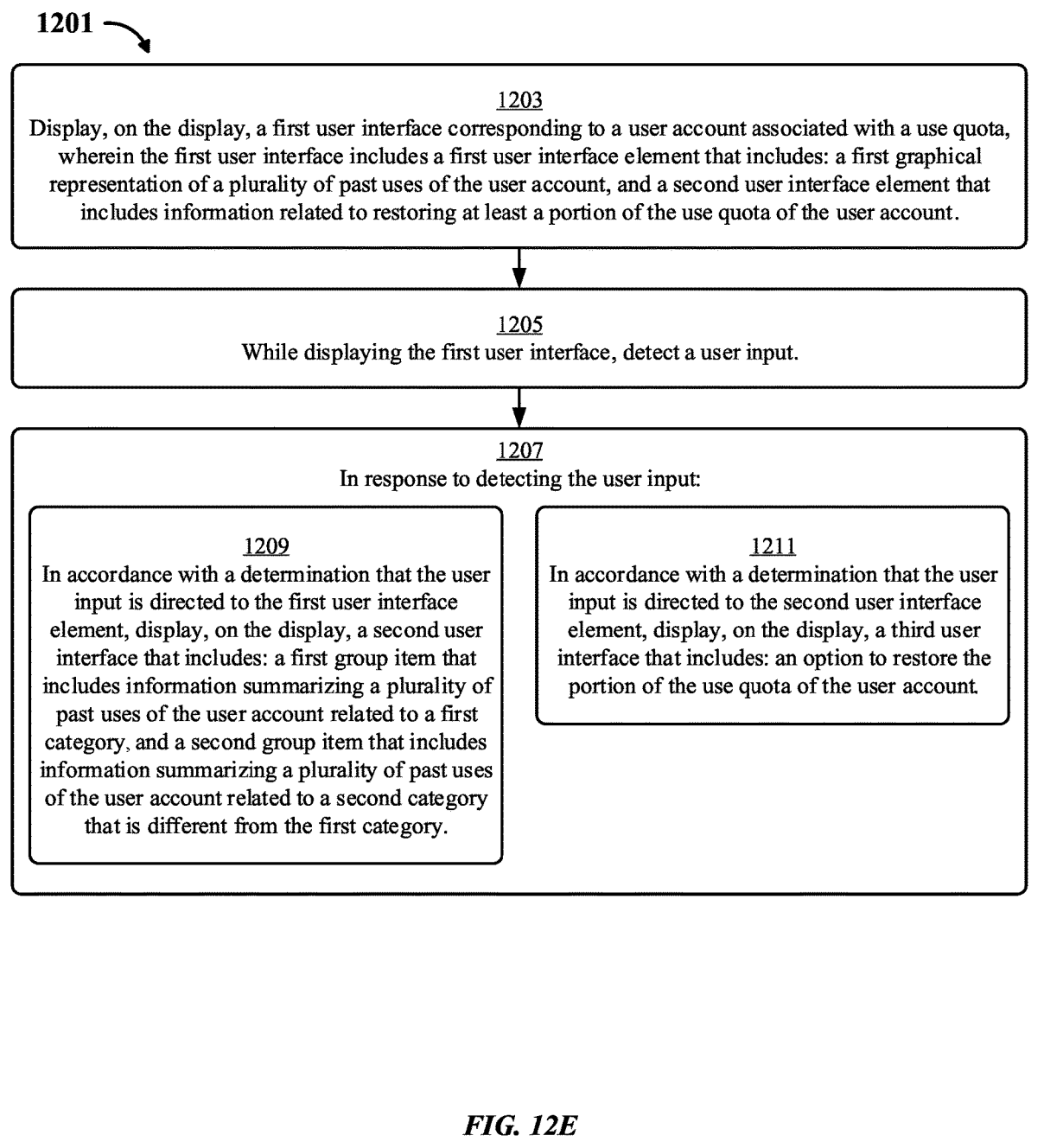

1203
Display, on the display, a first user interface corresponding to a user account associated with a use quota, wherein the first user interface includes a first user interface element that includes: a first graphical representation of a plurality of past uses of the user account, and a second user interface element that includes information related to restoring at least a portion of the use quota of the user account.

1205
While displaying the first user interface, detect a user input.

1207
In response to detecting the user input:

1209
In accordance with a determination that the user input is directed to the first user interface element, display, on the display, a second user interface that includes: a first group item that includes information summarizing a plurality of past uses of the user account related to a first category, and a second group item that includes information summarizing a plurality of past uses of the user account related to a second category that is different from the first category.

1211
In accordance with a determination that the user input is directed to the second user interface element, display, on the display, a third user interface that includes: an option to restore the portion of the use quota of the user account

Figure 15A:
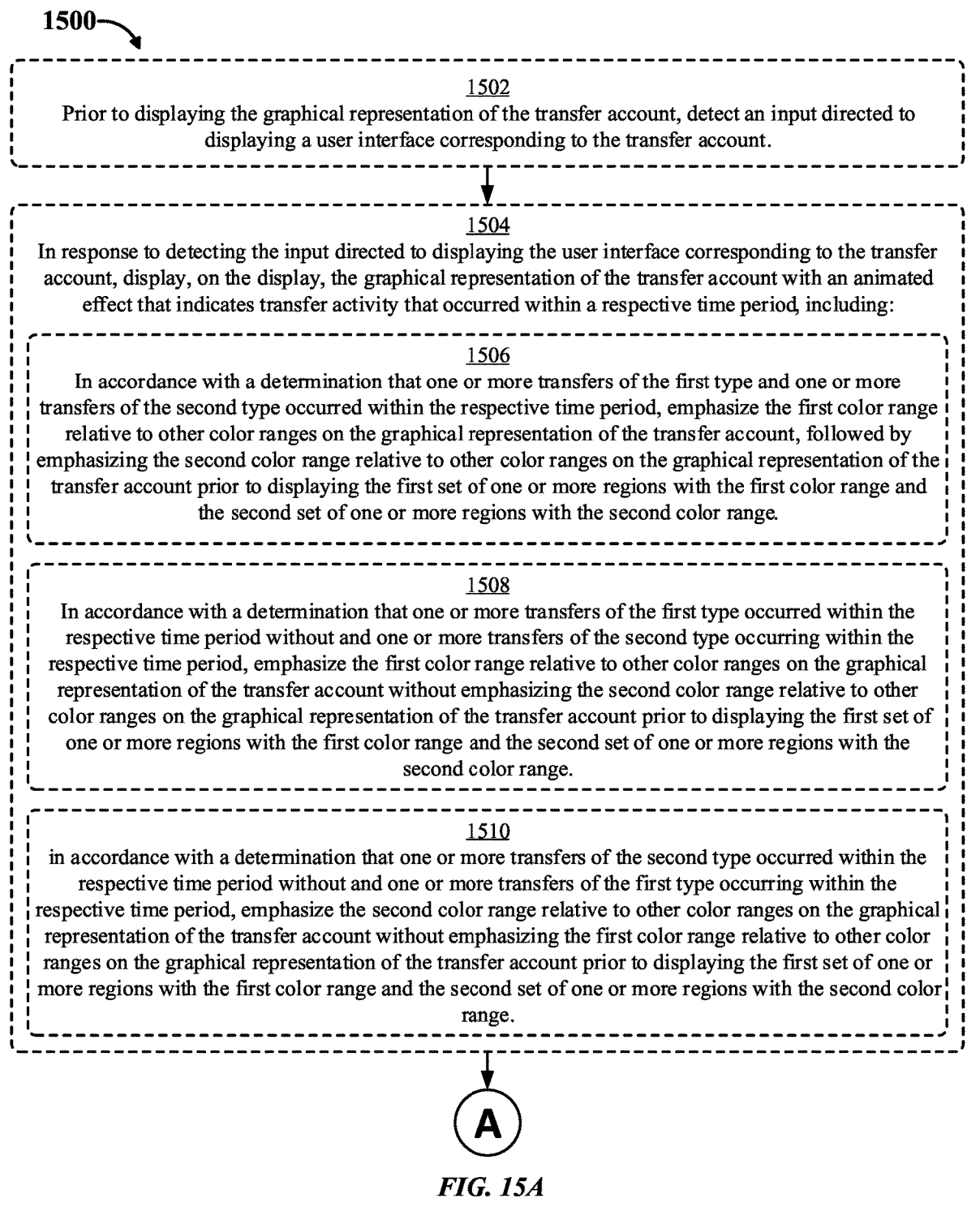

1502
Prior to displaying the graphical representation of the transfer account, detect an input directed to displaying a user interface corresponding to the transfer account.

1504
In response to detecting the input directed to displaying the user interface corresponding to the transfer account, display, on the display, the graphical representation of the transfer account with an animated effect that indicates transfer activity that occurred within a respective time period, including:

1506
In accordance with a determination that one or more transfers of the first type and one or more transfers of the second type occurred within the respective time period, emphasize the first color range relative to other color ranges on the graphical representation of the transfer account, followed by emphasizing the second color range relative to other color ranges on the graphical representation of the transfer account prior to displaying the first set of one or more regions with the first color range and the second set of one or more regions with the second color range.

1508
In accordance with a determination that one or more transfers of the first type occurred within the respective time period without and one or more transfers of the second type occurring within the respective time period, emphasize the first color range relative to other color ranges on the graphical representation of the transfer account without emphasizing the second color range relative to other color ranges on the graphical representation of the transfer account prior to displaying the first set of one or more regions with the first color range and the second set of one or more regions with the second color range.

1510
in accordance with a determination that one or more transfers of the second type occurred within the respective time period without and one or more transfers of the first type occurring within the respective time period, emphasize the second color range relative to other color ranges on the graphical representation of the transfer account without emphasizing the first color range relative to other color ranges on the graphical representation of the transfer account prior to displaying the first set of one or more regions with the first color range and the second set of one or more regions with the second color range.

Figure 15B:
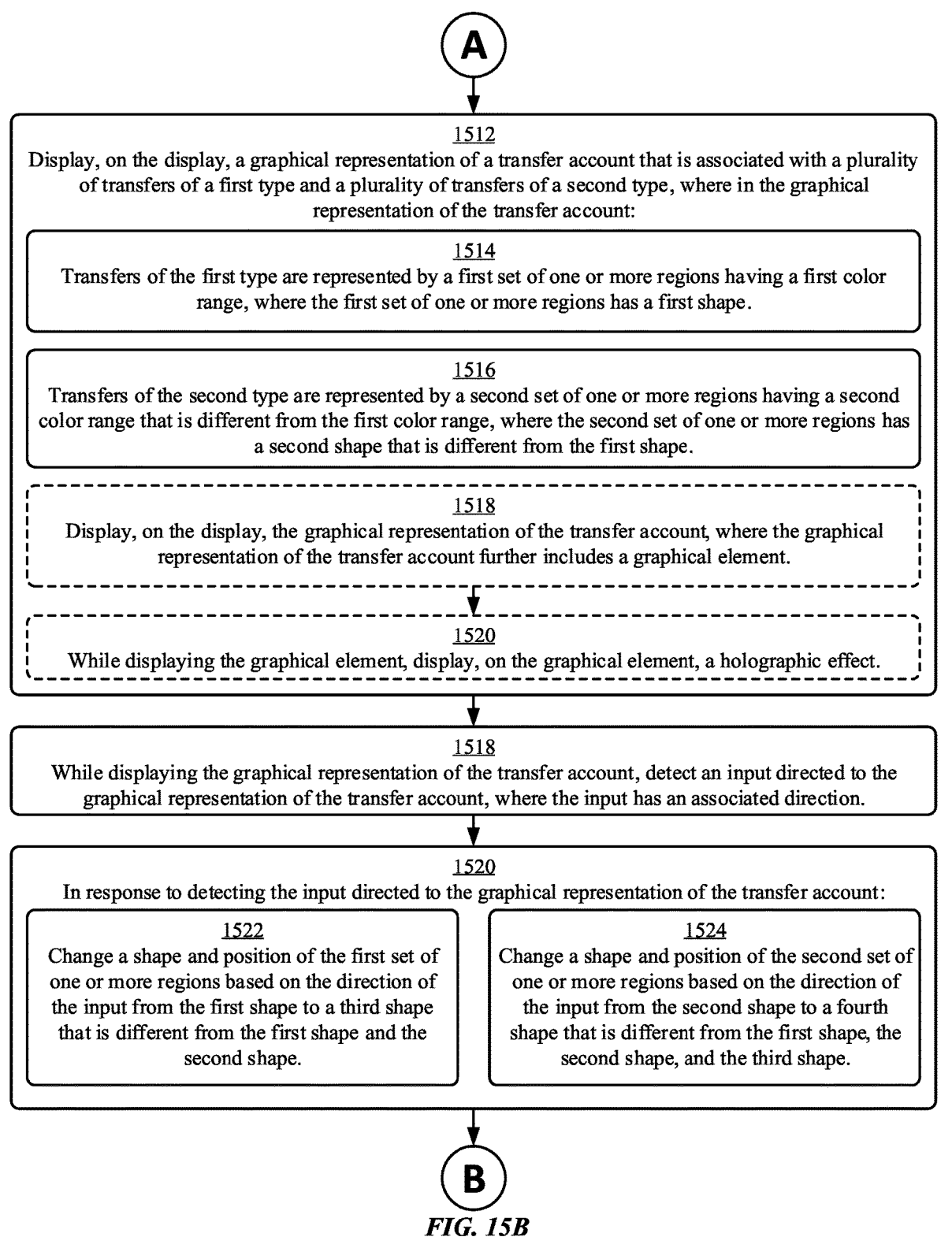

1512
Display, on the display, a graphical representation of a transfer account that is associated with a plurality of transfers of a first type and a plurality of transfers of a second type, where in the graphical representation of the transfer account:

1514
Transfers of the first type are represented by a first set of one or more regions having a first color range, where the first set of one or more regions has a first shape.

1516
Transfers of the second type are represented by a second set of one or more regions having a second color range that is different from the first color range, where the second set of one or more regions has a second shape that is different from the first shape.

1518
Display, on the display, the graphical representation of the transfer account, where the graphical representation of the transfer account further includes a graphical element.

1520
While displaying the graphical element, display, on the graphical element, a holographic effect.

1518
While displaying the graphical representation of the transfer account, detect an input directed to the graphical representation of the transfer account, where the input has an associated direction.

1520
In response to detecting the input directed to the graphical representation of the transfer account:

1522
Change a shape and position of the first set of one or more regions based on the direction of the input from the first shape to a third shape that is different from the first shape and the second shape.

1524
Change a shape and position of the second set of one or more regions based on the direction of the input from the second shape to a fourth shape that is different from the first shape, the second shape, and the third shape.

Figure 15C:
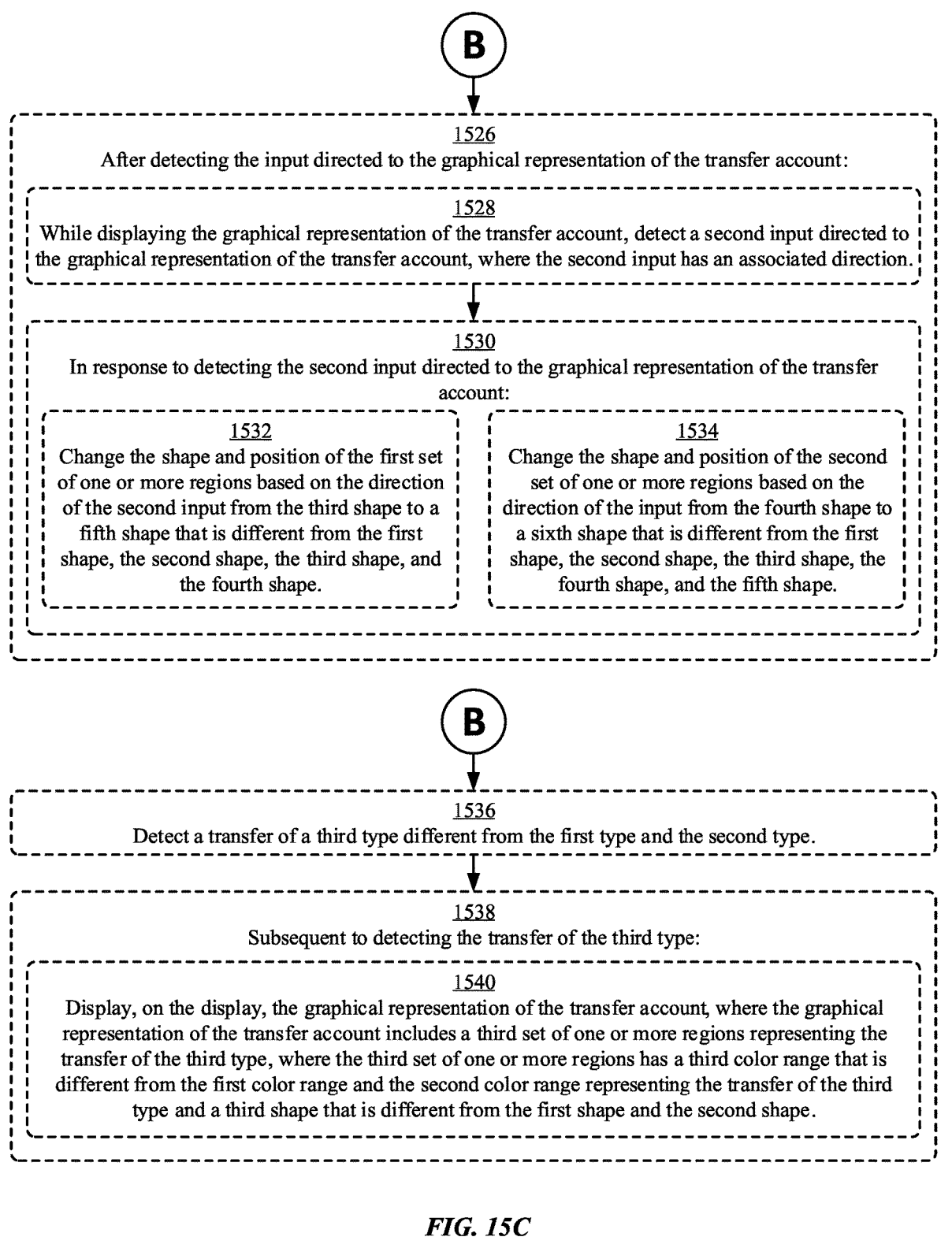

1526
After detecting the input directed to the graphical representation of the transfer account:

1528
While displaying the graphical representation of the transfer account, detect a second input directed to the graphical representation of the transfer account, where the second input has an associated direction.

1530
In response to detecting the second input directed to the graphical representation of the transfer account:

1532
Change the shape and position of the first set of one or more regions based on the direction of the second input from the third shape to a fifth shape that is different from the first shape, the second shape, the third shape, and the fourth shape.

1534
Change the shape and position of the second set of one or more regions based on the direction of the input from the fourth shape to a sixth shape that is different from the first shape, the second shape, the third shape, the fourth shape, and the fifth shape.

B

1536
Detect a transfer of a third type different from the first type and the second type.

1538
Subsequent to detecting the transfer of the third type:

1540
Display, on the display, the graphical representation of the transfer account, where the graphical representation of the transfer account includes a third set of one or more regions representing the transfer of the third type, where the third set of one or more regions has a third color range that is different from the first color range and the second color range representing the transfer of the third type and a third shape that is different from the first shape and the second shape.

Figure 15D:
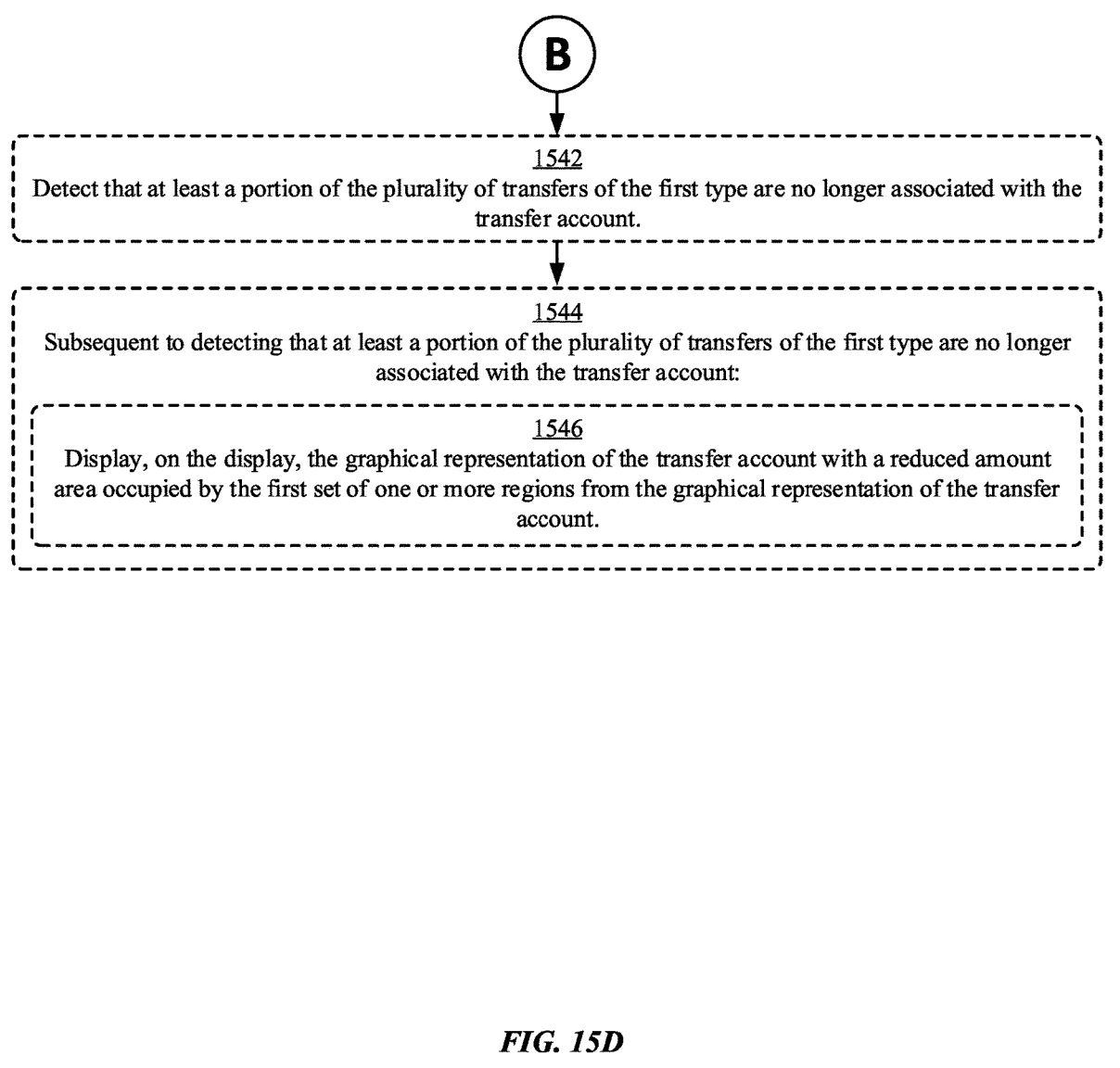

1542
Detect that at least a portion of the plurality of transfers of the first type are no longer associated with the transfer account.

1544
Subsequent to detecting that at least a portion of the plurality of transfers of the first type are no longer associated with the transfer account:

1546
Display, on the display, the graphical representation of the transfer account with a reduced amount area occupied by the first set of one or more regions from the graphical representation of the transfer account.

Figure 15E:
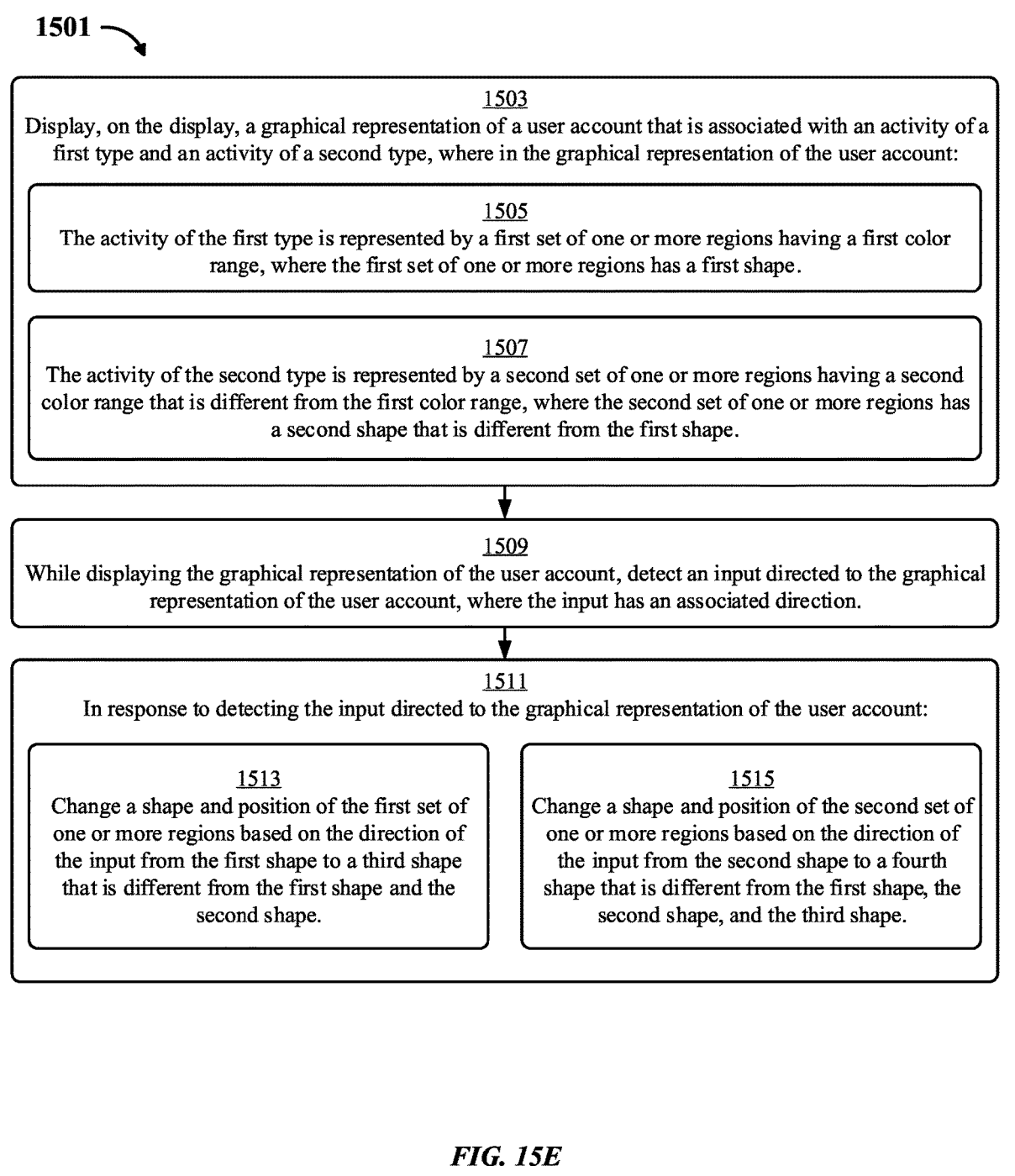

1503
Display, on the display, a graphical representation of a user account that is associated with an activity of a first type and an activity of a second type, where in the graphical representation of the user account:

1505
The activity of the first type is represented by a first set of one or more regions having a first color range, where the first set of one or more regions has a first shape.

1507
The activity of the second type is represented by a second set of one or more regions having a second color range that is different from the first color range, where the second set of one or more regions has a second shape that is different from the first shape.

1509
While displaying the graphical representation of the user account, detect an input directed to the graphical representation of the user account, where the input has an associated direction.

1511
In response to detecting the input directed to the graphical representation of the user account:

1513
Change a shape and position of the first set of one or more regions based on the direction of the input from the first shape to a third shape that is different from the first shape and the second shape.

1515
Change a shape and position of the second set of one or more regions based on the direction of the input from the second shape to a fourth shape that is different from the first shape, the second shape, and the third shape.

Figure 18A:
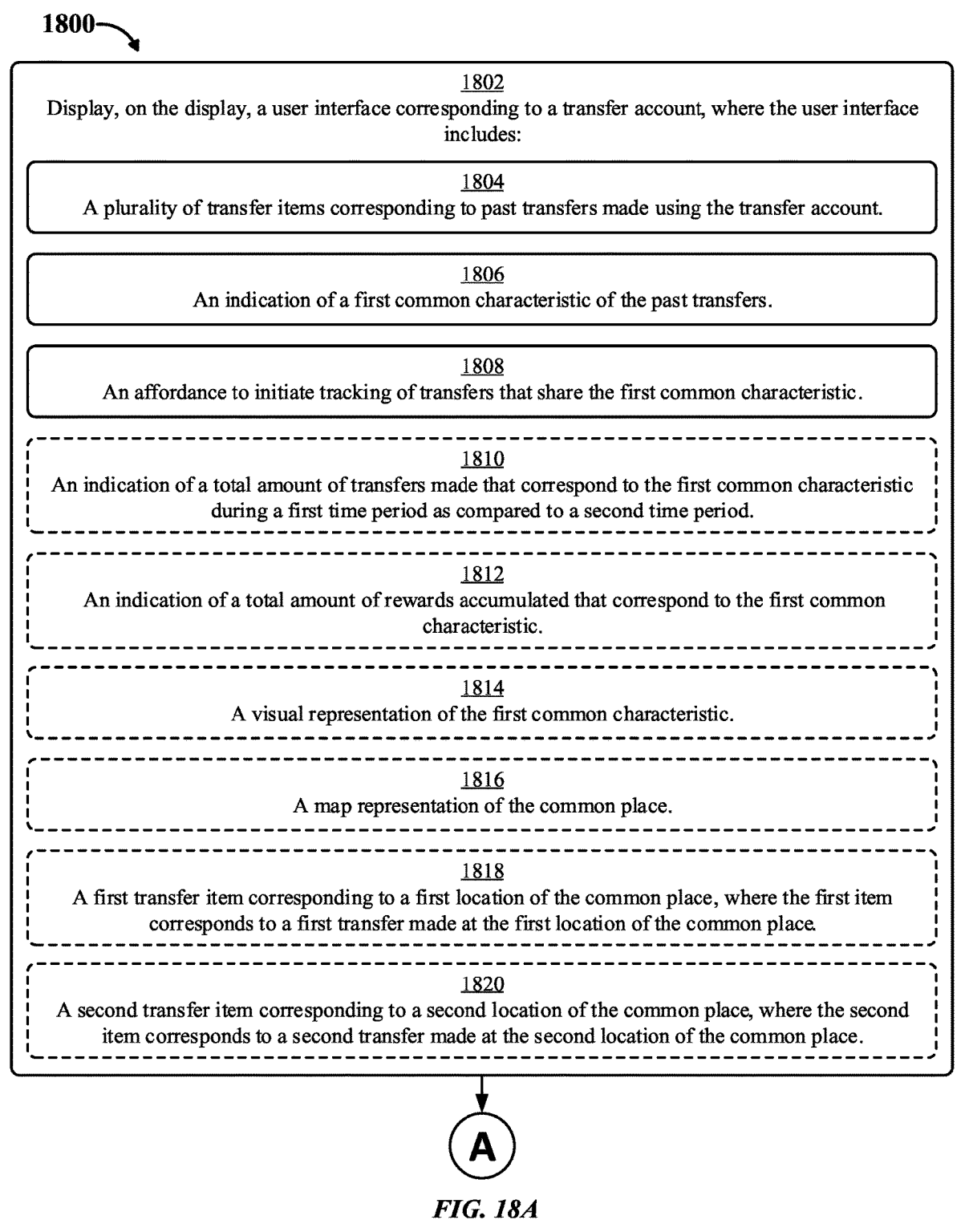

1802
Display, on the display, a user interface corresponding to a transfer account, where the user interface includes:

1804
A plurality of transfer items corresponding to past transfers made using the transfer account.

1806
An indication of a first common characteristic of the past transfers.

1808
An affordance to initiate tracking of transfers that share the first common characteristic.

1810
An indication of a total amount of transfers made that correspond to the first common characteristic during a first time period as compared to a second time period.

1812
An indication of a total amount of rewards accumulated that correspond to the first common characteristic.

1814
A visual representation of the first common characteristic.

1816
A map representation of the common place.

1818
A first transfer item corresponding to a first location of the common place, where the first item corresponds to a first transfer made at the first location of the common place.

1820
A second transfer item corresponding to a second location of the common place, where the second item corresponds to a second transfer made at the second location of the common place.

Figure 18D:
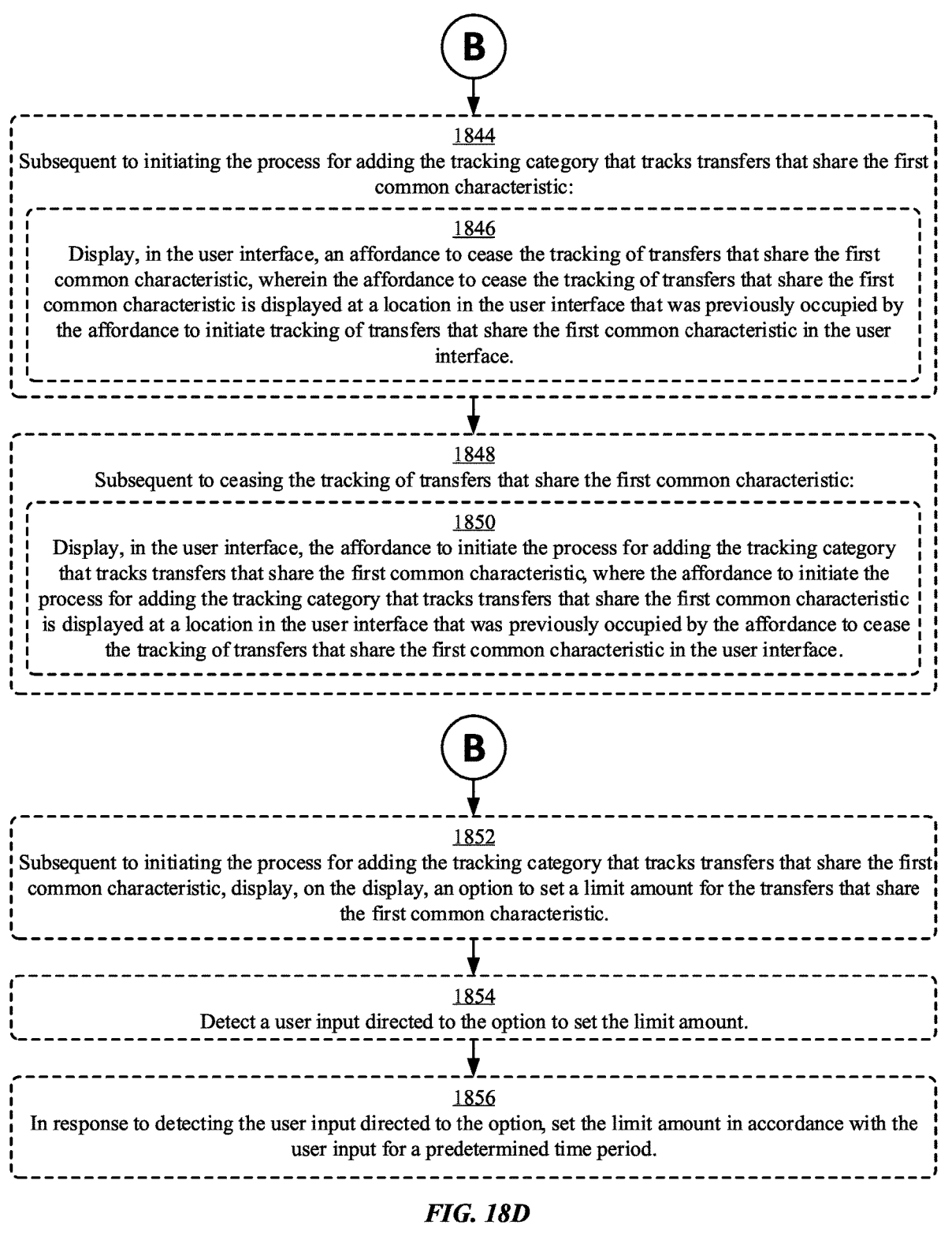

1844
Subsequent to initiating the process for adding the tracking category that tracks transfers that share the first common characteristic:

1846
Display, in the user interface, an affordance to cease the tracking of transfers that share the first common characteristic, wherein the affordance to cease the tracking of transfers that share the first common characteristic is displayed at a location in the user interface that was previously occupied by the affordance to initiate tracking of transfers that share the first common characteristic in the user interface.

1848
Subsequent to ceasing the tracking of transfers that share the first common characteristic:

1850
Display, in the user interface, the affordance to initiate the process for adding the tracking category that tracks transfers that share the first common characteristic, where the affordance to initiate the process for adding the tracking category that tracks transfers that share the first common characteristic is displayed at a location in the user interface that was previously occupied by the affordance to cease the tracking of transfers that share the first common characteristic in the user interface.

B

1852
Subsequent to initiating the process for adding the tracking category that tracks transfers that share the first common characteristic, display, on the display, an option to set a limit amount for the transfers that share the first common characteristic.

1854
Detect a user input directed to the option to set the limit amount.

1856
In response to detecting the user input directed to the option, set the limit amount in accordance with the user input for a predetermined time period.

Figure 18E:
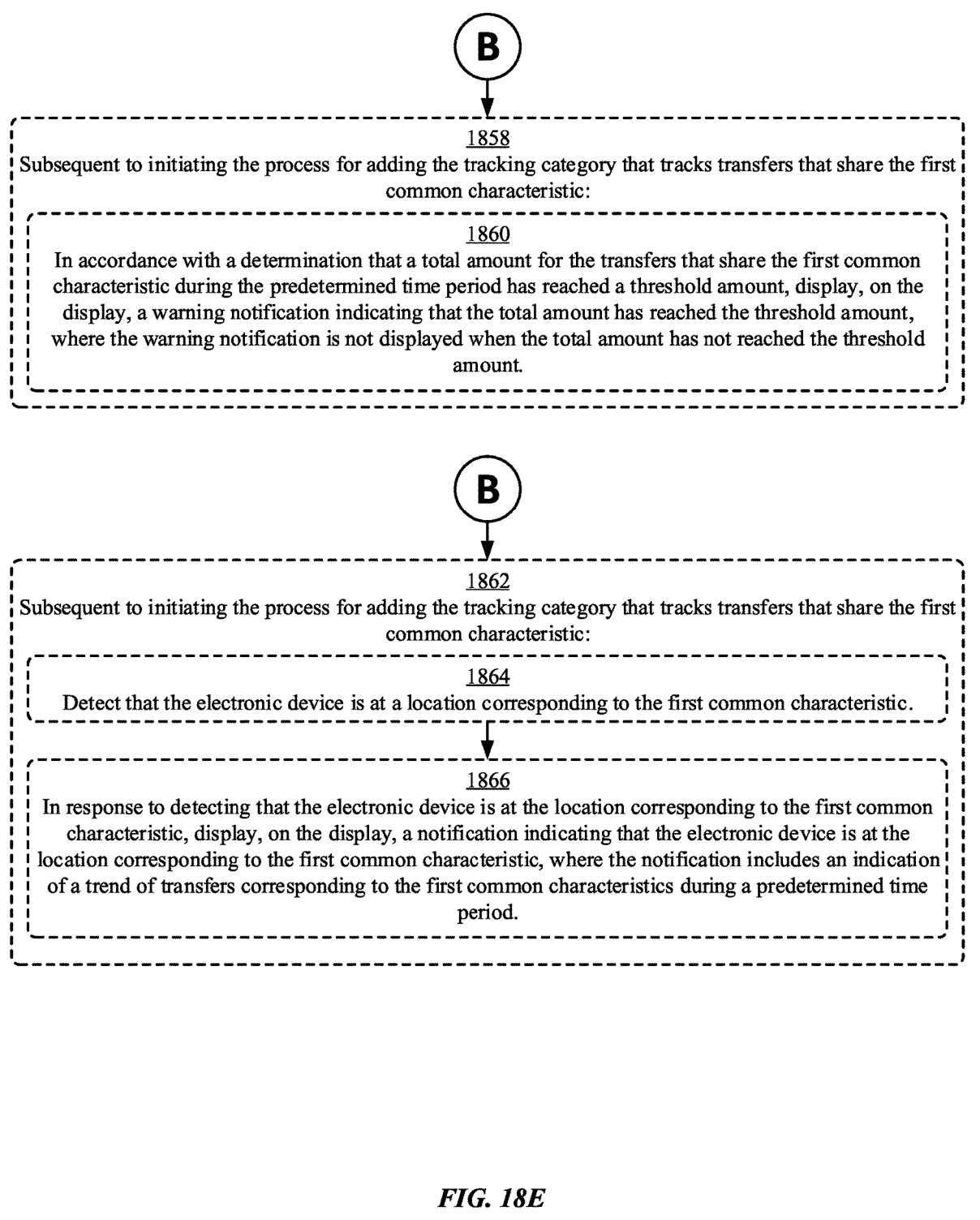

1858
Subsequent to initiating the process for adding the tracking category that tracks transfers that share the first common characteristic:

1860
In accordance with a determination that a total amount for the transfers that share the first common characteristic during the predetermined time period has reached a threshold amount, display, on the display, a warning notification indicating that the total amount has reached the threshold amount, where the warning notification is not displayed when the total amount has not reached the threshold amount.

B

1862
Subsequent to initiating the process for adding the tracking category that tracks transfers that share the first common characteristic:

1864
Detect that the electronic device is at a location corresponding to the first common characteristic.

1866
In response to detecting that the electronic device is at the location corresponding to the first common characteristic, display, on the display, a notification indicating that the electronic device is at the location corresponding to the first common characteristic, where the notification includes an indication of a trend of transfers corresponding to the first common characteristics during a predetermined time period.

Figure 18G:
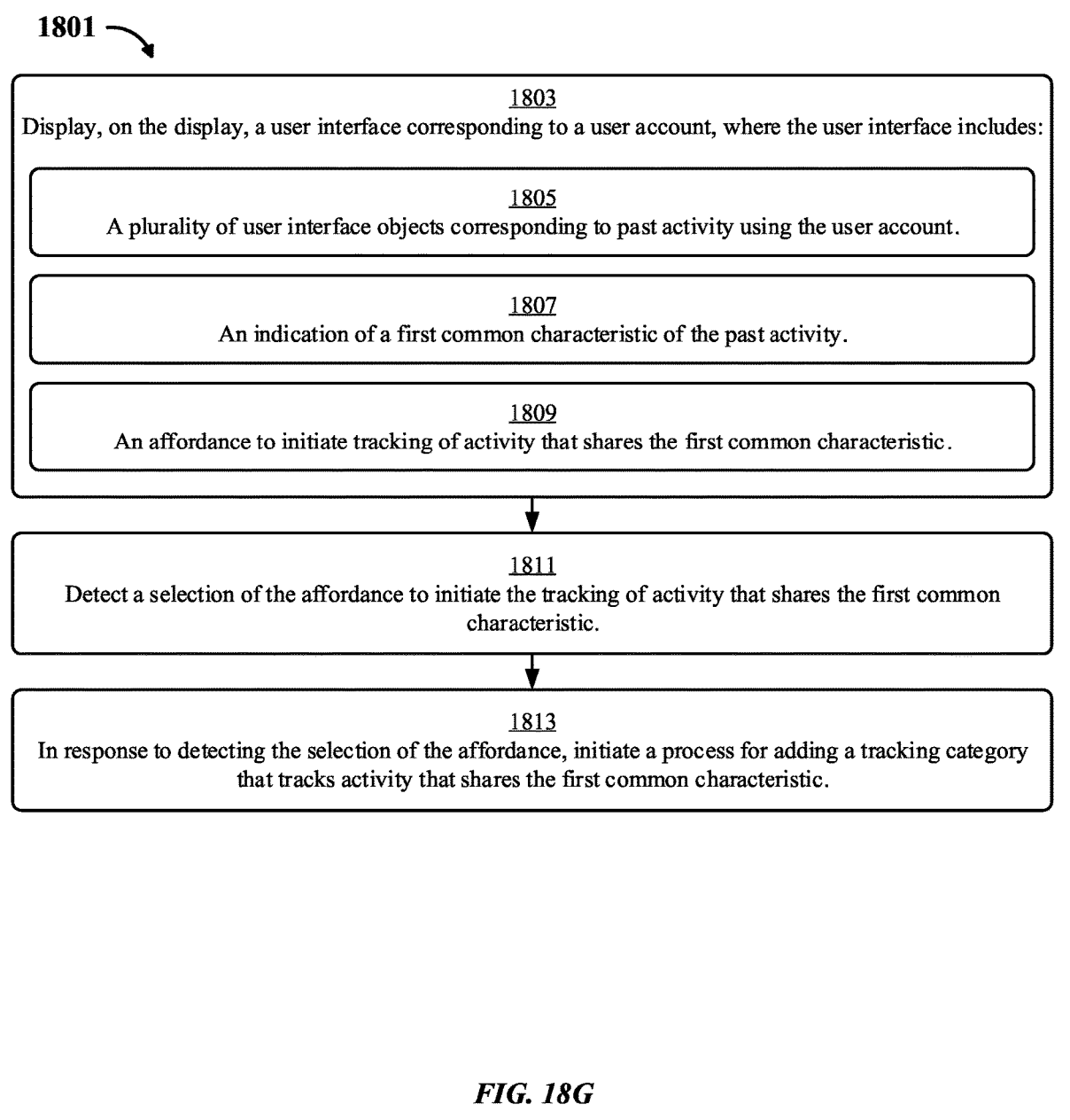

1803
Display, on the display, a user interface corresponding to a user account, where the user interface includes:

1805
A plurality of user interface objects corresponding to past activity using the user account.

1807
An indication of a first common characteristic of the past activity.

1809
An affordance to initiate tracking of activity that shares the first common characteristic.

1811
Detect a selection of the affordance to initiate the tracking of activity that shares the first common characteristic.

1813
In response to detecting the selection of the affordance, initiate a process for adding a tracking category that tracks activity that shares the first common characteristic.

Figure 21B:
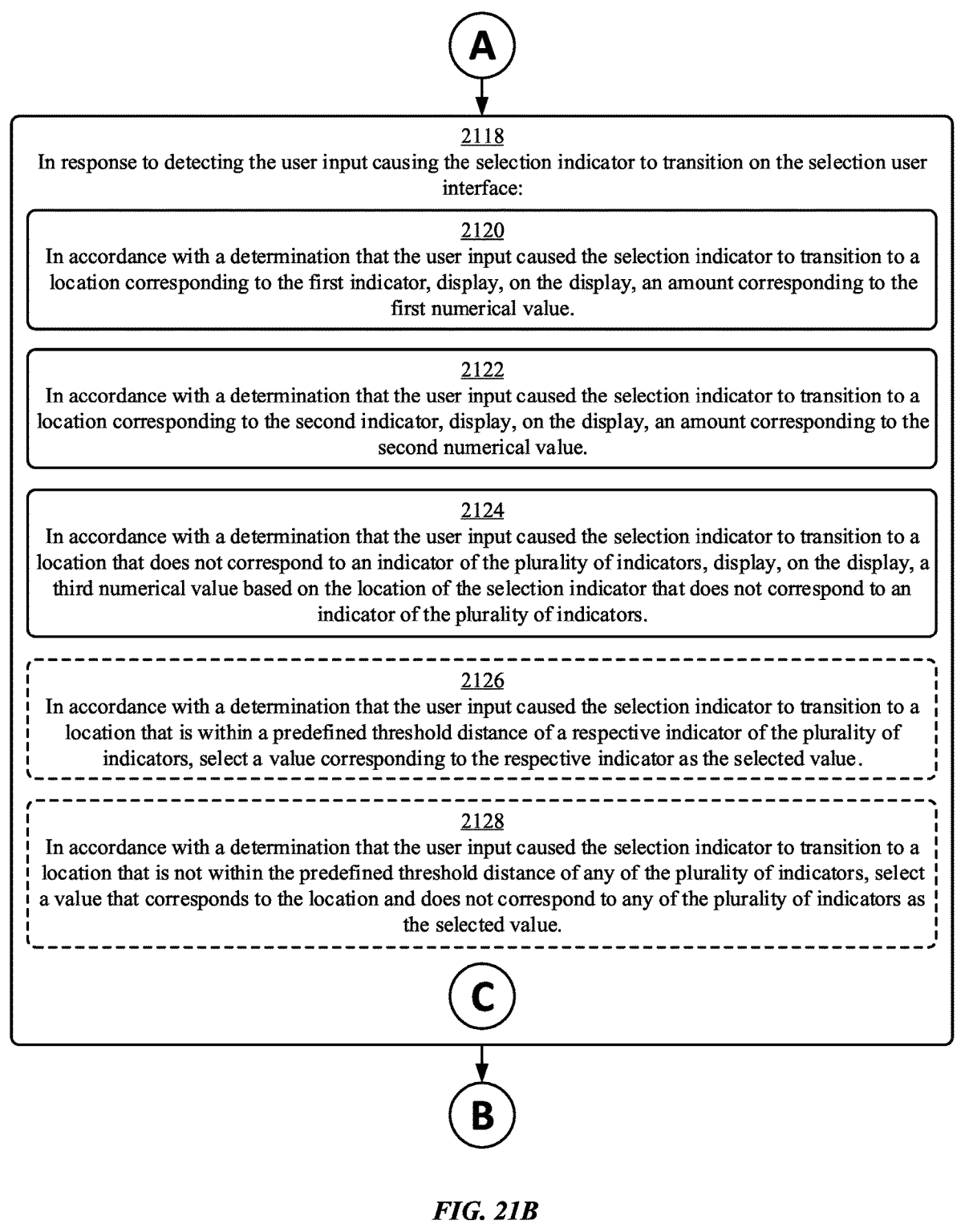

2118
In response to detecting the user input causing the selection indicator to transition on the selection user interface:

2120
In accordance with a determination that the user input caused the selection indicator to transition to a location corresponding to the first indicator, display, on the display, an amount corresponding to the first numerical value.

2122
In accordance with a determination that the user input caused the selection indicator to transition to a location corresponding to the second indicator, display, on the display, an amount corresponding to the second numerical value.

2124
In accordance with a determination that the user input caused the selection indicator to transition to a location that does not correspond to an indicator of the plurality of indicators, display, on the display, a third numerical value based on the location of the selection indicator that does not correspond to an indicator of the plurality of indicators.

2126
In accordance with a determination that the user input caused the selection indicator to transition to a location that is within a predefined threshold distance of a respective indicator of the plurality of indicators, select a value corresponding to the respective indicator as the selected value.

2128
In accordance with a determination that the user input caused the selection indicator to transition to a location that is not within the predefined threshold distance of any of the plurality of indicators, select a value that corresponds to the location and does not correspond to any of the plurality of indicators as the selected value.

Figure 21C:
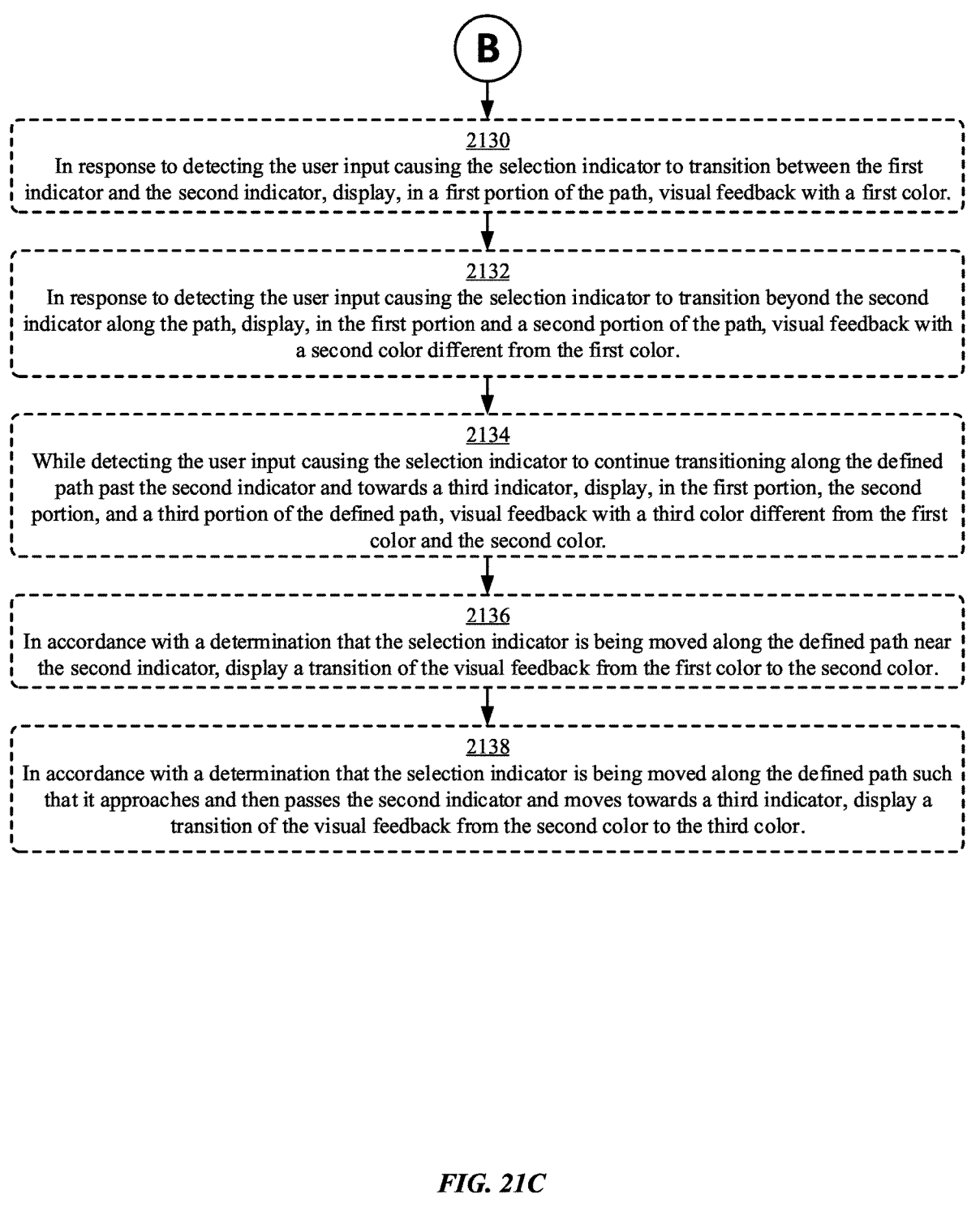

2130
In response to detecting the user input causing the selection indicator to transition between the first indicator and the second indicator, display, in a first portion of the path, visual feedback with a first color.

2132
In response to detecting the user input causing the selection indicator to transition beyond the second indicator along the path, display, in the first portion and a second portion of the path, visual feedback with a second color different from the first color.

2134
While detecting the user input causing the selection indicator to continue transitioning along the defined path past the second indicator and towards a third indicator, display, in the first portion, the second portion, and a third portion of the defined path, visual feedback with a third color different from the first color and the second color.

2136
In accordance with a determination that the selection indicator is being moved along the defined path near the second indicator, display a transition of the visual feedback from the first color to the second color.

2138
In accordance with a determination that the selection indicator is being moved along the defined path such that it approaches and then passes the second indicator and moves towards a third indicator, display a transition of the visual feedback from the second color to the third color.

Figure 21D:
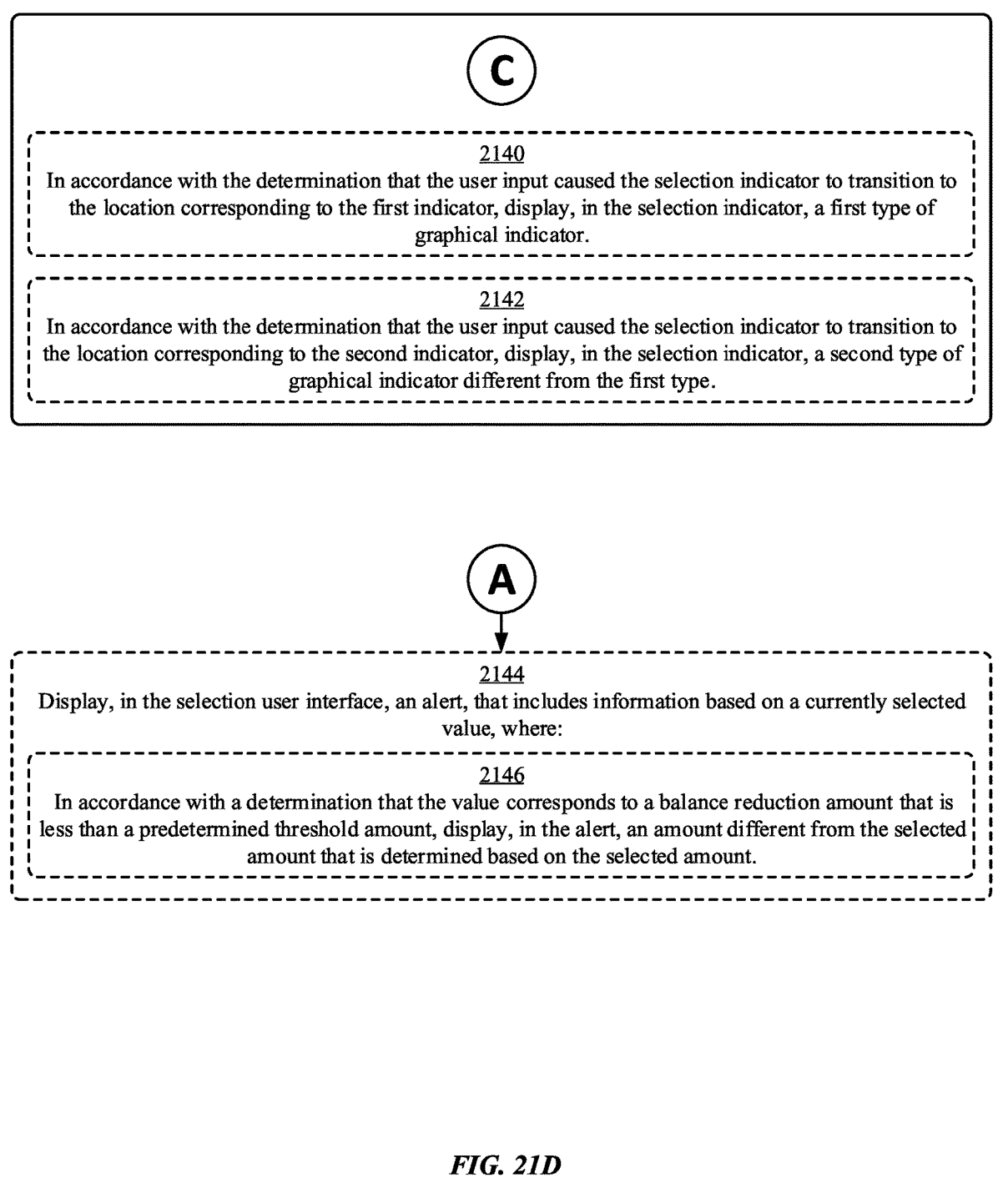

2140
In accordance with the determination that the user input caused the selection indicator to transition to the location corresponding to the first indicator, display, in the selection indicator, a first type of graphical indicator.

2142
In accordance with the determination that the user input caused the selection indicator to transition to the location corresponding to the second indicator, display, in the selection indicator, a second type of graphical indicator different from the first type.

A

2144
Display, in the selection user interface, an alert, that includes information based on a currently selected value, where:

2146
In accordance with a determination that the value corresponds to a balance reduction amount that is less than a predetermined threshold amount, display, in the alert, an amount different from the selected amount that is determined based on the selected amount.

Figure 21E:
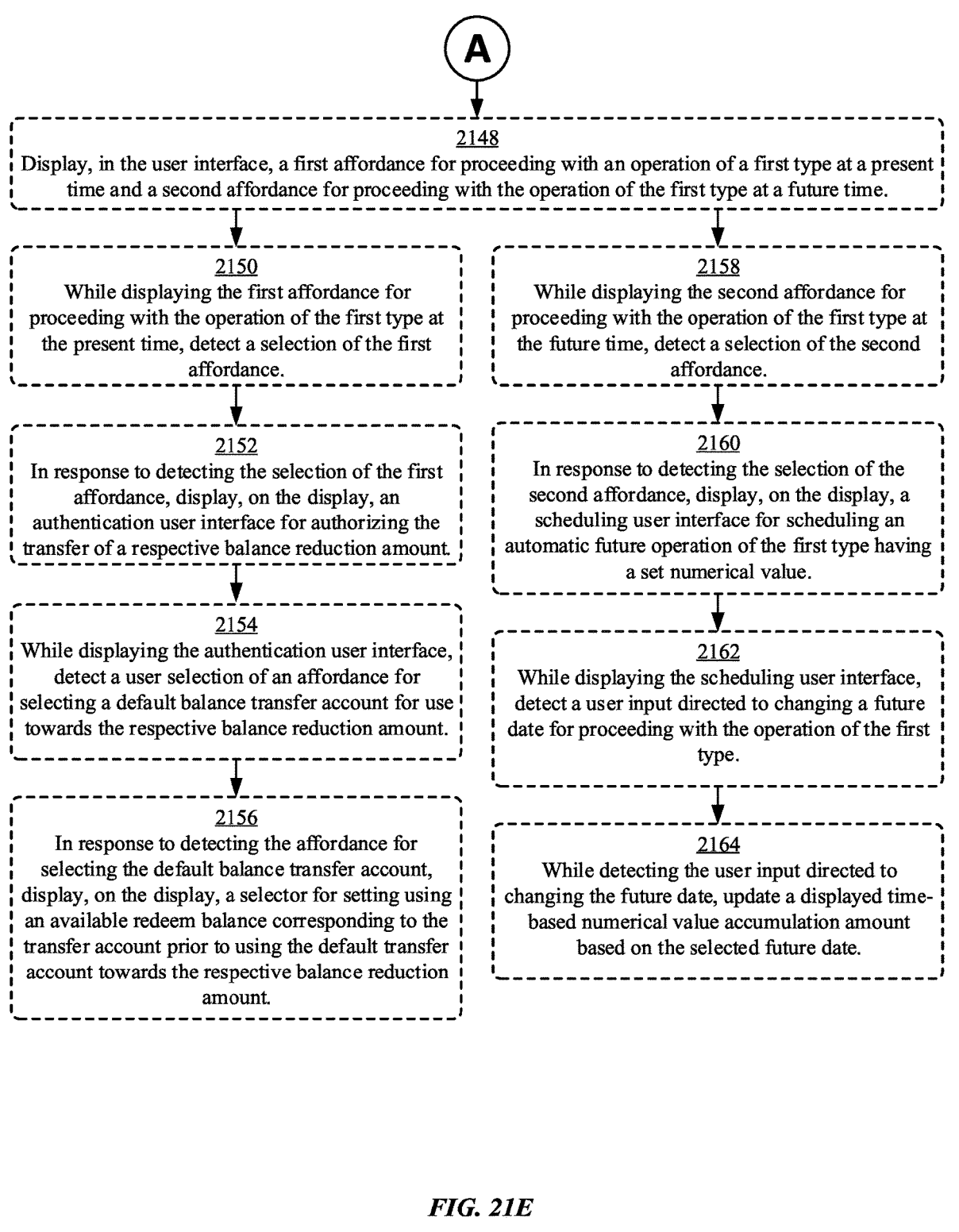

2148
Display, in the user interface, a first affordance for proceeding with an operation of a first type at a present time and a second affordance for proceeding with the operation of the first type at a future time.

2150
While displaying the first affordance for proceeding with the operation of the first type at the present time, detect a selection of the first affordance.

2152
In response to detecting the selection of the first affordance, display, on the display, an authentication user interface for authorizing the transfer of a respective balance reduction amount.

2154
While displaying the authentication user interface, detect a user selection of an affordance for selecting a default balance transfer account for use towards the respective balance reduction amount.

2156
In response to detecting the affordance for selecting the default balance transfer account, display, on the display, a selector for setting using an available redeem balance corresponding to the transfer account prior to using the default transfer account towards the respective balance reduction amount.

2158
While displaying the second affordance for proceeding with the operation of the first type at the future time, detect a selection of the second affordance.

2160
In response to detecting the selection of the second affordance, display, on the display, a scheduling user interface for scheduling an automatic future operation of the first type having a set numerical value.

2162
While displaying the scheduling user interface, detect a user input directed to changing a future date for proceeding with the operation of the first type.

2164
While detecting the user input directed to changing the future date, update a displayed time-based numerical value accumulation amount based on the selected future date.

Figure 24D:
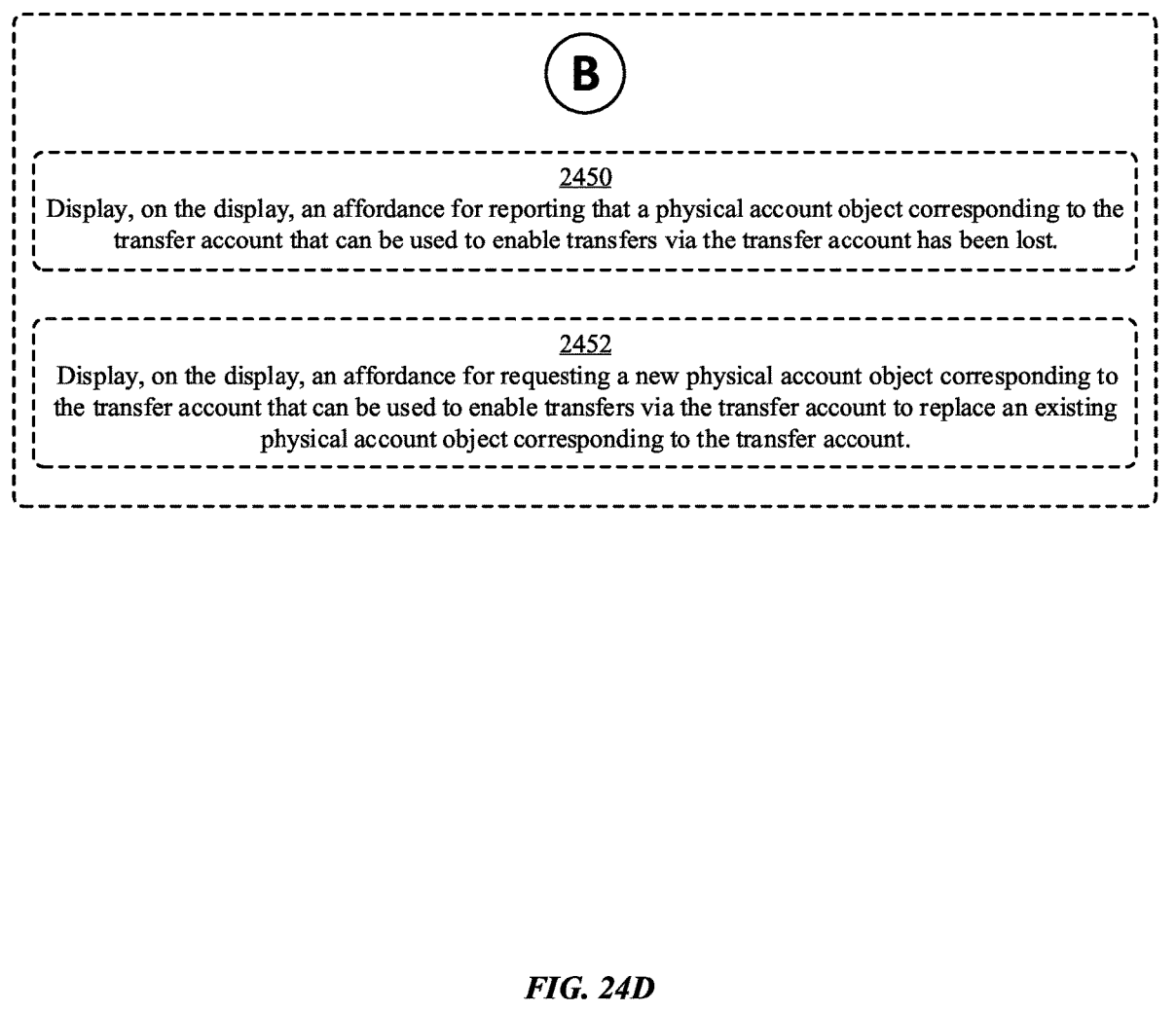

2450
Display, on the display, an affordance for reporting that a physical account object corresponding to the transfer account that can be used to enable transfers via the transfer account has been lost.

2452
Display, on the display, an affordance for requesting a new physical account object corresponding to the transfer account that can be used to enable transfers via the transfer account to replace an existing physical account object corresponding to the transfer account.

Figure 27B:
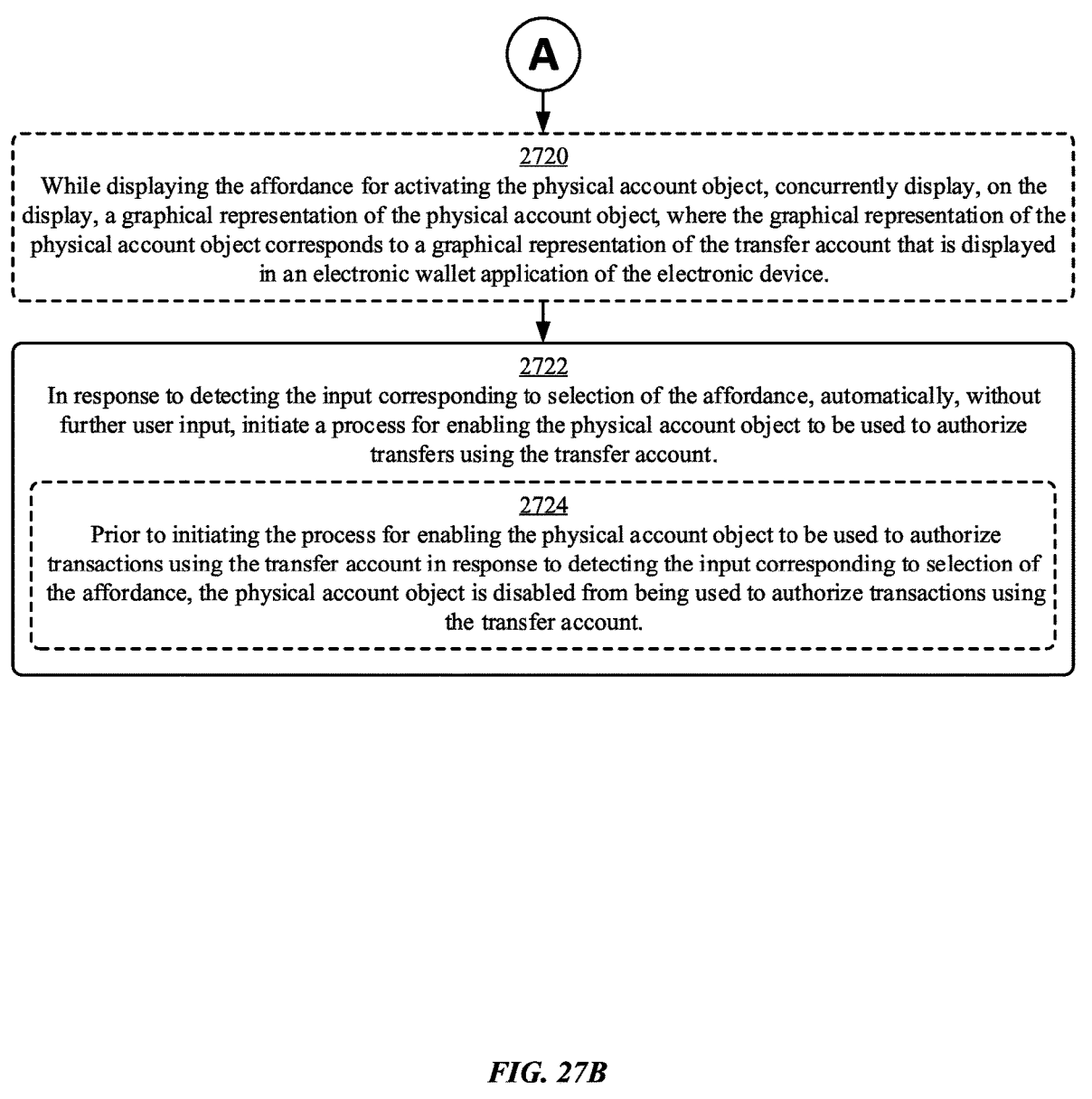

2720
While displaying the affordance for activating the physical account object, concurrently display, on the display, a graphical representation of the physical account object, where the graphical representation of the physical account object corresponds to a graphical representation of the transfer account that is displayed in an electronic wallet application of the electronic device.

2722
In response to detecting the input corresponding to selection of the affordance, automatically, without further user input, initiate a process for enabling the physical account object to be used to authorize transfers using the transfer account.

2724
Prior to initiating the process for enabling the physical account object to be used to authorize transactions using the transfer account in response to detecting the input corresponding to selection of the affordance, the physical account object is disabled from being used to authorize transactions using the transfer account.

Figure 27C:
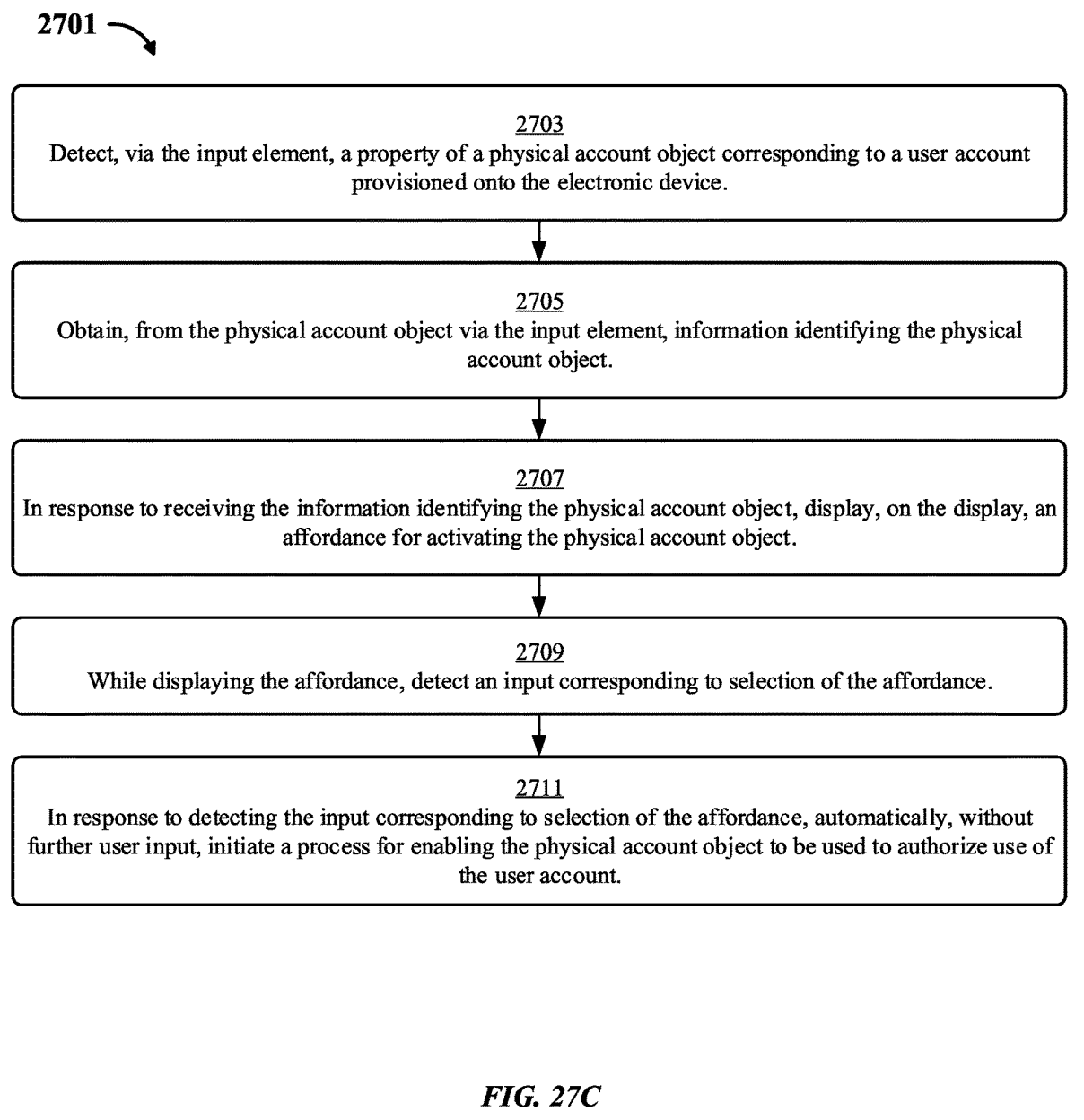

2703
Detect, via the input element, a property of a physical account object corresponding to a user account provisioned onto the electronic device.

2705
Obtain, from the physical account object via the input element, information identifying the physical account object.

2707
In response to receiving the information identifying the physical account object, display, on the display, an affordance for activating the physical account object.

2709
While displaying the affordance, detect an input corresponding to selection of the affordance.

2711
In response to detecting the input corresponding to selection of the affordance, automatically, without further user input, initiate a process for enabling the physical account object to be used to authorize use of the user account.

Figure 30A:
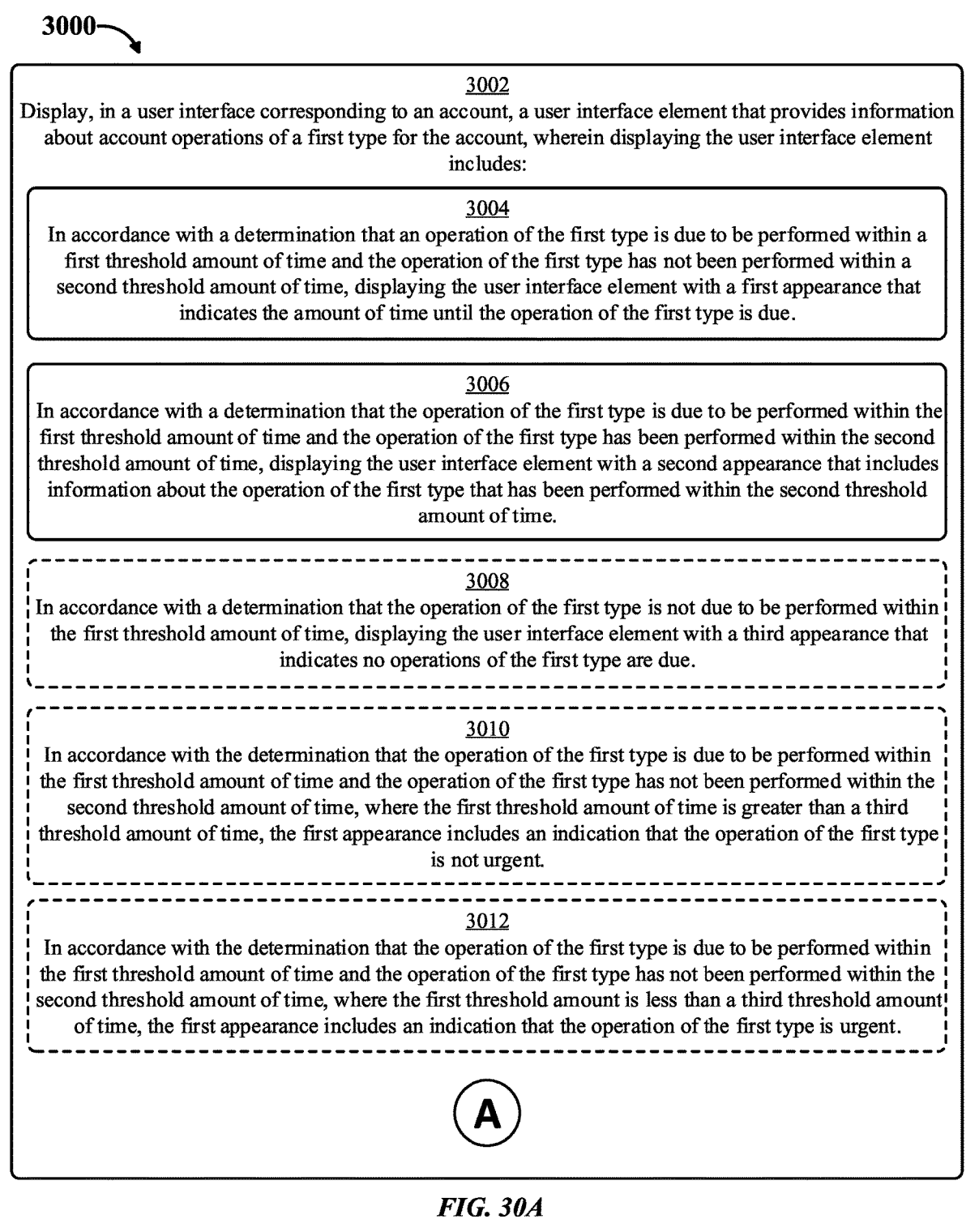

3002
Display, in a user interface corresponding to an account, a user interface element that provides information about account operations of a first type for the account, wherein displaying the user interface element includes:

3004
In accordance with a determination that an operation of the first type is due to be performed within a first threshold amount of time and the operation of the first type has not been performed within a second threshold amount of time, displaying the user interface element with a first appearance that indicates the amount of time until the operation of the first type is due.

3006
In accordance with a determination that the operation of the first type is due to be performed within the first threshold amount of time and the operation of the first type has been performed within the second threshold amount of time, displaying the user interface element with a second appearance that includes information about the operation of the first type that has been performed within the second threshold amount of time.

3008
In accordance with a determination that the operation of the first type is not due to be performed within the first threshold amount of time, displaying the user interface element with a third appearance that indicates no operations of the first type are due.

3010
In accordance with the determination that the operation of the first type is due to be performed within the first threshold amount of time and the operation of the first type has not been performed within the second threshold amount of time, where the first threshold amount of time is greater than a third threshold amount of time, the first appearance includes an indication that the operation of the first type is not urgent.

3012
In accordance with the determination that the operation of the first type is due to be performed within the first threshold amount of time and the operation of the first type has not been performed within the second threshold amount of time, where the first threshold amount is less than a third threshold amount of time, the first appearance includes an indication that the operation of the first type is urgent.

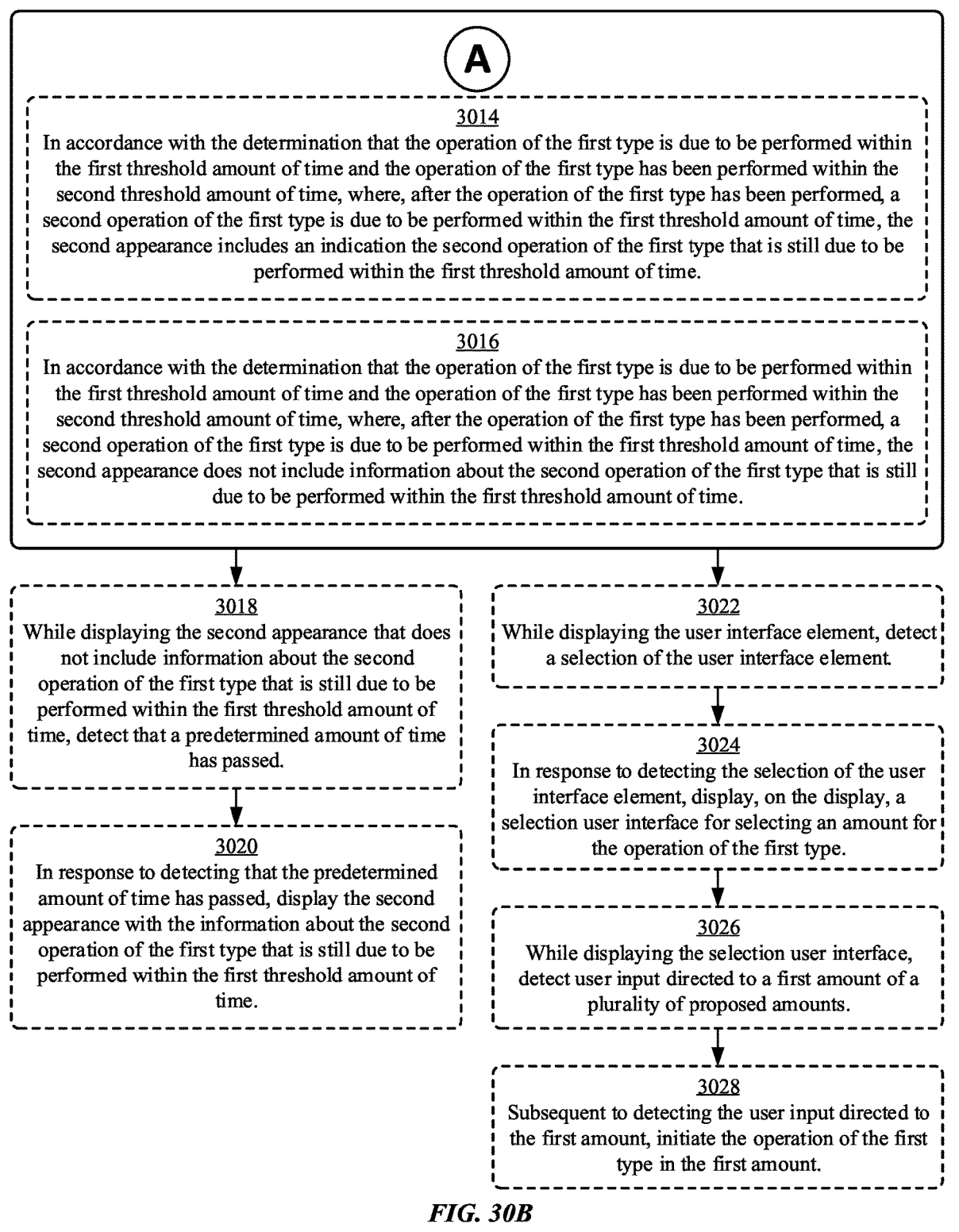

3014
In accordance with the determination that the operation of the first type is due to be performed within the first threshold amount of time and the operation of the first type has been performed within the second threshold amount of time, where, after the operation of the first type has been performed, a second operation of the first type is due to be performed within the first threshold amount of time, the second appearance includes an indication the second operation of the first type that is still due to be performed within the first threshold amount of time.

3016
In accordance with the determination that the operation of the first type is due to be performed within the first threshold amount of time and the operation of the first type has been performed within the second threshold amount of time, where, after the operation of the first type has been performed, a second operation of the first type is due to be performed within the first threshold amount of time, the second appearance does not include information about the second operation of the first type that is still due to be performed within the first threshold amount of time.

3018
While displaying the second appearance that does not include information about the second operation of the first type that is still due to be performed within the first threshold amount of time, detect that a predetermined amount of time has passed.

3020
In response to detecting that the predetermined amount of time has passed, display the second appearance with the information about the second operation of the first type that is still due to be performed within the first threshold amount of time.

3022
While displaying the user interface element, detect a selection of the user interface element.

3024
In response to detecting the selection of the user interface element, display, on the display, a selection user interface for selecting an amount for the operation of the first type.

3026
While displaying the selection user interface, detect user input directed to a first amount of a plurality of proposed amounts.

3028
Subsequent to detecting the user input directed to the first amount, initiate the operation of the first type in the first amount.

*FIG. 30B*

USER INTERFACES FOR MANAGING AN ACCOUNT

CROSS-REFERENCE TO RELATED APPLICATIONS

This application is a continuation of U.S. application Ser. No. 16/549,862, entitled "USER INTERFACES FOR MANAGING AN ACCOUNT," filed Aug. 23, 2019 which claims priority to U.S. Provisional Application Ser. No. 62/822,964, entitled "USER INTERFACES FOR MANAGING AN ACCOUNT," filed Mar. 24, 2019, and to U.S. Provisional Application Ser. No. 62/855,588, entitled "USER INTERFACES FOR MANAGING AN ACCOUNT," filed May 31, 2019. The contents of these applications are hereby incorporated by reference in their entireties.

FIELD

The present disclosure relates generally to computer user interfaces, and more specifically to user interfaces for managing an account.

BACKGROUND

Electronic devices can be used to manage accounts provisioned on the electronic device. Various features of an account can be controlled, performed, or managed using an electronic device.

BRIEF SUMMARY

Some techniques for managing an account using electronic devices, however, are generally cumbersome and inefficient. For example, some existing techniques require the use of certain applications that may not be commonly used by a user of a device, which may unnecessarily cause the user to open a seldom-used application or navigate a seldom-used interface. For another example, some existing techniques provide limited options to easily and conveniently manage transfers. For another example, some existing techniques use a complex and time-consuming user interface, which may include multiple key presses or keystrokes. As such, existing techniques require more time than necessary, wasting user time and device energy. This latter consideration is particularly important in battery-operated devices.

Accordingly, the present technique provides electronic devices with faster, more efficient methods and interfaces for managing an account. Such methods and interfaces optionally complement or replace other methods for managing an account. Such methods and interfaces reduce the cognitive burden on a user and produce a more efficient human-machine interface. For battery-operated computing devices, such methods and interfaces conserve power and increase the time between battery charges. Such methods and interfaces also reduce the number of unnecessary, extraneous, or repetitive inputs required at computing devices, such as smartphones and smartwatches.

In accordance with some embodiments, a method performed at an electronic device with a display and one or more input devices is described. The method comprises: displaying, on the display, a user interface including a first affordance for activating a user account; while displaying the first affordance for activating the user account, detecting, via the one or more input devices, user activation of the first affordance; in response to detecting the user activation of the first affordance, transmitting a request to create the user account; subsequent to transmitting the request, receiving a communication indicating that the user account is available for use; and in response to receiving the communication indicating that the user account is available for use, displaying, on the display, a second affordance for initiating a process for provisioning the electronic device with a secure credential associated with using the user account.

In accordance with some embodiments, a non-transitory computer-readable storage medium storing one or more programs configured to be executed by one or more processors of an electronic device with a display and one or more input devices is described. The one or more programs include instructions for: displaying, on the display, a user interface including a first affordance for activating a user account; while displaying the first affordance for activating the user account, detecting, via the one or more input devices, user activation of the first affordance; in response to detecting the user activation of the first affordance, transmitting a request to create the user account; subsequent to transmitting the request, receiving a communication indicating that the user account is available for use; and in response to receiving the communication indicating that the user account is available for use, displaying, on the display, a second affordance for initiating a process for provisioning the electronic device with a secure credential associated with using the user account.

In accordance with some embodiments, a transitory computer-readable storage medium storing one or more programs configured to be executed by one or more processors of an electronic device with a display and one or more input devices is described. The one or more programs include instructions for: displaying, on the display, a user interface including a first affordance for activating a user account; while displaying the first affordance for activating the user account, detecting, via the one or more input devices, user activation of the first affordance; in response to detecting the user activation of the first affordance, transmitting a request to create the user account; subsequent to transmitting the request, receiving a communication indicating that the user account is available for use; and in response to receiving the communication indicating that the user account is available for use, displaying, on the display, a second affordance for initiating a process for provisioning the electronic device with a secure credential associated with using the user account.

In accordance with some embodiments, an electronic device comprising a display, one or more input devices, one or more processors, and memory storing one or more programs configured to be executed by the one or more processors is described. The one or more programs include instructions for: displaying, on the display, a user interface including a first affordance for activating a user account; while displaying the first affordance for activating the user account, detecting, via the one or more input devices, user activation of the first affordance; in response to detecting the user activation of the first affordance, transmitting a request to create the user account; subsequent to transmitting the request, receiving a communication indicating that the user account is available for use; and in response to receiving the communication indicating that the user account is available for use, displaying, on the display, a second affordance for initiating a process for provisioning the electronic device with a secure credential associated with using the user account.

In accordance with some embodiments, an electronic device is described. The electronics device comprises a display; one or more input devices; means for displaying, on the display, a user interface including a first affordance for activating a user account; means, while displaying the first affordance for activating the user account, for detecting, via the one or more input devices, user activation of the first affordance; means, in response to detecting the user activation of the first affordance, for transmitting a request to create the user account; means, subsequent to transmitting the request, for receiving a communication indicating that the user account is available for use; and means, in response to receiving the communication indicating that the user account is available for use, for displaying, on the display, a second affordance for initiating a process for provisioning the electronic device with a secure credential associated with using the user account.

In accordance with some embodiments, a method performed at an electronic device with a display and one or more input devices is described. The method comprises: displaying, on the display, a user interface including a first affordance for activating a transfer account; while displaying the first affordance for activating the transfer account, detecting, via the one or more input devices, user activation of the first affordance; in response to detecting the user activation of the first affordance, transmitting a request to create the transfer account; subsequent to transmitting the request, receiving a communication indicating that the transfer account is available for use; and in response to receiving the communication indicating that the transfer account is available for use, displaying, on the display, a second affordance for initiating a process for provisioning the electronic device with a secure credential associated with making transfers using the transfer account.

In accordance with some embodiments, a non-transitory computer-readable storage medium storing one or more programs configured to be executed by one or more processors of an electronic device with a display and one or more input devices is described. The one or more programs include instructions for: displaying, on the display, a user interface including a first affordance for activating a transfer account; while displaying the first affordance for activating the transfer account, detecting, via the one or more input devices, user activation of the first affordance; in response to detecting the user activation of the first affordance, transmitting a request to create the transfer account; subsequent to transmitting the request, receiving a communication indicating that the transfer account is available for use; and in response to receiving the communication indicating that the transfer account is available for use, displaying, on the display, a second affordance for initiating a process for provisioning the electronic device with a secure credential associated with making transfers using the transfer account.

In accordance with some embodiments, a transitory computer-readable storage medium storing one or more programs configured to be executed by one or more processors of an electronic device with a display and one or more input devices is described. The one or more programs include instructions for: displaying, on the display, a user interface including a first affordance for activating a transfer account; while displaying the first affordance for activating the transfer account, detecting, via the one or more input devices, user activation of the first affordance; in response to detecting the user activation of the first affordance, transmitting a request to create the transfer account; subsequent to transmitting the request, receiving a communication indicating that the transfer account is available for use; and in response to receiving the communication indicating that the transfer account is available for use, displaying, on the display, a second affordance for initiating a process for provisioning the electronic device with a secure credential associated with making transfers using the transfer account.

In accordance with some embodiments, an electronic device comprising a display, one or more input devices, one or more processors, and memory storing one or more programs configured to be executed by the one or more processors is described. The one or more programs include instructions for: displaying, on the display, a user interface including a first affordance for activating a transfer account; while displaying the first affordance for activating the transfer account, detecting, via the one or more input devices, user activation of the first affordance; in response to detecting the user activation of the first affordance, transmitting a request to create the transfer account; subsequent to transmitting the request, receiving a communication indicating that the transfer account is available for use; and in response to receiving the communication indicating that the transfer account is available for use, displaying, on the display, a second affordance for initiating a process for provisioning the electronic device with a secure credential associated with making transfers using the transfer account.

In accordance with some embodiments, an electronic device is described. The electronics device comprises a display; one or more input devices; means for displaying, on the display, a user interface including a first affordance for activating a transfer account; means, while displaying the first affordance for activating the transfer account, for detecting, via the one or more input devices, user activation of the first affordance; means, in response to detecting the user activation of the first affordance, for transmitting a request to create the transfer account; means, subsequent to transmitting the request, for receiving a communication indicating that the transfer account is available for use; and means, in response to receiving the communication indicating that the transfer account is available for use, for displaying, on the display, a second affordance for initiating a process for provisioning the electronic device with a secure credential associated with making transfers using the transfer account.

In accordance with some embodiments, a method performed at an electronic device with a display is described. The method comprises: displaying, on the display, a first user interface corresponding to a user account associated with a use quota, wherein the first user interface includes: a first user interface element that includes a first graphical representation of a plurality of past uses of the user account, and a second user interface element that includes information related to restoring at least a portion of the use quota of the user account; while displaying the first user interface, detecting a user input; and in response to detecting the user input: in accordance with a determination that the user input is directed to the first user interface element, displaying, on the display, a second user interface that includes: a first group item that includes information summarizing a plurality of past uses of the user account related to a first category, and a second group item that includes information summarizing a plurality of past uses of the user account related to a second category that is different from the first category; and in accordance with a determination that the user input is directed to the second user interface element, displaying, on the display, a third user interface that includes: an option to restore the portion of the use quota of the user account.

In accordance with some embodiments, a non-transitory computer-readable storage medium storing one or more programs configured to be executed by one or more processors of an electronic device with a display is described. The one or more programs include instructions for: displaying, on the display, a first user interface corresponding to a user account associated with a use quota, wherein the first user interface includes: a first user interface element that includes a first graphical representation of a plurality of past uses of the user account, and a second user interface element that includes information related to restoring at least a portion of the use quota of the user account; while displaying the first user interface, detecting a user input; and in response to detecting the user input: in accordance with a determination that the user input is directed to the first user interface element, displaying, on the display, a second user interface that includes: a first group item that includes information summarizing a plurality of past uses of the user account related to a first category, and a second group item that includes information summarizing a plurality of past uses of the user account related to a second category that is different from the first category; and in accordance with a determination that the user input is directed to the second user interface element, displaying, on the display, a third user interface that includes: an option to restore the portion of the use quota of the user account.

In accordance with some embodiments, a transitory computer-readable storage medium storing one or more programs configured to be executed by one or more processors of an electronic device with a display is described. The one or more programs include instructions for: displaying, on the display, a first user interface corresponding to a user account associated with a use quota, wherein the first user interface includes: a first user interface element that includes a first graphical representation of a plurality of past uses of the user account, and a second user interface element that includes information related to restoring at least a portion of the use quota of the user account; while displaying the first user interface, detecting a user input; and in response to detecting the user input: in accordance with a determination that the user input is directed to the first user interface element, displaying, on the display, a second user interface that includes: a first group item that includes information summarizing a plurality of past uses of the user account related to a first category, and a second group item that includes information summarizing a plurality of past uses of the user account related to a second category that is different from the first category; and in accordance with a determination that the user input is directed to the second user interface element, displaying, on the display, a third user interface that includes: an option to restore the portion of the use quota of the user account.

In accordance with some embodiments, an electronic device comprising a display, one or more processors, and memory storing one or more programs configured to be executed by the one or more processors is described. The one or more programs include instructions for: displaying, on the display, a first user interface corresponding to a user account associated with a use quota, wherein the first user interface includes: a first user interface element that includes a first graphical representation of a plurality of past uses of the user account, and a second user interface element that includes information related to restoring at least a portion of the use quota of the user account; while displaying the first user interface, detecting a user input; and in response to detecting the user input: in accordance with a determination that the user input is directed to the first user interface element, displaying, on the display, a second user interface that includes: a first group item that includes information summarizing a plurality of past uses of the user account related to a first category, and a second group item that includes information summarizing a plurality of past uses of the user account related to a second category that is different from the first category; and in accordance with a determination that the user input is directed to the second user interface element, displaying, on the display, a third user interface that includes: an option to restore the portion of the use quota of the user account.

In accordance with some embodiments, an electronic device is described. The electronics device comprises a display; means for displaying, on the display, a first user interface corresponding to a user account associated with a use quota, wherein the first user interface includes: a first user interface element that includes a first graphical representation of a plurality of past uses of the user account, and a second user interface element that includes information related to restoring at least a portion of the use quota of the user account; means, while displaying the first user interface, for detecting a user input; and means, in response to detecting the user input, for: in accordance with a determination that the user input is directed to the first user interface element, displaying, on the display, a second user interface that includes: a first group item that includes information summarizing a plurality of past uses of the user account related to a first category, and a second group item that includes information summarizing a plurality of past uses of the user account related to a second category that is different from the first category; and in accordance with a determination that the user input is directed to the second user interface element, displaying, on the display, a third user interface that includes: an option to restore the portion of the use quota of the user account.

In accordance with some embodiments, a method performed at an electronic device with a display is described. The method comprises: displaying, on the display, a first user interface corresponding to a transfer account, wherein the first user interface includes: a first user interface element that includes a first graphical representation of a plurality of past transfers made using the transfer account, and a second user interface element that includes information related to reducing a balance of the transfer account; while displaying the first user interface, detecting a user input; and in response to detecting the user input: in accordance with a determination that the user input is directed to the first user interface element, displaying, on the display, a second user interface that includes: a first group item that includes information summarizing a plurality of past transfers of a first category, and a second group item that includes information summarizing a plurality of past transfers of a second category that is different from the first category; and in accordance with a determination that the user input is directed to the second user interface element, displaying, on the display, a third user interface that includes: an option to reduce the balance of the transfer account.

In accordance with some embodiments, a non-transitory computer-readable storage medium storing one or more programs configured to be executed by one or more processors of an electronic device with a display is described. The one or more programs include instructions for: displaying, on the display, a first user interface corresponding to a transfer account, wherein the first user interface includes: a first user interface element that includes a first graphical representation of a plurality of past transfers made using the transfer account, and a second user interface element that includes information related to reducing a balance of the transfer account; while displaying the first user interface, detecting a user input; and in response to detecting the user input: in accordance with a determination that the user input is directed to the first user interface element, displaying, on the display, a second user interface that includes: a first group item that includes information summarizing a plurality of past transfers of a first category, and a second group item that includes information summarizing a plurality of past transfers of a second category that is different from the first category; and in accordance with a determination that the user input is directed to the second user interface element, displaying, on the display, a third user interface that includes: an option to reduce the balance of the transfer account.

In accordance with some embodiments, a transitory computer-readable storage medium storing one or more programs configured to be executed by one or more processors of an electronic device with a display is described. The one or more programs include instructions for: displaying, on the display, a first user interface corresponding to a transfer account, wherein the first user interface includes: a first user interface element that includes a first graphical representation of a plurality of past transfers made using the transfer account, and a second user interface element that includes information related to reducing a balance of the transfer account; while displaying the first user interface, detecting a user input; and in response to detecting the user input: in accordance with a determination that the user input is directed to the first user interface element, displaying, on the display, a second user interface that includes: first group item that includes information summarizing a plurality of past transfers of a first category, and a second group item that includes information summarizing a plurality of past transfers of a second category that is different from the first category; and in accordance with a determination that the user input is directed to the second user interface element, displaying, on the display, a third user interface that includes: an option to reduce the balance of the transfer account.

In accordance with some embodiments, an electronic device comprising a display, one or more processors, and memory storing one or more programs configured to be executed by the one or more processors is described. The one or more programs include instructions for: displaying, on the display, a first user interface corresponding to a transfer account, wherein the first user interface includes: a first user interface element that includes a first graphical representation of a plurality of past transfers made using the transfer account, and a second user interface element that includes information related to reducing a balance of the transfer account; while displaying the first user interface, detecting a user input; and in response to detecting the user input: in accordance with a determination that the user input is directed to the first user interface element, displaying, on the display, a second user interface that includes: a first group item that includes information summarizing a plurality of past transfers of a first category, and a second group item that includes information summarizing a plurality of past transfers of a second category that is different from the first category; and in accordance with a determination that the user input is directed to the second user interface element, displaying, on the display, a third user interface that includes: an option to reduce the balance of the transfer account.

In accordance with some embodiments, an electronic device is described. The electronics device comprises a display; means for displaying, on the display, a first user interface corresponding to a transfer account, wherein the first user interface includes: a first user interface element that includes a first graphical representation of a plurality of past transfers made using the transfer account, and a second user interface element that includes information related to reducing a balance of the transfer account; means, while displaying the first user interface, for detecting a user input; and means, in response to detecting the user input, for: in accordance with a determination that the user input is directed to the first user interface element, displaying, on the display, a second user interface that includes: a first group item that includes information summarizing a plurality of past transfers of a first category, and a second group item that includes information summarizing a plurality of past transfers of a second category that is different from the first category; and in accordance with a determination that the user input is directed to the second user interface element, displaying, on the display, a third user interface that includes: an option to reduce the balance of the transfer account.

In accordance with some embodiments, a method performed at an electronic device with a display is described. The method comprises: displaying, on the display, a graphical representation of a user account that is associated with an activity of a first type and an activity of a second type, wherein in the graphical representation of the user account: the activity of the first type is represented by a first set of one or more regions having a first color range, wherein the first set of one or more regions has a first shape; and the activity of the second type is represented by a second set of one or more regions having a second color range that is different from the first color range, wherein the second set of one or more regions has a second shape that is different from the first shape; while displaying the graphical representation of the user account, detecting an input directed to the graphical representation of the user account, wherein the input has an associated direction; and in response to detecting the input directed to the graphical representation of the user account: changing a shape and position of the first set of one or more regions based on the direction of the input from the first shape to a third shape that is different from the first shape and the second shape; and changing a shape and position of the second set of one or more regions based on the direction of the input from the second shape to a fourth shape that is different from the first shape, the second shape, and the third shape.

In accordance with some embodiments, a non-transitory computer-readable storage medium storing one or more programs configured to be executed by one or more processors of an electronic device with a display is described. The one or more programs include instructions for: displaying, on the display, a graphical representation of a user account that is associated with an activity of a first type and an activity of a second type, wherein in the graphical representation of the user account: the activity of the first type is represented by a first set of one or more regions having a first color range, wherein the first set of one or more regions has a first shape; and the activity of the second type is represented by a second set of one or more regions having a second color range that is different from the first color range, wherein the second set of one or more regions has a second shape that is different from the first shape; while displaying the graphical representation of the user account, detecting an input directed to the graphical representation of the user account, wherein the input has an associated direction; and in response to detecting the input directed to the graphical representation of the user account: changing a shape and position of the first set of one or more regions based on the direction of the input from the first shape to a third shape that is different from the first shape and the second shape; and changing a shape and position of the second set of one or more regions based on the direction of the input from the second shape to a fourth shape that is different from the first shape, the second shape, and the third shape.

In accordance with some embodiments, a transitory computer-readable storage medium storing one or more programs configured to be executed by one or more processors of an electronic device with a display is described. The one or more programs include instructions for: displaying, on the display, a graphical representation of a user account that is associated with an activity of a first type and an activity of a second type, wherein in the graphical representation of the user account: the activity of the first type is represented by a first set of one or more regions having a first color range, wherein the first set of one or more regions has a first shape; and the activity of the second type is represented by a second set of one or more regions having a second color range that is different from the first color range, wherein the second set of one or more regions has a second shape that is different from the first shape; while displaying the graphical representation of the user account, detecting an input directed to the graphical representation of the user account, wherein the input has an associated direction; and in response to detecting the input directed to the graphical representation of the user account; changing a shape and position of the first set of one or more regions based on the direction of the input from the first shape to a third shape that is different from the first shape and the second shape; and changing a shape and position of the second set of one or more regions based on the direction of the input from the second shape to a fourth shape that is different from the first shape, the second shape, and the third shape.

In accordance with some embodiments, an electronics device comprising a display, one or more processors, and memory storing one or more programs configured to be executed by the one or more processors is described. The one or more programs include instructions for: displaying, on the display, a graphical representation of a user account that is associated with an activity of a first type and an activity of a second type, wherein in the graphical representation of the user account: the activity of the first type is represented by a first set of one or more regions having a first color range, wherein the first set of one or more regions has a first shape; and the activity of the second type is represented by a second set of one or more regions having a second color range that is different from the first color range, wherein the second set of one or more regions has a second shape that is different from the first shape; while displaying the graphical representation of the user account, detecting an input directed to the graphical representation of the user account, wherein the input has an associated direction; and in response to detecting the input directed to the graphical representation of the user account: changing a shape and position of the first set of one or more regions based on the direction of the input from the first shape to a third shape that is different from the first shape and the second shape; and changing a shape and position of the second set of one or more regions based on the direction of the input from the second shape to a fourth shape that is different from the first shape, the second shape, and the third shape.

In accordance with some embodiments, an electronics device is described. The electronic device comprises: a display; means for displaying, on the display, a graphical representation of a user account that is associated with an activity of a first type and an activity of a second type, wherein in the graphical representation of the user account: the activity of the first type is represented by a first set of one or more regions having a first color range, wherein the first set of one or more regions has a first shape; and the activity of the second type is represented by a second set of one or more regions having a second color range that is different from the first color range, wherein the second set of one or more regions has a second shape that is different from the first shape; means, while displaying the graphical representation of the user account, for detecting an input directed to the graphical representation of the user account, wherein the input has an associated direction; and means, in response to detecting the input directed to the graphical representation of the user account, for: changing a shape and position of the first set of one or more regions based on the direction of the input from the first shape to a third shape that is different from the first shape and the second shape; and changing a shape and position of the second set of one or more regions based on the direction of the input from the second shape to a fourth shape that is different from the first shape, the second shape, and the third shape.

In accordance with some embodiments, a method performed at an electronic device with a display is described. The method comprises: displaying, on the display, a graphical representation of a transfer account that is associated with a plurality of transfers of a first type and a plurality of transfers of a second type, wherein in the graphical representation of the transfer account: transfers of the first type are represented by a first set of one or more regions having a first color range, wherein the first set of one or more regions has a first shape; and transfers of the second type are represented by a second set of one or more regions having a second color range that is different from the first color range, wherein the second set of one or more regions has a second shape that is different from the first shape; while displaying the graphical representation of the transfer account, detecting an input directed to the graphical representation of the transfer account, wherein the input has an associated direction; and in response to detecting the input directed to the graphical representation of the transfer account: changing a shape and position of the first set of one or more regions based on the direction of the input from the first shape to a third shape that is different from the first shape and the second shape; and changing a shape and position of the second set of one or more regions based on the direction of the input from the second shape to a fourth shape that is different from the first shape, the second shape, and the third shape.

In accordance with some embodiments, a non-transitory computer-readable storage medium storing one or more programs configured to be executed by one or more processors of an electronic device with a display is described. The one or more programs include instructions for: displaying, on the display, a graphical representation of a transfer account that is associated with a plurality of transfers of a first type and a plurality of transfers of a second type, wherein in the graphical representation of the transfer account: transfers of the first type are represented by a first set of one or more regions having a first color range, wherein the first set of one or more regions has a first shape; and transfers of the second type are represented by a second set of one or more regions having a second color range that is different from the first color range, wherein the second set of one or more regions has a second shape that is different from the first shape; while displaying the graphical representation of the transfer account, detecting an input directed to the graphical representation of the transfer account, wherein the input has an associated direction; and in response to detecting the input directed to the graphical representation of the transfer account: changing a shape and position of the first set of one or more regions based on the direction of the input from the first shape to a third shape that is different from the first shape and the second shape; and changing a shape and position of the second set of one or more regions based on the direction of the input from the second shape to a fourth shape that is different from the first shape, the second shape, and the third shape.

In accordance with some embodiments, a transitory computer-readable storage medium storing one or more programs configured to be executed by one or more processors of an electronic device with a display is described. The one or more programs include instructions for: displaying, on the display, a graphical representation of a transfer account that is associated with a plurality of transfers of a first type and a plurality of transfers of a second type, wherein in the graphical representation of the transfer account: transfers of the first type are represented by a first set of one or more regions having a first color range, wherein the first set of one or more regions has a first shape; and transfers of the second type are represented by a second set of one or more regions having a second color range that is different from the first color range, wherein the second set of one or more regions has a second shape that is different from the first shape; while displaying the graphical representation of the transfer account, detecting an input directed to the graphical representation of the transfer account, wherein the input has an associated direction; and in response to detecting the input directed to the graphical representation of the transfer account: changing a shape and position of the first set of one or more regions based on the direction of the input from the first shape to a third shape that is different from the first shape and the second shape; and changing a shape and position of the second set of one or more regions based on the direction of the input from the second shape to a fourth shape that is different from the first shape, the second shape, and the third shape.

In accordance with some embodiments, an electronics device comprising a display, one or more processors, and memory storing one or more programs configured to be executed by the one or more processors is described. The one or more programs include instructions for: displaying, on the display, a graphical representation of a transfer account that is associated with a plurality of transfers of a first type and a plurality of transfers of a second type, wherein in the graphical representation of the transfer account: transfers of the first type are represented by a first set of one or more regions having a first color range, wherein the first set of one or more regions has a first shape; and transfers of the second type are represented by a second set of one or more regions having a second color range that is different from the first color range, wherein the second set of one or more regions has a second shape that is different from the first shape; while displaying the graphical representation of the transfer account, detecting an input directed to the graphical representation of the transfer account, wherein the input has an associated direction; and in response to detecting the input directed to the graphical representation of the transfer account; changing a shape and position of the first set of one or more regions based on the direction of the input from the first shape to a third shape that is different from the first shape and the second shape; and changing a shape and position of the second set of one or more regions based on the direction of the input from the second shape to a fourth shape that is different from the first shape, the second shape, and the third shape.

In accordance with some embodiments, an electronics device is described. The electronic device comprises: a display; means for displaying, on the display, a graphical representation of a transfer account that is associated with a plurality of transfers of a first type and a plurality of transfers of a second type, wherein in the graphical representation of the transfer account: transfers of the first type are represented by a first set of one or more regions having a first color range, wherein the first set of one or more regions has a first shape; and transfers of the second type are represented by a second set of one or more regions having a second color range that is different from the first color range, wherein the second set of one or more regions has a second shape that is different from the first shape; means, while displaying the graphical representation of the transfer account, for detecting an input directed to the graphical representation of the transfer account, wherein the input has an associated direction; and means, in response to detecting the input directed to the graphical representation of the transfer account, for: changing a shape and position of the first set of one or more regions based on the direction of the input from the first shape to a third shape that is different from the first shape and the second shape; and changing a shape and position of the second set of one or more regions based on the direction of the input from the second shape to a fourth shape that is different from the first shape, the second shape, and the third shape.

In accordance with some embodiments, a method performed at an electronic device with a display and one or more input devices is described. The method comprises: displaying, on the display, a user interface corresponding to a user account, wherein the user interface includes: a plurality of user interface objects corresponding to past activity using the user account, an indication of a first common characteristic of the past activity, and an affordance to initiate tracking of activity that shares the first common characteristic; detecting a selection of the affordance to initiate the tracking of activity that shares the first common characteristic; and in response to detecting the selection of the affordance, initiating a process for adding a tracking category that tracks activity that shares the first common characteristic.

In accordance with some embodiments, a non-transitory computer-readable storage medium storing one or more programs configured to be executed by one or more processors of an electronic device with a display and one or more input devices is described. The one or more programs include instructions for: displaying, on the display, a user interface corresponding to a user account, wherein the user interface includes: a plurality of user interface objects corresponding to past activity using the user account, an indication of a first common characteristic of the past activity, and an affordance to initiate tracking of activity that shares the first common characteristic; detecting a selection of the affordance to initiate the tracking of activity that shares the first common characteristic; and in response to detecting the selection of the affordance, initiating a process for adding a tracking category that tracks activity that shares the first common characteristic.

In accordance with some embodiments, a transitory computer-readable storage medium storing one or more programs configured to be executed by one or more processors of an electronic device with a display and one or more input devices is described. The one or more programs include instructions for: displaying, on the display, a user interface corresponding to a user account, wherein the user interface includes: a plurality of user interface objects corresponding to past activity using the user account, an indication of a first common characteristic of the past activity, and an affordance to initiate tracking of activity that shares the first common characteristic; detecting a selection of the affordance to initiate the tracking of activity that shares the first common characteristic; and in response to detecting the selection of the affordance, initiating a process for adding a tracking category that tracks activity that shares the first common characteristic.

In accordance with some embodiments, an electronic device comprising a display, one or more input devices, one or more processors, and memory storing one or more programs configured to be executed by the one or more processors is described. The one or more programs include instructions for: displaying, on the display, a user interface corresponding to a user account, wherein the user interface includes: a plurality of user interface objects corresponding to past activity using the user account, an indication of a first common characteristic of the past activity, and an affordance to initiate tracking of activity that shares the first common characteristic; detecting a selection of the affordance to initiate the tracking of activity that shares the first common characteristic; and in response to detecting the selection of the affordance, initiating a process for adding a tracking category that tracks activity that shares the first common characteristic.

In accordance with some embodiments, an electronics device is described. The electronic device comprises: a display; one or more input devices; means for displaying, on the display, a user interface corresponding to a user account, wherein the user interface includes: a plurality of user interface objects corresponding to past activity using the user account, an indication of a first common characteristic of the past activity, and an affordance to initiate tracking of activity that shares the first common characteristic; means for detecting a selection of the affordance to initiate the tracking of activity that shares the first common characteristic; and means, in response to detecting the selection of the affordance, for initiating a process for adding a tracking category that tracks activity that shares the first common characteristic.

In accordance with some embodiments, a method performed at an electronic device with a display and one or more input devices is described. The method comprises: displaying, on the display, a user interface corresponding to a transfer account, wherein the user interface includes: a plurality of transfer items corresponding to past transfers made using the transfer account, an indication of a first common characteristic of the past transfers, and an affordance to initiate tracking of transfers that share the first common characteristic; detecting a selection of the affordance to initiate the tracking of transfers that share the first common characteristic; and in response to detecting the selection of the affordance, initiating a process for adding a tracking category that tracks transfers that share the first common characteristic.

In accordance with some embodiments, a non-transitory computer-readable storage medium storing one or more programs configured to be executed by one or more processors of an electronic device with a display and one or more input devices is described. The one or more programs include instructions for: displaying, on the display, a user interface corresponding to a transfer account, wherein the user interface includes: a plurality of transfer items corresponding to past transfers made using the transfer account, an indication of a first common characteristic of the past transfers, and an affordance to initiate tracking of transfers that share the first common characteristic; detecting a selection of the affordance to initiate the tracking of transfers that share the first common characteristic; and in response to detecting the selection of the affordance, initiating a process for adding a tracking category that tracks transfers that share the first common characteristic.

In accordance with some embodiments, a transitory computer-readable storage medium storing one or more programs configured to be executed by one or more processors of an electronic device with a display and one or more input devices is described. The one or more programs include instructions for: displaying, on the display, a user interface corresponding to a transfer account, wherein the user interface includes: a plurality of transfer items corresponding to past transfers made using the transfer account, an indication of a first common characteristic of the past transfers, and an affordance to initiate tracking of transfers that share the first common characteristic; detecting a selection of the affordance to initiate the tracking of transfers that share the first common characteristic; and in response to detecting the selection of the affordance, initiating a process for adding a tracking category that tracks transfers that share the first common characteristic.

In accordance with some embodiments, an electronic device comprising a display, one or more input devices, one or more processors, and memory storing one or more programs configured to be executed by the one or more processors is described. The one or more programs include instructions for: displaying, on the display, a user interface corresponding to a transfer account, wherein the user interface includes: a plurality of transfer items corresponding to past transfers made using the transfer account, an indication of a first common characteristic of the past transfers, and an affordance to initiate tracking of transfers that share the first common characteristic; detecting a selection of the affordance to initiate the tracking of transfers that share the first common characteristic; and in response to detecting the selection of the affordance, initiating a process for adding a tracking category that tracks transfers that share the first common characteristic.

In accordance with some embodiments, an electronics device is described. The electronic device comprises: a display; one or more input devices; means for displaying, on the display, a user interface corresponding to a transfer account, wherein the user interface includes: a plurality of transfer items corresponding to past transfers made using the transfer account, an indication of a first common characteristic of the past transfers, and an affordance to initiate tracking of transfers that share the first common characteristic; means for detecting a selection of the affordance to initiate the tracking of transfers that share the first common characteristic; and means, in response to detecting the selection of the affordance, for initiating a process for adding a tracking category that tracks transfers that share the first common characteristic.

In accordance with some embodiments, a method performed at an electronic device with a display and one or more input devices is described. The method comprises: displaying, on the display, a selection user interface for selecting a numerical value, wherein the selection user interface includes: a plurality of indicators corresponding to numerical values, including: a first indicator corresponding to a first numerical value, and a second indicator corresponding to a second numerical value, and a selection indicator for moving among the plurality of indicators; while displaying the selection user interface, detecting, via the one or more input devices, a user input directed to the selection user interface; and in response to detecting the user input directed to the selection user interface: in accordance with a determination that the user input caused the selection indicator to transition to a location corresponding to the first indicator, displaying, on the display, an amount corresponding to the first numerical value; in accordance with a determination that the user input caused the selection indicator to transition to a location corresponding to the second indicator, displaying, on the display, an amount corresponding to the second numerical value; and in accordance with a determination that the user input caused the selection indicator to transition to a location that does not correspond to an indicator of the plurality of indicators, displaying, on the display, a third numerical value based on the location of the selection indicator that does not correspond to an indicator of the plurality of indicators.

In accordance with some embodiments, a non-transitory computer-readable storage medium storing one or more programs configured to be executed by one or more processors of an electronic device with a display and one or more input devices is described. The one or more programs include instructions for: displaying, on the display, a selection user interface for selecting a numerical value, wherein the selection user interface includes: a plurality of indicators corresponding to numerical values, including: a first indicator corresponding to a first numerical value, and a second indicator corresponding to a second numerical value, and a selection indicator for moving among the plurality of indicators; while displaying the selection user interface, detecting, via the one or more input devices, a user input directed to the selection user interface; and in response to detecting the user input directed to the selection user interface: in accordance with a determination that the user input caused the selection indicator to transition to a location corresponding to the first indicator, displaying, on the display, an amount corresponding to the first numerical value; in accordance with a determination that the user input caused the selection indicator to transition to a location corresponding to the second indicator, displaying, on the display, an amount corresponding to the second numerical value; and in accordance with a determination that the user input caused the selection indicator to transition to a location that does not correspond to an indicator of the plurality of indicators, displaying, on the display, a third numerical value based on the location of the selection indicator that does not correspond to an indicator of the plurality of indicators.

In accordance with some embodiments, a transitory computer-readable storage medium storing one or more programs configured to be executed by one or more processors of an electronic device with a display and one or more input devices is described. The one or more programs include instructions for: displaying, on the display, a selection user interface for selecting a numerical value, wherein the selection user interface includes: a plurality of indicators corresponding to numerical values, including: a first indicator corresponding to a first numerical value, and a second indicator corresponding to a second numerical value, and a selection indicator for moving among the plurality of indicators; while displaying the selection user interface, detecting, via the one or more input devices, a user input directed to the selection user interface; and in response to detecting the user input directed to the selection user interface: in accordance with a determination that the user input caused the selection indicator to transition to a location corresponding to the first indicator, displaying, on the display, an amount corresponding to the first numerical value; in accordance with a determination that the user input caused the selection indicator to transition to a location corresponding to the second indicator, displaying, on the display, an amount corresponding to the second numerical value; and in accordance with a determination that the user input caused the selection indicator to transition to a location that does not correspond to an indicator of the plurality of indicators, displaying, on the display, a third numerical value based on the location of the selection indicator that does not correspond to an indicator of the plurality of indicators.

In accordance with some embodiments, an electronic device comprising a display, one or more input devices, one or more processors, and memory storing one or more programs configured to be executed by the one or more processors is described. The one or more programs include instructions for: displaying, on the display, a selection user interface for selecting a numerical value, wherein the selection user interface includes: a plurality of indicators corresponding to numerical values, including: a first indicator corresponding to a first numerical value, and a second indicator corresponding to a second numerical value, and a selection indicator for moving among the plurality of indicators; while displaying the selection user interface, detecting, via the one or more input devices, a user input directed to the selection user interface; and in response to detecting the user input directed to the selection user interface: in accordance with a determination that the user input caused the selection indicator to transition to a location corresponding to the first indicator, displaying, on the display, an amount corresponding to the first numerical value; in accordance with a determination that the user input caused the selection indicator to transition to a location corresponding to the second indicator, displaying, on the display, an amount corresponding to the second numerical value; and in accordance with a determination that the user input caused the selection indicator to transition to a location that does not correspond to an indicator of the plurality of indicators, displaying, on the display, a third numerical value based on the location of the selection indicator that does not correspond to an indicator of the plurality of indicators.

In accordance with some embodiments, an electronic device is described. The electronic device comprises: a display; one or more input devices; means for displaying, on the display, a selection user interface for selecting a numerical value, wherein the selection user interface includes: a plurality of indicators corresponding to numerical values, including: a first indicator corresponding to a first numerical value, and a second indicator corresponding to a second numerical value, and a selection indicator for moving among the plurality of indicators; means, while displaying the selection user interface, for detecting, via the one or more input devices, a user input directed to the selection user interface; and means, in response to detecting the user input directed to the selection user interface, for: in accordance with a determination that the user input caused the selection indicator to transition to a location corresponding to the first indicator, displaying, on the display, an amount corresponding to the first numerical value; in accordance with a determination that the user input caused the selection indicator to transition to a location corresponding to the second indicator, displaying, on the display, an amount corresponding to the second numerical value; and in accordance with a determination that the user input caused the selection indicator to transition to a location that does not correspond to an indicator of the plurality of indicators, displaying, on the display, a third numerical value based on the location of the selection indicator that does not correspond to an indicator of the plurality of indicators.

In accordance with some embodiments, a method performed at an electronic device with a display and one or more input devices is described. The method comprises: displaying, on the display, a user interface corresponding to a user account, wherein a device-specific authentication process is used to enable use of the user account; while displaying the user interface, detecting, via the one or more input devices, input requesting an authentication credential corresponding to the user account; in response to detecting the input, displaying, on the display, a first authentication credential corresponding to the user account, wherein the first authentication credential is valid to use the user account for uses that do not use the device-specific authentication process; subsequent to displaying the first authentication credential, receiving, via the one or more input devices, a request for a new authentication credential corresponding to the user account; and in response to receiving the request for the new authentication credential, displaying a second authentication credential that is different from the first authentication credential and is valid to use the user account for uses that do not use the device-specific authentication process, wherein the first authentication credential is no longer valid for using the user account once the second authentication credential is available for use.

In accordance with some embodiments, a non-transitory computer-readable storage medium storing one or more programs configured to be executed by one or more processors of an electronic device with a display and one or more input devices is described. The one or more programs include instructions for: displaying, on the display, a user interface corresponding to a user account, wherein a device-specific authentication process is used to enable use of the user account; while displaying the user interface, detecting, via the one or more input devices, input requesting an authentication credential corresponding to the user account; in response to detecting the input, displaying, on the display, a first authentication credential corresponding to the user account, wherein the first authentication credential is valid to use the user account for uses that do not use the device-specific authentication process; subsequent to displaying the first authentication credential, receiving, via the one or more input devices, a request for a new authentication credential corresponding to the user account; and in response to receiving the request for the new authentication credential, displaying a second authentication credential that is different from the first authentication credential and is valid to use the user account for uses that do not use the device-specific authentication process, wherein the first authentication credential is no longer valid for using the user account once the second authentication credential is available for use.

In accordance with some embodiments, a transitory computer-readable storage medium storing one or more programs configured to be executed by one or more processors of an electronic device with a display and one or more input devices is described. The one or more programs include instructions for: displaying, on the display, a user interface corresponding to a user account, wherein a device-specific authentication process is used to enable use of the user account; while displaying the user interface, detecting, via the one or more input devices, input requesting an authentication credential corresponding to the user account; in response to detecting the input, displaying, on the display, a first authentication credential corresponding to the user account, wherein the first authentication credential is valid to use the user account for uses that do not use the device-specific authentication process; subsequent to displaying the first authentication credential, receiving, via the one or more input devices, a request for a new authentication credential corresponding to the user account; and in response to receiving the request for the new authentication credential, displaying a second authentication credential that is different from the first authentication credential and is valid to use the user account for uses that do not use the device-specific authentication process, wherein the first authentication credential is no longer valid for using the user account once the second authentication credential is available for use.

In accordance with some embodiments, an electronic device comprising a display, one or more input devices, one or more processors, and memory storing one or more programs configured to be executed by the one or more processors is described. The one or more programs include instructions for: displaying, on the display, a user interface corresponding to a user account, wherein a device-specific authentication process is used to enable use of the user account; while displaying the user interface, detecting, via the one or more input devices, input requesting an authentication credential corresponding to the user account; in response to detecting the input, displaying, on the display, a first authentication credential corresponding to the user account, wherein the first authentication credential is valid to use the user account for uses that do not use the device-specific authentication process; subsequent to displaying the first authentication credential, receiving, via the one or more input devices, a request for a new authentication credential corresponding to the user account; and in response to receiving the request for the new authentication credential, displaying a second authentication credential that is different from the first authentication credential and is valid to use the user account for uses that do not use the device-specific authentication process, wherein the first authentication credential is no longer valid for using the user account once the second authentication credential is available for use.

In accordance with some embodiments, an electronic device is described. The electronic device comprises: a display; one or more input devices; means for displaying, on the display, a user interface corresponding to a user account, wherein a device-specific authentication process is used to enable use of the user account; means, while displaying the user interface, for detecting, via the one or more input devices, input requesting an authentication credential corresponding to the user account; means, in response to detecting the input, for displaying, on the display, a first authentication credential corresponding to the user account, wherein the first authentication credential is valid to use the user account for uses that do not use the device-specific authentication process; means, subsequent to displaying the first authentication credential, for receiving, via the one or more input devices, a request for a new authentication credential corresponding to the user account; and means, in response to receiving the request for the new authentication credential, for displaying a second authentication credential that is different from the first authentication credential and is valid to use the user account for uses that do not use the device-specific authentication process, wherein the first authentication credential is no longer valid for using the user account once the second authentication credential is available for use.

In accordance with some embodiments, a method performed at an electronic device with a display and one or more input devices is described. The method comprises: displaying, on the display, a user interface corresponding to a transfer account, wherein a device-specific authentication process is used to enable transfers via the transfer account; while displaying the user interface, detecting, via the one or more input devices, input requesting an authentication credential corresponding to the transfer account; in response to detecting the input, displaying, on the display, a first authentication credential corresponding to the transfer account, wherein the first authentication credential is valid for transfers that do not use the device-specific authentication process; subsequent to displaying the first authentication credential, receiving, via the one or more input devices, a request for a new authentication credential corresponding to the transfer account; and in response to receiving the request for the new authentication credential, displaying a second authentication credential that is different from the first authentication credential and is valid for transfers that do not use the device-specific authentication process, wherein the first authentication credential is no longer valid for transfers once the second authentication credential is available for use.

In accordance with some embodiments, a non-transitory computer-readable storage medium storing one or more programs configured to be executed by one or more processors of an electronic device with a display and one or more input devices is described. The one or more programs include instructions for: displaying, on the display, a user interface corresponding to a transfer account, wherein a device-specific authentication process is used to enable transfers via the transfer account; while displaying the user interface, detecting, via the one or more input devices, input requesting an authentication credential corresponding to the transfer account; in response to detecting the input, displaying, on the display, a first authentication credential corresponding to the transfer account, wherein the first authentication credential is valid for transfers that do not use the device-specific authentication process; subsequent to displaying the first authentication credential, receiving, via the one or more input devices, a request for a new authentication credential corresponding to the transfer account; and in response to receiving the request for the new authentication credential, displaying a second authentication credential that is different from the first authentication credential and is valid for transfers that do not use the device-specific authentication process, wherein the first authentication credential is no longer valid for transfers once the second authentication credential is available for use.

In accordance with some embodiments, a transitory computer-readable storage medium storing one or more programs configured to be executed by one or more processors of an electronic device with a display and one or more input devices is described. The one or more programs include instructions for: displaying, on the display, a user interface corresponding to a transfer account, wherein a device-specific authentication process is used to enable transfers via the transfer account; while displaying the user interface, detecting, via the one or more input devices, input requesting an authentication credential corresponding to the transfer account; in response to detecting the input, displaying, on the display, a first authentication credential corresponding to the transfer account, wherein the first authentication credential is valid for transfers that do not use the device-specific authentication process; subsequent to displaying the first authentication credential, receiving, via the one or more input devices, a request for a new authentication credential corresponding to the transfer account; and in response to receiving the request for the new authentication credential, displaying a second authentication credential that is different from the first authentication credential and is valid for transfers that do not use the device-specific authentication process, wherein the first authentication credential is no longer valid for transfers once the second authentication credential is available for use.

In accordance with some embodiments, an electronic device comprising a display, one or more input devices, one or more processors, and memory storing one or more programs configured to be executed by the one or more processors is described. The one or more programs include instructions for: displaying, on the display, a user interface corresponding to a transfer account, wherein a device-specific authentication process is used to enable transfers via the transfer account; while displaying the user interface, detecting, via the one or more input devices, input requesting an authentication credential corresponding to the transfer account; in response to detecting the input, displaying, on the display, a first authentication credential corresponding to the transfer account, wherein the first authentication credential is valid for transfers that do not use the device-specific authentication process; subsequent to displaying the first authentication credential, receiving, via the one or more input devices, a request for a new authentication credential corresponding to the transfer account; and in response to receiving the request for the new authentication credential, displaying a second authentication credential that is different from the first authentication credential and is valid for transfers that do not use the device-specific authentication process, wherein the first authentication credential is no longer valid for transfers once the second authentication credential is available for use.

In accordance with some embodiments, an electronic device is described. The electronic device comprises: a display; one or more input devices; means for displaying, on the display, a user interface corresponding to a transfer account, wherein a device-specific authentication process is used to enable transfers via the transfer account; means, while displaying the user interface, for detecting, via the one or more input devices, input requesting an authentication credential corresponding to the transfer account; means, in response to detecting the input, for displaying, on the display, a first authentication credential corresponding to the transfer account, wherein the first authentication credential is valid for transfers that do not use the device-specific authentication process; means, subsequent to displaying the first authentication credential, for receiving, via the one or more input devices, a request for a new authentication credential corresponding to the transfer account; and means, in response to receiving the request for the new authentication credential, for displaying a second authentication credential that is different from the first authentication credential and is valid for transfers that do not use the device-specific authentication process, wherein the first authentication credential is no longer valid for transfers once the second authentication credential is available for use.

In accordance with some embodiments, a method performed at an electronic device with a display and an input element is described. The method comprises: detecting, via the input element, a property of a physical account object corresponding to a user account provisioned onto the electronic device; obtaining, from the physical account object via the input element, information identifying the physical account object; in response to receiving the information identifying the physical account object, displaying, on the display, an affordance for activating the physical account object; while displaying the affordance, detecting an input corresponding to selection of the affordance; and in response to detecting the input corresponding to selection of the affordance, automatically, without further user input, initiating a process for enabling the physical account object to be used to authorize use of the user account.

In accordance with some embodiments, a non-transitory computer-readable storage medium storing one or more programs configured to be executed by one or more processors of an electronic device with a display and an input element is described. The one or more programs include instructions for: detecting, via the input element, a property of a physical account object corresponding to a user account provisioned onto the electronic device; obtaining, from the physical account object via the input element, information identifying the physical account object; in response to receiving the information identifying the physical account object, displaying, on the display, an affordance for activating the physical account object; while displaying the affordance, detecting an input corresponding to selection of the affordance; and in response to detecting the input corresponding to selection of the affordance, automatically, without further user input, initiating a process for enabling the physical account object to be used to authorize use of the user account.

In accordance with some embodiments, a transitory computer-readable storage medium storing one or more programs configured to be executed by one or more processors of an electronic device with a display and an input element is described. The one or more programs include instructions for: detecting, via the input element, a property of a physical account object corresponding to a user account provisioned onto the electronic device; obtaining, from the physical account object via the input element, information identifying the physical account object; in response to receiving the information identifying the physical account object, displaying, on the display, an affordance for activating the physical account object; while displaying the affordance, detecting an input corresponding to selection of the affordance; and in response to detecting the input corresponding to selection of the affordance, automatically, without further user input, initiating a process for enabling the physical account object to be used to authorize use of the user account.

In accordance with some embodiments, an electronic device comprising a display, an input element, one or more processors, and memory storing one or more programs configured to be executed by the one or more processors. The one or more programs including instructions for: detecting, via the input element, a property of a physical account object corresponding to a user account provisioned onto the electronic device; obtaining, from the physical account object via the input element, information identifying the physical account object; in response to receiving the information identifying the physical account object, displaying, on the display, an affordance for activating the physical account object; while displaying the affordance, detecting an input corresponding to selection of the affordance; and in response to detecting the input corresponding to selection of the affordance, automatically, without further user input, initiating a process for enabling the physical account object to be used to authorize use of the user account.

In accordance with some embodiments, an electronic device is described. The electronic device comprises: a display; an input element; means for detecting, via the input element, a property of a physical account object corresponding to a user account provisioned onto the electronic device; means for obtaining, from the physical account object via the input element, information identifying the physical account object; means, in response to receiving the information identifying the physical account object, for displaying, on the display, an affordance for activating the physical account object; means, while displaying the affordance, for detecting an input corresponding to selection of the affordance; and means, in response to detecting the input corresponding to selection of the affordance, for automatically, without further user input, initiating a process for enabling the physical account object to be used to authorize use of the user account.

In accordance with some embodiments, a method performed at an electronic device with a display and an input element is described. The method comprises: detecting, via the input element, a property of a physical account object corresponding to a transfer account provisioned onto the electronic device; obtaining, from the physical account object via the input element, information identifying the physical account object; in response to receiving the information identifying the physical account object, displaying, on the display, an affordance for activating the physical account object; while displaying the affordance, detecting an input corresponding to selection of the affordance; and in response to detecting the input corresponding to selection of the affordance, automatically, without further user input, initiating a process for enabling the physical account object to be used to authorize transfers using the transfer account.

In accordance with some embodiments, a non-transitory computer-readable storage medium storing one or more programs configured to be executed by one or more processors of an electronic device with a display and an input element is described. The one or more programs include instructions for: detecting, via the input element, a property of a physical account object corresponding to a transfer account provisioned onto the electronic device; obtaining, from the physical account object via the input element, information identifying the physical account object; in response to receiving the information identifying the physical account object, displaying, on the display, an affordance for activating the physical account object; while displaying the affordance, detecting an input corresponding to selection of the affordance; and in response to detecting the input corresponding to selection of the affordance, automatically, without further user input, initiating a process for enabling the physical account object to be used to authorize transfers using the transfer account.

In accordance with some embodiments, a transitory computer-readable storage medium storing one or more programs configured to be executed by one or more processors of an electronic device with a display and an input element is described. The one or more programs include instructions for: detecting, via the input element, a property of a physical account object corresponding to a transfer account provisioned onto the electronic device; obtaining, from the physical account object via the input element, information identifying the physical account object; in response to receiving the information identifying the physical account object, displaying, on the display, an affordance for activating the physical account object; while displaying the affordance, detecting an input corresponding to selection of the affordance; and in response to detecting the input corresponding to selection of the affordance, automatically, without further user input, initiating a process for enabling the physical account object to be used to authorize transfers using the transfer account.

In accordance with some embodiments, an electronic device comprising a display, an input element, one or more processors, and memory storing one or more programs configured to be executed by the one or more processors. The one or more programs including instructions for: detecting, via the input element, a property of a physical account object corresponding to a transfer account provisioned onto the electronic device; obtaining, from the physical account object via the input element, information identifying the physical account object; in response to receiving the information identifying the physical account object, displaying, on the display, an affordance for activating the physical account object; while displaying the affordance, detecting an input corresponding to selection of the affordance; and in response to detecting the input corresponding to selection of the affordance, automatically, without further user input, initiating a process for enabling the physical account object to be used to authorize transfers using the transfer account.

In accordance with some embodiments, an electronic device is described. The electronic device comprises: a display; an input element; means for detecting, via the input element, a property of a physical account object corresponding to a transfer account provisioned onto the electronic device; means for obtaining, from the physical account object via the input element, information identifying the physical account object; means, in response to receiving the information identifying the physical account object for displaying, on the display, an affordance for activating the physical account object; means, while displaying the affordance, for detecting an input corresponding to selection of the affordance; and means, in response to detecting the input corresponding to selection of the affordance, for automatically, without further user input, initiating a process for enabling the physical account object to be used to authorize transfers using the transfer account.

In accordance with some embodiments, a method performed at an electronic device with a display is described. The method comprises: displaying, in a user interface corresponding to an account, a user interface element that provides information about account operations of a first type for the account; and wherein displaying the user interface element includes: in accordance with a determination that an operation of the first type is due to be performed within a first threshold amount of time and the operation of the first type has not been performed within a second threshold amount of time, displaying the user interface element with a first appearance that indicates the amount of time until the operation of the first type is due; and in accordance with a determination that the operation of the first type is due to be performed within the first threshold amount of time and the operation of the first type has been performed within the second threshold amount of time, displaying the user interface element with a second appearance that includes information about the operation of the first type that has been performed within the second threshold amount of time.

In accordance with some embodiments, a non-transitory computer-readable storage medium storing one or more programs configured to be executed by one or more processors of an electronic device with a display is described. The one or more programs include instructions for: displaying, in a user interface corresponding to an account, a user interface element that provides information about account operations of a first type for the account; and wherein displaying the user interface element includes: in accordance with a determination that an operation of the first type is due to be performed within a first threshold amount of time and the operation of the first type has not been performed within a second threshold amount of time, displaying the user interface element with a first appearance that indicates the amount of time until the operation of the first type is due; and in accordance with a determination that the operation of the first type is due to be performed within the first threshold amount of time and the operation of the first type has been performed within the second threshold amount of time, displaying the user interface element with a second appearance that includes information about the operation of the first type that has been performed within the second threshold amount of time.

In accordance with some embodiments, a transitory computer-readable storage medium storing one or more programs configured to be executed by one or more processors of an electronic device with a display is described. The one or more programs include instructions for: displaying, in a user interface corresponding to an account, a user interface element that provides information about account operations of a first type for the account; and wherein displaying the user interface element includes: in accordance with a determination that an operation of the first type is due to be performed within a first threshold amount of time and the operation of the first type has not been performed within a second threshold amount of time, displaying the user interface element with a first appearance that indicates the amount of time until the operation of the first type is due; and in accordance with a determination that the operation of the first type is due to be performed within the first threshold amount of time and the operation of the first type has been performed within the second threshold amount of time, displaying the user interface element with a second appearance that includes information about the operation of the first type that has been performed within the second threshold amount of time.

In accordance with some embodiments, an electronic device comprising a display, one or more processors, and memory storing one or more programs configured to be executed by the one or more processors is described. The one or more programs include instructions for: displaying, in a user interface corresponding to an account, a user interface element that provides information about account operations of a first type for the account; and wherein displaying the user interface element includes: in accordance with a determination that an operation of the first type is due to be performed within a first threshold amount of time and the operation of the first type has not been performed within a second threshold amount of time, displaying the user interface element with a first appearance that indicates the amount of time until the operation of the first type is due; and in accordance with a determination that the operation of the first type is due to be performed within the first threshold amount of time and the operation of the first type has been performed within the second threshold amount of time, displaying the user interface element with a second appearance that includes information about the operation of the first type that has been performed within the second threshold amount of time.

In accordance with some embodiments, an electronic device is described. The electronic device comprises a display; means for displaying, in a user interface corresponding to an account, a user interface element that provides information about account operations of a first type for the account; and wherein displaying the user interface element includes: means, in accordance with a determination that an operation of the first type is due to be performed within a first threshold amount of time and the operation of the first type has not been performed within a second threshold amount of time, for displaying the user interface element with a first appearance that indicates the amount of time until the operation of the first type is due; and means, in accordance with a determination that the operation of the first type is due to be performed within the first threshold amount of time and the operation of the first type has been performed within the second threshold amount of time, for displaying the user interface element with a second appearance that includes information about the operation of the first type that has been performed within the second threshold amount of time.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for managing a transfer account, thereby increasing the effectiveness, efficiency, and user satisfaction with such devices. Such methods and interfaces may complement or replace other methods for managing a transfer account.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIGS. 12A-12D are a flow diagram illustrating a method for providing usage information of a transfer account, in accordance with some embodiments.

FIG. 12E is a flow diagram illustrating a method for providing usage information of a user account, in accordance with some embodiments.

FIGS. 15A-15D are a flow diagram illustrating a method for providing visual feedback on a representation of a transfer account, in accordance with some embodiment.

FIG. 15E is a flow diagram illustrating a method for providing visual feedback on a representation of a user account, in accordance with some embodiments.

FIGS. 18A-18F are a flow diagram illustrating a method for managing the tracking of a transfer category, in accordance with some embodiments.

FIG. 18G is a flow diagram illustrating a method for managing the tracking of a usage category, in accordance with some embodiments.

FIGS. 21A-21F are a flow diagram illustrating a method for managing a transfer of items, in accordance with some embodiments.

FIGS. 24A-24D are a flow diagram illustrating a method for managing an authentication credential connected with a transfer account, in accordance with some embodiments.

FIGS. 27A-27B are a flow diagram illustrating a method for managing an authentication credential connected with a transfer account, in accordance with some embodiments.

FIG. 27C is a flow diagram illustrating a method for managing an authentication credential connected with the user account, in accordance with some embodiments.

FIGS. 30A-30B are a flow diagram illustrating a method for managing balance transfers, in accordance with some embodiments.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for managing a transfer account. For example, there is a need for electronic devices that provide a convenient and efficient method for activating a new transfer account. For another example, there is a need for electronic devices that provide easier management transfer activity of a transfer account. For another example there is a need for electronic devices that provide a convenient and efficient method for viewing and managing information, such as rewards information and past activity information, associated with using a transfer account. For another example, there is a need for electronic devices that provide a convenient and efficient method for selecting values for transfers using a transfer account. For another example, there is a need for electronic devices that provide visual feedback about the types of and amount of transfers made using a transfer account. Such techniques can reduce the cognitive burden on a user who manages and uses a transfer account using the electronic device, thereby enhancing productivity. Further, such techniques can reduce processor and battery power otherwise wasted on redundant user inputs.

Figure 7A:
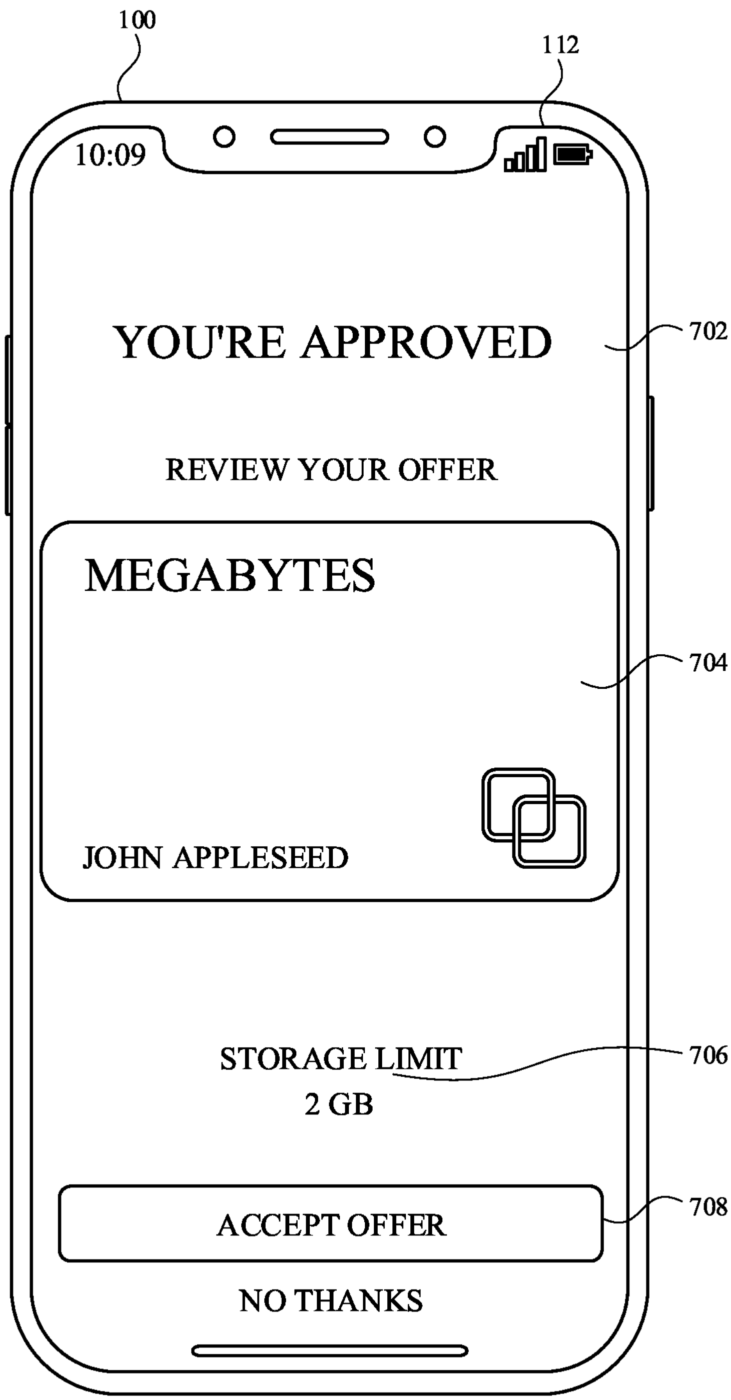
FIGS. 7A-7B illustrate exemplary user interfaces for provisioning an electronic device with a user account, in accordance with some embodiments.
Figure 7B:
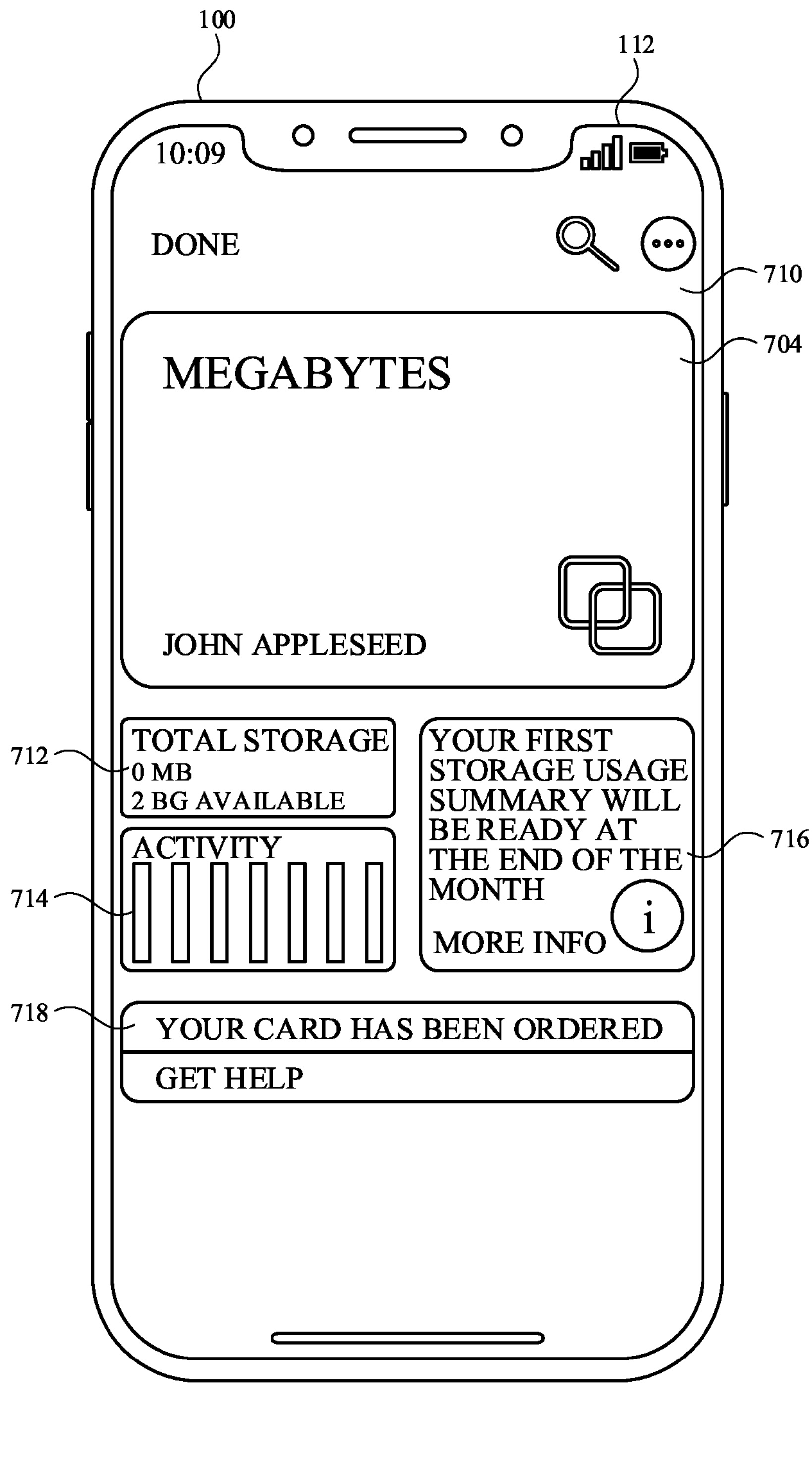
Figure 8A:
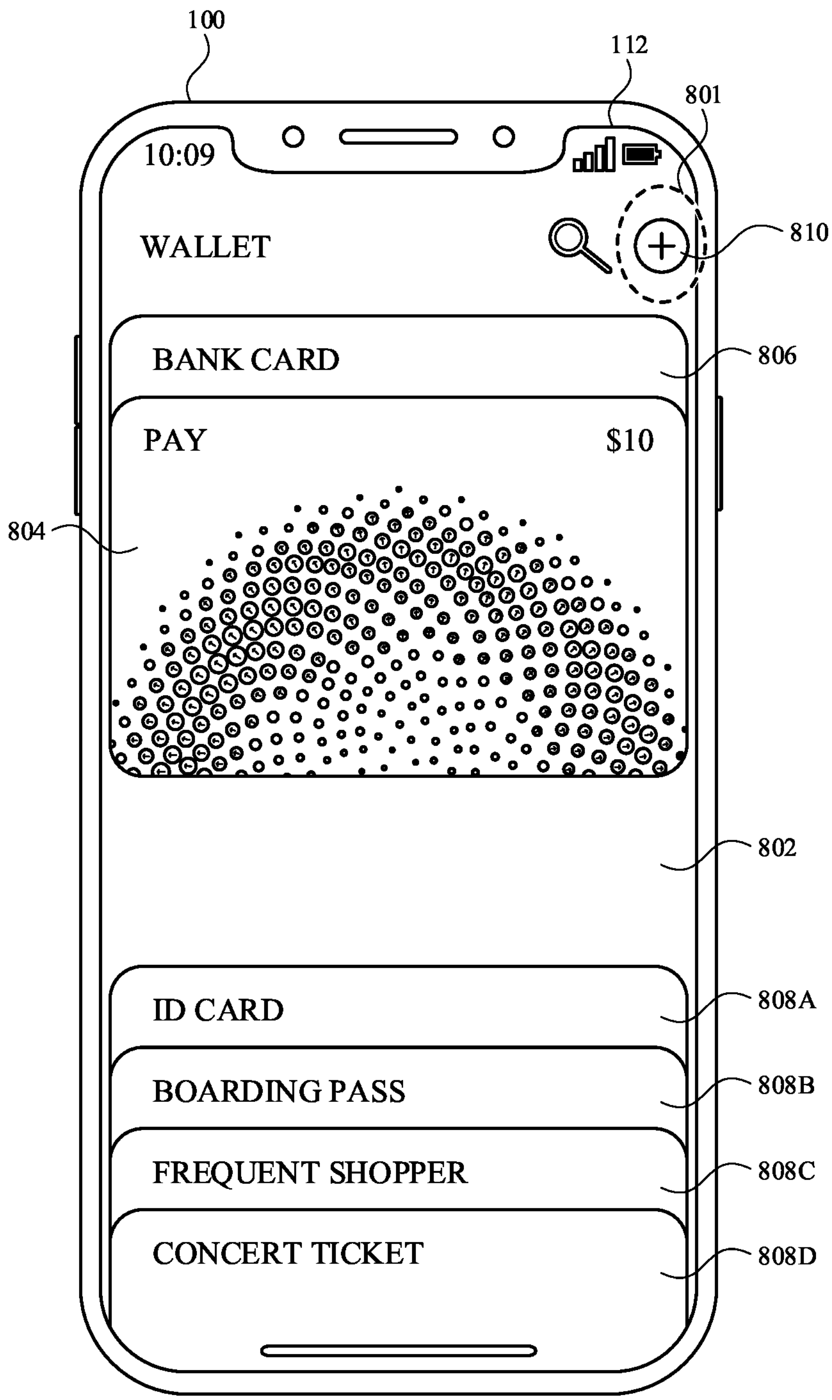
FIGS. 8A-8V illustrate exemplary user interfaces for provisioning an electronic device with a transfer account, in accordance with some embodiments.
Figure 9A:
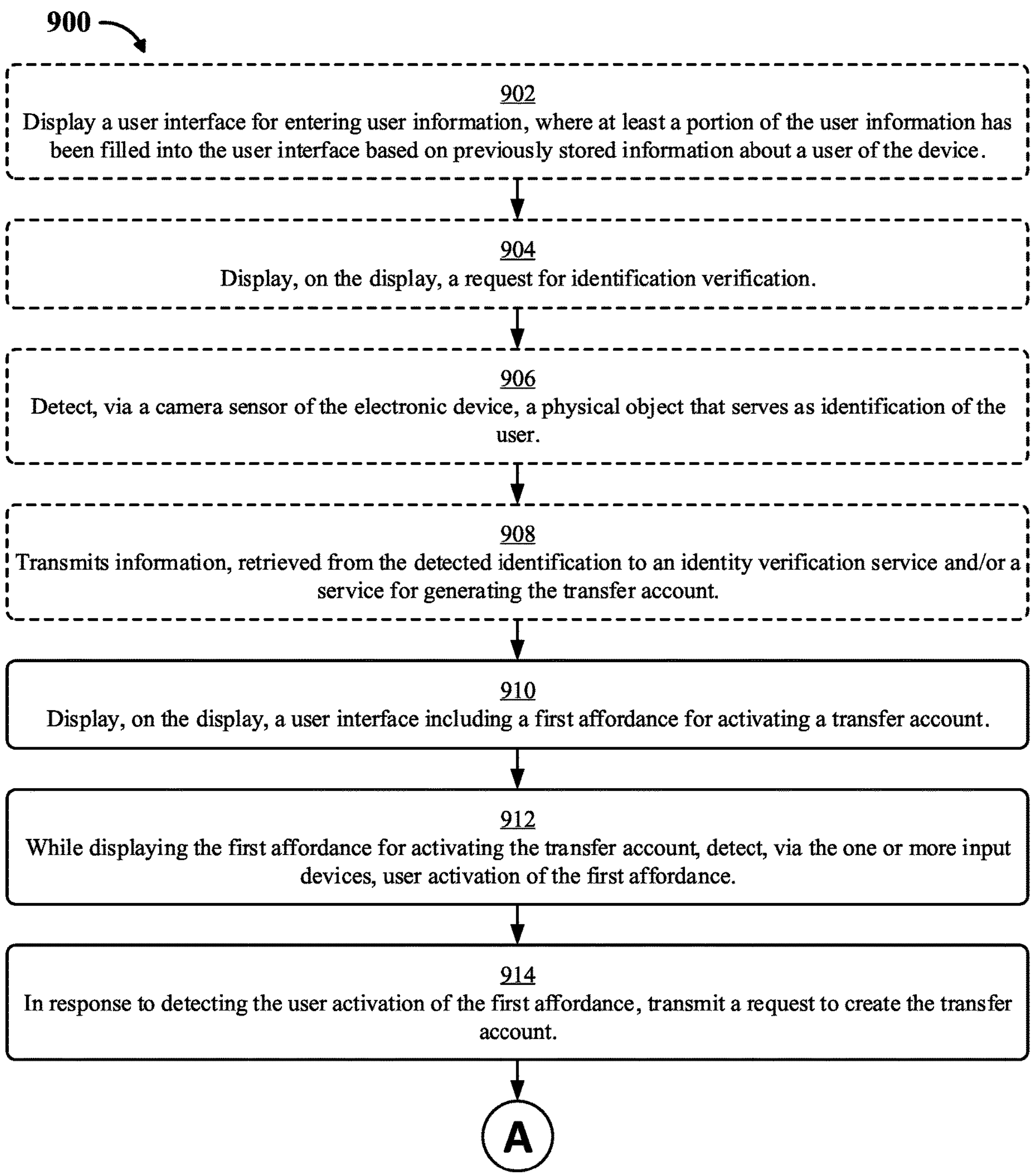
FIGS. 9A-9C are a flow diagram illustrating a method for provisioning an electronic device with a transfer account, in accordance with some embodiments.
Figure 9B:
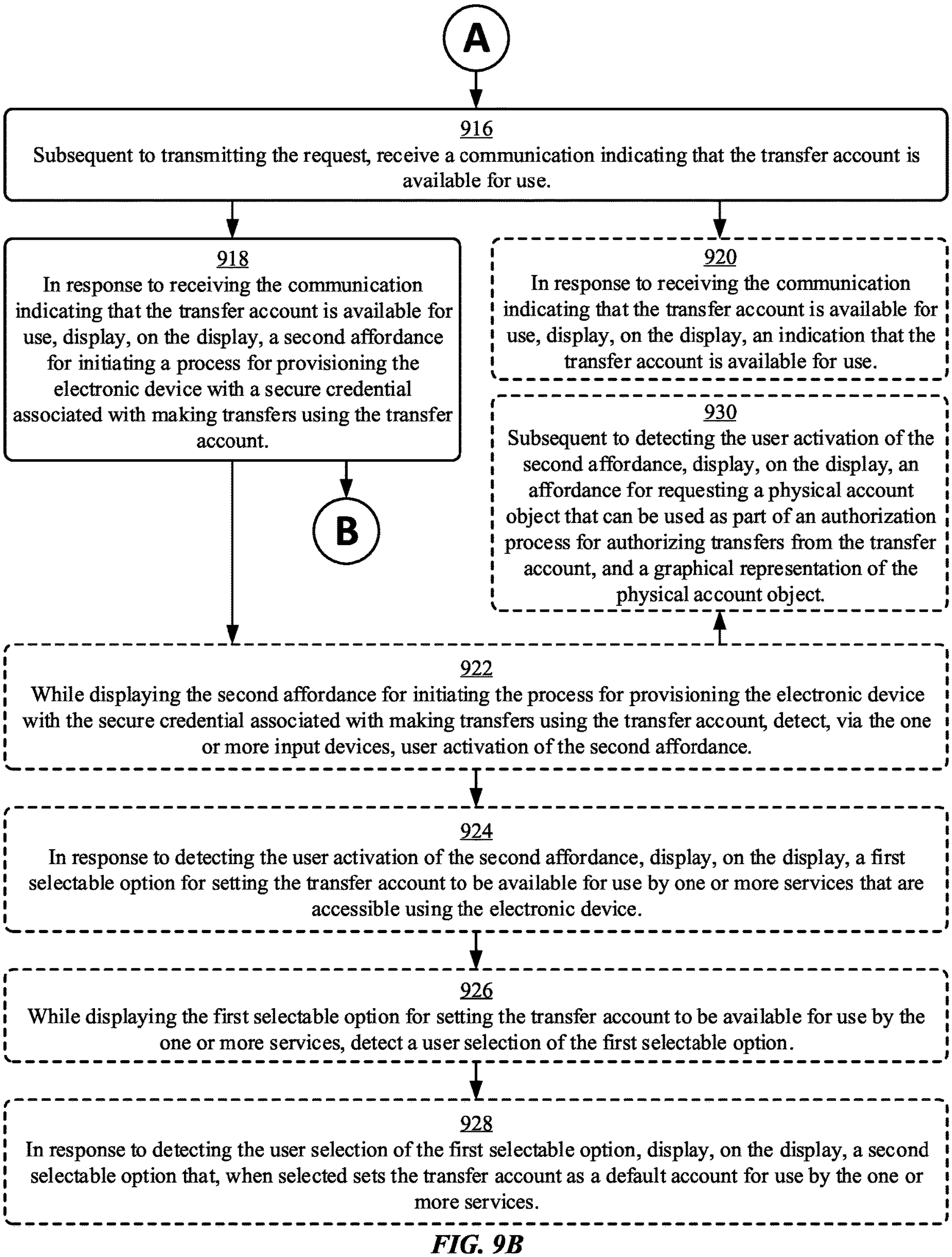
Figure 9C:
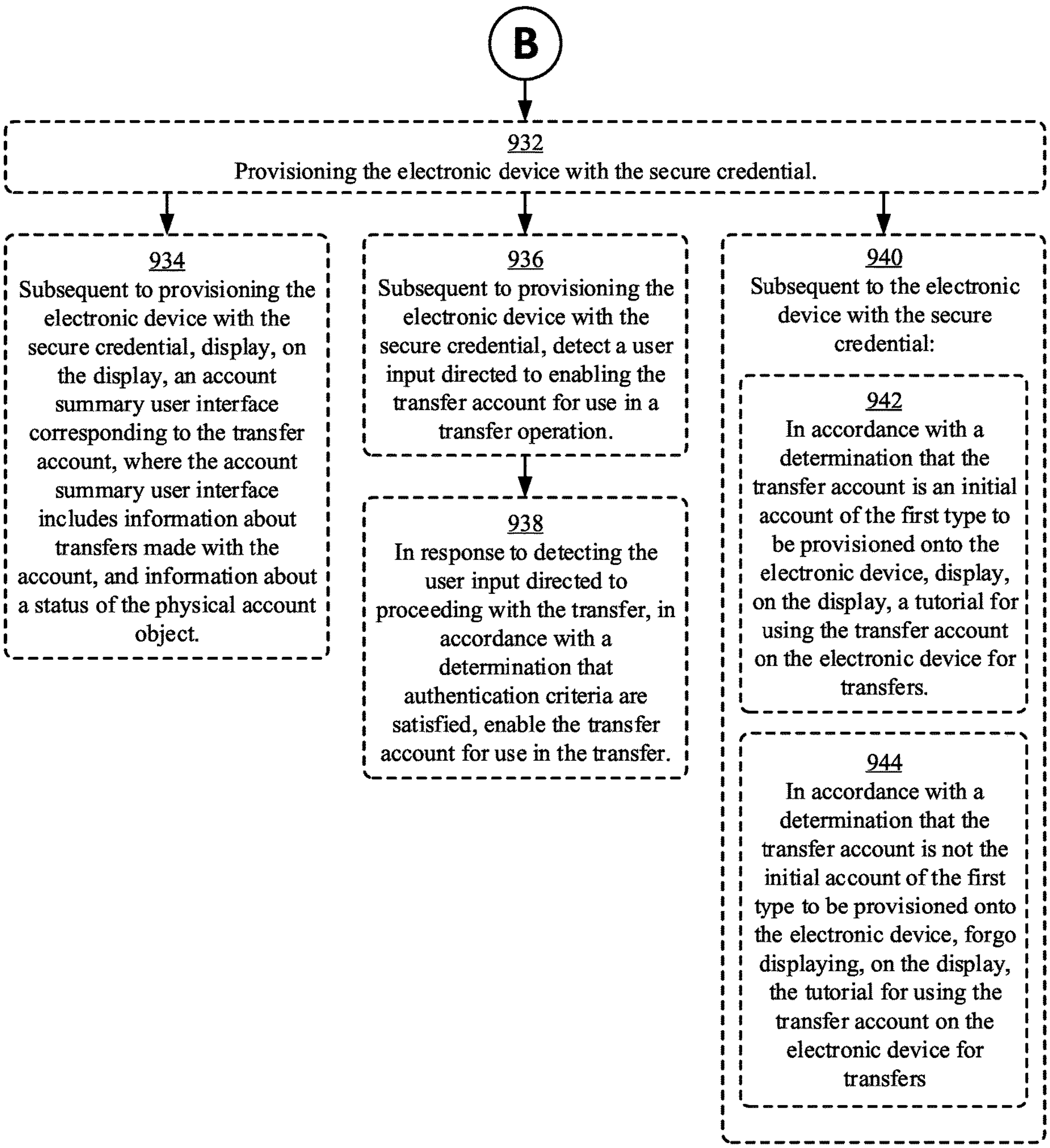
Figure 9D:
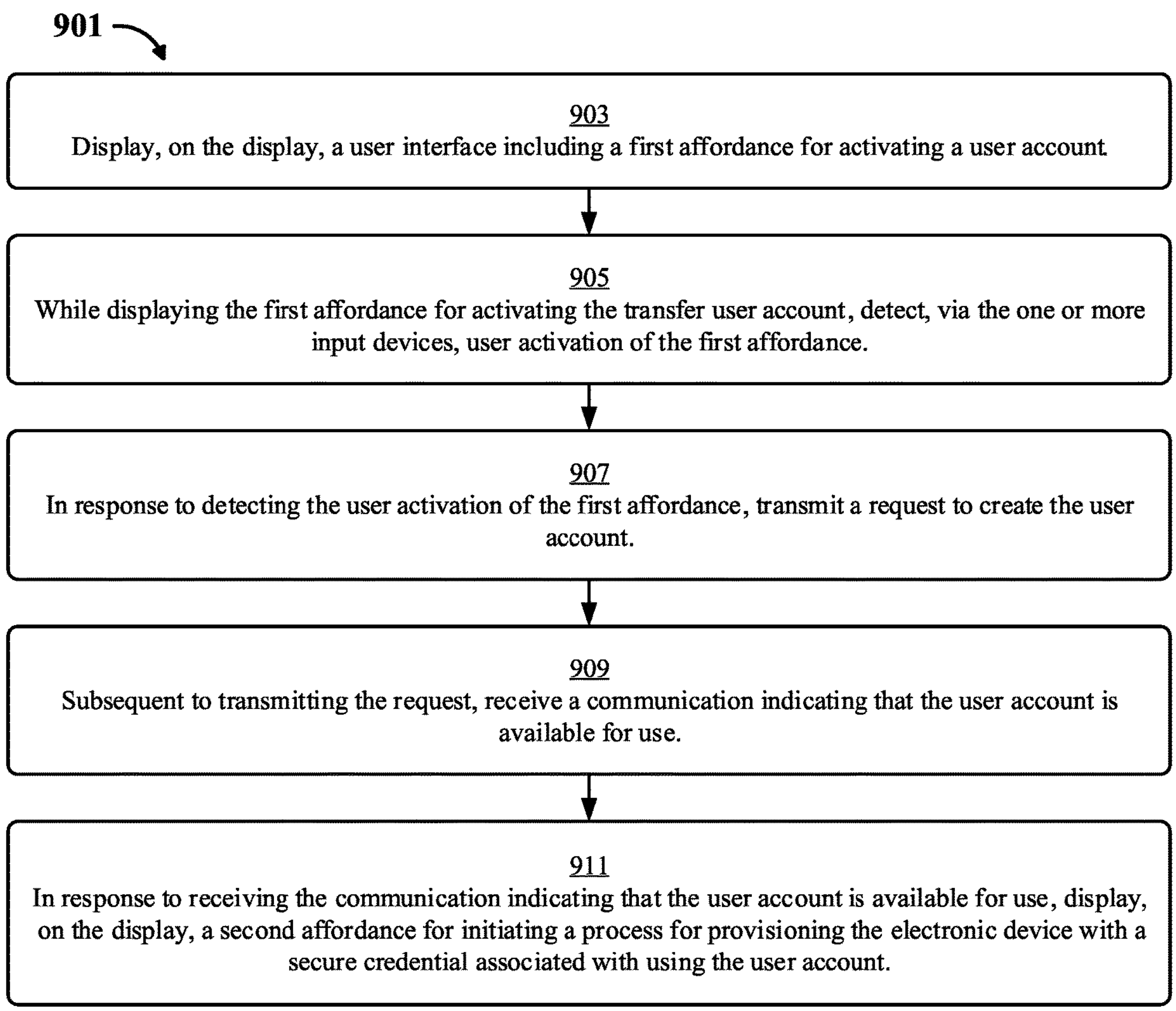
FIG. 9D is a flow diagram illustrating a method for provisioning an electronic device with a user account, in accordance with some embodiments.
Figure 10A:
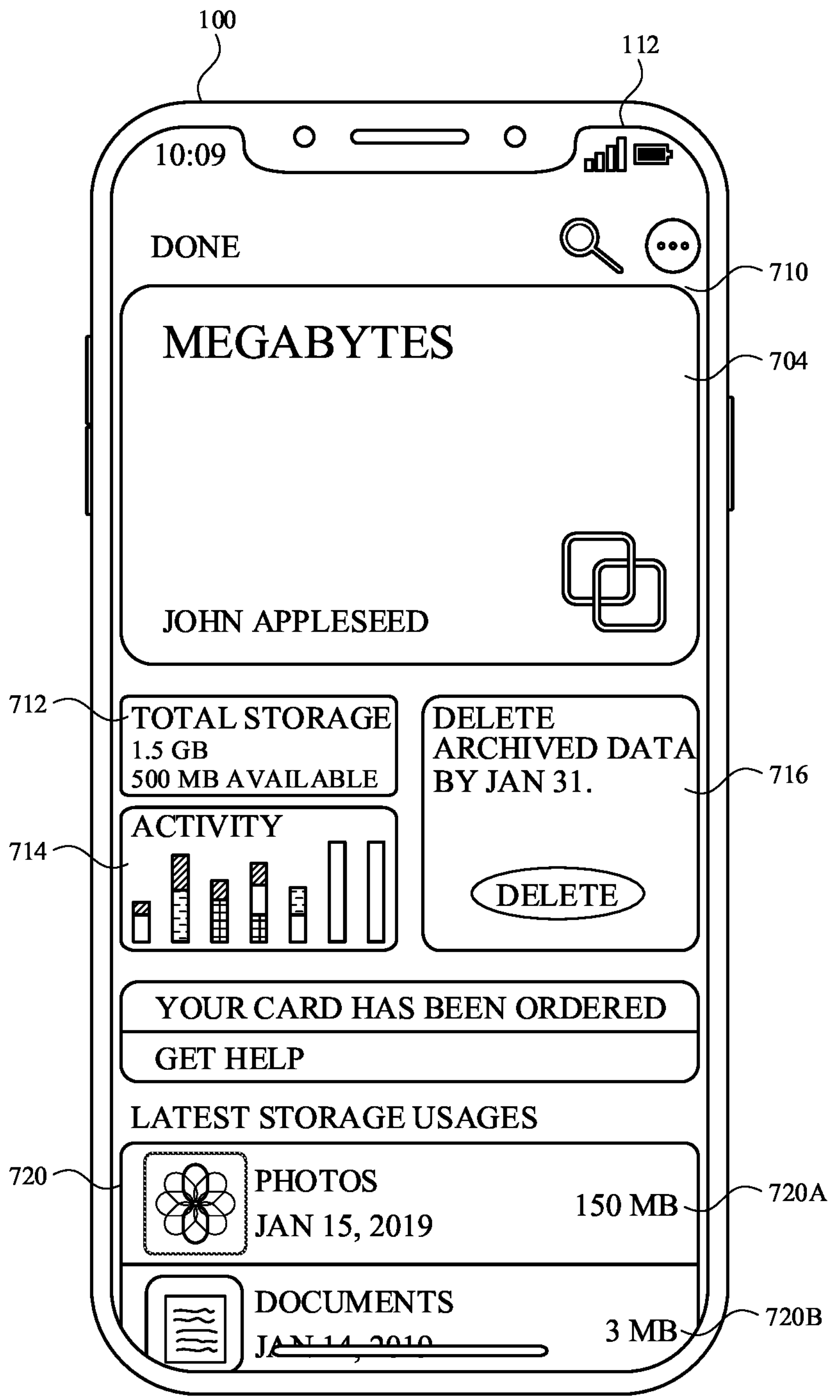
FIGS. 10A-10B illustrate exemplary user interfaces for providing usage information of a user account, in accordance with some embodiments.
Figure 10B:
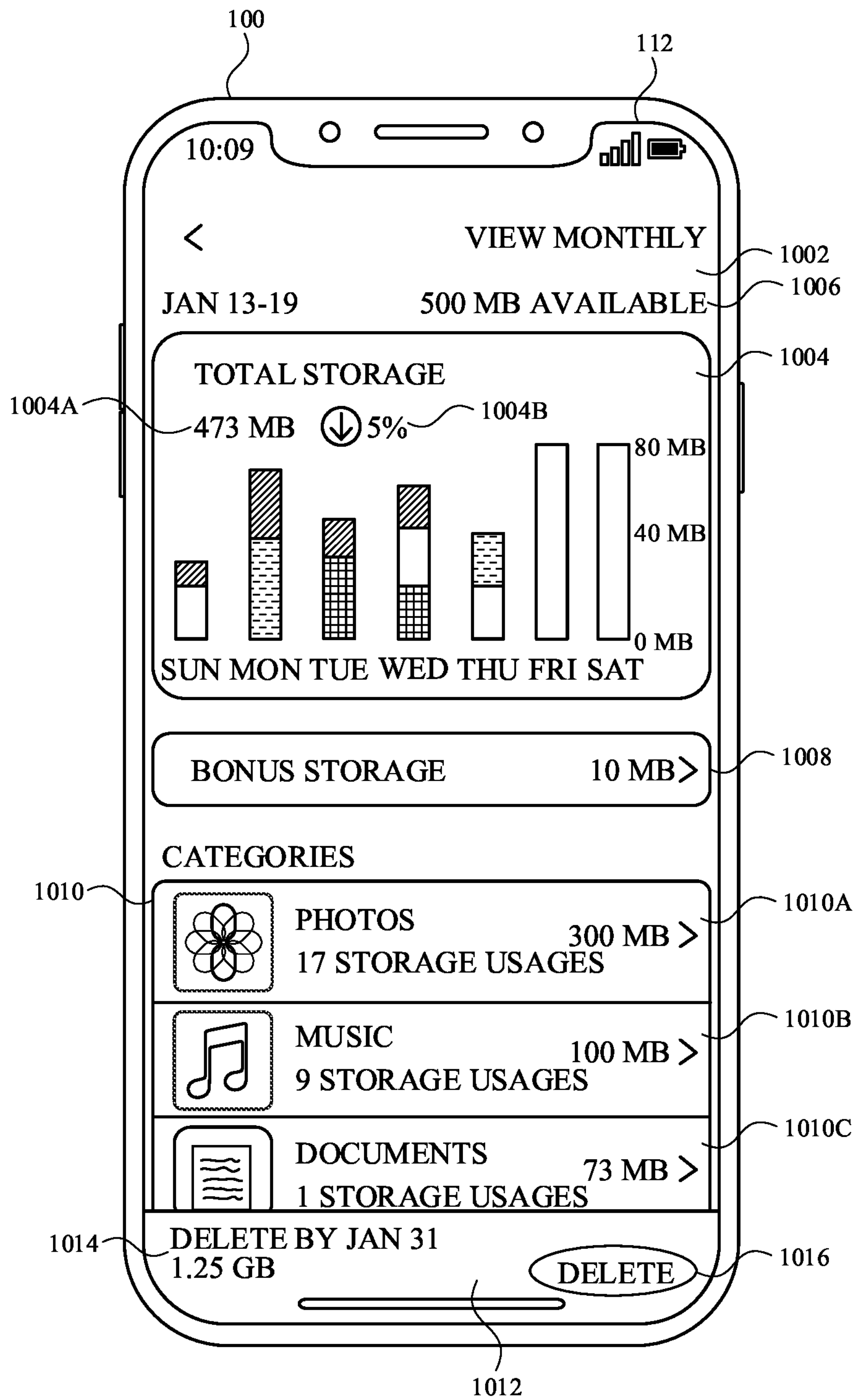
Figure 11A:
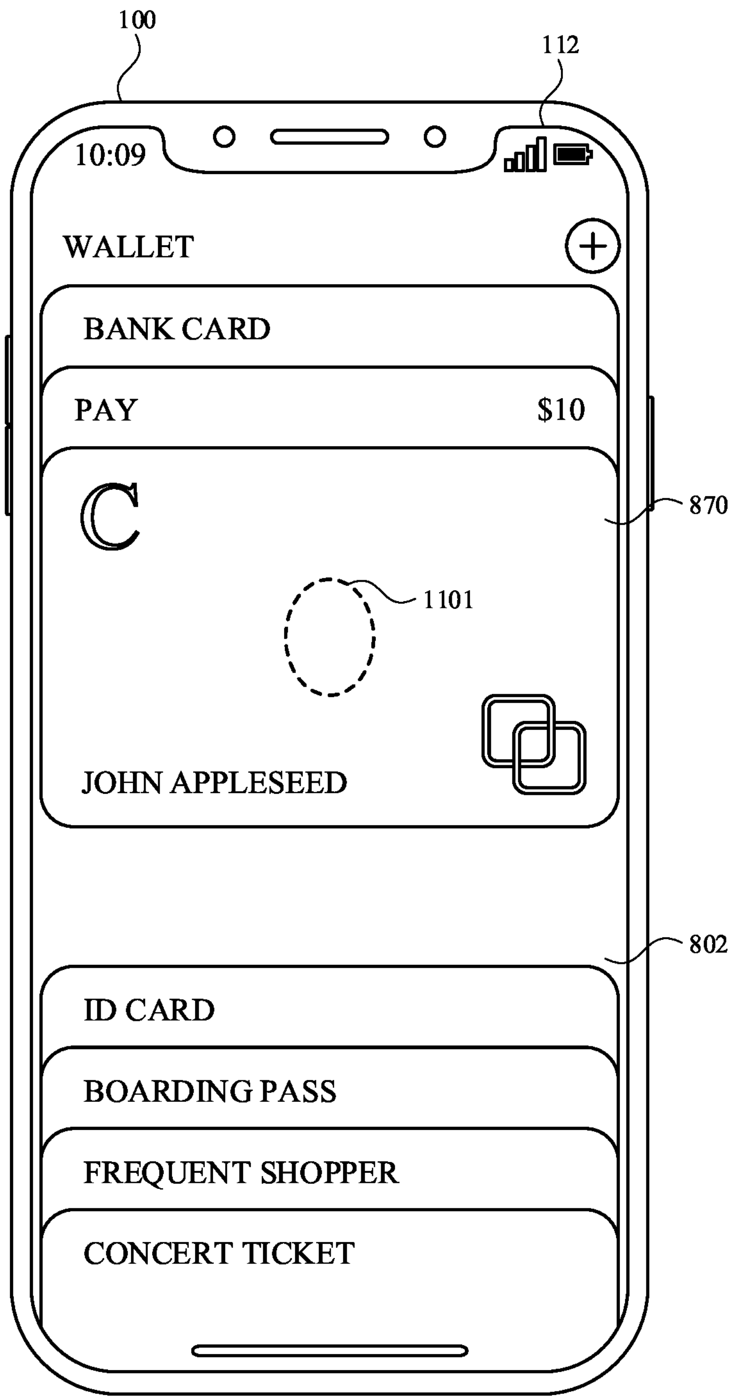
FIGS. 11A-11O illustrate exemplary user interfaces for providing usage information of a transfer account, in accordance with some embodiments.
Figure 11O:
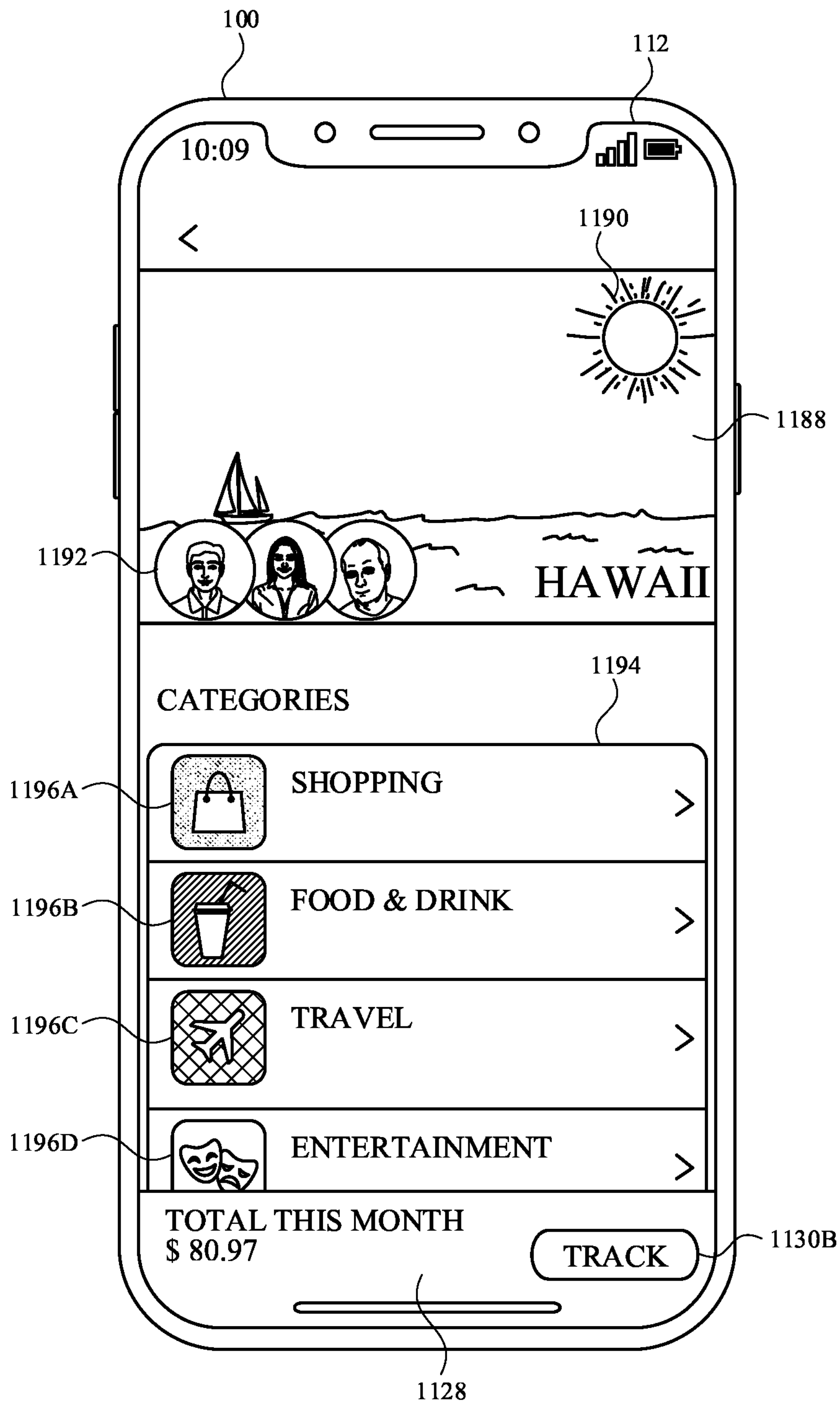
Figure 12A:
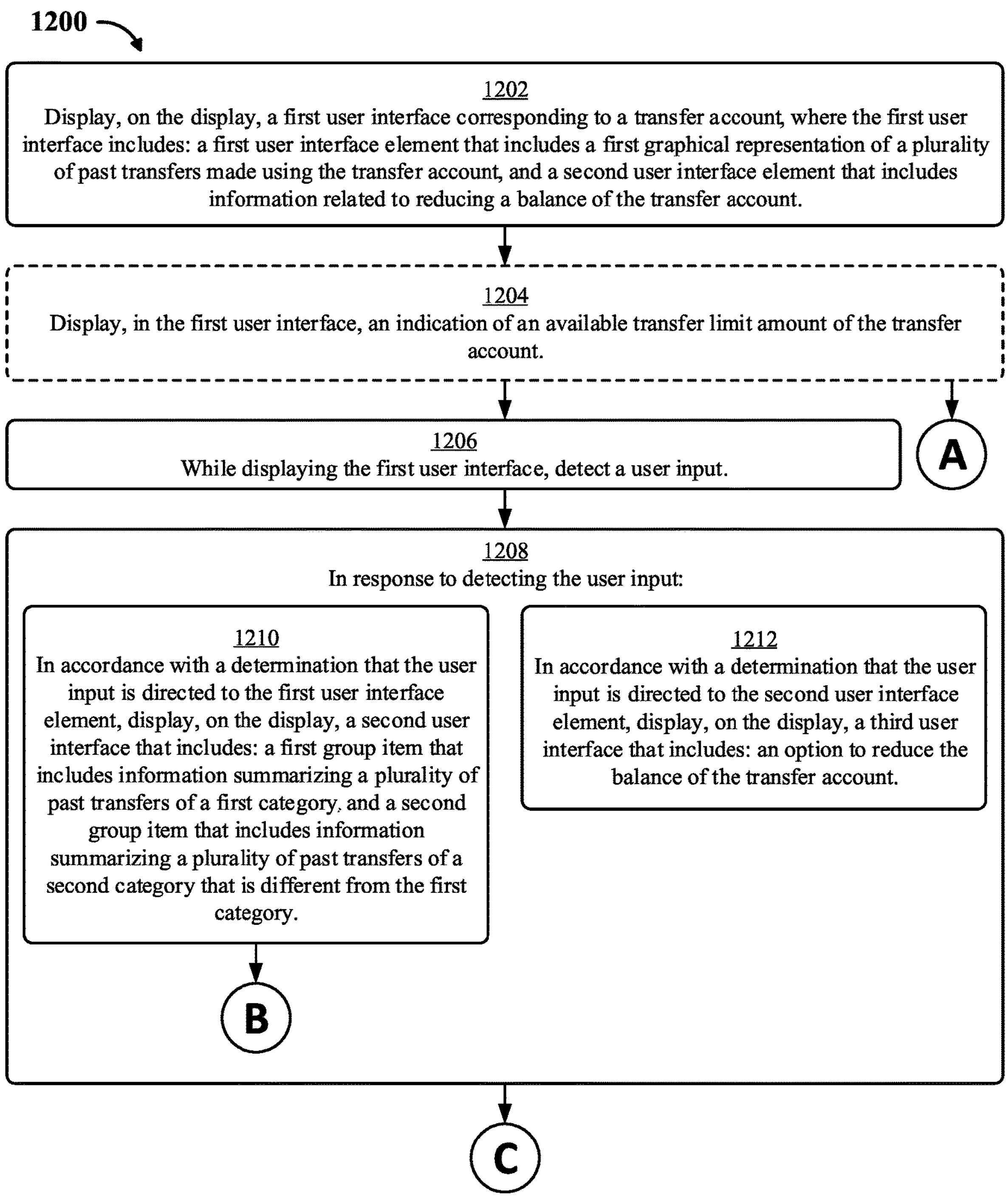
Figure 12C:
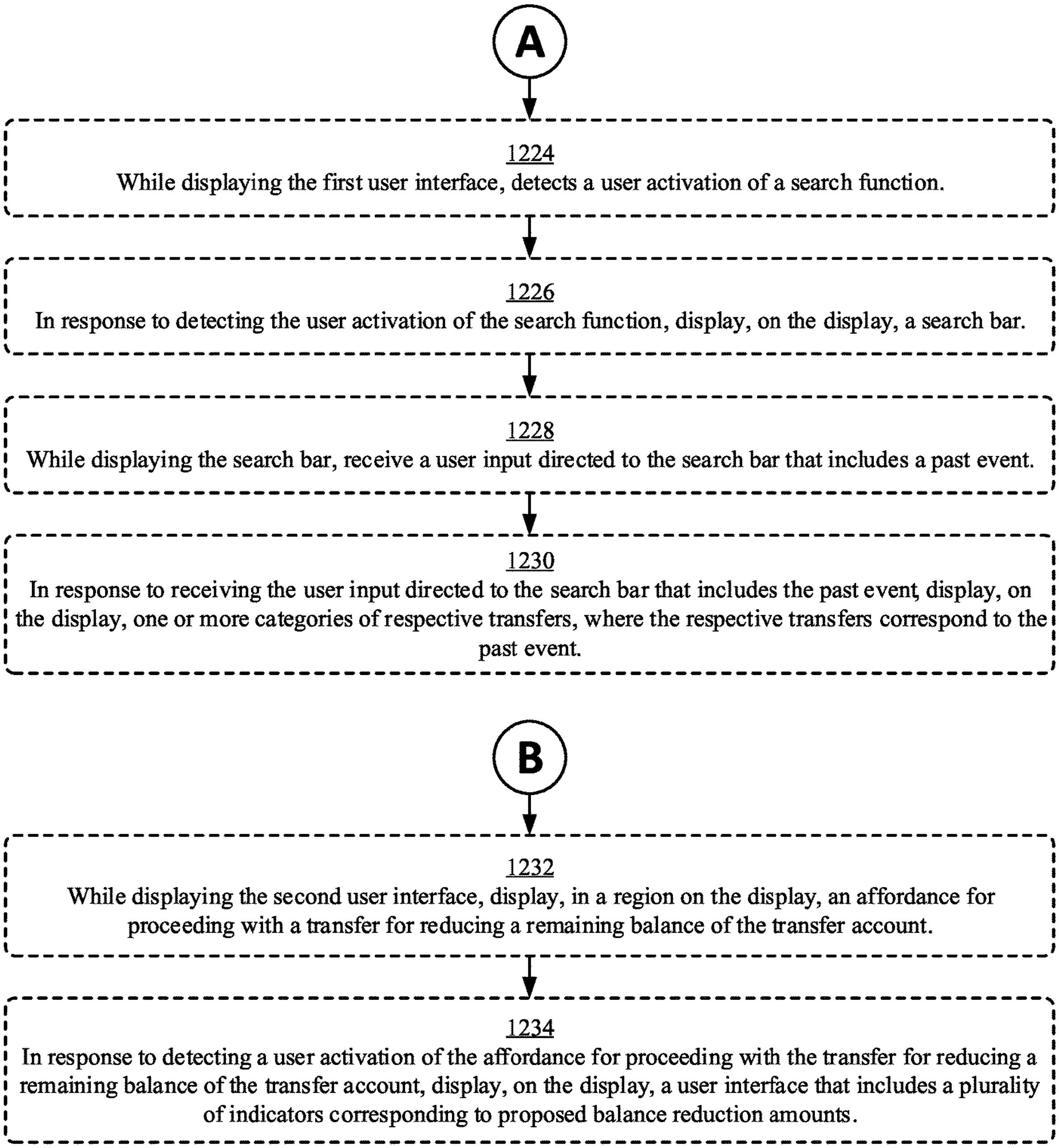
Figure 13A:
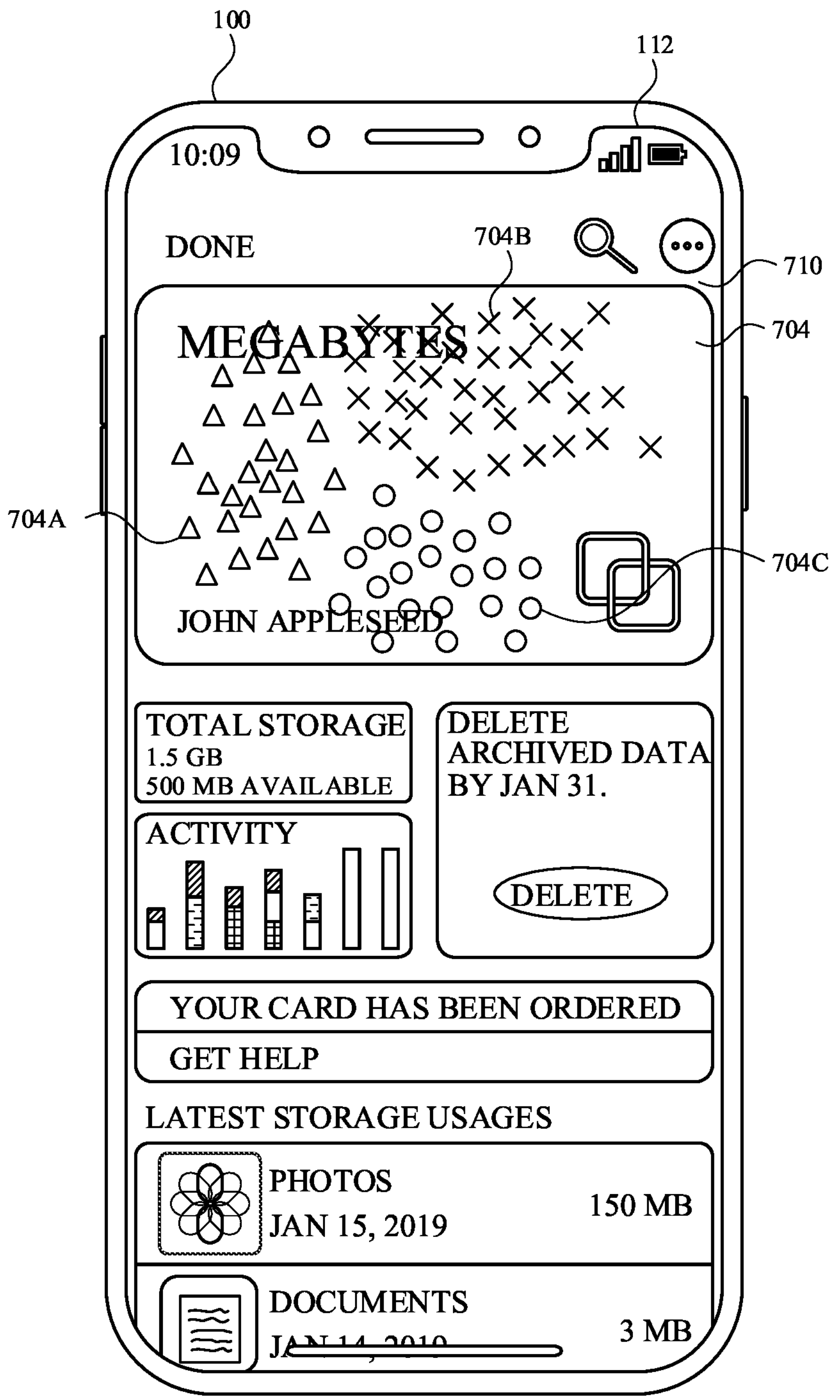
FIGS. 13A-13B illustrate exemplary user interfaces for providing visual feedback on a representation of a user account, in accordance with some embodiments.
Figure 13B:
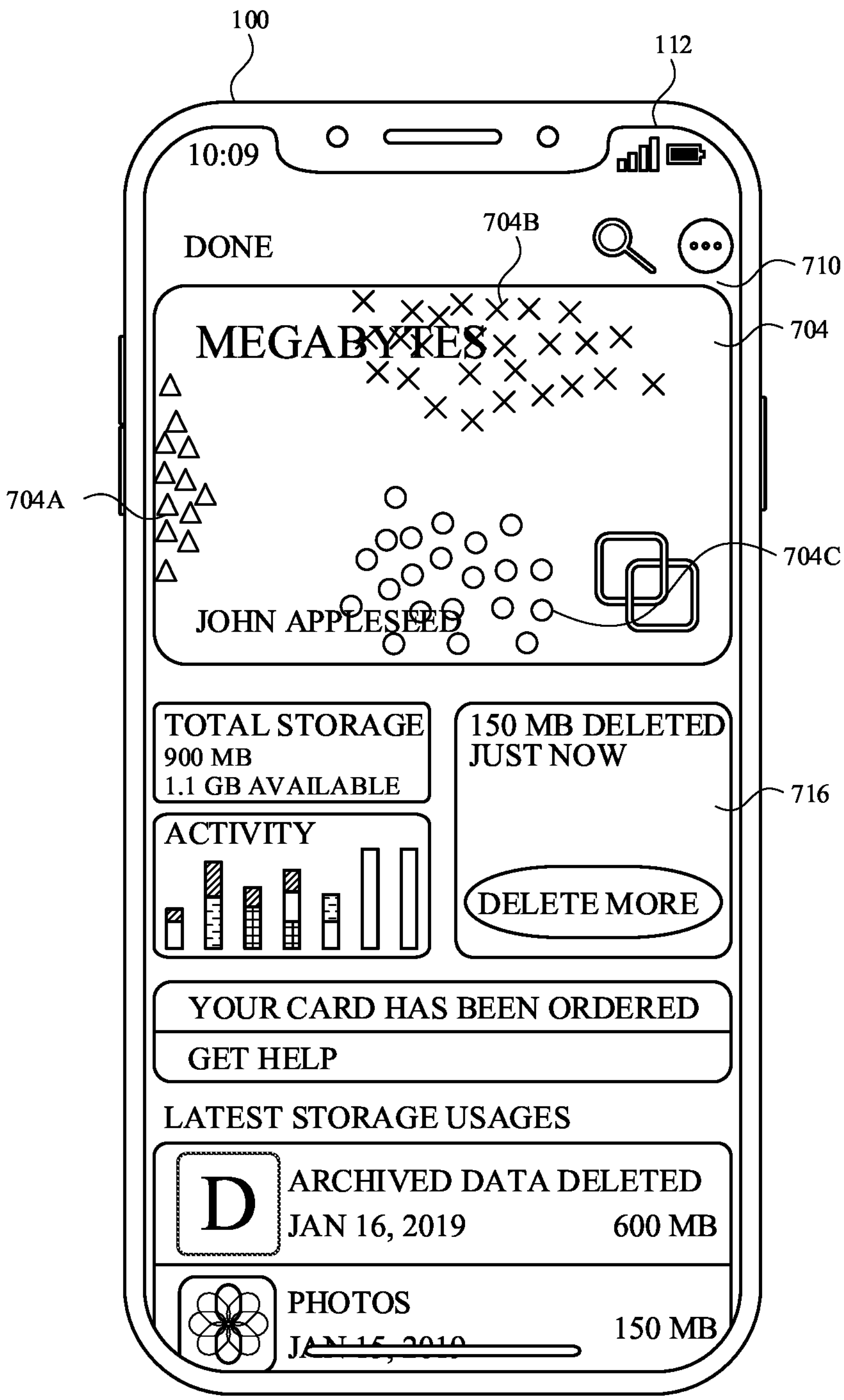
Figure 14A:
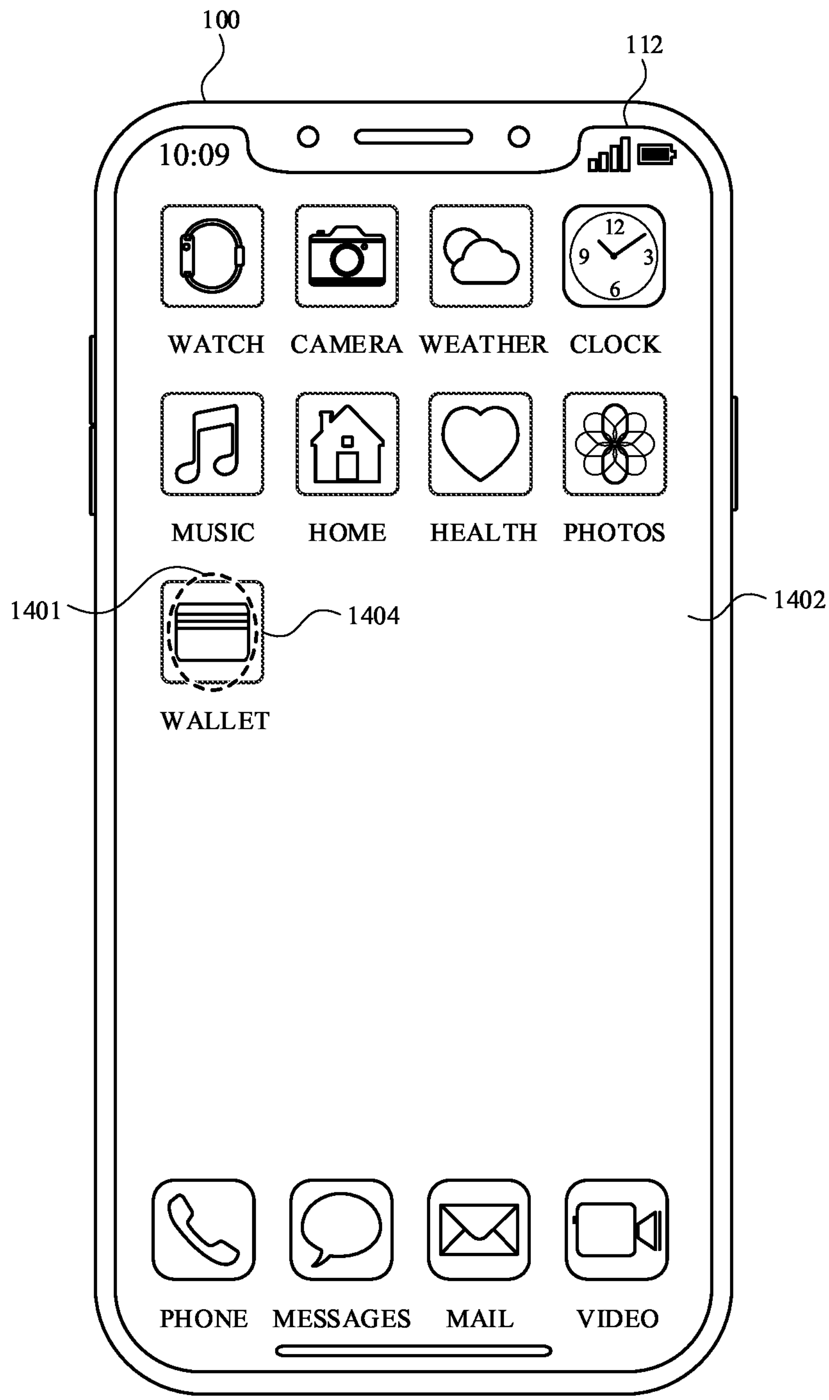
FIGS. 14A-14U illustrate exemplary user interfaces for providing visual feedback on a representation of a transfer account, in accordance with some embodiments.
Figure 16A:
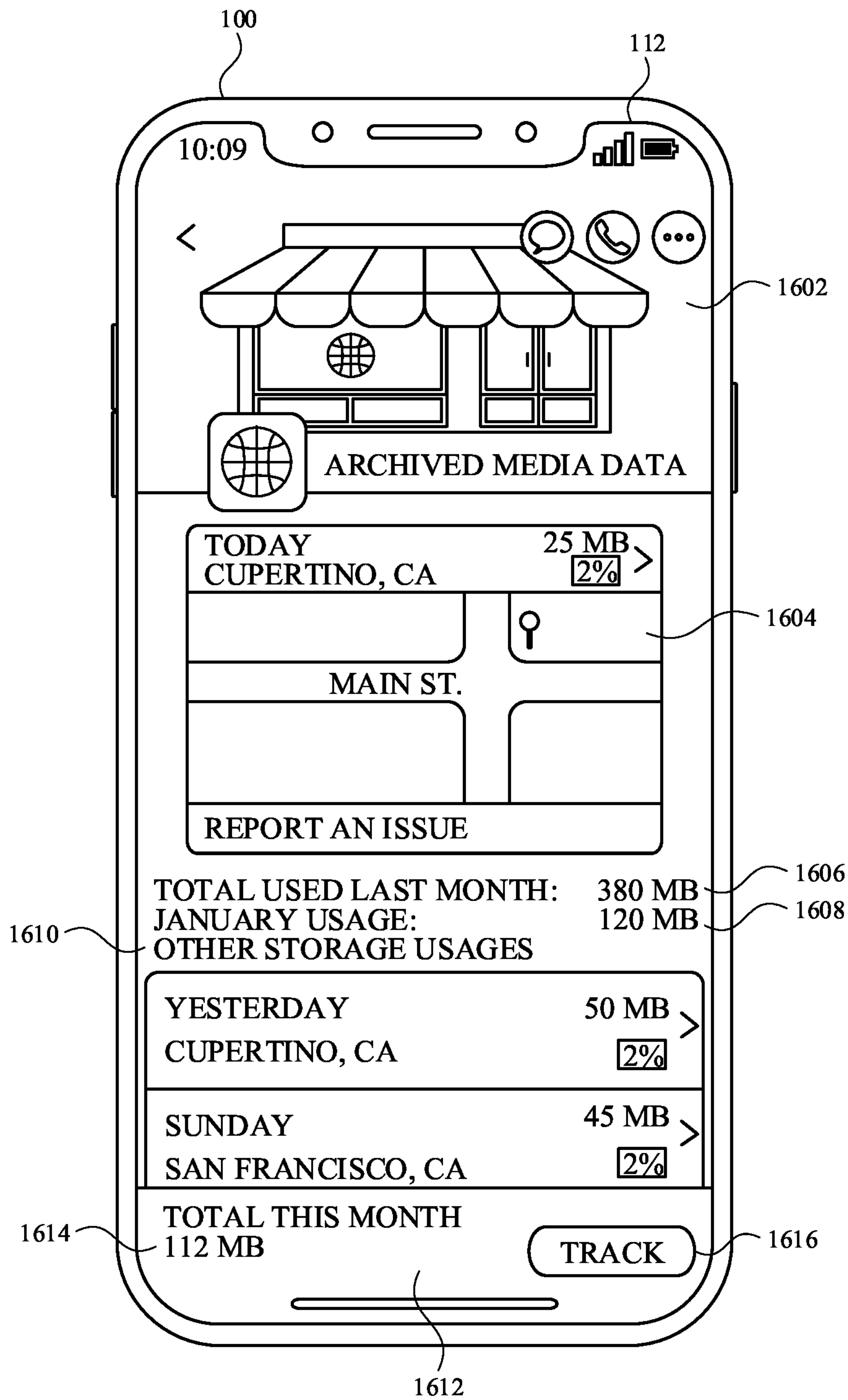
FIGS. 16A-16B illustrate exemplary user interfaces for managing the tracking of a usage category, in accordance with some embodiments.
Figure 16B:
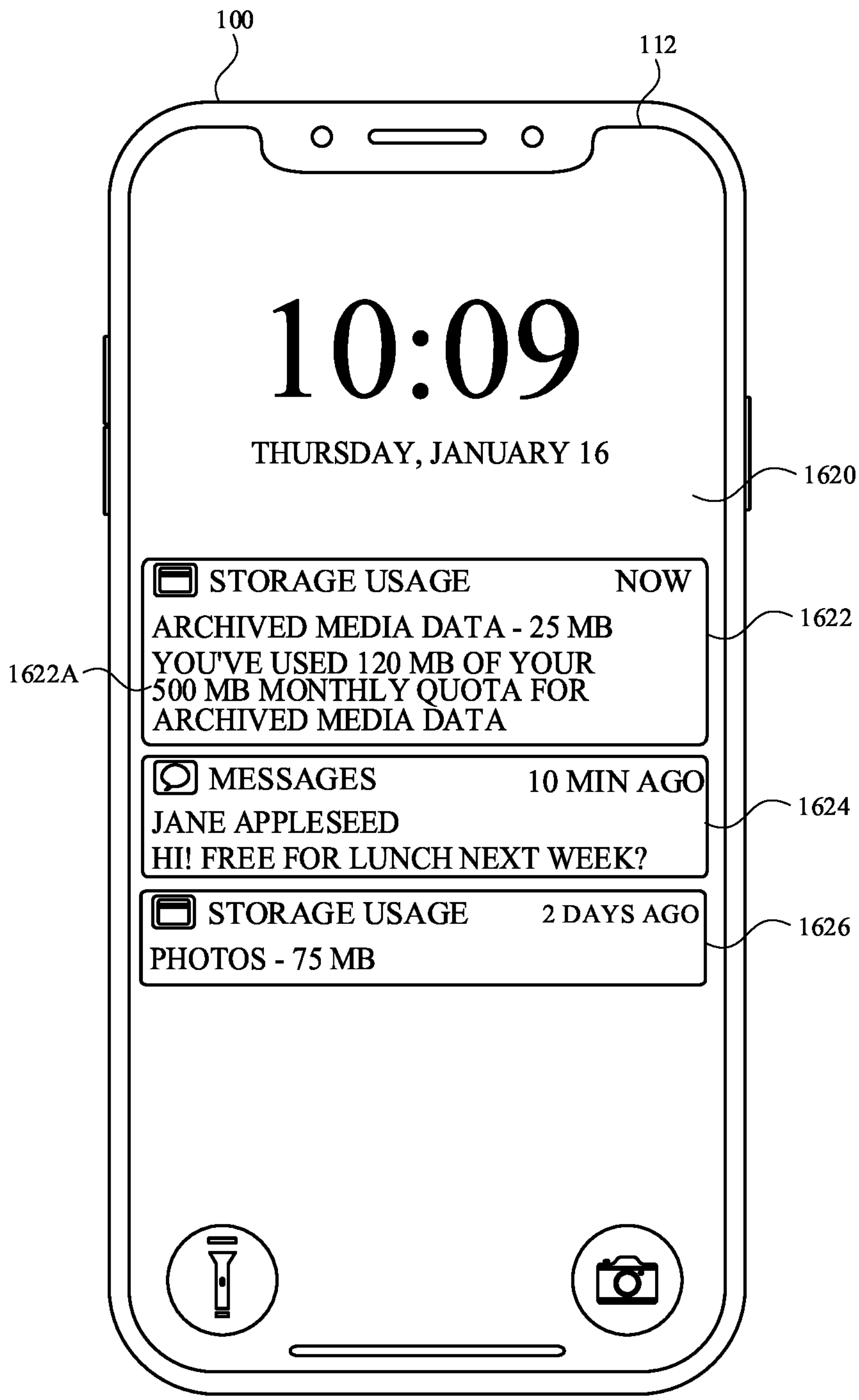
Figure 18B:
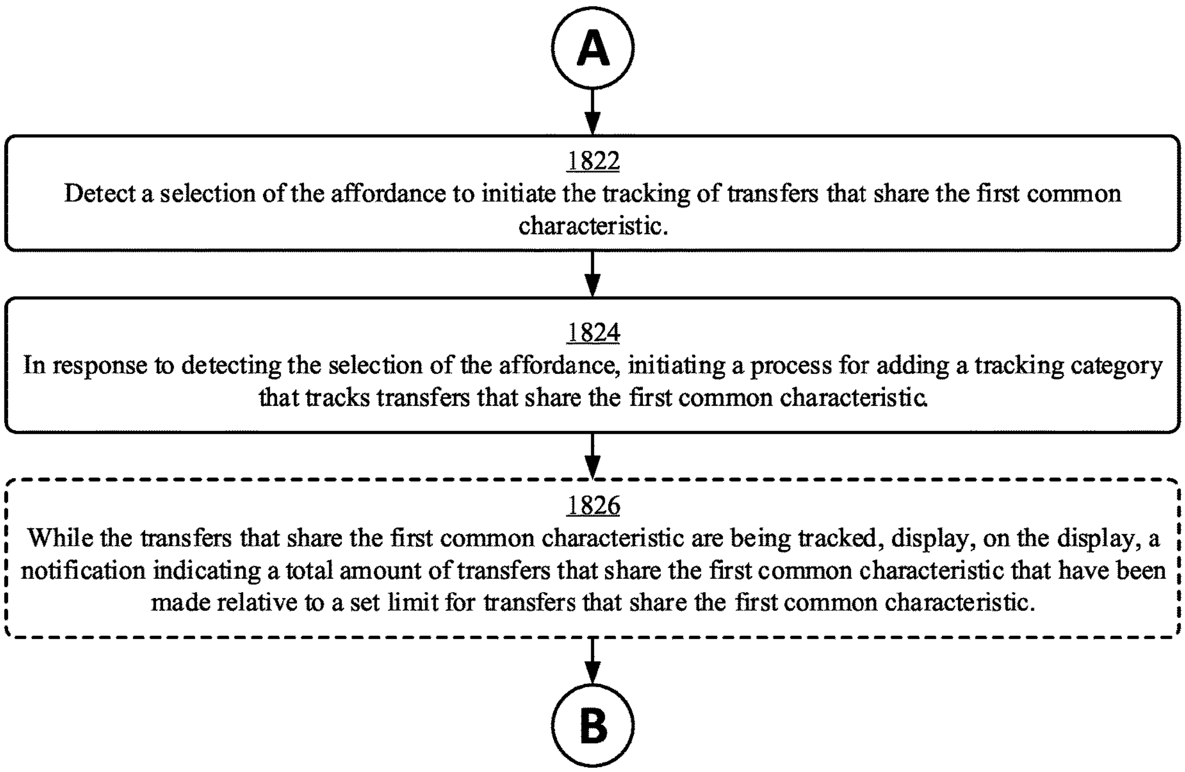
Figure 18C:
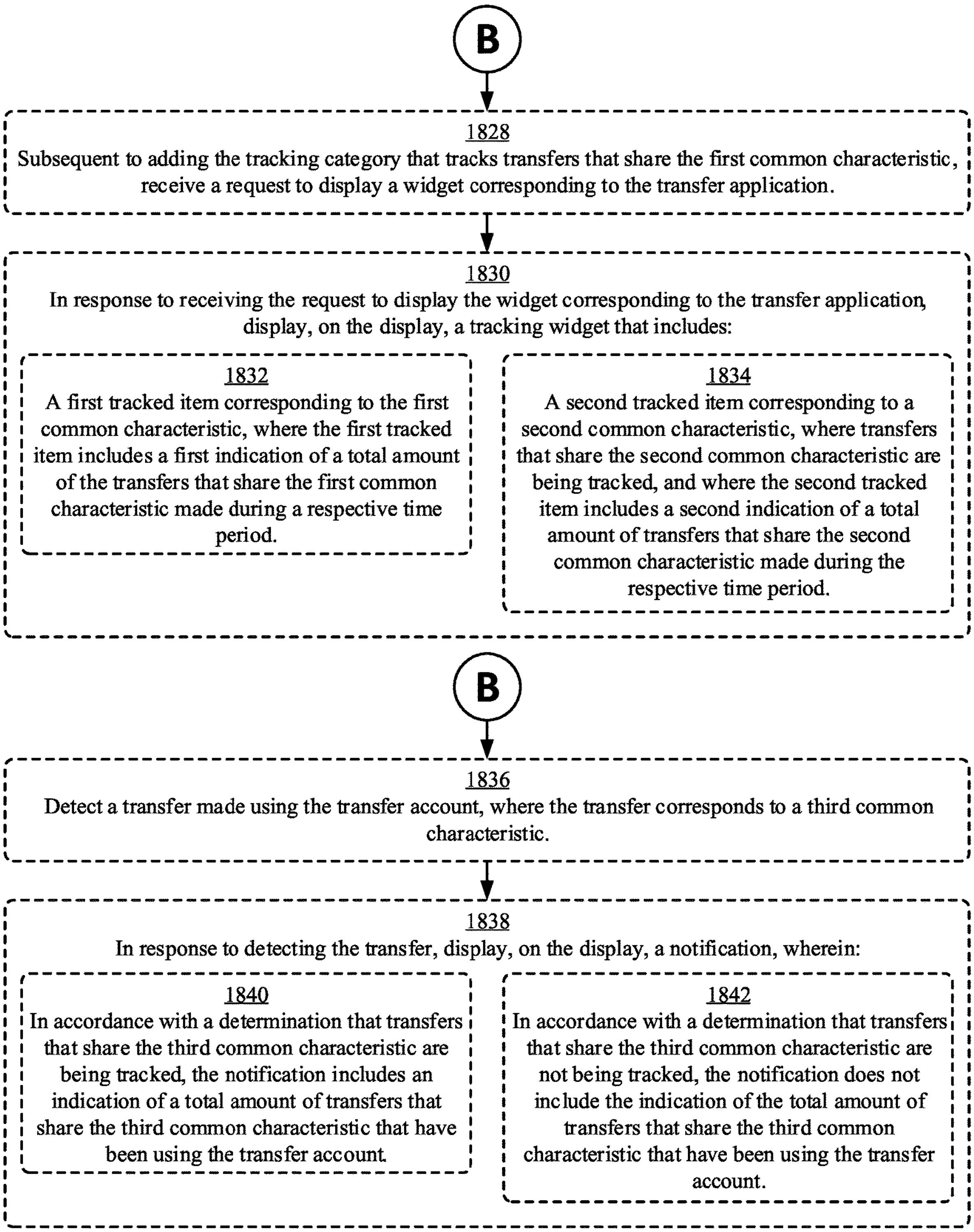
Figure 18F:
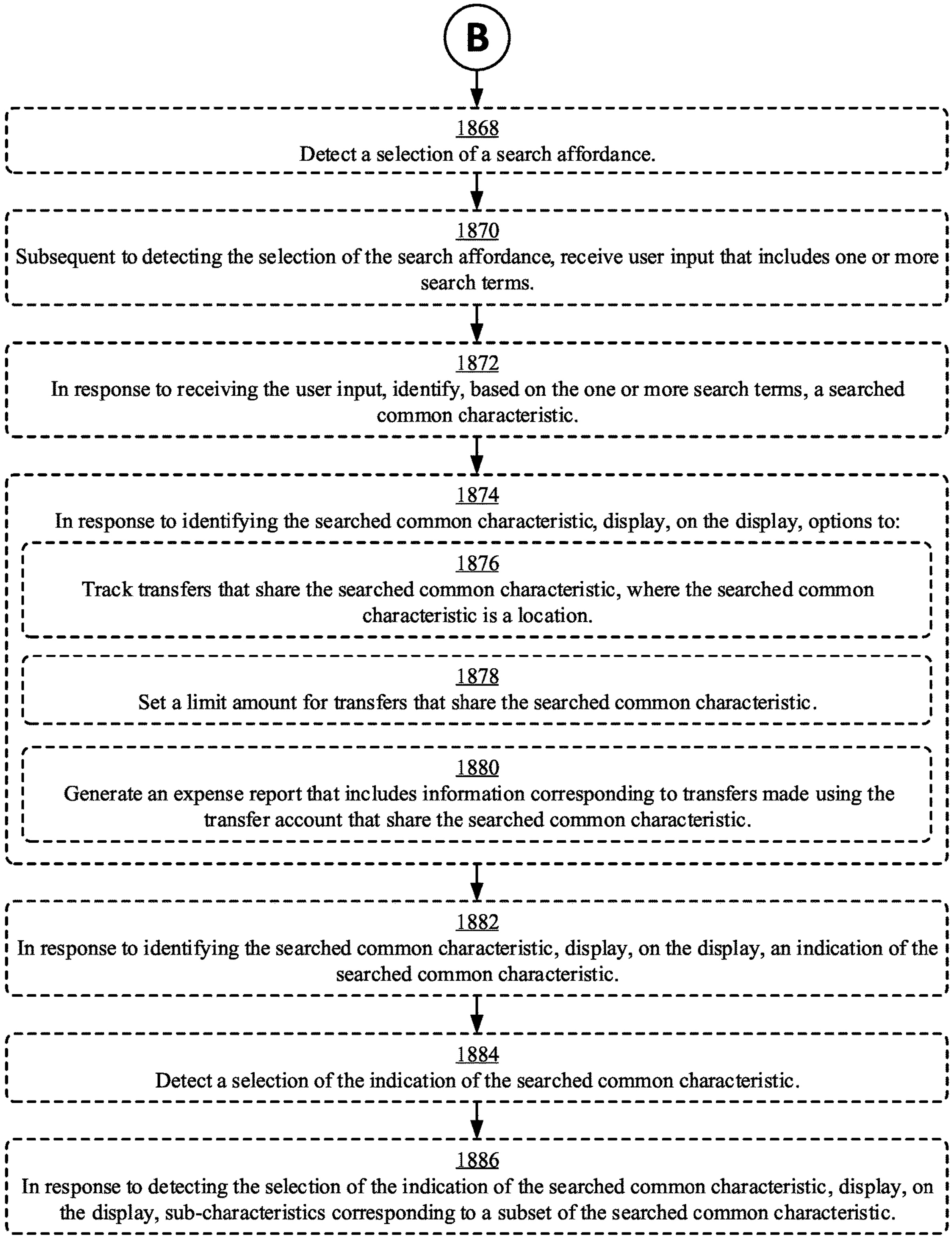
Figure 19A:
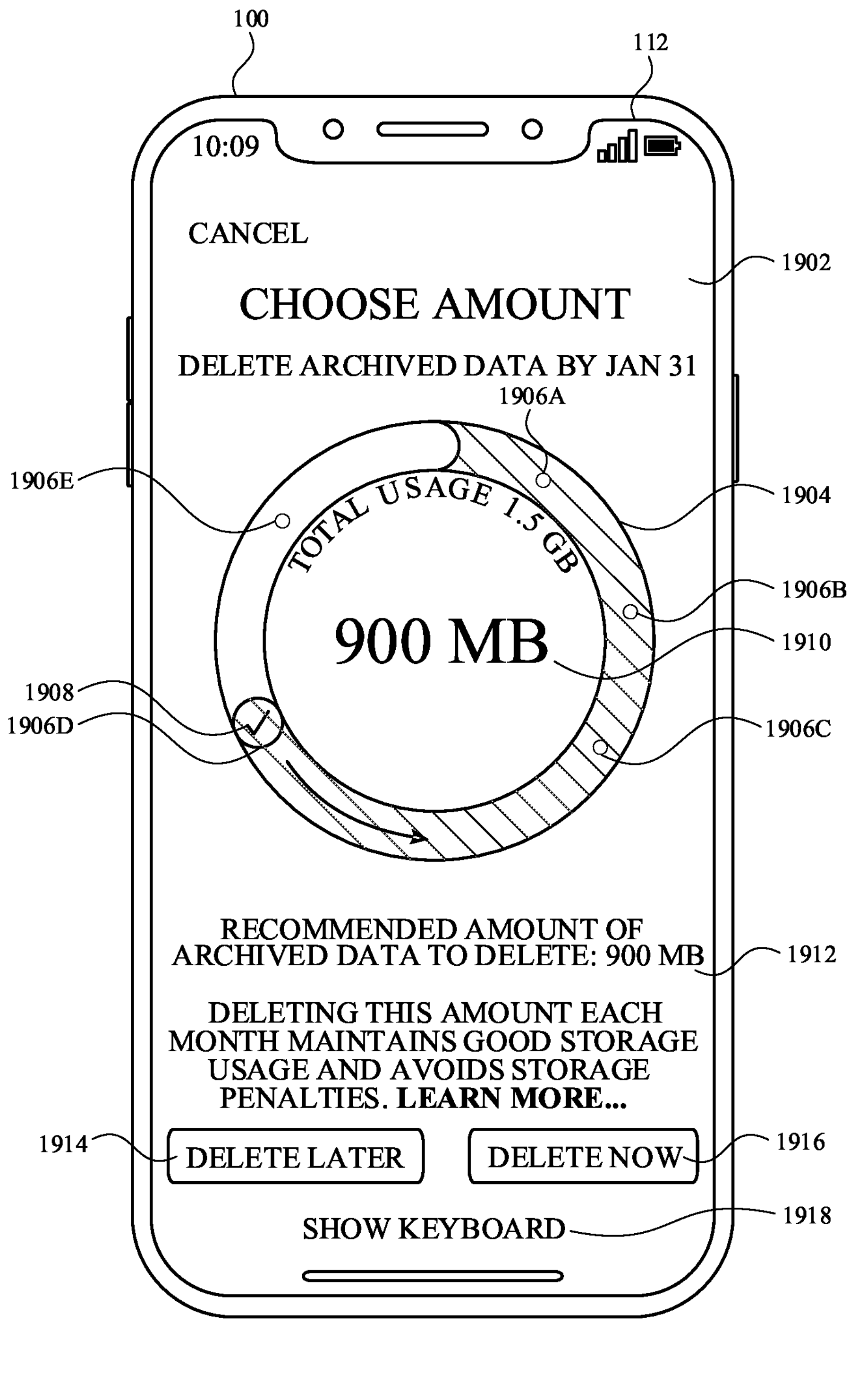
FIGS. 19A-19B illustrate exemplary user interfaces for managing a selection of a numerical value, in accordance with some embodiments.
Figure 19B:
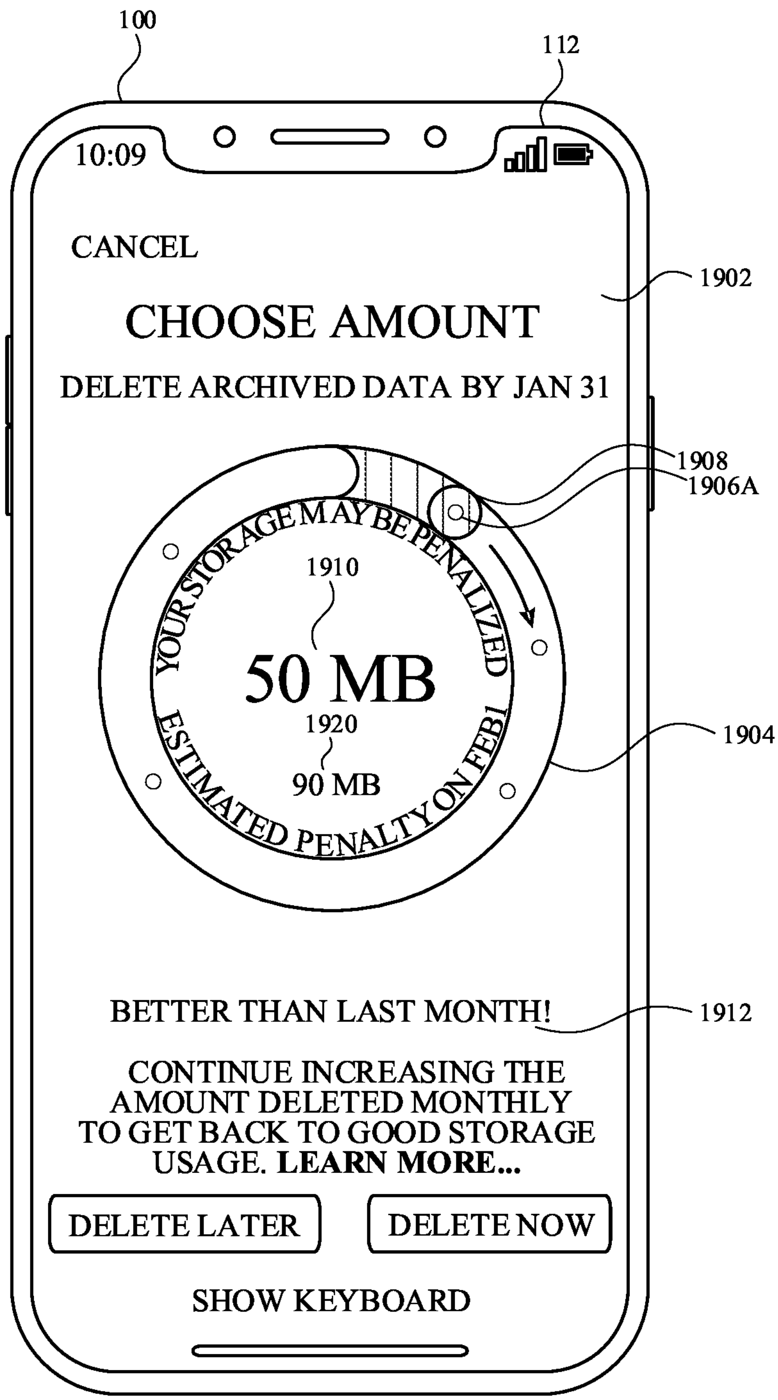
Figure 20A:
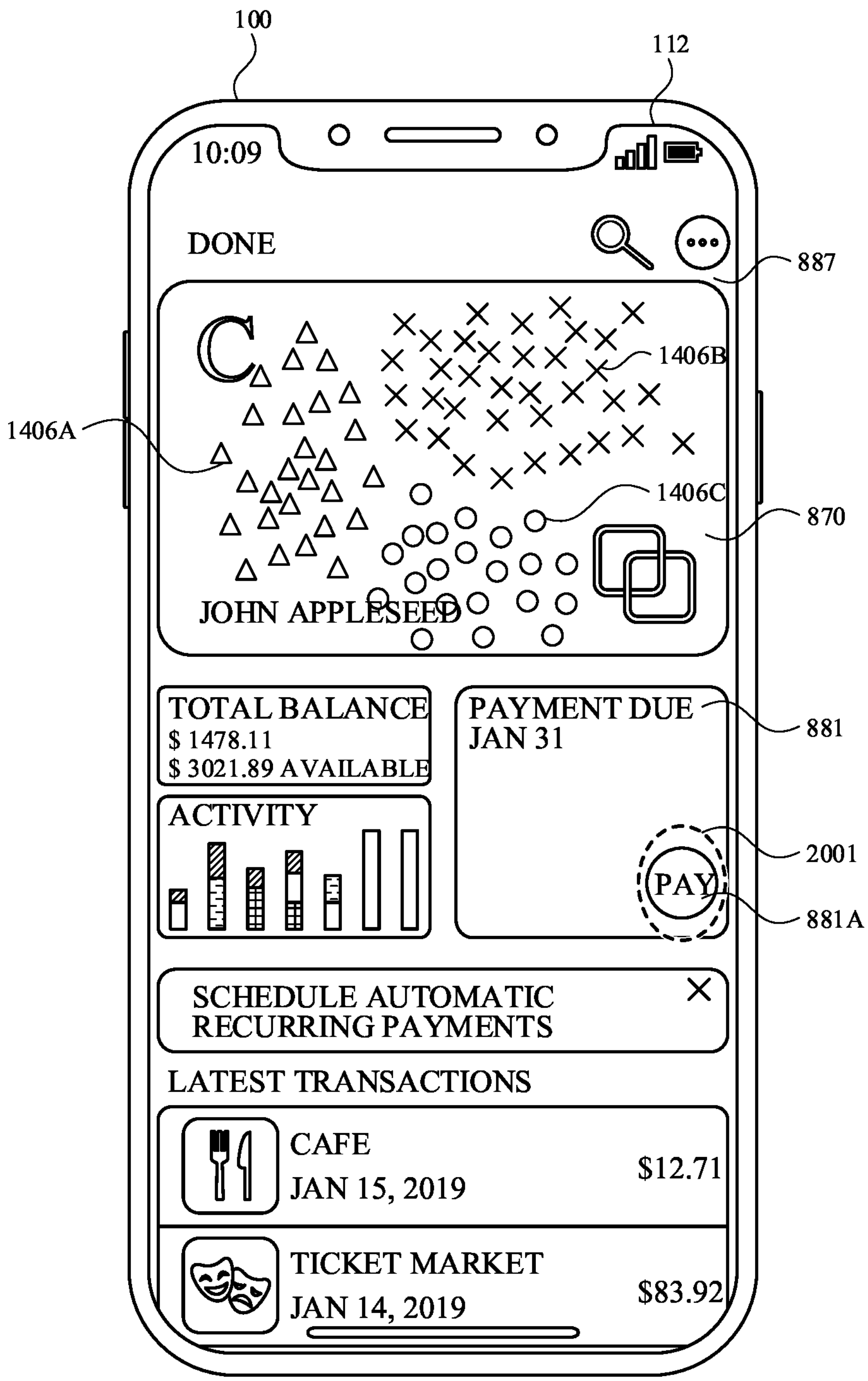
FIGS. 20A-20AF illustrate exemplary user interfaces for managing a transfer of items, in accordance with some embodiments.
Figure 22A:
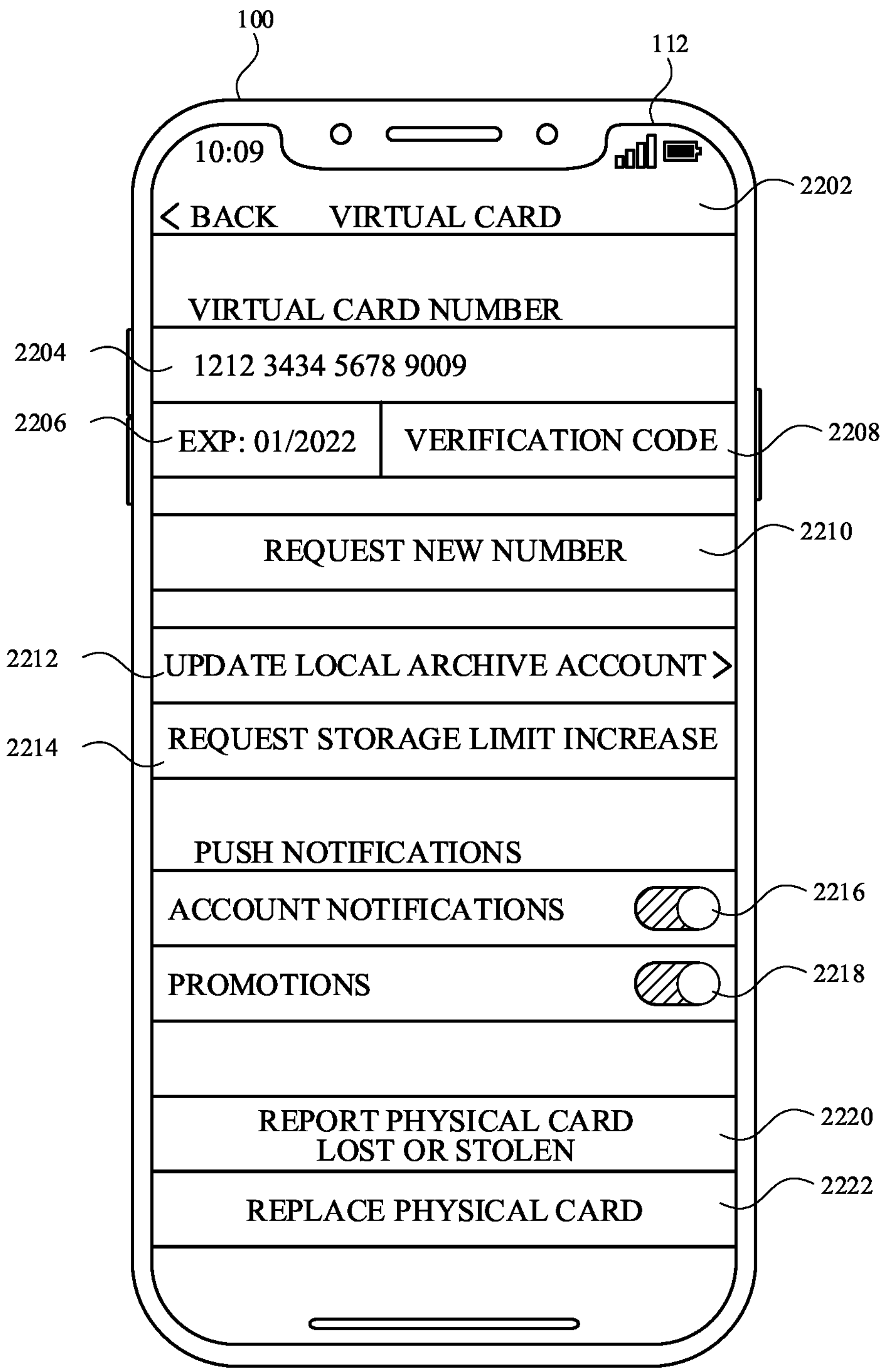
FIGS. 22A-22B illustrate exemplary user interfaces for managing an authentication credential connected with a user account, in accordance with some embodiments.
Figure 22B:
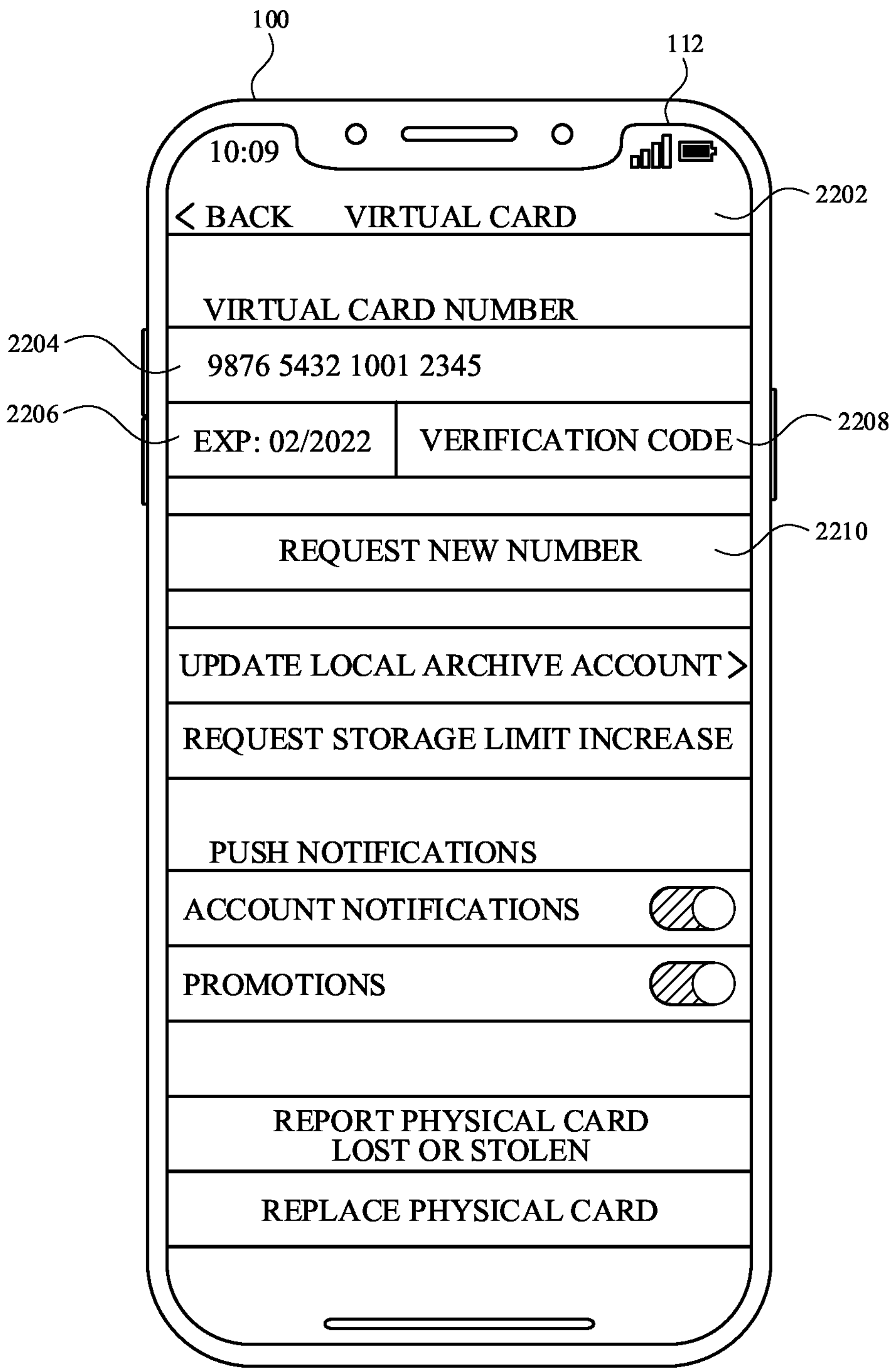
Figure 24A:
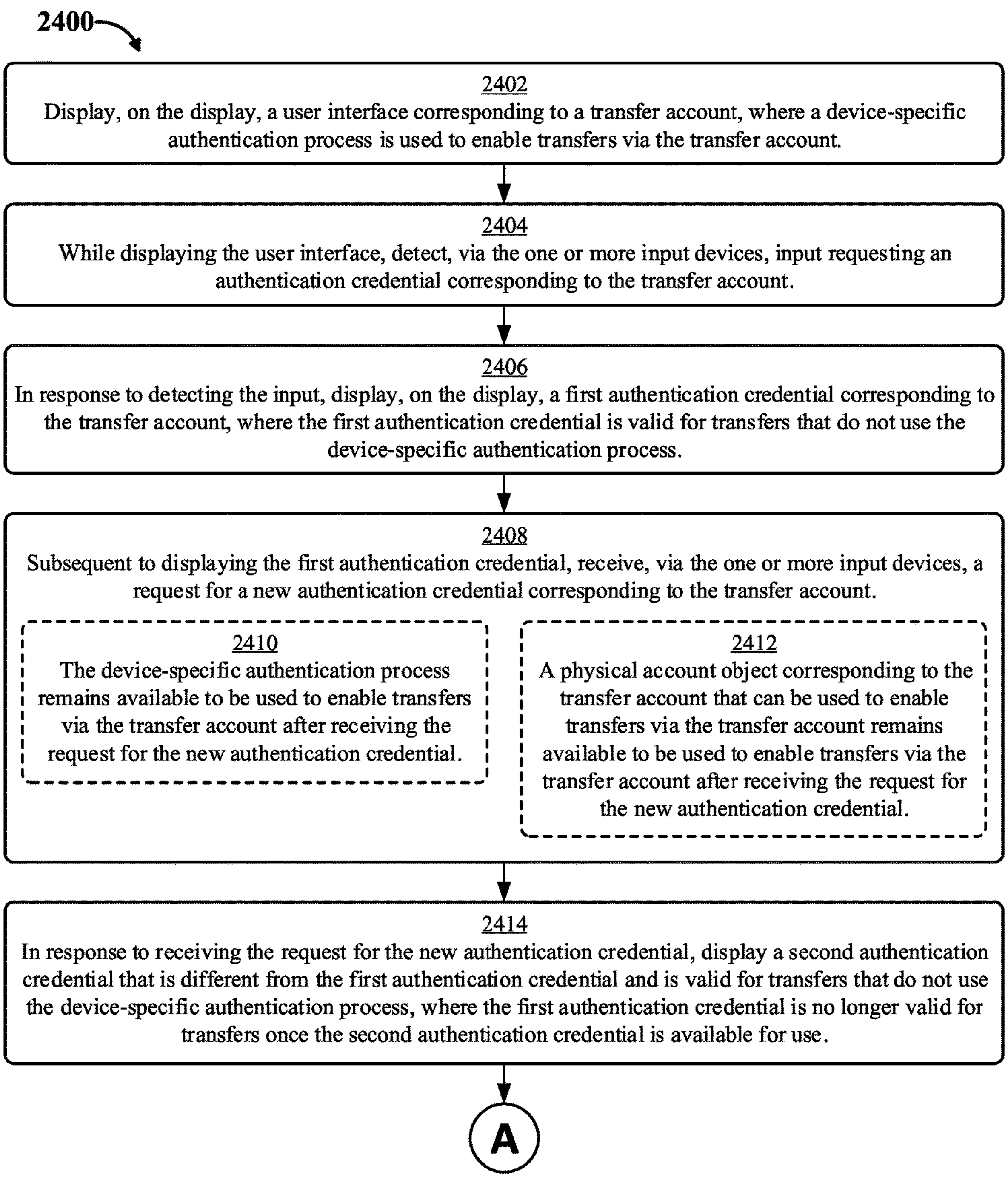
Figure 24B:
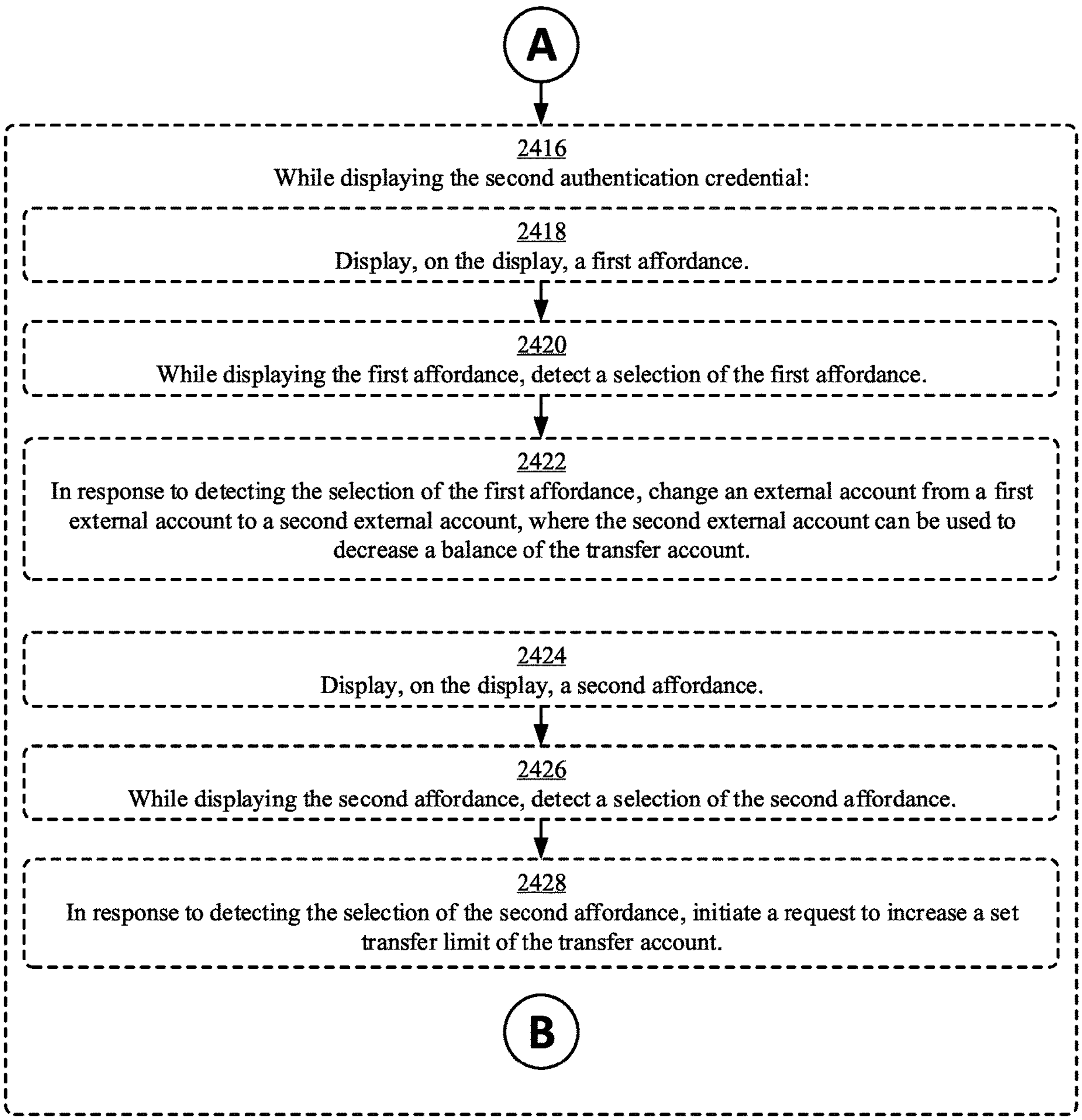
Figure 24C:
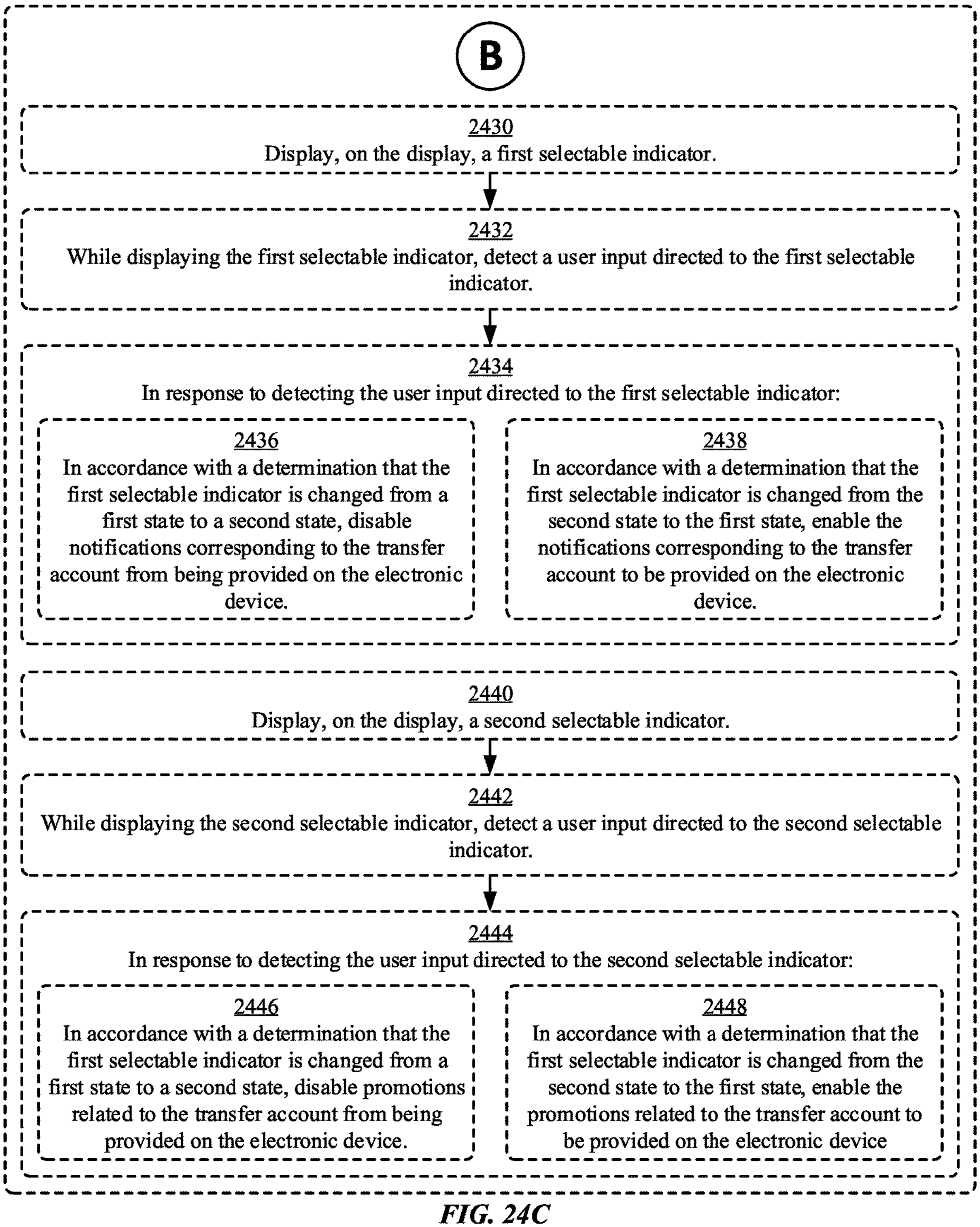
Figure 24E:
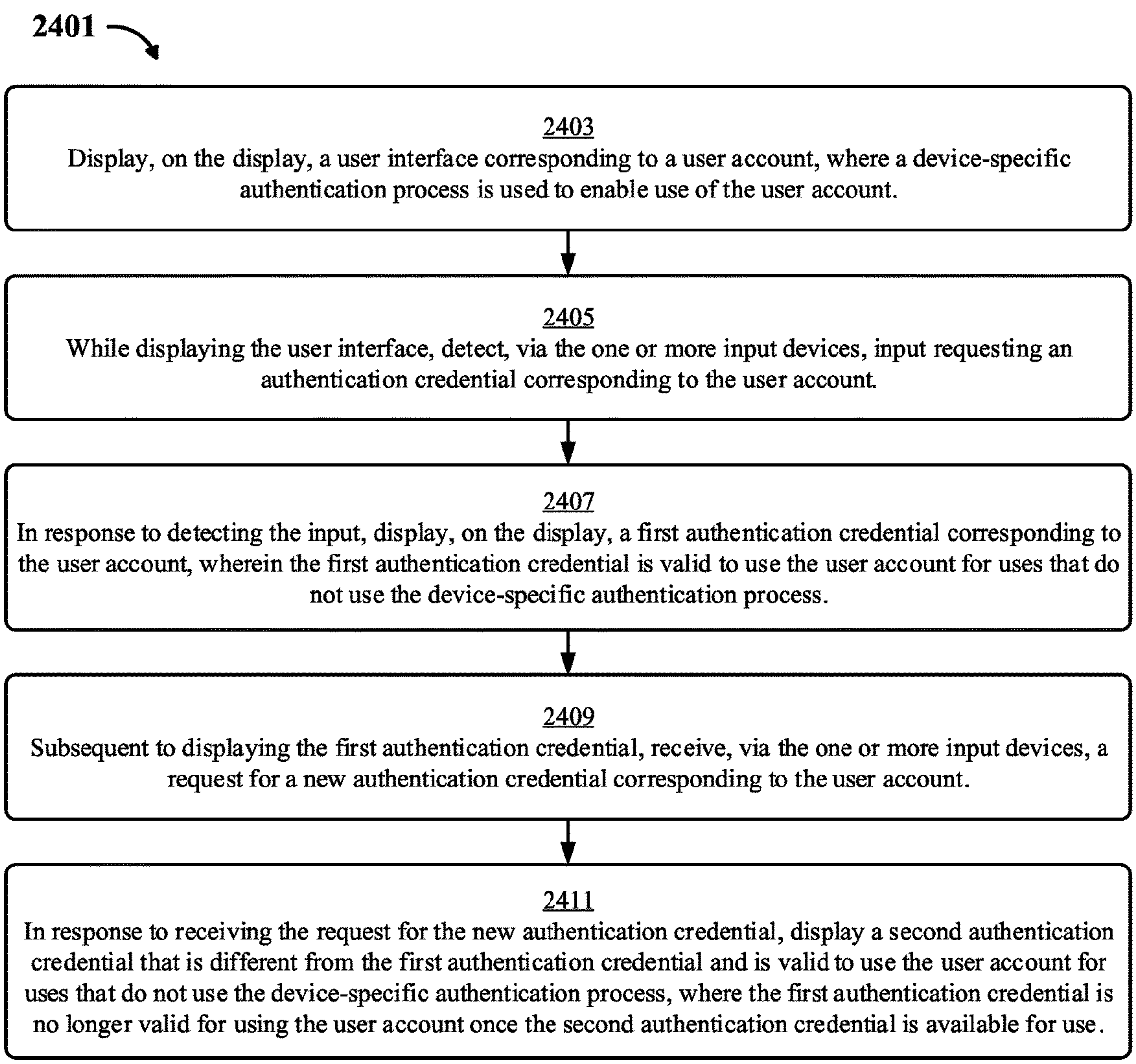
FIG. 24E is a flow diagram illustrating a method for managing an authentication credential connected with a user account, in accordance with some embodiments.
Figure 25:
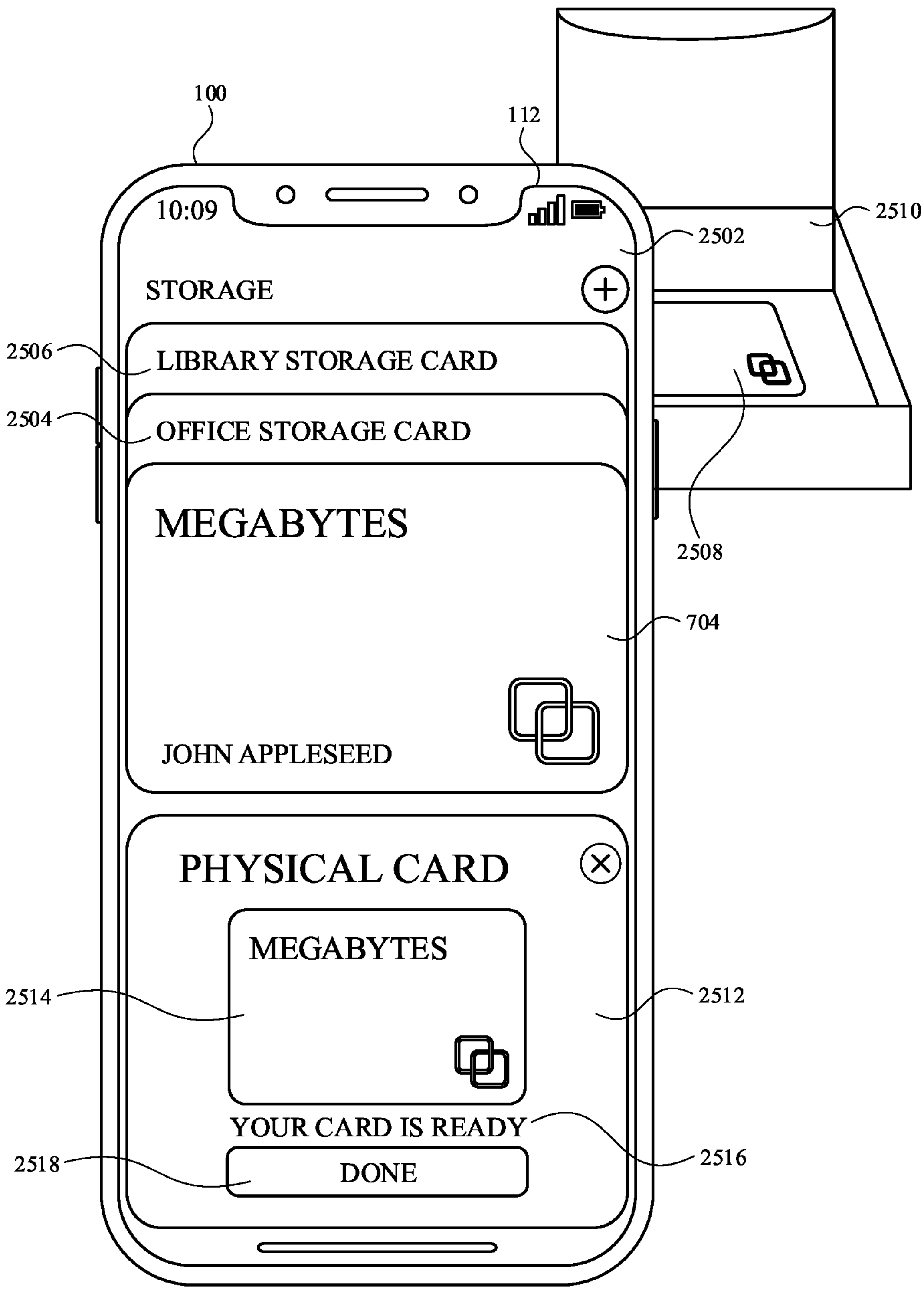
FIG. 25 illustrates an exemplary user interface for activating a physical account object, in accordance with some embodiments.
Figure 26A:
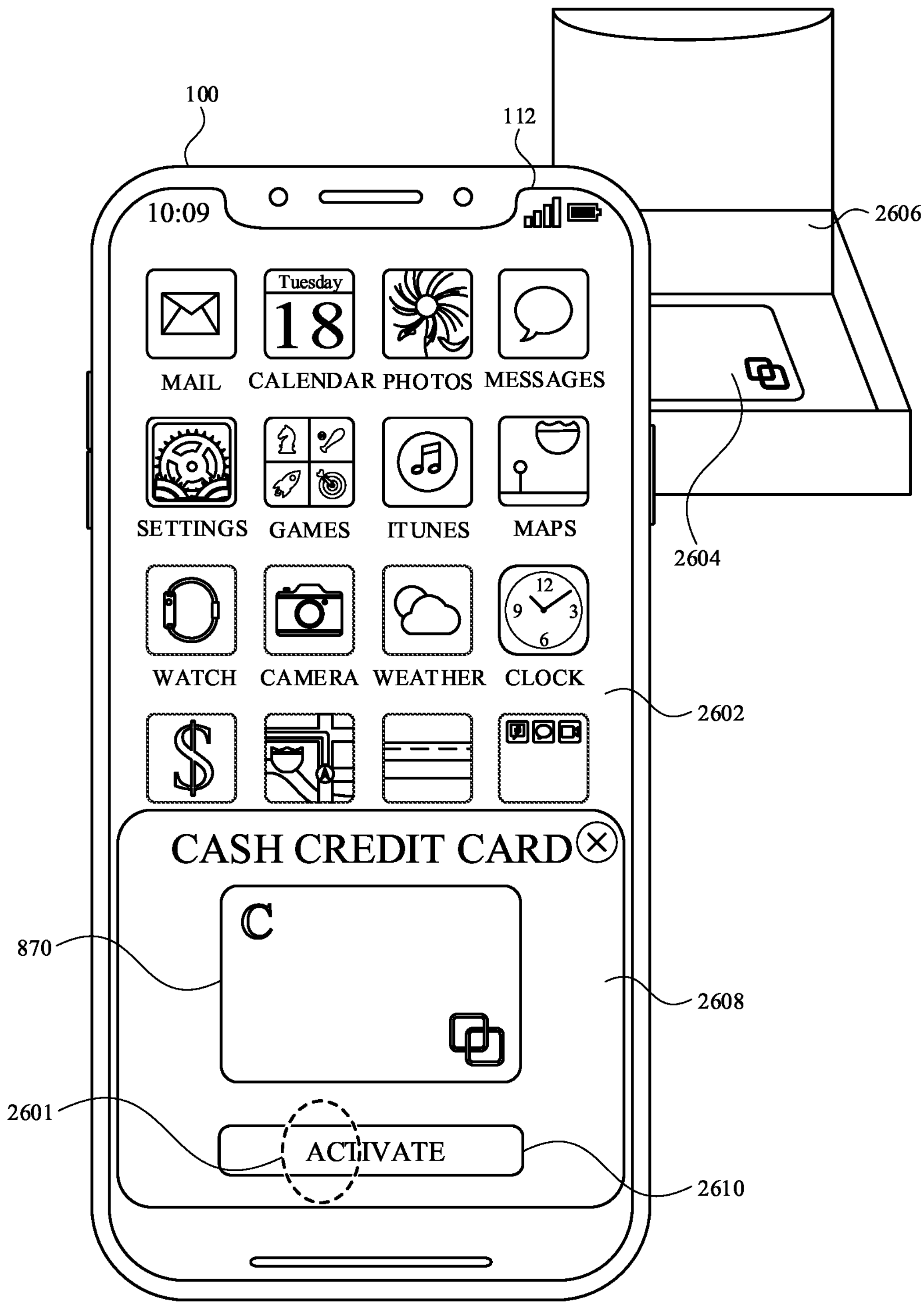
FIGS. 26A-26N illustrate exemplary user interfaces for activating a physical account object, in accordance with some embodiments.
Figure 26N:
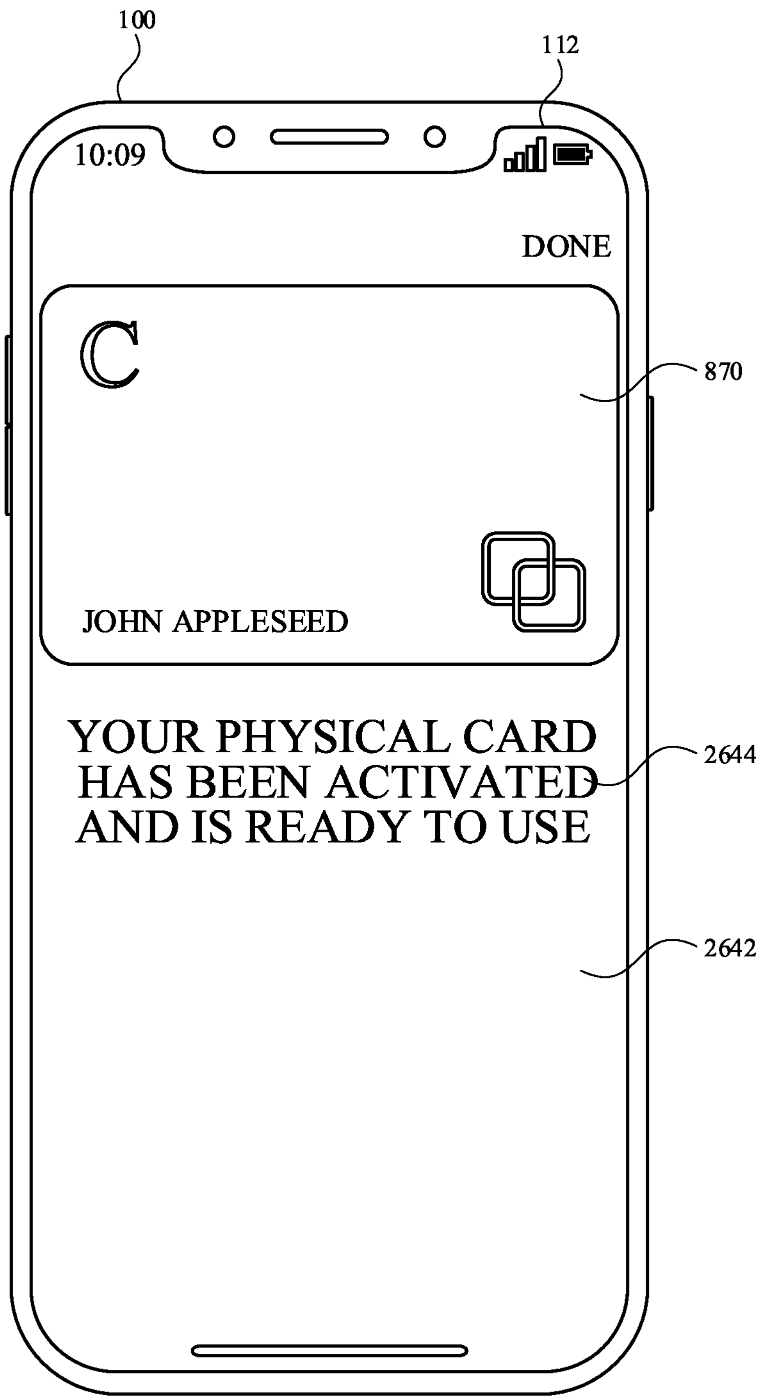
Figure 27A:
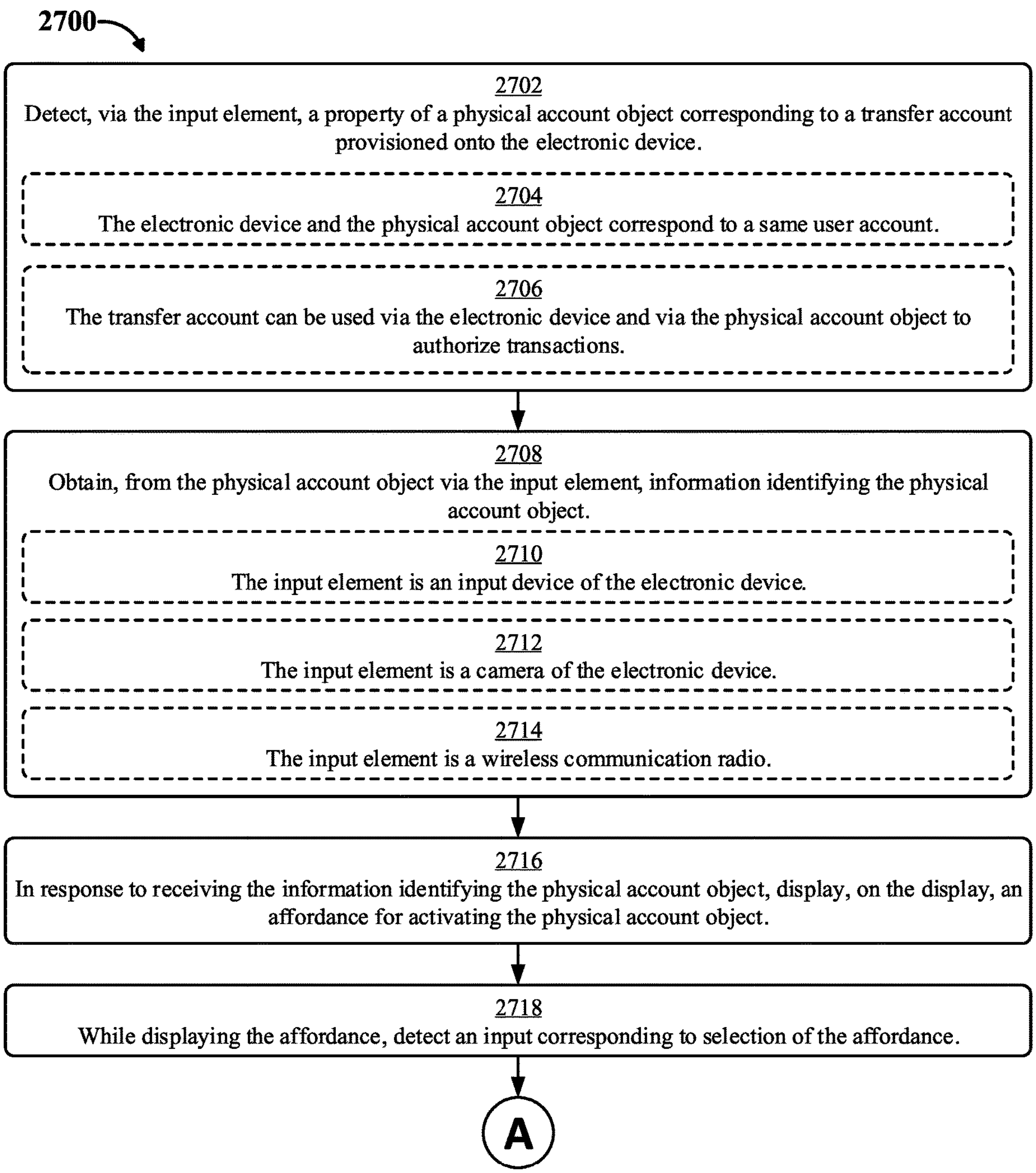
Figure 28A:
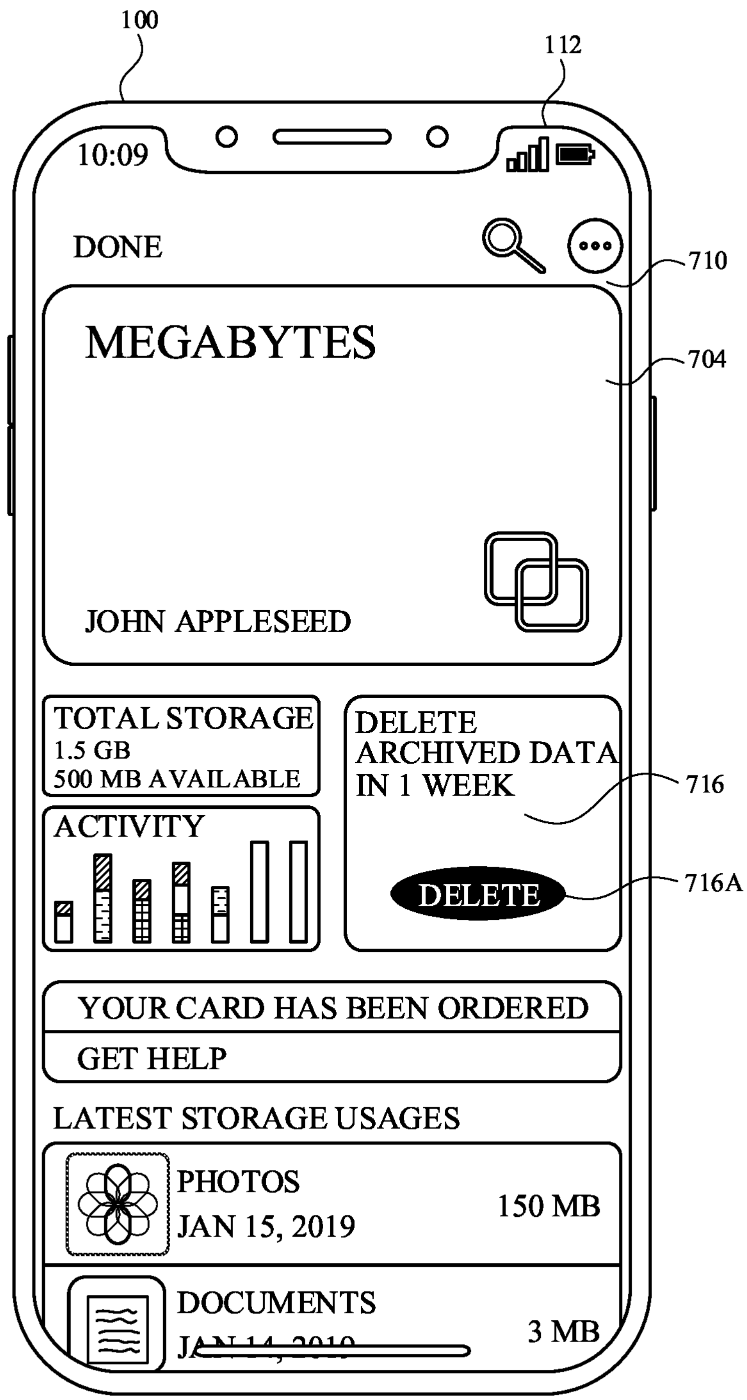
FIGS. 28A-28B illustrate exemplary user interfaces for managing account operations, in accordance with some embodiments.
Figure 28B:
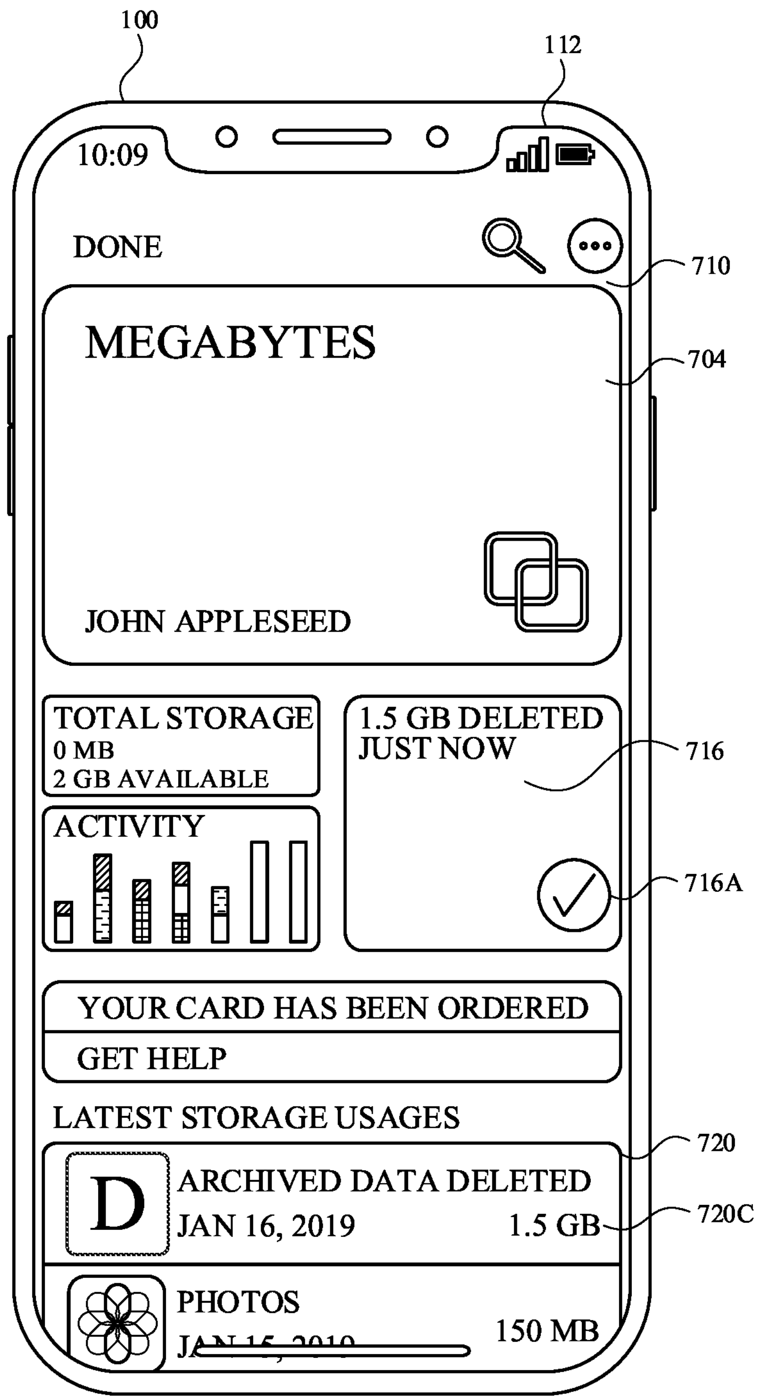

Below, FIGS. 1A-1B, 2, 3, 4A-4B, 5A-5B, and 6 provide a description of exemplary devices for performing the techniques for managing event notifications. FIGS. 7A-7B illustrate exemplary user interfaces for provisioning an electronic device with a user account, in accordance with some embodiments. FIGS. 8A-8V illustrate exemplary user interfaces for provisioning an electronic device with a transfer account, in accordance with some embodiments. FIGS. 9A-9C are a flow diagram illustrating a method for user interfaces for provisioning an electronic device with a transfer account, in accordance with some embodiments. FIG. 9D is a flow diagram illustrating a method for provisioning an electronic device with a user account, in accordance with some embodiments. The user interfaces in FIGS. 7A-7B and FIGS. 8A-8V are used to illustrate the processes described below, including the processes in FIGS. 9A-9C and FIG. 9D. FIGS. 10A-10B illustrate exemplary user interfaces for providing usage information of a user account, in accordance with some embodiments. FIGS. 11A-11O illustrate exemplary user interfaces for providing usage information of a transfer account, in accordance with some embodiments. FIGS. 12A-12D are a flow diagram illustrating a method for providing usage information of a transfer account, in accordance with some embodiments. FIG. 12E is a flow diagram illustrating a method for providing usage information of a user account, in accordance with some embodiments. The user interfaces in FIGS. 10A-10B and FIGS. 11A-11O are used to illustrate the processes described below, including the processes in FIGS. 12A-12D and FIG. 12E. FIGS. 13A-13B illustrate exemplary user interfaces for providing visual feedback on a representation of a user account, in accordance with some embodiments. FIGS. 14A-14U illustrate exemplary user interfaces for providing visual feedback on a representation of a transfer account, in accordance with some embodiments. FIGS. 15A-15D are a flow diagram illustrating a method for providing visual feedback on a representation of a transfer account, in accordance with some embodiment. FIG. 15E is a flow diagram illustrating a method for providing visual feedback on a representation of a user account, in accordance with some embodiments. The user interfaces in FIGS. 13A-13B and FIGS. 14A-14U are used to illustrate the processes described below, including the processes in FIGS. 15A-15D and FIG. 15E. FIGS. 16A-16B illustrate exemplary user interfaces for managing the tracking of a usage category, in accordance with some embodiments. FIGS. 17A-17K illustrate exemplary user interfaces for managing the tracking of a transfer category, in accordance with some embodiments. FIGS. 18A-18F are a flow diagram illustrating a method for managing the tracking of a transfer category, in accordance with some embodiments. FIG. 18G is a flow diagram illustrating a method for managing the tracking of a usage category, in accordance with some embodiments. The user interfaces in FIGS. 16A-16B and FIGS. 17A-17K are used to illustrate the processes described below, including the processes in FIGS. 18A-18F and FIG. 18G. FIGS. 19A-19B illustrate exemplary user interfaces for managing a selection of a numerical value, in accordance with some embodiments. FIGS. 20A-20AF illustrate exemplary user interfaces for managing a transfer of items, in accordance with some embodiments. FIGS. 21A-21F are a flow diagram illustrating a method for managing a transfer of items, in accordance with some embodiments. The user interfaces in FIGS. 19A-19B and FIGS. 20A-20AF are used to illustrate the processes described below, including the processes in FIGS. 21A-21F. FIGS. 22A-22B illustrate exemplary user interfaces for managing an authentication credential connected with a user account, in accordance with some embodiments. FIGS. 23A-23G illustrate exemplary user interfaces for managing an authentication credential connected with a transfer account, in accordance with some embodiments. FIGS. 24A-24D are a flow diagram illustrating a method for managing an authentication credential connected with a transfer account, in accordance with some embodiments. FIG. 24E is a flow diagram illustrating a method for managing an authentication credential connected with a user account, in accordance with some embodiments. The user interfaces in FIGS. 22A-22B and FIGS. 23A-23G are used to illustrate the processes described below, including the processes in FIGS. 24A-24D and FIG. 24E. FIG. 25 illustrates an exemplary user interface for activating a physical account object, in accordance with some embodiments. FIGS. 26A-26N illustrate exemplary user interfaces for activating a physical account object, in accordance with some embodiments. FIGS. 27A-27B are a flow diagram illustrating a method for managing an authentication credential connected with a transfer account, in accordance with some embodiments. FIG. 27C is a flow diagram illustrating a method for managing an authentication credential connected with the user account, in accordance with some embodiments. The user interfaces in FIG. 25 and FIGS. 26A-26N are used to illustrate the processes described below, including the processes in FIGS. 27A-27B and FIG. 27C. FIGS. 28A-28B illustrate exemplary user interfaces for managing account operations, in accordance with some embodiments. FIGS. 29A-29J illustrate exemplary user interfaces for managing balance transfers, in accordance with some embodiments. FIGS. 30A-30B are a flow diagram illustrating a method for managing balance transfers, in accordance with some embodiments. The user interfaces in FIGS. 28A-28B and FIGS. 29A-29J are used to illustrate the processes described below, including the processes in FIGS. 30A-30B. FIGS. 31A-31F illustrate exemplary user interfaces for initiating activation of a transfer account based on a purchase of an item, in accordance with some embodiments.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
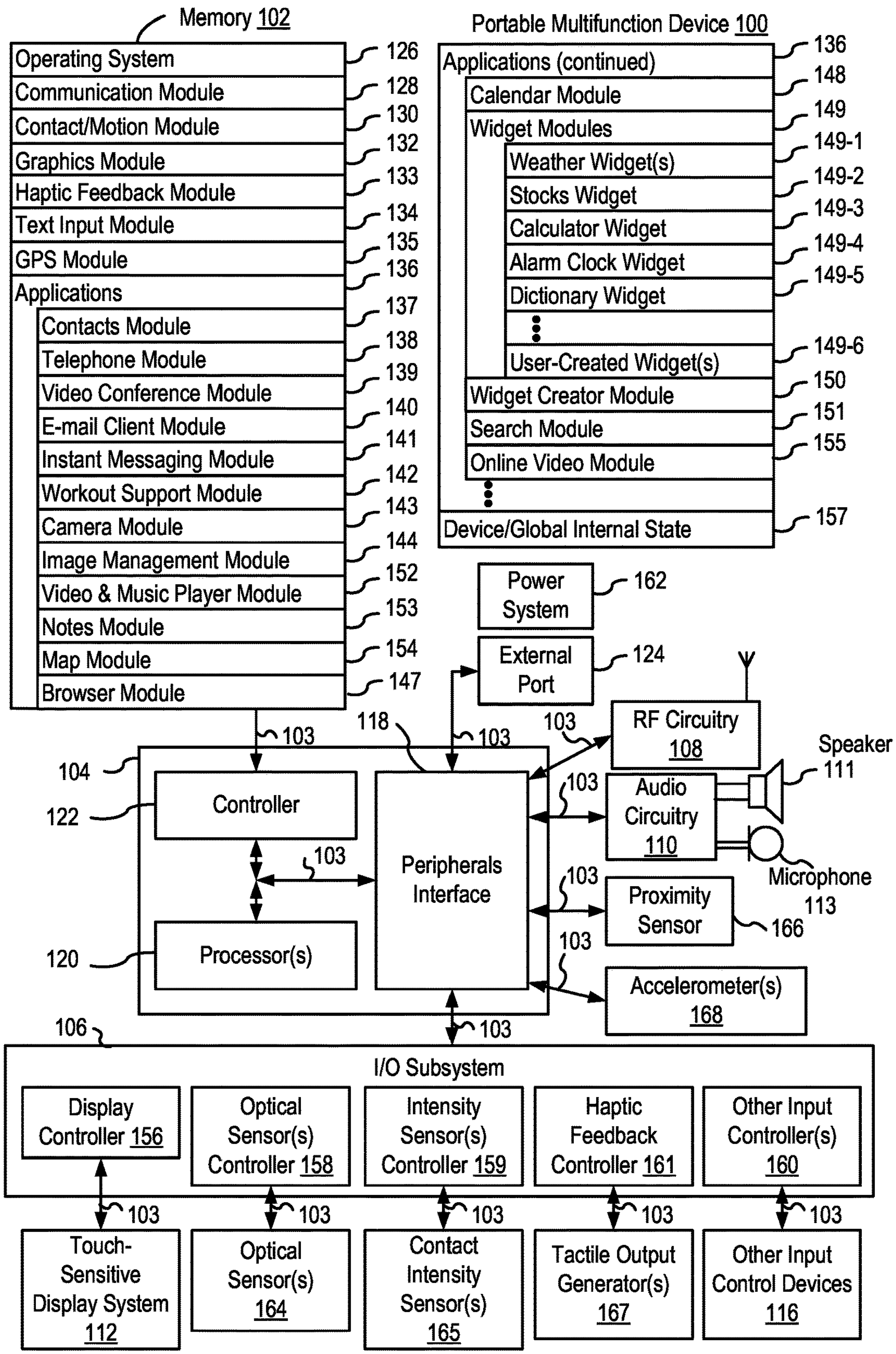
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

In some embodiments, a depth map (e.g., depth map image) contains information (e.g., values) that relates to the distance of objects in a scene from a viewpoint (e.g., a camera, an optical sensor, a depth camera sensor). In one embodiment of a depth map, each depth pixel defines the position in the viewpoint's Z-axis where its corresponding two-dimensional pixel is located. In some embodiments, a depth map is composed of pixels wherein each pixel is defined by a value (e.g., 0-255). For example, the "0" value represents pixels that are located at the most distant place in a "three dimensional" scene and the "255" value represents pixels that are located closest to a viewpoint (e.g., a camera, an optical sensor, a depth camera sensor) in the "three dimensional" scene. In other embodiments, a depth map represents the distance between an object in a scene and the plane of the viewpoint. In some embodiments, the depth map includes information about the relative depth of various features of an object of interest in view of the depth camera (e.g., the relative depth of eyes, nose, mouth, ears of a user's face). In some embodiments, the depth map includes information that enables the device to determine contours of the object of interest in a z direction.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
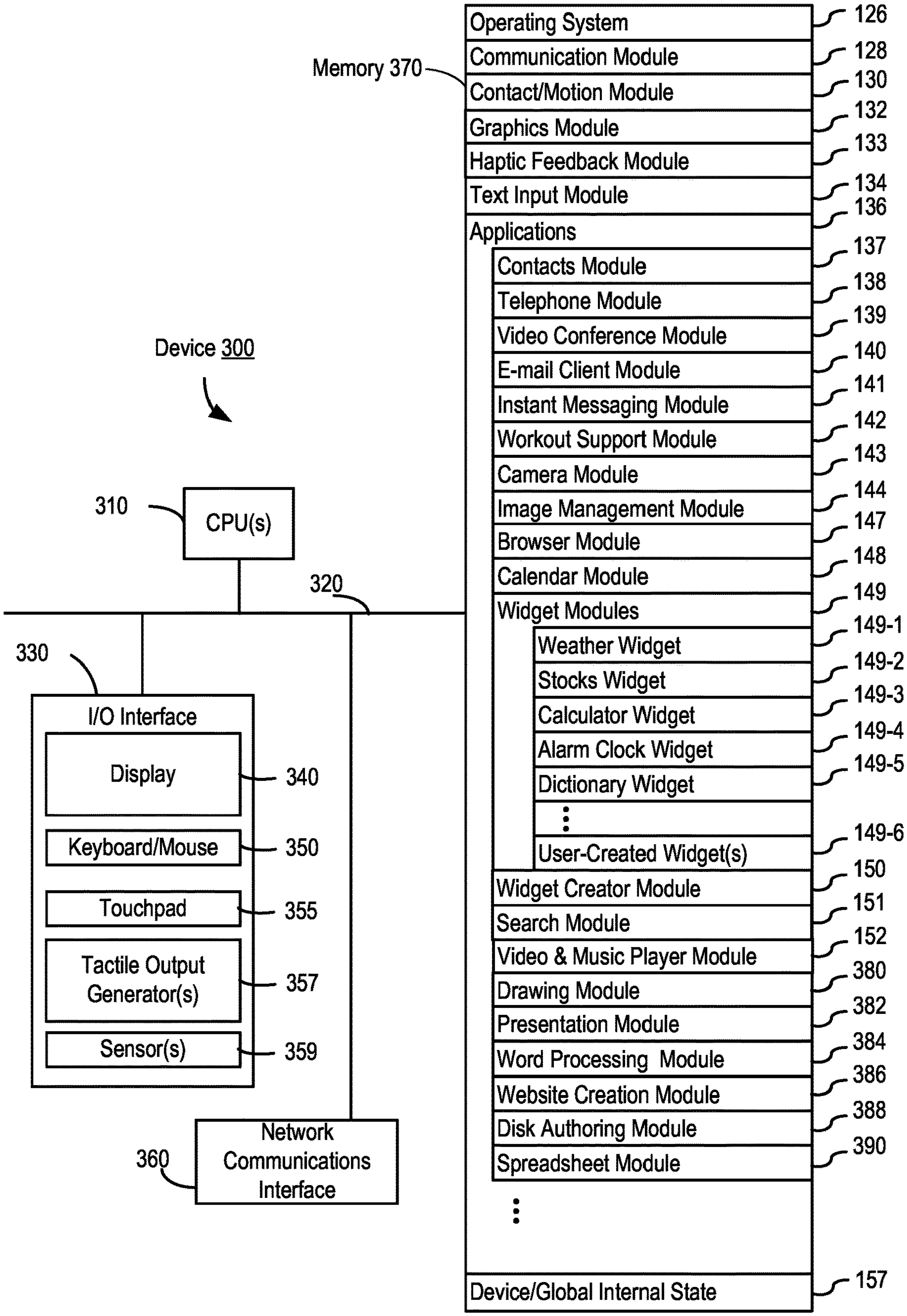
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:

- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data: calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
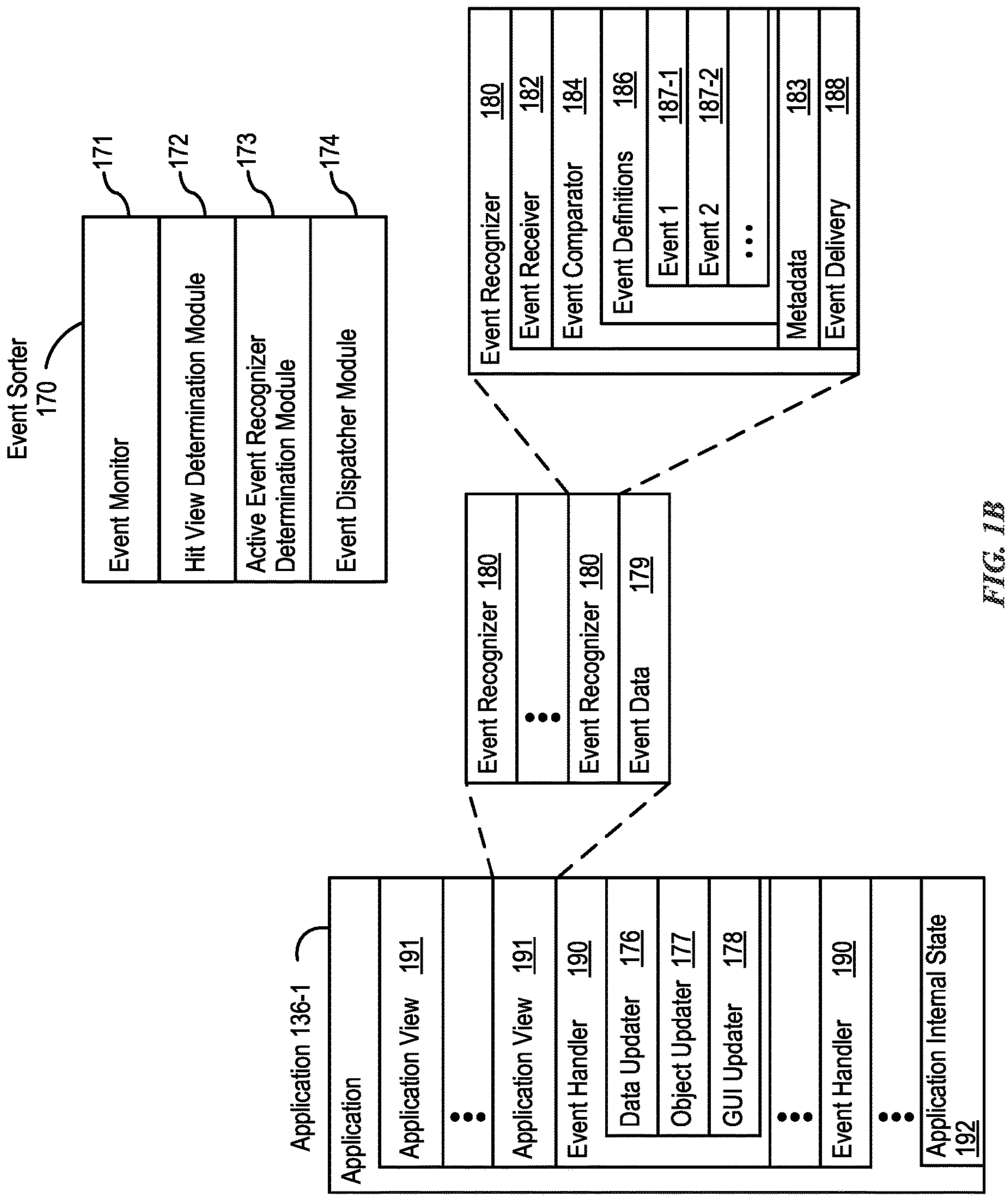
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
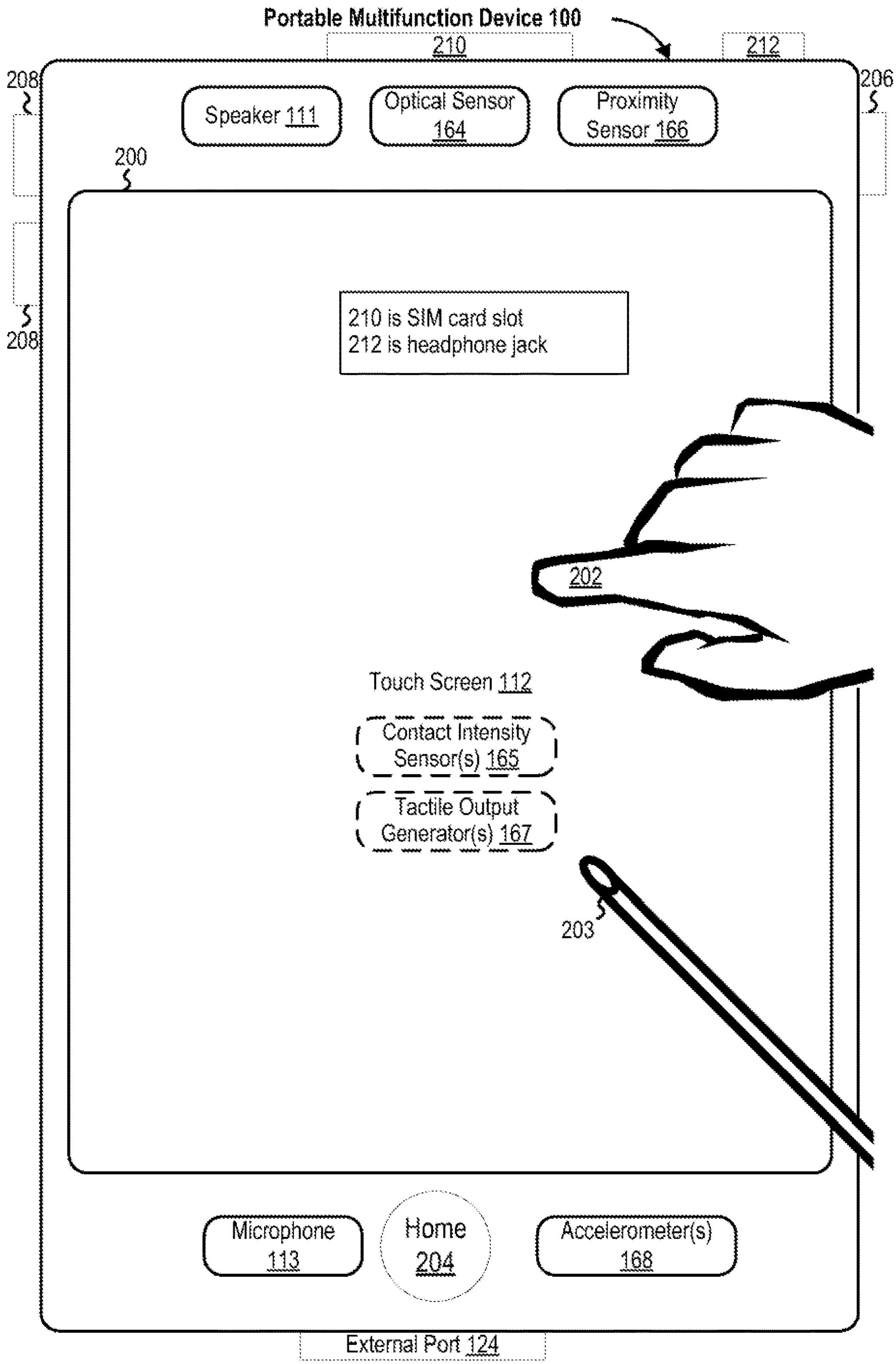
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
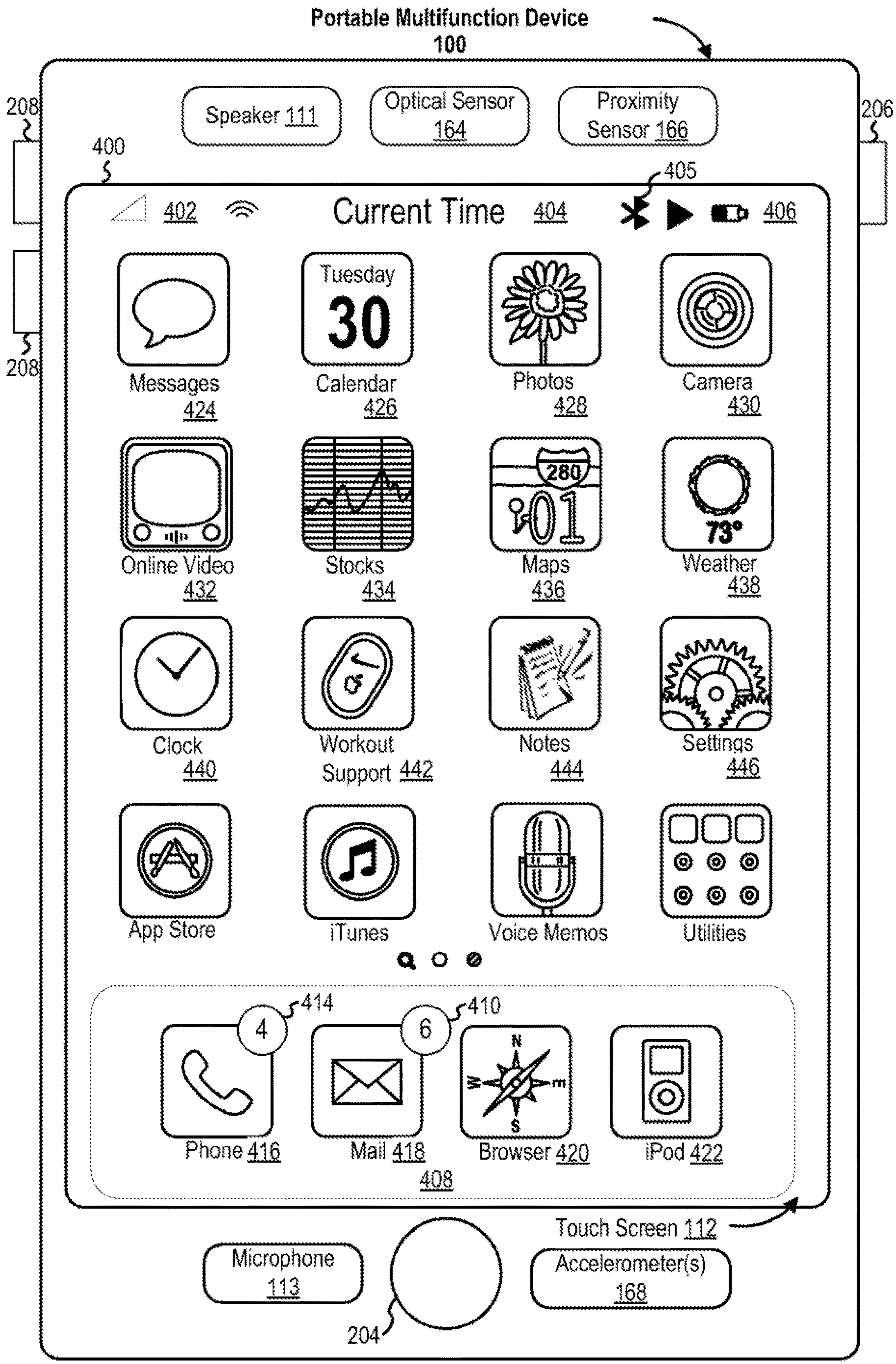
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser;" and
  - Icon 422 for video and music player module 152, also referred to as iPod (trademark of Apple Inc.) module 152, labeled "iPod," and
- Icons for other applications, such as:
  - Icon 424 for IM module 141, labeled "Messages;"
  - Icon 426 for calendar module 148, labeled "Calendar;"
  - Icon 428 for image management module 144, labeled "Photos;"
  - Icon 430 for camera module 143, labeled "Camera;"
  - Icon 432 for online video module 155, labeled "Online Video;"
  - Icon 434 for stocks widget 149-2, labeled "Stocks;"
  - Icon 436 for map module 154, labeled "Maps;"
  - Icon 438 for weather widget 149-1, labeled "Weather;"
  - Icon 440 for alarm clock widget 149-4, labeled "Clock;"

Icon 442 for workout support module 142, labeled "Workout Support;"

Icon 444 for notes module 153, labeled "Notes;" and

Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
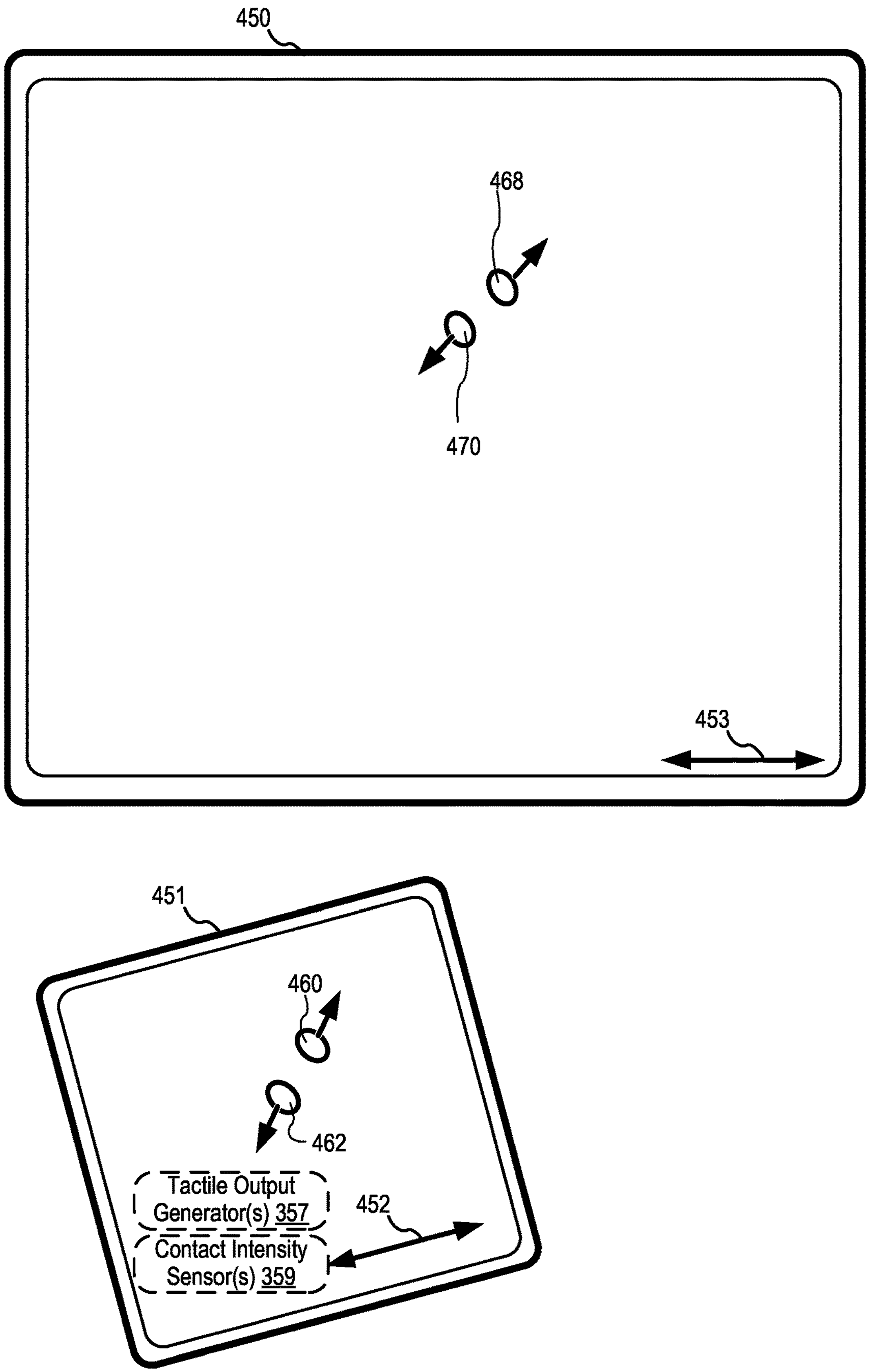
FIG. 4B illustrates an exemplary user interface for a multifunction device with a touch-sensitive surface that is separate from the display in accordance with some embodiments.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
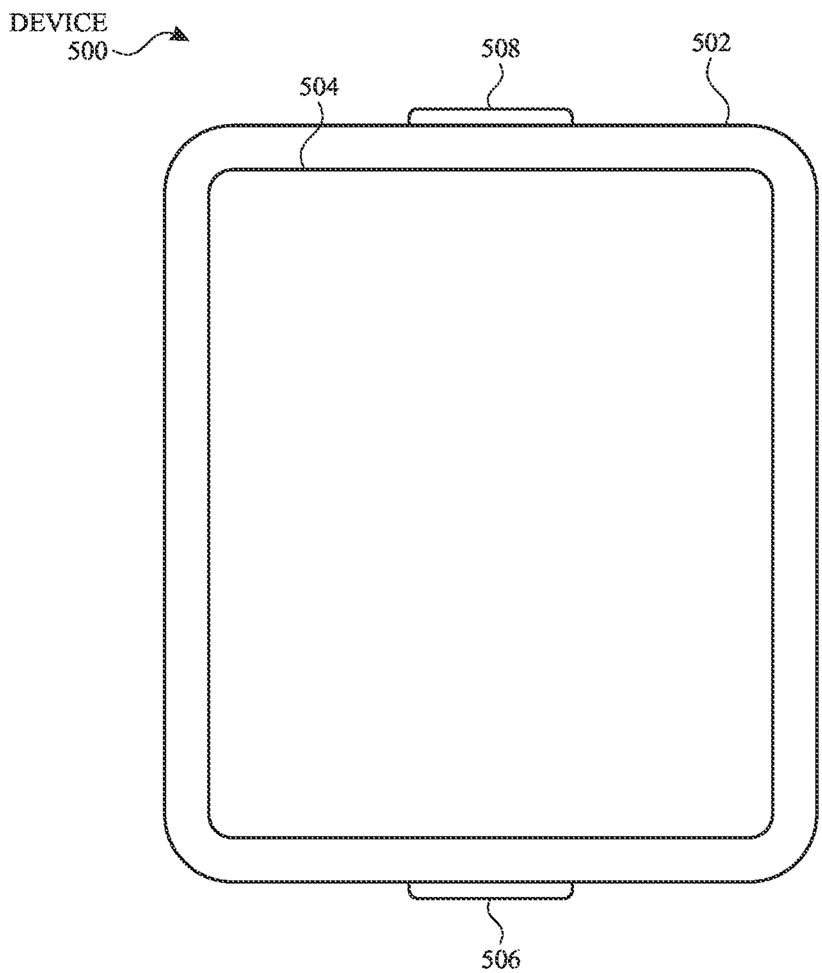
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
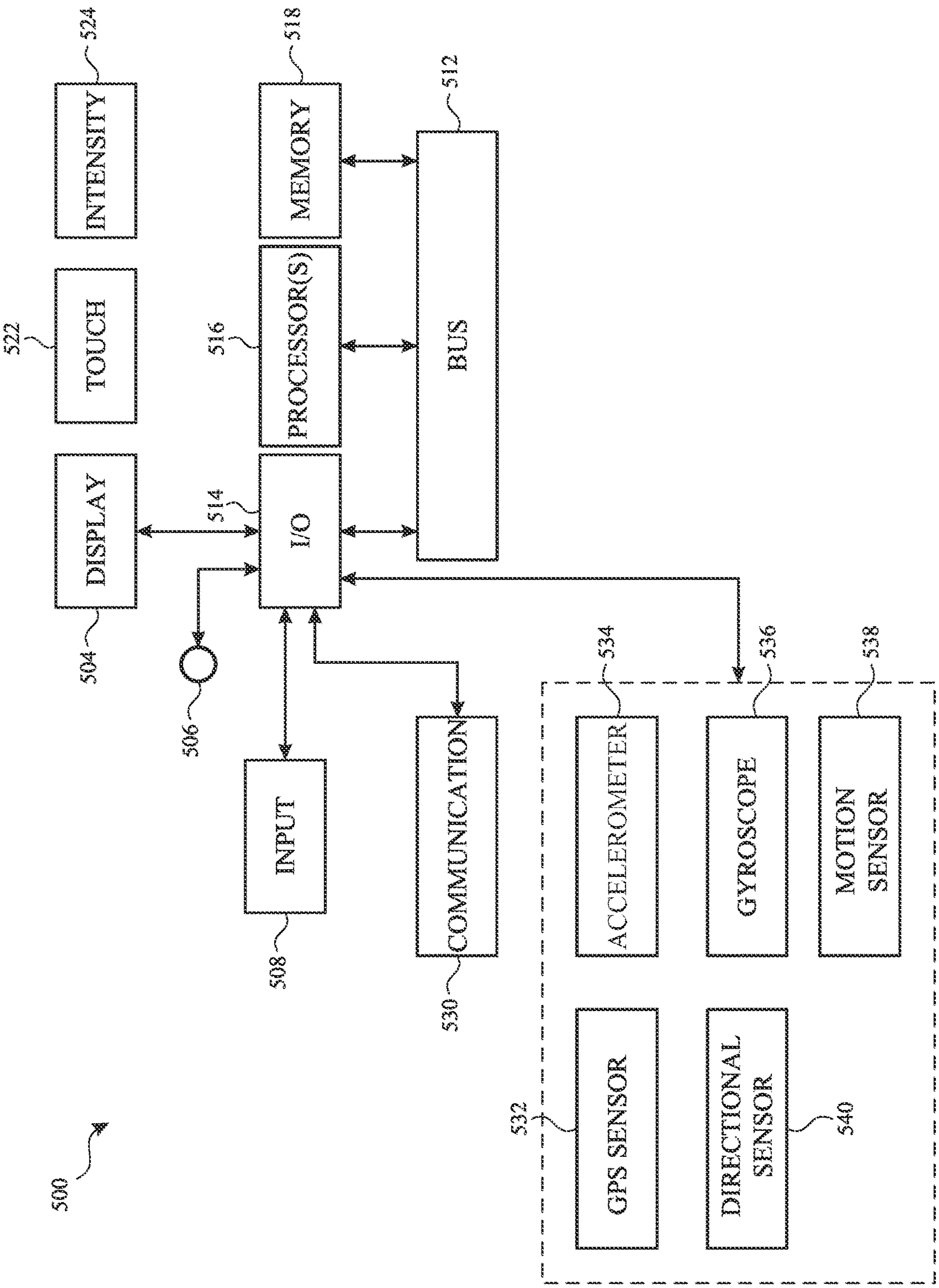
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes

900, 1200, 1500, 1800, 2100, 2400, 2700, and 3000 (FIGS. 9A-9C, 12A-12D, 15A-15D, 18A-18F, 21A-21F, 24A-24D, 27A-27B, and 30A-30B, respectively). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.5, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Figure 6:
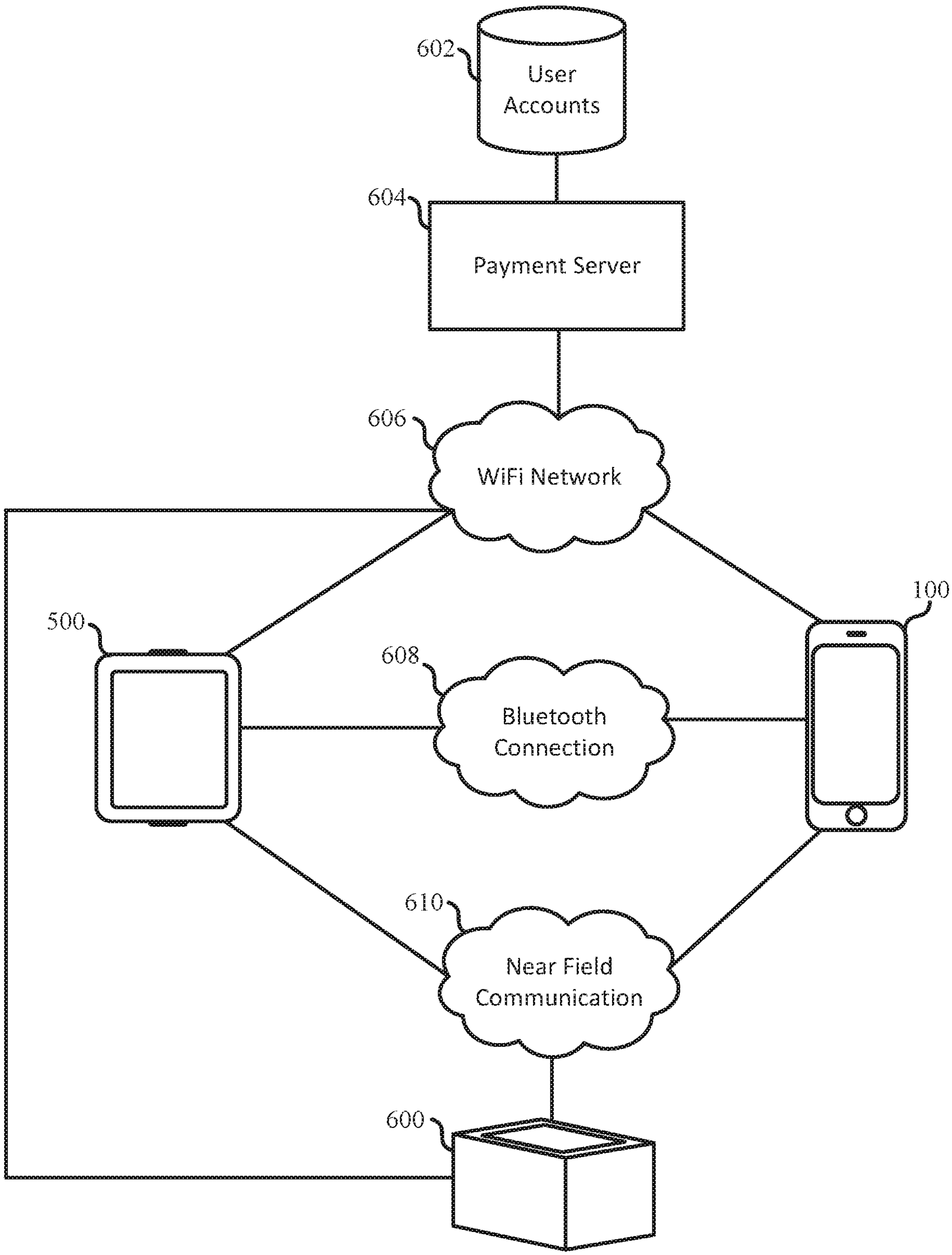
FIG. 6 illustrates exemplary devices connected via one or more communication channels, in accordance with some embodiments.

FIG. 6 illustrates exemplary devices connected via one or more communication channels to participate in a transaction in accordance with some embodiments. One or more exemplary electronic devices (e.g., devices 100, 300, and 500) are configured to optionally detect input (e.g., a particular user input, an NFC field) and optionally transmit payment information (e.g., using NFC). The one or more electronic devices optionally include NFC hardware and are configured to be NFC-enabled.

The electronic devices (e.g., devices 100, 300, and 500) are optionally configured to store payment account information associated with each of one or more payment accounts. Payment account information includes, for example, one or more of: a person's or company's name, a billing address, a login, a password, an account number, an expiration date, a security code, a telephone number, a bank associated with the payment account (e.g., an issuing bank), and a card network identifier. In some embodiments, payment account information includes include an image, such as a picture of a payment card (e.g., taken by the device and/or received at the device). In some embodiments, the electronic devices receive user input including at least some payment account information (e.g., receiving user-entered credit, debit, account, or gift card number and expiration date). In some embodiments, the electronic devices detect at least some payment account information from an image (e.g., of a payment card captured by a camera sensor of the device). In some embodiments, the electronic devices receive at least some payment account information from another device (e.g., another user device or a server). In some embodiments, the electronic device receives payment account information from a server associated with another service for which an account for a user or user device previously made a purchase or identified payment account data (e.g., an app for renting or selling audio and/or video files).

In some embodiments, a payment account is added to an electronic device (e.g., device 100, 300, and 500), such that payment account information is securely stored on the electronic device. In some embodiments, after a user initiates such process, the electronic device transmits information for the payment account to a transaction-coordination server, which then communicates with a server operated by a payment network for the account (e.g., a payment server) to ensure a validity of the information. The electronic device is optionally configured to receive a script from the server that allows the electronic device to program payment information for the account onto the secure element.

In some embodiments, communication among electronic devices 100, 300, and 500 facilitates transactions (e.g., generally or specific transactions). For example, a first electronic device (e.g., 100) can serve as a provisioning or managing device, and can send notifications of new or updated payment account data (e.g., information for a new account, updated information for an existing account, and/or an alert pertaining to an existing account) to a second electronic device (e.g., 500). In another example, a first electronic device (e.g., 100) can send data to a second election device, wherein the data reflects information about payment transactions facilitated at the first electronic device. The information optionally includes one or more of: a payment amount, an account used, a time of purchase, and whether a default account was changed. The second device (e.g., 500) optionally uses such information to update a default payment account (e.g., based on a learning algorithm or explicit user input).

Electronic devices (e.g., 100, 300, 500) are configured to communicate with each other over any of a variety of networks. For example, the devices communicate using a Bluetooth connection 608 (e.g., which includes a traditional Bluetooth connection or a Bluetooth Low Energy connection) or using a WiFi network 606. Communications among user devices are, optionally, conditioned to reduce the possibility of inappropriately sharing information across devices. For example, communications relating to payment information requires that the communicating devices be paired (e.g., be associated with each other via an explicit user interaction) or be associated with a same user account.

In some embodiments, an electronic device (e.g., 100, 300, 500) is used to communicate with a point-of-sale (POS) payment terminal 600, which is optionally NFC-enabled. The communication optionally occurs using a variety of communication channels and/or technologies. In some embodiments, electronic device (e.g., 100, 300, 500) communicates with payment terminal 600 using an NFC channel 610. In some embodiments, payment terminal 600 communicates with an electronic device (e.g., 100, 300, 500) using a peer-to-peer NFC mode. Electronic device (e.g., 100, 300, 500) is optionally configured transmit a signal to payment terminal 600 that includes payment information for a payment account (e.g., a default account or an account selected for the particular transaction).

In some embodiments, proceeding with a transaction includes transmitting a signal that includes payment information for an account, such as a payment account. In some embodiments, proceeding with the transaction includes reconfiguring the electronic device (e.g., 100, 300, 500) to respond as a contactless payment card, such as an NFC-enabled contactless payment card, and then transmitting credentials of the account via NFC, such as to payment terminal 600. In some embodiments, subsequent to transmitting credentials of the account via NFC, the electronic device reconfigures to not respond as a contactless payment card (e.g., requiring authorization before again reconfigured to respond as a contactless payment card via NFC).

In some embodiments, generation of and/or transmission of the signal is controlled by a secure element in the electronic device (e.g., 100, 300, 500). The secure element optionally requires a particular user input prior to releasing payment information. For example, the secure element optionally requires detection that the electronic device is being worn, detection of a button press, detection of entry of a passcode, detection of a touch, detection of one or more option selections (e.g., received while interacting with an application), detection of a fingerprint signature, detection of a voice or voice command, and or detection of a gesture or movement (e.g., rotation or acceleration). In some embodiments, if a communication channel (e.g., an NFC communication channel) with another device (e.g., payment terminal 600) is established within a defined time period from detection of the input, the secure element releases payment information to be transmitted to the other device (e.g., payment terminal 600). In some embodiments, the secure element is a hardware component that controls release of secure information. In some embodiments, the secure element is a software component that controls release of secure information.

In some embodiments, protocols related to transaction participation depend on, for example, device types. For example, a condition for generating and/or transmitting payment information can be different for a wearable device (e.g., device 500) and a phone (e.g., device 100). For example, a generation and/or transmission condition for a wearable device includes detecting that a button has been pressed (e.g., after a security verification), while a corresponding condition for a phone does not require button-depression and instead requires detection of particular interaction with an application. In some embodiments, a condition for transmitting and/or releasing payment information includes receiving particular input on each of multiple devices. For example, release of payment information optionally requires detection of a fingerprint and/or passcode at the device (e.g., device 100) and detection of a mechanical input (e.g., button press) on another device (e.g., device 500).

Payment terminal 600 optionally uses the payment information to generate a signal to transmit to a payment server 604 to determine whether the payment is authorized. Payment server 604 optionally includes any device or system configured to receive payment information associated with a payment account and to determine whether a proposed purchase is authorized. In some embodiments, payment server 604 includes a server of an issuing bank. Payment terminal 600 communicates with payment server 604 directly or indirectly via one or more other devices or systems (e.g., a server of an acquiring bank and/or a server of a card network).

Payment server 604 optionally uses at least some of the payment information to identify a user account from among a database of user accounts (e.g., 602). For example, each user account includes payment information. An account is, optionally, located by locating an account with particular payment information matching that from the POS communication. In some embodiments, a payment is denied when provided payment information is not consistent (e.g., an expiration date does not correspond to a credit, debit or gift card number) or when no account includes payment information matching that from the POS communication.

In some embodiments, data for the user account further identifies one or more restrictions (e.g., credit limits); current or previous balances; previous transaction dates, locations and/or amounts; account status (e.g., active or frozen), and/or authorization instructions. In some embodiments, the payment server (e.g., 604) uses such data to determine whether to authorize a payment. For example, a payment server denies a payment when a purchase amount added to a current balance would result in exceeding an account limit, when an account is frozen, when a previous transaction amount exceeds a threshold, or when a previous transaction count or frequency exceeds a threshold.

In some embodiments, payment server 604 responds to POS payment terminal 600 with an indication as to whether a proposed purchase is authorized or denied. In some embodiments, POS payment terminal 600 transmits a signal to the electronic device (e.g., 100, 300, 500) to identify the result. For example, POS payment terminal 600 sends a receipt to the electronic device (e.g., 100, 300, 500) when a purchase is authorized (e.g., via a transaction-coordination server that manages a transaction app on the user device). In some instances, POS payment terminal 600 presents an output (e.g., a visual or audio output) indicative of the result. Payment can be sent to a merchant as part of the authorization process or can be subsequently sent.

In some embodiments, the electronic device (e.g., 100, 300, 500) participates in a transaction that is completed without involvement of POS payment terminal 600. For example, upon detecting that a mechanical input has been received, a secure element in the electronic device (e.g., 100, 300, 500) releases payment information to allow an application on the electronic device to access the information (e.g., and to transmit the information to a server associated with the application).

In some embodiments, the electronic device (e.g., 100, 300, 500) is in a locked state or an unlocked state. In the locked state, the electronic device is powered on and operational but is prevented from performing a predefined set of operations in response to the user input. The predefined set of operations may include navigation between user interfaces, activation or deactivation of a predefined set of functions, and activation or deactivation of certain applications. The locked state may be used to prevent unintentional or unauthorized use of some functionality of the electronic device or activation or deactivation of some functions on the electronic device. In the unlocked state, the electronic device 100 is power on and operational and is not prevented from performing at least a portion of the predefined set of operations that cannot be performed while in the locked state.

When the device is in the locked state, the device is said to be locked. In some embodiments, the device in the locked state may respond to a limited set of user inputs, including input that corresponds to an attempt to transition the device to the unlocked state or input that corresponds to powering the device off.

In some embodiments, a secure element is a hardware component (e.g., a secure microcontroller chip) configured to securely store data or an algorithm. In some embodiments, the secure element provides (or releases) payment information (e.g., an account number and/or a transaction-specific dynamic security code). In some embodiments, the secure element provides (or releases) the payment information in response to the device receiving authorization, such as a user authentication (e.g., fingerprint authentication; passcode authentication; detecting double-press of a hardware button when the device is in an unlocked state, and optionally, while the device has been continuously on a user's wrist since the device was unlocked by providing authentication credentials to the device, where the continuous presence of the device on the user's wrist is determined by periodically checking that the device is in contact with the user's skin). For example, the device detects a fingerprint at a fingerprint sensor (e.g., a fingerprint sensor integrated into a button) of the device. The device determines whether the fingerprint is consistent with a registered fingerprint. In accordance with a determination that the fingerprint is consistent with the registered fingerprint, the secure element provides (or releases) payment information. In accordance with a determination that the fingerprint is not consistent with the registered fingerprint, the secure element forgoes providing (or releasing) payment information.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

Attention is now directed towards embodiments of user interfaces ("U") and associated processes that are implemented on an electronic device, such as portable multifunction device 100, device 300, or device 500.

FIGS. 7A-7B illustrate exemplary user interfaces for provisioning an electronic device with a user account (e.g., a computer storage account), in accordance with some embodiments. The user interfaces in these figures are used to illustrate the processes described below, including the processes in FIGS. 9A-9C and FIG. 9D.

FIG. 7A illustrates an electronic device 100 with a display (e.g., touch screen 112) and one or more input devices (e.g., menu button 204, push button 206). In FIG. 7A, electronic device 100 is displaying, on display 112, an offer user interface 702 (e.g., similar to offer user interface 864 described below with reference to FIG. 8J) for accepting an offer to initiate a user account (e.g., a computer storage account). In some embodiments, the user account is a computer storage account that provides access to a predetermined amount of (e.g., cloud-based) computer storage resources. In some embodiments, different types of data (e.g., data corresponding to photo files, data corresponding to document files; data corresponding to music files, data corresponding to video files, data corresponding to application files) can be stored and/or archived in the computer storage resources associated with the user account (e.g., a computer storage account).

In some embodiments, offer user interface 702 includes a representation 704 (e.g., a graphical representation) of the user account (e.g., a computer storage account). In some embodiments, representation 704 of the user account includes a name of the account holder and one or more textual and/or graphical indications of the type of the user account (e.g., a computer storage account).

In some embodiments, offer user interface 702 includes an indication 706 of a predetermined use quota of the user account (e.g., a computer storage account). In some embodiments, the predetermined use quota corresponds to the predetermined amount of (e.g., cloud-based) computer storage resources that can be accessed and used to store and/or archive data using the user account (e.g., a computer storage account).

In some embodiments, offer user interface 702 includes an affordance 708 for accepting the offer to initiate the user account (e.g., a computer storage account). In some embodiments, in response to detecting a user activation (e.g., a tap input) of affordance 708, electronic device 100 initiates a process for activating the user account (e.g., a computer storage account) and provisioning the user account onto electronic device 100.

In FIG. 7B, electronic device 100 displays, on display 112, a summary user interface 710 (e.g., similar to summary user interface 887 described below with reference to FIG. 8S) corresponding to the newly-activated user account (e.g., a computer storage account). In some embodiments, summary user interface 710 includes representation 704 of the user account (e.g., a computer storage account).

In some embodiments, summary user interface 710 includes a usage indicator user interface element 712 (e.g., similar to balance indicator user interface element 885 described below with reference to FIG. 8S). In some embodiments usage indicator user interface element 712 includes an indication of the amount of computer storage resources (e.g., measured in megabytes (MB) or gigabytes (GB)) associated with the user account (e.g., a computer storage account) that is currently being used to store archived data. In FIG. 7B, because the user account (e.g., a computer storage account) has been newly activated, usage indicator user interface element 712 shows (e.g., by showing "0 MB") that no computer storage resources associated with the user account is being used. In some embodiments, usage indicator user interface element 712 includes an indication of the use quota-a predetermined limit on the amount of computer storage resources that can be used via the user account (e.g., a computer storage account)—of the user account (e.g., by showing "2 GB available").

In some embodiments, summary user interface 710 includes a past usage user interface element 714 (e.g., similar to activity user interface element 883 described below with reference to FIG. 8S) that includes a bar graph depicting the types of stored and/or archived data (e.g., data corresponding to photo files, data corresponding to document files, data corresponding to music files, data corresponding to video files, data corresponding to application files) on the user account (e.g., a computer storage account) that have been stored on the available computer storage resources associated with the user account during a predetermined time period (e.g., the past week), with each bar corresponding to uses of the computer storage resources associated with the user account during a respective day of the predetermined time period. In FIG. 7B, because the user account (e.g., computer storage account) has been newly activated, the bar graph of past usage user interface element 714 does not show any types of archived data on the user account.

In some embodiments, summary user interface 710 includes a deletion user interface element 716 (e.g., similar to balance transfer user interface element 881 described below with reference to FIG. 8S). In some embodiments, deletion user interface element 716 includes an indication of a date by which an amount of archived data of the user account (e.g., a computer storage account) should be deleted from the user account in order to avoid storage penalties (e.g., a reduction in the use quota of the user account) being levied on the user account. Features concerning deletion user interface element 716 is described in greater detail below with reference to FIGS. 28A-28B.

In some embodiments, summary user interface 710 includes a notification user interface element 718 (e.g., similar to notification user interface element 879 described below with reference to FIG. 8S). In some embodiments, notification user interface element 718 displays notifications and/or promotions concerning the user account (e.g., a computer storage account).

Once the user account (e.g., a computer storage account) has been activated for use, the user account can be used to store data (e.g., different types of data, such as data corresponding to photo files, data corresponding to document files, data corresponding to music files, data corresponding to video files, data corresponding to application files) to and delete data from computer storage resources (e.g., remote, cloud-based computer storage resources that are not local to electronic device 100) that can be accessed via the user account.

FIGS. 8A-8V illustrate exemplary user interfaces for provisioning an electronic device with a transfer account, in accordance with some embodiments. The user interfaces in these figures are used to illustrate the processes described below, including the processes in FIGS. 9A-9C.

FIG. 8A illustrates an electronic device 100 with a display (e.g., touch screen 112) and one or more input devices (e.g., menu button 204, push button 206). In FIG. 8A, electronic device 100 is displaying, on display 112, a user interface 802 of a transfer application (e.g., an electronic wallet application). In some embodiments, user interface 802 includes a representation 804 and a representation 806 corresponding to different transfer accounts (e.g., payment accounts, such as a third-party credit card account, a debit card account, and/or a stored-value account; points accounts; rewards accounts) provisioned on the electronic device. In some embodiments, representation 804 corresponds to a first-party manufacturer-issued (or branded) stored-value account. In some embodiments, user interface 802 includes representations 808A-808D corresponding to other accounts (e.g., other transfer accounts, points cards, rewards cards), ID cards (e.g., student ID, government-issued ID), and/or tickets (e.g., event ticket, boarding pass ticket) provisioned on or linked to the electronic device.

In FIG. 8A, while displaying user interface 802 of the transfer application, electronic device 100 detects a user activation 801 (e.g., a user selection) of an add account affordance 810.

Figure 8B:
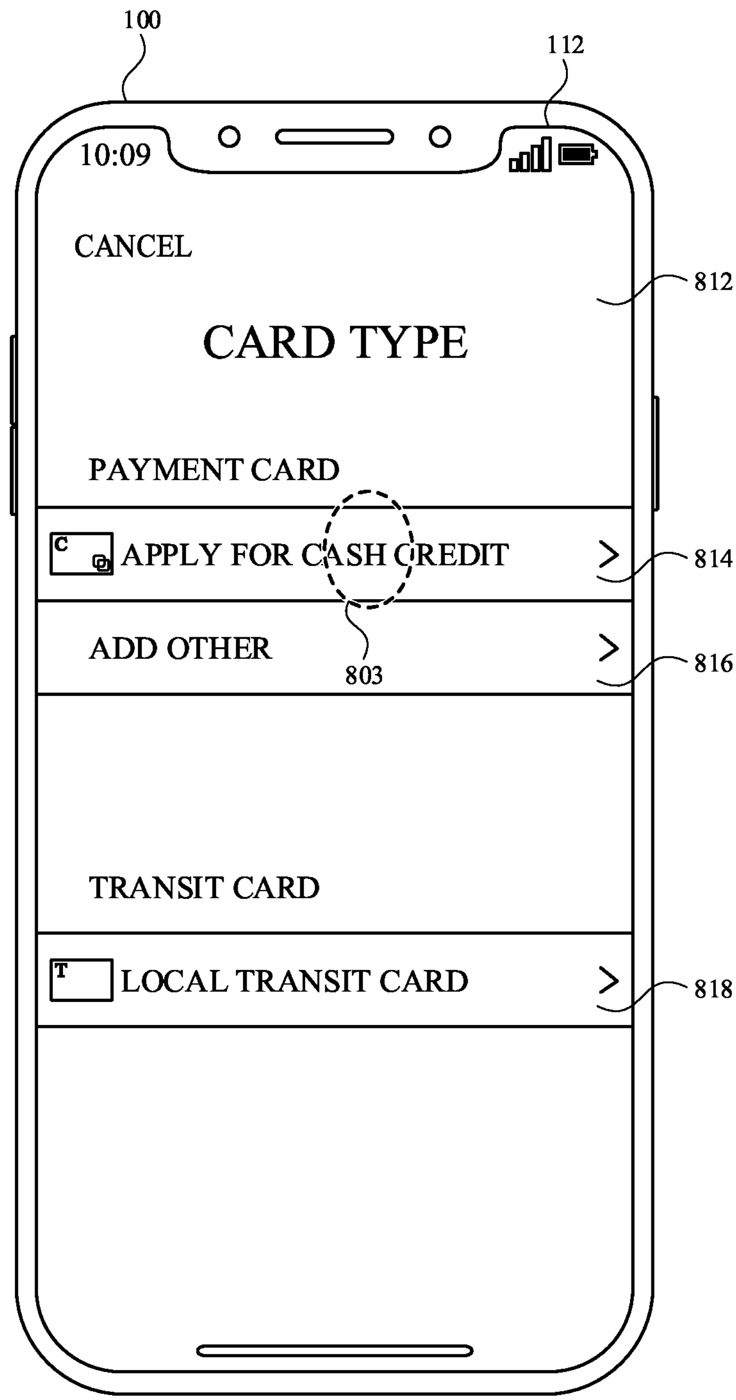

In FIG. 8B, in response to detecting user activation 801 of add account affordance 810, electronic device 100 displays, on display 112, a user interface 812 for adding (e.g., linking, provisioning) a new account (e.g., a new transfer account) to the electronic device. User interface 812 includes a selectable option 814 for applying for a transfer account (e.g., a credit account). In some embodiments, the transfer account that can be applied for via selectable option 814 is a first-party credit account (e.g., a revolving credit account that is issued or branded by the manufacturer of the electronic device), and provides rewards (e.g., cash back rewards, bonus points rewards) based on the amount of transfers (e.g., payment transactions, points transfers) made using the transfer account (e.g., cash back rewards that are based on a certain percentage of the value of each transaction). In some embodiments, the transfer account that can be applied for via selectable option 814 is a points account (e.g., for meal points, for printer credits, for membership points) that provides rewards (e.g., points rewards) based on the amount of points used using the transfer account.

In some embodiments, user interface 812 also includes a selectable option 816 for adding other types of accounts (e.g., a transfer account that is different from the first-party credit account described above; other payment accounts such as third-party credit card accounts and debit card accounts; rewards cards; points cards; ID cards) to the electronic device. In some embodiments, user interface 812 also includes a selectable option 818 for adding a stored-value account (e.g., a transit card account) to the electronic device.

In FIG. 8B, while displaying user interface 812, electronic device 100 detects a user activation 803 of selectable option 814.

Figure 8C:
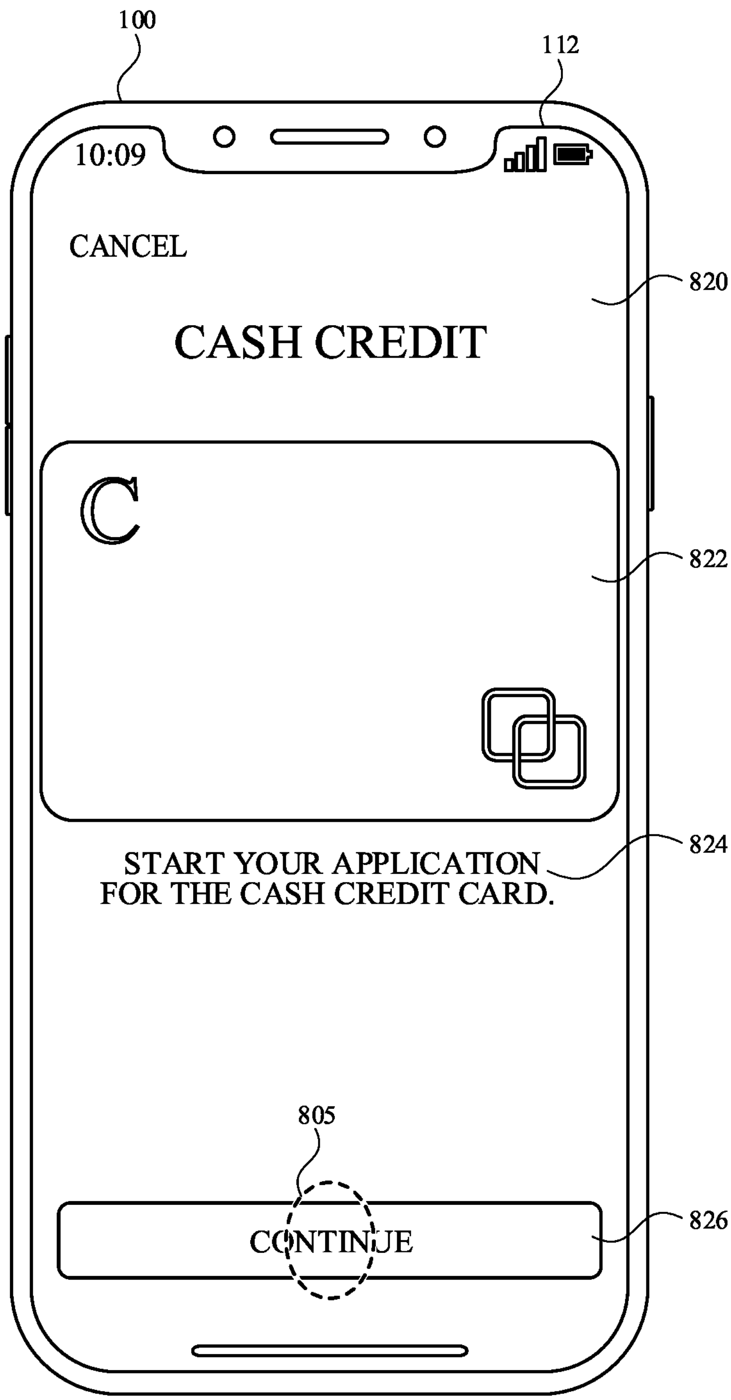

In FIG. 8C, in response to detecting user activation 803 of selectable option 814, electronic device 100 displays, on display 112, a first application user interface 820 for applying for a new transfer account (e.g., a new first-party credit account; a new points account). In some embodiments, first application user interface 820 includes a preview representation 822 of the transfer account (e.g., illustrating what the transfer account would look like on the device once/if it is issued). In some embodiments, first user interface 820 includes introductory text 824 indicating that the user can proceed with applying for the transfer account (e.g., the first-party credit account; the points account). In this example, preview representation 822 does not include pluralities of particles (as described, for example, with reference to 1406 of FIG. 14C) because the representation is a preview for an account that has not been issued.

In FIG. 8C, while displaying user interface 820, electronic device 100 detects a user activation 805 of an affordance 826 for proceeding with the application for the transfer account (e.g., the first-party credit account; the points account).

Figure 8D:
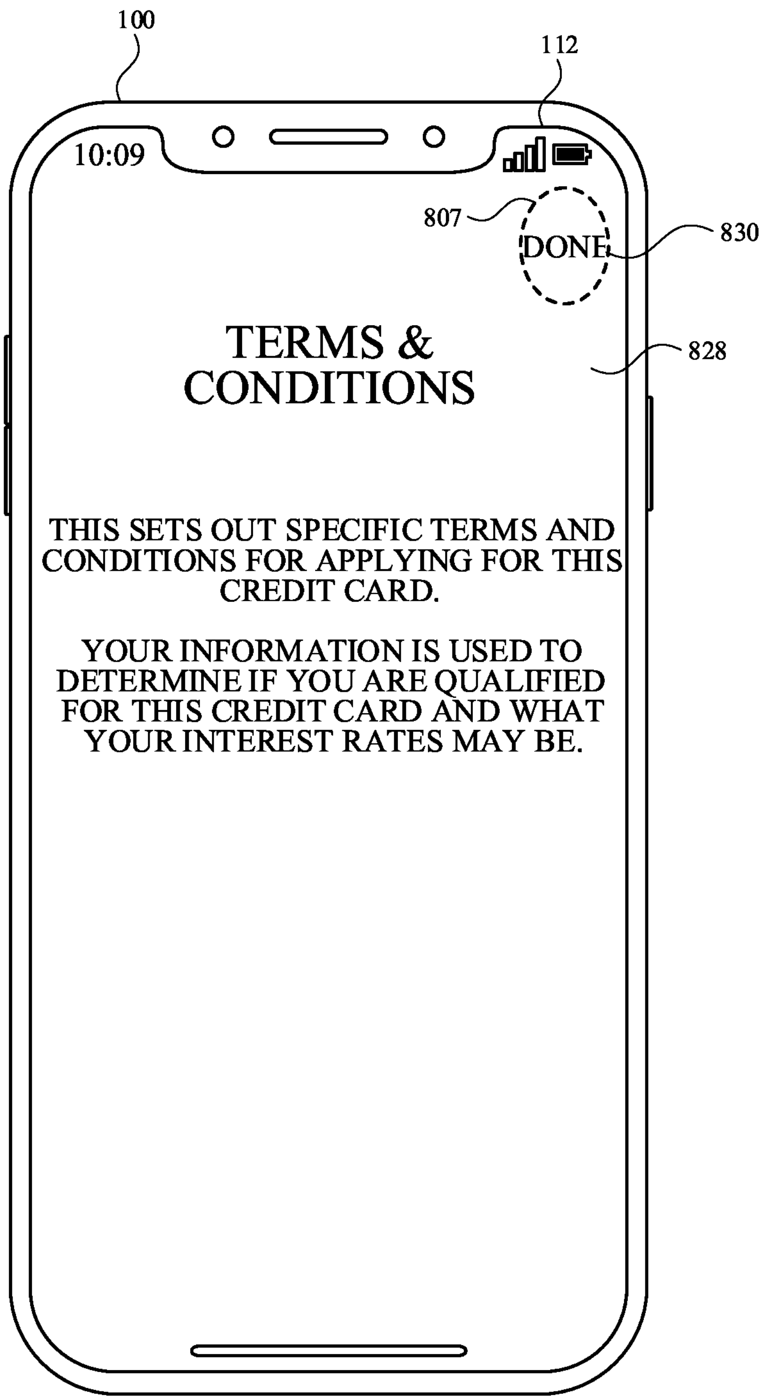

In FIG. 8D, in response to detecting user activation 805 of affordance 826, electronic device 100 displays, on display 112, a second application user interface 828 that includes terms and conditions information about the transfer account (e.g., the first-party credit account; the points account) that is being applied for.

In FIG. 8D, while displaying user interface 828, electronic device 100 detects a user activation 807 of an affordance 830 for continuing with the application for the transfer account (e.g., the first-party credit account; the points account).

Figure 8E:
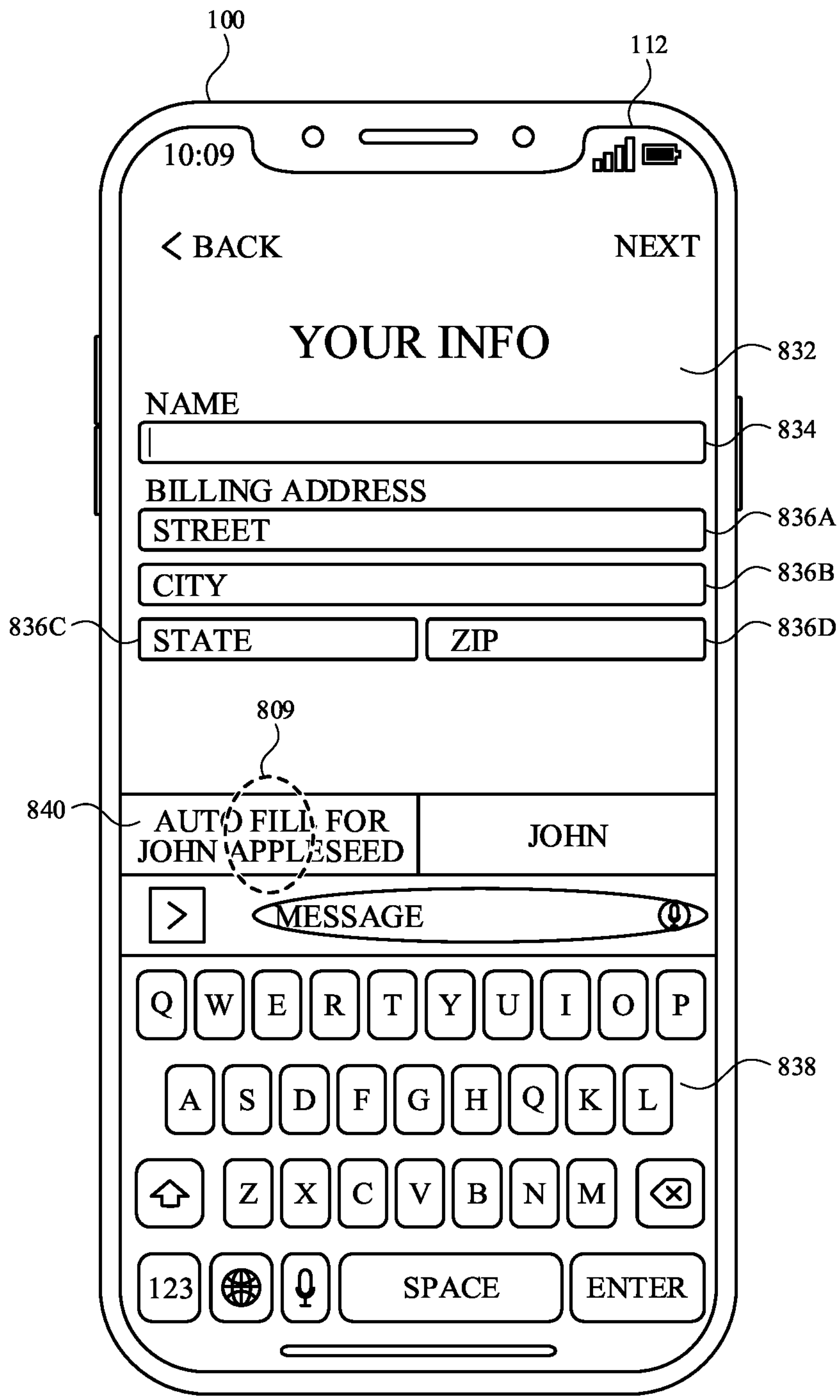

In FIG. 8E, in response to detecting user activation 807 of affordance 830, electronic device 100 displays, on display 112, a third application user interface 832 that includes a plurality of input fields corresponding to requests for user information (e.g., personal information such as name and billing address) that are required for the application for the transfer account (e.g., the first-party credit account; the points account). In some embodiments, user interface 832 includes a name input field 834 for entering the user's legal name and a plurality of input fields for entering the user's billing address, including a street input field 836A, a city input field 836B, a state/province input field 836C, and a zip code/postal code input field 836D. In some embodiments, electronic device 100 displays, concurrently with user interface 832, a virtual keyboard 838 (e.g., shown in response to detecting user selection of an input field) for entering the requested information in respective input fields and/or an autofill affordance 840.

Figure 8F:
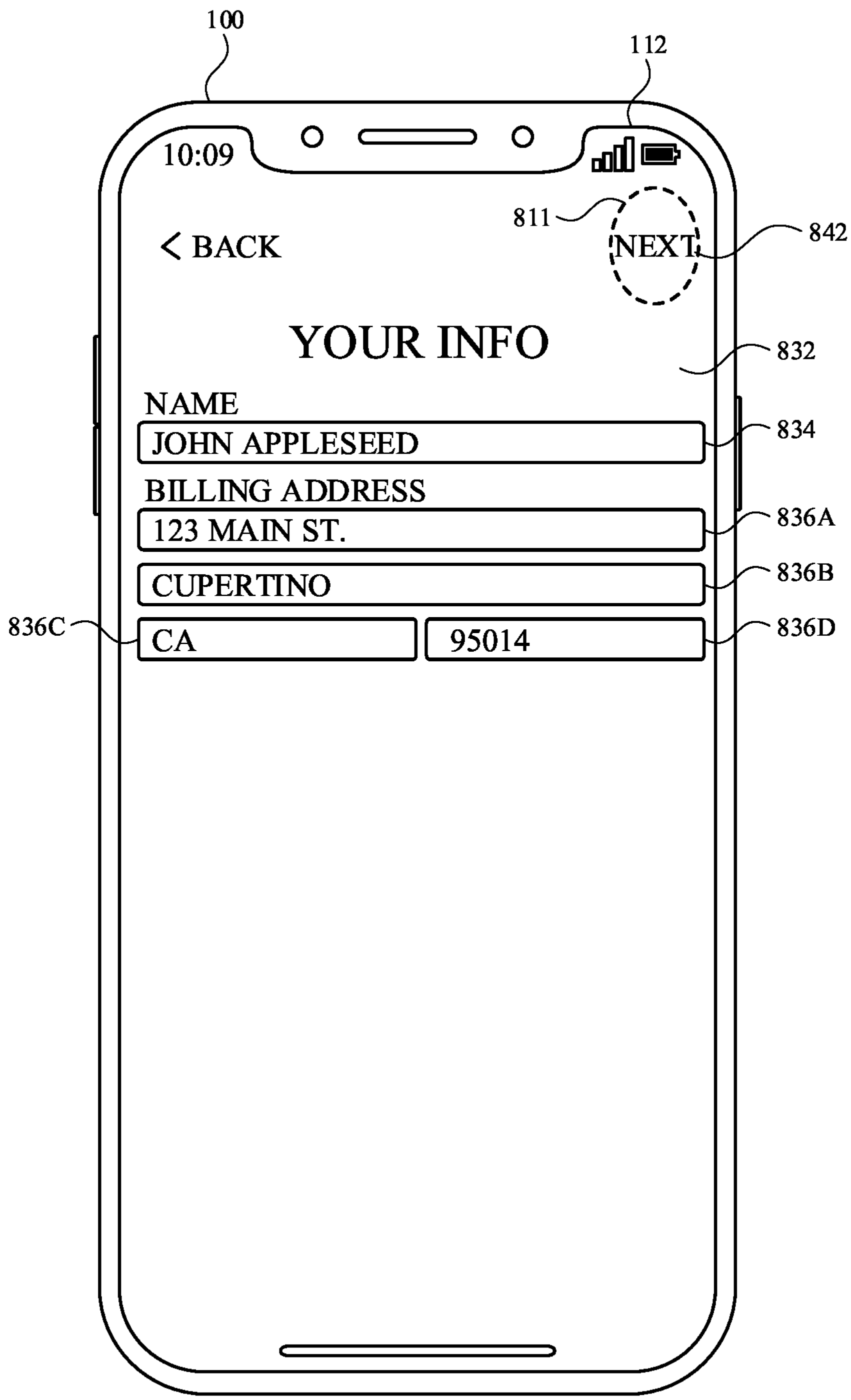

In FIG. 8E, while displaying autofill affordance 840, electronic device 100 detects a user activation 809 of autofill affordance 840. In some embodiments, in response to detecting user activation 809 of autofill affordance 840, electronic device 100 retrieves, identifies, and/or determines the requested user information from a user account (e.g., a user login account that is used to login to the operating system of the electronic device) of the electronic device. In some embodiments, upon retrieving, identifying, and/or determining the requested information from the user account, the electronic device automatically, without user input (e.g., without the user typing the requested information using virtual keyboard 838), displays the requested user information within the plurality of input fields, as shown in FIG. 8F. In some embodiments, the device automatically retrieves and displays the requested user information within the plurality of input fields, as shown in FIG. 8F, in response to detecting activation 807 of an affordance 830 for continuing with the application (without the need to detect user activation 809 of autofill affordance 840).

In FIG. 8F, after receiving the requested user information (either manually via the virtual keyboard or retrieved, identified, and/or determined from the user account), electronic device 100 detects a user activation 811 of an affordance 842 for continuing with the application for the transfer account (e.g., the first-party credit account; the points account).

Figure 8G:
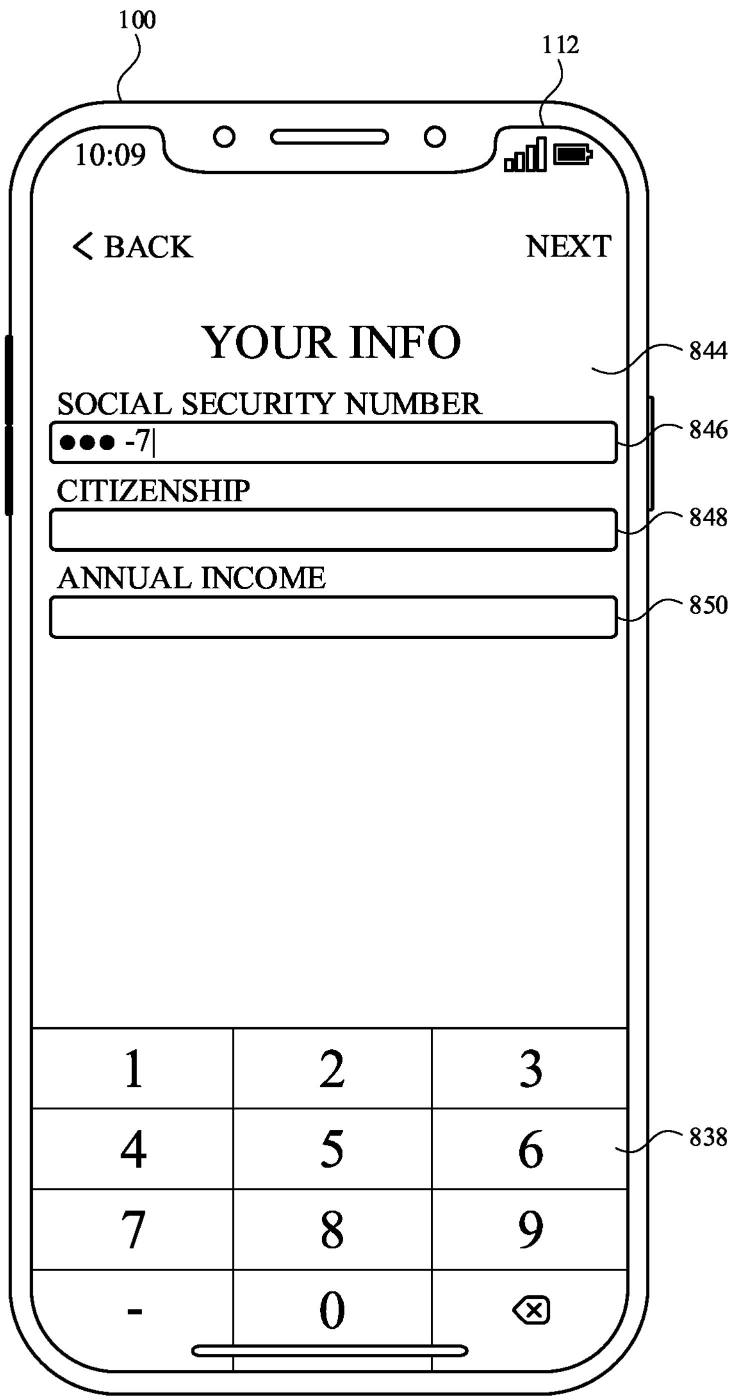

In FIG. 8G, in response to detecting user activation 811 of affordance 842, electronic device 100 displays, on display 112, a fourth application user interface 844 that includes a plurality of input fields corresponding to requests for additional user information (e.g., additional personal information such as a social security or national identification number, citizenship information, and/or income information) that are also required for the application for the transfer account (e.g., the first-party credit account; the points account). In some embodiments, user interface 844 includes an identification number (e.g., a social security number, a national identification number) input field 846, a citizenship input field 848, and/or an income input field 850.

In FIG. 8G, electronic device 100 receives the requested information within the input fields via user input on virtual keyboard 838.

Figure 8H:
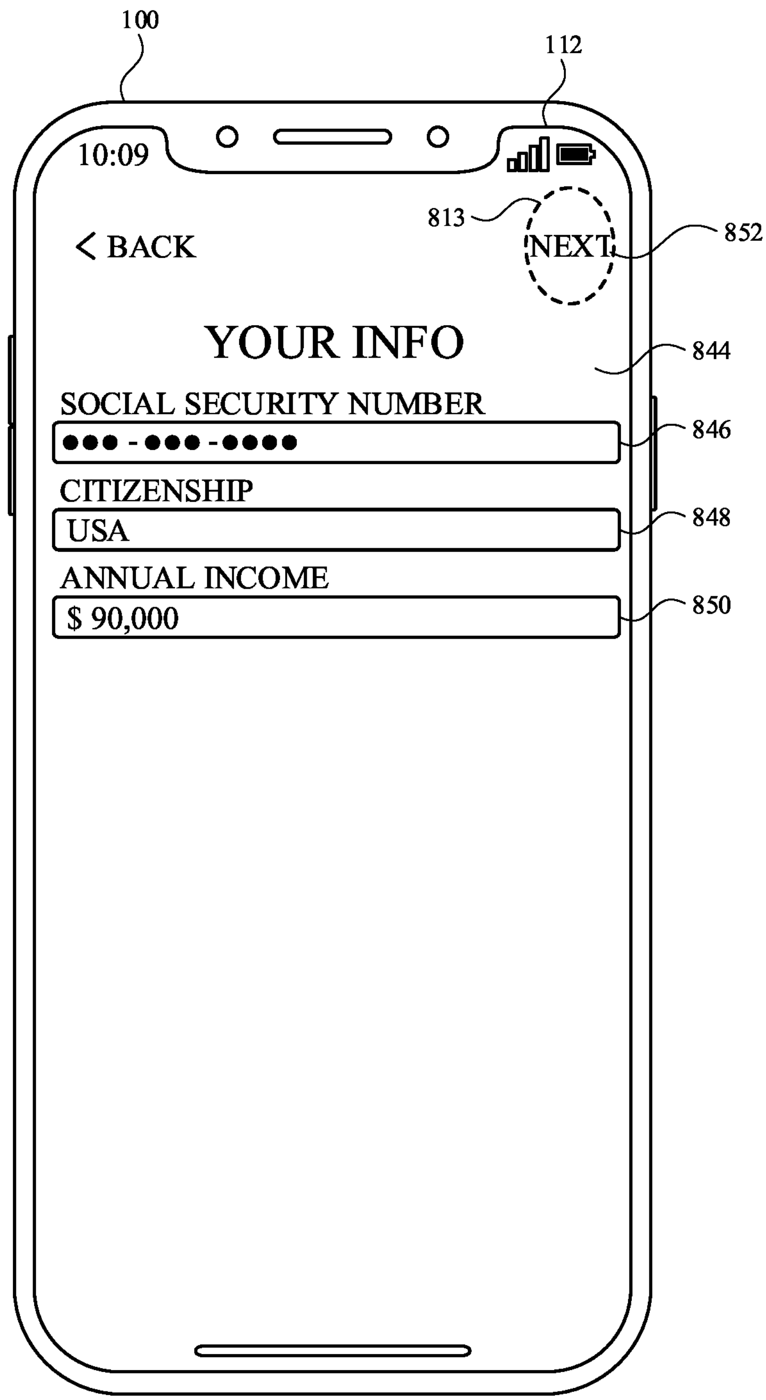

In FIG. 8H, after receiving user input (e.g., via virtual keyboard 838) directed to the requested user information in input fields 846, 848, and 850, electronic device 100 detects a user activation 813 of an affordance 852 for continuing with the application for the transfer account (e.g., the first-party credit account; the points account).

Figure 8I:
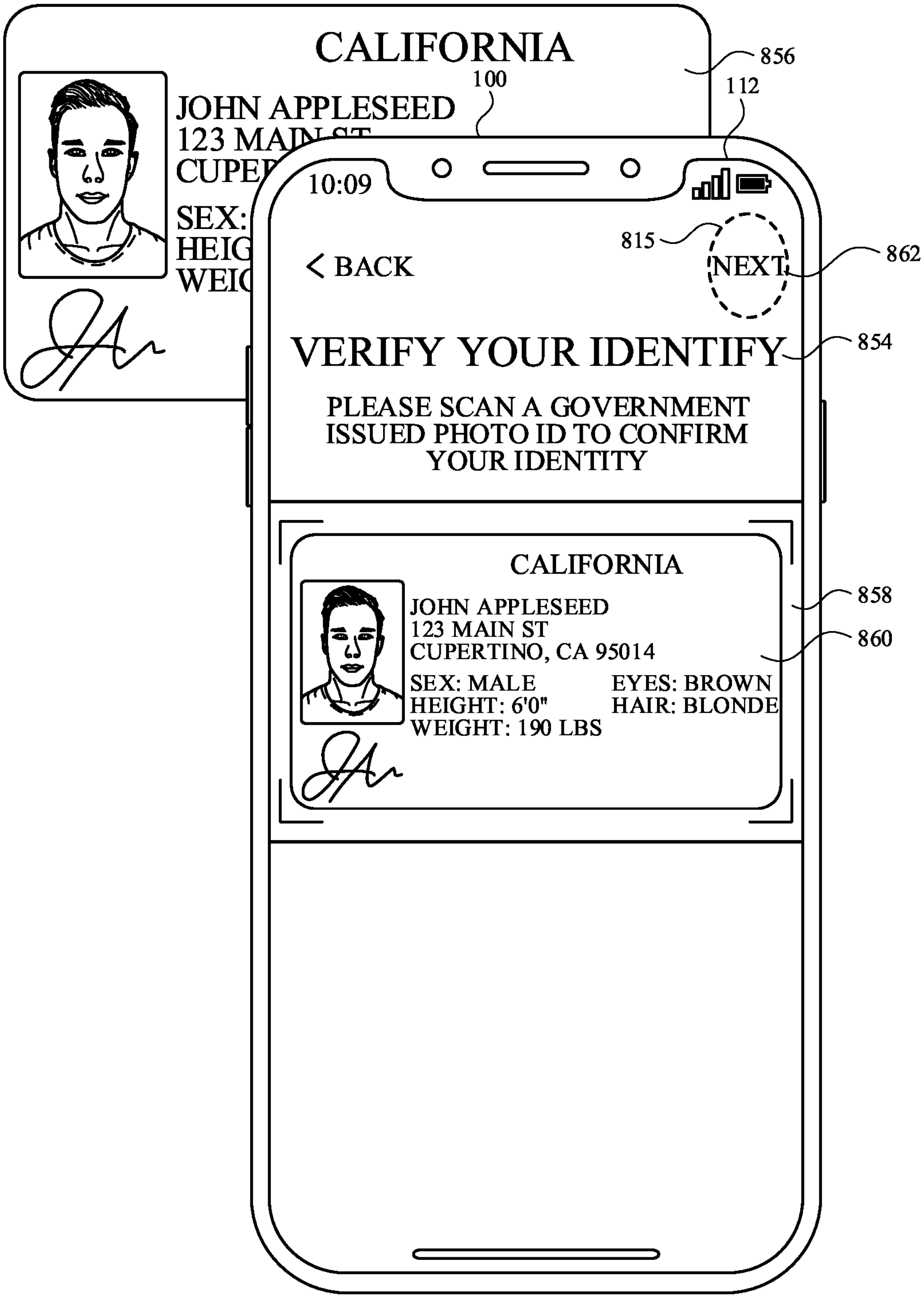

In some embodiments, in response to detecting user activation 813 of (e.g., a tap input on) affordance 852, electronic device 100 displays, on display 112, a request as to whether the user would like to proceed with identity verification using a government-issued ID, or would otherwise like to withdraw the application for the transfer account (and thus exit the application process). In some embodiments, in response to detecting a selection of (e.g., a tap input on) a continue affordance, the electronic device 100 proceeds with the application process for the transfer account (e.g., as shown in FIG. 8I. In some embodiments, in response to detecting a selection of (e.g., a tap input on) a withdraw affordance, the electronic device exits (e.g., terminates) the application process for the transfer account.

In some embodiments, in FIG. 8I, in response to detecting the selection of the continue affordance for proceeding with the application process for the transfer account or in response to detecting user activation 813 of (e.g., a tap input on) affordance 852, electronic device 100 displays, on display 112, a fifth application user interface 854 that requests user verification (e.g., using a government-issued ID 856). In some embodiments, user interface 854 includes an image region 858 that displays a live-feed image being captured by a camera (e.g., of camera module 143) of the electronic device while government-issued ID 856 is within a field-of-view of the camera. In some embodiments, image region 858 includes a preview image of a sample government-issued ID placed in the image region, thereby instructing the user on how to capture an image of the user's government-issued ID using the electronic device.

FIG. 8I illustrates electronic device 100 displaying an image 860 of government-issued ID 856 within image region 858 as government-issued ID 856 is being captured by the camera of the electronic device.

In some embodiments, in response to capturing the image of government-issued ID 856, electronic device 100 displays an image corresponding to government-issued ID 856. In some embodiments, electronic device 100 displays, on display 112, a continue affordance for proceeding with the verification process using the captured image and a retry affordance for re-capturing a new image of government-issued ID 856.

In some embodiments, electronic device 100 requests, through fifth application user interface 854, captures for both the front and back sides of government-issued ID 856. In some embodiments, as described above, electronic device 100 provides the option to re-capture the front and back sides of the government-issued ID (e.g., until the user is satisfied with the captured images).

In some embodiments, in accordance with a determination that government-issued ID 856 (e.g., both the front and back sides of government-issued ID 856) is successfully captured by the camera of the device, electronic device 100 identifies (e.g., using an image and language processing module of the device) user information from government-issued ID 856 (e.g., using optical character recognition). In some embodiments, in response to identifying the required user information (e.g., name, address, date of birth) electronic device 100 automatically transmits the identified information to a remote server to complete the verification process. In some embodiments, electronic device 100 completes the verification process using the identified user information locally on the device (e.g., retrieving the user information from a contacts application or a locally stored database).

In some embodiments, electronic device 100 requests user approval (e.g., via activation of next affordance 862) prior to transmitting the image 860 of government-issued ID 856. In particular, in FIG. 8I, while displaying user interface 854 (e.g., and after having successfully captured an image of government-issued ID 856 to identify the required user information from the ID), electronic device 100 detects a user activation 815 of an affordance 862 for continuing with the application for the transfer account (e.g., the first-party credit account; the points account).

Figure 8J:
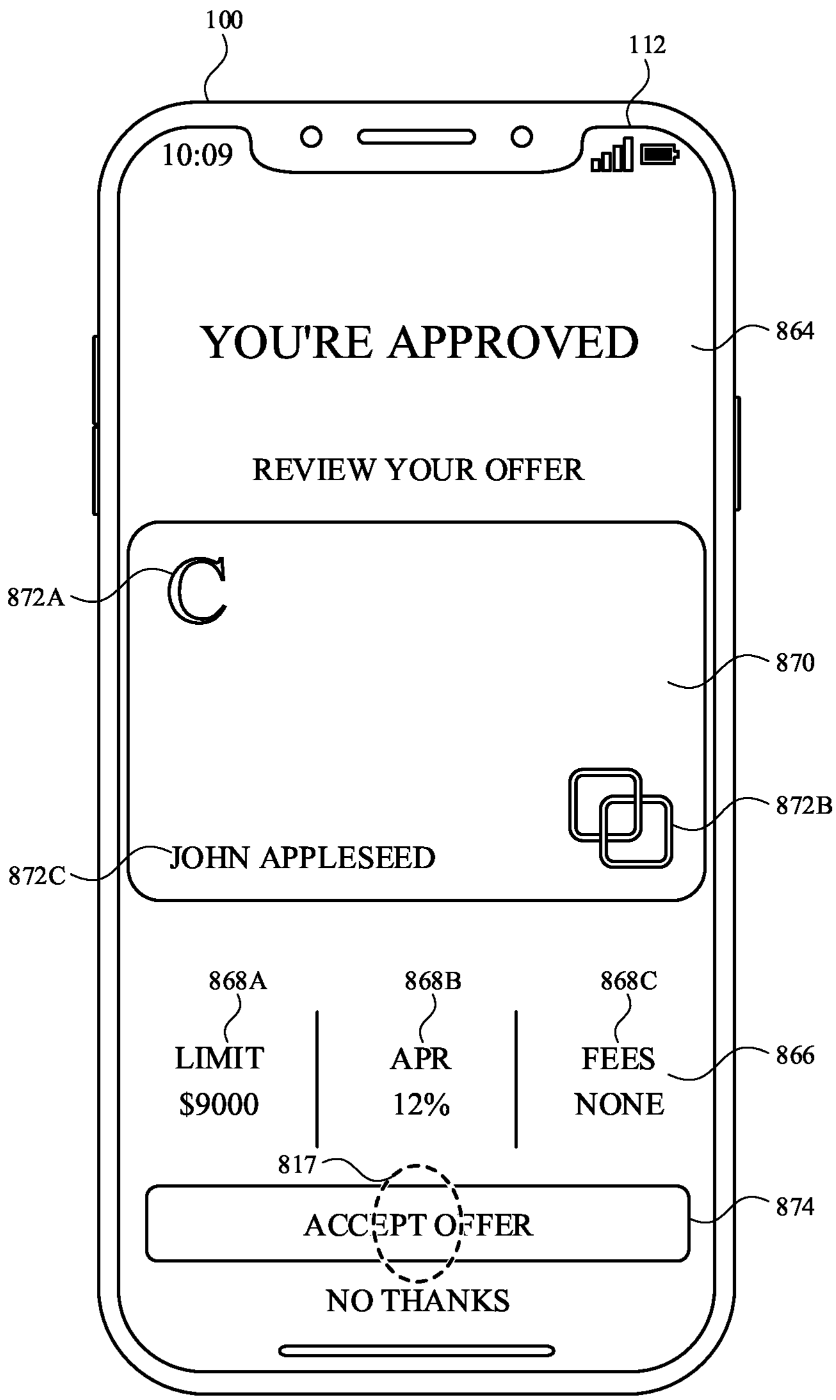

In FIG. 8J, in response to detecting user activation 815 of affordance 862, electronic device 100 displays, on display 112, an offer user interface 864 that includes an indication (e.g., text stating "You Are Approved") that the user has been approved for the transfer account and thus is being is offered the new transfer account (e.g., a new first-party credit account; a new points account). In some embodiments, electronic device 100 transmits (e.g., in response to detecting user activation 815 of affordance 862) the various application information (e.g., the required user information) to a remote server (e.g., an account approval server) and receives back an indication of approval or non-approval. In response to receiving the indication of approval, electronic device 100 displays the offer user interface 864. In response to receiving an indication of non-approval, the device forgoes displaying the offer user interface 864.

In some embodiments, electronic device 100 also displays, in offer user interface 864, a graphical representation 870 of the approved transfer account (e.g., approved first-party credit account). In some embodiments, representation 870 of the transfer account (e.g., the first-party credit account; the points account) includes a first visual indication 872A (e.g., a logo) of the first-party manufacturer of the electronic device (e.g., and is also an issuing institution for the transfer account), a second visual indication 872B (e.g., a logo) of a party (e.g., an institution, a company) different from the first-party manufacturer that is also associated with the transfer account (e.g., the first-party credit account; the points account), and/or a third visual indication 872C of the name of the user of the electronic device. For example, if the transfer account is a first-party credit account (e.g., a first-party credit card account) issued by the manufacturer of the electronic device, first visual indication 872A corresponds to the logo of the manufacturer of the device and second visual indication 872B corresponds to the logo of a financial instruction that manages the method of payment of the account.

In some embodiments, electronic device 100 also displays, in user interface 864, an indication 866 of the terms of the offer for the transfer account (e.g., the first-party credit account; the points account). In some embodiments, the terms of the offer include an indication 868A of a limit (e.g., a credit limit, a spending limit) of the transfer account, an indication 868B of a rate (e.g., interest rate, APR) to be applied to an overdue balance of the transfer account, and/or an indication 868C of fees (e.g., annual fees) for using the transfer account.

In FIG. 8J, while displaying user interface 864, electronic device 100 detects a user activation 817 of an affordance 874 for accepting the offer for the transfer account (and thus for the user to be issued the transfer account in accordance with the displayed offer terms). Alternatively, the user can decline the offer by activating the "No Thanks" affordance of FIG. 8J.

Figure 8K:
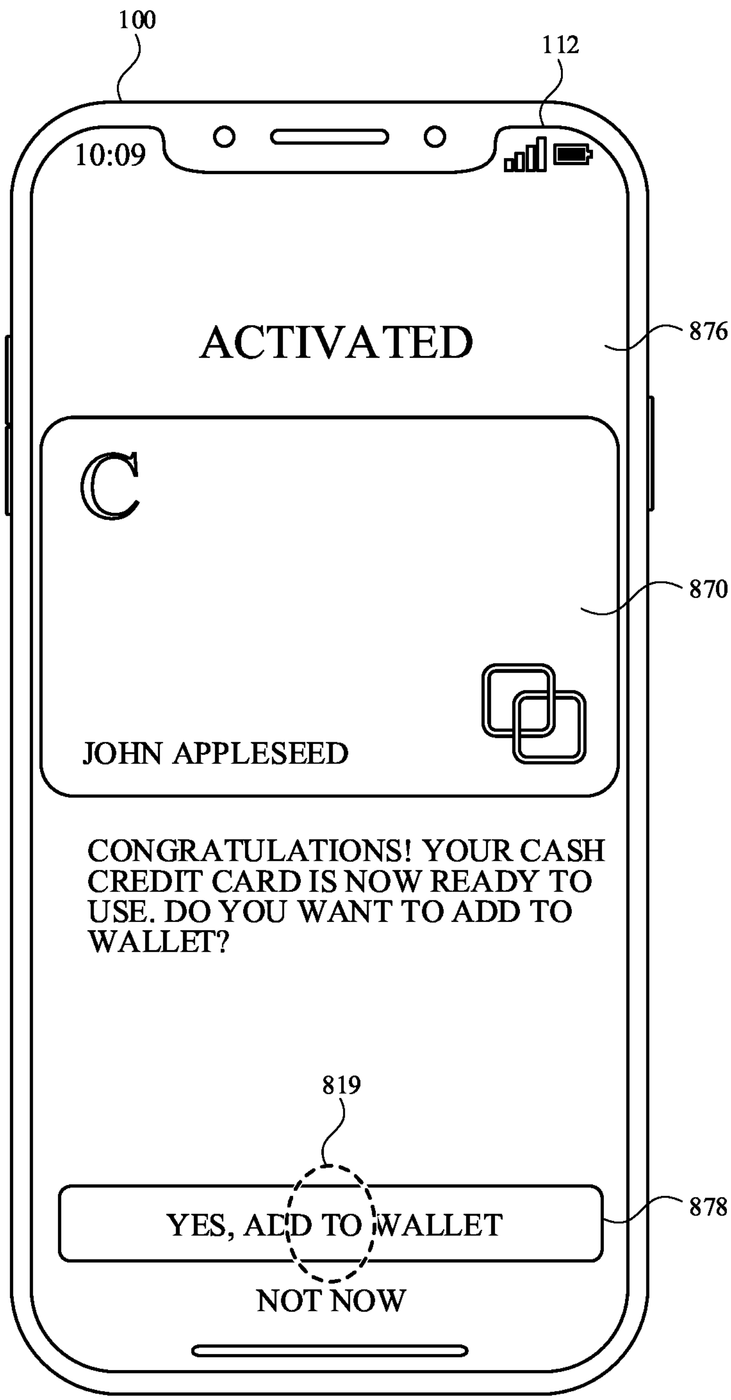

In FIG. 8K, in response to detecting user activation 817 of affordance 874, electronic device 100 displays, on display 112, a first post-activation user interface 876 indicating that the new transfer account (e.g., the new first-party credit account; the new points account) has been created and activated (e.g., in accordance with the terms displayed in offer user interface 864). In some embodiments, electronic device 100 displays, in user interface 876, representation 870 of the transfer account (e.g., the first-party credit account; the points account) as in offer user interface 864, and further displays text indicating that the transfer account is now available for use in performing transfers (e.g., payment transactions, points transfers) and an option to add and/or link (provision) the transfer account to the transfer application (e.g., the electronic wallet application) of the electronic device.

In FIG. 8K, while display user interface 876, electronic device 100 detects a user activation 819 of an affordance 878 for adding and/or linking the transfer account (e.g., the first-party credit account; the points account) to the transfer application (e.g., the electronic wallet application) of the electronic device.

Figure 8L:
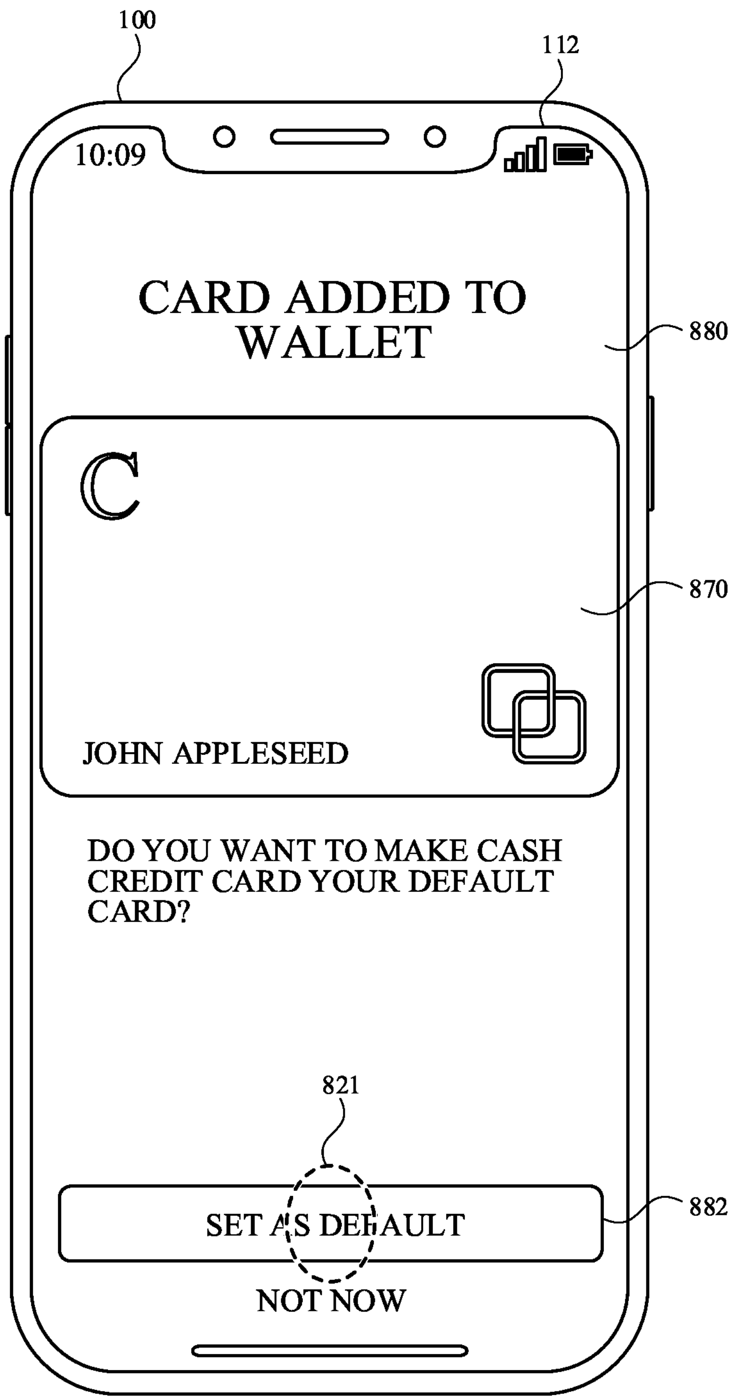

In FIG. 8L, electronic device 100 displays (e.g., in response to detecting user activation 819 of affordance 878), on display 112, a second post-activation user interface 880 indicating that the transfer account (e.g., the first-party credit account; the points account) has been provisioned on the electronic device, and thus can be used via the transfer application (e.g., the electronic wallet application) of the electronic device. In some embodiments, provisioning the transfer account (e.g., the first-party credit account; the points account) comprises provisioning electronic device 100 with a secure credential corresponding to the transfer account (e.g., the first-party credit account; the points account). In some embodiments, the secure credential is stored in a secure element (e.g., an encrypted physical memory module) of the electronic device, which is accessible only by the operating system of the electronic device and cannot be accessed by third-party applications installed on the electronic device.

In some embodiments, electronic device 100 displays, in user interface 880, representation 870 of the transfer account (e.g., the first-party credit account; the points account) as in first post-activation user interface 876, and also displays text asking whether the transfer account should be set as the default account for performing transfers (e.g., payment transactions; points transfers) using the electronic device. In FIG. 8L, while displaying user interface 880, electronic device 100 detects a user activation 821 of an affordance 882 for setting the transfer account (e.g., the first-party credit account; the points account) as the default account for performing transfers (e.g., payment transactions; points transfers) using the electronic device.

Figure 8M:
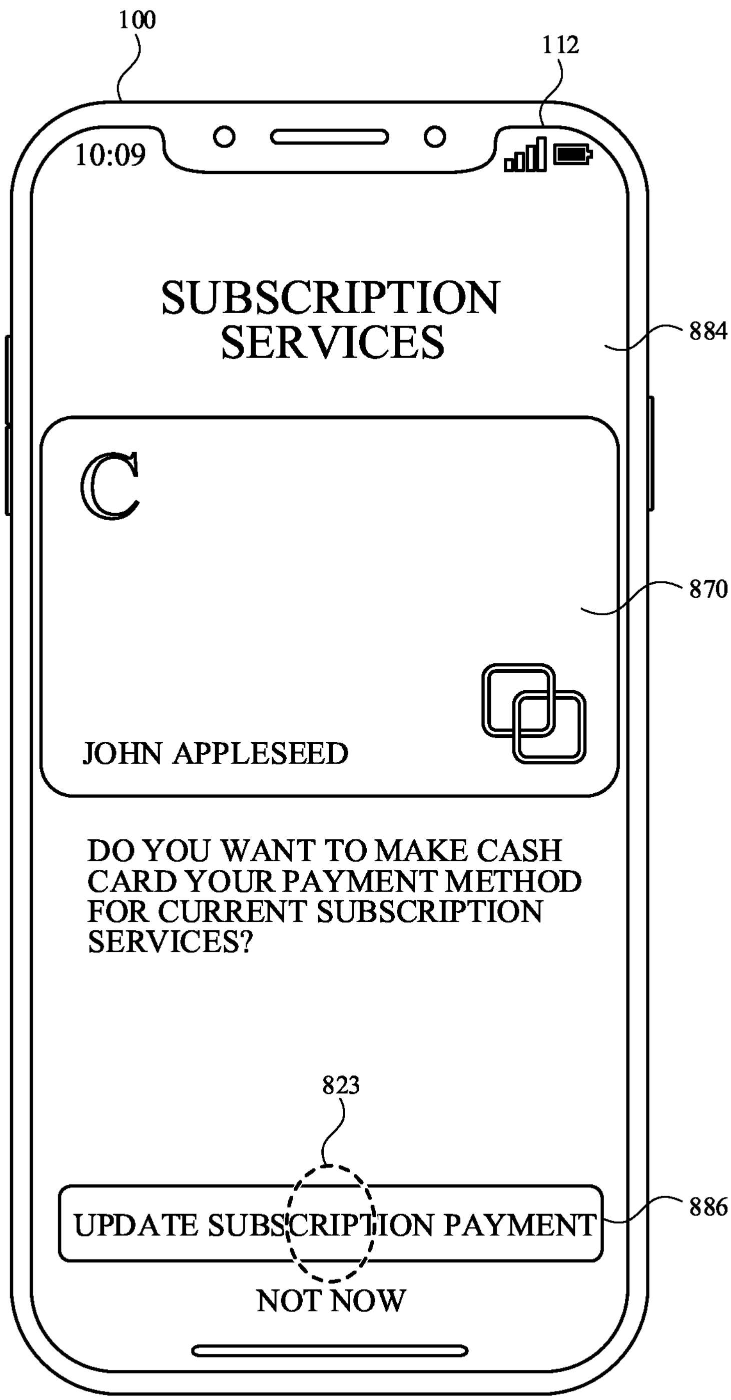

In FIG. 8M, electronic device 100 displays (e.g., in response to detecting user activation 821 of affordance 882), on display 112, a third post-activation user interface 884 that includes an indication that the transfer account (e.g., the first-party credit account; the points account) can be set as the default account to be used for current subscription services registered by the user on the electronic device. In some embodiments, electronic device 100 displays, in user interface 884, representation 870 of the transfer account (e.g., the first-party credit account; the points account) as in second post-activation user interface 880, and also displays text asking whether the transfer account should be set for in transfers (e.g., payment transactions; points transfers) involving current subscription services.

In FIG. 8M, while displaying user interface 884, electronic device 100 detects a user activation 823 of an affordance 886 to set the transfer account (e.g., the first-party credit account; the points account) for use in current subscription services.

Figure 8N:
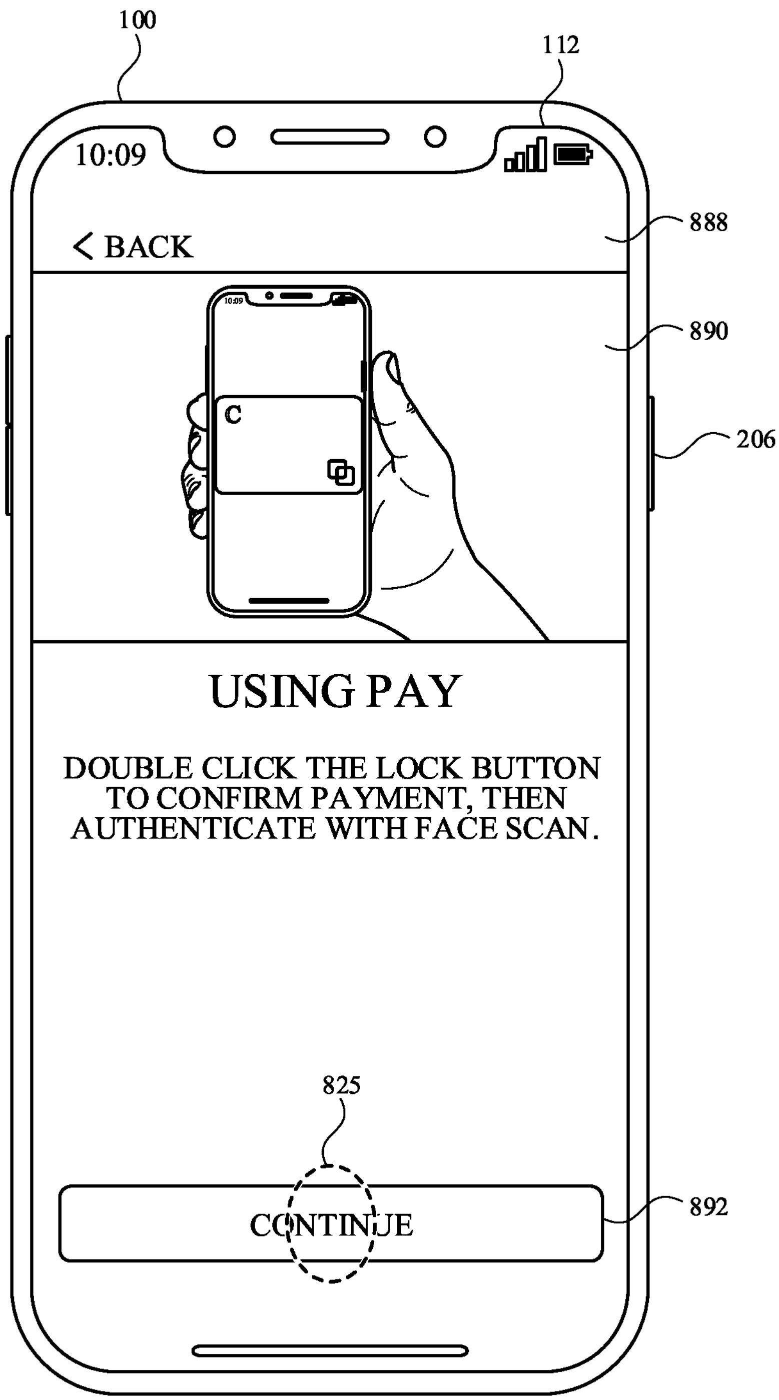

In FIG. 8N, electronic device 100 displays (e.g., in response to detecting user activation 823 of affordance 886), on display 112, a fourth post-activation user interface 888 that includes a tutorial 890 on using the transfer account (e.g., the first-party credit account; the points account) to perform transfers (e.g., payment transactions; points transfers). In some embodiments, tutorial 890 is an image or video depicting setting (e.g., arming) the transfer account (e.g., the first-party credit account; the points account) on the electronic device to be ready for use in a transfer (e.g., a payment transaction involving NFC communication with a transaction terminal).

In FIG. 8N, while displaying user interface 888, electronic device 100 detects a user activation 825 of an affordance 892 for proceeding to a next information page concerning the newly-activated transfer account (e.g., the first-party credit account; the points account).

Figure 8O:
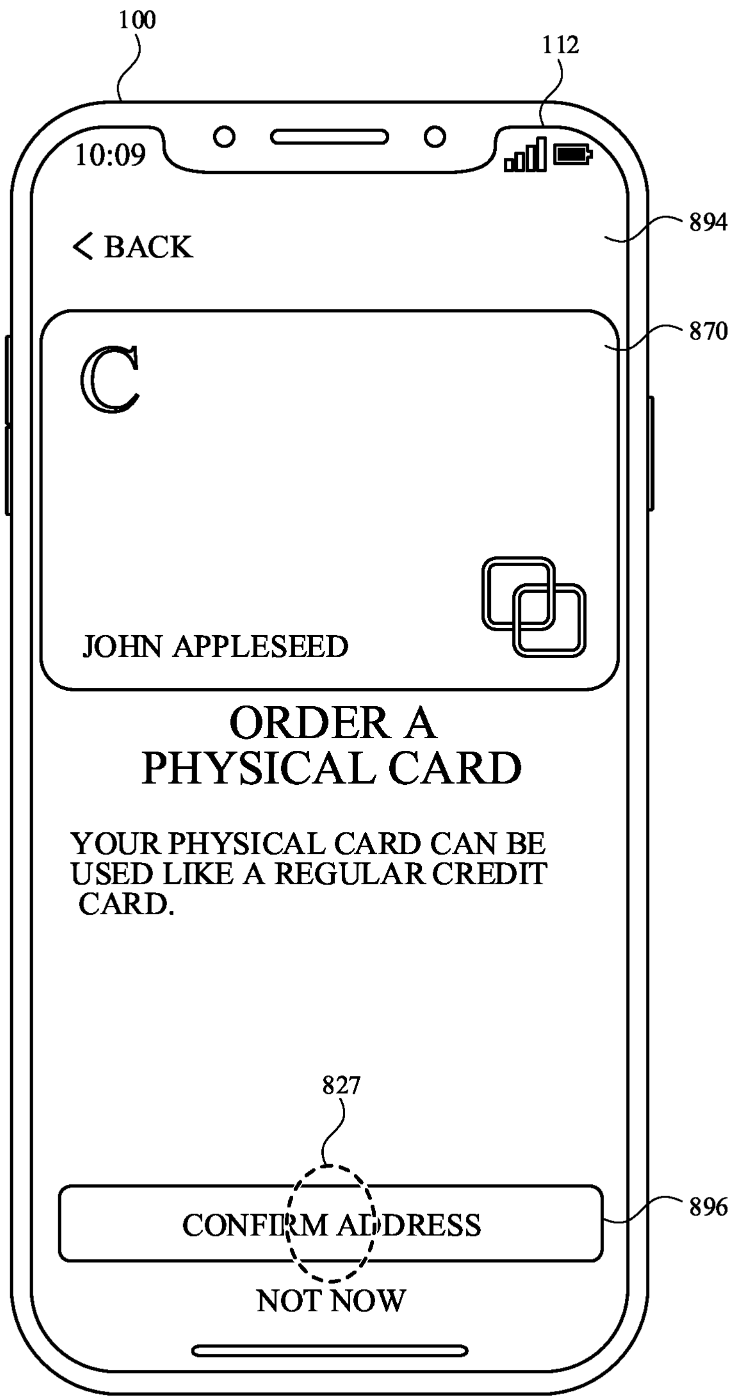

In FIG. 8O, electronic device 100 displays (e.g., in response to detecting user activation 825 of affordance 892), on display 112, a fifth post-activation user interface 894 indicating that a physical account object (e.g., a physical, real-world card) corresponding to the transfer account (e.g., the first-party credit card) can be ordered. In some embodiments, electronic device 100 displays, in user interface 894, representation 870 of the transfer account (e.g., the first-party credit account; the points account) as in third post-activation user interface 884 and also displays text indicating that the physical account object corresponding to the transfer account (e.g., the first-party credit account; the points account) can be used like other types of physical transfer accounts (e.g., like third-party credit cards; like physical points cards or membership cards).

In FIG. 8O, while displaying user interface 894, electronic device 100 detects a user activation 827 of an affordance 896 for confirming a mailing address for receiving the ordered physical account object. Features concerning the ordered physical account object are described in greater detail below with reference to FIGS. 26A-26N.

Figure 8P:
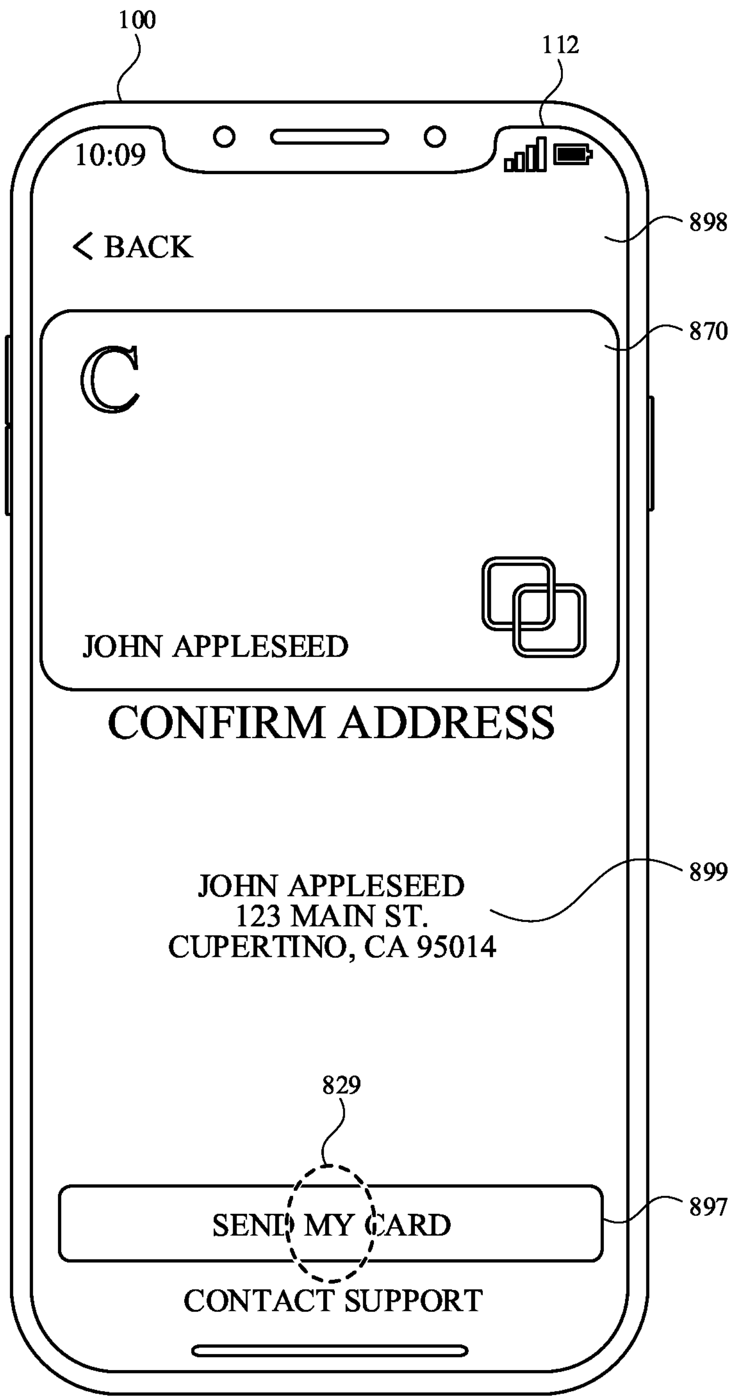

In FIG. 8P, in response to detecting user activation 827 of affordance 896, electronic device 100 displays, on display 112, an address confirmation user interface 898 that includes an indication 899 of a registered address of the user of the electronic device (e.g., the address entered in user interface 844 of FIG. 8G). In some embodiments, electronic device 100 displays, in user interface 898, representation 870 of the transfer account (e.g., the first-party credit account; the points account) as in fifth post-activation user interface 894.

In FIG. 8P, while displaying user interface 898, electronic device 100 detects a user activation 829 of an affordance 897 for ordering the physical account object (e.g., the physical, real-world card) corresponding to the transfer account (e.g., the first-party credit account; the points account).

Figure 8Q:
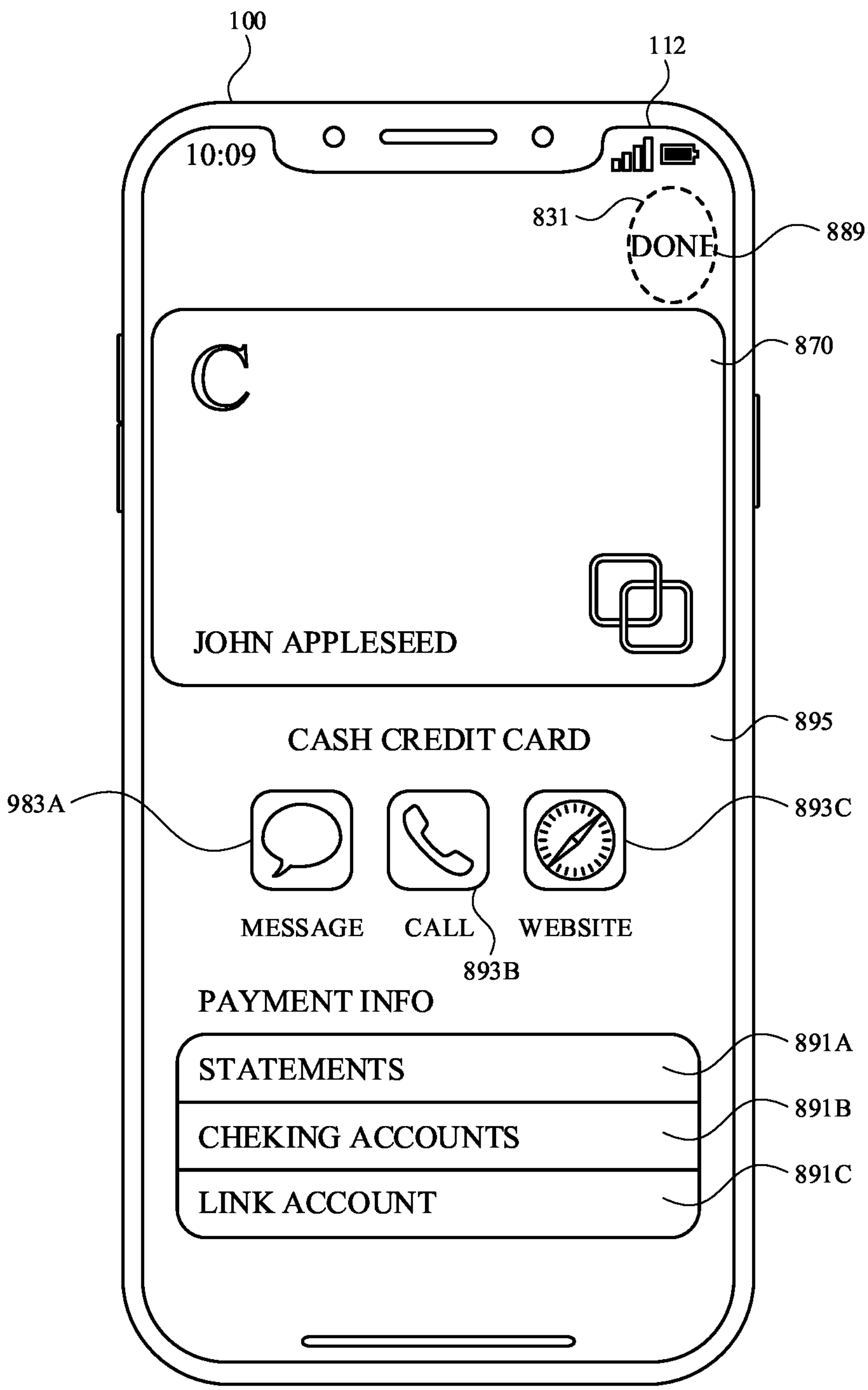

In FIG. 8Q, electronic device 100 displays (e.g., in response to detecting user activation 829 of affordance 897), on display 112, an information user interface 895 of the transfer account (e.g., the first-party credit account; the points account). In some embodiments, electronic device 100 displays, in information user interface 895 of the transfer account (e.g., the first-party credit account; the points account), representation 870 of the transfer account, a plurality of icons 893A-893C corresponding to applications (e.g., a messaging application, a phone application, a browser application) frequently used on the electronic device, and/or selectable information items 891A-891C for viewing information (e.g., statements) concerning the transfer account and/or managing the transfer account (e.g., selecting an external checking account linked to the transfer account, where the checking account is used for balance payments on the transfer account; linking the transfer to one or more services or operations, such as current subscription services), In FIG. 8Q, while displaying information user interface 895, electronic device 100 detects a user activation 831 of an affordance 889 for leaving the information user interface. In response to detecting user activation 831 of affordance 889, electronic device 100 displays a user interface different from information user interface 895 (e.g., user interface 802 of the transfer application).

Figure 8R:
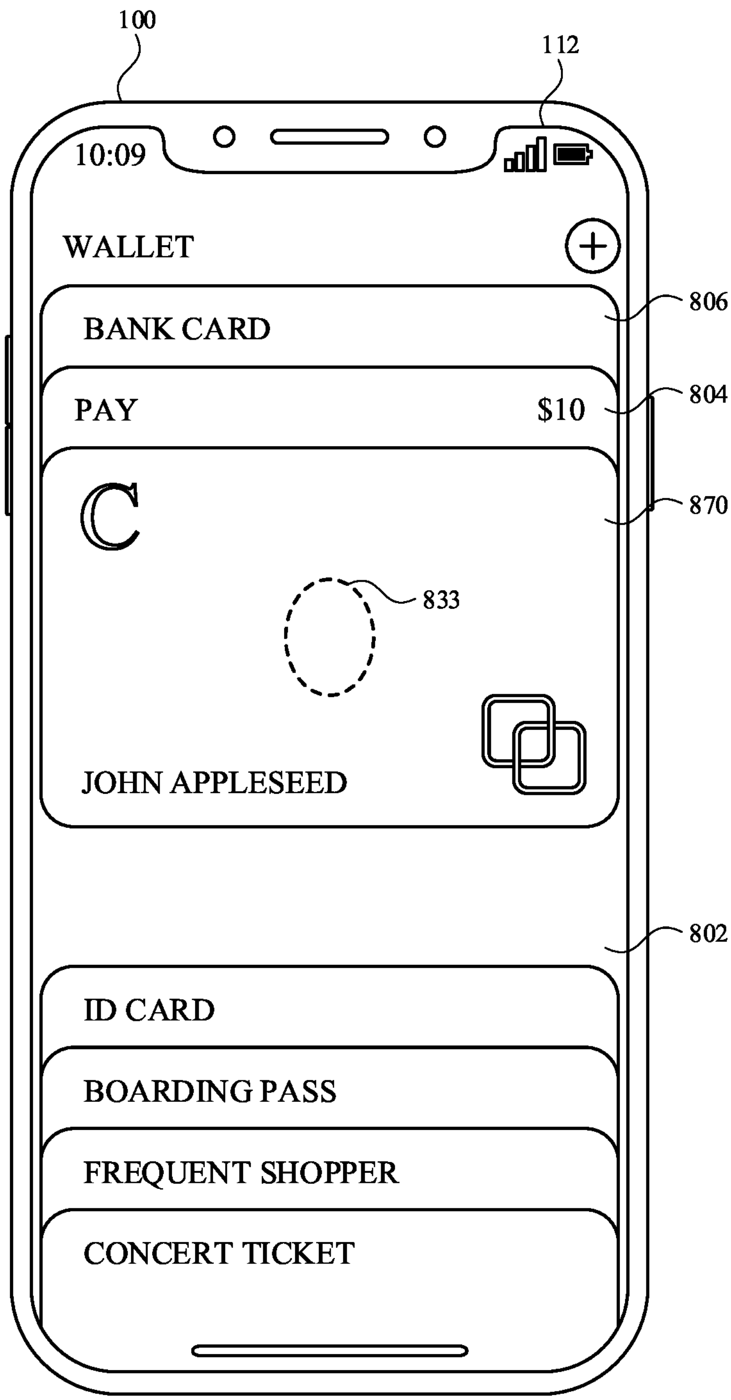

In FIG. 8R, electronic device 100 displays (e.g., in response to detecting user activation 831 of affordance 889), on display 112, user interface 802 of the transfer application (e.g., the electronic wallet application), as first depicted in FIG. 8A. Because the transfer account (e.g., the first-party credit account; the points account) is activated and linked to the transfer application of the electronic device, electronic device 100 displays, in user interface 802 of the transfer application, in addition to representation 804 and representation 806 corresponding to different types of transfer accounts (e.g., payment accounts, such as a third-party credit card account, a debit card account, and/or a stored-value account), representation 870 of the transfer account (e.g., the first-party credit account; the points account).

In FIG. 8R, while displaying user interface 802 of the transfer application (e.g., the electronic wallet application), electronic device 100 detects a selection 833 of (e.g., tap on) representation 870 of the transfer account (e.g., the first-party credit account; the points account).

Figure 8S:
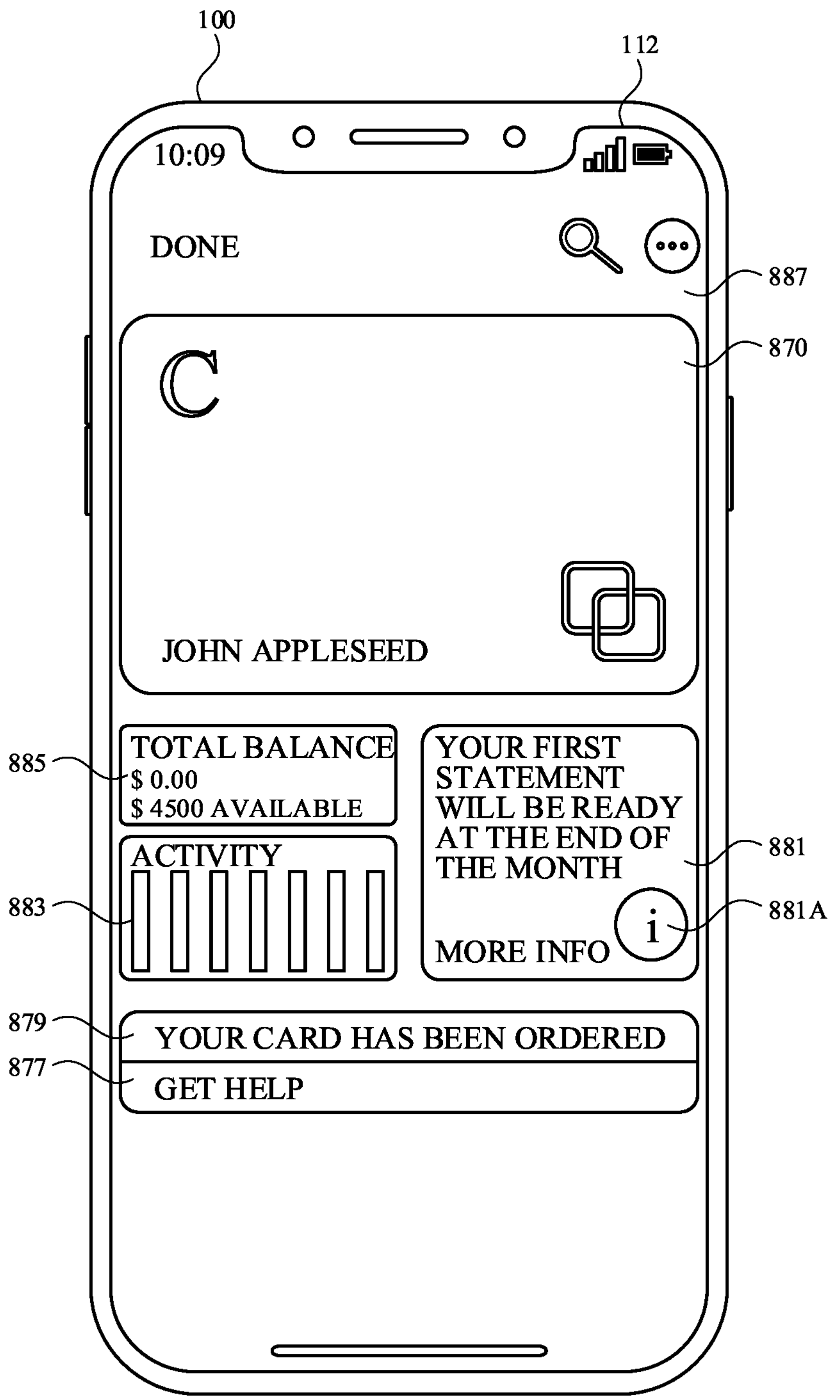

In FIG. 8S, in response to detecting selection of representation 870 of the transfer account (e.g., the first-party credit account; the points account), electronic device 100 displays, on display 112, a summary user interface 887 (e.g., a dashboard user interface) of the transfer account. In some embodiments, electronic device 100 displays, in summary user interface 887 of the transfer account (e.g., the first-party credit account; the points account), representation 870 of the transfer account, a balance indicator user interface element 885 (e.g., a balance module), an activity user interface element 883 (e.g., an activity module), and a balance transfer user interface element 881 (e.g., a balance payment module).

In some embodiments, balance indicator user interface element 885 (e.g., the balance module) includes an indication of a current balance of the transfer account (e.g., the first-party credit account; the points account) accumulated as a result of transfers (e.g., payment transactions, points transfers) made using the transfer account, and/or a limit (e.g., a credit limit) set for the transfer account.

In some embodiments, activity user interface element 883 (e.g., the activity module) includes a bar graph depicting transfer activity (e.g., payment activity) of the transfer account (e.g., the first-party credit account; the points account) during a predetermined time period (e.g., the past week), with each bar corresponding to transfers (e.g., payment transactions, points transfers) made during a respective day of the predetermined time period, and different colors used to represent different types of transfers based on a category of each transfer. For example, in the bar graph depicting transfer activity, a first color is used to represent transfers (e.g., payment transactions, points transfers) of one type of category (e.g., shopping, groceries, dining, travel, education, entertainment), a second color is used to represent transfers of another type of category, a third color is used to represent transfers of yet another type of category, and so on. In some embodiments, electronic device 100 continuously or periodically updates the bar graph of activity user interface element 883 as new transfers (e.g., payment transactions, points transfers) are made using the transfer account (e.g., the first-party credit account; the points account).

In some embodiments, balance transfer user interface element 881 (e.g., the balance payment module) includes an indication (e.g., text) of when a next balance transfer (e.g., a balance payment) is due (e.g., the next statement due date) for the transfer account (e.g., the first-party credit account; the points account). In some embodiments, if a balance transfer is past due (e.g., at least a portion of a previous statement balance was not paid by the due date), balance transfer user interface element 881 includes an indication that a balance transfer is past due. In some embodiments, if a portion (but not all of) the next balance transfer has been made (e.g., a portion of, but not all of, the statement balance has been paid), balance transfer user interface element 881 includes an indication of an amount of the portion of the balance transfer that was made. In some embodiments, balance transfer user interface element 881 includes an indicator 881A indicating (e.g., with text such as "pay," "pay early," "pay more," and/or symbols such as a checkmark, an exclamation mark) a status of a balance transfer (e.g., whether a balance payment is currently due, whether a balance payment is urgently due, whether a balance payment has been made). Features concerning balance transfer user interface element 881 are described in greater detail below with reference to FIGS. 29A-29J.

In some embodiments, electronic device 100 also displays, in summary user interface 887, a notification user interface element 879 (e.g., a notification module) that displays notifications or promotions concerning the transfer account (e.g., the first-party credit account; the points account) and an affordance 877 (e.g., stating "Get Help") for seeking assistance (e.g., contacting customer service) with use of the transfer account.

Figure 8T:
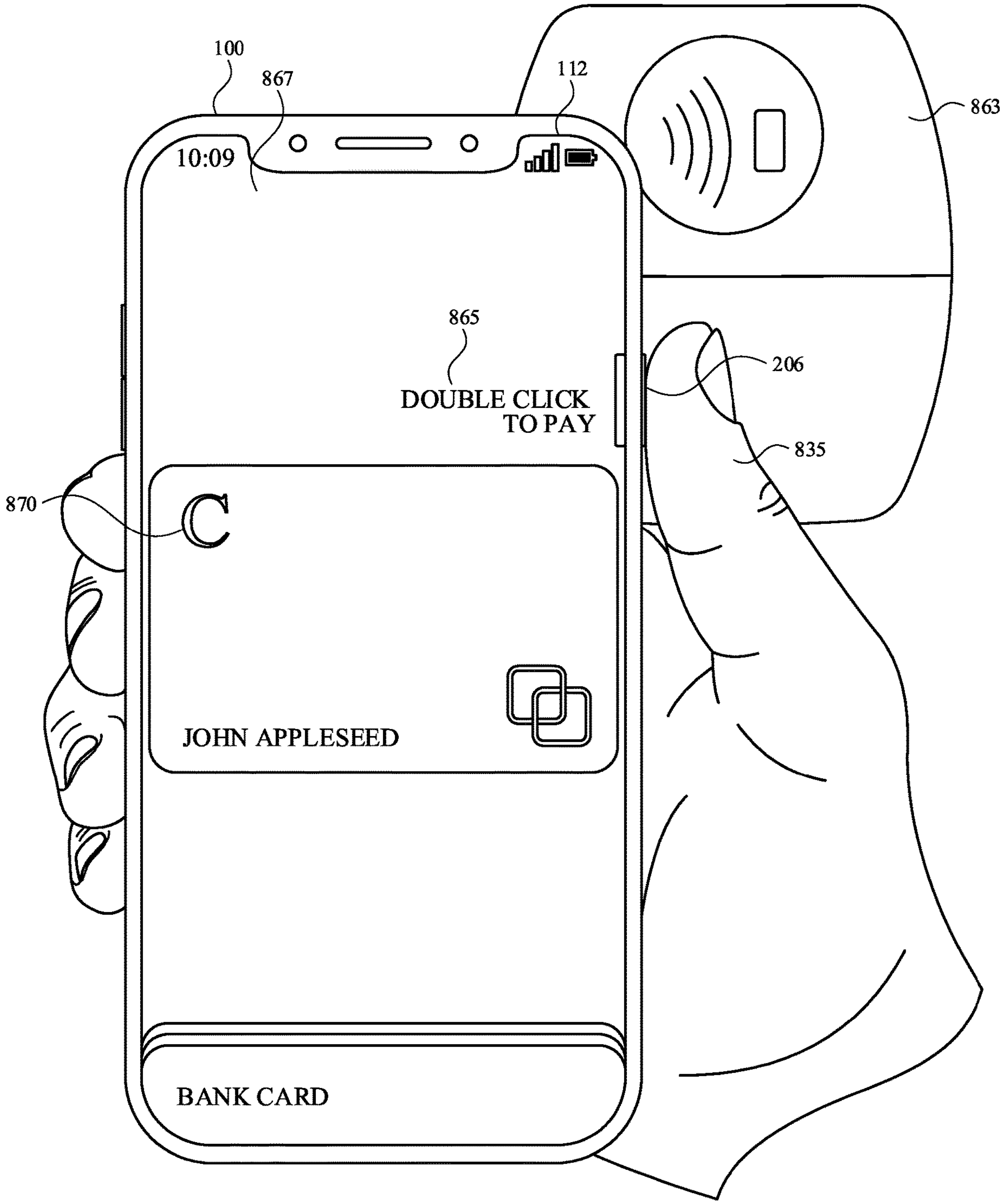
Figure 8U:
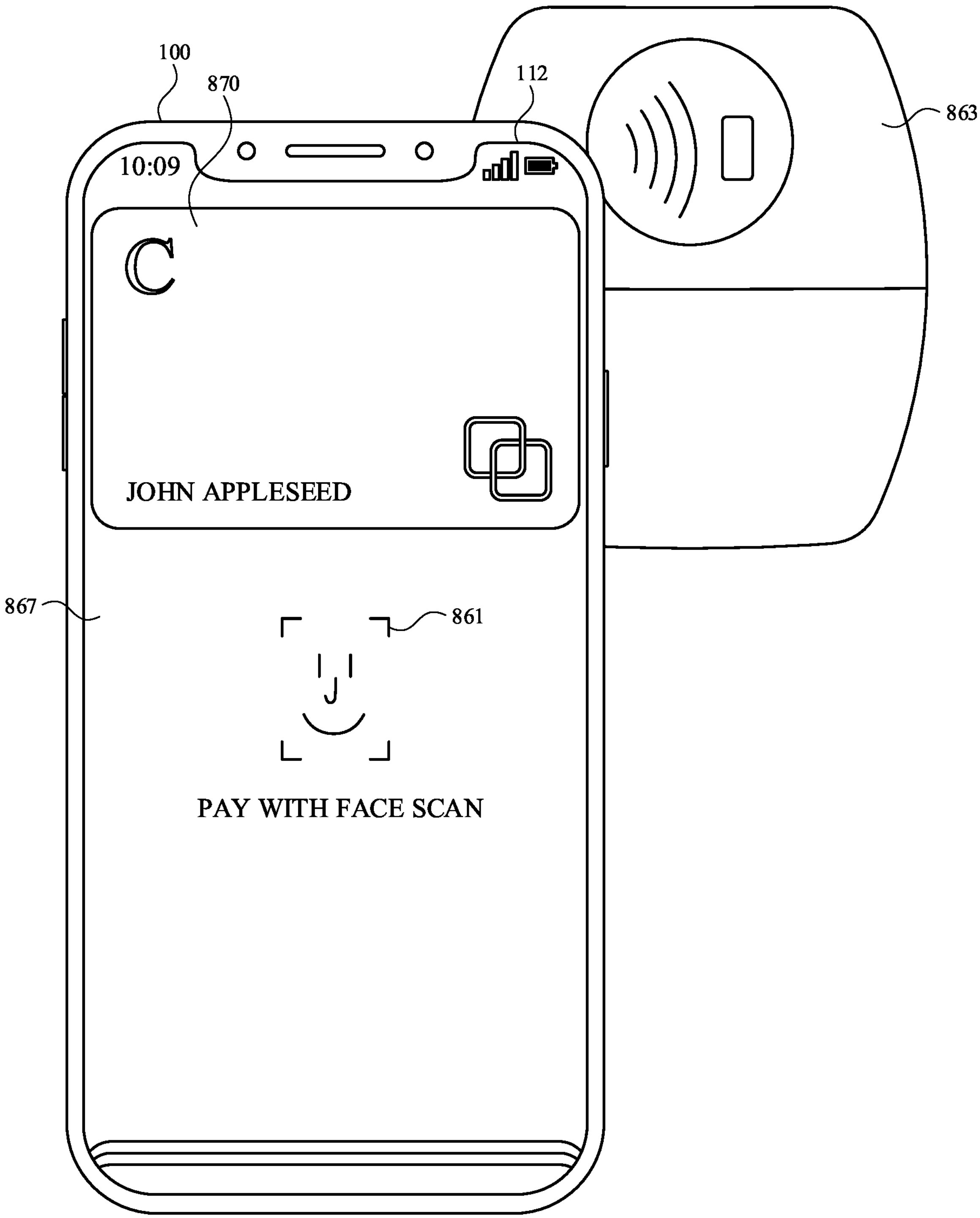
Figure 8V:
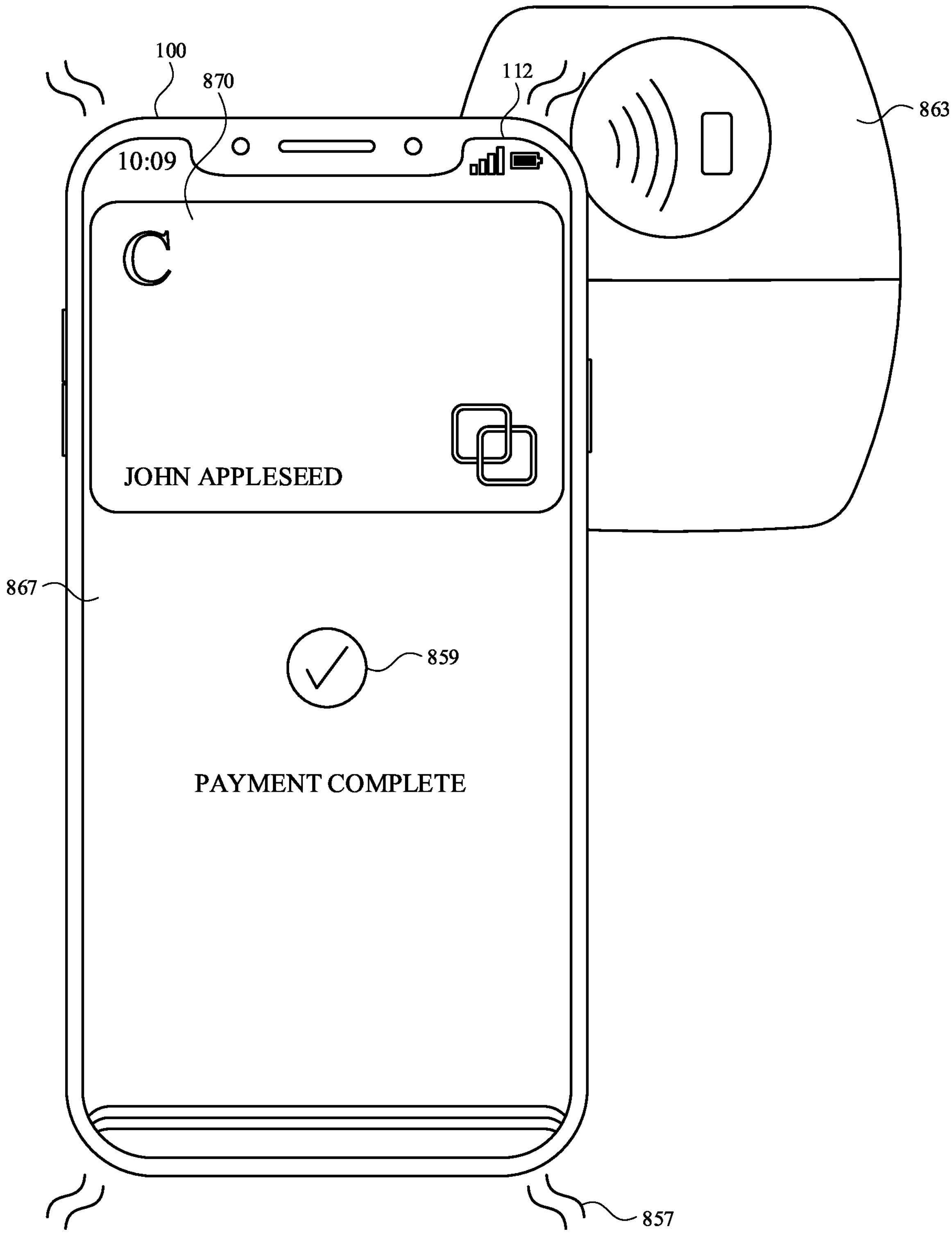

FIGS. 8T-8V illustrate a transfer (e.g., a NFC-based payment transaction, a points transfer) being performed by electronic device 100 with a transaction terminal 863 (an external device) using the transfer account (e.g., the first-party credit account; the points account).

In FIG. 8T, electronic device is displaying, on display 112, a user interface 867 of the transfer application (e.g., the electronic wallet application), where the transfer account (e.g., the first-party credit account; the points account) is set as the account to be used for the transfer (e.g., the payment transaction; the points transfer), as indicated by representation 870 of the transfer account being displayed in a center region of user interface 867.

In FIG. 8T, electronic device 100 receives a user input 835 on an input device (e.g., push button 206) of the electronic device in accordance with a transfer instruction 865 (e.g., stating "Double Click to Pay") displayed in user interface 867.

In FIG. 8U, in response to receiving user input 835 on the input device (e.g., push button 206) of the device, electronic device 100 displays, in user interface 867 of the transfer application (e.g., the electronic wallet application), an indication 861 requesting authentication (e.g., biometric authentication, such as facial recognition authentication, fingerprint authenticating, retina and/or iris scan authentication; or passcode or password authentication) to authorize the transfer (e.g., the payment transaction, the points transfer) using the transfer account (e.g., the first-party credit account; the points account).

In FIG. 8V, in response to receiving successful authentication, electronic device 100 displays, in user interface 867 of the transfer application (e.g., the electronic wallet application), an indication 859 that the transfer (e.g., the payment transaction; the points transfer) has been successfully completed using the transfer account (e.g., the first-party credit account; the points account). In some embodiments, in addition to displaying indication 859, electronic device 100 also generates (e.g., using haptic feedback controller 161 and/or haptic feedback module 133) tactile output 857 indicating that the transfer (e.g., the payment transaction; the points transfer) has been successfully completed using the transfer account (e.g., the first-party credit account; the points account).

FIGS. 9A-9C are a flow diagram illustrating a method for provisioning an electronic device with a transfer account, in accordance with some embodiments. Method 900 is performed at an electronic device (e.g., 100, 300, 500) with a display (e.g., 112) and one or more input devices (e.g., the touch screen of display 112, menu button 204, push button 206). Some operations in method 900 are, optionally, combined, the orders of some operations are, optionally, changed, and some operations are, optionally, omitted.

As described below, method 900 provides an intuitive way for managing a transfer account. The method reduces the cognitive burden on a user for managing a transfer account, thereby creating a more efficient human-machine interface. For battery-operated computing devices, enabling a user to manage a transfer account faster and more efficiently conserves power and increases the time between battery charges.

The electronic device (e.g., 100) displays (910), on the display (e.g., 112), a user interface (e.g., 702, 864) including a first affordance (e.g., 708, 874) for activating a transfer account (e.g., an account used to transfer items of a first type, such as funds, credits, points; a payment account; a virtual card account; a virtual-only account that does not correspond to an existing account with a corresponding physical card).

In some embodiments, the first affordance (e.g., 708, 874) for activating the transfer account is displayed without displaying an identifier corresponding to the transfer account (e.g., because the transfer account has not yet been created). Displaying the affordance without displaying an identifier corresponding to the transfer account enhances security by not displaying the identifier corresponding to the transfer account unless it is requested by the user and/or is necessary to do so, thereby reducing the likelihood that an unauthorized person can view the identifier and gain access to the transfer account. Enhancing security features of the device enhances the operability of the device by making the device more secure, which in turn enables the user to use the device more efficiently and frequently.

In some embodiments, prior to displaying the user interface (e.g., 702, 864) including the first affordance (e.g., 708, 874) for activating the transfer account, the electronic device (e.g., 100) displays (902) a user interface (e.g., 832, 844) for entering user information, where at least a portion of the user information has been filled into the user interface based on previously stored information about a user of the device (e.g., such that the user of the device does not need to manually enter the user's information required to activate the transfer account). Filling out at least a portion of the user interface into the user interface based on previously stored information about the user of the device enables the user to proceed more quickly and easily through the activation process by reducing the number of inputs required and increasing the accuracy of the information (reducing likelihood of typographical errors). Reducing the number of inputs needed to perform an operation enhances the operability of the device and makes the user-device interface more efficient (e.g., by helping the user to provide proper inputs and reducing user mistakes when operating and/or interacting with the device) which, additionally, reduces power usage and improves battery life of the device by enabling the user to use the device more quickly and efficiently. In some embodiments, the user interface includes one or more affordances for editing, replacing, or entering different user information and/or adding additional user information.

In some embodiments, prior to displaying the user interface (e.g., 702, 864) including the first affordance (e.g., 708, 874) for activating the transfer account, the electronic device (e.g., 100) displays (904), on the display (e.g., 112), a request for identification verification (e.g., photo ID verification). In some embodiments, the electronic device (e.g., 100) detects (906), via a camera sensor of the electronic device, a physical object (e.g., 856) that serves as identification of the user (e.g., a photo ID, passport or other proof of identity). In some embodiments, the electronic device transmits (908) information (e.g., driver's license number and/or identifier, date of birth, and/or name), retrieved from the detected identification to an identity verification service and/or a service for generating the transfer account (e.g., for use in activating the transfer account). Using the physical object to verify the user enhances security by requiring that the user possess the physical object in order to complete the verification. Enhancing security features of the device enhances the operability of the device by making the device more secure, which in turn enables the user to use the device more efficiently and frequently.

While displaying the first affordance (e.g., 708, 874) for activating the transfer account, the electronic device (e.g., 100) detects (912), via the one or more input devices, user activation of the first affordance.

In response to detecting the user activation of the first affordance (e.g., 708, 874), the electronic device (e.g., 100) transmits (914) (e.g., to a remote server) a request to create the transfer account (e.g., where the request does not include information identifying the transfer account). In some embodiments, the transfer account is a new account that does not correspond to any existing account, such as any existing debit card or credit card account. In other words, in some embodiments, the transfer account is a newly-issued or newly-activated account.

Subsequent to (e.g., only momentarily after; in response to) transmitting the request, the electronic device (e.g., 100) receives (916) (e.g., from the remote server) a communication indicating that the transfer account is available for use (e.g., to make transfers using the electronic device, such as a transaction using funds or involving credit and/or points).

In response to receiving the communication indicating that the transfer account is available for use, the electronic device e.g., 100) displays (918), on the display (e.g., 112), a second affordance (e.g., 878) for initiating a process for provisioning the electronic device with a secure credential associated with making transfers using the transfer account. Displaying the second affordance for initiating the process for provisioning the device with secure credential associated with making transfers using the transfer account in response to receiving the communication indicating that the transfer account is available for use enhances visual feedback by enabling the user to quickly and easily recognize that the transfer account is available for use. Providing improved visual feedback to the user enhances the operability of the device and makes the user-device interface more efficient (e.g., by helping the user to provide proper inputs and reducing user mistakes when operating and/or interacting with the device) which, additionally, reduces power usage and improves battery life of the device by enabling the user to use the device more quickly and efficiently. In some embodiments, the electronic device concurrently displays an indication that creation of the transfer account has been approved, and that selection of the affordance would cause the transfer account to be provisioned on the electronic device. In some embodiments, the secure credential is a credential that is stored in a secure element of the electronic device, where the secure element is not accessible by a third-party application installed on the device. In some embodiments, a credential that is not secure is not stored in the secure element of the electronic device.

In some embodiments, in response to receiving the communication indicating that the transfer account is available for use, the electronic device (e.g., 100) displays (920) (e.g., concurrently with the second affordance (e.g., 878) for initiating the process for provisioning the electronic device with the secure credential associated with making transfers using the transfer account), on the display (e.g., 112), an indication that the transfer account is available for use (e.g., to make transfers using the electronic device, such as a transaction using funds or involving credit and/or points).

In some embodiments, while displaying the second affordance (e.g., 878) for initiating the process for provisioning the electronic device (e.g., 100) with the secure credential associated with making transfers using the transfer account, the electronic device detects (922), via the one or more input devices, user activation of the second affordance. In some embodiments, in response to detecting the user activation of the second affordance, the electronic device displays (924), on the display, a first selectable option (e.g., 882, 886) for setting the transfer account to be available for use (e.g., as one of the available payment accounts or as the default payment account) by one or more services (e.g., first-party-provided services) that are accessible using the electronic device. Displaying the first selectable option for setting the transfer account to be available for use by one or more services in response to detecting the user activation of the second affordance enables the user to quickly and easily set the transfer account to be used for the one or more services. Providing additional control of the device (e.g., without cluttering the UT with additional displayed controls) enhances the operability of the device and makes the user-device interface more efficient (e.g., by allowing the user to configure a certain setting at one time when provisioning the transfer account) which, additionally, reduces power usage and improves battery life of the device by enabling the user to use the device more quickly and efficiently.

In some embodiments, while displaying the first selectable option (e.g., 882, 886) for setting the transfer account to be available for use by the one or more services, the electronic device (e.g., 100) detects (926) a user selection of the first selectable option. In some embodiments, in response to detecting the user selection of the first selectable option, the electronic device displays (928), on the display (e.g., 112), a second selectable option that, when selected, sets the transfer account as a default account for use by the one or more services. Displaying the second selectable option for the transfer account as a default account for use by the one or more services in response to detecting the user selection of the first selectable option enables the user to quickly and easily set the transfer account as a default account for use by the one or more services. Providing additional control of the device (e.g., without cluttering the UI with additional displayed controls) enhances the operability of the device and makes the user-device interface more efficient (e.g., by allowing the user to easily configure the transfer account to be the default account) which, additionally, reduces power usage and improves battery life of the device by enabling the user to use the device more quickly and efficiently.

In some embodiments, while displaying the second affordance (e.g., 878) for initiating the process for provisioning the electronic device (e.g., 100) with a secure credential associated with making transfers using the transfer account, the electronic device detects (922), via the one or more input devices, user activation of the second affordance. In some embodiments, subsequent to (or in response to) detecting the user activation of the second affordance, the electronic device displays (930) (e.g., concurrently), on the display, an affordance (e.g., 897) for requesting (e.g., ordering) a physical account object that can be used as part of an authorization process for authorizing transfers from the transfer account (e.g., a physical card corresponding to the transfer account, as described in greater detail below with reference to FIGS. 26A-26J), and a graphical representation (e.g., 704, 870; a preview) of the physical account object.

In some embodiments, the electronic device (e.g., 100) provisions (932) (e.g., in response to detecting the user activation of the second affordance) the electronic device with the secure credential. In some embodiments, subsequent to (or in response to) provisioning the electronic device with the secure credential, the electronic device displays (934), on the display (e.g., 112), an account summary user interface (e.g., 710, 887) corresponding to the transfer account (e.g., same as or similar to the user interface corresponding to the transfer account described below with reference to FIGS. 11A-11O), where the account summary user interface includes information about transfers made with the account, and information about a status of the physical account object (e.g., object creation information, shipping information, activation information for the physical account object). In some embodiments, the account summary user interface (e.g., 710, 887) also includes one or more of: a graphical representation of the transfer account (e.g., 704, 870; same as or similar to the graphical representation of the transfer account described below with reference to FIGS. 14A-14U), balance information corresponding to the transfer account (e.g., 712, 885; a balance summary, a next statement due date if balance is still remaining on the next statement, an amount of a past balance reduction transfer), and past transfer activity information corresponding to the transfer account (e.g., 714, 716, 883, 881; a spending summary, a visual element that provides a summary or indication of past transfers made using the transfer account). Displaying the account summary user interface corresponding to the transfer account allows the user to quickly and easily view information about the transfer account and manage the transfer account. Providing improved visual feedback and control options to the user enhances the operability of the device and makes the user-device interface more efficient (e.g., by helping the user to provide proper inputs and reducing user mistakes when operating and/or interacting with the device) which, additionally, reduces power usage and improves battery life of the device by enabling the user to use the device more quickly and efficiently.

In some embodiments, subsequent to (or in response to) provisioning (e.g., in response to detecting the user activation of the second affordance) the electronic device (e.g., 100) with the secure credential, the electronic device detects (936) a user input (e.g., 835) directed to enabling the transfer account for use in a transfer operation (e.g., an input on a first input device of the one or more input devices, a single or double press of the first input device, a press-and-hold of the input device, a touch input on a touch-sensitive surface of the electronic device). In some embodiments, in response to detecting the user input directed to proceeding with the transfer, in accordance with a determination (e.g., using biometric authentication, such as fingerprint authentication, facial recognition authentication, retina and/or iris scan authentication; using passcode or password authentication) that authentication criteria are satisfied, the electronic device enables (938) (e.g., arms) the transfer account for use in the transfer. In some embodiments, in response to detecting the user input directed to proceeding with the transfer, in accordance with a determination that the authentication criteria are not satisfied, the electronic device forgoes enabling the transfer account for use in the transfer. Enabling the transfer account for use in the transfer in accordance with a determination that authentication criteria are satisfied enhances security by requiring secure, user-specific information to authorize enabling the transfer account. Enhancing security features of the device enhances the operability of the device by making the device more secure, which in turn enables the user to use the device more efficiently and frequently.

In some embodiments, the transfer account is of a first type (e.g., configured for advanced historical analysis and/or tracking, a first-party issued (or branded) account type), and the electronic device (e.g., 100) is provisioned for use with a second transfer account (e.g., a bank account, a credit account) different from the transfer account, the second transfer account being of a second type (e.g., not configured for advanced historical analysis and/or tracking, not first-party-issued (or branded) account type) different from the first type. In some embodiments, subsequent to (or in response to) provisioning (e.g., in response to detecting the user activation of the second affordance) the electronic device with the secure credential (940), in accordance with a determination that the transfer account is an initial account of the first type to be provisioned onto the electronic device ((e.g., there are no other accounts of the first type that are or were provisioned on the device), the electronic device displays (942), on the display (e.g., 112), a tutorial (e.g., 888) for using the transfer account on the electronic device for transfers. In some embodiments, subsequent to (or in response to) provisioning (e.g., in response to detecting the user activation of the second affordance) the electronic device with the secure credential, in accordance with a determination that the transfer account is not the initial account of the first type to be provisioned onto the electronic device (e.g., there is at least one other account of the first type that is or was provisioned on the device), the electronic device forgoes displaying (944), on the display, the tutorial for using the transfer account on the electronic device for transfers. Displaying the tutorial in accordance with a determination that the transfer account is an initial account of the first type to be provisioned onto the electronic device and forgoing displaying the tutorial in accordance with a determination that the transfer account is not the initial account of the first type to be provisioned onto the electronic device improves usability of the device by providing information only when it is determined that the information may be helpful to the user of the device, thus making the user-device interface more efficient which, additionally, reduces power usage and improves battery life of the device by enabling the user to use the device more quickly and efficiently.

In some embodiments, prior to displaying the user interface including the first affordance for activating the transfer account, the electronic device (e.g., 100) detects, via the one or more input devices, one or more inputs directed to initiating a process for acquiring (e.g., purchasing, obtaining ownership of) an item (e.g., a second electronic device different from the electronic device). In some embodiments, in response to detecting the one or more inputs, in accordance with a determination that the process for acquiring the item has been initiated, the electronic device (e.g., 100) displays, on the display (e.g., 112), one or more activation user interfaces, where the one or more activation user interfaces include the user interface including the first affordance for activating the transfer account. Displaying the one or more activation user interfaces in response to detecting the one or more inputs directed to imitating the process for acquiring the item and in accordance with the determination that the process for acquiring the item has been initiated provides a user with quick and easy access to the process for activating the transfer account. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the electronic device (e.g., 100) provisions the electronic device with the secure credential. In some embodiments, subsequent to (or in response to) provisioning the electronic device with the secure credential, the electronic device (e.g., 100) displays, on the display (e.g., 112), an account summary user interface corresponding to the transfer account, where the account summary user interface includes a representation of a first transfer made using the transfer account, where the first transfer corresponds to a transfer made toward acquiring the item. Displaying a representation of the first transfer that corresponds to a transfer made toward acquiring the item subsequent to or in response to provisioning the electronic device with the secure credential enables a user to quickly and easily recognize that a transfer toward acquiring the item has been made using the transfer account. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Note that details of the processes described above with respect to method 900 (e.g., FIGS. 9A-9C) are also applicable in an analogous manner to the methods described below. For example, method 1200 optionally includes one or more of the characteristics of the various methods described above with reference to method 900. For example, the summary user interface described in method 1200 can display information about and options for managing the transfer account activated in method 900. For another example, method 1500 optionally includes one or more of the characteristics of the various methods described above with reference to method 900. For example, the visual feedback (e.g., of moving particles; of moving color blobs) described in method 1500 can be provided on a representation of the transfer account activated in method 900. For another example, method 1800 optionally includes one or more of the characteristics of the various methods described above with reference to method 900. For example, the place summary user interface concerning transfer made at a common place described in method 1800 can relate to transfers made using the transfer account activated in method 900. For example, method 2100 optionally includes one or more of the characteristics of the various methods described above with reference to method 900. For example, the summary user interface described for managing transfers of a numerical value to the transfer account described in method 2100 can relate to transfers to the transfer account activated in method 900. For another example, method 2400 optionally includes one or more of the characteristics of the various methods described above with reference to method 900. For example, the authentication credential described in method 2400 for performing transfers can correspond to the transfer account activated in method 900. For another example, method 2700 optionally includes one or more of the characteristics of the various methods described above with reference to method 900. For example, the transfers performed using the physical account object activated in method 2700 can correspond to the transfer account activated in method 900. For another example, method 3000 optionally includes one or more of the characteristics of the various methods described above with reference to method 900. For example, the visual indications provided by the user interface element described in method 3000 can concern required balance transfers for the transfer account activated in method 900. For brevity, these details are not repeated below.

FIG. 9D is a flow diagram illustrating a method for provisioning an electronic device with a user account, in accordance with some embodiments. Method 901 is performed at an electronic device (e.g., 100, 300, 500) with a display (e.g., 112) and one or more input devices (e.g., the touch screen of display 112, menu button 204, push button 206). Some operations in method 901 are, optionally, combined, the orders of some operations are, optionally, changed, and some operations are, optionally, omitted.

As described below, method 901 provides an intuitive way for managing a user account. The method reduces the cognitive burden on a user for managing a user account, thereby creating a more efficient human-machine interface. For battery-operated computing devices, enabling a user to manage a user account faster and more efficiently conserves power and increases the time between battery charges.

The electronic device (e.g., 100) displays (903, 910), on the display (e.g., 112), a user interface (e.g., 702) including a first affordance (e.g., 708) for activating a user account.

While displaying the first affordance (e.g., 708) for activating the user account, the electronic device (e.g., 100) detects (905, 912), via the one or more input devices, user activation of the first affordance.

In response to detecting the user activation of the first affordance (e.g., 708), the electronic device (e.g., 100) transmits (907, 914) a request to create the user account.

Subsequent to transmitting the request, the electronic device (e.g., 100) receives (909, 916) a communication indicating that the user account is available for use.

In response to receiving the communication indicating that the user account is available for use, the electronic device (e.g., 100) displays (911, 918), on the display (e.g., 112), a second affordance for initiating a process for provisioning the electronic device with a secure credential associated with using the user account.

In some embodiments, the user account corresponds to a computer storage account. In some embodiments, using the user account includes requesting storage of data onto available computer storage resources (e.g., an available MB or GB amount of computer resources) associated with the computer storage account.

In some embodiments, the user account corresponds to a financial account. In some embodiments, using the user account includes making purchases based on financial resources (e.g., credit or money) associated with the financial account.

In some embodiments, the user account is a transfer account, and the technique described with respect to FIG. 9D includes some or all aspects of the technique described above with respect to FIGS. 9A-9C.

FIGS. 10A-10B illustrate exemplary user interfaces for providing usage information (e.g., storage usage information) of a user account (e.g., a computer storage account), in accordance with some embodiments. The user interfaces in these figures are used to illustrate the processes described below, including the processes in FIGS. 12A-12D and FIG. 12E.

FIG. 10A illustrates electronic device 100 displaying, on display 112, summary user interface 710. As discussed, in some embodiments, summary user interface 710 includes representation 704 of the user account (e.g., a computer storage account), usage indicator user interface element 712, past usage user interface element 714, and deletion user interface element 716.

In FIG. 10A, a portion of the use quota of the user account (e.g., a computer storage account)—that is, a portion of the computer storage resources associated with the user account is storing data. In this example, 1.5 GB of the 2.0 GB use quota is used, as indicated by usage indicator user interface element 712. Also in FIG. 10A, the bar graph of past usage user interface element 714 indicates amounts and types of data that have been stored on the computer storage resources associated with the user account (e.g., a computer storage account) on respective days during a past predetermined period of time (e.g., the past week). In some embodiments, in the bar graph, a first color is used to indicate a first type of data (e.g., data corresponding to video files) that were stored, a second color is used to indicate a second type of data (e.g., data corresponding to document files) that were stored, and a third color is used to indicate a third type of data (e.g., data corresponding to music files) that were stored. As in FIG. 10A, deletion user interface element 716 indicates a next date by which at least a portion of the data that is stored and/or archived on the computer storage resources associated with the user account (e.g., a computer storage account) should be deleted.

In FIG. 10A, electronic device 100 also displays, in summary user interface 710, an stored data list 720 (e.g., similar to transfer items list 875 described below with reference to FIG. 11B) that shows a plurality of recent user account activity corresponding to data being stored on the computer storage resources associated with the user account (e.g., a computer storage account). In this example, the stored data list 720 includes a first past stored data item 720A corresponding to a first amount (e.g., 150 MB) of a first type of data (e.g., data corresponding to photo files) being stored on the computer storage resources associated with the user account (e.g., a computer storage account). In this example, the stored data list 720 also includes a second past stored data item 720B corresponding to a second amount (e.g., 3 MB) of a second type of data (e.g., data corresponding to document files) being stored on the computer storage resources associated with the user account (e.g., a computer storage account).

FIG. 10B illustrates electronic device 100 displaying, on display 112, a usage detail user interface 1002 (e.g., similar to activity user interface 1102 described below with reference to FIG. 11D) that includes detailed usage information of the computer storage resources associated with the user account (e.g., a computer storage account). In some embodiments, electronic device 100 displays usage user interface 1002 in response to detecting a user activation (e.g., a tap input) of past usage user interface element 714 of summary user interface 710.

In some embodiments, usage detail user interface 1002 includes a usage summary representation 1004 that includes an indication 1004A of the total amount of data that has been stored and/or archived on the user account (e.g., a computer storage account) during a predetermined time period (e.g., the past week). In some embodiments, usage summary representation 1004 includes an indication 1004B of a change in the total amount of data that has been stored and/or archived on the user account (e.g., a computer storage account) during the current time period (e.g., the current week) as compared to a previous time period (e.g., the previous week). In some embodiments, usage summary representation 1004 includes a bar graph 1004C corresponding to an enlarged view of the bar graph shown in past usage user interface element 714 of summary user interface 710.

In some embodiments, usage detail user interface 1002 includes a rewards user interface element 1008 that indicates an amount of additional bonus use quota (in this example, 10 MB) that has been rewarded to the user account (e.g., a computer storage account), such that the use quota of the user account is further increased by the bonus amount. In some embodiments, the bonus use quota is gained and accumulated based (e.g., a percentage of) the amount of data that is stored and/or archived on the user account (e.g., a computer storage account). Thus, in some embodiments, the user account (e.g., a computer storage account) gains additional bonus use quota if more data is stored and/or archived on the user account.

In some embodiments, usage detail user interface 1002 includes a data type items list 1010 that comprises a list of selectable items representing different types of data (e.g., data corresponding to photo files, data corresponding to document files, data corresponding to music files, data corresponding to video files, data corresponding to application files) that are stored and/or archived on the user account (e.g., a computer storage account). In some embodiments, a respective data type item of data type items list 1010 includes an indication of the total amount of data that is stored and/or archived on the user account (e.g., a computer storage account) for its respective type of data, and the number of instances in which the computer storage resources associated with the user account was accessed to store the respective type of data. In this example, data type items list 1010 includes a first data type item 1010A corresponding to a first type of data that is stored and/or archived on the user account (e.g., data corresponding to photo files), a second data type item 1010B corresponding to a second type of data that is stored and/or archived on the user account (e.g., data corresponding to music files), and a third data type item 1010C corresponding to a third type of data that is stored and/or archived on the user account (e.g., data corresponding to document files).

In some embodiments, while displaying usage detail user interface 1002, electronic device 100 displays, on display 112 (e.g., over a portion of usage detail user interface 1002, such as a bottom-edge portion of user interface 1002), a footer user interface 1014 (e.g., similar to footer user interface 1116 described below with reference to FIG. 11D) for initiating a process for deleting at least a portion of the data that is stored and/or archived on the user account (e.g., a computer storage account). In some embodiments, footer user interface 1014 includes an indication of a date by which at least a portion of the data that is stored and/or archived on the user account (e.g., a computer storage account) should be deleted in order to avoid a penalty (e.g., a reduction in use quota), and the amount of data that should be deleted by the date in order to avoid the penalty. In some embodiments, footer user interface 1014 includes a delete affordance 1016 for initiating the process for deleting at least a portion of the data that is stored and/or archived on the user account (e.g., a computer storage account).

FIGS. 11A-11O illustrate exemplary user interfaces for providing usage information of a transfer account, in accordance with some embodiments. The user interfaces in these figures are used to illustrate the processes described below, including the processes in FIGS. 12A-12D.

FIG. 11A illustrates electronic device 100 displaying, on display 112, user interface 802 of the transfer application (e.g., the electronic wallet application) first described above with reference to FIG. 8A. User interface 802 of the transfer application includes representation 870 of the transfer account (e.g., the first-party credit account; the points account). As mentioned, in some embodiments, the transfer account is a first-party credit account (e.g., a revolving credit account that is issued or branded by the manufacturer of the electronic device), and provides rewards (e.g., cash back rewards) based on the amount of transfers (e.g., payment transactions, points transfers) made using the transfer account (e.g., cash back rewards that are based on a certain percentage of the value of each transition). As also mentioned, in some embodiments, the transfer account is a points account (e.g., for meal points, for printer credits, for membership points) that provides rewards (e.g., points rewards) based on the amount of points used using the transfer account.

In FIG. 11A, while displaying user interface 802 of the transfer application (e.g., the electronic wallet application), electronic device 100 detects a user activation 1101 of representation 870 of the transfer account (e.g., the first-party credit account; the points account).

Figure 11B:
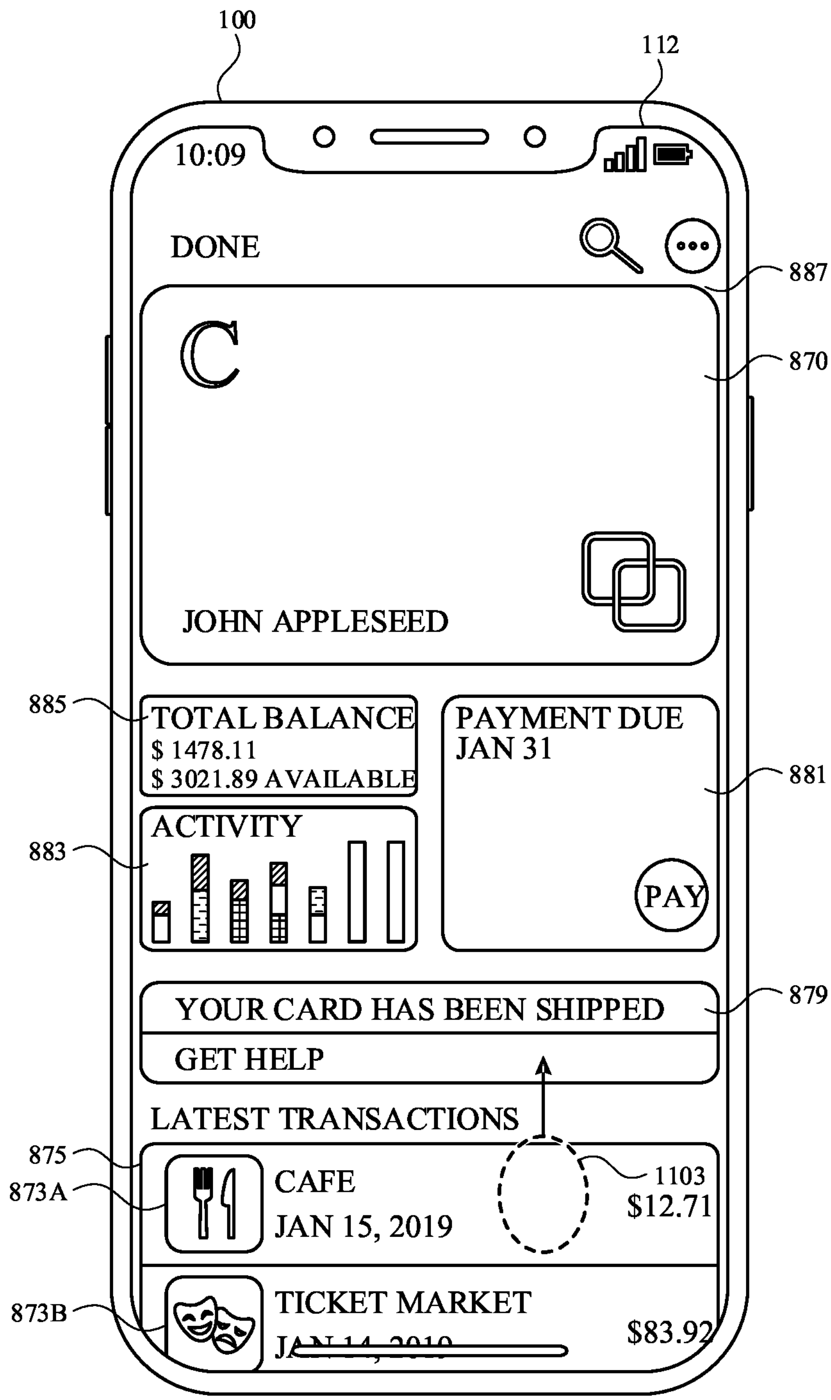

In FIG. 11B, in response to detecting user activation 1101 of representation 870 of the transfer account (e.g., the first-party credit account; the points account), electronic device 100 displays, on display 112, summary user interface 887 of the transfer account, as first described above with reference to FIG. 8S. As previously discussed, in some embodiments, electronic device 100 displays, in summary user interface 887 (e.g., a dashboard user interface) of the transfer account (e.g., the first-party credit account; the points account), representation 870 of the transfer account, balance indicator user interface element 885 (e.g., a balance module), activity user interface element 883 (e.g., an activity module), balance transfer user interface element 881 (e.g., a balance payment module), and notification user interface element 879 (e.g., a notification module).

In FIG. 11B, a plurality of transfers (e.g., payment transactions, points transfers) has been previously performed using the transfer account (e.g., the first-party credit account; the points account). Thus, in some embodiments, electronic device 100 displays, in summary user interface 887, a transfer items list 875 (e.g., a transactions items list) of single transfer items (e.g., single transaction items) and/or group transfer items (e.g., group transaction items), where a single transfer item corresponds to a single past transfer (e.g., a single past payment transaction, a single past points transfer) made using the transfer account (e.g., the first-party credit account; the points account) and a group transfer item corresponds to a plurality of past transfers (e.g., a plurality of past payment transactions, a plurality of past points transfers) of a shared category (e.g., shopping, groceries, dining, travel, education, entertainment) made using the transfer account. In some embodiments, items transfer items list 875 are arranged in chronological order such that the item corresponding to the most recent transfer (e.g., the most recent payment transaction, the most recent points transfer) is displayed at the top of the list. For example, in FIG. 11B, transfer items list 875 shows a first single transfer item 873A (e.g., corresponding to a payment transaction made at a cafe) and a second single transfer item 873B (e.g., corresponding to a payment transaction made at Ticket Market), where first single transfer item 873A corresponds to the most recent transfer (e.g., the most recent payment transaction, the most recent points transfer) made using the transfer account (e.g., the first-party credit account; the points account).

In FIG. 11B, while displaying summary user interface 887, electronic device 100 detects a user input 1103 corresponding to a scrolling of the user interface.

Figure 11C:
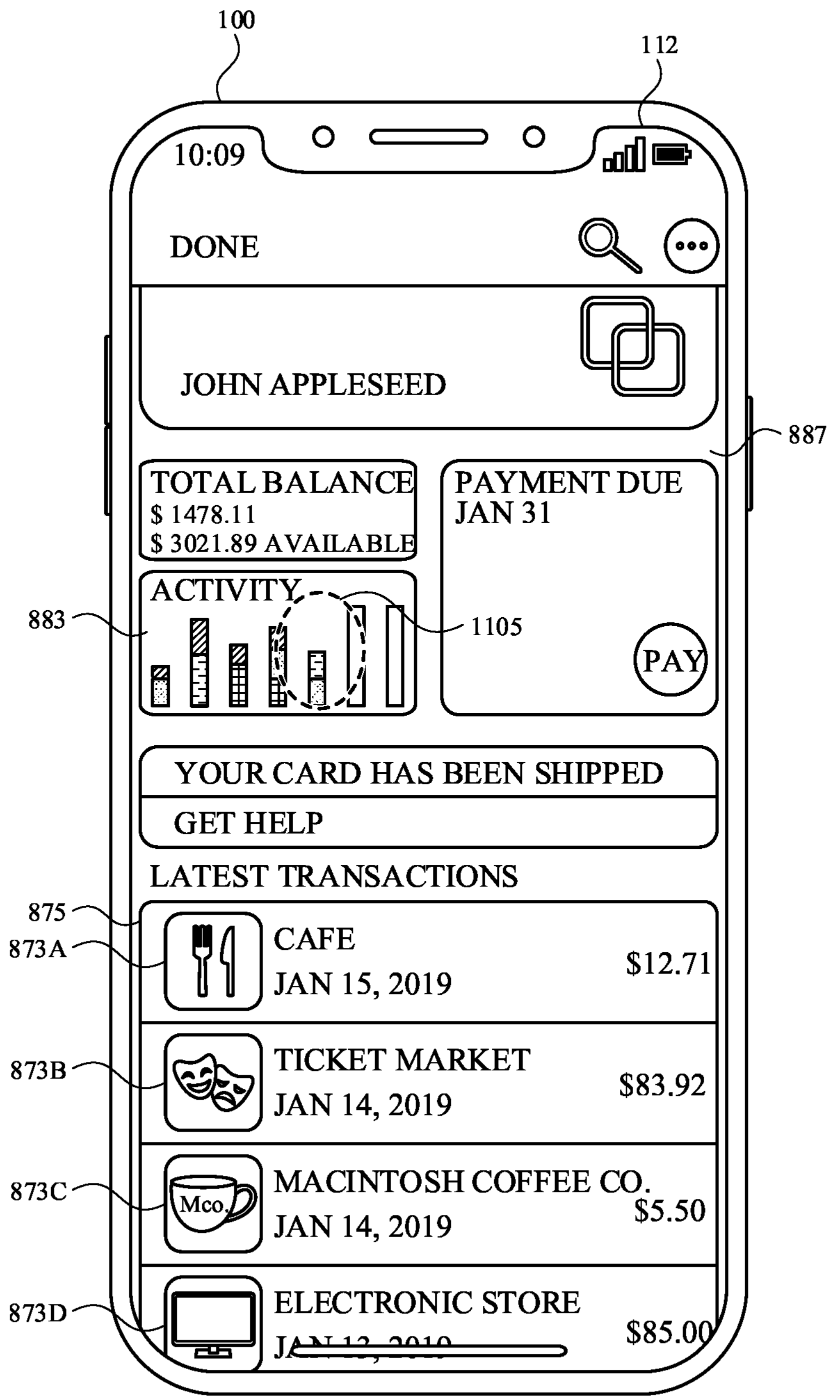

In FIG. 11C, in response to detecting user input 1103 (a swipe up gesture using a single touch input) corresponding to the scrolling of summary user interface 887, electronic device 100 display, in transfer items list 875 of summary user interface 887, additional items corresponding to more past transfers (e.g., more past payment transactions; past points transfers) made using the transfer account (e.g., the first-party credit account; the points account). For example, in FIG. 11C, transfer items list 875 further shows a third single transfer item 873C (e.g., corresponding to a payment transaction made at a Macintosh Coffee Co.) and a fourth single transfer item 873D (e.g., corresponding to a payment transaction made at Electronic Store), where third single transfer item 873C and fourth single transfer item 873D correspond to transfers (e.g., payment transactions, points transfers) that were made using the transfer account (e.g., the first-party credit account; the points account) before the transfers corresponding to first single transfer item 873A and second single transfer item 873B.

In FIG. 11C, while displaying summary user interface 887, electronic device 100 detects a user activation 1105 (e.g., a tap input) of activity user interface element 883 (e.g., an activity module).

Figure 11D:
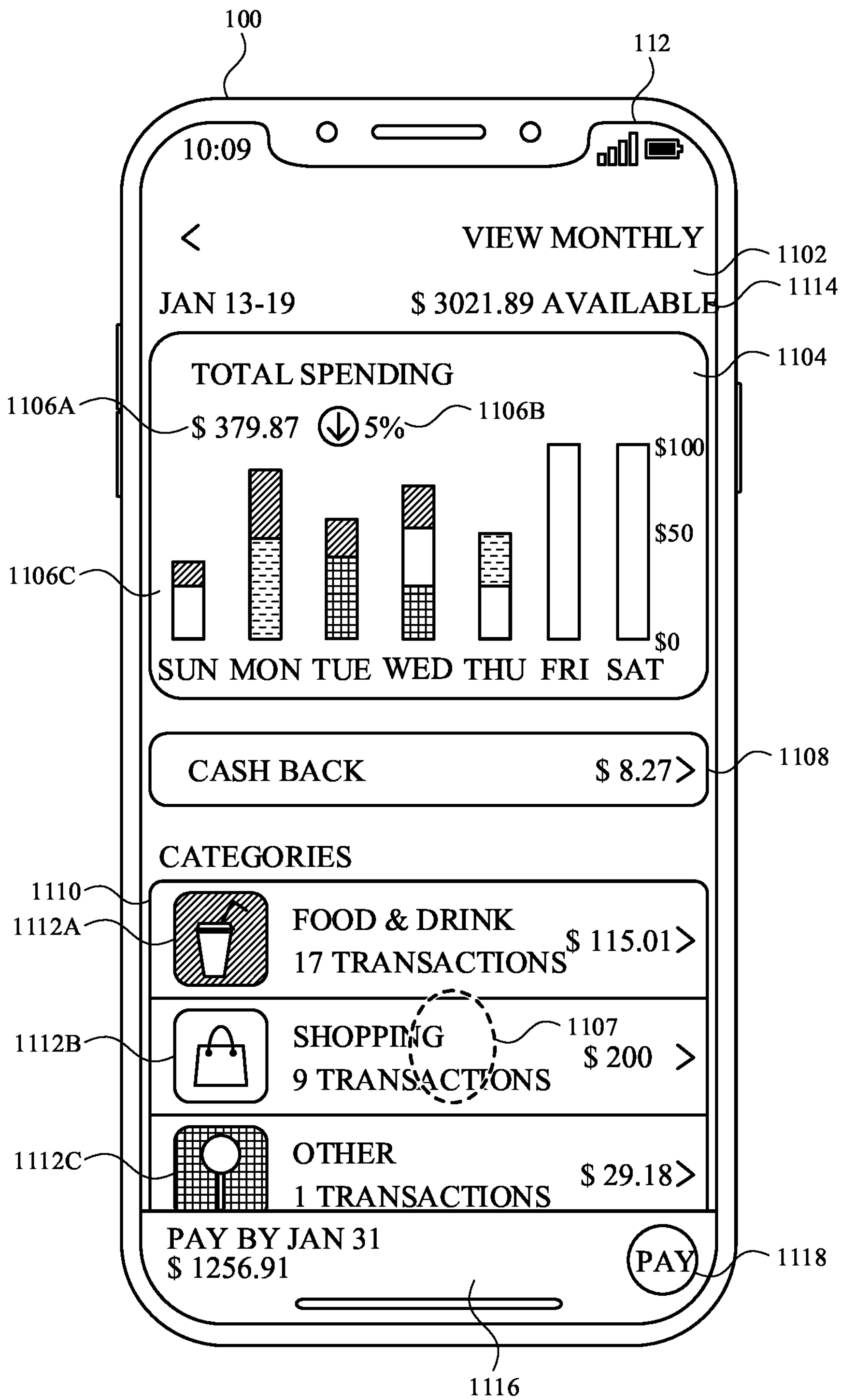

In FIG. 11D, in response to detecting user activation 1105 of activity user interface element 883 (e.g., an activity module), electronic device 100 displays, on display 112, an activity user interface 1102 that includes activity information (e.g., spending information) of the transfer account (e.g., the first-party credit account; the points account) for a predetermined period of time (e.g., weekly, monthly). In some embodiments, electronic device 100 displays, in activity user interface 1102, an activity summary representation 1104 that includes an indication 1106A of a total amount of transfers (e.g., a total spending amount) made using the transfer account (e.g., the first-party credit account; the points account) for the predetermined period of time (e.g., weekly, monthly), an indication 1106B of a change in the total amount of transfers (e.g., a change in the total spending amount) during the current period of time (e.g., during the current week, during the current month) as compared to a previous period of time (e.g., the previous week, the previously month), and/or a bar graph 1106C, which corresponds to an enlarged view of the bar graph depicted in activity user interface element 883, and thus shows transfer activity (e.g., payment activity) of the transfer account (e.g., the first-party credit account; the points account) during the predetermined period of time (e.g., the past week). As discussed above, in some embodiments, each bar corresponds to transfers (e.g., payment transactions, points transfers) made during a respective day of the predetermined time period, and different colors are used to represent different types of transfers based on a category of each transfer.

In some embodiments, electronic device 100 also displays, in activity user interface 1102, a rewards user interface element 1108 that indicates an amount of usage rewards (e.g., a cash back amount) that is available for use (e.g., to reduce the balance of the transfer account), where the usage rewards are accumulated by using the transfer account (e.g., the first-party credit account; the points account) for transfers (e.g., payment transactions, points transfers). In some embodiments, the usage rewards are automatically added to a stored value account that is associated with the device (e.g., a stored value account that is available for use in payments using proximity based wireless payments or for in app payments), such as the stored value account described with respect to option 2202 that can be used to pay off the balance of the transfer account. In some embodiments, the usage rewards are automatically added to the stored value account for each transaction. In some embodiments, the usage rewards are automatically added to the stored value account on a predetermined schedule (e.g., daily, weekly, monthly or on some other predetermined schedule).

In some embodiments, electronic device also displays, in activity user interface 1102, a category items list 1110 corresponding to a list of selectable items representing different types of transfer categories (e.g., spending categories such as food and drinks, shopping, groceries, dining, travel, education, entertainment) related to the use of the transfer account (e.g., the first-party credit account; the points account). For example, in FIG. 11D, category items list 1110 includes a first category item 1112A (e.g., a food and drink category), a second category item 1112B (e.g., a shopping category), and a third category item 1112C (e.g., an "other" category). In some embodiments, a category item includes an indication of the number of transfers (e.g., the number of payment transactions, the number of points transfers) made during the predetermined time period (e.g., the current week, the current month) that correspond to the respective category, an a total amount of transfers (e.g., the total spending amount) for transfers (e.g., payment transactions, points transfers) made during the predetermined time period that correspond to the respective category.

In some embodiments, categories that are included in category items list 1110 correspond to categories for which corresponding transfers (e.g., corresponding payment transactions; corresponding points transfers) are being tracked by electronic device 100. In some embodiments, if a category is being tracked, transfers (e.g., payment transactions, points transfers) made using the transfer account (e.g., the first-party credit account; the points account) that are determined to be associated with, relate to, or correspond to the tracked category are included within the tracked category. In some embodiments, categories that are not being tracked are not included in category items list 1110.

In some embodiments, activity user interface 1102 includes a time period selection affordance 1198 (e.g., for changing between viewing different time periods, for example between a weekly summary and a monthly summary). In some embodiments, in response to detecting a selection of time period selection affordance 1198, electronic device 100 updates activity user interface 1102, and in particular activity summary representation 1104, to display activity information based on a different time period (e.g., monthly) than the previous time period (e.g., weekly).

In some embodiments, while displaying activity user interface 1102, electronic device 100 displays (e.g., over a portion of activity user interface 1102, such as a bottom-edge portion of user interface 1102), a footer user interface 1116 for initiating a balance transfer for the transfer account (e.g., the first-party credit account; the points account), where footer user interface 1116 includes an indication of a due date for a balance transfer (e.g., the statement balance due date), an indication of a current balance of the transfer account, and an affordance 1118 for initiating a balance transfer (e.g., a balance payment) for the transfer account. An example of performing a balance transfer for the transfer account is paying an amount of funds towards an outstanding balance of the account (e.g., including an outstanding statement balance) in order to reduce (e.g., either partially or fully) the outstanding balance of the account. Another example of performing a balance transfer for the transfer account is reimbursing points towards a transfer account that is a points account, where the reimbursed points reduces the amount of points that has been used on the points account, thereby increasing the amount of available points to be used.

In FIG. 11D, while displaying activity user interface 1102, electronic device 100 detects a selection 1107 (e.g., a tap input) of second category item 1112B (e.g., a shopping category) of category items list 1110.

Figure 11E:
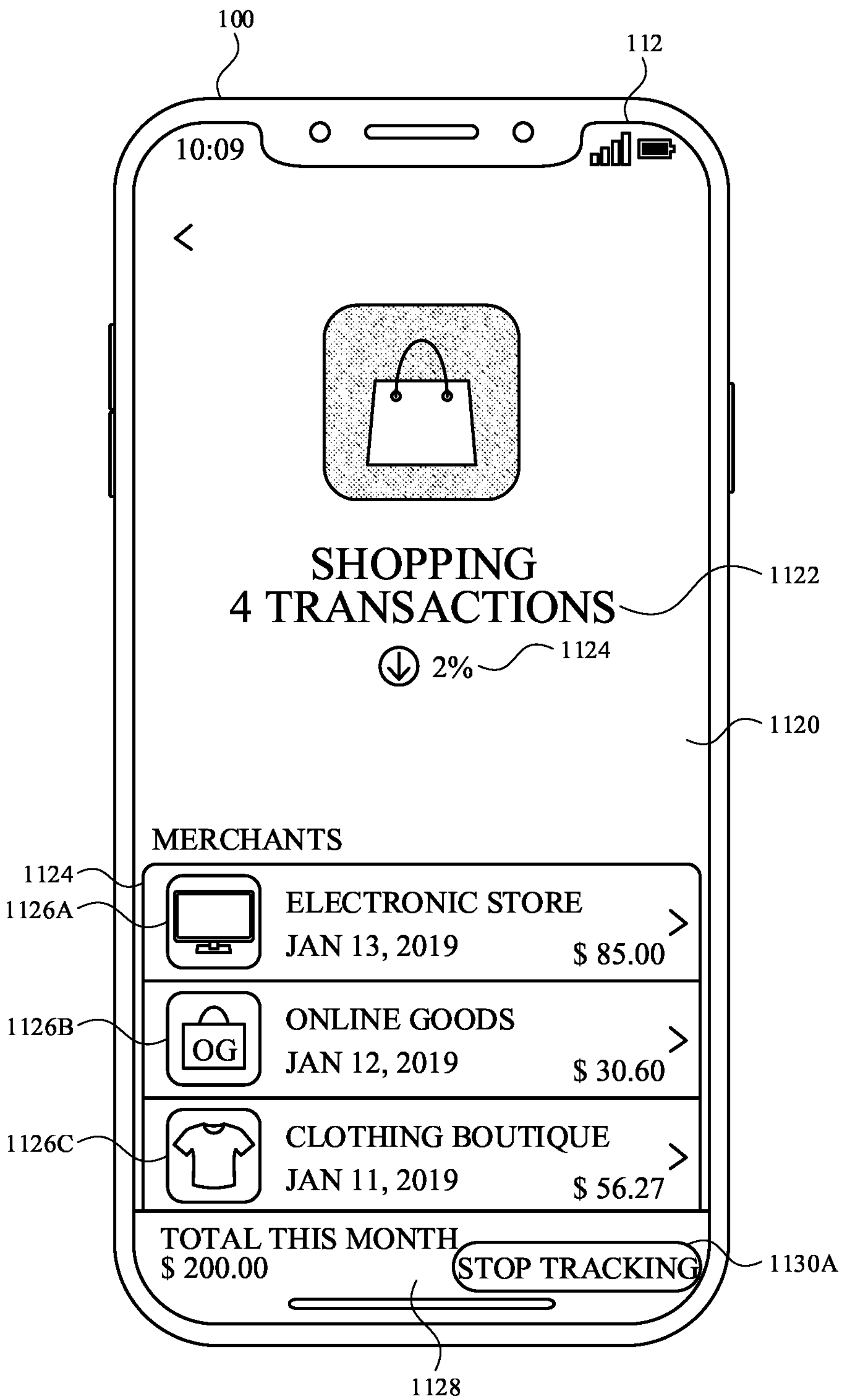

In FIG. 11E, in response to detecting selection 1107 of second category item 1112B, electronic device 100 displays, on display 112, a category user interface 1120 corresponding to the selected category (e.g., a shopping category user interface). In some embodiments, electronic device 100 displays, in category user interface 1120, an indication 1122 of a number of transfers (e.g., a number of payment transactions; a number of points transfers) made using the transfer account (e.g., the first-party credit account; the points account) that correspond to the selected category (e.g., shopping) during the predetermined time period (e.g., the current week, the current month). In some embodiments, electronic device 100 displays, in category user interface 1120, an indication 1124 of a change in the total amount of transfers (e.g., a change in the total spending amount) during the current time period (e.g., during the current week, during the current month) as compared to a previous time period (e.g., the previous week, the previously month). In some embodiments, electronic device 100 displays, in category user interface 1120, a transfer items list 1124 that include a list of items 1126A-1126C representing transfers (e.g., payment transactions, points transfers) made using the transfer account (e.g., the first-party credit account; the points account) during the predetermined time period (e.g., during the current week, during the current month) listed in chronological order (with the item corresponding to the most recent transfer shown at the top of the list). In some embodiments, an item within transfer items list 1124 includes an indication of a location (e.g., place, store, merchant) of the respective transfer (e.g., the respective payment transaction, the respective points transfer), a time and/or date of the respective transfer, and an amount of the respective transfer (e.g., the amount of the payment transaction, the amount of the points transfer).

In some embodiments, while displaying category user interface 1120, electronic device 100 displays (e.g., over a portion of category user interface 1120, such as a bottom-edge portion of user interface 1120), a footer user interface 1128 for enabling or disabling tracking of the respective category. In FIG. 11E, tracking of the respective category (e.g., shopping) is currently enabled. Thus, electronic device 100 displays, in footer user interface 1128, a stop tracking affordance 1130A, the activation of which would cause the electronic device to disable the tracking of the respective category. Further, in some embodiments, electronic device 100 displays, in footer user interface 1128, an indication of a total amount of transfers (e.g., a total spending amount) for the respective category made using the transfer account (e.g., the first-party credit account; the points account) during the predetermined time period (e.g., during the current week, during the current month). Features concerning tracking a category of transfers (e.g., a payment category) made using the transfer account (e.g., the first-party credit account; the points account) are described in greater detail below with reference to FIGS. 17A-17K.

Figure 11F:
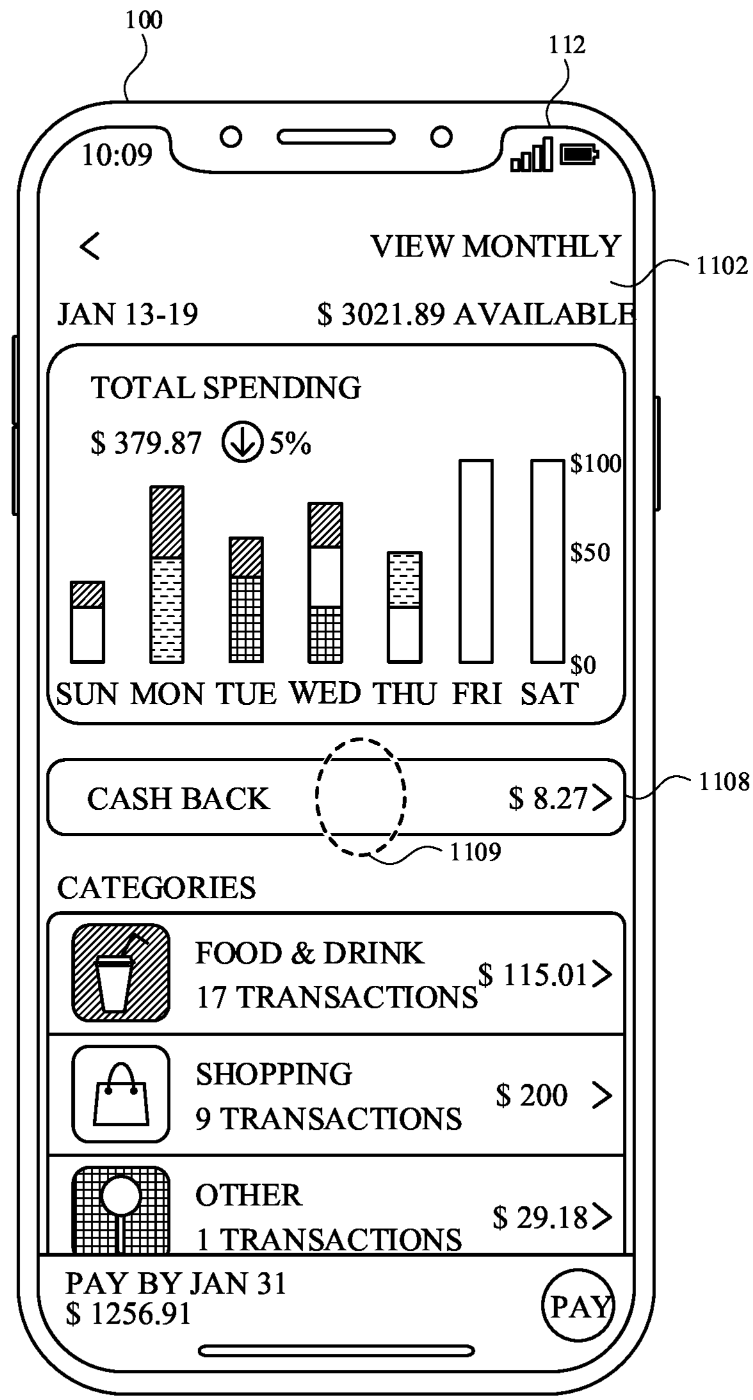

FIG. 11F illustrates electronic device 100 displaying, on display 112, activity user interface 1102, as first depicted in FIG. 11D. In FIG. 11F, while displaying activity user interface 1102, electronic device 100 detects a selection 1109 of rewards user interface element 1108.

Figure 11G:
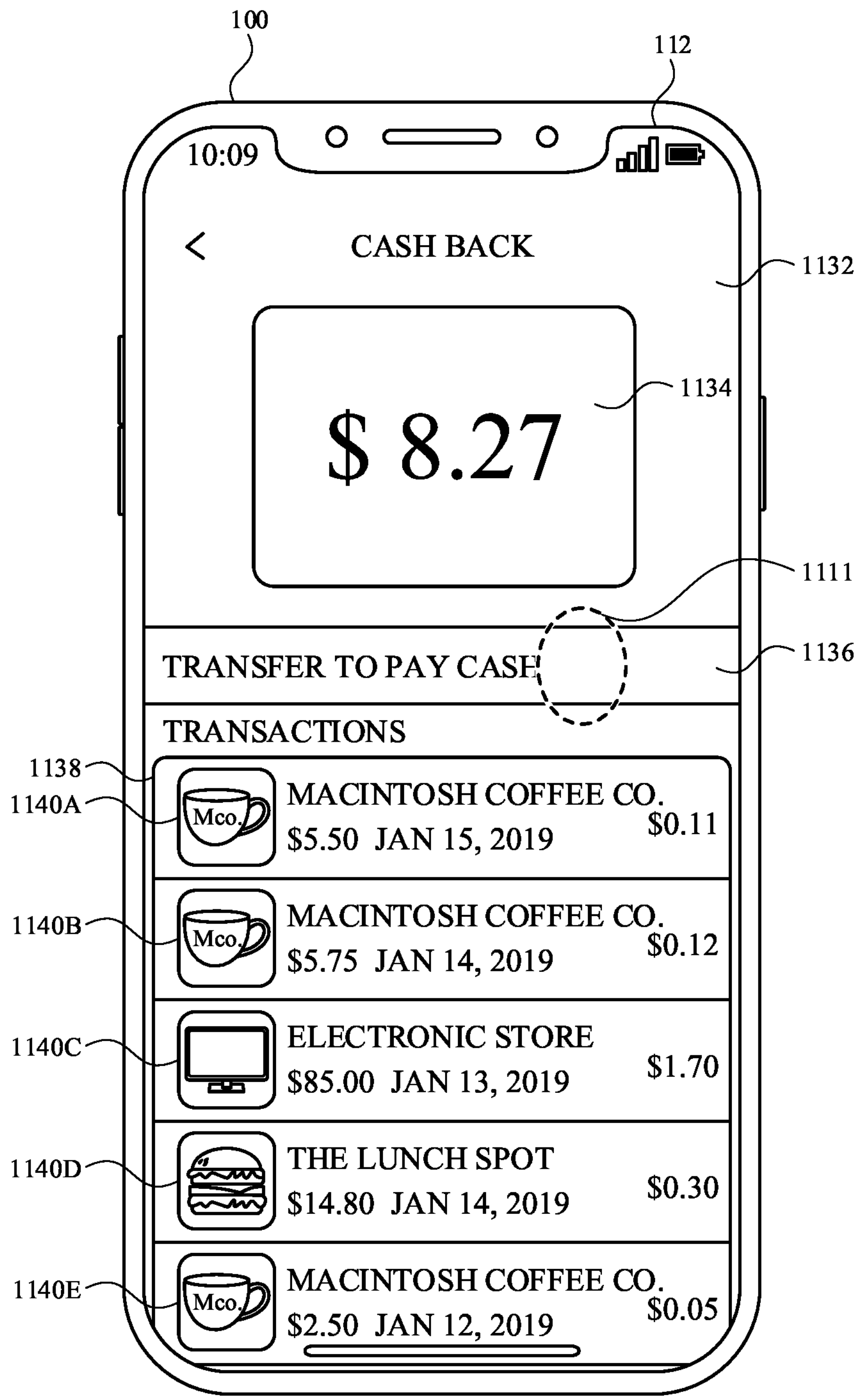

In FIG. 11G, in response to detecting selection 1109 of rewards user interface element 1108, electronic device 100 displays, on display 112, a rewards user interface 1132 corresponding to the transfer account (e.g., the first-party credit account; the points account). In some embodiments, electronic device 100 displays, in rewards user interface 1132, an indication 1134 of the currently-available rewards amount (e.g., the accumulated cash back amount). In some embodiments, electronic device 100 displays, in rewards user interface 1132, a selectable option 1136 for initiating the transfer of the rewards amount (e.g., the cash back amount) to a stored-value account (e.g., a first-party stored value account) that is provisioned on the electronic device. In some embodiments, electronic device 100 displays, in rewards user interface 1132, a transfer items list 1138 that includes items (e.g., items 1140A-1140E) corresponding to past transfers (e.g., past payment transactions, past points transfers) made using the transfer account (e.g., the first-party credit account; the points account). In some embodiments, an item in transfer items list 1130 includes an indication of a location (e.g., place, store, merchant) of the respective transfer (e.g., the respective payment transaction, the respective points transfer), an amount of the respective transfer, a time and/or date of respective transfer, and/or the amount of rewards earned (e.g., the amount of cash back earned) from the respective transfer.

In FIG. 11G, while displaying rewards user interface 1132, electronic device 100 detects a selection 1111 of (e.g., tap input on) selectable option 1136 for initiating the transfer of the rewards amount (e.g., the cash back amount) to a stored-value account (e.g., the first-party stored value account) that is provisioned on the electronic device.

Figure 11H:
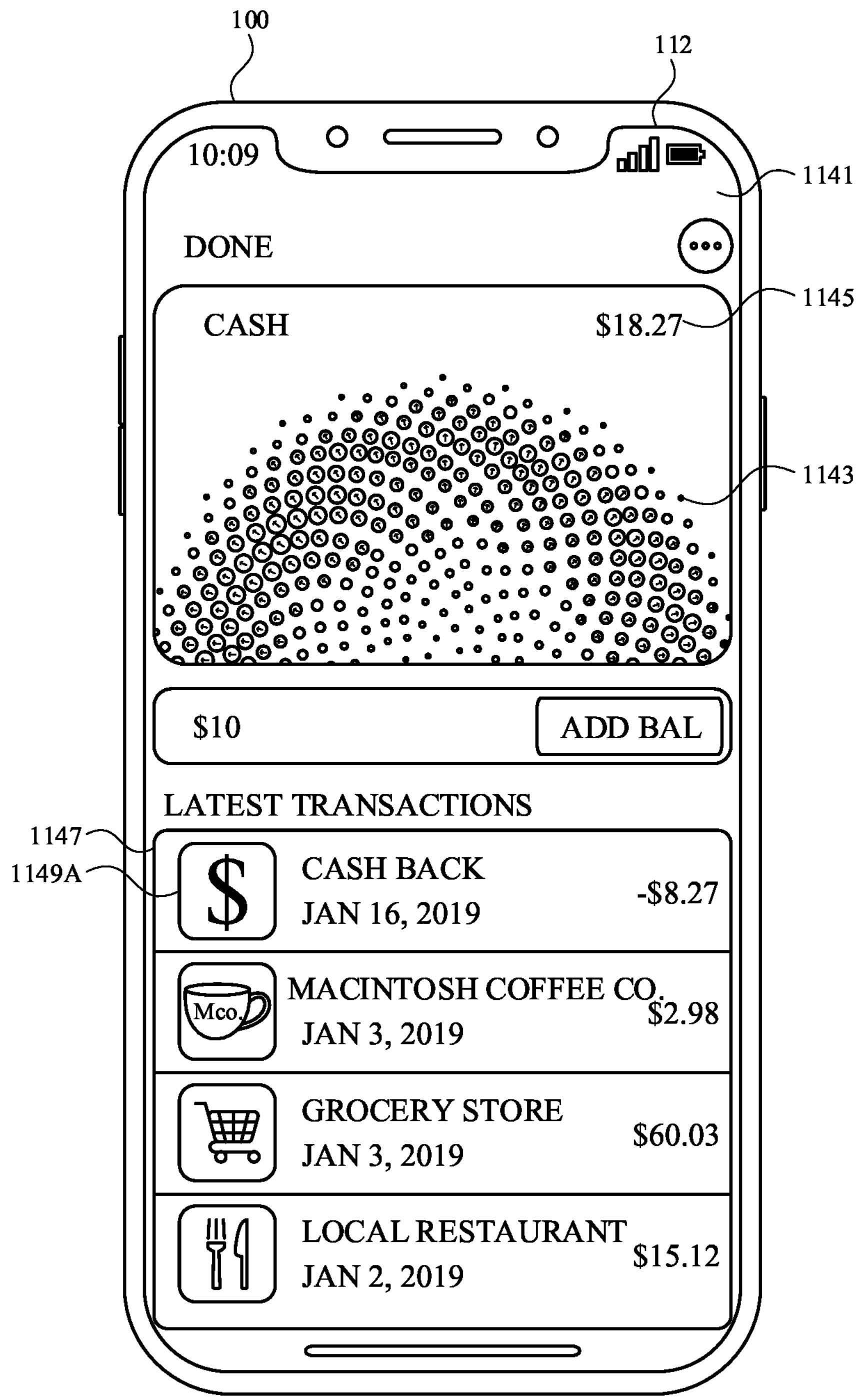

In FIG. 11H, in response to detecting selection 1111 of selectable option 1136, electronic device 100 displays, on display 112, a user interface 1141 corresponding to a stored-value transfer account (e.g., a first-party stored-value account; a stored-value card; a transit card; a points card; a debit account or card). In some embodiments, in response to detecting selection 1111 of selectable option 1136, electronic device 100 initiates a process for transferring the rewards amount to the stored-value transfer account (e.g., such that the rewards amount is available for use via the stored-value transfer account; such that the rewards amount is added to a current balance (e.g., an available amount of stored-value, such as funds or points) of the stored-value transfer account).

In some embodiments, user interface 1141 corresponding to the stored-value account (e.g., a first-party stored-value account; a stored-value card; a transit card; a points card; a debit account or card) includes a (e.g., graphical, animated) representation 1143 of the stored-value transfer account (e.g., corresponding to representation 804 of the stored-value transfer account shown in user interface 802 of the transfer application, as first depicted in FIG. 8A). In some embodiments, representation 1143 of the stored-value transfer account includes an indication 1145 of the current balance (e.g., the available amount of stored-value, such as funds or points) o the stored-value transfer account (e.g., which now includes the rewards amount) transferred from the transfer account. In some embodiments, user interface 1141 corresponding to the stored-value transfer account includes a list of transfer items 1147 corresponding to the most recent transfers involving the stored-value transfer account. In some embodiments, in accordance with a determination that the rewards amount has been added to the stored-value of the stored-value transfer account (e.g., has been added to the available balance of the stored-value transfer account), electronic device 100 displays, in list of transfer items 1147, a first item 1149A corresponding to the transfer of the rewards amount from the transfer account to the stored-value transfer account.

Figure 11I:
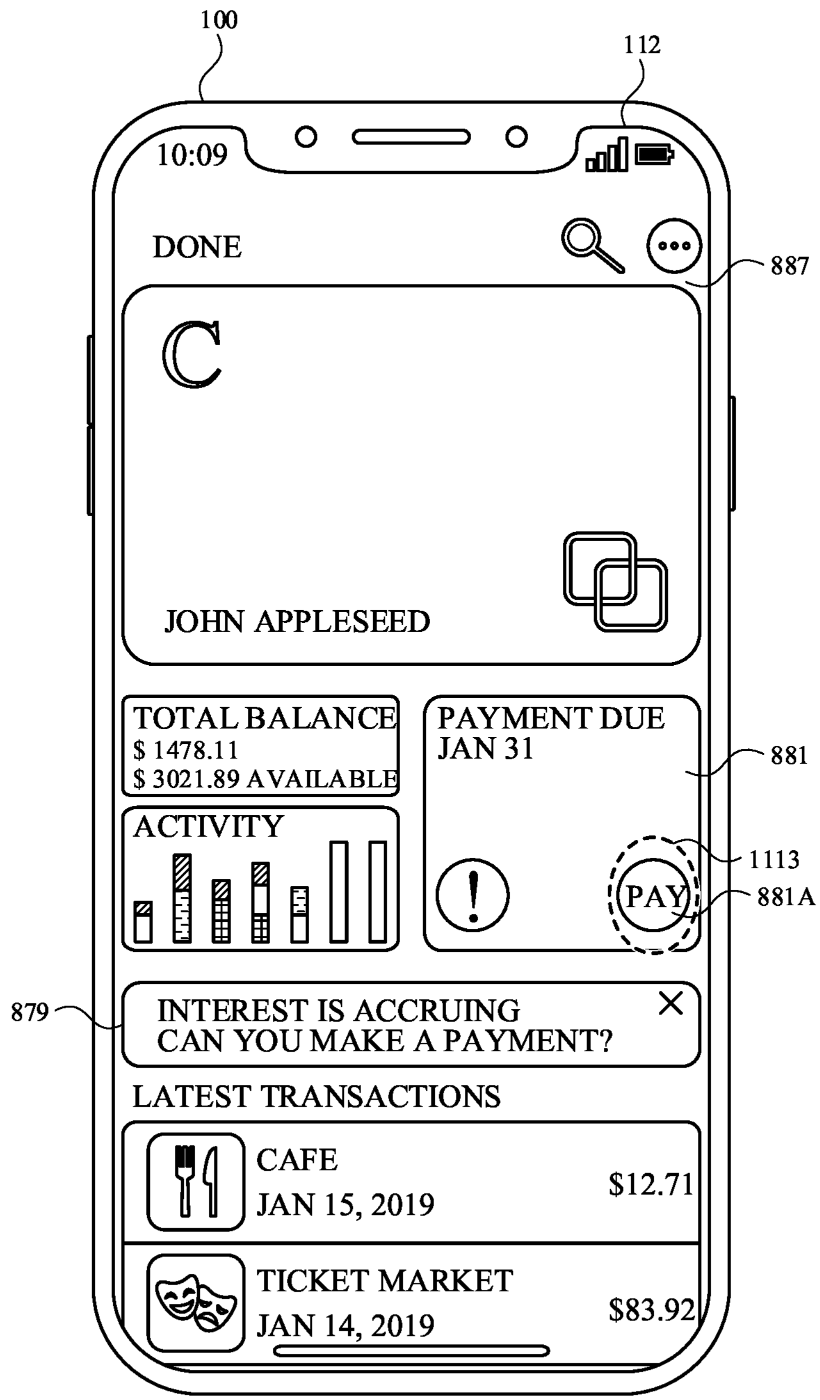

FIG. 11I illustrates electronic device 100 again displaying, on display 112, summary user interface 887 (e.g., a dashboard user interface). In FIG. 11I, at least a portion of the balance of the transfer account (e.g., the first-party credit account; the points account) is accruing a penalty (e.g., accruing interest) because the portion of the balance was not paid by the previous due date (e.g., the previous statement balance was not fully paid by the previous statement due date).

In some embodiments, if the transfer account (e.g., the first-party credit account; the points account) is due a late balance transfer (e.g., a balance payment is past due), and thus the transfer account (e.g., the first-party credit account; the points account) is accruing a penalty (e.g., is accruing interest), electronic device 100 displays, in balance transfer user interface element 881 (e.g., a balance payment module) of summary user interface 887, an indication (e.g., a symbol, such as an exclamation mark; a change in background color; text stating "Pay") that a balance transfer (e.g., a balance payment) is due (or overdue) for the transfer account. Features concerning balance transfer user interface element 881 is described in greater detail below with reference to FIGS. 29A-29J. In some embodiments, electronic device 100 also displays, in notification user interface element 879 of summary user interface 887, a notification stating that a penalty (e.g., interest) accruing on the transfer account (e.g., the first-party credit account; the points account).

In FIG. 11I, while displaying summary user interface 887, electronic device detects a selection 1113 of balance transfer user interface element 881.

Figure 11J:
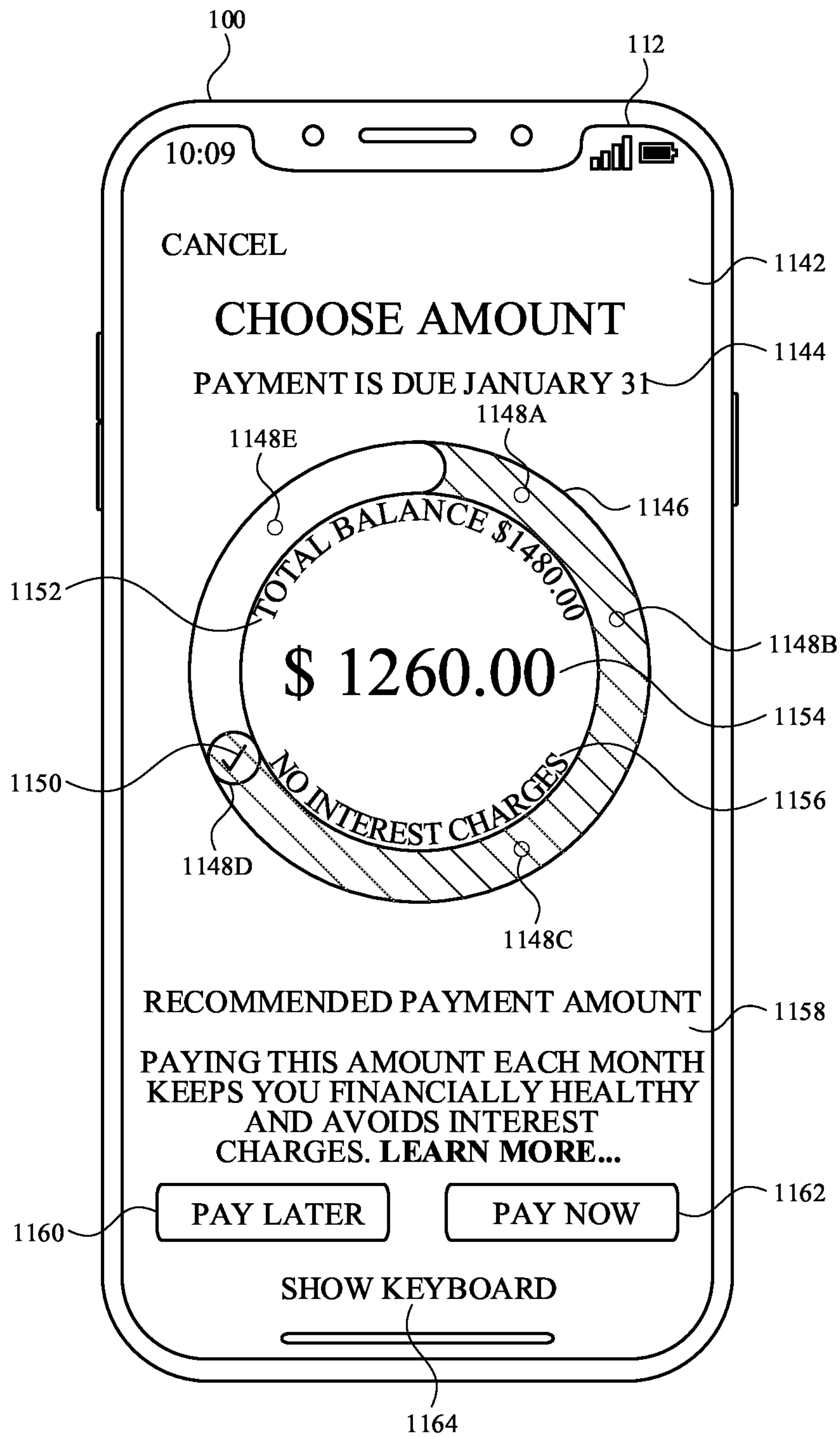

In FIG. 11J, in response to detecting selection 1113 of balance transfer user interface element 881, electronic device 100 displays, on display 112, a balance transfer user interface 1142 corresponding to the transfer account (e.g., the first-party credit account; the points account). In some embodiments, balance transfer user interface 1142 includes an indication 1144 of a due date of a balance transfer (e.g., the previous statement due date, if the statement balance was not fully paid; a current statement due date). In some embodiments, balance transfer user interface 1142 includes a selector user interface element 1146 for using a selection indicator 1150 to select an amount for a balance transfer (e.g., an amount for a balance payment) by moving selection indicator 1150 along a defined path (e.g., a circular, closed-looped path) of selector user interface element 1146. The selected balance transfer amount (e.g., a selected balance payment amount) is based on the location of selection indicator 1150 along the defined path of selector user interface element 1146.

That is, in some embodiments, if selection indicator 1150 is at a first terminus point (e.g., a minimum value point) of the defined path of selector user interface element 1146, the currently-selected balance transfer amount corresponds to a minimum balance transfer amount (e.g., the minimum balance payment amount that would avoid a penalty, such as a late fee). In some embodiments, if selection indicator 1150 is at a second terminus point (e.g., a maximum value point) of the defined path, the currently-selected balance transfer amount corresponds to a maximum selectable transfer amount (e.g., the full amount of the outstanding balance).

In some embodiments, points along the defined path between the two terminus points of selector user interface element 1146 correspond to balance transfer amounts that are dispersed along the defined path between the minimum balance transfer amount to the maximum selectable balance transfer amount. In some embodiments, the portion of the defined path from the first terminus point (e.g., the minimum value point corresponding to the minimum balance payment amount that would avoid a penalty) to the location of selection indicator 1150 along the defined path is displayed with a visual characteristic (e.g., a particular color or color hue, such as green), where the type of visual characteristic (e.g., the type of color or color hue) is determined based on the currently-selected balance transfer amount (e.g., the selected balance payment amount) and an amount of a penalty (e.g., interest) that may accrue based on the selected balance transfer amount.

In some embodiments, the defined path of selector user interface element 1146 further includes, along the defined path, a plurality of proposed amount indicators 1148A-1148E corresponding to proposed balance transfer amounts (e.g., proposed balance payment amounts). In some embodiments, the plurality of proposed amount indicators include a proposed amount indicator (e.g., proposed amount indicator 1148A) corresponding to an amount that is greater than the minimum balance transfer amount (e.g., and is the same as or greater than a previous balance transfer amount) but is still a relatively small amount. In some embodiments, the plurality of proposed amount indicators include another proposed amount indicator (e.g., a proposed amount indicator 1148D) corresponding to a balance transfer amount (e.g., the full statement amount) that would fully avoid a penalty (e.g., interest) for the respective balance transfer period (e.g., the respective statement period). In some embodiments, the plurality of proposed amount indicators include another proposed amount indicator (e.g., a proposed amount indicator 1148E) corresponding to an amount that is greater than the balance transfer amount that would fully avoid a penalty for the respective balance transfer period (e.g., greater than the full statement amount) but smaller than the maximum balance transfer amount (e.g., less than all of the current balance). In some embodiments, the plurality of proposed amount indicators include one or more additional proposed amount indicators (e.g., proposed amount indicators 1148B, 1148C) corresponding to balance transfer amounts (e.g., balance payment amounts) that are determined based on the full amount of the remaining balance of the transfer account, past balance transfer history (e.g., past balance payment history), and/or an afforded time period (e.g., 3 months 6 months) to be provided to fully reduce the remaining balance of the transfer account (e.g., to fully pay off the balance of the account).

In some embodiments, electronic device 100 also displays, in balance transfer user interface 1142, an indication 1152 of the current total balance of the transfer account (e.g., the first-party credit account; the points account), an indication 1154 of the currently-selected balance transfer amount based on the location of selection indicator 1150 on the defined path of selector user interface element 1146, an indication 1156 of a penalty (e.g., interest) that may be enforced (e.g., charged) on the transfer account based on the currently-selected balance transfer amount, and an information region 1158 describing an effect or result of making a balance transfer (e.g., a balance payment) based on the currently-selected balance transfer amount.

In some embodiments, electronic device 100 also displays, in balance transfer user interface 1142, a transfer later affordance 1160 for scheduling a further balance transfer (e.g., for setting a date and/or time for a future automatic balance payment), a transfer now affordance 1162 for initiating a process for an immediate balance transfer (e.g., for proceeding with an immediate balance payment), and a show keypad affordance 1164 for causing display of a keypad that can be used to manually enter a balance transfer amount (e.g., to manually enter a balance payment amount) without using selector user interface element 1146.

An embodiment of balance transfer user interface 1142 is described in greater detail below with reference to FIGS. 20A-20AF.

Figure 11K:
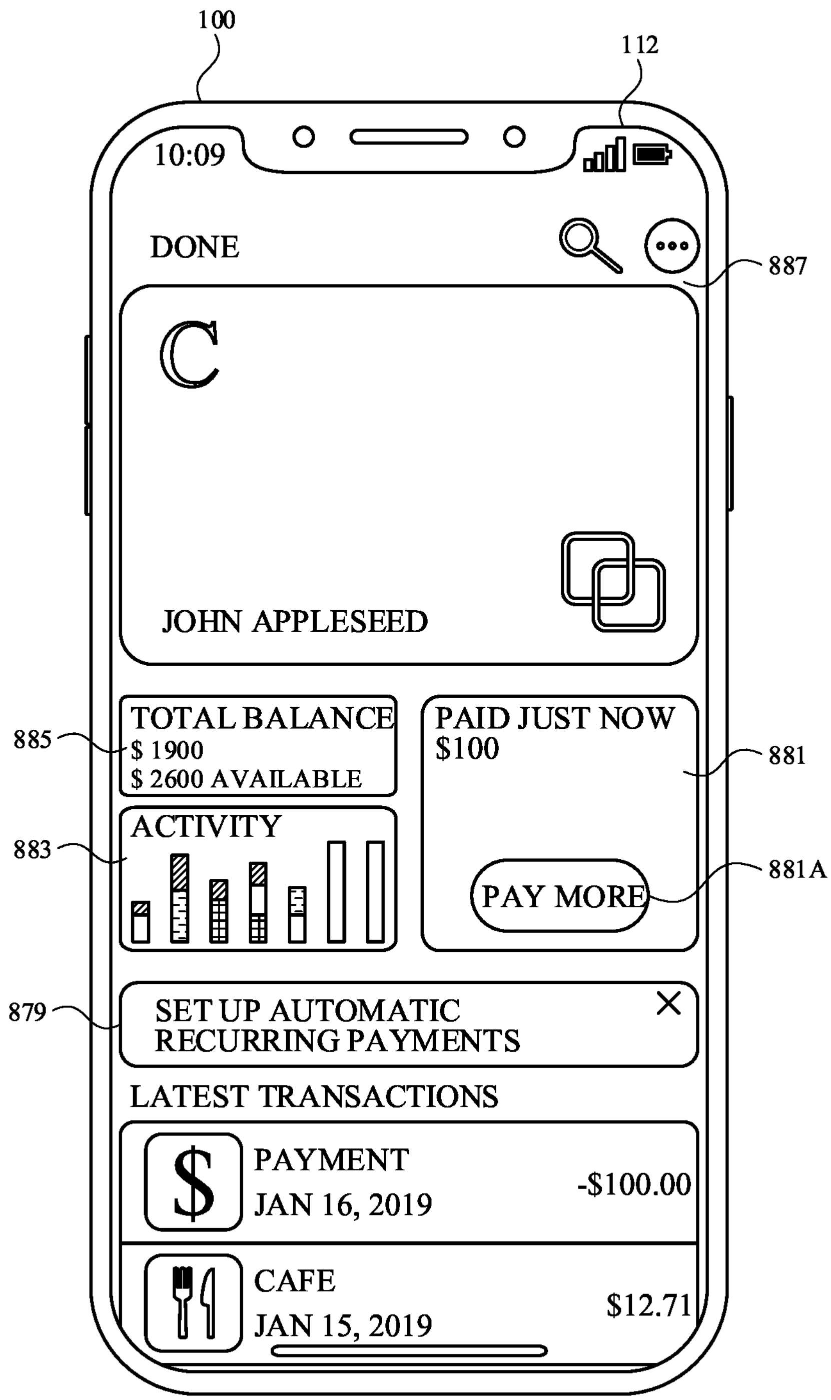

FIG. 11K illustrates electronic device 100 displaying, on display 112, summary user interface 887 after a balance transfer (e.g., a balance payment in the amount of $100) has been made through balance transfer user interface 1142 (e.g., where the balance transfers comprises a portion of (but not all of) the balance amount of the transfer account (e.g., the first-party credit account; the points account) that is currently due (e.g., the current statement amount)).

In FIG. 11K, in response to detecting the balance transfer (e.g., the balance payment in the amount of $100), electronic device 100 updates display of balance indicator user interface element 885 in accordance with the balance transfer (e.g., showing the reduced total balance and the updated available balance amount), updates display of activity user interface element 883 (e.g., showing, in the bar graph, an indication of the balance payment), and/or updates display of balance transfer user interface element 881 to indicate that a balance transfer (e.g., a balance payment) has been made and an amount of the balance transfer (e.g., the amount of the balance payment).

In some embodiments, in accordance with a determination that recurring transfers (e.g., automatic one-a-month (or more frequent) balance payments or points transfers) are not enabled and/or not scheduled for the transfer account (e.g., the first-party credit account; the points account), electronic device 100 displays, in notification user interface element 879, a reminder to set up recurring transfers. In some embodiments, in accordance with a determination that recurring transfers (e.g., automatic one-a-month (or more frequent) balance payments or points transfers) are enabled and/or scheduled for the transfer account (e.g., the first-party credit account; the points account), electronic device 100 does not display, in notification user interface element 879, the reminder to set up recurring transfers.

Figure 11L:
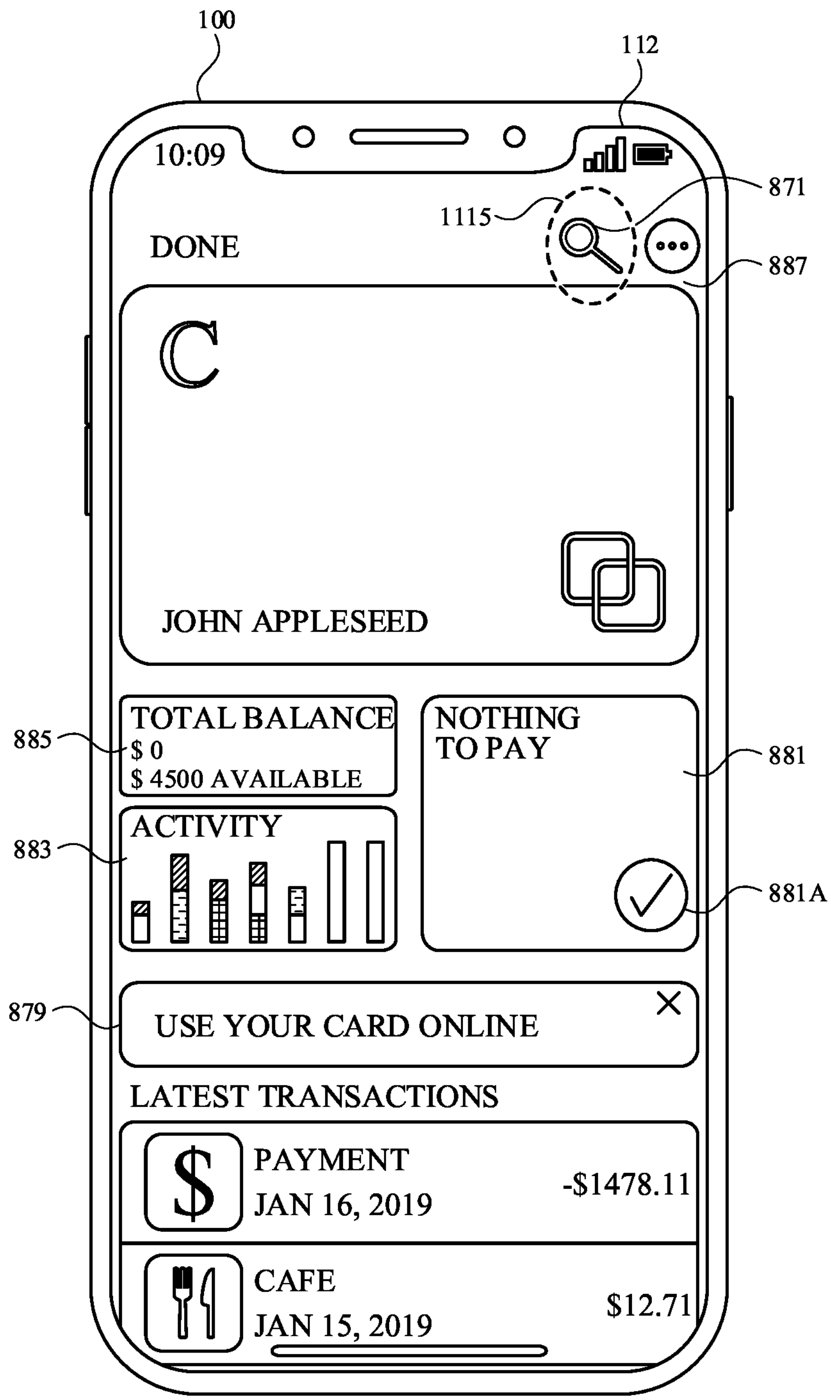

FIG. 11L illustrates electronic device 100 displaying, on display 112, summary user interface 887 after another balance transfer (e.g., a balance payment of all of the remaining balance of $1,900) has been made through balance transfer user interface 1142, where the second balance transfer corresponds to all of the remaining balance amount of the transfer account (e.g., the first-party credit account; the points account). In FIG. 11L, in response to detecting the second balance transfer (e.g., the balance payment in the amount of $1,900), electronic device 100 updates display of balance indicator user interface element 885 in accordance with the balance transfer (e.g., showing that there is no balance remaining), updates display of activity user interface element 883 (e.g., showing, in the bar graph, an indication of the second balance payment), and/or updates display of balance transfer user interface element 881 to indicate that a balance transfer (e.g., a balance payment) has been made and to indicate a balance transfer is no longer due.

In some embodiments, electronic device 100 displays, in notification user interface element 879, a suggestion to use the transfer account (e.g., the first-party credit account; the points account) for transfers (e.g., payment transactions; points transfers).

In FIG. 11L, while displaying user interface 887, electronic device 100 detects a user activation 1115 of a search affordance 871.

Figure 11M:
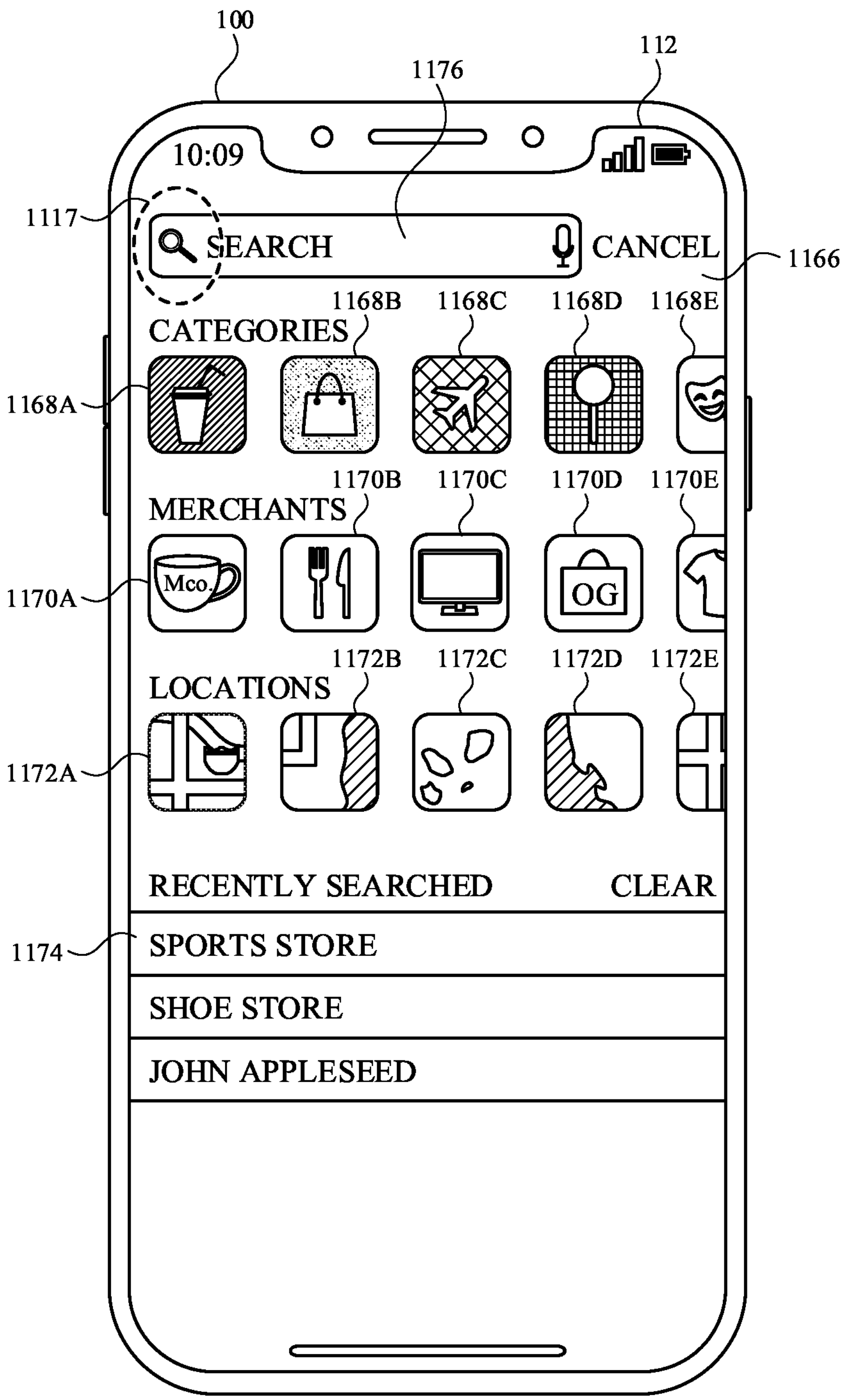

In FIG. 11M, in response to detecting user activation 1115 of search affordance 871, electronic device 100 displays, on display 112, a search user interface 1166. In some embodiments, electronic device 100 displays, in search user interface 1166 a plurality of category search suggestions 1168A-1168E (e.g., food and drink, shopping, travel, groceries, dining, education, entertainment). In some embodiments, electronic device 100 also displays, in search user interface 1166, a plurality of merchant search suggestions 1170A-1170E corresponding to various merchants and/or stores. In some embodiments, electronic device 100 also displays, in search user interface 1166, a plurality of location suggestions 1172A-1172E corresponding to locations, places, regions, and/or areas. In some embodiments, electronic device also displays, in search user interface 1166, a recent searches list 1174 indicating recent searches made through search user interface 1166. In some embodiments, electronic device 100 also displays, in search user interface 1166, a search input field 1176.

In FIG. 11M, while displaying search user interface 1166, electronic device 100 detects a user input 1117 directed to search input field 1176.

Figure 11N:
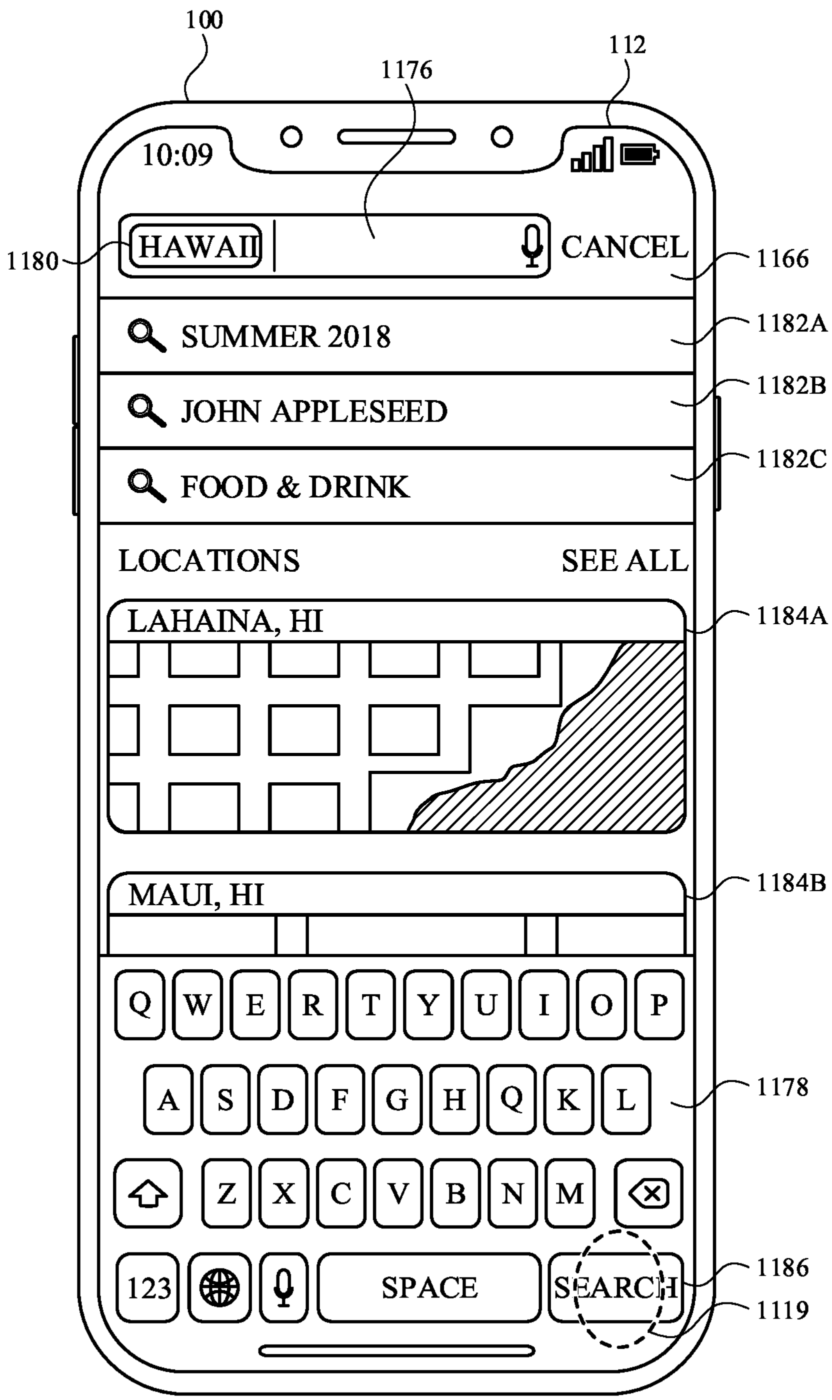

FIG. 11N illustrates electronic device 100 displaying search use interface 1166 after a search term 1180 (e.g., "Hawaii") has been received and/or detected (e.g., via virtual keyboard 1178) in search input field 1176. In some embodiments, in response to detecting that search term 1180 (e.g., "Hawaii") has been entered in search input field 1176, electronic device 100 displays, in search user interface 1166, a list of related search term suggestions 1182A-1182C, where the search term suggestions are based on past transfers (e.g., past payment transactions; past points transfers) made using the transfer account (e.g., the first-party credit account; the points account) that are associated with search term 1180 (e.g., past payment transactions made using the transfer account while in Hawaii). That is, in some embodiments, a first subset of the past transfers (e.g., past payment transactions, past points transfers) are associated with both search term 1180 and first related search term suggestion 1182A, a second subset of the past transfers are associated with both search term 1180 and second related search term suggestion 1182B, and a third subset of the past transfers are associated with both search term 1180 and third related search term suggestion 1182C.

In some embodiments, in response to detecting that search term 1180 (e.g., "Hawaii") has been entered in search input field 1176, electronic device 100 displays, in search user interface 1166, a plurality of map representations 1184A-1184B corresponding to locations that are associated with and/or relate to search term 1180.

In FIG. 11N, while displaying search user interface 1166 with search term 1180 (e.g., "Hawaii") received and/or detected in search input field 1176, electronic device 100 detects a user activation 1119 of an affordance 1186 for proceeding with a search of search term 1180.

In FIG. 11O, in response to detecting user activation 1119 of affordance 1186 for proceeding with the search of search term 1180 (e.g., "Hawaii"), electronic device 100 displays, on display 112, a search result user interface 1188 corresponding to search term 1180. In some embodiments, electronic device 100 displays, in search result user interface 1188 a visual representation 1190 (e.g., an image, a photo) corresponding to search term 1180. In some embodiments, electronic device 100 displays, in search result user interface

1188, an indication 1192 (e.g., thumbnail images of) one or more contacts (e.g., friends) determined to be associated with and/or related to search term 1180 (e.g., based on a previous trip or event where the one or more contacts were involved with search term 1180). In some embodiments, electronic device 100 displays, in search result user interface 1188, a category items list 1194 that includes a plurality of category items 1196A-1196D corresponding to categories (e.g., shopping, food and drink, travel, entertainment) determined to be associated with and/or related to search term 1180. In some embodiments, as described above, the categories are determined to be associated with and/or related to search term 1180 based on past transfers (e.g., past payment transactions, past points transfers) made using the transfer account (e.g., the first-party credit account: the points account) that are associated with search term 1180 (e.g., past payment transactions made using the transfer account while in Hawaii).

In some embodiments, while displaying search result user interface 1188 corresponding to search term 1180, electronic device 100 displays (e.g., over a portion of search result user interface 1188, such as a bottom-edge portion of user interface 1188), footer user interface 1128 for enabling or disabling tracking of a category. In some embodiments, electronic device 100 displays, in footer user interface 1128, an indication of an amount of transfers (e.g., a spending amount) made using the transfer account (e.g., the first-party credit account; the points account) during a period of time (e.g., the current week, the current month, the current statement period) that correspond to search term 1180 (e.g., the amount spent in Hawaii using the transfer account during the current month). Further, in FIG. 11O, search term 1180 (e.g., "Hawaii") is currently not being tracked as a category. As such, in some embodiments, electronic device 100 displays, in footer user interface 1128, a track affordance 1130B for enabling tracking of searched term 1180 as a category. Features concerning tracking a category of transfers (e.g., a payment category; a points category) made using the transfer account (e.g., the first-party credit account; the points account) are described in greater detail below with reference to FIGS. 17A-17K.

FIGS. 12A-12D are a flow diagram illustrating a method for providing usage information of a transfer account, in accordance with some embodiments. Method 1200 is performed at an electronic device (e.g., 100, 300, 500) with a display (e.g., 112). Some operations in method 1200 are, optionally, combined, the orders of some operations are, optionally, changed, and some operations are, optionally, omitted.

As described below, method 1200 provides an intuitive way for managing a transfer account. The method reduces the cognitive burden on a user for managing a transfer account, thereby creating a more efficient human-machine interface. For battery-operated computing devices, enabling a user to manage a transfer account faster and more efficiently conserves power and increases the time between battery charges.

The electronic device (e.g., 100) displays (1202), on the display (e.g., 112), a first user interface (e.g., 710, 887; a dashboard user interface, a dashboard page of the transfer account showing summarized information corresponding to use of the transfer account, a main details page of the transfer account)) corresponding to a transfer account (e.g., the transfer account as first described above with reference to FIGS. 8A-8V, such as a payment account, a virtual card account, a points account, a rewards account), where the first user interface includes: a first user interface element (e.g., 714, 883; including a spending summary, a visual element that provides a summary or indication of past transfers made using the transfer account) that includes a first graphical representation of a plurality of past transfers made using the transfer account, and a second user interface element (e.g., 712, 716, 885, 881; including balance payment information) that includes information related to reducing a balance (e.g., an outstanding balance of the transfer account, which can be a positive outstanding balance (in which case payment is and/or will be due on the account) or a negative outstanding balance (in which case there is an overpayment on the account, and no payment is due)) of the transfer account (e.g., same as or similar to the user interface element described in greater detail below with reference to FIGS. 29A-29J).

In some embodiments, the first graphical representation of the plurality of past transfers (e.g., 714, 883) corresponds to a bar graph arranged based on time (e.g., for a particular time period, such as a week, with a bar for each day of the week). In some embodiments, the bar graph includes a first color indicating a first type of transfer (e.g., a particular type of transfer category, such as shopping, groceries, travel, dining) of the plurality of past transfers. In some embodiments, the bar graph includes a second color different from the first color indicating a second type of transfer (e.g., a particular type of transfer category that is different from the category of the first type of transfer) of the plurality of past transfers. Displaying a bar graph as a representation of the plurality of past transfers enables a user to quickly and easily visualize the amount and/or types of transfers that were made using the transfer for the time period covered by the bar graph. Providing improved visual feedback to the user enhances the operability of the device and makes the user-device interface more efficient (e.g., by helping the user to provide proper inputs and reducing user mistakes when operating and/or interacting with the device) which, additionally, reduces power usage and improves battery life of the device by enabling the user to use the device more quickly and efficiently.

In some embodiments, in accordance with a determination that a first bar of the bar graph corresponding to a first time period (e.g., a first day of a week) includes a corresponding past transfer (e.g., because a transaction was made using the transfer account during the first time period), the first bar is displayed having a respective color of the respective past transfer. In some embodiments, in accordance with a determination that the first bar of the bar graph does not include a corresponding past transfer (e.g., because no transactions were made using the transfer account during the first time period), the first bar is displayed having a third color (e.g., a neutral color, such as white) that does not correspond to any type of transfer. Displaying portions of the bar graph with colors based on the type of a respective past transfer, and displaying portions of the bar graph with a color that does not correspond to any type of transfer if there were no past transfers in its respective time period enables a user to quickly and easily visualize the amount and/or types of transfers that were made using the transfer for the entire time period covered by the bar graph. Providing improved visual feedback to the user enhances the operability of the device and makes the user-device interface more efficient (e.g., by helping the user to provide proper inputs and reducing user mistakes when operating and/or interacting with the device) which, additionally, reduces power usage and improves battery life of the device by enabling the user to use the device more quickly and efficiently.

In some embodiments, the electronic device (e.g., 100) displays (1204), in the first user interface (e.g., 710, 887), an indication (e.g., in 712, in 885) of an available (e.g., unspent) transfer limit amount (e.g., remaining amount of credit) of the transfer account. In some embodiments, the indication of the available transfer limit amount is displayed in the first user interface element (e.g., 712, 885). In some embodiments, the indication of the available transfer limit amount is displayed in a third user interface element different from the first user interface element and the second user interface element. Displaying, in the first user interface the indication of the available transfer limit amount enables the user to quickly and easily view (e.g., without needing to navigate to a different user interface) the available amount (and thus plan accordingly). Reducing the number of inputs needed to perform an operation enhances the operability of the device and makes the user-device interface more efficient (e.g., by helping the user to provide proper inputs and reducing user mistakes when operating and/or interacting with the device) which, additionally, reduces power usage and improves battery life of the device by enabling the user to use the device more quickly and efficiently.

In some embodiments, while displaying the first user interface (e.g., 710, 887), in accordance with a determination that an interest is being accrued on the transfer account, the electronic device (e.g., 100) displays (1214), in the second user interface element (e.g., 716, 881), an alert indicating that the interest is being accrued on the transfer account. In some embodiments, the alert indicating that interest is being accrued includes an amount (e.g., an estimated amount) of interest being accrued. Displaying the alert indicating that the interest is being accrued on the transfer account acts to warn the user of the interest being accrued on the account, and thus allows the user to plan or act accordingly. Providing improved feedback enhances the operability of the device and makes the user-device interface more efficient (e.g., by helping the user to provide proper inputs and reducing user mistakes when operating and/or interacting with the device) which, additionally, reduces power usage and improves battery life of the device by enabling the user to use the device more quickly and efficiently.

In some embodiments, while displaying the first user interface (e.g., 710, 887), the electronic device (e.g., 100) displays (1216), in the first user interface, a list of (e.g., selectable) transfer items (e.g., 720, 875) corresponding to past transfers (e.g., one or more past payment transactions, one or more past points transfers) made using the transfer account, where the transfer items are arranged in chronological order based on a time of the corresponding past transfers. In some embodiments, the transfer item corresponding to the most recent past transfer (e.g., 873A) is displayed at the top of the list. Displaying, in the first user interface, the list of transfer items corresponding to past transfers made using the transfer account enables the user to quickly and easily view a summary of the past transfers made using the transfer account and thus be mindful of the transfer history. Providing improved feedback enhances the operability of the device and makes the user-device interface more efficient (e.g., by helping the user to provide proper inputs and reducing user mistakes when operating and/or interacting with the device) which, additionally, reduces power usage and improves battery life of the device by enabling the user to use the device more quickly and efficiently.

While displaying the first user interface (e.g., 710, 887), the electronic device (e.g., 100) detects (1206) a user input (e.g., 1105, 1113).

In response to detecting the user input (e.g., 1105) (1208), in accordance with a determination that the user input is directed to the first user interface element (e.g., 714, 883), the electronic device (e.g., 100) displays (1210), on the display (e.g., 112), a second user interface (e.g., 1006, 1102) that includes: a first group item (e.g., 1010A, 1112A) that includes information summarizing a plurality of past transfers of a first category (e.g., a particular spending category, such as food, groceries, entertainment, shopping, medical expenses, etc.), and a second group item (e.g., 1010B, 1112B) that includes information summarizing a plurality of past transfers of a second category that is different from the first category.

In some embodiments, the second user interface (e.g., 1002, 1102) further includes information indicating a remaining balance of the transfer account. In some embodiments, the second user interface further includes a second graphical representation (e.g., 1004, 1104) of the plurality of past transfers (e.g., corresponding to the graphical representation shown in the first user interface element) made using the transfer account, the second graphical representation corresponding to (e.g., an enlarged view of) the first graphical representation of the plurality of past transfers displayed in the first user interface element (e.g., 714, 883).

In some embodiments, while displaying the second user interface (e.g., 1002, 1102), the electronic device (e.g., 100) displays (1232), in a region on the display (e.g., 112) (e.g., in a region of the second user interface or overlapping the second user interface), an affordance (e.g., 1016, 1118) for proceeding with a transfer for reducing a remaining balance of the transfer account. In some embodiments, in response to detecting a user activation of the affordance for proceeding with the transfer for reducing a remaining balance of the transfer account, the electronic device displays (1234), on the display, a user interface (e.g., 1142) that includes a plurality of indicators (e.g., arranged along a circular, closed-loop user interface element) corresponding to proposed balance reduction amounts (e.g., same as or similar to the user interface described below with reference to FIGS. 20A-20AF). In some embodiments, the region on the display (e.g., 1012, 1116) further includes an indication of an amount of the remaining balance on the transfer account. In some embodiments, the region on the display further includes an indication of a due date for the remaining balance. Displaying the affordance for proceeding with a transfer for reducing a remaining balance of the transfer account while displaying the second user interface enables the user to quickly and easily navigate to a user interface for performing a balance transfer in view of information that was provided in the second user interface. Reducing the number of inputs needed to perform an operation enhances the operability of the device and makes the user-device interface more efficient (e.g., by helping the user to provide proper inputs and reducing user mistakes when operating and/or interacting with the device) which, additionally, reduces power usage and improves battery life of the device by enabling the user to use the device more quickly and efficiently.

In response to detecting the user input (e.g., 1113) (1208), in accordance with a determination that the user input is directed to the second user interface element (e.g., 716, 881, 881A), the electronic device (e.g., 100) displays (1212), on the display (e.g., 112), a third user interface (e.g., 1142) that includes an option to reduce the balance of the transfer account (e.g., same as or similar to the user interface with a plurality of balance reduction amount proposals described below with reference to FIGS. 20A-20AF).

In some embodiments, subsequent to (or in response to) detecting a transfer corresponding to a balance reduction of the transfer account (e.g., for the current statement period, for the current pay period), the electronic device (e.g., 100) displays (1236), in the second user interface element (e.g., 716, 881, 881A), an indication of a date (e.g., month and day) that the transfer corresponding to the balance reduction of the transfer account was made. Displaying the indication of the date that the transfer corresponding to the balance reduction of the transfer account was made reminders the user of a past balance transfer that has already been performed, thereby influencing the user's consideration of whether a new balance transfer should be performed. Providing improved feedback enhances the operability of the device and makes the user-device interface more efficient (e.g., by helping the user to provide proper inputs and reducing user mistakes when operating and/or interacting with the device) which, additionally, reduces power usage and improves battery life of the device by enabling the user to use the device more quickly and efficiently.

In some embodiments, subsequent to (or in response to) detecting a transfer corresponding to a balance reduction of the transfer account (e.g., for the current statement period, for the current pay period), in accordance with a determination that a balance is remaining on the transfer account (e.g., because the transfer was in an amount that was less than the full remaining balance), the electronic device (e.g., 100) displays (1238), in the second user interface element (e.g., 716, 881, 881A), an indication of an amount of the balance that is remaining on the transfer account. Displaying the indication of the amount of the balance that is remaining on the transfer account after detecting the transfer corresponding to a balance reduction of the transfer account enables the user to quickly and easily recognize that one or more additional balance transfers may be needed. Providing improved feedback enhances the operability of the device and makes the user-device interface more efficient (e.g., by helping the user to provide proper inputs and reducing user mistakes when operating and/or interacting with the device) which, additionally, reduces power usage and improves battery life of the device by enabling the user to use the device more quickly and efficiently.

In some embodiments, prior to detecting a transfer corresponding to a balance reduction of the transfer account (e.g., for the current statement period, for the current pay period), the electronic device (e.g., 100) displays (1240), in the second user interface element (e.g., 716, 881, 881A), an indication of a date corresponding to a balance reduction due date (e.g., the due date for the current statement balance) and an indication of an amount corresponding to a balance reduction amount that is due by the balance reduction due date (e.g., the current statement amount). Displaying the indication of the date corresponding to a balance reduction due date (e.g., the due date for the current statement balance) and the indication of the amount corresponding to a balance reduction amount that is due by the balance reduction due date enables the user to quickly and easily recognize and plan for a future balance transfer. Providing improved feedback enhances the operability of the device and makes the user-device interface more efficient (e.g., by helping the user to provide proper inputs and reducing user mistakes when operating and/or interacting with the device) which, additionally, reduces power usage and improves battery life of the device by enabling the user to use the device more quickly and efficiently.

In some embodiments, while displaying the first user interface (e.g., 710, 887), the electronic device (e.g., 100) displays (1218), in the first user interface, a third user interface element (e.g., 879; that shows notifications). In some embodiments, while displaying the third user interface element, the electronic device displays (1220), in the third user interface element, a notification (e.g., related to various information about the transfer account, such as promotions concerning the transfer account, rewards that have been accumulated using the transfer account, interest accruing on the transfer account, whether a physical card corresponding to the transfer account has been ordered and/or shipped) including information related to the transfer account, where the notification is periodically updated to display different types of information related to the transfer account. Displaying the notification including information related to the transfer account, where the notification is periodically updated to display different types of information related to the transfer account allows the user to view information that may be helpful in managing the use of the transfer account. Providing improved feedback enhances the operability of the device and makes the user-device interface more efficient (e.g., by helping the user to provide proper inputs and reducing user mistakes when operating and/or interacting with the device) which, additionally, reduces power usage and improves battery life of the device by enabling the user to use the device more quickly and efficiently.

In some embodiments, while displaying the third user interface element (e.g., 879), the electronic device (e.g., 100) displays (1222), in the third user interface element, instructions for initiating a process to order a physical account object (e.g., a physical card) corresponding to the transfer account that can be used as part of an authentication process (e.g., which optionally also requires a signature and/or a PIN number) to authorize transfers using the transfer account. In some embodiments, the physical account object is the same as or similar to the physical account object described below with reference to FIGS. 26A-26N.

In some embodiments, while displaying the first user interface (e.g., 710, 887), the electronic device (e.g., 100) detects (1224) a user activation of a search function. In some embodiments, the search function is activated by activating a search affordance (e.g., 871; that is shaped like a search or finder symbol). In some embodiments, in response to detecting the user activation of the search function, the electronic device displays (1226), on the display, a search bar (e.g., for entering one or more search terms). In some embodiments, while displaying the search bar (e.g., 1176), the electronic device receives (1228) a user input directed to the search bar that includes a past event (e.g., such as a past trip). In some embodiments, in response to receiving the user input directed to the search bar that includes the past event, the electronic device displays (1230), on the display, one or more categories (e.g., 1168A-1168E, 1170A-1170E, 1172A-1172E; shopping, dining, groceries, travel) of respective transfers, where the respective transfers correspond to (e.g., were made during the event, were made at a location of the event, and/or were made to access (fly to or from) the event) the past event.

Note that details of the processes described above with respect to method 1200 (e.g., FIGS. 12A-12D) are also applicable in an analogous manner to the methods described above and below. For example, method 900 optionally includes one or more of the characteristics of the various methods described above with reference to method 1200. For example, the transfer account activated in method 900 can be summarized and managed using the summary user interface described in method 1200. For another example, method 1500 optionally includes one or more of the characteristics of the various methods described above with reference to method 1200. For example, the visual feedback on the reservation of the transfer account described in method 1500 can be provided in the summary user interface described in method 1200. For another example, method 1800 optionally includes one or more of the characteristics of the various methods described above with reference to method 1200. For example, the transfer categories that are tracked as described in method 1800 can be viewed and summarized in the activity user interface described in method 1200. For another example, method 2100 optionally includes one or more of the characteristics of the various methods described above with reference to method 1200. For example, the balance transfer user interface described in method 2100 can be used to perform a balance transfer in view of information provided in the summary user interface described in method 1200. For another example, method 2400 optionally includes one or more of the characteristics of the various methods described above with reference to method 1200. For example, transfers performed using the authentication credential described in method 2400 can be summarized in the summary user interface described in method 1200. For another example, method 2700 optionally includes one or more of the characteristics of the various methods described above with reference to method 1200. For example, transfers made using the physical account object activated in method 2700 can be summarized in the summary user interface described in method 1200. For another example, method 3000 optionally includes one or more of the characteristics of the various methods described above with reference to method 1200. For example, the balance transfer user interface element described in method 3000 can be displayed in the summary user interface described in method 1200. For brevity, these details are not repeated below.

FIG. 12E is a flow diagram illustrating a method for providing usage information of a user account, in accordance with some embodiments. Method 1201 is performed at an electronic device (e.g., 100, 300, 500) with a display (e.g., 112). Some operations in method 1201 are, optionally, combined, the orders of some operations are, optionally, changed, and some operations are, optionally, omitted.

As described below, method 1201 provides an intuitive way for managing a user account. The method reduces the cognitive burden on a user for managing a user account, thereby creating a more efficient human-machine interface. For battery-operated computing devices, enabling a user to manage a user account faster and more efficiently conserves power and increases the time between battery charges.

The electronic device (e.g., 100) displays (1202, 1203), on the display (e.g., 112), a first user interface (e.g., 710) corresponding to a user account associated with a use quota, where the first user interface includes a first user interface element that includes a first graphical representation (e.g., 714) of a plurality of past uses of the user account, and a second user interface element (e.g., 712) that includes information related to restoring at least a portion of the use quota of the user account.

While displaying the first user interface (e.g., 710), the electronic device (e.g., 100) detects (1206, 1205) a user input.

In response to detecting the user input (1208, 1207), in accordance with a determination that the user input is directed to the first user interface element (e.g., 714), the electronic device (e.g., 100) displays (1210, 1209), on the display (e.g., 112), a second user interface (e.g., 1002) that includes a first group item that includes information summarizing a plurality of past uses of the user account related to a first category, and a second group item that includes information summarizing a plurality of past uses of the user account related to a second category that is different from the first category.

In response to detecting the user input (1208, 1207), in accordance with a determination that the user input is directed to the second user interface element (e.g., 712), the electronic device (e.g., 100) displays (1212, 1211), on the display (e.g., 112), a third user interface that includes an option to restore the portion of the use quota of the user account.

In some embodiments, the user account corresponds to a computer storage account. In some embodiments, the use quota associated with the user account correspond to computer storage accessible via the computer storage account. In some embodiments, using the user account comprises storing data onto available computer storage (e.g., an available MB or GB amount of computer resources) of the computer storage account.

In some embodiments, restoring at least a portion of the use quota comprises deleting data stored onto a portion of the computer storage of the computer storage account.

In some embodiments, the user account corresponds to a credit account. In some embodiments, the use quota associated with the user account correspond to a credit limit for the credit account. In some embodiments, using the user account comprises making purchases using the credit account.

In some embodiments, restoring at least a portion of the use quota comprises paying at least a portion of the balance of the credit account.

In some embodiments, the user account is a transfer account, and the technique described with respect to FIG. 12E includes some or all aspects of the technique described above with respect to FIGS. 12A-12D.

FIGS. 13A-13B illustrate exemplary user interfaces for providing visual feedback on a representation of a user account (e.g., a computer storage account), in accordance with some embodiments. The user interfaces in these figures are used to illustrate the processes described below, including the processes in FIGS. 15A-15D and FIG. 15E.

FIG. 13A illustrates electronic device 100 displaying, on display 112, summary user interface 710. As discussed, summary user interface 710 includes a representation 704 of a user account (e.g., a computer storage account). In some embodiments, summary user interface 710 includes display of representation 704 of the user account (e.g., a computer storage account), where representation 704 includes a plurality of particles 704A, 704B, and 704C (e.g., dynamic particles) corresponding to respective data types that are stored and/or archived on the user account (e.g., similar to particles 1406A, 1406B, and 1406C displayed on representation 870 of a transfer account corresponding to respective transfer categories for transfer made using the transfer account, as described below with reference to FIG. 14N) In some embodiments, distortion is applied to the plurality of particles 704A-704C, such as a blur or smearing effect, such that the particles are displayed to appear to be part of a visually contiguous region even though the particles are moving independently in accordance with a predetermined physics model (e.g., a model defining a simulated mass, friction, inertia, viscosity, adhesion, cohesion, magnetic or electrostatic attraction, and/or other simulated physical properties of the particles as well as how inputs at the device such as tilting of the device or touching the device affect the particles as a simulated force exerted on the particles, such as the force of gravity).

In some embodiments, first plurality of particles 704A correspond to and represent a first type of data (e.g., data corresponding to photo files) that are stored and/or archived in the user account (e.g., a computer storage account). In some embodiments, second plurality of particles 704B correspond to and represent a second type of data (e.g., data corresponding to document files) that are stored and/or archived in the user account (e.g., a computer storage account). In some embodiments, third plurality of particles 704C correspond to and represent a third type of data (e.g., data corresponding to video files) that are stored and/or archived in the user account (e.g., a computer storage account). In some embodiments, the number and/or size of each of the particle groups (e.g., 704A, 704B, 704C) are based on the amount of storage allocated to each of the respective corresponding data types. In some embodiments, the relative number and/or size of the particle groups (e.g., 704A, 704B, 704C) are based on the relative amounts of storage taken up by each of the data types. In some embodiments, the particle groups (e.g., 704A, 704B, 704C) dynamically move around within representation 704 in accordance with a tile of electronic device 100 (e.g., move towards a general direction within representation 704 that corresponds to a direction of the tilt of electronic device 100).

FIG. 13B illustrates electronic device 100 displaying, on display 112, representation 704 of the user account (e.g., a computer storage account) that includes plurality of particles 704A-704C. In some embodiments, in response to detecting that a portion (in this example, 150 MB) of the data stored and/or archived in the user account (e.g., a computer storage account) has been deleted from the computer storage resources associated with the user account. In some embodiments, in response to detecting that the portion of the data stored and/or archived in the user account (e.g., a computer storage account) has been deleted, electronic device 100 displays, in deletion user interface element 716, an indication (in this example, showing "150 MB Deleted Just Now") that the portion of the data stored and/or archived in the user account has been deleted.

In some embodiments, further in response to detecting that the portion (in this example, 150 MB) of the data stored and/or archived in the user account (e.g., a computer storage account) has been deleted from the computer storage resources associated with the user account, electronic device 100 displays, in representation 704 of the user account, a movement of plurality of particles 704A-704C, where at least a portion of one or more of the particle groups 704A-704C move off of an edge of representation 704 (thereby graphically indicating that a portion of the data that was stored and/or archived in the user account has been deleted). In some embodiments, the type and amount of particles that move off of an edge of representation 704 is based on the type and amount of stored and/or archived data that has been deleted from the user account (e.g., a computer storage account). For example, if the portion of the data stored and/or archived in the user account (e.g., a computer storage account) that has been deleted all correspond to all of the first type of data (e.g., data corresponding to photo files), only plurality of particles 704A are moved off of representation 704A. For another example, if the portion of the data stored and/or archived in the user account (e.g., a computer storage account) that has been deleted corresponds to portions of the first type of data, the second type of data (e.g., data corresponding to document files), and the third type of data (e.g., data corresponding to video files), then corresponding portions of particles 704A-704C are moved off of representation 704.

FIGS. 14A-14U illustrate exemplary user interfaces for providing visual feedback on a representation of a transfer account, in accordance with some embodiments. The user interfaces in these figures are used to illustrate the processes described below, including the processes in FIGS. 15A-15D.

FIG. 14A illustrates electronic device 100 displaying, on display 112, a home user interface 1402 of the electronic device. Home user interface 1402 includes a plurality of icons corresponding to software applications installed on the electronic device, including a transfer application icon 1404 corresponding to the transfer application (e.g., the electronic wallet application). Activation of a respective application icon causes the corresponding application to be displayed.

In FIG. 14A, while displaying home user interface 1402, electronic device 100 detects a user activation 1401 of (e.g., tap input on) transfer application icon 1404 corresponding to the transfer application (e.g., the electronic wallet application).

Figure 14B:
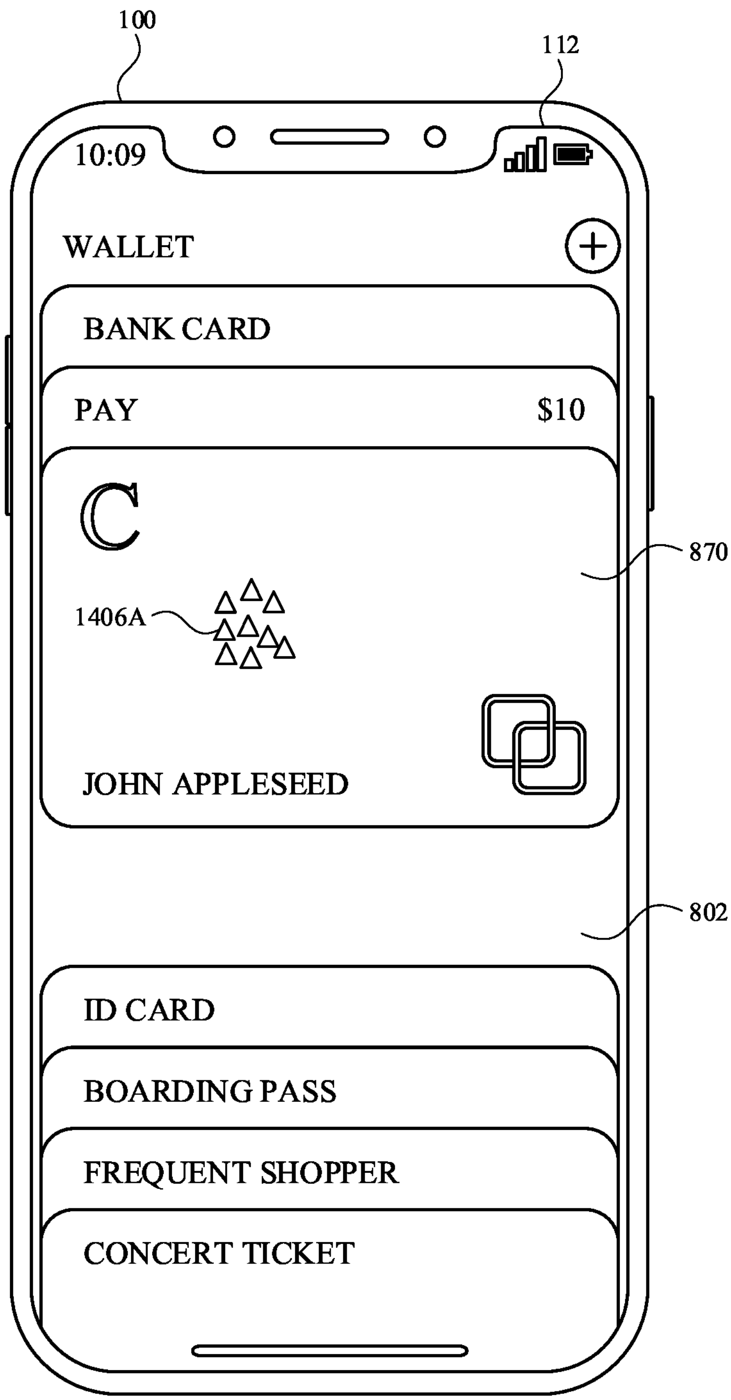

In FIG. 14B, in response to detecting user activation 1401, electronic device 100 displays, on display 112, user interface 802 of the transfer application (e.g., the electronic wallet application), including representation 870 of the transfer account (e.g., the first-party credit account: the points account). As mentioned, in some embodiments, the transfer account is a first-party credit account (e.g., a revolving credit account that is issued or branded by the manufacturer of the electronic device), and provides rewards (e.g., cash back rewards) based on the amount of transfers (e.g., payment transactions, points transfers) made using the transfer account (e.g., cash back rewards that are based on a certain percentage of the value of each transition). As also mentioned, in some embodiments, the transfer account is a points account (e.g., for meal points, for printer credits, for membership points) that provides rewards (e.g., points rewards) based on the amount of points used using the transfer account.

In some embodiments, in response to displaying user interface 802 of the transfer application (e.g., the electronic wallet application), electronic device 100 displays, in representation 870 of the transfer account (e.g., the first-party credit account; the points account), a region (represented in some of the following figures as a first plurality of particles 1406A) having a first common visual characteristic (e.g., a common color; a common color hue), where first plurality of particles 1406A correspond to transfers (e.g., payment transactions; points transfers) of a first category (e.g., food and drinks, shopping, groceries, travel, education, entertainment) made using the transfer account, and for which the corresponding balance is still remaining on the transfer account (e.g., the corresponding balance has not yet been paid off) during a predetermined time period (e.g., the current week, the current month). While FIGS. 14A-14S represent the various regions with the common visual characteristic as a plurality of particles, it should be understood that it could be represented in a plurality of different ways (e.g., contiguous regions of color, predefined shapes with different sizes, or the like) where the area of the region indicates the magnitude of some property associated with the common visual characteristic. For example, in FIGS. 14T-14U, the various regions with the common visual characteristic are represented as contiguous regions of color (e.g., a plurality of blobs with a different respective colors). In some embodiments where particles are used, a distortion is applied to the particles such as a blur or smearing effect so that the particles appear to be part of a visually contiguous region even though the particles are moving independently in accordance with a predetermined physics model (e.g., a model defining a simulated mass, friction, inertia, viscosity, adhesion, cohesion, magnetic or electrostatic attraction, and/or other simulated physical properties of the particles as well as how inputs at the device such as tilting of the device or touching the device affect the particles as a simulated force exerted on the particles, such as the force of gravity).

In some embodiments, first plurality of particles 1406A dynamically move within representation 870 based on a movement (e.g., changes in tilt) of electronic device 100. For example, if the electronic device is tilted towards the left, first plurality of particles 1406A move within representation 870 in the corresponding left direction towards the left edge of representation 870. Similarly, if the electronic device is tilted towards the right, first plurality of particles 1406A move within representation 870 in the corresponding right direction towards the right edge of representation 870. In some embodiments, the particles of first plurality of particles 1406A generally move together in a coordinated manner (e.g., as a group, in the same general direction, within the same general region or so as to maintain a contiguous region of with the same color) within representation 870. In some embodiments, the speed of movement of first plurality of particles 1406A in accordance with movements of the electronic device is at least in part based on the degree of tilt of the device. That is, the more the electronic device is tilted (e.g., relative to the horizontal), the faster the plurality of particles are moved and/or dispersed within representation 870. In some embodiments, first plurality of particles 1406A move (e.g., by a small amount, in a back-and-forth movement in the same general region) within representation 870 even when no movement (or very slight movement) is detected on the electronic device.

In some embodiments, instead of first plurality of particles 1406A, transfers (e.g., payment transactions, points transfers) of the first category (e.g., food and drinks, shopping, groceries, travel, education, entertainment) made using the transfer account (e.g., the first-party credit account; the points account) are represented by one or more dynamic blobs having the first common visual characteristic (e.g., one or more blobs of color of the same hue). In some embodiments, other than differences in visual appearance, the one or more dynamic blobs behave similarly to the plurality of particles within representation 870. Characteristics of the one or more dynamic blobs are described in greater detail below with reference to FIGS. 14T-14U.

In FIG. 14B, first plurality of particles 1406A are beginning to appear in (e.g., at or near a center region of) representation 870 of the transfer account (e.g., the first-party credit account; the points account) in response to the electronic device displaying representation 870 in user interface 802.

FIGS. 14B-14E illustrate first plurality of particles 1406A, a second plurality of particles 1406B, and a third plurality of particles 1406C appearing (e.g., in that order) on representation 870 of the transfer account (e.g., the first-party credit account; the points account). As mentioned, while FIGS. 14B-14E represent various regions as a plurality of particles (e.g., first plurality of particles 1406A, second plurality of particles 1406B, and third plurality of particles 1406C), in some embodiments, distortion is applied to the particles such as a blur or smearing effect so that the particles appear to be part of a visually contiguous region even though the particles are moving independently in accordance with a predetermined physics model (e.g., a model defining a simulated mass, friction, inertia, viscosity, adhesion, cohesion, magnetic or electrostatic attraction, and/or other simulated physical properties of the particles as well as how inputs at the device such as tilting of the device or touching the device affect the particles as a simulated force exerted on the particles, such as the force of gravity).

Figure 14C:
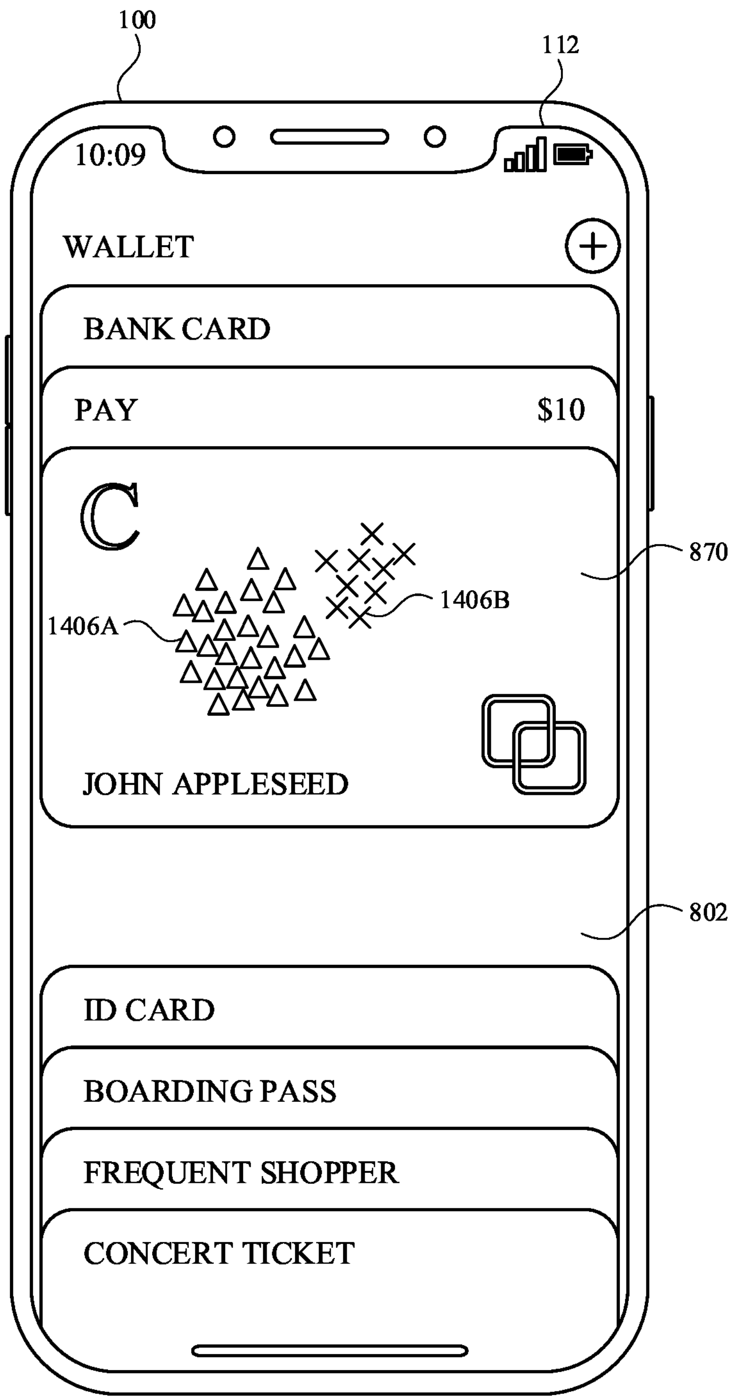

Specifically, in FIG. 14C, as electronic device 100 increasingly displays first plurality of particles 1406A within representation 870 of the transfer account (e.g., the first-party credit account; the points account) and begins displaying second plurality of particles 1406B in (e.g., at or near a center region of) representation 870. Second plurality of particles 1406B have a second common visual characteristic (e.g., a common color; a common color hue) and correspond to transfers (e.g., payment transactions; points transfers) of a second category (e.g., food and drinks, shopping, groceries, travel, education, entertainment) made using the transfer account (e.g., the first-party credit account; the points account) for which the corresponding balance is still remaining on the transfer account (e.g., the corresponding balance has not yet been paid off).

Figure 14D:
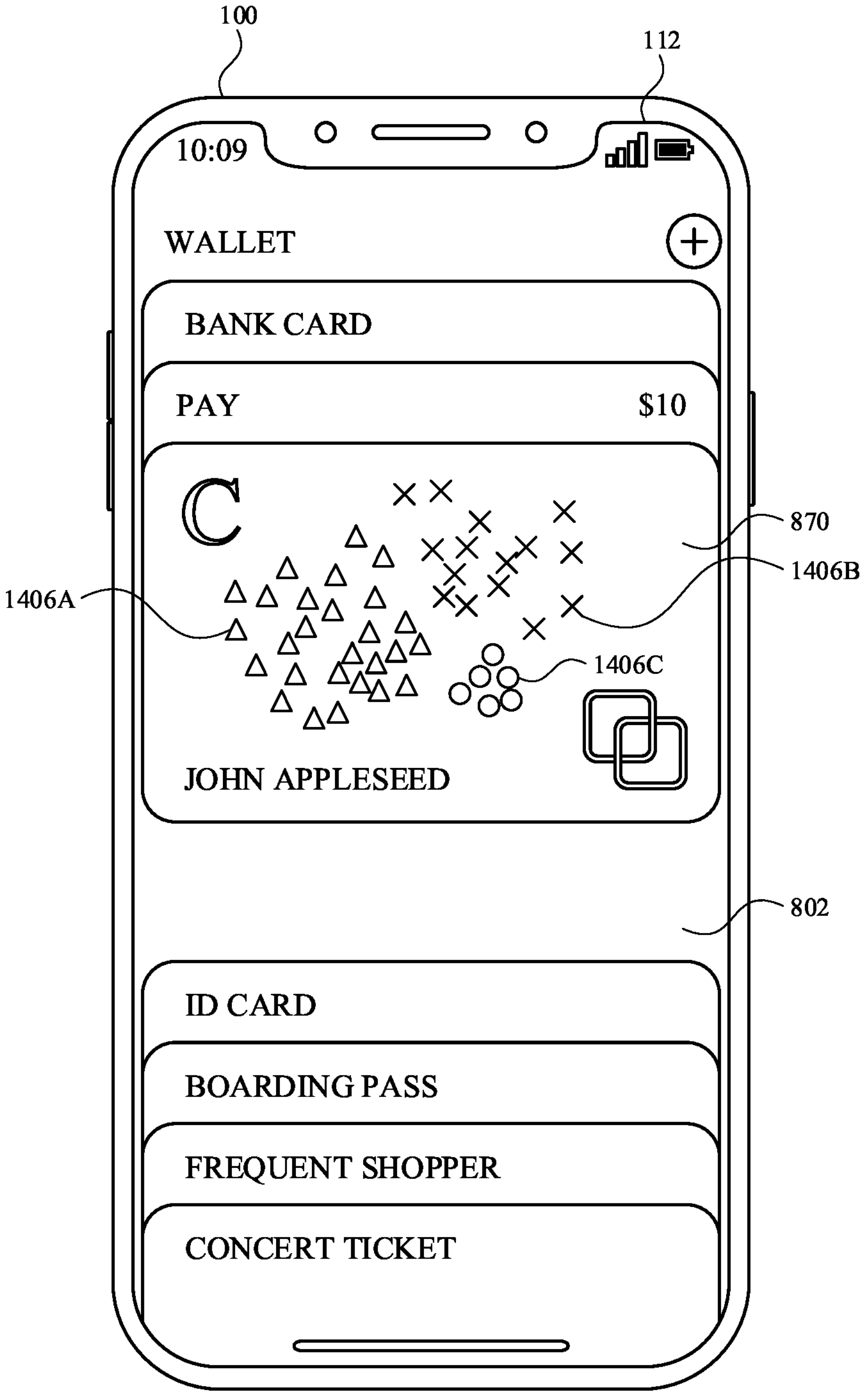

In FIG. 14D, electronic device 100 has fully displayed first plurality of particles 1406A on representation 870 of the transfer account (e.g., the first-party credit account; the points account). In some embodiments, the number of particles of first plurality of particles 1406A, the size of each particle of plurality of particles 1406A, and/or the area of representation 870 generally covered by plurality of particles 1406A corresponds to the total amount of transfers of the first category made using the transfer account (e.g., the total current balance corresponding to payment transactions of the first category).

Further, in FIG. 14D, electronic device 100 increasingly displays second plurality of particles 1406B within representation 870 of the transfer account (e.g., the first-party credit account; the points account) and begins displaying third plurality of particles 1406C in (e.g., at or near a center region of) representation 870. Third plurality of particles 1406C have a third common visual characteristic (e.g., a common color; a common color hue) and correspond to transfers (e.g., payment transactions; points transfers) of a third category (e.g., food and drinks, shopping, groceries, travel, education, entertainment) made using the transfer account (e.g., the first-party credit account; the points account) for which the corresponding balance is still remaining on the transfer account (e.g., the corresponding balance has not yet been paid off).

Figure 14E:
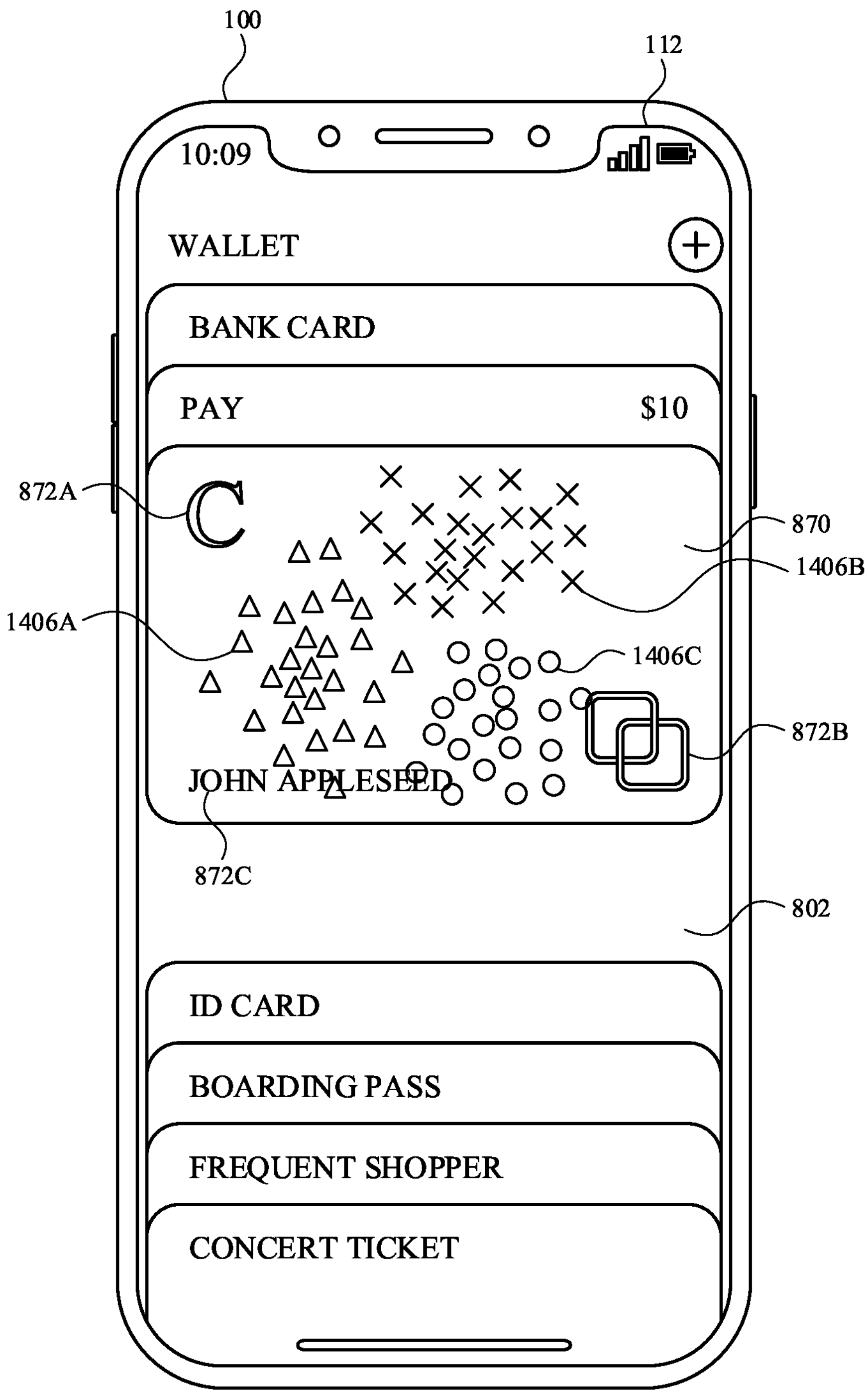

In FIG. 14E, electronic device 100 has fully displayed first plurality of particles 1406A, second plurality of particles 1406B, and third plurality of particles 1406C on representation 870 of the transfer account (e.g., the first-party credit account; the points account). As mentioned, in some embodiments, the size of individual particles and/or the total size of each of the plurality of particles is based on the total amount of transfers of the respective category made using the transfer account (e.g., the total current balance corresponding to payment transactions of the respective category). For example, if the total amount of transfers of the first category (e.g., the total balance corresponding to payment transactions of the first category) made using the transfer account (e.g., the first-party credit account; the points account) is greater than the total amount of transfers of the third category (e.g., the total balance corresponding to payment transactions of the third category) made using the transfer account, then electronic device 100 displays first plurality of particles 1406A with a larger size (e.g., such that it is more prominent) on representation 870 as compared to third plurality of particles 1406C.

In some embodiments, if electronic device 100 detects or determines that there are transfers made using the transfer account (e.g., the first-party credit account; the points account) corresponding to categories other than the first, second, and third categories discussed above, the electronic device displays other types of particles with different visual characteristics (e.g., different colors, different color hues) in representation 870 corresponding to those other categories. In some embodiments, electronic device 100 sets a maximum number of particle types (of different colors or color hues) that can be displayed simultaneously on representation 870 of the transfer account (e.g., the first-party credit account; the points account). In some embodiments, if there is no transfer balance associated with the transfer account (e.g., the first-party credit account; the points account), electronic device 100 forgoes displaying any particles on representation 870 of the transfer account.

As also mentioned, in some embodiments, electronic device 100 displays particles being moved dynamically within representation 870 based on a detected movement (e.g., changes in tilt) of the electronic device. In some embodiments, electronic device 100 displays the particles being moved within representing 870 (e.g., by a small amount, in a back-and-forth movement in the same general region) even when no movement (or very slight movement) is detected by the electronic device.

In FIG. 14E, while detecting minimal movement of the device, electronic device 100 displays first plurality of particles 1406A, second plurality of particles 1406B, and third plurality of particles 1406C being moved around (e.g., oscillating, vacillating, wavering) near their respective locations on representation 870. In some embodiments, electronic device 100 does not display the moving particles over first visual indication 872A (e.g., a logo), second visual indication 872B (e.g., a logo), and third visual indication 872C of representation 870. Therefore, in some embodiments, first visual indication 872A, second visual indication 872B, and third visual indication 872C are always fully displayed on representation 870 (and thus are always fully visible to the user of the electronic device).

Figure 14F:
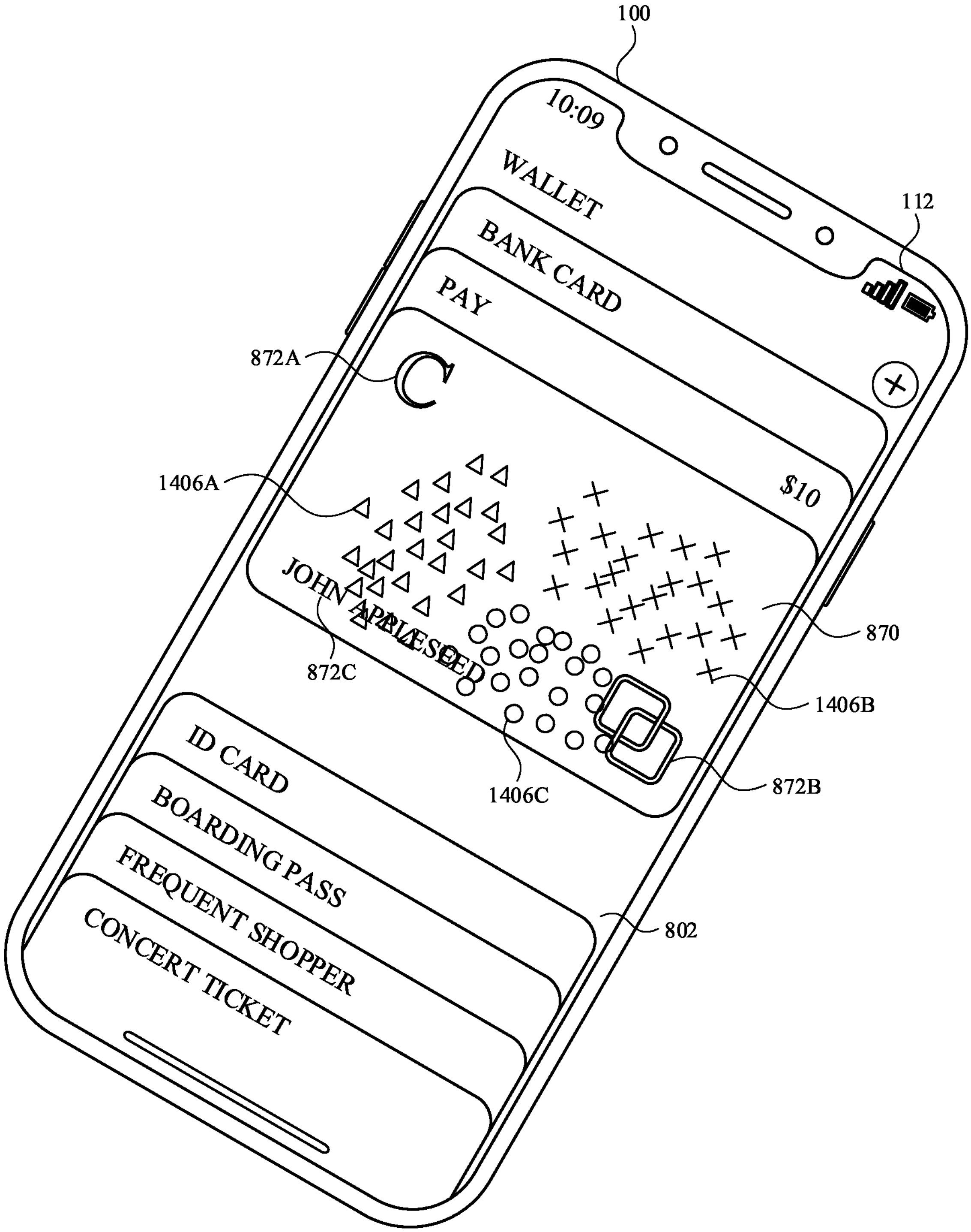
Figure 14G:
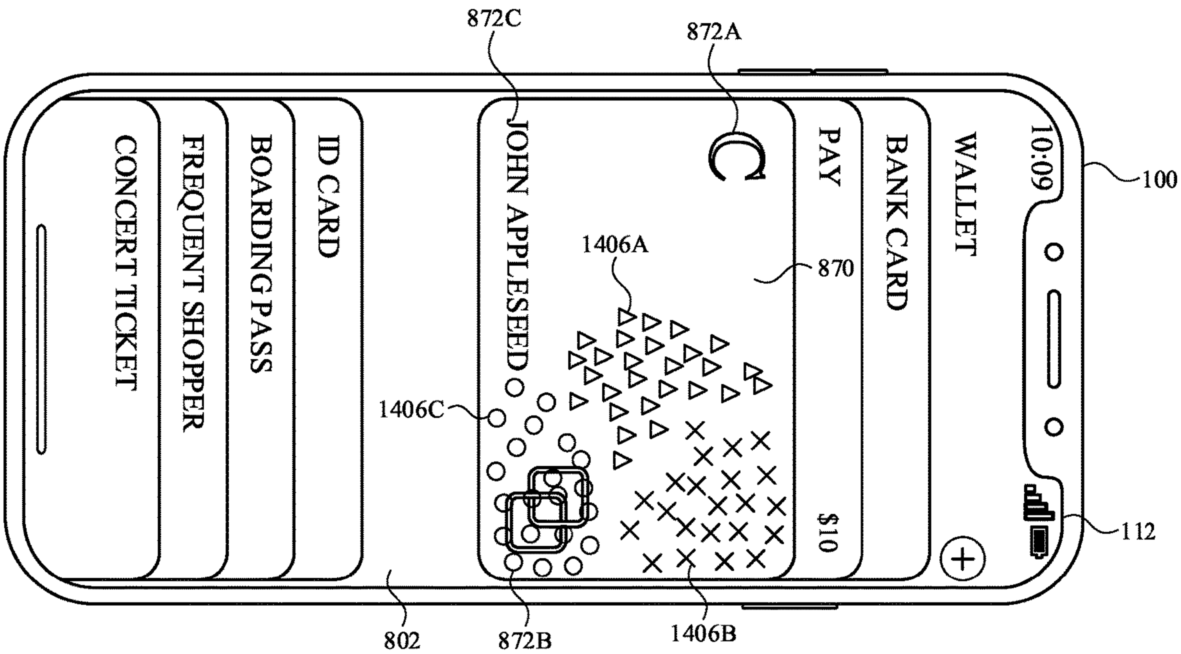

FIGS. 14F-14G illustrate electronic device 100 displaying first plurality of particles 1406A, second plurality of particles 1406B, and third plurality of particles 1406C being moved within representation 870 of the transfer account (e.g., the first-party credit account; the points account) in response to detecting a movement (e.g., a tilt) of the device. As mentioned, while FIGS. 14F-14G represent various regions as a plurality of particles (e.g., first plurality of particles 1406A, second plurality of particles 1406B, and third plurality of particles 1406C), in some embodiments, distortion is applied to the particles such as a blur or smearing effect so that the particles appear to be part of a visually contiguous region even though the particles are moving independently in accordance with a predetermined physics model (e.g., a model defining a simulated mass, friction, inertia, viscosity, adhesion, cohesion, magnetic or electrostatic attraction, and/or other simulated physical properties of the particles as well as how inputs at the device such as tilting of the device or touching the device affect the particles as a simulated force exerted on the particles, such as the force of gravity).

In FIG. 14F, electronic device 100 detects (e.g., via an accelerometer and/or a gyrometer of the device) a rightwards tilt of the device (e.g., by a 45 degree angle from the horizontal). In some embodiments, in response to detecting the rightwards tilt of the device, electronic device 100 displays plurality of particles 1406A-1406C beginning to be moved (e.g., in a smooth, flowing movement) within representation 870 towards the direction of the tilt. Thus, in FIG. 14F, plurality of particles 1406A-1406C are moved towards the right edge of representation 870 as the device is tilted towards the right.

In FIG. 14G, electronic device 100 detects (e.g., via accelerometer and/or a gyrometer of the device) a more extreme rightwards tilt of the device (e.g., by almost a 90 degree from the horizontal). In some embodiments, in response to detecting the extreme rightwards tilt of the device, electronic device 100 displays plurality of particles 1406A-1406C being moved further (e.g., in a smooth, flowing movement) within representation 870 towards the direction of the tilt. In some embodiments, because of the more extreme movement of the device (e.g., the more extreme tilting of the device), plurality of particles 1406A-1406C are moved further and grouped more tightly together in FIG. 14G as compared to in FIG. 14F.

In some embodiments, while displaying the movement of the particles within representation 870 of the transfer account (e.g., the first-party credit account; the points account) in accordance with detected movements (e.g., tilting) of the device, electronic device 100 displays the different particle types (e.g., first plurality of particles 1406A, second plurality of particles 1406B, and third plurality of particles 1406C) moving in the same general direction within representation. 870 (e.g., without any overlapping movements among the different particle types), as shown in FIGS. 14F-14G. In some embodiments, electronic device 100 maintains a boundary region (e.g., a neutral region corresponding to the background color of representation 870, such as a white region) between different particle types within representation 870. In other embodiments, electronic device 100 allows at least a partial overlap of different particle types when they are being moved on representation 870.

Figure 14H:
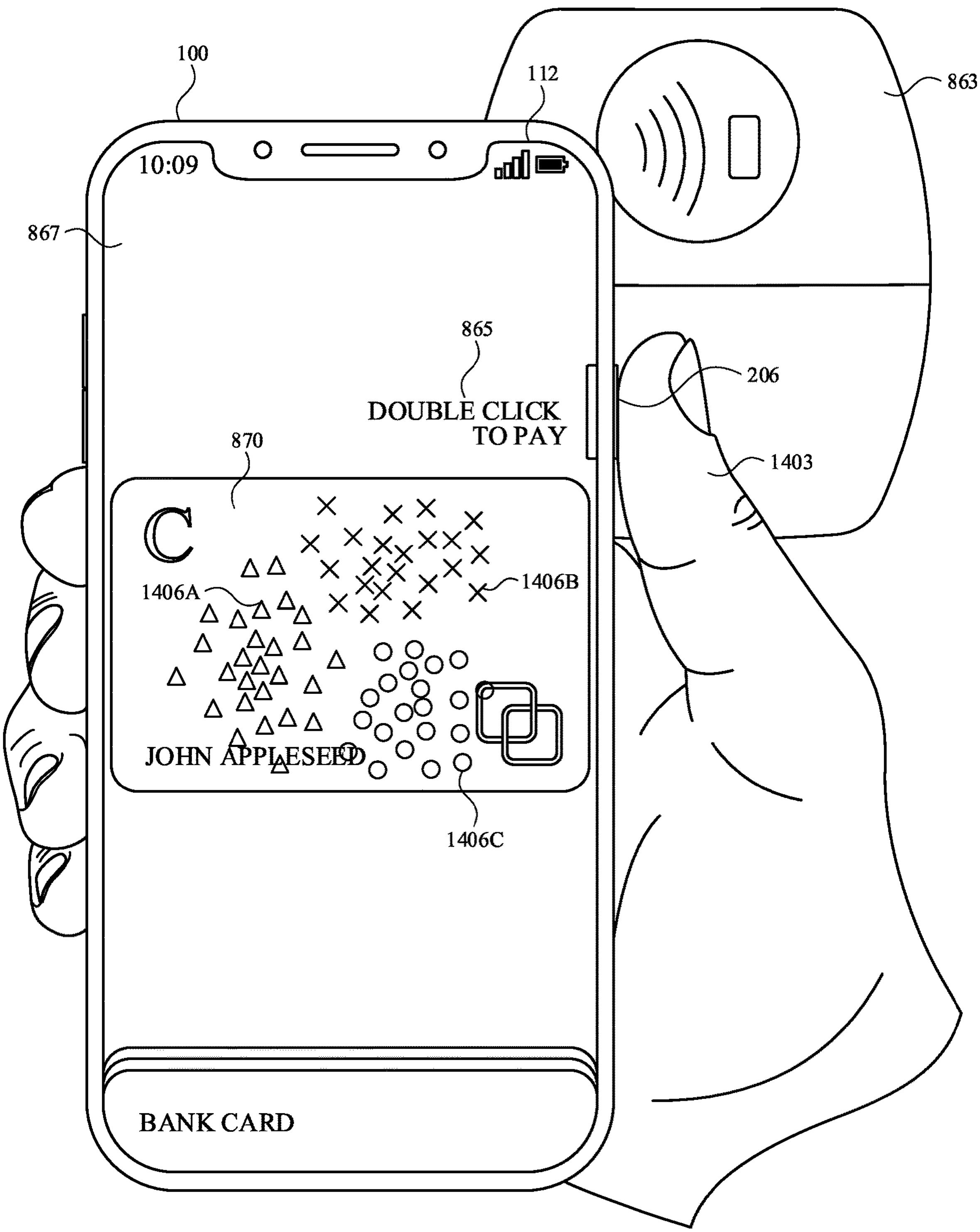

FIG. 14H illustrates electronic device 100 displaying, on display 112, user interface 867 of the transfer application (e.g., the electronic wallet application) for proceeding with a transfer (e.g., a NFC-based payment) with terminal 863 (e.g., a transaction terminal) using the transfer account (e.g., the first-party credit account; the points account), as first described above with reference to FIGS. 8T-8V. In some embodiments, electronic device 100 displays, in user interface 867, representation 870 of the transfer account (e.g., the first-party credit account; the points account) in a center region of the user interface (thereby indicating that the transfer account corresponding to representation is 870 is set as the account to be used in a transfer (e.g., a payment transaction; a points transfer)).

In FIG. 14H, electronic device 100 detects (e.g., using an accelerometer and/or a gyroscope of the device) that it is being held in a natural holding position (e.g., with no or slight left or right tilting). As such, electronic device 100 displays plurality of particles 1406A-1406C near a center region of representation 870 of the transfer account (e.g., the first-party credit account; the points account).

In FIG. 14H, while displaying user interface 867 with representation 870 showing plurality of particles 1406A-1406C, electronic device 100 receives a user input 1403 on an input device (e.g., push button 206) of the electronic device in accordance with a transfer instruction 865 (e.g., stating "Double Click to Pay") displayed in user interface 867.

Figure 14I:
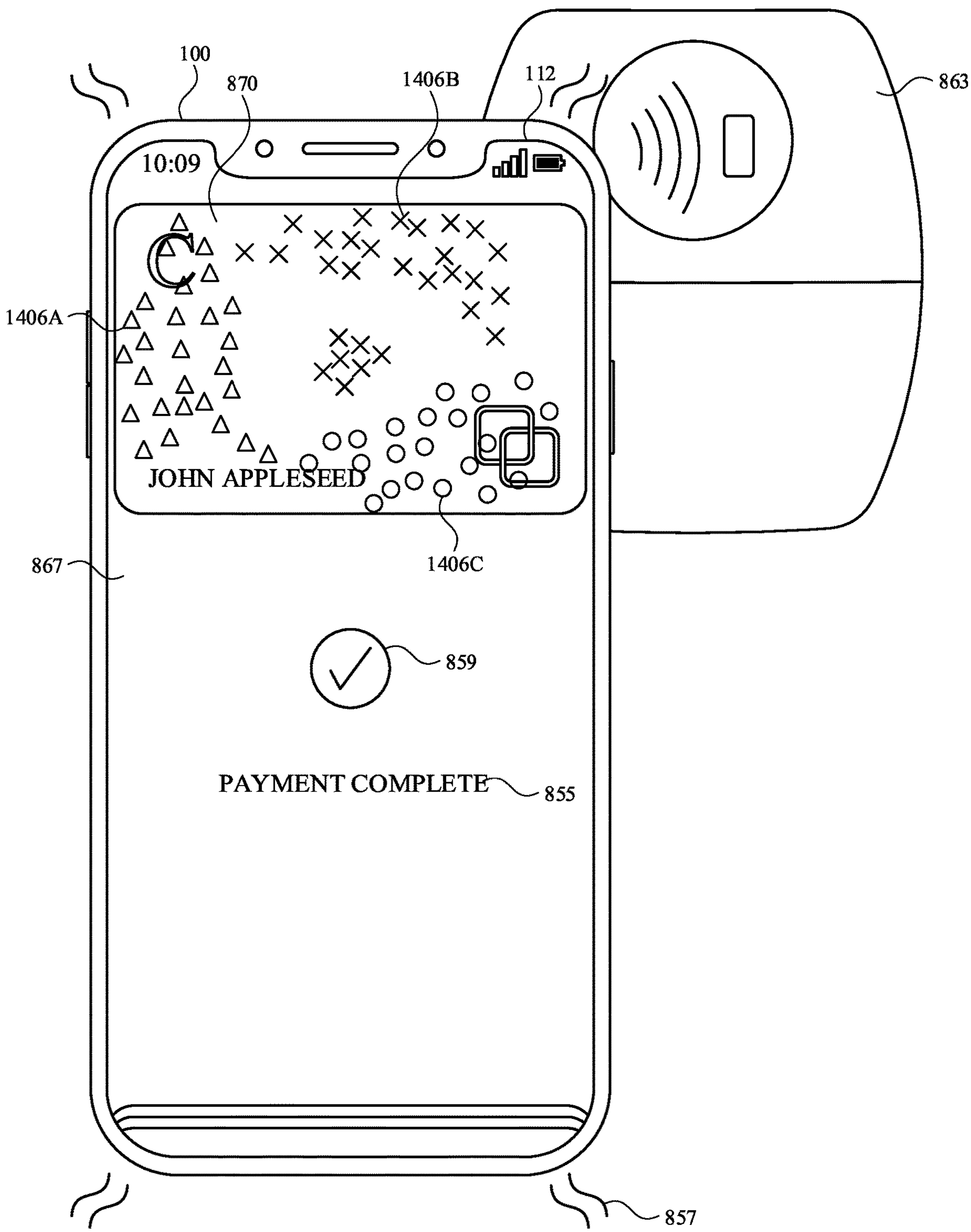

In FIG. 14I, in response to receiving user input 1403 on the input device (e.g., push button 206) of electronic device 100, and further in response to receiving successful authentication (e.g., biometric authentication, such as facial recognition authentication, fingerprint authentication, iris and/or retina scan authentication, voice recognition authentication; or passcode or password authentication), electronic device 100 displays, in user interface 867 of the transfer application (e.g., the electronic wallet application), an indication 859 that the transfer (e.g., the payment transaction; the points transfer) has been successfully completed using the transfer account (e.g., the first-party credit account; the points account). In some embodiments, in addition to displaying indication 859, electronic device 100 also generates (e.g., using haptic feedback controller 161 and/or haptic feedback module 133) tactile output 857 indicating that the transfer (e.g., the payment transaction, the points transfer) has been successfully completed using the transfer account (e.g., the first-party credit account; the points account).

FIGS. 14I-14M illustrate electronic device 100 displaying, in representation 870 of user interface 867 of the transfer application (e.g., the electronic wallet application), a visual effect using the plurality of particles (e.g., plurality of particles 1406A-1406C) in response to detecting the successful transfer (e.g., the successful payment transaction; the successful points transfer). As mentioned, while FIGS. 14I-14M represent various regions as a plurality of particles (e.g., first plurality of particles 1406A, second plurality of particles 1406B, and third plurality of particles 1406C), in some embodiments, distortion is applied to the particles such as a blur or smearing effect so that the particles appear to be part of a visually contiguous region even though the particles are moving independently in accordance with a predetermined physics model (e.g., a model defining a simulated mass, friction, inertia, viscosity, adhesion, cohesion, magnetic or electrostatic attraction, and/or other simulated physical properties of the particles as well as how inputs at the device such as tilting of the device or touching the device affect the particles as a simulated force exerted on the particles, such as the force of gravity).

In FIG. 14I, electronic device 100 detects or determines (e.g., based at least in part on information from terminal 863) that the successful transfer (e.g., the successful payment transaction, the successful points transfer) completed in FIG. 14I was a transfer corresponding to the second transfer category (which corresponds to second plurality of particles 1406B). As previously mentioned, transfer categories are based on information about the transfer (e.g., a location where the transfer was made, the purpose of the transfer), and can include, for example, food and drinks, groceries, shopping, travel, education, entertainment, and the like.

Figure 14J:
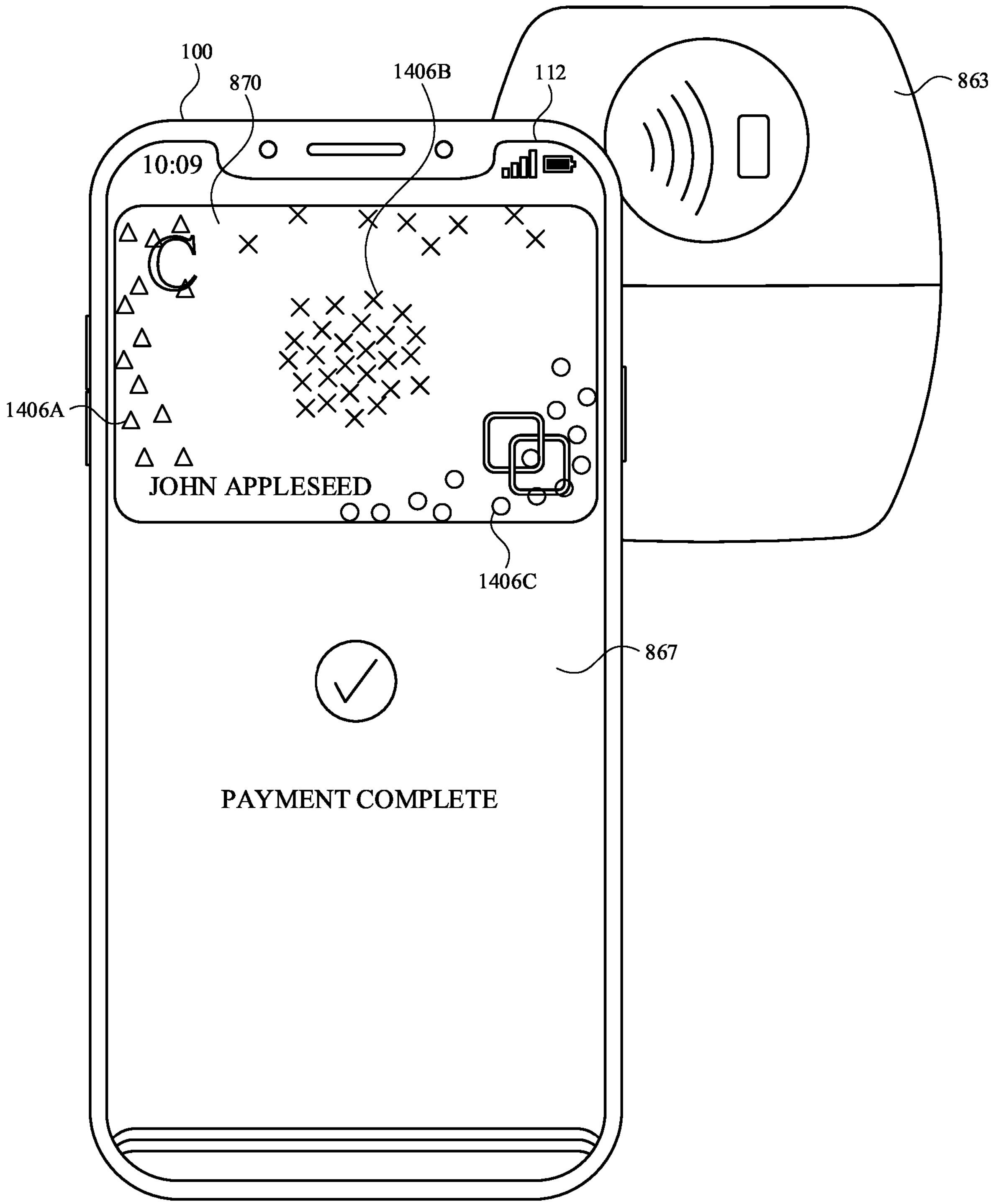

In FIG. 14I-14J, in response to detecting or determining that the successful transfer (e.g., the successful payment transaction; the successful points transfer) using the transfer account (e.g., the first-party credit account; the points account) was of the second transfer category, electronic device 100 first displays, in representation 870, a movement of at least a portion of the particles out of one or more edges of representation 870.

In some embodiments, the movement of the particles comprises an outward circular expanding movement where the particles move off of (e.g., expand off of) the four edges of representation 870 in a circular, closed-loop pattern. In some embodiments, at least a portion of second plurality of particles 1406B that correspond to the second transfer category remain in a center region of representation 870 as other particles (e.g., all of first plurality of particles 1406A, all of third plurality of particles 1406C, and the remaining portion of second plurality of particles 1406B) expand out of representation 870. In some embodiments, all of the particles (including all of second plurality of particles 1406B) expand out of representation 870 and, as the particles are expanding out of representation 870, second plurality of particles 1406B gradually reappear at the center region of representation 870.

Figure 14K:
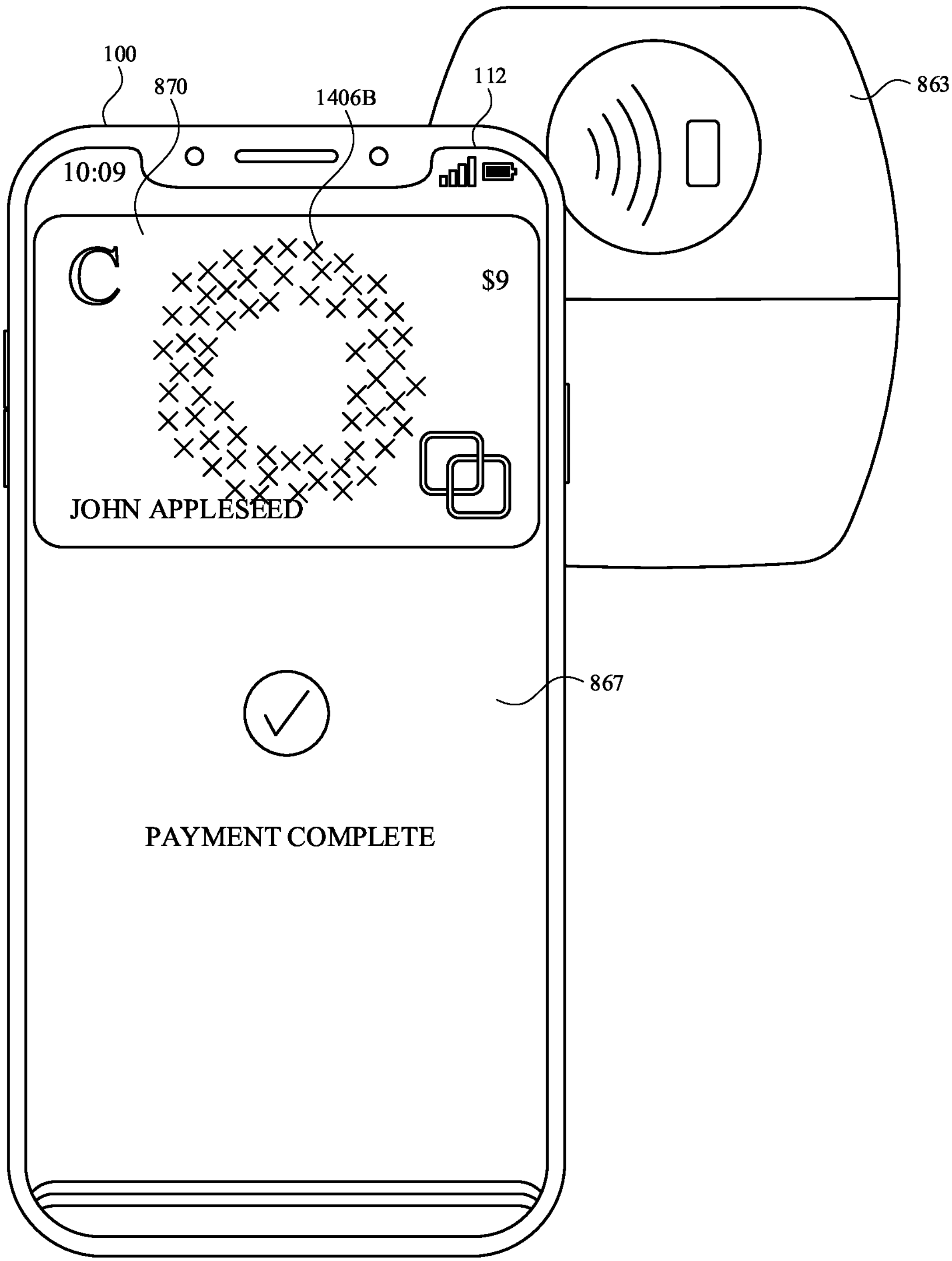
Figure 14L:
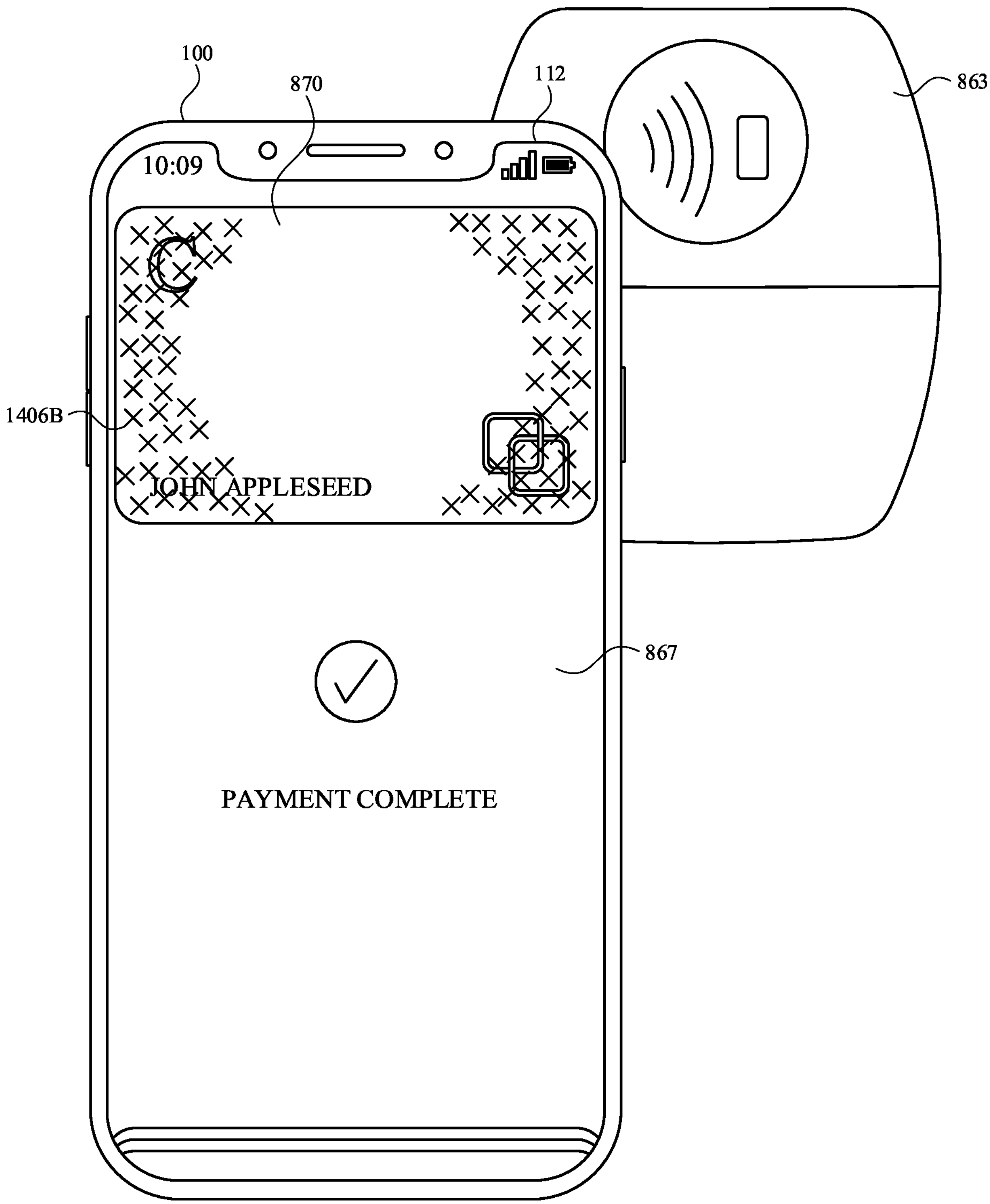

FIGS. 14J-14L illustrate, while the particles are expanding out of the edges of representation 870 of the transfer account (e.g., the first-party credit account; the points account) (or, alternatively, after the particles have expanded out of the edges of representation 870 of the transfer account), electronic device 100 displaying second plurality of particles 1406B re-appearing in the center region of representation 870, and then in a circular, closed-loop pattern, expanding out of the edges of representation 870. By displaying the movements of second plurality of particles 1406B shown in FIGS. 14J-14L, electronic device 100 indicates to the user that the successful transfer (e.g. the successful payment transaction, the successful points transfer) corresponded to the second transfer category.

In some embodiments, in response to detecting a successful transfer, in accordance with a determination that the successful transfer (e.g., the successful payment transaction; the successful points transfer) using the transfer account (e.g., the first-party credit account; the points account) does not correspond to any (or cannot be determined to correspond to any) transfer category, electronic device 100 displays, animated over plurality of particles 1406A-1406C in representation 870 of the transfer account, a circular shape (e.g., a circular, closed-loop shape) having a neutral visual characteristic (e.g., white, grey, black, or a color that is different from the colors of the particles or regions that represent different transfer categories). In some embodiments, the circular shape having the neutral visual characteristic expands outward in representation 870 such that the shape moves off of the four edges of representation 870 in an expanding circular, closed-loop shape.

Figure 14M:
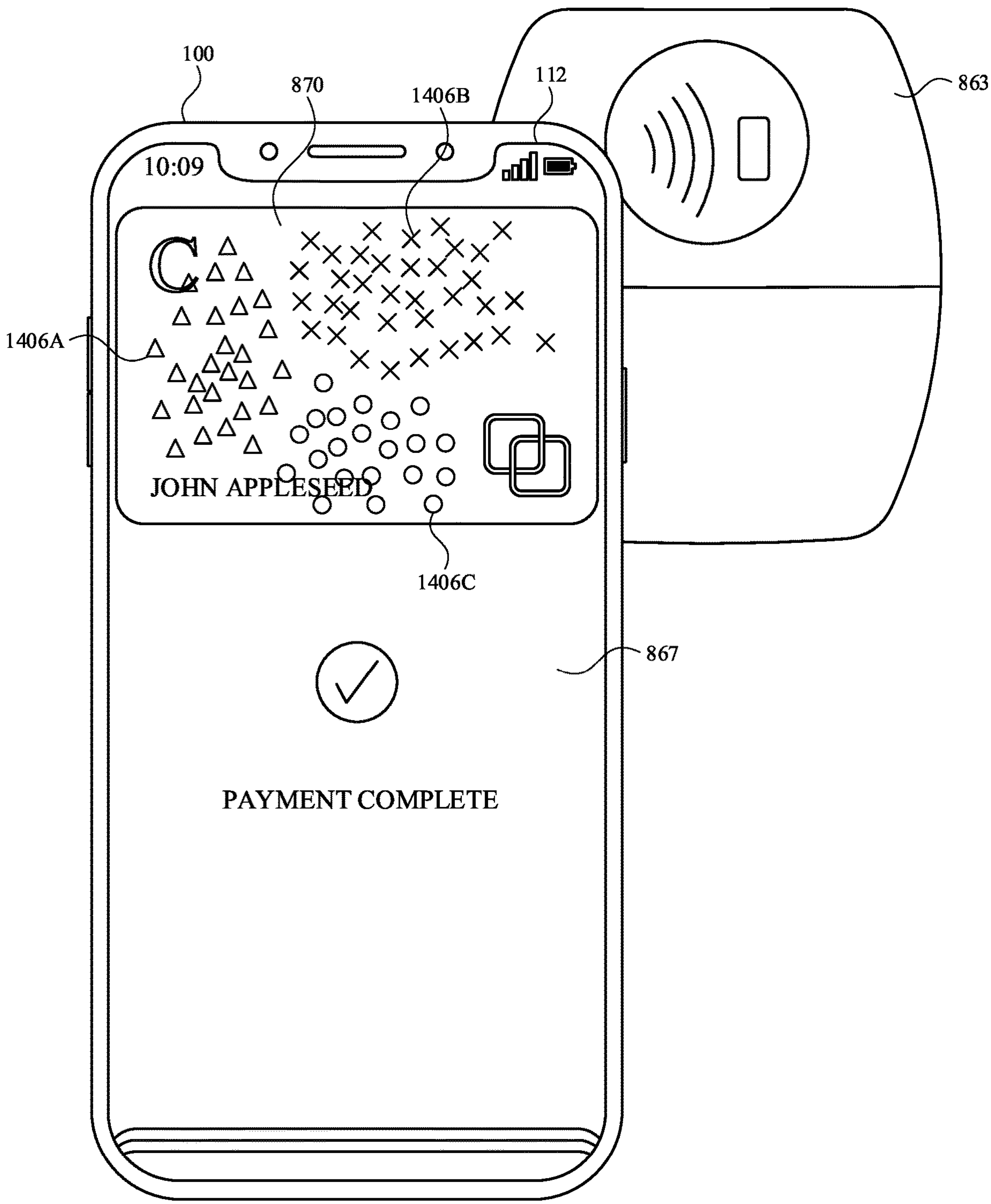

In FIG. 14M, after successfully completing the transfer (e.g., the payment transaction, the points transfer) using the transfer account (e.g., the first-party credit account; the points account) and providing the visual effect described in FIGS. 14I-14L indicative of the successful transfer, electronic device 100 again displays, in representation 870 of the transfer account (e.g., the first-party credit account; the points account), all particles types (e.g., first plurality of particles 1406A, second plurality of particles 1406B, and third plurality of particles 1406C), as first shown in FIG. 0.14E. In some embodiments, displaying all particles types includes fading in display of the particles.

FIGS. 14N-14S illustrates electronic device 100 displaying, on display 112, summary user interface 887 (e.g., a dashboard user interface) of the transfer account (e.g., the first-party credit account; the points account), as first depicted in FIG. 8S. In some embodiments, summary user interface 887 includes display of representation 870 of the transfer account (e.g., the first-party credit account; the points account), where representation 870 includes the particles (e.g., plurality of particles 1406A-1406C) corresponding to respective transfer categories for transfers made using the transfer account, where the transfers correspond to balance that is remaining on the transfer account (e.g., balance that has not yet been paid). As mentioned, while FIGS. 14N-14S represent various regions as a plurality of particles (e.g., first plurality of particles 1406A, second plurality of particles 1406B, and third plurality of particles 1406C), in some embodiments, distortion is applied to the particles such as a blur or smearing effect so that the particles appear to be part of a visually contiguous region even though the particles are moving independently in accordance with a predetermined physics model (e.g., a model defining a simulated mass, friction, inertia, viscosity, adhesion, cohesion, magnetic or electrostatic attraction, and/or other simulated physical properties of the particles as well as how inputs at the device such as tilting of the device or touching the device affect the particles as a simulated force exerted on the particles, such as the force of gravity).

Figure 14N:
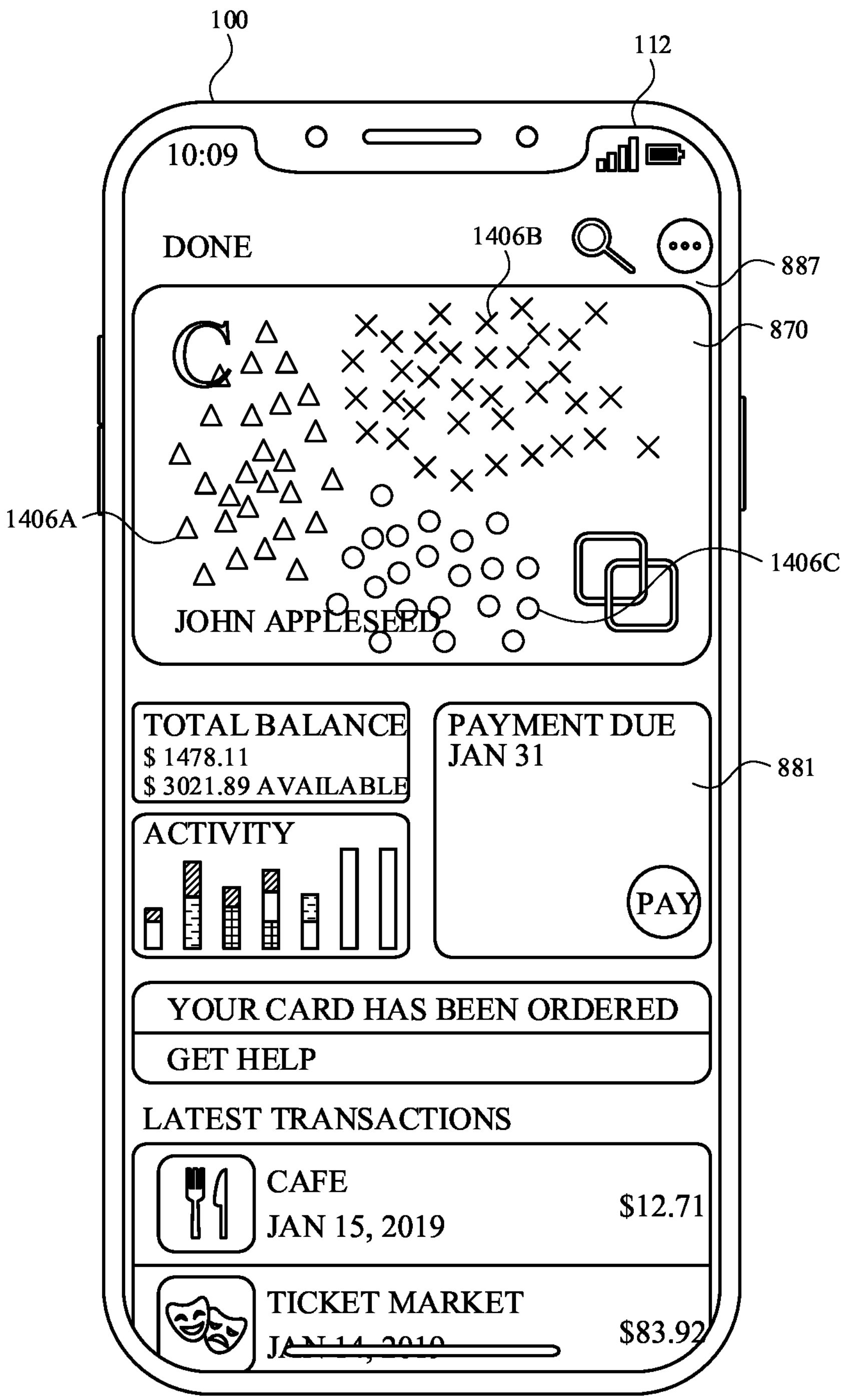

In FIG. 14N, electronic device 100 displays, in balance transfer user interface element 881 of summary user interface 887, that a balance transfer (e.g., a balance payment for the most recent statement amount, or for the statement amount and a previous balance that is past due) is due for the transfer account (e.g., the first-party credit account; the points account).

Figure 14O:
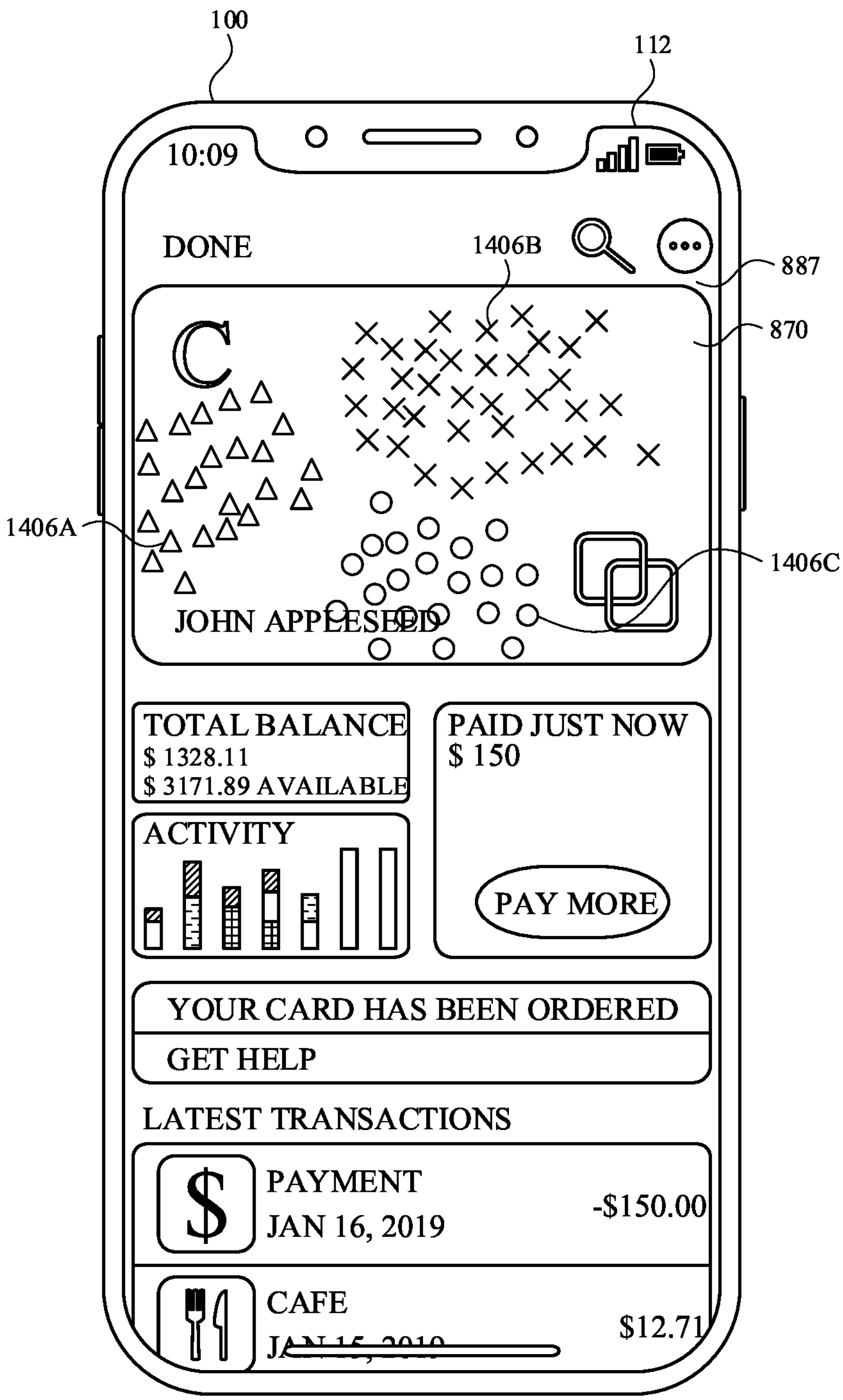

In FIG. 14O, while displaying, on display 112, summary user interface 887, electronic device 100 determines that a balance transfer (e.g., a balance payment of "$150") has been made for the transfer account (e.g., the first-party credit account; the points account), and detects (or determines) that the balance transfer corresponded to a subset of transfers of the first category.

In some embodiments, in response to detecting (or determining) that the balance transfer corresponds to a subset of transfers of the first category, electronic device 100 displays a portion of (e.g., based on the proportional amount of the balance transfer relative to the full amount remaining balance for transfers of the first category) first plurality of particles 1406A corresponding to the first transfer category moving off (e.g., gradually transitioning off) an edge (or one or more edges) of representation 870 of the transfer account (e.g., the first-party credit account; the points account). In some embodiments, in response to detecting (or determining) that the balance transfer corresponds to all of the transfer of the first category, electronic device 100 instead displays all of first plurality of particles 1406A corresponding to the first transfer category moving off (e.g., gradually transitioning off) an edge (or one or more edges) of representation 870 of the transfer account.

Figure 14P:
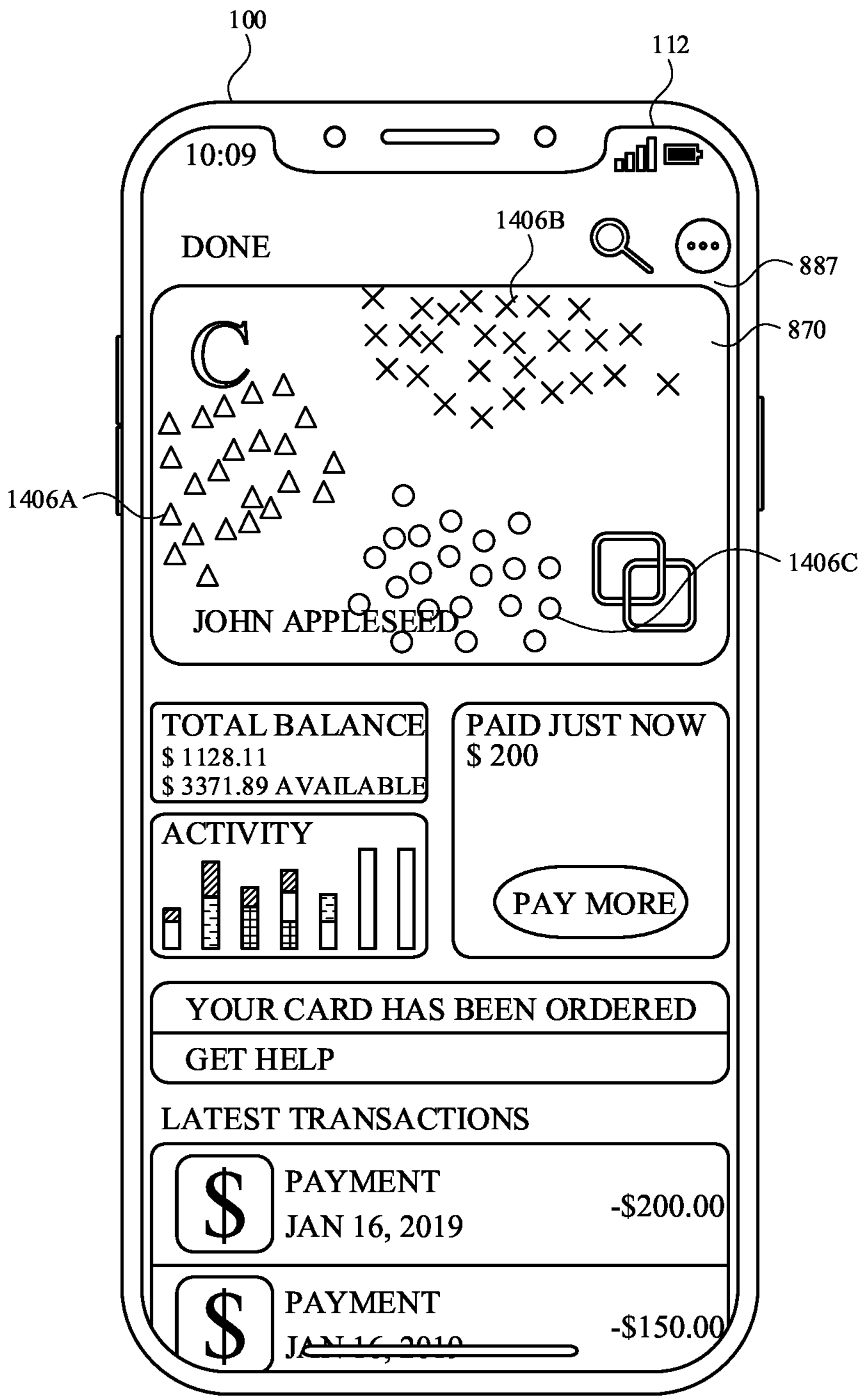

In FIG. 14P, while displaying, on display 112, summary user interface 887, electronic device 100 detects (or determines) that another balance transfer (e.g., a balance payment of "$200") has been made for the transfer account (e.g., the first-party credit account; the points account), and detects (or determines) that the balance transfer corresponds to a subset of transfers of the first category and a subset of transfers of the second category.

In some embodiments, in response to detecting (or determining) that the balance transfer corresponds to a subset of transfers of the first category and a subset of transfers of the second category, electronic device 100 displays a portion of (e.g., based on the proportional amount of the portion of the balance transfer for the first category relative to the full amount remaining balance for transfers of the first category) first plurality of particles 1406A corresponding to the first transfer category and a portion of (e.g., based on the proportional amount of the portion of the balance transfer for the second category relative to the full amount remaining balance for transfers of the second category) second plurality of particles 1406B corresponding to the second transfer category moving off (e.g., gradually transitioning off) one or more edges of representation 870 of the transfer account.

Figure 14Q:
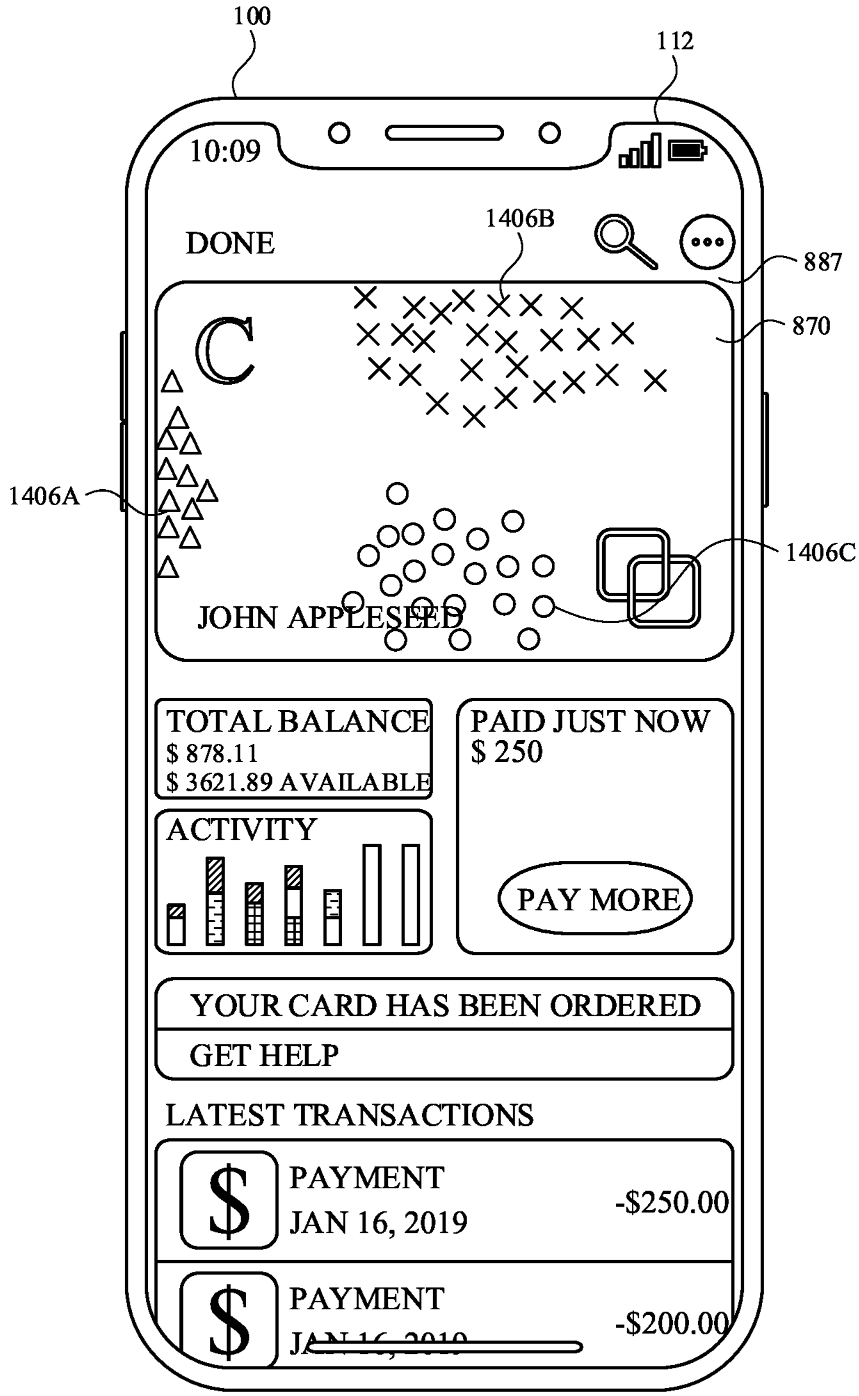

In FIG. 14Q, while displaying, on display 112, summary user interface 887, electronic device 100 detects (or determines) that another balance transfer (e.g., a balance payment of "$250") has been made for the transfer account (e.g., the first-party credit account; the points account), and detects (or determines) that the balance transfer corresponds to all of the remaining amount of transfers of the first category.

In some embodiments, in response to detecting (or determining) that the balance transfer corresponds to all of the remaining amount of transfers of the first category, electronic device 100 displays all of the displayed first plurality of particles 1406A corresponding to the first transfer category moving off (e.g., gradually transitioning off) one or more edges of representation 870 of the transfer account.

Figure 14R:
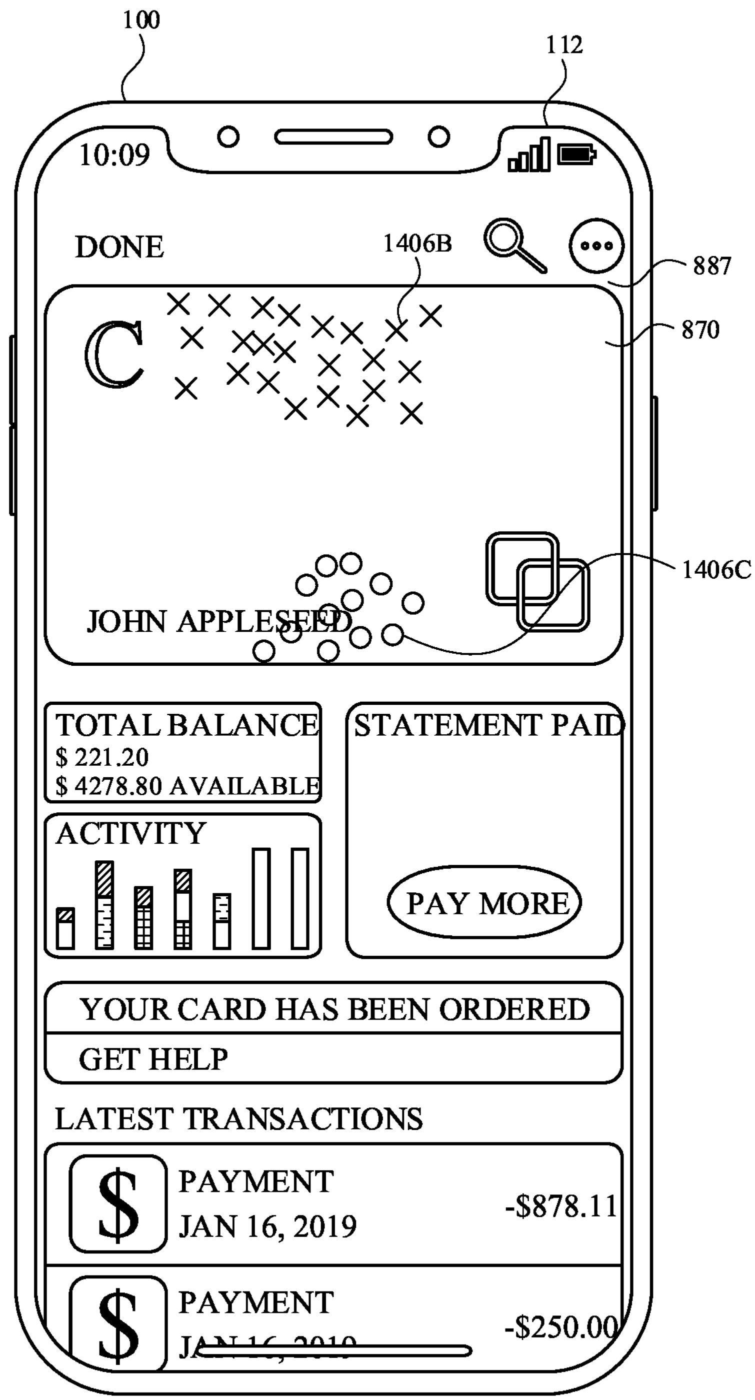
Figure 14S:
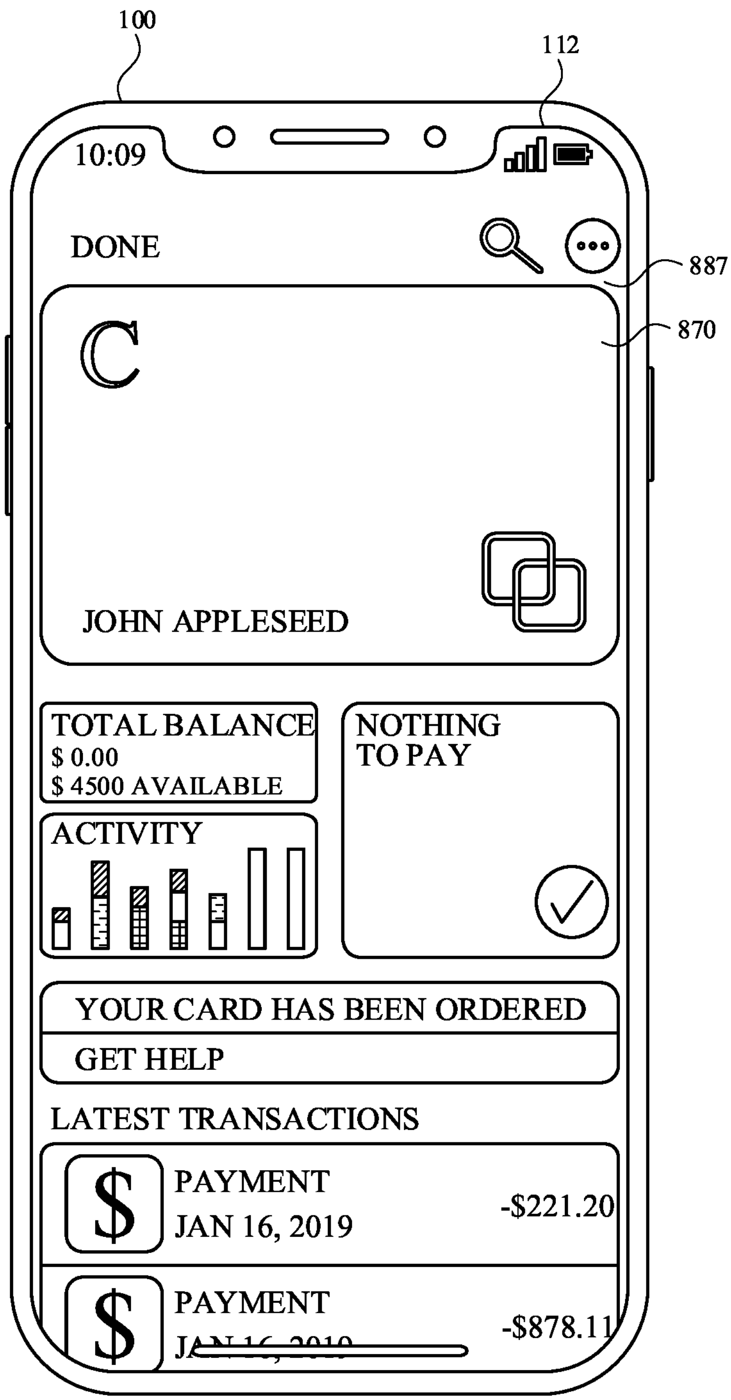

In FIG. 14R, while displaying, on display 112, summary user interface 887, electronic device 100 detects (or determines) that another balance transfer (e.g., a balance payment of all of the remaining statement balance) has been made for the transfer account (e.g., the first-party credit account; the points account), and detects (or determines) that the balance transfer corresponds to an amount that would fully avoid a penalty (e.g., interest) for the respective balance transfer period (e.g., the current statement period), which corresponds to a subset of transfers of the second category and a subset of transfers of the third category.

In some embodiments, in response to detecting (or determining) that the balance transfer corresponds to a subset of transfers of the second category and a subset of transfers of the third category, electronic device 100 displays a portion of (e.g., based on the proportional amount of the portion of the balance transfer for the second category relative to the full amount remaining balance for transfers of the second category) second plurality of particles 1406B corresponding to the second transfer category and a portion of (e.g., based on the proportional amount of the portion of the balance transfer for the third category relative to the full amount remaining balance for transfers of the third category) third plurality of particles 1406C corresponding to the second transfer category moving off (e.g., gradually transitioning off) one or more edges of representation 870 of the transfer account.

In FIG. 14S, while displaying, on display 112, summary user interface 887, electronic device 100 detects (or determines) that another balance transfer (e.g., a balance payment of all of the remaining statement balance) has been made for the transfer account (e.g., the first-party credit account; the points account), and detects (or determines) that the balance transfer corresponds to the full remaining balance amount on the transfer account (e.g., the first-party credit account; the points account).

In some embodiments, in response to detecting (or determining) that the balance transfer corresponds to the full remaining balance amount on the transfer account (e.g., which consists of transfers of the second category and transfers of the third category), electronic device 100 displays all of the remaining second plurality of particles 1406B corresponding to the second transfer category and all of the remaining third plurality of particles 1406C corresponding to the second transfer category moving off (e.g., gradually transitioning off) one or more edges of representation 870 of the transfer account such that particles are no longer displayed in representation 870 of the transfer account.

Figure 14T:
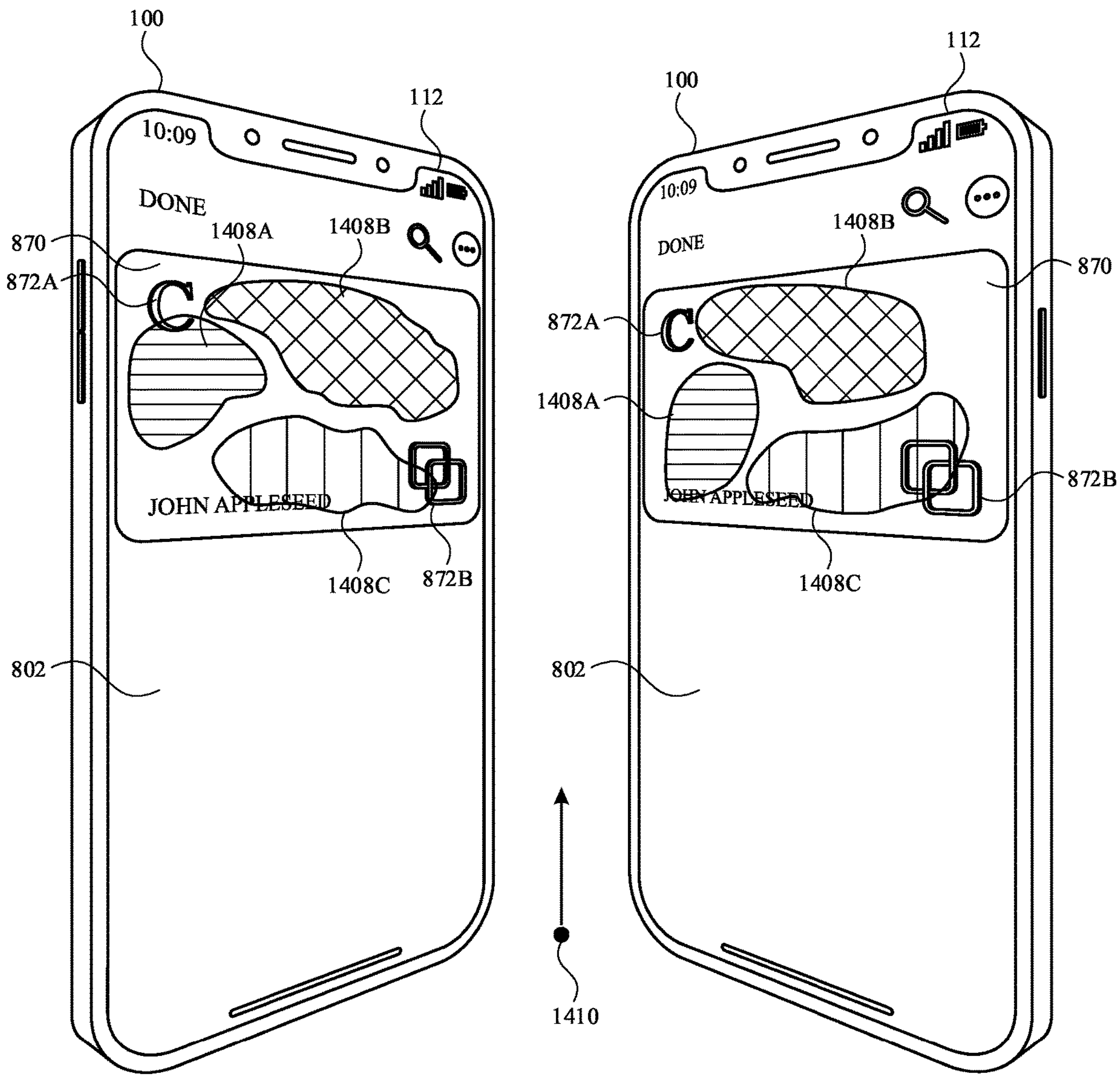
Figure 14U:
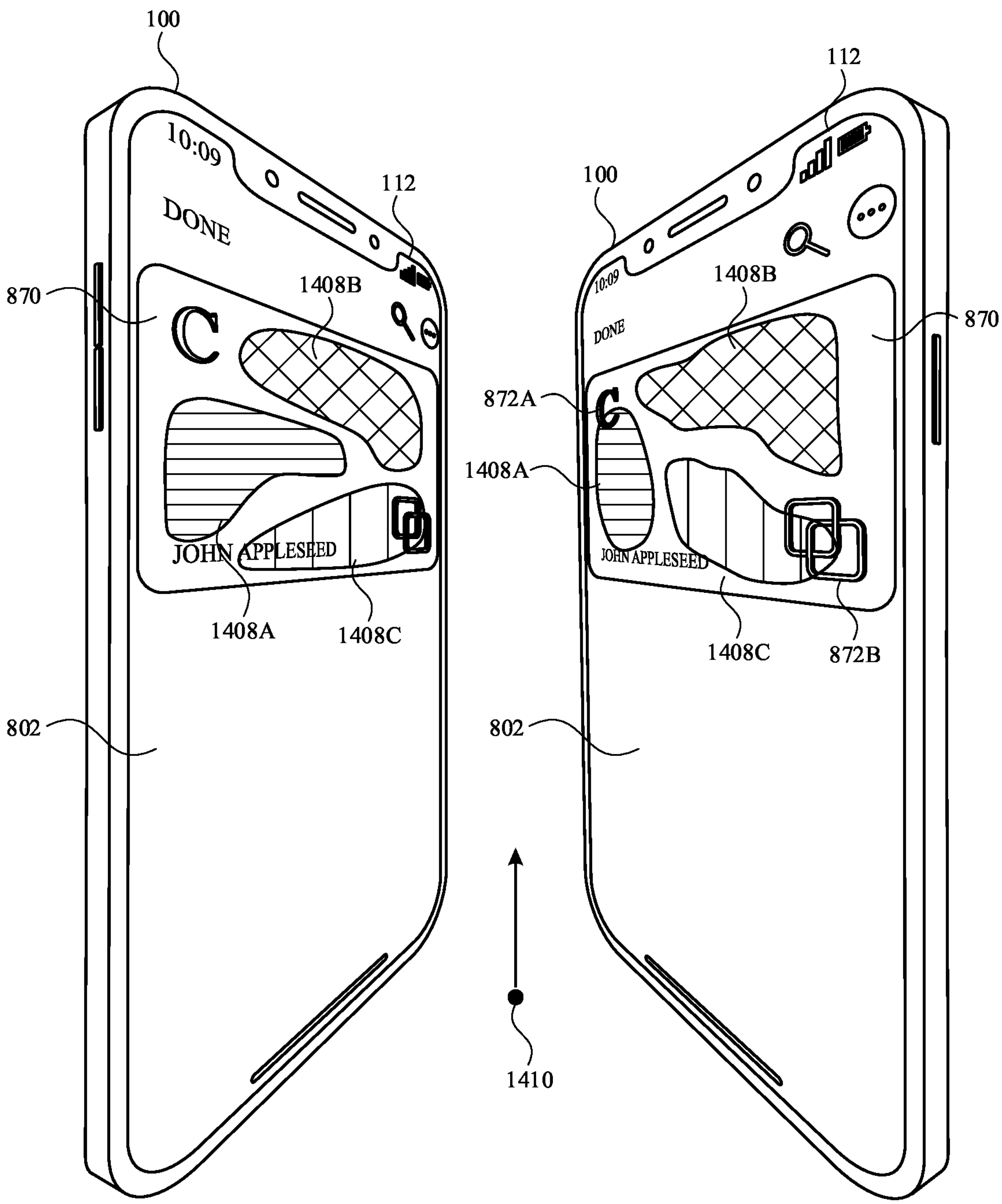

FIGS. 14T-14U illustrate electronic device 100 displaying, in user interface 802 of the transfer application (e.g., the electronic wallet application), which includes representation 870 of the transfer account (e.g., the first-party credit account; the points account), while display 112 of the electronic device is being viewed at two opposing angles relative to a reference point 1410. In some embodiments, representation 870 includes a first blob 1408A (e.g., a contiguous region) having the first common visual characteristic (e.g., a common color, a common color hue), where first blob 1408A corresponds to transfers (e.g., payment transactions, points transfers) of the first category made using the transfer account (e.g., the first-party credit account; the points account), a second blob 1408B (e.g., a contiguous region) having the second common visual characteristic (e.g., a common color, a common color hue), where second blob 1408B corresponds to transfers (e.g., payment transactions, points transfers) of the second category made using the transfer account, and a third blob 1408C (e.g., a contiguous region) having the third common visual characteristic (e.g., a common color, a common color hue), where third blob 1408A corresponds to transfers (e.g., payment transactions, points transfers) of the third category made using the transfer account.

As mentioned above, the blobs are different visual representations of the particles described above with reference to FIGS. 14A-14S—that is, electronic device 100 applies similar features and characteristics to blobs in representation 870 of the transfer account (e.g., the first-party credit account) as it would to particles in representation 870 of the transfer account. For example, in FIGS. 14T-14U, first blob 1408A corresponds to first plurality of particles 1406A, second blob 1408B corresponds to second plurality of particles 1406B, and third blob 1408C corresponds to third plurality of particles 1406C.

In FIG. 14T, while displaying representation 870 (either with blobs 1408A-1408C or plurality of particles 1406A-1406C) of the transfer account (e.g., the first-party credit account; the points account), electronic device 100 detects (e.g., using an accelerometer and/or a gyroscope of the device) a change in orientation of the device, and that the device is being viewed at a first angle (e.g., from reference point 1410). In some embodiments, in response to detecting the change in orientation (and that the device is being viewed at the first angle), electronic device 100 generates a holographic effect (e.g., a 3D effect, a depth effect, an engraving effect) on first visual indication 872A (e.g., a logo) of the first-party manufacturer of the electronic device and second visual indication 872B (e.g., a logo) of a party (e.g., an institution, a company) different from the first-party manufacturer that is also associated with the transfer account (e.g., the first-party credit account; the points account). In FIG. 14T, based on the magnitude of the first angle, electronic device 100 generates the holographic effect on visual indications 872A and 872B of representation 870 with a first magnitude. In some embodiments, the generated holographic effect provides the user with the visual effect that visual indications 872A and 872B are three-dimensional.

In some embodiments, the magnitude of the holographic effect changes in accordance with a change in orientation of electronic device 100. That is, in some embodiments, in accordance with a determination that the ordination of the device is getting increasingly extreme relative to a reference point (e.g., reference point 1410), electronic device 100 generates the holographic effect with a correspondingly increasing magnitude.

In FIG. 14U, while displaying representation 870 (either with blobs 1408A-1408C or plurality of particles 1406A-1406C) of the transfer account (e.g., the first-party credit account; the points account), electronic device 100 detects that the device is now being viewed at a second angle (e.g., from reference point 1410) that is greater than the first angle. In some embodiments, in response to detecting that device is being viewed at the second angle, electronic device 100 generates the holographic effect (e.g., a 3D effect, a depth effect, an engraving effect) on first visual indication 872A and second visual indication 872B with a second magnitude, where the second magnitude is greater than the first magnitude.

FIGS. 15A-15D are a flow diagram illustrating a method for providing visual feedback on a representation of a transfer account, in accordance with some embodiments. Method 1500 is performed at an electronic device (e.g., 100, 300, 500) with a display (e.g., 112). Some operations in method 1500 are, optionally, combined, the orders of some operations are, optionally, changed, and some operations are, optionally, omitted.

As described below, method 1500 provides an intuitive way for managing a transfer account. The method reduces the cognitive burden on a user for managing a transfer account, thereby creating a more efficient human-machine interface. For battery-operated computing devices, enabling a user to manage a transfer account faster and more efficiently conserves power and increases the time between battery charges.

The electronic device (e.g., 100) displays (1512), on the display (e.g., 112), a graphical representation (e.g., 704, 870; in the general shape of a card) of a transfer account (e.g., the transfer account as first described above with reference to FIGS. 8A-8V, such as a payment account, a virtual card account, a points account, a rewards account) that is associated with a plurality of transfers of a first type (e.g., transfers of a first particular type of category, where categories can include, for example, shopping, groceries, travel, dining) and a plurality of transfers of a second type (e.g., transfers of a second particular type of category).

In the graphical representation (e.g., 704, 870) of the transfer account, transfers of the first type are represented by a first set of one or more regions having a first color range (e.g., 704A, 1406A, 1408A; a first type of range of color of the same or similar hue), where the first set of one or more regions (e.g., a contiguous region) has a first shape (1514). In some embodiments, the first shape of the first set of one or more regions is controlled by a predetermined physics model (e.g., a model defining a simulated mass, friction, inertia, viscosity, adhesion, cohesion, magnetic or electrostatic attraction, and/or other simulated physical properties of the particles as well as how inputs at the device such as tilting of the device or touching the device affect the particles as a simulated force exerted on the particles, such as the force of gravity). Representing transfers of the first type with the first set of one or more regions having the first color range, where the first set of one or more regions has the first shape enables the user viewing the representation of the transfer account to quickly and easily recognize that the first set of one or more regions correspond to transfers of the first type. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In the graphical representation (e.g., 704, 870) of the transfer account, transfers of the second type are represented by a second set of one or more regions having a second color range (e.g., 704A, 1406B, 1408B; a second type of range of color of the same or similar hue) that is different from the first color range, where the second set of one or more regions (e.g., a contiguous region) has a second shape that is different from the first shape (1516). In some embodiments, the second shape of the second set of one or more regions is controlled by a predetermined physics model (e.g., a model defining a simulated mass, friction, inertia, viscosity, adhesion, cohesion, magnetic or electrostatic attraction, and/or other simulated physical properties of the particles as well as how inputs at the device such as tilting of the device or touching the device affect the particles as a simulated force exerted on the particles, such as the force of gravity). Representing transfers of the second type with the second set of one or more regions having the second color range that is different from the first color range, where the second set of one or more regions has the second shape different from the first shape enables the user viewing the representation of the transfer account to quickly and easily recognize that the second set of one or more regions correspond to transfers of the second type and not to transfers of the first type. Providing improved visual feedback to the user enhances the operability of the device and makes the user-device interface more efficient (e.g., by helping the user to provide proper inputs and reducing user mistakes when operating and/or interacting with the device) which, additionally, reduces power usage and improves battery life of the device by enabling the user to use the device more quickly and efficiently.

In some embodiments, prior to displaying the graphical representation (e.g., 704, 870) of the transfer account, the electronic device (e.g., 100) detects (1502) (e.g., via an input device) an input directed to displaying a user interface (e.g., 710, 802, 887) corresponding to the transfer account. In some embodiments, in response to detecting the input directed to displaying the user interface corresponding to the transfer account, the electronic device displays (1504), on the display (e.g., 112), the graphical representation of the transfer account with an animated effect that indicates transfer activity that occurred within a respective time period (e.g., in the last day, since the card was last displayed). Displaying the graphical representation of the transfer account with an animated effect that indicates transfer activity that occurred within a respective time period in response to detecting the input directed to displaying the user interface corresponding to the transfer account brings attention to the representation of the transfer account, thereby reminding the user of the transfer activity that occurred within the respective time period. Providing improved visual feedback to the user enhances the operability of the device and makes the user-device interface more efficient (e.g., by helping the user to provide proper inputs and reducing user mistakes when operating and/or interacting with the device) which, additionally, reduces power usage and improves battery life of the device by enabling the user to use the device more quickly and efficiently.

In some embodiments, the electronic device (e.g., 100) displaying the graphical representation (e.g., 704, 870) of the transfer account with an animated effect that indicates transfer activity that occurred within a respective time period (1504) includes, in accordance with a determination that one or more transfers of the first type and one or more transfers of the second type occurred within the respective time period, the electronic device emphasizing (1506) (e.g., increasing the size of one color range relative to another/other color range(s); increasing the brightness of one color range relative to another and/or other color range(s); within at least a predetermined portion of the graphical representation of the transfer account, replacing all color ranges with one of the color ranges) the first color range relative to other color ranges on the graphical representation of the transfer account, followed by emphasizing the second color range relative to other color ranges on the graphical representation of the transfer account prior to displaying the first set of one or more regions with the first color range and the second set of one or more regions with the second color range. In some embodiments, the user interface (e.g., 710, 802, 887) includes three or more sets of regions (e.g., 704C, 1406C, 1408C) that exhibit behavior similar to the behavior of the first set of one or more regions and the second set of one or more regions, where the different sets of regions have different colors (or ranges of colors) corresponding to different categories of transactions. In some embodiments, after emphasizing the second range relative to the other color ranges, the electronic device further emphasizes a third color range that corresponds to a third set of one or more regions (e.g., 704C, 1406C, 1408C) on the graphical representation of the transfer account prior to displaying the first set of one or more regions (e.g., 704A, 1406A, 1408A) with the first color range, the second set of one or more regions (e.g., 704B, 1406B, 1408B) with the second color range, and the third set of one or more regions with the third color range. Emphasizing the different color ranges (e.g., in order) displayed in the representation of the transfer account reminds and emphasizes to the user of the types of categories of transfers that have been made using the transfer account. Providing improved visual feedback to the user enhances the operability of the device and makes the user-device interface more efficient (e.g., by helping the user to provide proper inputs and reducing user mistakes when operating and/or interacting with the device) which, additionally, reduces power usage and improves battery life of the device by enabling the user to use the device more quickly and efficiently.

In some embodiments, the electronic device (e.g., 100) displaying the graphical representation (e.g., 704, 870) of the transfer account with an animated effect that indicates transfer activity that occurred within a respective time period (1504) includes, in accordance with a determination that one or more transfers of the first type occurred within the respective time period without and one or more transfers of the second type occurring within the respective time period, the electronic device emphasizing (1508) (e.g., increasing the size of one color range relative to another/other color range(s); increasing the brightness of one color range relative to another/other color range(s); within at least a predetermined portion of the graphical representation of the transfer account, replacing all color ranges with one of the color ranges) the first color range relative to other color ranges on the graphical representation of the transfer account without emphasizing the second color range relative to other color ranges on the graphical representation of the transfer account prior to displaying the first set of one or more regions (e.g., 704A, 1406A, 1408A) with the first color range and the second set of one or more regions (e.g., 704B, 1406B, 1408B) with the second color range. In some embodiments, the user interface includes three or more sets of regions (e.g., 704C, 1406C, 1408C) that exhibit behavior similar to the behavior of the first set of one or more regions and the second set of one or more regions, where the different sets of regions have different colors (or ranges of colors) corresponding to different categories of transactions. In some embodiments, the electronic device emphasizes the first color range relative to the other color ranges on the graphical representation of the transfer account without emphasizing any of the other color ranges on the graphical representation that correspond to the second set or one or more regions or any of the three or more sets of regions prior to displaying the first set of one or more regions with the first color range, the second set of one or more regions with the second color range, and the three or more sets of regions with different color ranges that are different from the first color range and the second color range.

In some embodiments, the electronic device (e.g., 100) displaying the graphical representation (e.g., 704, 870) of the transfer account with an animated effect that indicates transfer activity that occurred within a respective time period (1504) includes, in accordance with a determination that one or more transfers of the second type occurred within the respective time period without and one or more transfers of the first type occurring within the respective time period, the electronic device emphasizing (1510) (e.g., increasing the size of one color range relative to another/other color range(s); increasing the brightness of one color range relative to another/other color range(s); within at least a predetermined portion of the graphical representation of the transfer account, replacing all color ranges with one of the color ranges) the second color range relative to other color ranges on the graphical representation of the transfer account without emphasizing the first color range relative to other color ranges on the graphical representation of the transfer account prior to displaying the first set of one or more regions (e.g., 704A, 1406A, 1408A) with the first color range and the second set of one or more regions (e.g., 704B, 1406B, 1408B) with the second color range. In some embodiments, the user interface includes three or more sets of regions (e.g., 704C, 1406C, 1408C) that exhibit behavior similar to the behavior of the first set of one or more regions and the second set of one or more regions, where the different sets of regions have different colors (or ranges of colors) corresponding to different categories of transactions. In some embodiments, the electronic device emphasizes the second color range relative to the other color ranges on the graphical representation of the transfer account without emphasizing any of the other color ranges on the graphical representation that correspond to the first set or one or more regions or any of the three or more sets of regions prior to displaying the first set of one or more regions with the first color range, the second set of one or more regions with the second color range, and the three or more sets of regions with different color ranges that are different from the first color range and the second color range.

In some embodiments (e.g., while displaying the graphical representation (e.g., 704, 870) of the transfer account), the electronic device (e.g., 100) detects a transfer (e.g., a near-field communication (NFC)-based transaction with a transaction terminal) of the first type made using the transaction account. In some embodiments, subsequent to (or in response to) detecting the transfer, the electronic device displays, on the display (e.g., 112), the graphical representation of the transfer account with an animated effect that indicates transfer activity that occurred within a respective time period (e.g., in the last day, since the card was last displayed), including emphasizing (e.g., increasing the size of one color range relative to another/other color range(s); increasing the brightness of one color range relative to another/other color range(s); within at least a predetermined portion of the graphical representation of the transfer account, replacing all color ranges with one of the color ranges) the first color range relative to other color ranges on the graphical representation of the transfer account without emphasizing the second color range relative to other color ranges on the graphical representation of the transfer account (e.g., emphasizing the first color range with a "splash" of the first color range but not of the other color ranges). Emphasizing the first color range relative to other color ranges on the graphical representation of the transfer account without emphasizing the second color range relative to other color ranges on the graphical representation of the transfer account subsequent to (or in response to) detecting the transfer enables the user to quickly and easily recognize that the transfer was of the first category corresponding to the first color range. Providing improved visual feedback to the user enhances the operability of the device and makes the user-device interface more efficient (e.g., by helping the user to provide proper inputs and reducing user mistakes when operating and/or interacting with the device) which, additionally, reduces power usage and improves battery life of the device by enabling the user to use the device more quickly and efficiently. Further, emphasizing the first color range relative to other color ranges on the graphical representation of the transfer account without emphasizing the second color range relative to other color ranges on the graphical representation of the transfer account subsequent to (or in response to) detecting the transfer improves security by enabling the user to quickly and easily confirm whether a correct transfer was made. Enhancing security features of the device enhances the operability of the device by making the device more secure, which in turn enables the user to use the device more efficiently and frequently.

In some embodiments, the electronic device (e.g., 100) displaying the graphical representation (e.g., 704, 870) of the transfer account includes the electronic device displaying the graphical representation of the transfer account with an animated effect that indicates transfer activity that occurred (e.g., within a respective time period (e.g., in the last day, since the card was last displayed)) on the transfer account. Displaying the graphical representation of the transfer account with an animated effect that indicates transfer activity that occurred on the transfer account reminds and emphasizes to the user that a transfer activity has occurred on the transfer account. Providing improved visual feedback to the user enhances the operability of the device and makes the user-device interface more efficient (e.g., by helping the user to provide proper inputs and reducing user mistakes when operating and/or interacting with the device) which, additionally, reduces power usage and improves battery life of the device by enabling the user to use the device more quickly and efficiently. Further, displaying the graphical representation of the transfer account with an animated effect that indicates transfer activity that occurred on the transfer account improves security by enabling the user to quickly react if the activity was not authorized by the user. Enhancing security features of the device enhances the operability of the device by making the device more secure, which in turn enables the user to use the device more efficiently and frequently.

In some embodiments, the electronic device (e.g., 100) displaying the graphical representation (e.g., 704, 870) of the transfer account with an animated effect that indicates transfer activity that occurred (e.g., within a respective time period (e.g., in the last day, since the card was last displayed)) on the transfer account includes, in accordance with a determination that one or more transfers of the first type and one or more transfers of the second type have occurred (e.g., within the respective time period), the electronic device emphasizing (e.g., increasing the size of one color range relative to another/other color range(s); increasing the brightness of one color range relative to another/other color range(s); within at least a predetermined portion of the graphical representation of the transfer account, replacing all color ranges with one of the color ranges) the first color range relative to other color ranges on the graphical representation of the transfer account, followed by emphasizing the second color range relative to other color ranges on the graphical representation of the transfer account.

In some embodiments, the electronic device (e.g., 100) displaying the graphical representation (e.g., 704, 870) of the transfer account with an animated effect that indicates transfer activity that occurred (e.g., within a respective time period (e.g., in the last day, since the card was last displayed)) on the transfer account includes, in accordance with a determination that the one or more transfers of the first type have occurred (e.g., within the respective time period) and the one or more transfers of the second type have not occurred (e.g., within the respective time period), the electronic device emphasizing (e.g., increasing the size of one color range relative to another/other color range(s); increasing the brightness of one color range relative to another/other color range(s); within at least a predetermined portion of the graphical representation of the transfer account, replacing all color ranges with one of the color ranges) the first color range relative to other color ranges on the graphical representation of the transfer account without emphasizing the second color range relative to other color ranges on the graphical representation of the transfer account.

In some embodiments, the electronic device (e.g., 100) displaying the graphical representation (e.g., 704, 870) of the transfer account with an animated effect that indicates transfer activity that occurred (e.g., within a respective time period (e.g., in the last day, since the card was last displayed)) on the transfer account includes, in accordance with a determination that the one or more transfers of the second type occurred (e.g., within the respective time period) and the one or more transfers of the first type have not occurred (e.g., within the respective time period), the electronic device emphasizing (e.g., increasing the size of one color range relative to another/other color range(s); increasing the brightness of one color range relative to another/other color range(s); within at least a predetermined portion of the graphical representation of the transfer account, replacing all color ranges with one of the color ranges) the second color range relative to other color ranges on the graphical representation of the transfer account without emphasizing the first color range relative to other color ranges on the graphical representation of the transfer account.

In some embodiments, the electronic device (e.g., 100) emphasizing the first color range relative to other color ranges on the graphical representation (e.g., 704, 870) of the transfer account, followed by emphasizing the second color range relative to other color ranges on the graphical representation of the transfer account further includes the electronic device emphasizing the first color range relative to other color ranges on the graphical representation of the transfer account, followed by de-emphasizing all of the color ranges, including the first color range, on the graphical representation of the transfer account (e.g., by removing display of all of the color ranges for a brief period of time; by replacing display of all of the color ranges with a neutral color (e.g., white) for a brief period of time; by displaying a flash of a neutral color (e.g., white) for a brief period of time), followed by emphasizing the second color range relative to other color ranges on the graphical representation of the transfer account.

In some embodiments, the electronic device (e.g., 100) displays (1518), on the display (e.g., 112), the graphical representation (e.g., 704, 870) of the transfer account, where the graphical representation of the transfer account further includes a (e.g., stationary, unmoving) graphical element. In some embodiments, while displaying the graphical element, the electronic device displays (1520), on the graphical element, a holographic effect (e.g., a dynamic 3D effect that changes on the graphical element based on a viewing angle of a user of the electronic device). In some embodiments, the electronic device displays the holographic effect in response to detecting the input (e.g., a tilting of the electronic device) directed to the graphical representation of the transfer account. In some embodiments, unlike the sets of regions, however, the position of the graphical elements displaying the holographic effect is not changed in response to detecting the input directed to the graphical representation of the transfer account. Displaying the holographic effect on the graphical element of the representation of the transfer account enables the user to quickly and easily recognize that the displayed representation corresponds to unique type of transfer account (e.g., a first-party transfer account that is issued by or branded by the manufacturer of the electronic device). Providing improved visual feedback to the user enhances the operability of the device and makes the user-device interface more efficient (e.g., by helping the user to provide proper inputs and reducing user mistakes when operating and/or interacting with the device) which, additionally, reduces power usage and improves battery life of the device by enabling the user to use the device more quickly and efficiently.

While displaying the graphical representation of the transfer account, the electronic device (e.g., 100) detects (1518) an input directed to the graphical representation (e.g., 704, 870) of the transfer account (e.g., an input causing a movement and/or change in orientation of the device while the device is displaying the graphical representation of the transfer account; an input on or selection of the graphical representation of the transfer account), where the input has an associated direction.

In response to detecting the input directed to the graphical representation of the transfer account (1520), the electronic device (e.g., 100) changes (1522) a shape and position of the first set of one or more regions based on the direction of the input (e.g., the direction of the input causing a movement and/or change in orientation of the device in a corresponding direction) from the first shape to a third shape that is different from the first shape and the second shape. In some embodiments, the change in shape from the first shape to the third shape comprises a distortion of the shape of at least a portion of the first set of one or more regions (e.g., based on a physics model adjusting a position of one or more particles that determine the shape of the first set of one or more regions). Changing the shape and position of the first set of one or more regions based on the direction of the input from the first shape to a third shape that is different from the first shape and the second shape attracts the user's attention, thereby reminding the user of the transfers of the type or category corresponding to the first set of one or more regions that have been made using the transfer account. Providing improved visual feedback to the user enhances the operability of the device and makes the user-device interface more efficient (e.g., by helping the user to provide proper inputs and reducing user mistakes when operating and/or interacting with the device) which, additionally, reduces power usage and improves battery life of the device by enabling the user to use the device more quickly and efficiently. Further, changing the shape and position of the first set of one or more regions based on the direction of the input from the first shape to a third shape that is different from the first shape and the second shape visually provides the user with information about the user's spending behavior (e.g., spending of funds, spending of points) while preserving the user's privacy by not revealing, in the graphical representation of the transfer account, specific details about the spending behavior (e.g., the timing or absolute magnitude of the spending activity, the identity of the corresponding transfer categories). Providing improved visual feedback to the user enhances the operability of the device and makes the user-device interface more efficient (e.g., by helping the user to provide proper inputs and reducing user mistakes when operating and/or interacting with the device) which, additionally, reduces power usage and improves battery life of the device by enabling the user to use the device more quickly and efficiently.

In response to detecting the input directed to the graphical representation of the transfer account (1520), the electronic device (e.g., 100) changes (1524) a shape and position of the second set of one or more regions based on the direction of the input from the second shape to a fourth shape that is different from the first shape, the second shape, and the third shape. In some embodiments, the change in shape from the second shape to the fourth shape comprises a distortion of the shape of at least a portion of the second set of one or more regions. In some embodiments, the color range (or hue) of the first set of one or more regions and the second set of one or more regions are maintained despite to detecting the input directed to the graphical representation of the transfer account. Changing the shape and position of the second set of one or more regions based on the direction of the input from the second shape to a fourth shape that is different from the first shape and the third shape attracts the user's attention, thereby reminding the user of the transfers of the type or category corresponding to the second set of one or more regions that have been made using the transfer account. Providing improved visual feedback to the user enhances the operability of the device and makes the user-device interface more efficient (e.g., by helping the user to provide proper inputs and reducing user mistakes when operating and/or interacting with the device) which, additionally, reduces power usage and improves battery life of the device by enabling the user to use the device more quickly and efficiently. Further, changing the shape and position of the second set of one or more regions based on the direction of the input from the second shape to a fourth shape that is different from the first shape and the third shape visually provides the user with information about the user's spending behavior (e.g., spending of funds, spending of points) while preserving the user's privacy by not revealing, in the graphical representation of the transfer account, specific details about the spending behavior (e.g., the timing or absolute magnitude of the spending activity, the identity of the corresponding transfer categories). Providing improved visual feedback to the user enhances the operability of the device and makes the user-device interface more efficient (e.g., by helping the user to provide proper inputs and reducing user mistakes when operating and/or interacting with the device) which, additionally, reduces power usage and improves battery life of the device by enabling the user to use the device more quickly and efficiently.

In some embodiments, the user interface (e.g., showing representation 704; showing representation 870) includes three or more sets of regions that exhibit behavior similar to the behavior of the first set of one or more regions (e.g., 704A, 1406A, 1408A) and the second set of one or more regions (e.g., 704B, 1406B, 1408B), where the different sets of regions have different colors (or ranges of colors) corresponding to different categories of transactions.

In some embodiments, after detecting the input directed to the graphical representation (e.g., 704, 870) of the transfer account (1526), while displaying the graphical representation of the transfer account, the electronic device (e.g., 100) detects (1528) a second input directed to the graphical representation of the transfer account (e.g., an input causing a movement and/or change in orientation of the device while the device is displaying the graphical representation of the transfer account; an input on or selection of the graphical representation of the transfer account), where the second input has an associated direction. In some embodiments, in response to detecting the second input directed to the graphical representation of the transfer account (1530), the electronic device changes (1532) the shape and position of the first set of one or more regions (e.g., 704A, 1406A, 1408A) based on the direction of the second input (e.g., the direction of the input causing a movement and/or change in orientation of the device in a corresponding direction) from the third shape to a fifth shape that is different from the first shape, the second shape, the third shape, and the fourth shape. In some embodiments, the change in shape from the third shape to the fifth shape comprises a distortion of the shape of at least a portion of the first set of one or more regions. In some embodiments, in response to detecting the second input directed to the graphical representation of the transfer account (1530), the electronic device changes (1534) the shape and position of the second set of one or more regions (e.g., 704B, 1406B, 1408B) based on the direction of the input from the fourth shape to a sixth shape that is different from the first shape, the second shape, the third shape, the fourth shape, and the fifth shape. In some embodiments, the change in shape from the fourth shape to the sixth shape comprises a distortion of the shape of at least a portion of the second set of one or more regions.

In some embodiments, changing the shape and position of the first set of one or more regions based on the direction of the input includes combining a first region and a second region of the first set of one or more regions (e.g., 704A, 1406A, 1408A) into a single region of the first set of one or more regions (e.g., such that the single region now acts as one region that moves in the same direction/amount, instead of as two separate, distinct regions) in response to the input.

In some embodiments, changing the shape and position of the first set of one or more regions based on the direction of the input includes splitting a first region of the first set of one or more regions (e.g., 704A, 1406A, 1408A) into a second region and a third region of the first set of one or more regions (e.g., such that the second region and the third region now act as two separate, distinct regions that can move in different directions/amounts) in response to the input.

In some embodiments, changing the shape and position of the first set of one or more regions (e.g., 704A, 1406A, 1408A) based on the direction of the input directed to the graphical representation of the transfer account and changing the shape and position of the second set of one or more regions based on the direction of the input directed to the graphical representation of the transfer account are based on a physics model (e.g., a physics model that simulates gravitational pull on the one or more regions).

In some embodiments, changing the shape and position of the first set of one or more regions (e.g., 704A, 1406A, 1408A) based on the direction of the input and changing the shape and position of the second set of one or more regions (e.g., 704A, 1406B, 1408B) based on the direction of the input includes moving the first set of one or more regions and the second set of one or more regions in a substantially similar direction within the graphical representation (e.g., 704, 870) of the transfer account. That is, in some embodiments, both the first set of one or more regions and the second set of one or more regions move around the graphical representation of the transfer account in substantially similar directions based on the direction of the input and/or changes in the direction of the input. In some embodiments, all the sets (first, second, third) of one or more regions within the graphical representation of the transfer account share an axis along which the majority of the movement of the sets occurs in response to the input, and the axis is (optionally) based on the direction associated with the input. In some embodiments, the user interface includes three or more sets of regions that exhibit behavior similar to the behavior of the first set of one or more regions and the second set of one or more regions, where the different sets of regions have different colors (or ranges of colors) corresponding to different categories of transactions. In some embodiments, the shape and position of each of the three or more sets of regions also change based on the direction of the input. In some embodiments, the three or more sets of regions also move in the substantially similar direction within the graphical representation of the transfer account as the first set of one or more regions and the second set of one or more regions.

In some embodiments, during a first time period, the first set of one or more regions (e.g., 704A, 1406A, 1408A) and the second set of one or more regions (e.g., 704B, 1406B, 1408B) at least partially overlap (e.g., at certain times or moments) within the graphical representation (e.g., 704, 870) of the transfer account. In some embodiments, the user interface includes three or more sets of regions that exhibit behavior similar to the behavior of the first set of one or more regions and the second set of one or more regions, where the different sets of regions have different colors (or ranges of colors) corresponding to different categories of transactions. In some embodiments, one or more of the three or more sets of regions also at least partially overlap with the first set of one or more regions and/or the second set of one or more regions.

In some embodiments, during a second time period, the first set of one or more regions (e.g., 704A, 1406A, 1408A) and the second set of one or more regions (e.g., 704B, 1406B, 1408B) do not overlap within the graphical representation (e.g., 704, 870) of the transfer account (e.g., such that there is always a boundary of a neutral color, such as white, between the two different regions). In some embodiments, the user interface (e.g., showing representation 704; showing representation 870) includes three or more sets of regions that exhibit behavior similar to the behavior of the first set of one or more regions and the second set of one or more regions, where the different sets of regions have different colors (or ranges of colors) corresponding to different categories of transactions. In some embodiments, each of the three or more sets of regions also do not overlap with the first set of one or more regions and the second set of one or more regions.

In some embodiments, a size of the first set of one or more regions (e.g., 704A, 1406A, 1408A) is at least partially based on a transfer amount corresponding to transfers of the first type (e.g., based on a total balance corresponding to transfers of the first type; based on a transfer quantity and/or number of transfers corresponding to transfers of the first type). Basing (at least partially) the size of the first set of one or more regions on the transfer amount corresponding to transfers of the first type enables the user to quickly and easily recognize the number and/or amount of transfers of the first type that have been made using the transfer account (e.g., for a certain period of time). Providing improved visual feedback to the user enhances the operability of the device and makes the user-device interface more efficient (e.g., by helping the user to provide proper inputs and reducing user mistakes when operating and/or interacting with the device) which, additionally, reduces power usage and improves battery life of the device by enabling the user to use the device more quickly and efficiently. Further, basing (at least partially) the size of the first set of one or more regions on the transfer amount corresponding to transfers of the first type visually provides the user with information about the user's spending behavior (e.g., the amount of funds spent, the amount of points spent) while preserving the user's privacy by not revealing, in the graphical representation of the transfer account, specific details about the spending behavior (e.g., the timing or absolute magnitude of the spending activity, the identity of the corresponding transfer categories). Providing improved visual feedback to the user enhances the operability of the device and makes the user-device interface more efficient (e.g., by helping the user to provide proper inputs and reducing user mistakes when operating and/or interacting with the device) which, additionally, reduces power usage and improves battery life of the device by enabling the user to use the device more quickly and efficiently.

In some embodiments, the transfers of the first type correspond to transfers of the first type during a certain time period (e.g., the current week, the current month, the current statement period). In some embodiments, the size of the second set of one or more regions (e.g., 704B, 1406B, 1408B) is at least partially based on a transfer amount corresponding to transfers of a second type different from the first type (e.g., based on a total balance corresponding to transfers of the second type; based on a transfer quantity and/or number of transfers corresponding to transfers of the second type). Basing (at least partially) the size of the second set of one or more regions on the transfer amount corresponding to transfers of the second type enables the user to quickly and easily recognize the number and/or amount of transfers of the second type that have been made using the transfer account (e.g., for a certain period of time). Providing improved visual feedback to the user enhances the operability of the device and makes the user-device interface more efficient (e.g., by helping the user to provide proper inputs and reducing user mistakes when operating and/or interacting with the device) which, additionally, reduces power usage and improves battery life of the device by enabling the user to use the device more quickly and efficiently. Further, basing (at least partially) the size of the second set of one or more regions on the transfer amount corresponding to transfers of the second type visually provides the user with information about the user's spending behavior (e.g., the amount of funds spent, the amount of points spent) while preserving the user's privacy by not revealing, in the graphical representation of the transfer account, specific details about the spending behavior (e.g., the timing or absolute magnitude of the spending activity, the identity of the corresponding transfer categories). Providing improved visual feedback to the user enhances the operability of the device and makes the user-device interface more efficient (e.g., by helping the user to provide proper inputs and reducing user mistakes when operating and/or interacting with the device) which, additionally, reduces power usage and improves battery life of the device by enabling the user to use the device more quickly and efficiently.

Thus, in some embodiments, if the transfer amount (e.g., total balance) corresponding to transfers of the second type is greater than the transfer amount corresponding to transfers of the first type, then the size of the second set of one or more regions is greater than the size of the first set of one or more regions (e.g., 704A, 1406A, 1408A). Conversely, in some embodiments, if the transfer amount (e.g., total balance) corresponding to transfers of the second type is smaller than the transfer amount corresponding to transfers of the first type, then the size of the second set of one or more regions is smaller than the size of the first set of one or more regions. In some embodiments, the user interface includes three or more sets of regions that exhibit behavior similar to the behavior of the first set of one or more regions and the second set of one or more regions, where the different sets of regions have different colors (or ranges of colors) corresponding to different categories of transactions. In some embodiments, the size of each of the three or more sets of regions are at least partially based on the transfer amount corresponding to transfers of respective different types that are different from the first type and from the second type.

In some embodiments, the electronic device (e.g., 100) displaying, on the display (e.g., 112), the graphical representation (e.g., 704, 870) of the transfer account comprises the electronic device (e.g., initially) removing display of the first set of one or more regions (e.g., 704A, 1406A, 1408A) and the second set of one or more regions (e.g., 704B, 1406B, 1408B) from the graphical representation of the transfer account, and subsequent to (e.g., a predefined amount of time after, a short period after; in response to) removing display of the first set of one or more regions and the second set of one or more regions in the graphical representation of the transfer account, the re-displaying the first set of one or more regions and the second set of one or more regions in the graphical representation of the transfer account, and displaying the third set of one or more regions (e.g., 704C, 1406C, 1408C) in the graphical representation of the transfer account.

In some embodiments, the electronic device (e.g., 100) detects (1542) that at least a portion of the plurality of transfers of the first type are no longer associated with (e.g., pending in) the transfer account (e.g., because at least some transactions of the first type that were made using the transfer account have been paid off). In some embodiments, subsequent to (or in response to) detecting that at least a portion of the plurality of transfers of the first type are no longer associated with (e.g., pending in) the transfer account (1544), the electronic device displays (1546), on the display, the graphical representation (e.g., 704, 870) of the transfer account with a reduced amount area occupied by the first set of one or more regions (e.g., 704A, 1406A, 1408A) from the graphical representation of the transfer account. Displaying the graphical representation of the transfer account with the reduced amount area occupied by the first set of one or more regions in response to detecting that at least a portion of the plurality of transfers of the first type are no longer associated with the transfer account allows the user to quickly and easily recognize that a previous balance transfer was successful, and recognize the remaining amount of balance on the transfer account. Providing improved visual feedback to the user enhances the operability of the device and makes the user-device interface more efficient (e.g., by helping the user to provide proper inputs and reducing user mistakes when operating and/or interacting with the device) which, additionally, reduces power usage and improves battery life of the device by enabling the user to use the device more quickly and efficiently.

In some embodiments, if all of the plurality of transfers of the first type are no longer associated with (e.g., pending in) the transfer account (e.g., because all of the transactions of the first type that were made using the transfer account have been paid off), the electronic device (e.g., 100) removes display of all of the first set of one or more regions (e.g., 704A, 1406A, 1408A) from the graphical representation (e.g., 704, 870) of the transfer account and does not display regions using the first color range. Removing display of all of the first set of one or more regions from the graphical representation of the transfer account if all of the plurality of transfers of the first type are no longer associated with the transfer account enables the user to quickly and easily recognize that a previous balance transfer was successful, and that the transfer account no longer includes a balance corresponding to transfers of the first type. Providing improved visual feedback to the user enhances the operability of the device and makes the user-device interface more efficient (e.g., by helping the user to provide proper inputs and reducing user mistakes when operating and/or interacting with the device) which, additionally, reduces power usage and improves battery life of the device by enabling the user to use the device more quickly and efficiently. In some embodiments, if at least a portion of the plurality of transfers of the second type are still associated with the transfer account, the electronic device maintains display of at least a portion of the second set of one or more regions within the graphical representation of the transfer account.

In some embodiments, the electronic device (e.g., 100) displaying, on the display (e.g., 112), the graphical representation (e.g., 704, 870) of the transfer account with a reduced amount area occupied by the first set of one or more regions (e.g., 704A, 1406A, 1408A) from the graphical representation of the transfer account includes the electronic device displaying an animation of a first region of the first set of one or more regions moving out of the graphical representation of the transfer account (e.g., no longer displayed) and, subsequently (e.g., a short period after), displaying an animation of a second region of the first set of one or more regions moving out of the graphical representation of the transfer account. In some embodiments, moving a particular region off of the graphical representation of the transfer account comprises growing, expanding, and/or dispersing the region (e.g., in a circular shape) out of the graphical representation of the transfer account.

In some embodiments, the electronic device (e.g., 100) detects (1536) a transfer of a third type different from the first type and the second type (e.g., where the transfer of the third type is an initial transfer of the third type, and there are no other transfers included in the current balance of the transfer account of the third type). In some embodiments, subsequent to (or in response to) detecting the transfer of the third type (1538), the electronic device displays (1540), on the display, the graphical representation (e.g., 704, 870) of the transfer account, where the graphical representation of the transfer account includes a third set of one or more regions (e.g., 704C, 1406C, 1408C) representing the transfer of the third type, where the third set of one or more regions has a third color range (e.g., a third type of range of color of the same or similar hue) that is different from the first color range and the second color range (e.g., the third color range does not overlap with the second or third color ranges) representing the transfer of the third type and a third shape (e.g., a contiguous region) that is different from the first shape and the second shape. In some embodiments, the first shape and/or the second shape are fluid (non-static, non-permanent) shapes that change (e.g., shift, transform) over time (e.g., to an extent that the core shape of outline (e.g., circular) is still maintained). Displaying, in the graphical representation of the transfer account, the third set of one or more regions representing the transfer of the third type, where the third set of one or more regions has a third color range that is different from the first color range and the second color range representing the transfer of the third type and a third shape that is different from the first shape and the second shape enables the user to quickly and easily recognize the types or categories of transfers that have been made using the transfer account. Providing improved visual feedback to the user enhances the operability of the device and makes the user-device interface more efficient (e.g., by helping the user to provide proper inputs and reducing user mistakes when operating and/or interacting with the device) which, additionally, reduces power usage and improves battery life of the device by enabling the user to use the device more quickly and efficiently. Further, displaying, in the graphical representation of the transfer account, the third set of one or more regions representing the transfer of the third type, where the third set of one or more regions has a third color range that is different from the first color range and the second color range representing the transfer of the third type and a third shape that is different from the first shape and the second shape visually provides the user with information about the user's spending behavior (e.g., spending of funds, spending of points) while preserving the user's privacy by not revealing, in the graphical representation of the transfer account, specific details about the spending behavior (e.g., the timing or absolute magnitude of the spending activity, the identity of the corresponding transfer categories). Providing improved visual feedback to the user enhances the operability of the device and makes the user-device interface more efficient (e.g., by helping the user to provide proper inputs and reducing user mistakes when operating and/or interacting with the device) which, additionally, reduces power usage and improves battery life of the device by enabling the user to use the device more quickly and efficiently.

In some embodiments, the transfer account is further associated with a plurality of transfers of a third type (e.g., transfers of a third particular type of category). In some embodiments, in the graphical representation (e.g., 704, 870) of the transfer account, transfers of the third type are represented by a third set of one or more regions (e.g., 704C, 1406C, 1408C) having a third color range that is different from the first color range and the second color range, where the third set of one or more regions has a third shape that is different from the first shape and the second shape. In some embodiments, the third set of one or more regions exhibit behavior similar to the behavior of the first set of one or more regions and the second set of one or more regions (e.g., as described above). In some embodiments, the user interface includes four or more sets of regions that exhibit behavior similar to the behavior of the first set of one or more regions and the second set of one or more regions described in detail above, where the different sets of regions have different colors (or ranges of colors) corresponding to different categories of transactions. Displaying the third set of one or more regions in addition to the first set of one or more regions and the second set of one or more regions in the graphical representation of the transfer account provides the user with more visual and/or animated information about transfer activity on the transfer account. Providing improved visual feedback to the user enhances the operability of the device and makes the user-device interface more efficient (e.g., by helping the user to provide proper inputs and reducing user mistakes when operating and/or interacting with the device) which, additionally, reduces power usage and improves battery life of the device by enabling the user to use the device more quickly and efficiently. Further, displaying the third set of one or more regions in addition to the first set of one or more regions and the second set of one or more regions in the graphical representation of the transfer account visually provides the user with information about the user's spending behavior (e.g., spending of funds, spending of points) while preserving the user's privacy by not revealing, in the graphical representation of the transfer account, specific details about the spending behavior (e.g., the timing or absolute magnitude of the spending activity, the identity of the corresponding transfer categories). Providing improved visual feedback to the user enhances the operability of the device and makes the user-device interface more efficient (e.g., by helping the user to provide proper inputs and reducing user mistakes when operating and/or interacting with the device) which, additionally, reduces power usage and improves battery life of the device by enabling the user to use the device more quickly and efficiently.

Note that details of the processes described above with respect to method 1500 (e.g., FIGS. 15A-15D) are also applicable in an analogous manner to the methods described above and below. For example, method 900 optionally includes one or more of the characteristics of the various methods described above with reference to method 1500. For example, a representation of the transfer account activated in method 900 can include, when displayed on the electronic device, the visual effect and/or feedback described in method 1500. For another example, method 1200 optionally includes one or more of the characteristics of the various methods described above with reference to method 1500. For example, the summary user interface described in method 1200 can include a representation of the transfer account with the visual effect/feedback described in method 1500. For another example, method 1800 optionally includes one or more of the characteristics of the various methods described above with reference to method 1500. For example, the transfer categories that are tracked as described in method 1800 can be included in the visual effect and/or feedback displayed on the representation of the transfer account as described in method 1500. For another example, method 2100 optionally includes one or more of the characteristics of the various methods described above with reference to method 1500. For example, performing a successful balance transfer using the balance transfer user interface described in method 2100 can cause corresponding changes in the visual effect and/or feedback provided on the representation of the transfer account described in method 1500. For another example, method 2400 optionally includes one or more of the characteristics of the various methods described above with reference to method 1500. For example, performing a transfer using the authentication credential described in method 2400 can cause corresponding changes in the visual effect and/or feedback on the representation of the transfer account described in method 1500. For another example, method 2700 optionally includes one or more of the characteristics of the various methods described above with reference to method 1500. For example, performing a transfer using the physical account object activated in method 2700 can cause corresponding changes in the visual effect and/or feedback on the representation of the transfer account described in method 1500. For another example, method 3000 optionally includes one or more of the characteristics of the various methods described above with reference to method 1500. For example, performing a successful balance transfer using the balance transfer user interface element described in method 3000 can cause corresponding changes in the visual effect and/or feedback provided on the representation of the transfer account described in method 1500. For brevity, these details are not repeated below.

FIG. 15E is a flow diagram illustrating a method for providing visual feedback on a representation of a user account, in accordance with some embodiments. Method 1501 is performed at an electronic device (e.g., 100, 300, 500) with a display (e.g., 112). Some operations in method 1501 are, optionally, combined, the orders of some operations are, optionally, changed, and some operations are, optionally, omitted.

As described below, method 1501 provides an intuitive way for managing a user account. The method reduces the cognitive burden on a user for managing a user account, thereby creating a more efficient human-machine interface. For battery-operated computing devices, enabling a user to manage a user account faster and more efficiently conserves power and increases the time between battery charges.

The electronic device (e.g., 100) displays (1512, 1503), on the display (e.g., 112), a graphical representation (e.g., 704) of a user account that is associated with an activity of a first type and an activity of a second type. In the graphical representation (e.g., 704) of the user account, the activity of the first type is represented by a first set of one or more regions (e.g., 704A) having a first color range, where the first set of one or more regions has a first shape (1514, 1505). In the graphical representation (e.g., 704) of the user account, the activity of the second type is represented by a second set of one or more regions (e.g., 704B) having a second color range that is different from the first color range, where the second set of one or more regions has a second shape that is different from the first shape (1516, 1507).

While displaying the graphical representation (e.g., 704) of the user account, the electronic device (e.g., 100) detects (1518, 1509) an input directed to the graphical representation of the user account, where the input has an associated direction.

In response to detecting the input directed to the graphical representation (e.g., 704) of the user account (1520, 1511), the electronic device (e.g., 100) changes (1522, 1513) a shape and position of the first set of one or more regions (e.g., 704A) based on the direction of the input from the first shape to a third shape that is different from the first shape and the second shape.

In response to detecting the input directed to the graphical representation (e.g., 704) of the user account (1520, 1511), the electronic device (e.g., 100) changes (1524, 1515) a shape and position of the second set of one or more regions (e.g., 704B) based on the direction of the input from the second shape to a fourth shape that is different from the first shape, the second shape, and the third shape.

In some embodiments, the user account corresponds to a computer storage account. In some embodiments, using the user account includes requesting storage of data onto available computer storage resources (e.g., an available MB or GB amount of computer resources) associated with the computer storage account.

In some embodiments, the activity of the first type corresponds to using the computer storage account to request storage of a first type of data (e.g., media-related data) onto the available computer storage resources associated with the computer storage account. In some embodiments, the activity of the second type corresponds to using the computer storage account to request storage of a second type of data (e.g., documents-related data) onto the available computer storage resources associated with the computer storage account.

In some embodiments, the user account corresponds to a financial account. In some embodiments, using the user account includes making purchases based on financial resources (e.g., credit or money) associated with the financial account.

In some embodiments, the activity of the first type corresponds to using the financial account to make a first type of purchase (e.g., a purchase of a particular category, such as travel) based on the financial resources associated with the financial account. In some embodiments, the activity of the second type corresponds to using the financial account to make a second type of purchase (e.g., a purchase of a different category, such as groceries) based on the financial resources associated with the financial account.

In some embodiments, the user account is a transfer account, and the technique described with respect to FIG. 15E includes some or all aspects of the technique described above with respect to FIGS. 15A-15D.

FIGS. 16A-16B illustrate exemplary user interfaces for managing the tracking of a usage category, in accordance with some embodiments. The user interfaces in these figures are used to illustrate the processes described below, including the processes in FIGS. 18A-18F and FIG. 18G.

FIG. 16A illustrates electronic device 100 displaying, on display 112, a data type summary user interface 1602 (e.g., similar to place summary user interface 1702 described below with reference to FIG. 17A). In this example, data type summary user interface 1602 corresponds to a data type summary user interface for data of a first type (e.g., archived media data).

In some embodiments, data type summary user interface 1602 includes a representation 1604 of a most recent usage of the user account (e.g., a computer storage account) where data of the first type (e.g., archived media data) was archived on the computer storage resources associated with the user account. In some embodiments, representation 1604 of the most recent usage includes an indication of the location of electronic device 100 (e.g., including a map representation of the location) when, most recently, data of the first type (e.g., archived media data) was archived on the computer storage resources associated with the user account (e.g., a computer storage account) (in this example, Cupertino, Calif.). In some embodiments, representation 1604 of the most recent usage includes an indication of the amount of the data of the first type (e.g., archived media data) that was most recently archived on the computer storage resources associated with the user account (e.g., a computer storage account) (in this example, 25 MB). In some embodiments, representation 1604 of the most recent usage includes an indication of a bonus amount of use quota that was gained as a result of the most recent archive of the first type of data (in this example, 2% of 25 MB).

In some embodiments, data type summary user interface 1602 includes an indication 1606 of the total amount of data corresponding to the data of the first type (e.g., archived media data) that was archived in the user account (e.g., a computer storage account) during a previous predetermined time period (in this example, during the last month). In some embodiments, data type summary user interface 1602 includes an indication 1608 of the total amount of data corresponding to the data of the first type (e.g., archived media data) that was archived in the user account (e.g., a computer storage account) during a current time period (in this example, during the current month of January). In some examples, data type summary user interface 1602 includes a past usage items list 1610 that includes one or more past usage items corresponding to previous instances of data of the first type (e.g., archived media data) being archived in the user account (e.g., a computer storage account).

In FIG. 16A, while displaying data type summary user interface 1602, electronic device 100 displays (e.g., over a portion of data type summary user interface 1602, such as a bottom-edge portion of user interface 1602), a footer user interface 1612 (e.g., similar to footer user interface 1128 described below with reference to FIG. 17A) for enabling or disabling tracking of the respective data category of data type summary user interface 1602. In some embodiments, footer user interface 1612 includes an indication 1614 of an amount of the respective data category of data type summary user interface 1602 (in this example, archived media data) that has been during the current time period (e.g., the current month). In some embodiments, footer user interface 1612 includes an affordance 1616 for enabling the tracking of (e.g., if the respective data category is currently not being tracked) or disabling the tracking of (e.g., if the respective data category is currently being tracked).

FIG. 16B illustrates electronic device 100 displaying, on display 112, a lock user interface 1620 of electronic device 100 (e.g., similar to lock user interface 1754 described below with reference to FIG. 17H). In FIG. 16B, electronic device 100 is displaying, on lock user interface 1620, a first notification 1622 corresponding to a usage of the user account (e.g., a computer storage account) to store and/or archive a category of data that is being tracked (e.g., archived media data), a second notification 1624 corresponding to a received message, and a third notification 1626 corresponding to a usage of the user account to store and/or archive a category of data that is not being tracked (e.g., photo data).

In some embodiments, first notification 1622 includes an indication of its respective data category (e.g., archived media data) and the amount of data of its respective data category that was archived on the user account for the respective instance of the data being archived on the user account (in this example, 25 MB). In some embodiments, because its respective data category (in this example, archived media data) is being tracked, first notification 1622 also includes an indication 1622A of a total amount of data of its respective data category (e.g., archived media data) that has been archived on the user account during the current time period (e.g., the current month) (in this example, 120 MB of media data has been archived in the user account during the current month), and indication of a use quota for the respective data category for a predetermined time period (e.g., during every month) (in this example, a use quota of 500 MB of archived media data per month). In some embodiments, third notification 1626 includes an indication of its respective data category (e.g., photo data) and the amount of data of its respective data category that was archived on the user account for the respective instance of the data being archived on the user account (in this example, 75 MB). In some embodiments, because its respective data category (in this example, photo data) is not being tracked, third notification 1626 does not include an indication of a total amount of data of its respective data category that has been archived on the user account during the current time period, and also does not include an indication of a use quota for the respective data category for a predetermined time period.

FIGS. 17A-17K illustrate exemplary user interfaces for managing the tracking of a transfer category, in accordance with some embodiments. The user interfaces in these figures are used to illustrate the processes described below, including the processes in FIGS. 18A-18F.

Figure 17A:
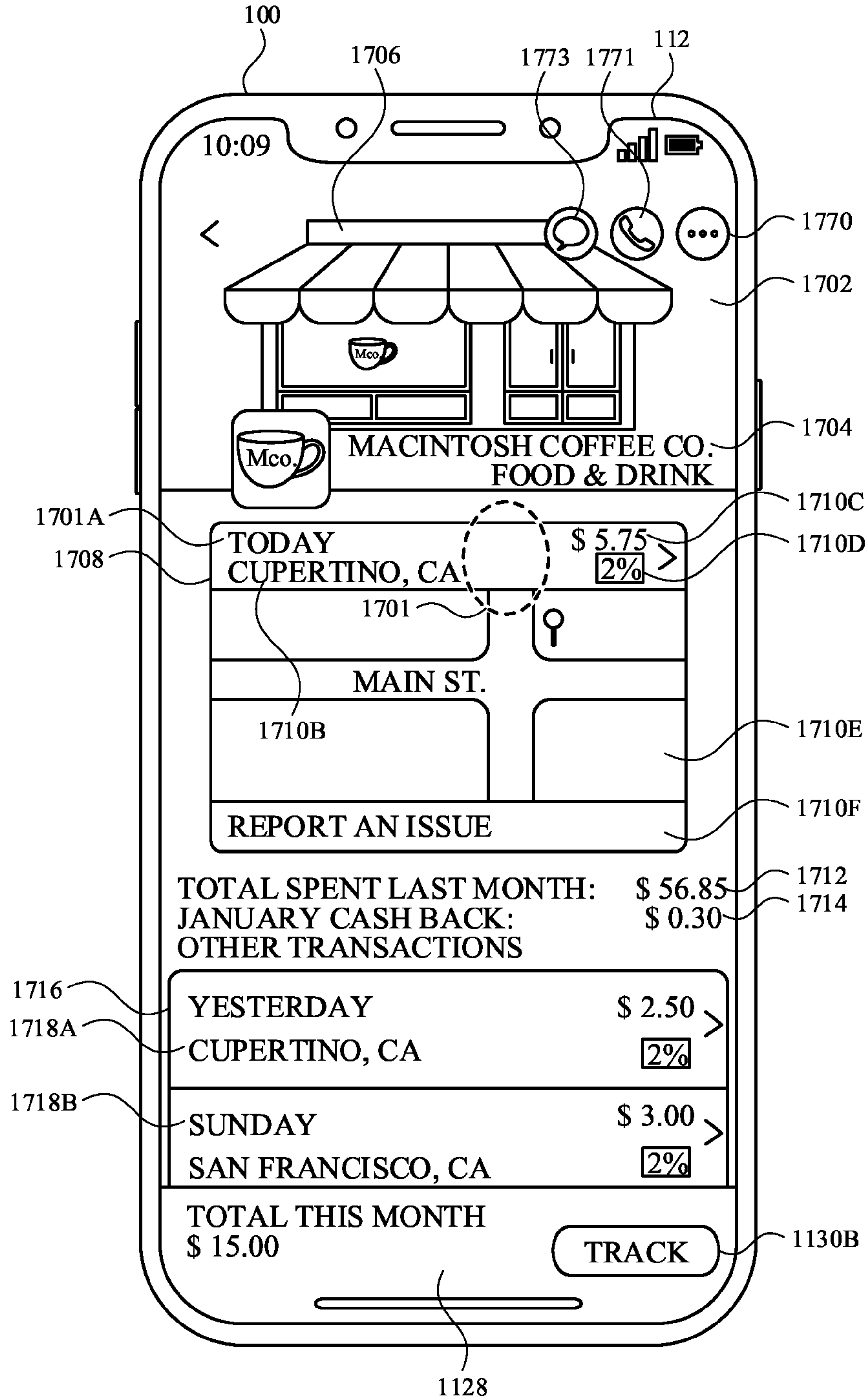
FIGS. 17A-17K illustrate exemplary user interfaces for managing the tracking of a transfer category, in accordance with some embodiments.

FIG. 17A illustrates electronic device 100 displaying, on display 112, a place summary user interface 1702 corresponding to a place (e.g., a merchant, a store, a location). In some embodiments, place summary user interface 1702 includes an indication 1704 of a name of the place (e.g., the name of the merchant, the name of the store, the name of the location) and a visual representation 1706 (e.g., in image, a photo, a logo) of the place (e.g., the merchant, the store, the location).

In some embodiments, place summary user interface 1702 includes a most recent transfer user interface element 1708 that includes information about a most recent transfer made at the place (e.g., the most recent payment transaction made the merchant, the store, or the location). As mentioned, in some embodiments, the transfer account is a first-party credit account (e.g., a revolving credit account that is issued or branded by the manufacturer of the electronic device), and provides rewards (e.g., cash back rewards) based on the amount of transfers (e.g., payment transactions, points transfers) made using the transfer account (e.g., cash back rewards that are based on a certain percentage of the value of each transition). As also mentioned, in some embodiments, the transfer account is a points account (e.g., for meal points, for printer credits, for membership points) that provides rewards (e.g., points rewards) based on the amount of points used using the transfer account.

In some embodiments, most recent transfer user interface element 1708 includes an indication 1710A of the date and/or time of the most recent transfer, an indication 1710B of a location (e.g., city and state/province) of the most recent transaction, an indication 1710C of the amount of the most recent transfer (e.g., the payment amount), an indication 1710D of an earned rewards amount (e.g., cash back amount) from the most recent transfer, an map representation 1710E showing a map view of the location of the place in which the most recent transfer was made (e.g., the location of the merchant's store in which the payment transaction was made), and an affordance 1710F for reporting an issue regarding the most recent transfer (e.g., for disputing the transaction; for disputing an amount of the transaction).

In some embodiments, place summary user interface 1702 further includes an indication 1712 of a total amount of transfers (e.g., total amount spent) at the corresponding place (e.g., a merchant, a store) during a predetermined time period (e.g., the past week; the past month). In some embodiments, place summary user interface 1702 further includes an indication 1714 of an amount of rewards earned in the predetermined time period (e.g., the past week; the past month) for transfers made in connection with the corresponding place (e.g., a merchant, a store).

In some embodiments, place summary user interface 1702 further includes a past transfer items list 1716 that includes a plurality of items (e.g., items 1718A-1718B) corresponding to previous transfers (e.g., previous payment transactions; previous points transfers) made at the corresponding place (e.g., a merchant, a store) using the transfer account (e.g., the first-party credit account; the points account). In some embodiments, an item in past transfer items list 1716 includes an indication of a date and/or time of the respective transfer (e.g., the respective payment transaction; the respective points transfer), an indication of a location (e.g. city and state/province) of the respective transfer, an indication of the amount of the respective transfer (e.g., the payment amount of the respective payment transaction, the points amount of the respective points transfer), and an indication of the amount of rewards earned (e.g., cash back rewards earned) for the respective transfer. In some embodiments, electronic device 100 displays items in past transfer items list 1716 in chronological order such that the item corresponding to the most recent transfer in the list (e.g., item 1718A) is displayed at the top of the list.

In some embodiments, place summary user interface 1702 further includes a details affordance 1770 for viewing information (e.g., contact information, business information, merchant or store information) about the place (e.g., "Macintosh Coffee Co.") corresponding to place summary user interface 702. In some embodiments, place summary user interface 1702 further includes a phone affordance 1771 for initiating a telephone call or a voice call with a representative of the place (e.g., a representative or customer service personnel of the business, merchant, or store). In some embodiments, place summary user interface 1702 further includes a message affordance 1773 for initiating a messaging conversation (e.g., a support conversation) with a representative of the place (e.g., a representative or customer service personnel of the business, merchant, or store).

In FIG. 17A, electronic device 100 also displays (e.g., over a portion of place summary user interface 1702, such as a bottom-edge portion of user interface 1702), footer user interface 1128 for enabling or disabling tracking of the respective category or respective place (e.g., "Macintosh Coffee Co.").

In FIG. 17A, tracking of the respective place (e.g., "Macintosh Coffee Co.") is currently disabled. Thus, electronic device 100 displays, in footer user interface 1128, a track affordance 1130B for enabling the tracking of the respective place. Further, in some embodiments, footer user interface 1128 includes an indication of a total amount of transfers (e.g., a total spending amount; a total points use amount) for the respective place made using the transfer account (e.g., the first-party credit account; the points account) during the predetermined time period (e.g., during the current week, during the current month), as also shown in indication 1712.

In FIG. 17A, while displaying, on display 112, place summary user interface 1702 (e.g., corresponding to "Macintosh Coffee Co."), electronic device 100 detects a selection 1701 of most recent transfer user interface element 1708.

Figure 17B:
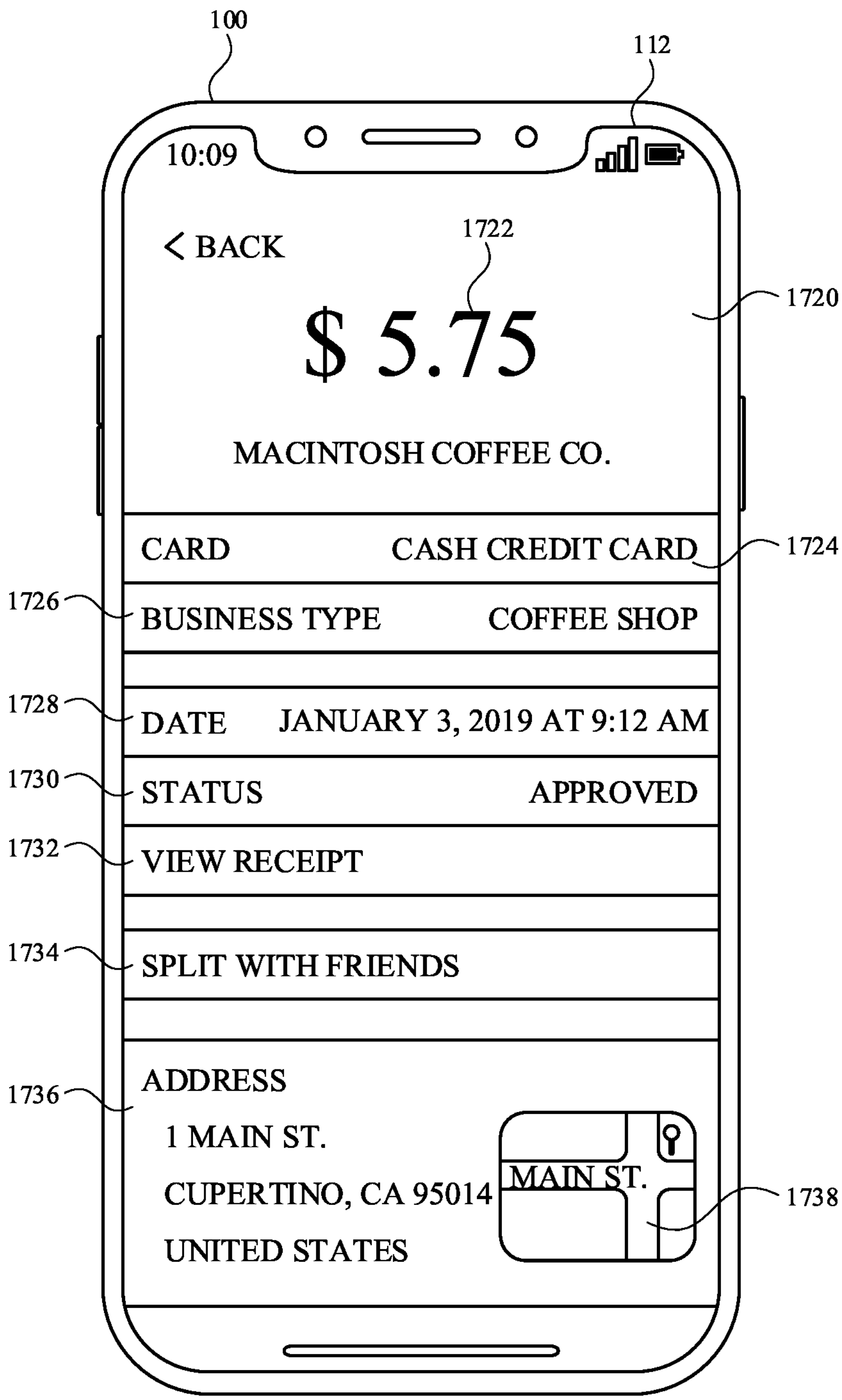

In FIG. 17B, in response to detecting selection 1701 of most recent transfer user interface element 1708, electronic device 100 displays, on display 112, a transfer details user interface 1720 that includes information about the most recent transfer (e.g., the most recent payment transaction; the most recent points transfer). In some embodiments, transfer details user interface 1720 includes an indication 1722 of a transfer amount (e.g., the payment amount; the points use amount) of the transfer, an indication of an account that was used for the transfer (e.g., the transfer account (e.g., the first-party credit account; the points account)), an indication 1726 of a type and/or category (e.g., a type of the business and/or a category that the business is deemed to be operating in, such as "coffee shop" or "cafe" or "food and drinks"), an indication 1728 of a time and date of the transfer, and/or an indication 1730 of a status of the transfer (e.g., whether the payment transaction is pending, approved, or denied).

In some embodiments, transfer details user interface 1720 also includes a view receipt affordance 1732—in response to detecting a user activation of view receipt affordance 1732, electronic device 100 displays an image and/or information corresponding to a receipt (e.g., an original receipt) for the transfers. In some embodiments, transfer details user interface 1720 also includes a split transfer affordance 1734—in response to detecting a user activation of split transfer affordance 1734, electronic device 100 initiates a process for splitting the transfer amount (e.g., as indicated by indication 1722) with one or more contacts and/or friends (e.g., registered or stored on the device or accessible by the electronic device).

In some embodiments, transfer details user interface 1720 also includes an address indication 1736 that includes an address (e.g., business address; the respective chain location address, if the merchant operates a plurality of stores) of the place (e.g., a merchant, such as "Macintosh Coffee Co.") corresponding to the transfer. In some embodiments, address indication 1736 also includes a map view 1738 of the location of the place. In some embodiments, in response to detecting a selection of map view 1738, electronic device 100 displays, on display 112, a map application that indicates the location of the place in a displayed map of the application.

In some embodiments, in response to detecting a selection of a respective item of past transfer items list 1716 of place summary user interface 1702, as shown in FIG. 0.17A, electronic device 100 displays a respective transfer details user interface 1720 corresponding to the transfer of the respective item.

Figure 17C:
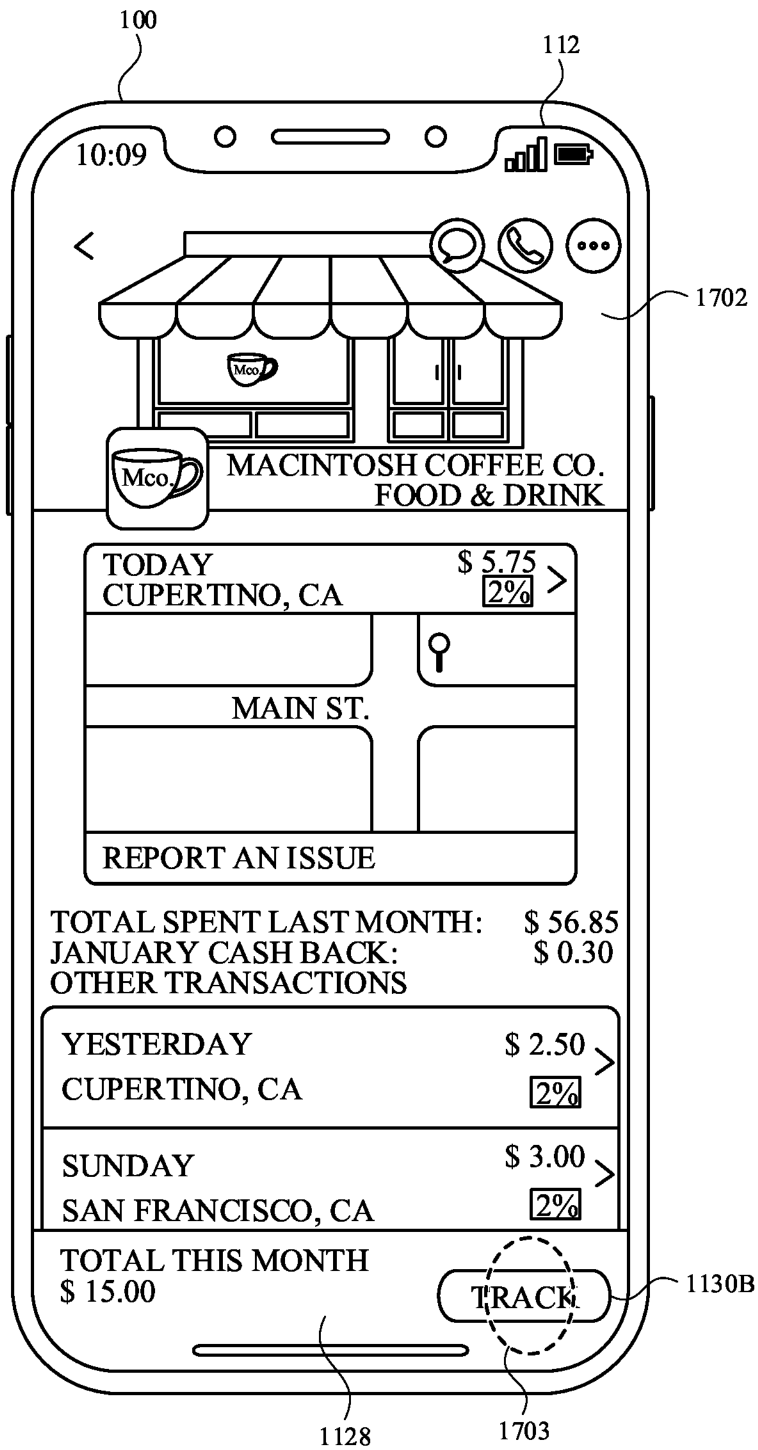

In FIG. 17C, electronic device 100 is again displaying, on display 112, place summary user interface 1702 corresponding to the place (e.g., a merchant, such as "Macintosh Coffee Co.") and footer user interface 1128, as first shown in FIG. 17A. In FIG. 17C, while displaying place summary user interface 1702 and footer user interface 1128, electronic device 100 detects a selection 1703 of track affordance 1130B.

In response to detecting selection 1703 of track affordance 1130B, electronic device 100 initiates a process for enabling the tracking of the place (e.g., a merchant, such as "Macintosh Coffee Co.") as a tracking category (e.g., which corresponds to transfer categories for categorizing transfers). In some embodiments, initiating the process for enabling the tracking of the place comprises enabling the tracking of the place (e.g., a merchant, such as "Macintosh Coffee Co.") as a tracking category without requiring any further input confirming the tracking. In some embodiments, initiating the process for enabling the tracking of the place (e.g., a merchant, such as "Macintosh Coffee Co.") comprises displaying a tracking user interface 1740, as shown in FIG. 17D.

Figure 17D:
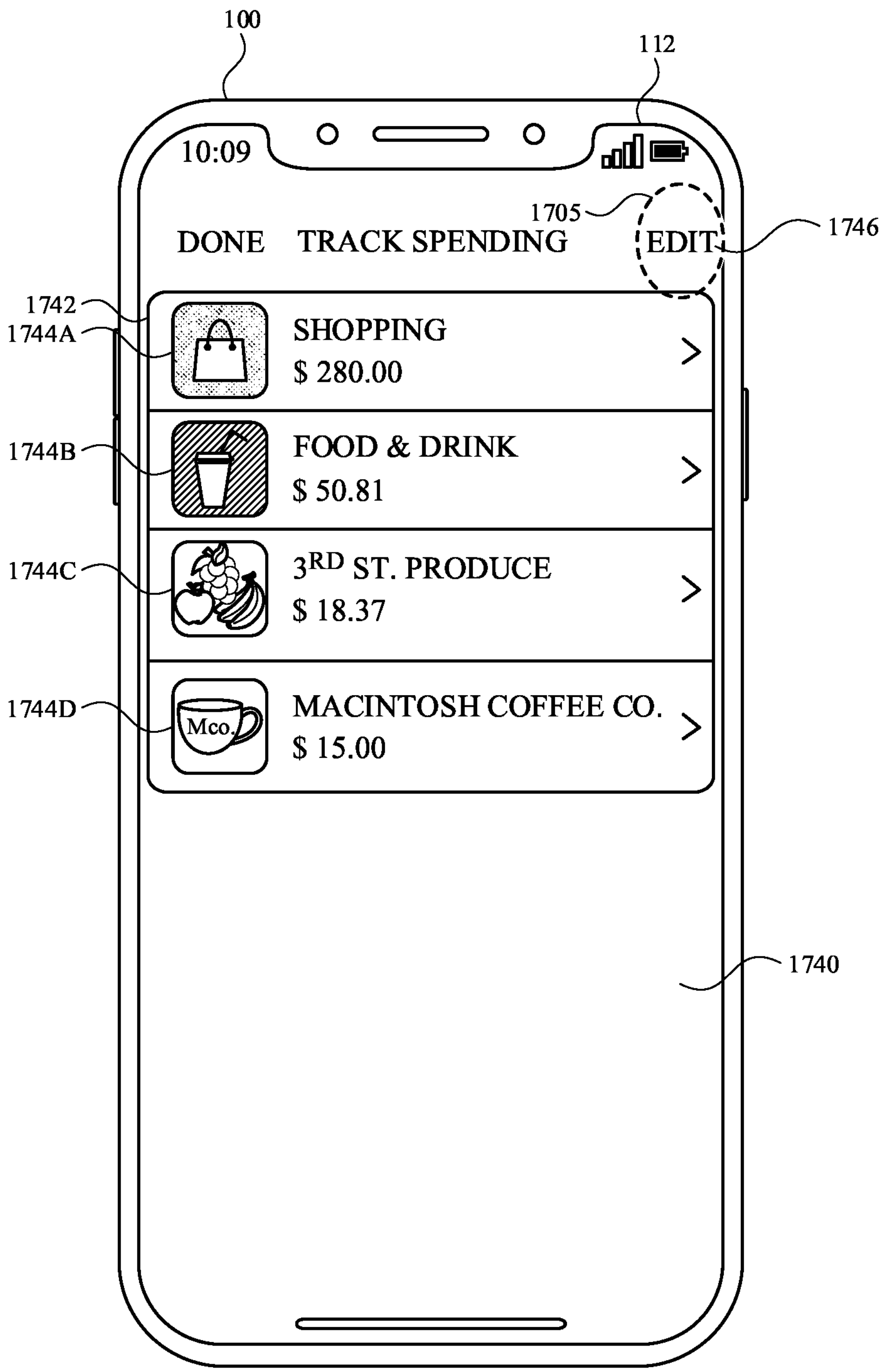

In FIG. 17D, in response to detecting selection 1703 of track affordance 1130B of footer user interface 1128, electronic device 100 displays, on display 112, tracking user interface 1740 that indicates categories (e.g., a particular merchant, a particular store, food and drinks, shopping, travel, education, entertainment) that are currently being tracked by the electronic device.

In some embodiments, tracking user interface 1740 includes a category items list 1742 that include category items 1744A-1744C corresponding to categories that are currently being tracked by electronic device 100. In FIG.

17D, in response to detecting selection 1703 of track affordance 1130B, electronic device 100 adds category item 1744D corresponding to the place corresponding to user interface 1702 in FIGS. 17A-17C (e.g., a merchant such as "Macintosh Coffee Co.") to category items list 1742, thereby indicating that the place is now a category that is being tracked.

In FIG. 17D, while displaying tracking user interface 1740 with category items list 1742 that now include category items 1744A-1744D corresponding to categories that are being tracked by the device, electronic device 100 detects a user activation 1705 of an edit affordance 1746 for editing tracking categories using user interface 1740.

Figure 17E:
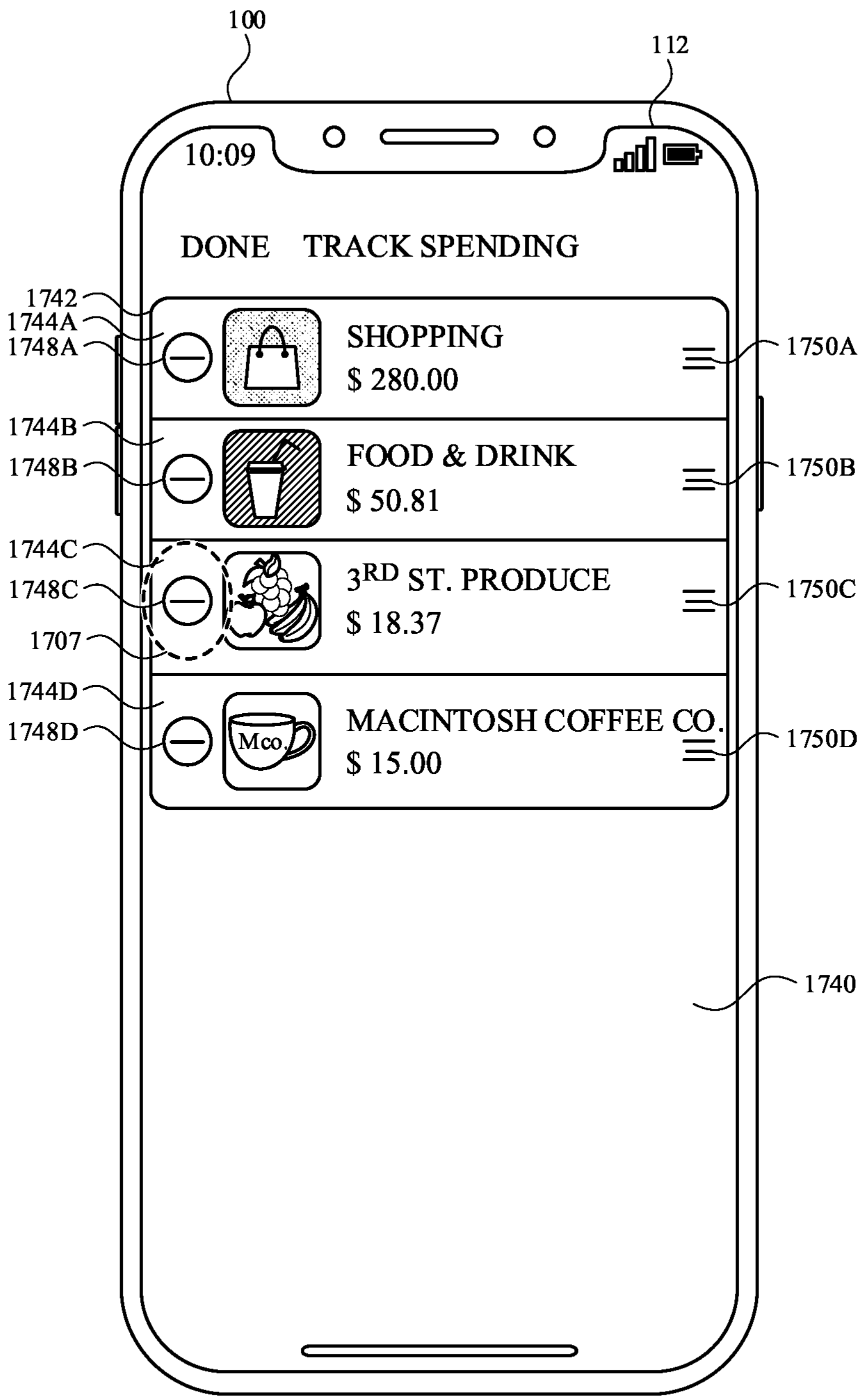

In FIG. 17E, in response to detecting user activation 1705 of edit affordance 1746, electronic device 100 enables an edit mode for the category items by displaying, for each category item in category items list 1742, a remove affordance and a re-order affordance. That is, in some embodiments, electronic device 100 displays a remove affordance 1748A and a re-order affordance 1750A for category item 1744A, a remove affordance 1748B and a re-order affordance 1750B for category item 1744B, a remove affordance 1748C and a re-order affordance 1750C for category item 1744C, and a remove affordance 1748D and a re-order affordance 1750D for category item 1744D. In FIG. 17E, while displaying tracking user interface 1740 in the edit mode, electronic device 100 detects a user activation 1707 of remove affordance 1748C corresponding to third category item 1744C (e.g., a store, such as "3$^{rd}$ St. Produce").

Figure 17F:
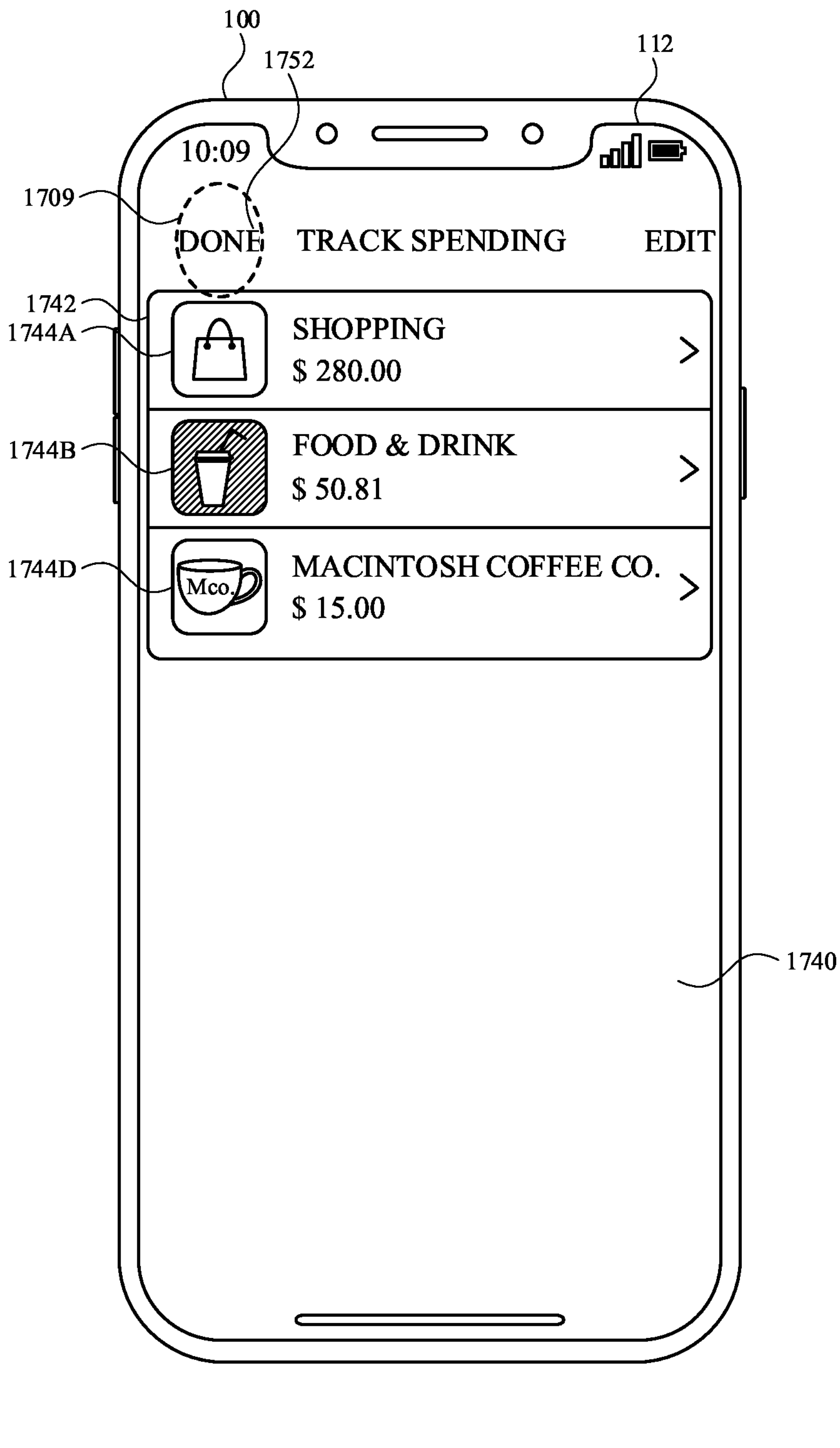

In FIG. 17F, in response to detecting user activation 1707 of remove affordance 1748C corresponding to third category item 1744C (e.g., a store, such as "3$^{rd}$ St. Produce"), electronic device 100 displays, in track user interface 1740, category items list 1742 that no longer includes third category item 1748C (while maintaining the other previously tracked categories). In FIG. 17F, while displaying, in track user interface 1740, category items list 1742 that no longer includes third category item 1748C, electronic device 100 detects a user activation 1709 of a confirm affordance 1752. In response to detecting user activation 1709 of confirm affordance 1752, electronic device 100 disables tracking of the category (e.g., a store, such as "3$^{rd}$ St. Produce") corresponding to the removed category item. In response to detecting user activation 1709 of confirm affordance 1752, electronic device 100 also enables tracking of transfers (e.g., payment transactions, points transfers) corresponding to (e.g., made at) the place (e.g., a merchant, such as "Macintosh Coffee Co.").

Figure 17G:
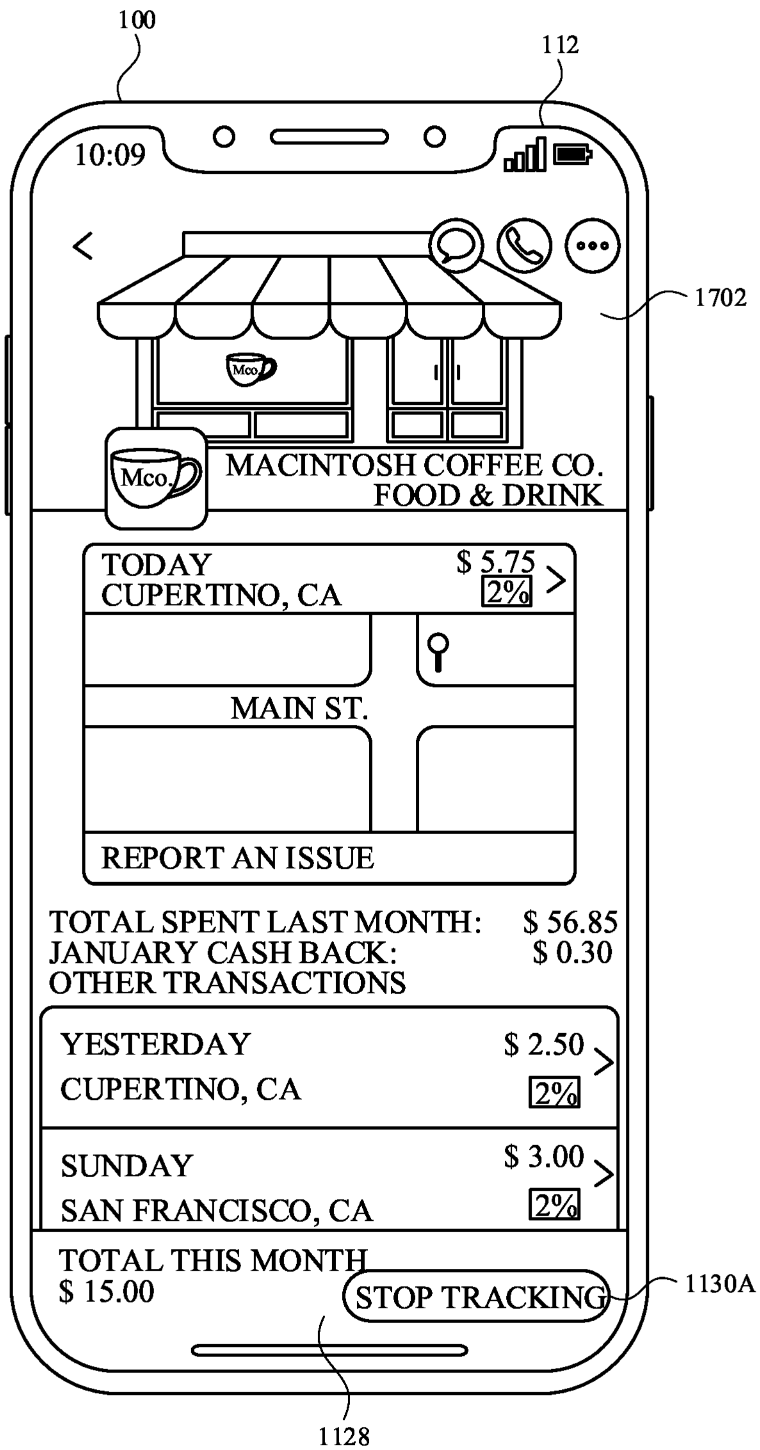

FIG. 17G illustrates electronic device 100 again displaying, on display 112, place summary user interface 1702, as first shown in FIG. 17A. Unlike in FIG. 17A, however, in FIG. 17G, electronic device 100 is now tracking transfers (e.g., payment transactions; points transfers) corresponding to (e.g., made at) the place (e.g., a merchant, such as "Macintosh Coffee Co.") as a category. As such, electronic device 100 displays, in footer user interface 1128, a stop tracking affordance 1130A (e.g., instead of and in place of track affordance 1130B), thereby indicating that the place corresponding to the displayed place summary user interface 1702 is currently being tracked.

Figure 17H:
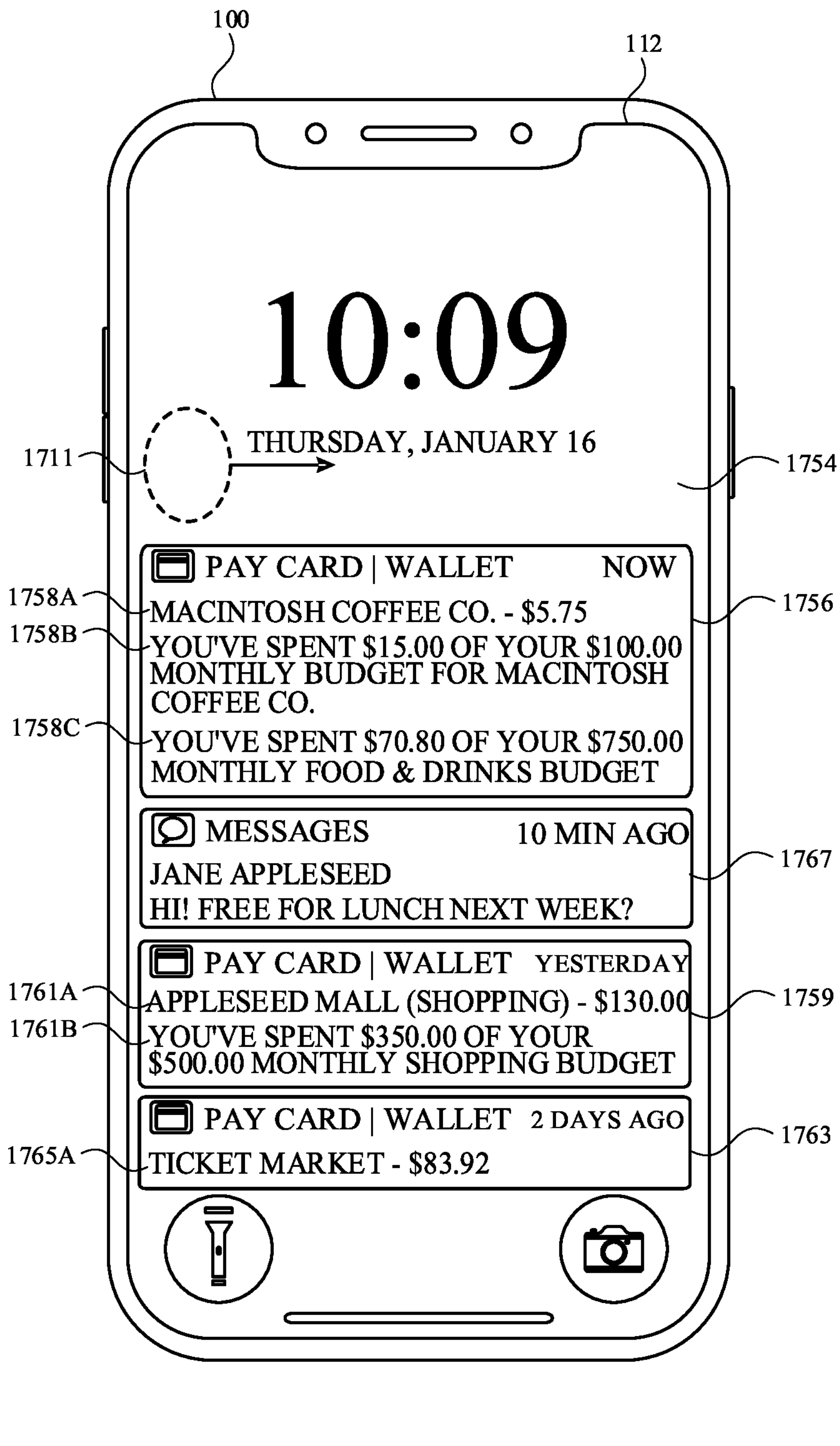

FIG. 17H illustrates electronic device 100 displaying, on display 112, a lock user interface 1754 (e.g., a lock screen or wake screen) of electronic device 100 showing a plurality of transfer notifications corresponding to transfers (e.g., payment transactions, points transfers) made using the transfer account (e.g., the first-party credit account; the points account), including a first transfer notification 1756, a second transfer notification 1759, and a third transfer notification 1763, and a message notification 1767 corresponding to an incoming message (e.g., an incoming text or chat message).

In some embodiments, first transfer notification 1756 corresponds to a new transfer (e.g., a new payment transaction, a new points transfer) performed using the transfer account (e.g., the first-party credit account; the points account) at a place (e.g., a merchant, store, or location, such as "Macintosh Coffee Co."), as indicated by indication 1758A, where the respective place is being tracked as a tracking category by the electronic device and the corresponding transfer category (e.g., food and drinks) is also being tracked as a tracking category by the electronic device. In some embodiments, indication 1758A includes an amount of the transfer that was performed (e.g., the payment transaction amount, the points transfer amount).

In some embodiments, because the respective place (e.g., "Macintosh Coffee Co.") corresponding to the transfer (e.g., transfer of "$5.75" at "Macintosh Coffee Co.") represented in the notification is being tracked for the transfer account (e.g., the first-party credit account; the points account), first transfer notification 1756 includes a first tracking indication 1758B corresponding to the respective place. In some embodiments, first tracking indication 1758B includes an indication of the total amount of transfers made (e.g., the total amount of funds spent, the total amount of points transferred) at the respective place for a predetermined time period (e.g., the past week, the past month, where the predetermined time period can be set or configured by the user of the electronic device) and, optionally, a budget allowance (e.g., set by the user) for transfers made at the respective place for the predetermined time period. Thus, in some embodiments, first tracking indication 1758B includes an indication of the total amount of transfers made at the respective place (e.g., "Macintosh Coffee Co.") relative to the set budget allowance for the respective place for the predetermined time period.

In some embodiments, because the respective transfer category (e.g., food and drinks) corresponding to the transfer (e.g., transfer of "$5.75" at "Macintosh Coffee Co.") represented in the notification is also being tracked for the transfer account (e.g., the first-party credit account; the points account), first transfer notification 1756 also includes a second tracking indication 1758C corresponding to the respective place. In some embodiments, second tracking indication 1758C includes an indication of the total amount of transfers made (e.g., the total amount of funds spent, the total amount of points transferred) for transfers of the respective transfer category (e.g., food and drinks) during the predetermined time period (e.g., the past week, the past month, where the predetermined time period can be set or configured by the user of the electronic device) and, optionally, a budget allowance (e.g., set by the user) for transfers of the respective transfer category for the predetermined time period. Thus, in some embodiments, second tracking indication 1758C includes an indication of the total amount of transfers made for transfers of the respective transfer category (e.g., food and drinks) during the predetermined time period relative to the set budget allowance for transfers of the respective transfer category for the predetermined time period.

In some embodiments, the budget allowance corresponds to the budget allowance for the respective place or respective transfer category (e.g., the particular place or location (e.g., "Macintosh Coffee Co."), the particular spending type (e.g., food and drinks, shopping, groceries, travel, education, entertainment)) associated with the respective notification for the predetermined time period. In some embodiments, the budget allowance corresponds to the budget allowance for all transfers (e.g., all payment transactions, all points transfers) made using the transfer account for the predetermined time period.

In some embodiments, second transfer notification 1759 corresponds to a previous transfer (e.g., a previous payment transaction, a previous points transfer) performed using the transfer account (e.g., the first-party credit account; the points account) at a place (e.g., a merchant, store, or location, such as "Appleseed Mall"), as indicated by indication 1761A, where the corresponding transfer category (e.g., shopping) is being tracked as a tracking category by the electronic device (e.g., but the respective place, "Appleseed Mall," is not being tracked as a tracking category by the electronic device). In some embodiments, indication 17561A includes an amount of the transfer that was performed (e.g., the payment transaction amount, the points transfer amount).

In some embodiments, because the respective transfer category (e.g., shopping) corresponding to the transfer (e.g., transfer of "$130.00" made at "Appleseed Mall") represented in the notification is being tracked for the transfer account (e.g., the first-party credit account; the points account), second transfer notification 1759 includes a tracking indication 1761B corresponding to the respective place. In some embodiments, second tracking indication 1758B includes an indication of the total amount of transfers made (e.g., the total amount of funds spent, the total amount of points transferred) for transfers of the respective transfer category (e.g., shopping) during the predetermined time period (e.g., the past week, the past month, where the predetermined time period can be set or configured by the user of the electronic device) and, optionally, a budget allowance (e.g., set by the user) for transfers of the respective transfer category for the predetermined time period. Thus, in some embodiments, second tracking indication 17612B includes an indication of the total amount of transfers made for transfers of the respective transfer category (e.g., shopping) during the predetermined time period relative to the set budget allowance for transfers of the respective transfer category for the predetermined time period.

In some embodiments, third transfer notification 1763 corresponds to a previous transfer (e.g., a previous payment transaction, a previous points transfer) performed using the transfer account (e.g., the first-party credit account; the points account) with a place (e.g., a merchant, store, a physical or online location, such as "Ticket Market"), as indicated by indication 1765A, where neither the respective place (e.g., "Ticket Market") nor the corresponding transfer category (e.g., entertainment) are being tracked as tracking categories by the electronic device. In some embodiments, indication 17565A includes an amount of the transfer that was performed (e.g., the payment transaction amount, the points transfer amount).

In some embodiments, because neither the respective place (e.g., "Ticket Market") nor the transfer category (e.g., entertainment) corresponding to the transfer (e.g., transfer of "$83.92" made for "Ticket Market") are being tracked as tracking categories by the electronic device, third transfer notification 1763 does not include tracking indications corresponding to the respective place or to the corresponding transfer category.

Figure 17I:
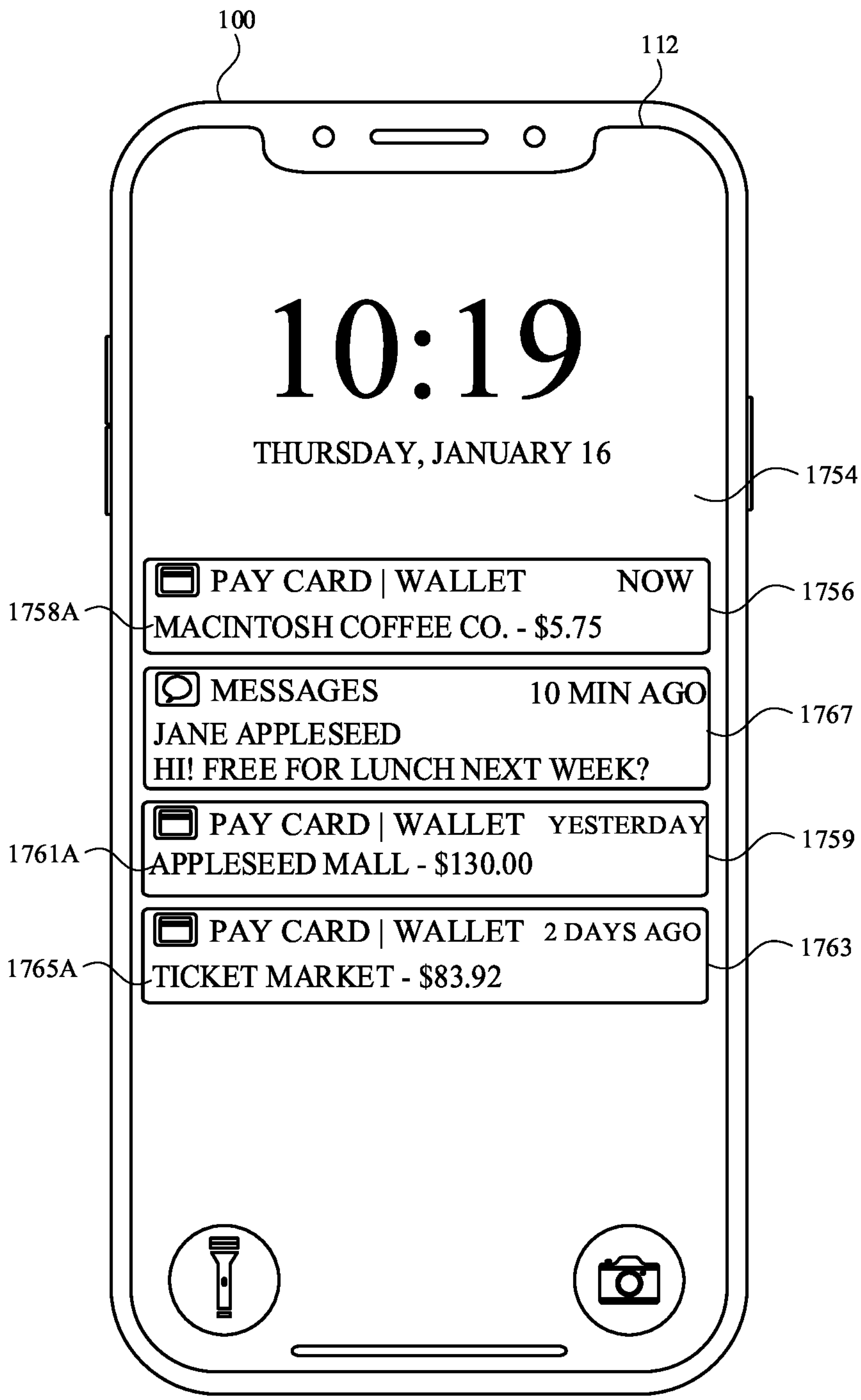

FIG. 17I illustrates electronic device 100 displaying, on display 112, lock user interface 1754 of electronic device 100 showing the plurality of transfer notifications corresponding to transfers (e.g., payment transactions, points transfers) made using the transfer account (e.g., the first-party credit account; the points account) first shown in FIG. 17H (e.g., first transfer notification 1756, second transfer notification 1759, and third transfer notification 1763, and message notification). However, in FIG. 17I, electronic device 100 is not tracking any tracking categories (and thus is not tracking any place or transfer category) for transfers made using the transfer account (e.g., the first-party credit account; the points account).

As shown in FIG. 17I, because electronic device 100 is not tracking the respective place (e.g., "Macintosh Coffee Co.") corresponding to the transfer represented in first transfer notification 1756 and is not tracking the respective transfer category (e.g., food and drinks) corresponding to the transfer represented in first transfer notification 1756, electronic device 100 forgoes displaying, in first transfer notification 1756, any tracking indications and only displays, in first transfer notification 1756, indication 1758A of the name of the respective place and an amount of the corresponding transfer (e.g., the amount of funds spent, the amount of points transferred).

As also shown in FIG. 17I, because electronic device 100 is not tracking the respective transfer category (e.g., shopping) corresponding to the transfer represent in second transfer notification 1759, electronic device 100 forgoes displaying, in second transfer notification 1759, any tracking indications and only displays, in second transfer notification 1759, indication 1761A of the name of the respective place (e.g., "Appleseed Mall") and an amount of the corresponding transfer (e.g., the amount of funds spent, the amount of points transferred).

Figure 17J:
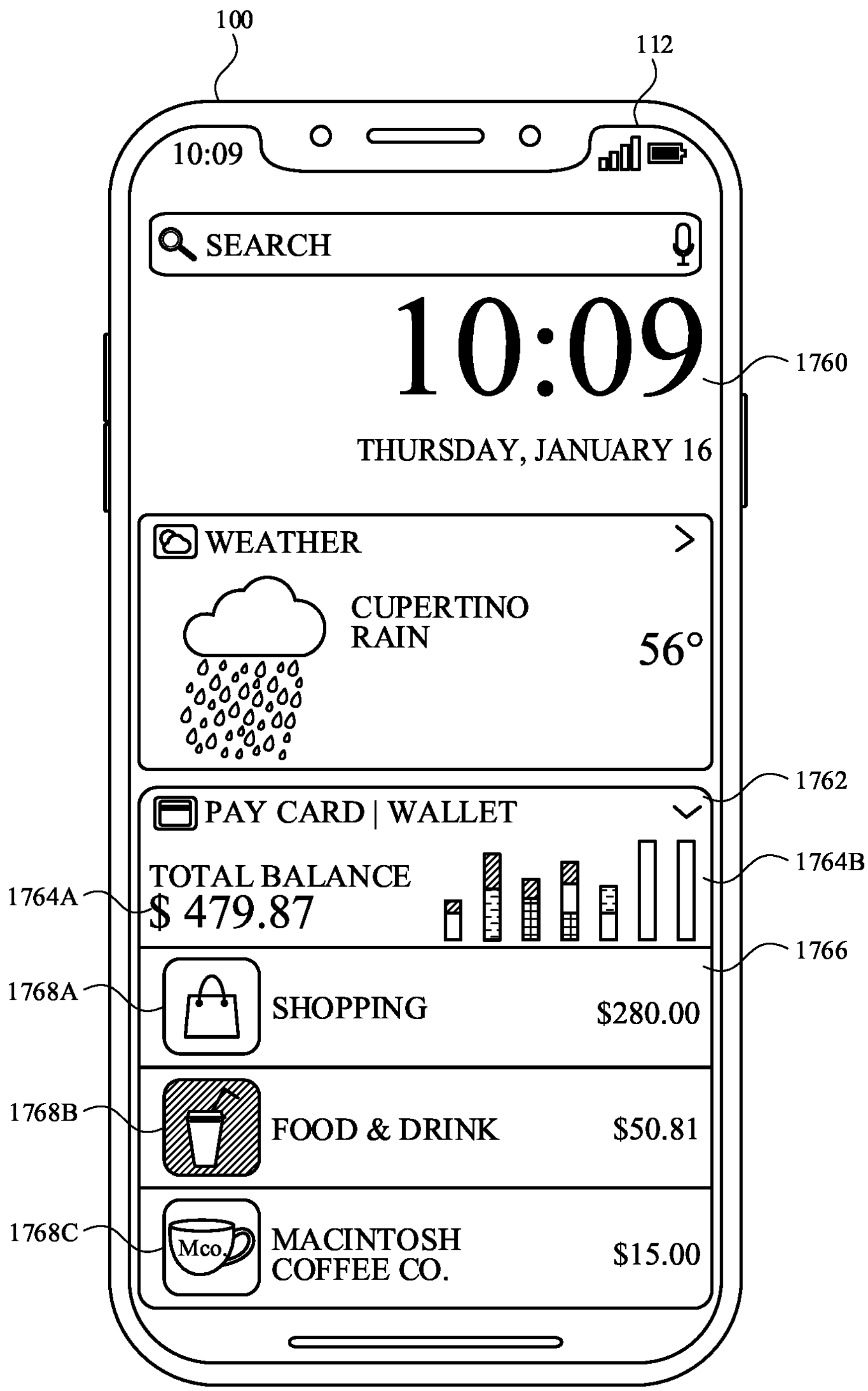

In FIG. 17H, while displaying lock user interface 1754, electronic device 100 detects user input 1711 (e.g., a swipe right input, a swipe up input). In some embodiments, in response to detecting user input 1711, electronic device 100 displays the widgets user interface 1760, as shown in FIG. 17J. In some embodiments, in response to detecting user input 1711, electronic device 100 displays, on display a home user interface (e.g., home user interface 1402) of the electronic device. While displaying the home user interface, electronic device 100 detects further user input directed to navigating to the widgets user interface 1760 of FIG. 17J (e.g., a horizontal swipe on the home user interface or a downward drag input beginning on the top edge of the display).

In FIG. 17J, electronic device 100 is displaying, on display 112, widgets user interface 1760. In some embodiments, widgets user interface 1760 includes a tracked categories widget 1762 that includes summary information about the transfer account (e.g., the first-party credit account; the points account) and transfer categories corresponding to the use of the transfer account (e.g., shopping, food and drink, a merchant or store (e.g., "Macintosh Coffee Co.")) that are currently being tracked by the electronic device. For example, in FIG. 17J, tracked categories widget 1762 includes an indication 1764A of a current balance amount of the transfer account (e.g., the first-party credit account; the points account), an activity summary indication 1764B (e.g., corresponding to the bar graph of activity user interface element 883 depicting transfer activity (e.g., payment activity)), and a plurality of tracked category items 1768A-1768C corresponding to transfer categories that are currently being tracked by the electronic device, where each tracked category item includes an indication of the type or name of its respective transfer category and a total transfer amount corresponding to its respective transfer category. As shown in FIG. 17J, because the place (e.g., a merchant, such as "Macintosh Coffee Co.") corresponding to place summary user interface 1702 in FIG. 17A is now being tracked, as detected n FIG. 17C, tracked categories widget 1762 includes tracked category item 1768C corresponding to the place (e.g., a merchant, such as "Macintosh Coffee Co.") that is being tracked. Widgets user interface 1760 optionally includes various widgets that display information retrieved from different applications, such as the weather application, as illustrated in FIG. 17J.

Figure 17K:
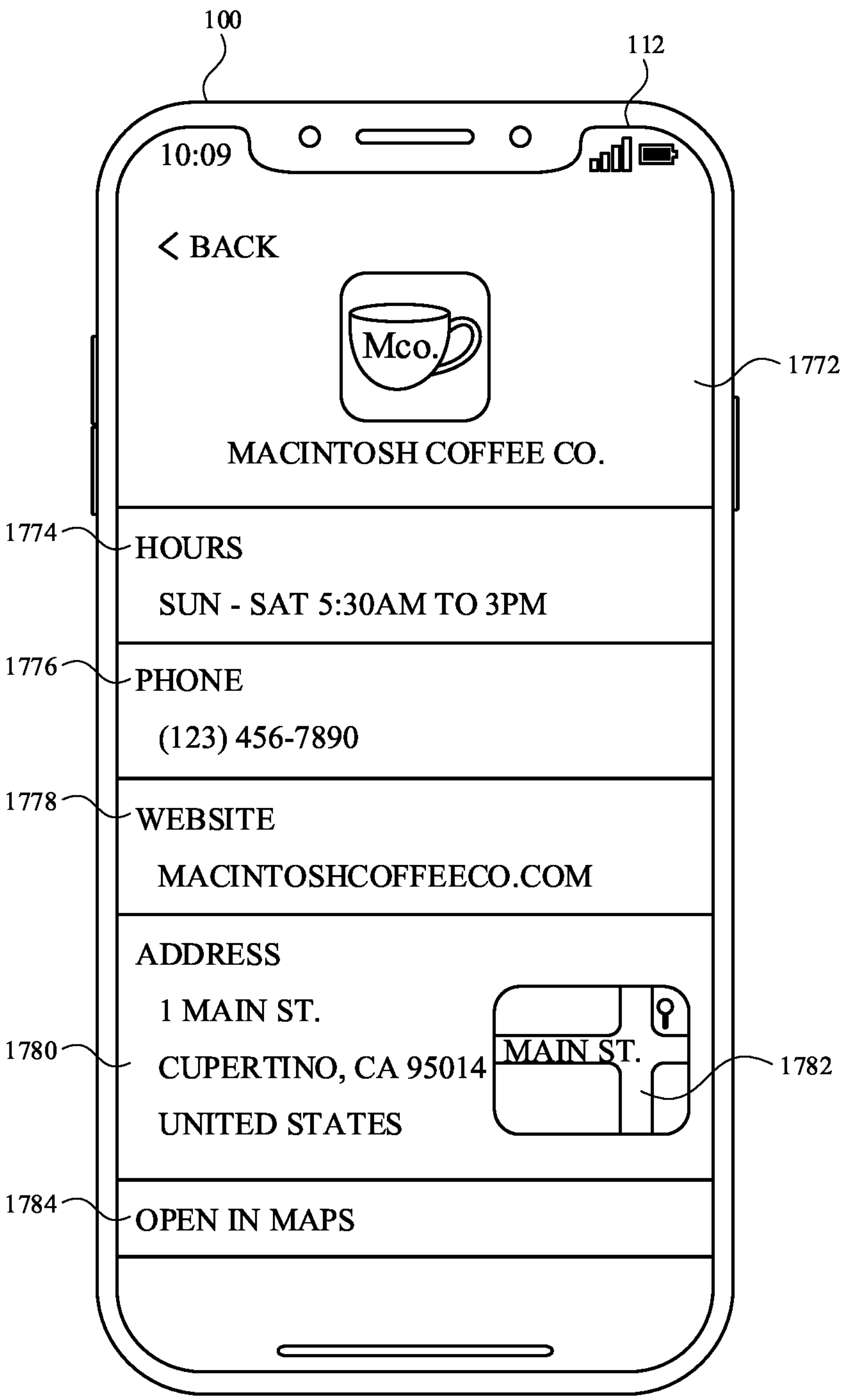

In FIG. 17K, electronic device 100 displays, on display 112, a place details user interface 1772 that includes information (e.g., business information) about the corresponding place. In some embodiments, electronic device 100 displays place details user interface 1772 in response to detecting a user activation of details affordance 1770 shown in place summary user interface 1702, as first depicted in FIG. 17A. In some embodiments, place details user interface 1772 includes an indication 1774 of the hours of operation of the place (e.g., the hours of operation of the merchant or business), an indication 1776 of a contact number (e.g., business phone number, customer service number), an indication 1778 of a website corresponding to the place (e.g., the merchant or business's webpage), an indication 1780 of the address of the place (e.g., the merchant's store address, the business's office address), and/or a map view 1782 of the location of the place corresponding to the listed address. In some embodiments, place details user interface 1772 also includes an affordance 1784 for opening a map application to view the location of the place (e.g., for viewing the location of the store of the merchant or office of the business in a map application of the device).

FIGS. 18A-18F are a flow diagram illustrating a method for managing the tracking of a transfer category, in accordance with some embodiments. Method 1800 is performed at an electronic device (e.g., 100, 300, 500) with a display (e.g., 112) and one or more input devices (e.g., the touch screen of display 112, menu button 204, push button 206). Some operations in method 1800 are, optionally, combined, the orders of some operations are, optionally, changed, and some operations are, optionally, omitted.

As described below, method 1800 provides an intuitive way for managing a transfer account. The method reduces the cognitive burden on a user for managing a transfer account, thereby creating a more efficient human-machine interface. For battery-operated computing devices, enabling a user to manage a transfer account faster and more efficiently conserves power and increases the time between battery charges.

The electronic device (e.g., 100) displays (1802), on the display (e.g., 112), a user interface (e.g., 1602, 1702) corresponding to a transfer account (e.g., the transfer account as escribed above with reference to FIGS. 8A-8V, such as a payment account, a virtual card account, a points account, a rewards account).

The user interface (e.g., 1602, 1702) includes a plurality of transfer items (e.g., 1610, 1716; shown as a list in chronological order) corresponding to past transfers (e.g., past payment transactions, past points transfers) made using the transfer account (1804). Displaying the plurality of transfer items corresponding to past transfers made using the transfer account enables the user to quickly and easily view summaries of and be reminded of (e.g., the most recent) transfers made using the transfer account. Providing improved visual feedback to the user enhances the operability of the device and makes the user-device interface more efficient (e.g., by helping the user to provide proper inputs and reducing user mistakes when operating and/or interacting with the device) which, additionally, reduces power usage and improves battery life of the device by enabling the user to use the device more quickly and efficiently.

The user interface (e.g., 1602, 1702) includes an indication (e.g., 1704, 1706; name, image, photo, location information, map) of a first common characteristic (e.g., a particular location, a particular merchant, a particular category (e.g., shopping, groceries, travel, dining), a time period or a combination of those characteristics) of the past transfers (1806). Including the indication of the first common characteristic in the user interface allows the user to quickly and easily recognize the common characteristic that is associated with the displayed user interface (e.g., without needing to navigate to a different user interface or option). Reducing the number of inputs needed to perform an operation enhances the operability of the device and makes the user-device interface more efficient (e.g., by helping the user to provide proper inputs and reducing user mistakes when operating and/or interacting with the device) which, additionally, reduces power usage and improves battery life of the device by enabling the user to use the device more quickly and efficiently.

The user interface (e.g., 1602, 1128, 1702) includes an affordance (e.g., 1616, 1130B; a track affordance) to initiate tracking of transfers that share the first common characteristic (1808).

In some embodiments, the user interface (e.g., 1602, 1128, 1702) further includes an indication of a total amount of transfers made (e.g., the total amount of funds or credit spent) that correspond to the first common characteristic (e.g., at a common place) during a first time period (e.g., the current month, the current week) as compared to a second time period (e.g., the previous month, the previous week) (1810). Including, in the user interface, the indication of the total amount of transfers made that correspond to the first common characteristic during a first time period as compared to a second time period reminds the user of and provides feedback about changes in the user's spending behavior. Providing improved feedback to the user enhances the operability of the device and makes the user-device interface more efficient (e.g., by helping the user to provide proper inputs and reducing user mistakes when operating and/or interacting with the device) which, additionally, reduces power usage and improves battery life of the device by enabling the user to use the device more quickly and efficiently. In some embodiments, the user interface includes the indication of a total amount of transfers made (e.g., the total amount of funds or credit spent) at a common place during a present time period (e.g., the current month, the current week) as compared to a previous time period (e.g., the previous month, the previous week). Including, in the user interface, the indication of a total amount of transfers made at the common place during a present time period as compared to a previous time period reminds the user of and provides feedback about changes in the user's spending behavior. Providing improved feedback to the user enhances the operability of the device and makes the user-device interface more efficient (e.g., by helping the user to provide proper inputs and reducing user mistakes when operating and/or interacting with the device) which, additionally, reduces power usage and improves battery life of the device by enabling the user to use the device more quickly and efficiently.

In some embodiments, the user interface (e.g., 1602, 1702) further includes an indication (e.g., 1608, 1714) of a total amount of rewards (e.g., cash back, rewards points)

accumulated (e.g., for a certain time period) that correspond to the first common characteristic (e.g., at the common place) (1812). Including, in the user interface, the indication of the total amount of rewards accumulated that correspond to the first common characteristic enables the user to quickly and easily view the amount of available rewards. Providing improved visual feedback to the user enhances the operability of the device and makes the user-device interface more efficient (e.g., by helping the user to provide proper inputs and reducing user mistakes when operating and/or interacting with the device) which, additionally, reduces power usage and improves battery life of the device by enabling the user to use the device more quickly and efficiently.

In some embodiments, the user interface (e.g., 1602, 1702) further includes a visual representation (e.g., 1706; photo, image, picture, logo) of the first common characteristic (e.g., a common place) (1814).

In some embodiments, the first common characteristic corresponds to a common place (e.g., a particular merchant, a particular company, a particular store, a particular location, a particular geographical area).

In some embodiments, the user interface (e.g., 1602, 1702) further includes a map representation (e.g., 1710E) of the common place (1816). In some embodiments, in response to detecting a selection of the map representation, the electronic device (e.g., 100) displays a location of the common place in a map application (e.g., different from the application that displays the user interface). Displaying the location of the common place in the map application in response to detecting the selection of the map representation enables the user to, if needed, quickly view detailed location information about the common place and/or search for a direction to the commonplace. Providing additional control options without cluttering the UI with additional displayed controls enhances the operability of the device and makes the user-device interface more efficient (e.g., by helping the user to provide proper inputs and reducing user mistakes when operating and/or interacting with the device) which, additionally, reduces power usage and improves battery life of the device by enabling the user to use the device more quickly and efficiently. In some embodiments, the display of a user interface of the map application replaces the display of the user interface.

In some embodiments, the user interface (e.g., 1602, 1702) further includes a first transfer item (e.g., 1718A) corresponding to a first location of the common place (e.g., if the common place is a chain merchant with a plurality of stores or locations, a first store or location of the merchant), where the first item corresponds to a first transfer (e.g., past payment, purchase, bill) made at the first location of the common place (1818). In some embodiments, the user interface further includes a second transfer item (e.g., 1718B) corresponding to a second location of the common place (e.g., a second store or location of the merchant), where the second item corresponds to a second transfer (e.g., past payment, purchase, bill) made at the second location of the common place (1820). In some embodiments, the user interface further includes additional transfer items corresponding to other locations of the common place. Including, in the user interface, the first transfer item corresponding to the first location of the common place and the second transfer item corresponding to the second location of the common place enables the user to quickly and easily view past transfers made using the transfer account at different locations of the common place. Reducing the number of inputs needed to perform an operation enhances the operability of the device and makes the user-device interface more efficient (e.g., by helping the user to provide proper inputs and reducing user mistakes when operating and/or interacting with the device) which, additionally, reduces power usage and improves battery life of the device by enabling the user to use the device more quickly and efficiently. In some embodiments, the display of a user interface of the map application replaces the display of the user interface.

In some embodiments, the user interface (e.g., 1602, 1702) includes a location detail affordance (e.g., 1770) and the first common characteristic corresponds to a common place (e.g., a particular merchant, a particular company, a particular store, a particular location, a particular geographical area). In some embodiments, while displaying the user interface, the electronic device (e.g., 100) detects a selection of the location detail affordance. In some embodiments, in response to detecting the selection of the location detail affordance, the electronic device (e.g., 100) displays, on the display (e.g., 112), a location detail user interface (e.g., 1772) that includes information (e.g., hours of operation, contact information, address) corresponding to the common place. In some embodiments, at least a portion of the information corresponding to the common place is retrieved (in response to detecting the selection of the location detail affordance) from the Internet (optionally in response to detecting selection of the location detail affordance).

In some embodiments, the location detail user interface (e.g., 1772) includes a map affordance (e.g., 1782). In some embodiments, while displaying the location detail user interface, the electronic device (e.g., 100) detects a selection of the map affordance. In some embodiments, in response to detecting the selection of the map affordance, the electronic device displays, on the display (e.g., 112) (e.g., in a map application), a map indicating a location of the common place. Displaying a map indicating the location of the common place in response to detecting the selection of the map affordance in the location detail user interface enables the user to, if needed, quickly view detailed location information about the common place and/or search for a direction to the commonplace. Providing additional control options without cluttering the UI with additional displayed controls enhances the operability of the device and makes the user-device interface more efficient (e.g., by helping the user to provide proper inputs and reducing user mistakes when operating and/or interacting with the device) which, additionally, reduces power usage and improves battery life of the device by enabling the user to use the device more quickly and efficiently.

The electronic device (e.g., 100) detects (1822) a selection of the affordance (e.g., 1616, 1130B) to initiate the tracking of transfers that share the first common characteristic.

In response to detecting the selection of the affordance (e.g., 1616, 1130B), the electronic device (e.g., 100) initiates (1824) a process for adding a tracking category that tracks transfers that share the first common characteristic.

In some embodiments, initiating the process for adding the tracking category that tracks transfers that share the first common characteristic includes the electronic device (e.g., 100) concurrently displaying, on the display (e.g., 112) (e.g., in a track spending user interface), an indication (e.g., 1744D) of the first common characteristic and an indication (e.g., 1744A-1744C) of a second common characteristic (e.g., a particular location, a particular merchant, a particular category (e.g., shopping, groceries, travel, dining) that is different from that of the first common characteristic), where transfers (e.g., distinct from the past transfers) that share the second common characteristic are being tracked. Displaying the indication of the first common characteristic and the indication of the second common characteristic provides feedback about the different types of common characteristics that are being tracked. Providing improved feedback enhances the operability of the device and makes the user-device interface more efficient (e.g., by helping the user to provide proper inputs and reducing user mistakes when operating and/or interacting with the device) which, additionally, reduces power usage and improves battery life of the device by enabling the user to use the device more quickly and efficiently. In some embodiments, some (but not all) of the past transfers share the second common characteristic. In some embodiments, none of the past transfers share the second common characteristic.

In some embodiments, while the transfers that share the first common characteristic are being tracked, the electronic device (e.g., 100) displays (1826), on the display (e.g., 112) (e.g., in the user interface corresponding to the transfer account, in a home user interface, in a lock user interface), a notification (e.g., 1622, 1756; an alert) indicating a total amount (e.g., the total amount of funds spent) of transfers that share the first common characteristic that have been made relative to a set limit (e.g., a budget, a spending limit) for transfers that share the first common characteristic (e.g., during a certain period of time, such as during the past month or during the past week). In some embodiments, however, if the same transfers that share the first common characteristic are not being tracked, the electronic device displays, on the display, the notification without including the indication of the total amount (e.g., the total amount of funds spent, the total amount of points transferred) of transfers that share the first common characteristic that have been made relative to the set limit for transfers that share the first common characteristic. Displaying the notification indicating the total amount of transfers that share the first common characteristic that have been made relative to a set limit for transfers that share the first common characteristic provides (e.g., immediate) feedback to the user about transfer activity of the first common characteristic (e.g., whenever transfers that share the first common characteristic are made). Providing improved visual feedback to the user enhances the operability of the device and makes the user-device interface more efficient (e.g., by helping the user to provide proper inputs and reducing user mistakes when operating and/or interacting with the device) which, additionally, reduces power usage and improves battery life of the device by enabling the user to use the device more quickly and efficiently. In some embodiments, the electronic device determines which characteristics are being tracked. For those characteristics being tracked, the device determines whether a notification condition is met. In accordance with the notification condition being met, the notification is displayed. In accordance with the notification condition not being met, the notification is not displayed. When the notification condition is met (and not met) for a characteristic that is not being tracked, the notification is not displayed.

In some embodiments, initiating the process for adding the tracking category that tracks transfers that share the first common characteristic includes the electronic device (e.g., 100) displaying, on the display (e.g., 112), a tracking user interface (e.g., 1740), where the tracking user interface includes: a first indication (e.g., 1744D) of a total amount of the transfers that share the first common characteristic made (e.g., spent) during a respective time period (e.g., a certain set time period, such as the past month or the past statement period), and a second indication (e.g., 1744A-1477C) of a total amount of transfers that share a second common characteristic different from the first common characteristic made (e.g., spent) during the respective time period, where transfers that share the second common characteristic are being tracked. Displaying the tracking user interface that includes the first indication of the total amount of the transfers that share the first common characteristic made during the respective time period, and the second indication of the total amount of transfers that share a second common characteristic different from the first common characteristic made during the respective time period, where transfers that share the second common characteristic provides quick feedback about common characteristics that are being tracked. Providing improved visual feedback to the user enhances the operability of the device and makes the user-device interface more efficient (e.g., by helping the user to provide proper inputs and reducing user mistakes when operating and/or interacting with the device) which, additionally, reduces power usage and improves battery life of the device by enabling the user to use the device more quickly and efficiently. In some embodiments, common characteristics (e.g., a particular merchant, a particular location, a particular store, a particular area) that are not being tracked are not included in the tracking user interface. In some embodiments, some (but not all) of the past transfers have the second common characteristic. In some embodiments, none of the past transfers have the second common characteristic.

In some embodiments, subsequent to (or in response to) adding the tracking category that tracks transfers that share the first common characteristic, the electronic device (e.g., 100) receives (1828) a request to display a widget corresponding to the transfer application. In some embodiments, in response to receiving the request to display the widget corresponding to the transfer application, the electronic device displays, on the display (e.g., 112), a tracking widget (e.g., 1762) that includes (1830): a first tracked item (e.g., 1768C) corresponding to the first common characteristic, where the first tracked item includes a first indication of a total amount of the transfers that share the first common characteristic made (e.g., spent) during a respective time period (e.g., a certain set time period, such as the past month or the past statement period) (1832), and a second tracked item (e.g., 1768A-1768B) corresponding to a second common characteristic, where transfers that share the second common characteristic are being tracked, and where the second tracked item includes a second indication of a total amount of transfers that share the second common characteristic made (e.g., spent) during the respective time period (1834). Displaying the tracking widget that includes the first tracked item and the second tracked item enables the user to quickly and easily access and view summarized information about transfer categories that are being tracked. Reducing the number of inputs needed to perform an operation enhances the operability of the device and makes the user-device interface more efficient (e.g., by helping the user to provide proper inputs and reducing user mistakes when operating and/or interacting with the device) which, additionally, reduces power usage and improves battery life of the device by enabling the user to use the device more quickly and efficiently. In some embodiments, a plurality of application affordances are concurrently displayed with the widgets user interface (e.g., 1760) that includes the tracking widget. In some embodiments, activating the first tracked item causes display of an electronic wallet application. Displaying the electronic wallet application in response to detecting activation of the first racked item allows the user to quickly and easily access the electronic wallet application from the tracking widget. Reducing the number of inputs needed to perform an operation enhances the operability of the device and makes the user-device interface more efficient (e.g., by helping the user to provide proper inputs and reducing user mistakes when operating and/or interacting with the device) which, additionally, reduces power usage and improves battery life of the device by enabling the user to use the device more quickly and efficiently.

In some embodiments, the electronic device (e.g., 100) detects (1836) a transfer (e.g., a transaction) made using the transfer account, where the transfer corresponds to a third common characteristic (e.g., a particular merchant, a particular location, a particular store, a particular area). In some embodiments, in response to detecting the transfer, the electronic device displays (1838), on the display (e.g., 112) (e.g., in a home user interface, in a lock user interface), a notification (e.g., 1622, 1756; a banner notification, an alert, a prompt). Displaying the notification indicating provides (e.g., immediate) feedback to the user about transfer activity of the third common characteristic (e.g., whenever transfers that share the third common characteristic are made). Providing improved visual feedback to the user enhances the operability of the device and makes the user-device interface more efficient (e.g., by helping the user to provide proper inputs and reducing user mistakes when operating and/or interacting with the device) which, additionally, reduces power usage and improves battery life of the device by enabling the user to use the device more quickly and efficiently. In some embodiments, the notification includes an amount of the detected transfer and/or a merchant corresponding to the transfer. In some embodiments, in accordance with a determination that transfers that share the third common characteristic are being tracked, the notification includes an indication of a total amount of transfers that share the third common characteristic that have been using the transfer account (e.g., for a certain period of time, such as the current month, the current week, the current statement balance period) (1840). In some embodiments, in accordance with a determination that transfers that share the third common characteristic are not being tracked, the notification does not include the indication of the total amount of transfers that share the third common characteristic that have been using the transfer account (1842). In some embodiments, in accordance with the determination that transfers that share the third common characteristic are being tracked, the notification also includes an amount of the detected transfer. In some embodiments, in accordance with the determination that transfers that share the third common characteristic are not being tracked, the notification also includes the amount of the detected transfer.

In some embodiments, subsequent to (or in response to) initiating the process for adding the tracking category that tracks transfers that share the first common characteristic (1844), the electronic device (e.g., 100) displays (1846), in the user interface (e.g., 1602, 1128, 1702), an affordance (e.g., 1130A) to cease (or initiate a process to cease) the tracking of transfers that share the first common characteristic, where the affordance (e.g., a stop-tracking affordance) to cease the tracking of transfers that share the first common characteristic is displayed at a location in the user interface that was previously occupied by the affordance (e.g., a track affordance) to initiate tracking of transfers that share the first common characteristic in the user interface. In some embodiments, the affordance to cease the tracking of transfers is displayed at the same location on the display as the affordance to initiate tracking of transfers that share the first common characteristic was previously displayed. Displaying, in the user interface, the affordance to cease the tracking of transfers that share the first common characteristic, where the affordance to cease the tracking of transfers that share the first common characteristic is displayed at a location in the user interface that was previously occupied by the affordance to initiate tracking of transfers that share the first common characteristic in the user interface enables the user to quickly and easily recognize that transfers that share the first common characteristic are being tracked. Providing improved visual feedback to the user enhances the operability of the device and makes the user-device interface more efficient (e.g., by helping the user to provide proper inputs and reducing user mistakes when operating and/or interacting with the device) which, additionally, reduces power usage and improves battery life of the device by enabling the user to use the device more quickly and efficiently.

In some embodiments, the electronic device (e.g., 100) detects activation of the affordance (e.g., 1130A) to cease the tracking of transfers that share the first common characteristic. In some embodiments, in response to detecting activation of the affordance to cease the tracking of transfers that share the first common characteristic, the electronic device ceases (or initiates a process to cease) tracking of transfers that share the first common characteristic. In some embodiments, subsequent to (or in response to) ceasing (or initiating a process for ceasing) the tracking of transfers that share the first common characteristic (1848), the electronic device displays (1850), in the user interface (e.g., 1602, 1128, 1702), the affordance (e.g., 1616, 1130B) to initiate the process for adding the tracking category that tracks transfers that share the first common characteristic, where the affordance to initiate the process for adding the tracking category that tracks transfers that share the first common characteristic is displayed at a location in the user interface that was previously occupied by the affordance to cease the tracking of transfers that share the first common characteristic in the user interface. In some embodiments, the affordance to initiate tracking of transfers is displayed at the same location on the display as the affordance to cease the tracking of transfers that share the first common characteristic was previously displayed.

In some embodiments, subsequent to (or in response to) initiating the process for adding the tracking category that tracks transfers that share the first common characteristic, the electronic device (e.g., 100) displays (1852), on the display (e.g., 112) (e.g., in a tracking user interface for the first common characteristic), an option to set a limit amount for the transfers that share the first common characteristic (e.g., a budget). In some embodiments, the electronics device detects (1854) a user input directed to the option to set the limit amount (e.g., a user input entering or setting the budget). In some embodiments, in response to detecting the user input directed to the option, the electronic device sets (1856) the limit amount in accordance with the user input for a predetermined time period (e.g., a month, a week).

In some embodiments, subsequent to (or in response to) initiating the process for adding the tracking category that tracks transfers that share the first common characteristic (1858), in accordance with a determination that a total amount for the transfers that share the first common characteristic during the predetermined time period has reached (and/or exceeded) a threshold amount (e.g., an amount that is nearing or approaching the set budget or an amount that has exceeded the set budget), the electronics device (e.g., 100) displays (1860), on the display (e.g., 112), a warning notification indicating that the total amount has reached the threshold amount, where the warning notification is not displayed when the total amount has not reached the threshold amount. Thus, in some embodiments, the warning notification is only displayed when the total amount has reached and/or exceeded the threshold amount. In some embodiments, the electronic device provides a plurality of different warning notifications if the total amount for the transfers that share the first common characteristic has reached and/or exceeded the threshold amount. In some embodiments, the electronic device provides warning notifications more frequently than regular (non-warning) notifications that are provided when the total amount has not yet reached the threshold amount. Providing one or more warnings notifications in accordance with the determination that the total amount for the transfers that share the first common characteristic during the predetermined time period has reached (and/or exceeded) a threshold amount provides (e.g., immediate) feedback to the user that the total amount for the transfers has reached (and/or exceeded) the threshold amount, and thus that the user may need to take action accordingly (e.g., perform a balance transfer or reduce or stop transfer activity for the first common characteristic). Providing improved visual feedback to the user enhances the operability of the device and makes the user-device interface more efficient (e.g., by helping the user to provide proper inputs and reducing user mistakes when operating and/or interacting with the device) which, additionally, reduces power usage and improves battery life of the device by enabling the user to use the device more quickly and efficiently.

In some embodiments, subsequent to (or in response to) initiating the process for adding the tracking category that tracks transfers that share the first common characteristic (1862), the electronic device (e.g., 100) detects (1864) (e.g., using GPS information) that the electronic device is at a location (e.g., a store) corresponding to the first common characteristic (e.g., a merchant). In some embodiments, in response to detecting that the electronic device is at the location corresponding to the first common characteristic, the electronic device (e.g., 100) displays (1866), on the display (e.g., 112) (e.g., in a home user interface, in a lock user interface, in a widget or menus user interface), a notification (e.g., 1622, 1756, a banner notification, an alert, a prompt) indicating that the electronic device is at the location corresponding to the first common characteristic, where the notification includes an indication of a trend of transfers corresponding to the first common characteristics (e.g., made at locations, such as stores, corresponding to the first common characteristic, such as a merchant) during a predetermined time period (e.g., the past month, the past 3 months, the past year).

In some embodiments, while displaying the user interface (e.g., 1602, 1702), the electronic device (e.g., 100) detects a selection of a transfer item corresponding to a transfer (e.g., a past payment, purchase, or bill). In some embodiments, the transfer was made at a location of a common place (e.g., at a store of the merchant). In some embodiments, in response to detecting the selection of the transfer item, the electronic device displays, on the display (e.g., 112), a transfer detail user interface (e.g., 1720) corresponding to the transfer corresponding to the selected transfer item. In some embodiments, the transfer was made at the location of the common place. In some embodiments, the transfer detail user interface includes information about the corresponding transfer, such as an amount of the transfer (e.g., 1722), a date and/or time of the transfer (e.g., 1728), the particular location of the transfer (e.g., 1736).

In some embodiments, the transfer detail user interface (e.g., 1720) includes a splitting affordance (e.g., 1734). In some embodiments, while displaying the transfer detail user interface, the electronic device (e.g., 100) detects a selection of the splitting affordance. In some embodiments, in response to detecting the selection of the splitting affordance, the electronic device initiates a process for splitting the transfer with the at least one other person (e.g., splitting the payment, purchase, or bill with one or more additional people).

In some embodiments, the transfer detail user interface (e.g., 1720) includes a receipt affordance (e.g., 1732). In some embodiments, while displaying the transfer detail user interface, the electronic derive (e.g., 100) detects a selection of the receipt affordance. In some embodiments, in response to detecting the selection of the receipt affordance, the electronic device displays, on the display (e.g., 112), (e.g., information corresponding to, an image of) a receipt (e.g., a copy of the original receipt) corresponding to the transfer. In some examples, the receipt includes an itemized list of products and/or services purchased. In some examples, the receipt includes an itemized list of taxes paid.

In some embodiments, the transfer detail user interface (e.g., 1720) includes a dispute affordance. In some embodiments, while displaying the transfer detail user interface, the electronic device (e.g., 100) detects a selection of the dispute affordance. In some embodiments, in response to detecting the selection of the dispute affordance, the electronic device initiates a process for disputing the transfer (e.g., by displaying a contact page for entering information about and registering the dispute; by placing a call to a registered dispute number).

In some embodiments, the electronic device (e.g., 100) detects (1868) (e.g., while displaying a user interface (e.g., 710, 887, 1702) corresponding to the transfer account) a selection of a search affordance (e.g., 871). In some embodiments, in response to detecting the selection of the search affordance, the electronic device displays a search user interface (e.g., 1166). In some embodiments, subsequent to (or in response to) detecting the selection of the search affordance, the electronic device receives (1870) user input that includes one or more search terms. In some embodiments, in response to receiving the user input, the electronic device identifies (1872), based on the one or more search terms, a searched common characteristic. In some embodiments, in response to identifying the searched common characteristic, the electronic device displays (1874), on the display, options to: track transfers that share the searched common characteristic, where the searched common characteristic is a location (e.g., a particular region or area) (1876), set a limit amount (e.g., a budget) for transfers that share the searched common characteristic (e.g., for a predetermined amount of time) (1878), and generate an expense report that includes information corresponding to transfers made using the transfer account that share the searched common characteristic (1880). Displaying options to track transfers that share the searched common characteristic, set a limit amount for transfers that share the searched common characteristic, and generate an expense report that includes information corresponding to transfers made using the transfer account that share the searched common characteristic in response to identifying the searched common characteristic enables the user to quickly and easily manage transfers that share the searched common characteristic from the search user interface. Providing additional control options without cluttering the UI with additional displayed controls enhances the operability of the device and makes the user-device interface more efficient (e.g., by helping the user to provide proper inputs and reducing user mistakes when operating and/or interacting with the device) which, additionally, reduces power usage and improves battery life of the device by enabling the user to use the device more quickly and efficiently.

In some embodiments, in response to (or subsequent to) detecting a user input directed to selecting the option to track transfers that share the searched common characteristic, the electronic device (e.g., 100) begins tracking transfers that share the searched common characteristic (e.g., provides notifications and/or prompts about transfers that share the searched common characteristic, including a total amount of the transfers). In some embodiments, in response to detecting a user input directed to selecting the option to set a limit amount (e.g., a budget) for transfers that share the searched common characteristic, the electronic device (e.g., 100) enables the user to select or enter the limit amount. In some embodiments, in response to (or subsequent to) detecting the selection of the limit amount, the electronic device (e.g., 100) initiates a process for enforcing the limit amount on transfers that share the searched common characteristic. In some embodiments, in response to detecting a user input directed to generating the expense report, the electronic device (e.g., 100) displays, on the display (e.g., 112), a list of items that include detailed information related to the transfers (e.g., including detailed information related to the transfers, such as the amount, date, and location of the transfers, the parties involved in the transfers, and/or receipts corresponding to the transfers).

In some embodiments, in response to identifying the searched common characteristic, the electronic device (e.g., 100) displays (1882), on the display (e.g., 112), an indication (e.g., 1180) of the searched common characteristic. In some embodiments, the electronic device (e.g., 100) detects (1884) a selection of the indication of the searched common characteristics. In some embodiments, in response to detecting the selection of the indication of the searched common characteristic, the electronic device displays (1886), on the display (e.g., 112), sub-characteristics (e.g., 1182A-1182C) corresponding to a subset of the searched common characteristic (e.g., if the searched common characteristic is a particular category, such as a particular region or area, the sub-characteristics are sub-categories of that particular category, such as locations within the particular region or area). In some embodiments, transfers can also be tracked based on common sub-characteristics. That is, in some embodiments, the electronic device can track transfers that share a particular common sub-characteristic as it can track transfers that share a particular common characteristic, as described in greater detail above with reference to FIGS. 17C-17G.

Note that details of the processes described above with respect to method 1800 (e.g., FIGS. 18A-18F) are also applicable in an analogous manner to the methods described above and below. For example, method 900 optionally includes one or more of the characteristics of the various methods described above with reference to method 1800. For example, one or more transfer categories for transfers made using the transfer account activated in method 900 can be tracked using the process described in method 1800. For another example, method 1200 optionally includes one or more of the characteristics of the various methods described above with reference to method 1800. For example, information and/or notifications about transfer categories that are being tracked using the process described in method 1800 can be displayed and/or summarized in the summary user interface of method 1200. For another example, method 1500 optionally includes one or more of the characteristics of the various methods described above with reference to method 1800. For example, transfer categories that are being tracked using the process of method 1800 can be displayed on a representation of the transfer account using the visual effect and/or feedback described in method 1500. For another example, method 2100 optionally includes one or more of the characteristics of the various methods described above with reference to method 1800. For example, the balance transfer user interface described in method 2100 can be used to initiate a balance transfer for a balance amount corresponding to one or more transfers that are being tracked using the process described in method 1800. For another example, method 2400 optionally includes one or more of the characteristics of the various methods described above with reference to method 1800. For example, one or more categories corresponding to transfers made using the authentication credential described in method 2400 can be tracked using the process described in method 1800. For another example, method 2700 optionally includes one or more of the characteristics of the various methods described above with reference to method 1800. For example, one or more categories corresponding to transfers made using the physical account object activated in method 2700 can be tracked using the process described in method 1800. For another example, method 3000 optionally includes one or more of the characteristics of the various methods described above with reference to method 1800. For example, the balance summary user interface element described in method 3000 can be used to reduce the balance of transfers corresponding to transfer categories that are being tracked using the process described in method 1800. For brevity, these details are not repeated below.

FIG. 18G is a flow diagram illustrating a method for managing the tracking of a usage category, in accordance with some embodiments. Method 1801 is performed at an electronic device (e.g., 100, 300, 500) with a display (e.g., 112) and one or more input devices (e.g., the touch screen of display 112, menu button 204, push button 206). Some operations in method 1801 are, optionally, combined, the orders of some operations are, optionally, changed, and some operations are, optionally, omitted.

As described below, method 1801 provides an intuitive way for managing a user account. The method reduces the cognitive burden on a user for managing a user account, thereby creating a more efficient human-machine interface. For battery-operated computing devices, enabling a user to manage a user account faster and more efficiently conserves power and increases the time between battery charges.

The electronic device (e.g., 100) displays (1802, 1803), on the display (e.g., 112), a user interface (e.g., 1602, 1612) corresponding to a user account. The user interface (e.g., 1602, 1612) includes a plurality of user interface objects (e.g., 1610) corresponding to past activity using the user account (1804, 1805). The user interface (e.g., 1602) includes an indication of a first common characteristic of the past activity (1806, 1807). The user interface (e.g., 1602, 1612) includes an affordance (e.g., 1616) to initiate tracking of activity that shares the first common characteristic (1808, 1809).

The electronic device (e.g., 100) detects (1822, 1811) a selection of the affordance (e.g., 1616) to initiate the tracking of activity that shares the first common characteristic.

In response to detecting the selection of the affordance (e.g., 1616), the electronic device (e.g., 100) initiates (1824, 1813) a process for adding a tracking category that tracks activity that shares the first common characteristic.

In some embodiments, the user account corresponds to a computer storage account. In some embodiments, using the user account includes requesting storage of data onto available computer storage resources (e.g., an available MB or GB amount of computer resources) associated with the computer storage account.

In some embodiments, the user account corresponds to a financial account. In some embodiments, using the user account includes making purchases based on financial resources (e.g., credit or money) associated with the financial account.

In some embodiments, the user account is a transfer account, and the technique described with respect to FIG. 18G includes some or all aspects of the technique described above with respect to FIGS. 18A-18F.

FIGS. 19A-19B illustrate exemplary user interfaces for managing a selection of a numerical value, in accordance with some embodiments. The user interfaces in these figures are used to illustrate the processes described below, including the processes in FIGS. 21A-21F.

FIG. 19A illustrates electronic device 100 displaying, on display 112, a data deletion user interface 1902 (e.g., similar to balance transfer user interface 1142 described below with reference to FIG. 20B). In some embodiments, data deletion user interface 1902 enables a selection of an amount of data to be deleted from data that is stored and/or archived on the computer storage resources associated with the user account (e.g., a computer storage account).

In some embodiments, data deletion user interface 1902 includes a selector user interface element 1904 (e.g., shaped as a circular, closed loop) with a selection indicator 1908 that enables a selection of the amount of data to be deleted by moving selection indicator 1908 along selector user interface element 1904. In some embodiments, data deletion user interface 1902 includes an indication 1910 showing the amount of data that is currently selected by selection indicator 1908 on selector user interface element 1904.

In some embodiments, selector user interface element 1904 includes a minimum selectable value position (e.g., near the top region of the circular, closed loop shape of the user interface element) that corresponds to a lowest amount of data that can be selected to be deleted from data that is stored and/or archived on the computer storage resources associated with the user account (e.g., a computer storage account). In some embodiments, selector user interface element 1904 includes a maximum selectable value position (e.g., near the top region of the circular, closed loop shape of the user interface element) that corresponds to a highest amount of data that can be selected to be deleted from data that is stored and/or archived on computer storage resources associated with the user account (e.g., a computer storage account)—all of the data that is currently stored and/or archived on the computer storage resources associated with the user account.

In some embodiments, selector user interface element 1904 includes a plurality of suggested selectable data amounts that are indicated on the user interface element via suggested amount indicators 1906A-1906E. In some embodiments, suggested amount indicator 1906D corresponds to a data amount corresponding to the full amount of data that should be deleted from the computer storage resources associated with the user account (e.g., a computer storage account) for a respective time period (e.g., a previous month) to fully avoid a use quota reduction penalty on the user account. In some embodiments, suggested amount indicator 1806E corresponds to a data amount corresponding an amount that is greater than the full amount of data that should be deleted from the computer storage resources associated with the user account (e.g., a computer storage account) for the respective time period (e.g., a previous month) but less than an amount representing all of the data that is currently stored and/or archived on the user account.

In some embodiments, suggested amount indicator 1906A corresponds to a suggested selectable data amount to be deleted from the computer storage resources associated with the user account (e.g., a computer storage account) that would enable the avoidance of a basic use quota reduction penalty. In some embodiments, suggested amount indicator 1906B corresponds to a suggested selectable data amount to be deleted from the computer storage resources associated with the user account (e.g., a computer storage account) that would enable the data to be deleted at a reasonable rate over a first period of time (e.g., 2 years, 1.5 years, 1 year). In some embodiments, suggested amount indicator 1906C corresponds to a suggested selectable data amount to be deleted from the computer storage resources associated with the user account (e.g., a computer storage account) that would enable the data to be deleted at a reasonable rate over a second period of time (e.g., 9 months, 6 months, 3 months).

In some embodiments, data deletion user interface 1902 includes a delete later affordance 1914 for scheduling an amount of data to be (e.g., automatically) deleted from the computer storage resources associated with the user account (e.g., a computer storage account) at a future time. In some embodiments, data deletion user interface 1902 includes a delete now affordance for initiating the deletion of the selected amount of data (e.g., selected via selector user interface element 1904 and selection indicator 1908) from the computer storage resources associated with the user account (e.g., a computer storage account). In some embodiments, data deletion user interface 1902 includes a keyboard affordance 1918 for causing display of a keyboard or keypad to manually enter an amount (e.g., using numerical values on the keyboard or keypad) of data for deletion from the computer storage resources associated with the user account (e.g., a computer storage account).

In some embodiments, data deletion user interface 1902 includes a message region 1912 that shows information about different amounts of data that are suggested to be deleted from the computer storage resources associated with the user account (e.g., a computer storage account). In FIG. 19A, message region 1912 includes an indication of a suggested amount that corresponds to the amount that is currently selected via selector user interface element 1904 and selection indicator 1908—the full amount of data that should be deleted from the computer storage resources associated with the user account (e.g., a computer storage account) for a respective time period (e.g., a previous month) to fully avoid a use quota reduction penalty on the user account.

In FIG. 19B, selection indicator 1908 is moved on selector user interface element 1904 to a position on the user interface element corresponding to suggested amount indicator 1906A. In some embodiments, because suggested amount indicator 1906A corresponds to a suggested selectable data amount to be deleted from the computer storage resources associated with the user account (e.g., a computer storage account) that would enable the avoidance of a basic use quota reduction penalty, but would still result in a regular use quota reduction penalty (for not having deleted the full amount corresponding to suggested amount indicator 1906D), electronic device 100 displays, in data deletion user interface 1902, a penalty indication 1920 showing the amount of the use quota reduction penalty that would result from deleting the currently-selected data mount (in this example, 50 MB, as indicated by indication 1910).

In some embodiments, in response to detecting that selection indicator 1908 is moved on selector user interface element 1904, electronic device 100 accordingly updates the displayed message in message region 1912 based on the new selected data amount. In this example, in response to detecting that selection indicator 1908 is moved to a location on selector user interface element 1904 corresponding to suggested amount indicator 1906A, electronic device 100 displays, in message region 1912, an indication that the currently-selected amount is greater than the data amount that was deleted from the computer storage resources associated with the user account (e.g., a computer storage account) during the previous deletion time period (e.g., the previous month).

FIGS. 20A-20AF illustrate exemplary user interfaces for managing a transfer of items, in accordance with some embodiments. The user interfaces in these figures are used to illustrate the processes described below, including the processes in FIGS. 21A-21F.

FIG. 20A illustrates electronic device 100 displaying, on display 112, summary user interface 887 including representation 870 of the transfer account (e.g., the first-party credit account; the points account) showing plurality of particles 1406A-1406C, as described above with reference to FIGS. 14A-14U, and balance transfer user interface element 881 (e.g., a balance payment module). As mentioned, in some embodiments, the transfer account is a first-party credit account (e.g., a revolving credit account that is issued or branded by the manufacturer of the electronic device), and provides rewards (e.g., cash back rewards) based on the amount of transfers (e.g., payment transactions; points transfer) made using the transfer account (e.g., cash back rewards that are based on a certain percentage of the value of each transition). As also mentioned, in some embodiments, the transfer account is a points account (e.g., for meal points, for printer credits, for membership points) that provides rewards (e.g., points rewards) based on the amount of points used using the transfer account.

In FIG. 20A, while displaying summary user interface 887 of the transfer account (e.g., the first-party credit account; the points account), electronic device 100 detects a selection 2001 of balance transfer user interface element 881 (e.g., of indicator 881A of user interface element 881).

Figure 20B:
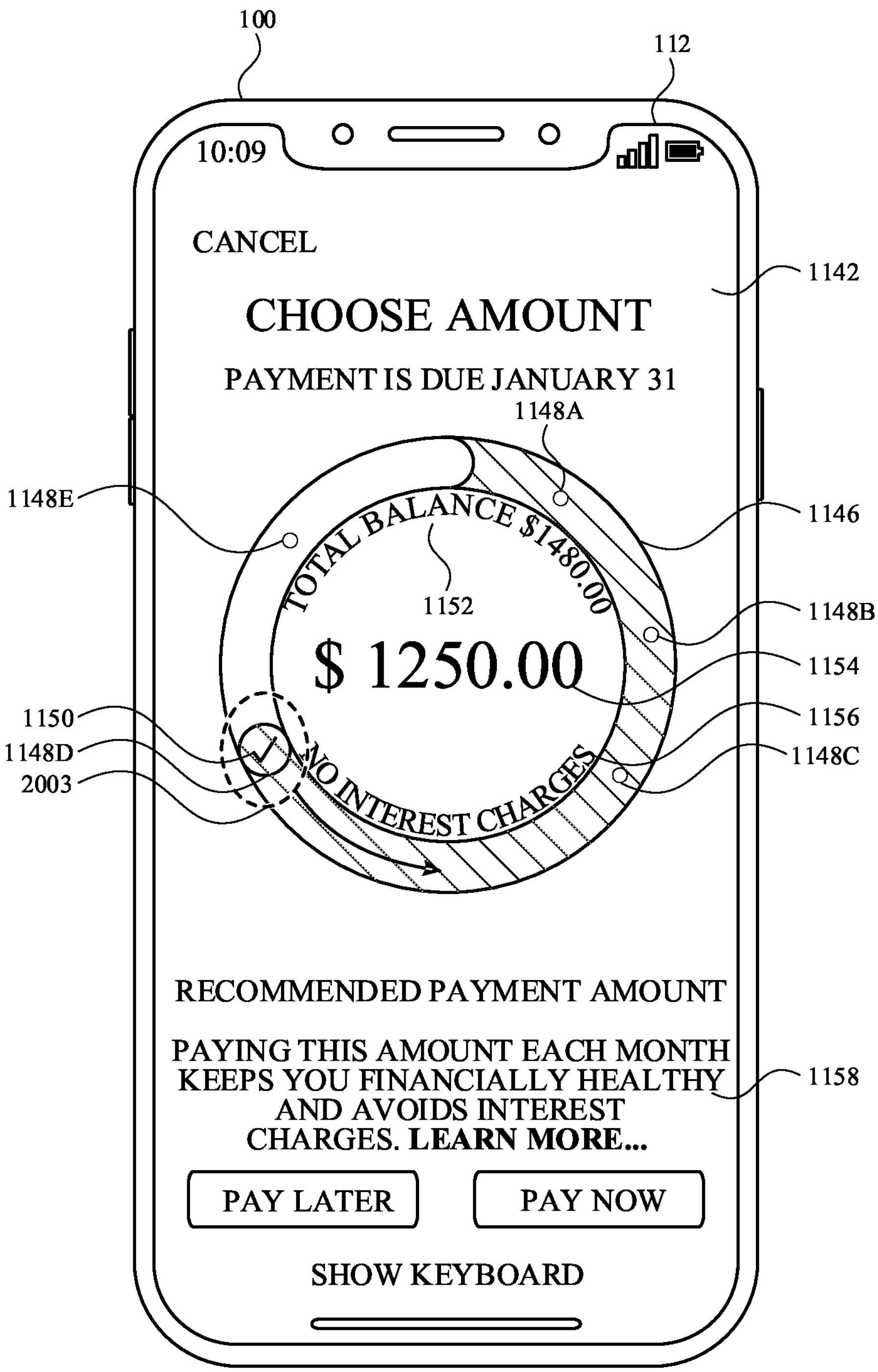
Figure 20C:
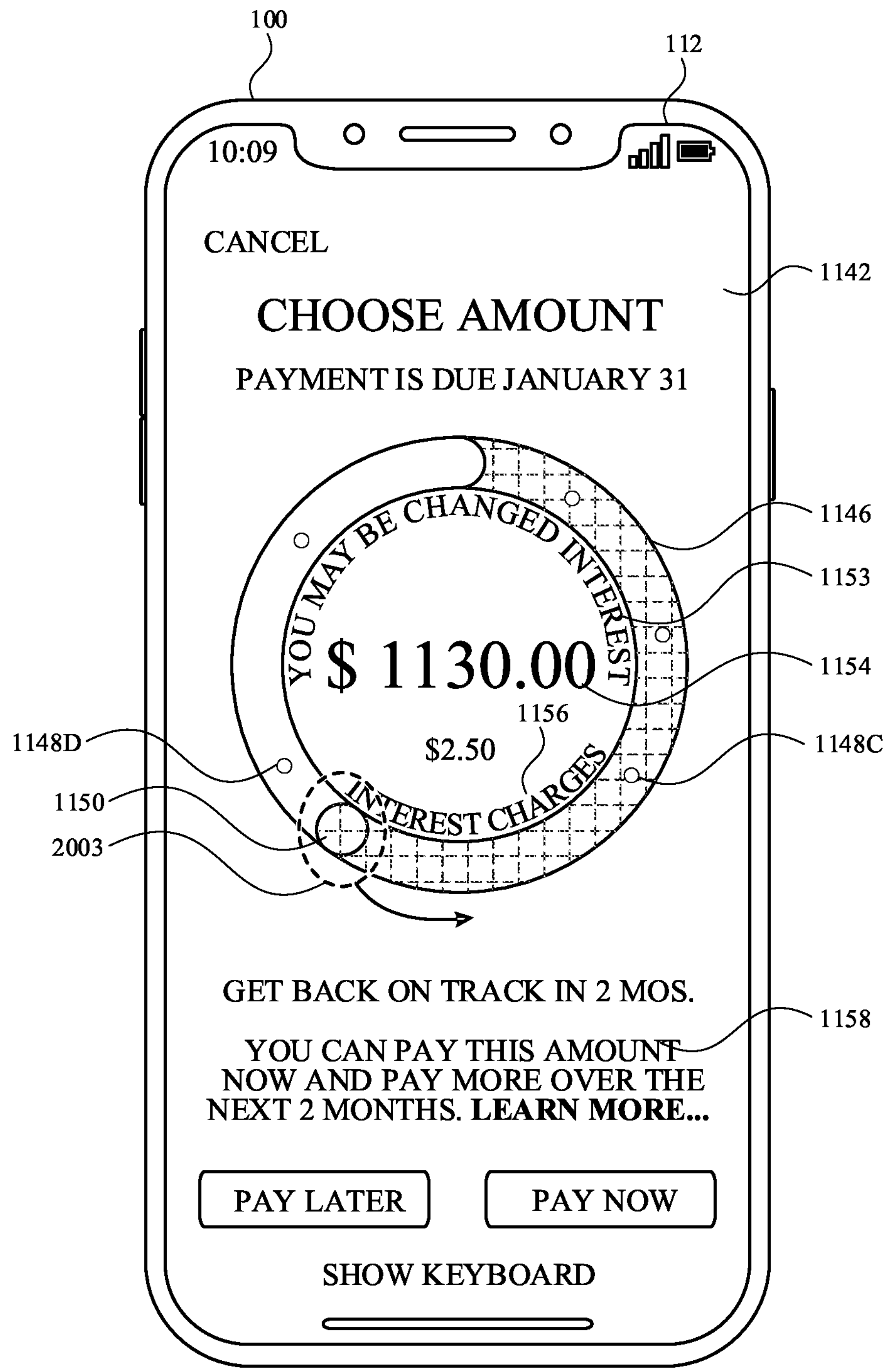
Figure 20D:
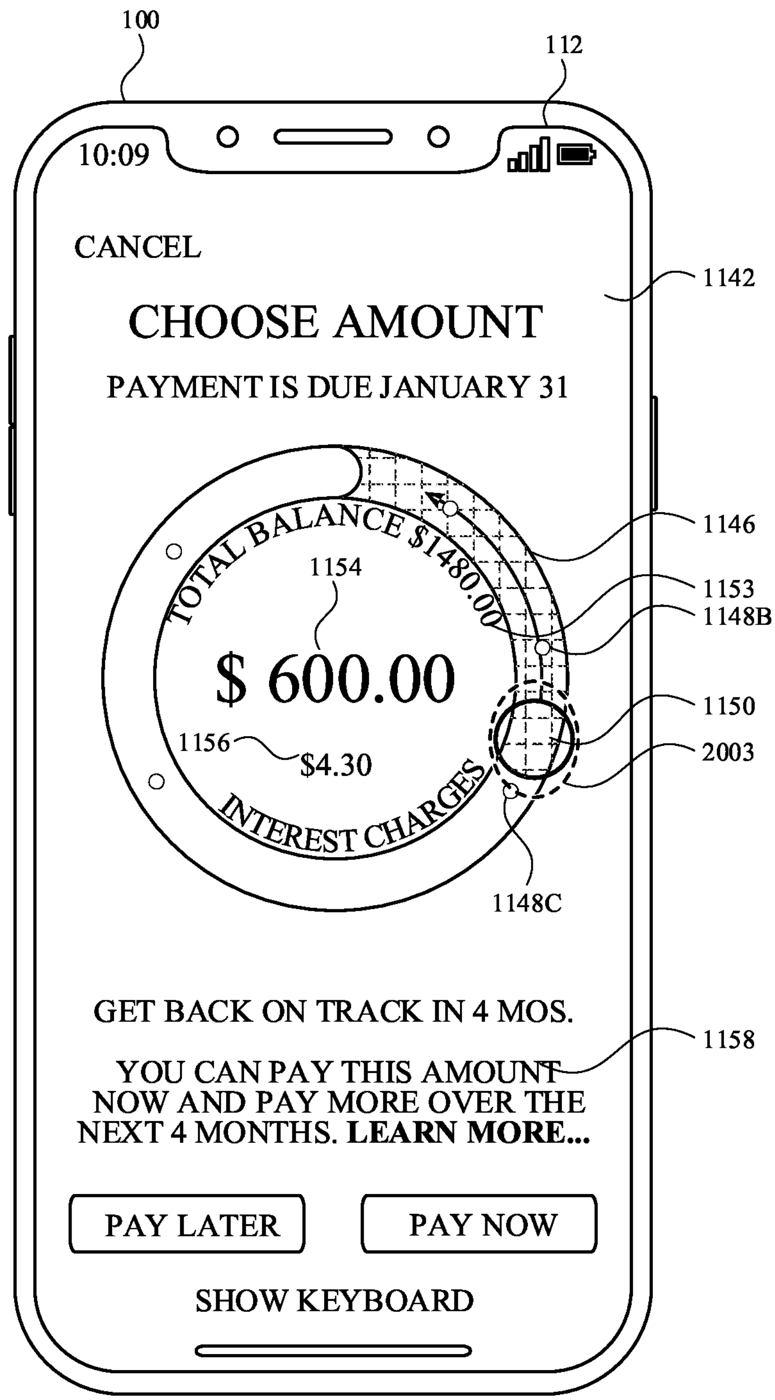

In FIG. 20B, in response to detecting selection 2001 of balance transfer user interface element 881, electronic device 100 displays, on display 112, balance transfer user interface 1142 corresponding to the transfer account (e.g., the first-party credit account; the points account), as first described above with reference to FIG. 11J. As discussed, balance transfer user interface 1142 includes selector user interface element 1146 with selection indicator 1150. Electronic device 100 detects (or determines) an amount for a balance transfer (e.g., an amount for a balance payment) based on the location of selection indicator 1150 along the defined path (e.g., a circular, closed-loop path) of selector user interface element 1146.

In some embodiments, selector user interface element 1146 further includes plurality of proposed amount indicators 1148A-1148E corresponding to proposed balance transfer amounts (e.g., proposed balance payment amounts). As already discussed, the defined path of selector user interface element 1146 further includes, along the defined path, a plurality of proposed amount indicators 1148A-1148E corresponding to proposed balance transfer amounts (e.g., proposed balance payment amounts). In some embodiments, the plurality of proposed amount indicators include a proposed amount indicator (e.g., proposed amount indicator 1148A) corresponding to an amount that is greater than the minimum balance transfer amount (e.g., and is the same as or greater than a previous balance transfer amount) but is still a relatively small amount. In some embodiments, the plurality of proposed amount indicators include another proposed amount indicator (e.g., a proposed amount indicator 1148D) corresponding to a balance transfer amount (e.g., the full statement amount) that would fully avoid a penalty (e.g., interest) for the current balance transfer period (e.g., the current statement period). In some embodiments, the plurality of proposed amount indicators include another proposed amount indicator (e.g., a proposed amount indicator 1148E) corresponding to an amount that is greater than the balance transfer amount that would fully avoid a penalty for the current balance transfer period (e.g., greater than the full statement amount) but smaller than the maximum balance transfer amount (e.g., less than all of the current balance). In some embodiments, the plurality of proposed amount indicators include one or more additional proposed amount indicators (e.g., proposed amount indicators 1148B, 1148C) corresponding to balance transfer amounts (e.g., balance payment amounts) that are determined based on the full amount of the remaining balance of the transfer account, past balance transfer history (e.g., past balance payment history), and/or an afforded time period (e.g., 3 months 6 months) to be provided to fully reduce the remaining balance of the transfer account (e.g., to fully pay off the balance of the account). In some embodiments, balance transfer user interface 1142 also includes information region 1158 describing an effect or result of making a balance transfer (e.g., a balance payment) based on the currently-selected balance transfer amount.

In some embodiments, in response to detecting selection 2001 of balance transfer user interface element 881, electronic device 100 displays (e.g., by default) selection indicator 1150 at a location on the defined path of selector user interface element 1146 that corresponds to a balance transfer amount (e.g., the full statement amount) that would fully avoid a penalty (e.g., interest) for the current balance transfer period (e.g., the current statement period). Thus, in some embodiments, electronic device 100 displays, by default, selection indicator 1150 at the location on the defined path of selector user interface element 1146 corresponding to proposed amount indicator 1148D. In some embodiments, in response to detecting selection 2001 of balance transfer user interface element 881, electronic device 100 displays (e.g., by default) selection indicator 1150 at a location on the defined path of selector user interface element 1146 that corresponds to the minimum balance transfer amount (e.g., the minimum balance payment amount that would avoid a penalty, such as a late fee, as depicted in FIG. 11J).

In FIG. 20B, electronic device 100 is displaying selection indicator 1150 at the location corresponding to proposed amount indicator 1148D on the defined path of selector user interface element 1146. In some embodiments, in accordance with a determination that selection indicator 1150 is on the position of proposed amount indicator 1148D (e.g., corresponding to the full statement balance; corresponding to a balance transfer amount that would fully avoid a penalty (e.g., interest) for the current balance transfer period), electronic device 100 displays, in selection indicator 1150, a visual indication (e.g., a symbol, such as a checkmark) that the selection indicator is at a position corresponding to a balance transfer amount that would fully avoid a penalty (e.g., interest) for the current balance transfer period.

In some embodiments, the portion of the defined path from a beginning terminus position of the defined path (e.g., if the defined path is a circular, closed-loop path, the 12 o'clock position of the defined path) to the current position of selection indicator 1150 is displayed with a visual characteristic (e.g., a particular color), where the type of the visual characteristic that is displayed is dependent upon the location of selection indicator 1150 along the defined path and the corresponding value of the selected transfers amount when the selection indicator 1150 is at its current location.

For example, if selection indicator 1150 is at a position on the defined path corresponding to proposed amount indicator 1148A or at a position that corresponds to a value that is less than the value corresponding to the position on the defined path corresponding to proposed amount indicator 1148A (e.g., a position closer to the beginning terminus position of the defined path), electronic device 100 displays the portion of the defined path (e.g., and the selection indicator itself) from the beginning terminus position of the defined path (e.g., if the defined path is a circular, closed-loop path, the 12 o'clock position of the defined path) to the position of selection indicator 1150 with a first visual characteristic (e.g., a first color, such as red). In some example, the device prevents the user from moving selector indicator 1150 to a position on the defined path that corresponds to a value that is less than the value of amount indicator 1148A. For another example, if selection indicator 1150 is at a position on the defined path that corresponds to a value that is less than the value of the position of proposed amount indicator 1148D but more than the value of the position of proposed amount indicator 1148A (e.g., a position on the defined path that is between proposed amount indicator 1148A and proposed amount indicator 1148D), electronic device 100 displays the portion of the defined path (e.g., and the selection indicator itself) from the beginning terminus position of the defined path (e.g., if the defined path is a circular, closed-loop path, the 12 o'clock position of the defined path) to the position of selection indicator 1150 with a second visual characteristic (e.g., a second color, such as yellow). For another example, if selection indicator 1150 is at a position on the defined path that corresponds to proposed amount indicator 1148D, electronic device 100 displays the portion of the defined path (e.g., and the selection indicator itself) from the beginning terminus position of the defined path (e.g., if the defined path is a circular, closed-loop path, the 12 o'clock position of the defined path) to the position of selection indicator 1150 with a third visual characteristic (e.g., a third color, such as green). For another example, if selection indicator 1150 is at a position on the defined path that corresponds to a value on the defined path that is more than the value of the position on the defined path of proposed amount indicator 1148D (e.g., a position farther from the beginning terminus position of the defined path than proposed amount indicator 1148D), electronic device 100 displays the portion of the defined path (e.g., and the selection indicator itself) from the beginning terminus position of the defined path (e.g., if the defined path is a circular, closed-loop path, the 12 o'clock position of the defined path) to the position of selection indicator 1150 with a fourth visual characteristic (e.g., a fourth color, such as blue).

In some embodiments, balance transfer user interface 1142 includes indication 1154 of the currently-selected balance transfer amount (e.g., balance payment amount; points transfer amount) based on the location of selection indicator 1150 on the defined path of selector user interface element 1146.

In FIG. 20B, electronic device 100 displays, in indication 1154, an amount corresponding to the balance transfer amount (e.g., the full statement amount) that would fully avoid a penalty (e.g., interest) for the current balance transfer period (e.g., the current statement period), as selection indicator 1150 is positioned on proposed amount indicator 1148D. In some embodiments, in accordance with a determination that selection indicator 1150 is positioned on the defined path of selector user interface element 1146 such that it corresponds to a position (e.g., position of the minimum selectable amount; position of proposed amount indicator 1148D) that corresponds to a balance transfer amount (e.g., a balance payment amount) that is an imposed defined value for the current balance period (e.g., the full statement amount based on the total amount of transfers for the current balance period; the minimum allowed balance transfer amount for the current balance period), electronic device 100 displays, in indication 1154, the exact value corresponding to the amount of the selected balance transfer (e.g., by forgoing to round the value, such as to a value (e.g., dollar amount) that is a multiple of 10 or a multiple of 50). In some embodiments, in accordance with a determination that selection indicator 1150 is positioned on the defined path of selector user interface element 1146 such that it corresponds to a position that does not correspond to a balance transfer amount (e.g., a balance payment amount) that is an imposed defined value for the current balance period (e.g., and instead corresponds to a position of a proposed amount indicator that corresponds to a recommended transfer amount determined based on the user's past balance transfer habits, such as proposed amount indicator 1148B and 1148C), electronic device 100 displays, in indication 1154, the a rounded value (e.g., an amount (e.g., dollar amount) that is a multiple of 10 or a multiple of 50) based on the position of selectable indicator 1150 and/or based on the correspond proposed amount indicator.

In FIG. 20B, while displaying balance transfer user interface 1142 (e.g., with selection indicator 1150 at the location corresponding to proposed amount indicator 1148D on the defined path of selector user interface element 1146), electronic device 100 detects a user input 2003 directed to shifting (e.g., dragging; changing the location of) selection indicator 1150 along the defined path of selector user interface element 1146 (e.g., in a counter-clockwise direction).

Figure 20E:
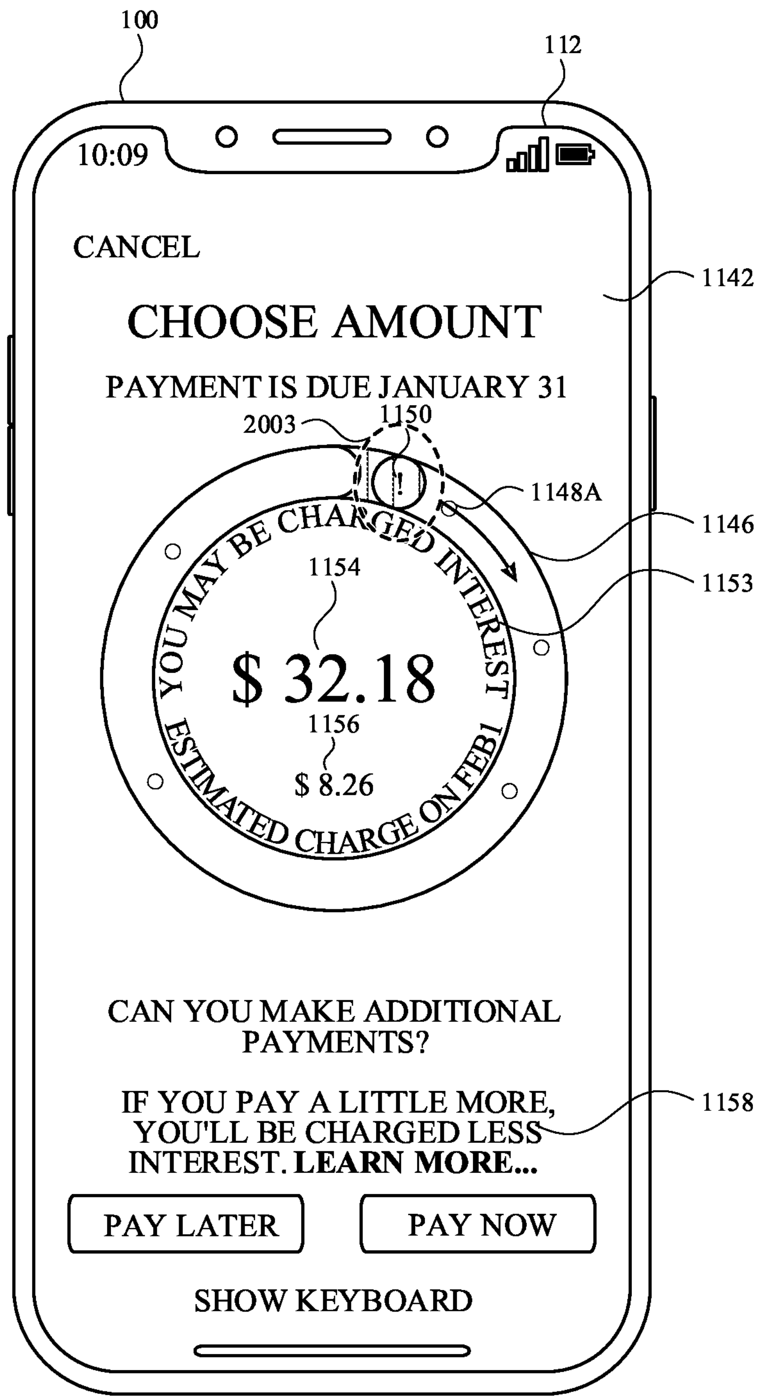

In FIGS. 20B-20E, electronic device 100 detects (e.g., via the touch screen of display 112), a user input 2003 (e.g., a hold-and-drag input) directed to moving (e.g., dragging, sliding) selection indicator 1150 along the defined path of selector user interface element 1146 from its position in FIG. 20B (e.g., corresponding to proposed amount indicator 1148D) to its position in FIG. 20E (e.g., corresponding to the minimum value (e.g., the minimum balance payment amount) that would avoid a penalty and the minimum value that is selectable using selector user interface element 1146).

In some embodiments, while electronic device 100 detects that selection indicator 1150 is being moved (e.g., dragged, slid) on the defined path of selector user interface element 1146 via a user input, and selection indicator 1150 approaches a proposed amount indicator (e.g., proposed amount indicators 1148A 1148B, 1148C) on the defined path, electronic device 100 displays a "snapping" motion of selection indicator 1150 to the proposed amount indicator. That is, in some embodiments, a proposed amount indicator along the defined path acts like a magnetic pulling selection indicator 1150 as it is approaching and/or leaving the respective proposed amount indicator's position on the defined path. In some embodiments, in addition to displaying the "snapping" motion of selection indicator 1150 to a proposed amount indicator, electronic device 100 also generates (e.g., using haptic feedback controller 161 and/or haptic feedback module 133) a tactile output when selection indicator 1150 approaches a proposed amount indicator on the defined path.

In some embodiments, as also shown in FIGS. 20B-20E, electronic device 100 updates display of indication 1156 of a penalty (e.g., interest) that may be enforced (e.g., charged) on the transfer account based on a currently-selected balance transfer amount as the device detects selection indicator 1150 being moved (e.g., dragged, slid) on the defined path. That is, electronic device 100 displays the corresponding penalty amount, as shown by indication 1156, increasing as the device detects selection indicator 1150 being moved towards its position in FIG. 20B to its position in FIG. 20E (e.g., the electronic device shows the interest charge increasing as the currently-selected balance payment amount is being reduced).

In some embodiments, as also shown in FIGS. 20B-20E, electronic device 100 updates display of information region 1158 describing the effect or result of making a balance transfer (e.g., a balance payment) based on the currently-selected balance transfer amount in response to detecting the change in the currently-selected balance transfer amount as the device detects selection indicator 1150 being moved (e.g., dragged, slid) on the defined path.

In FIG. 20E, in response to detecting user input 2003 directed to moving (e.g., dragging, sliding) selection indicator 1150 along the defined path of selector user interface element 1146 from its position in FIG. 20B (e.g., corresponding to proposed amount indicator 1148D) to its position in FIG. 20E (e.g., corresponding to the minimum value point corresponding to the minimum balance payment amount that would avoid a penalty and the minimum value that is selectable using selector user interface element 1146), electronic device 100 displays selection indicator 1150 at a position on the defined path of selector user interface element 1146 corresponding to a minimum selectable amount. That is, in some embodiments, electronic device 100 prevents selection indicator 1150 from being moved past (e.g., from being moved from a position that corresponds to a value less than; from being moved more towards the 12 o'clock position of selector user interface element 1146) the position on the defined path corresponding to the minimum selectable amount. In some embodiments, in response to detecting that selection indicator 1150 is moved to the position on the defined path corresponding to the minimum selectable amount, electronic device 100 displays, in selection indicator 1150, a visual indication (e.g., a symbol, such as an exclamation mark) that the currently-selected transfer amount (e.g., the currently-selected balance payment amount) corresponds to minimum selectable value, and thus that the transfer account may incur a penalty (e.g., a late fee) if only a transfer for the minimum selectable amount is made by the due date.

Figure 20F:
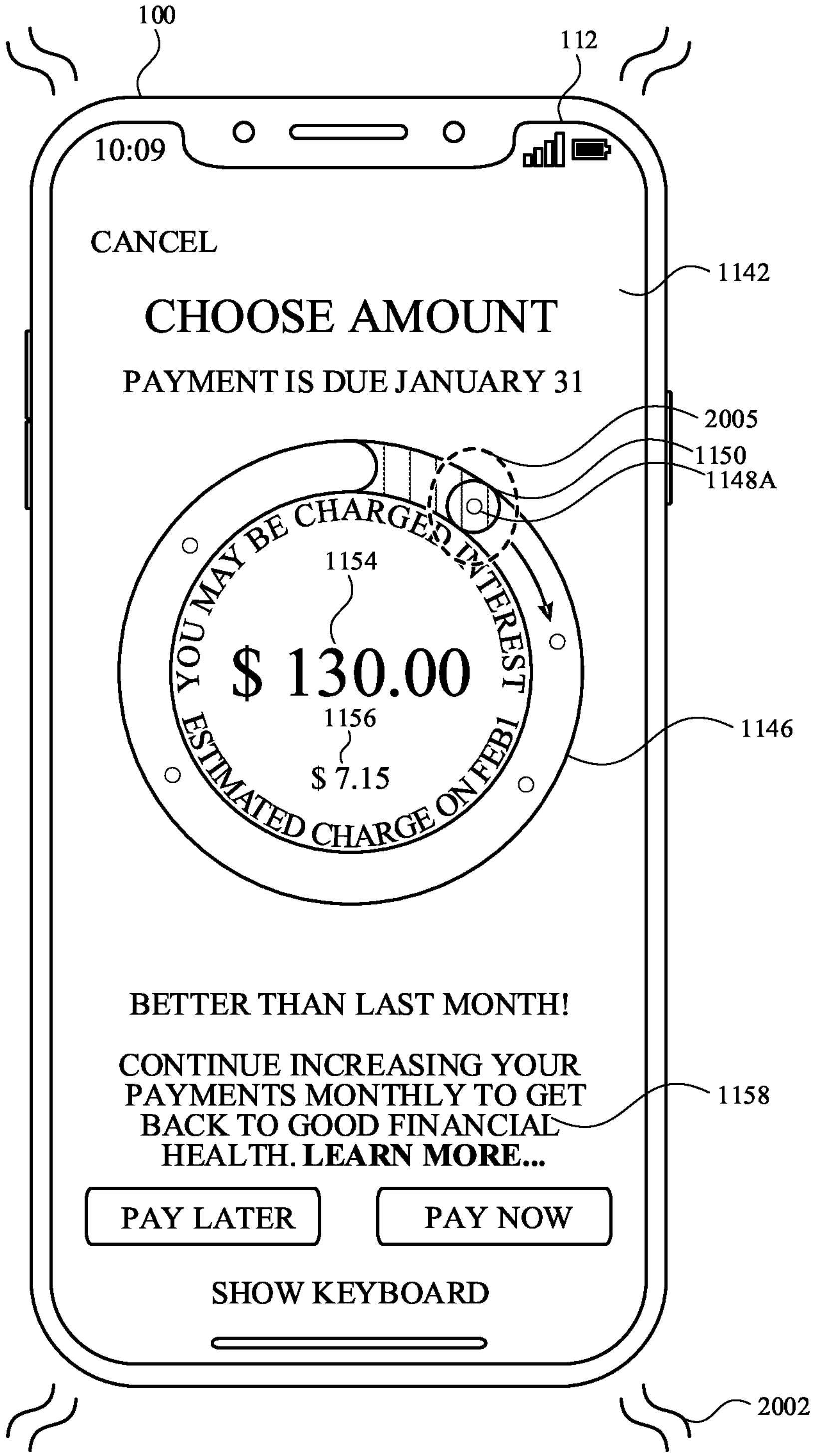
Figure 20G:
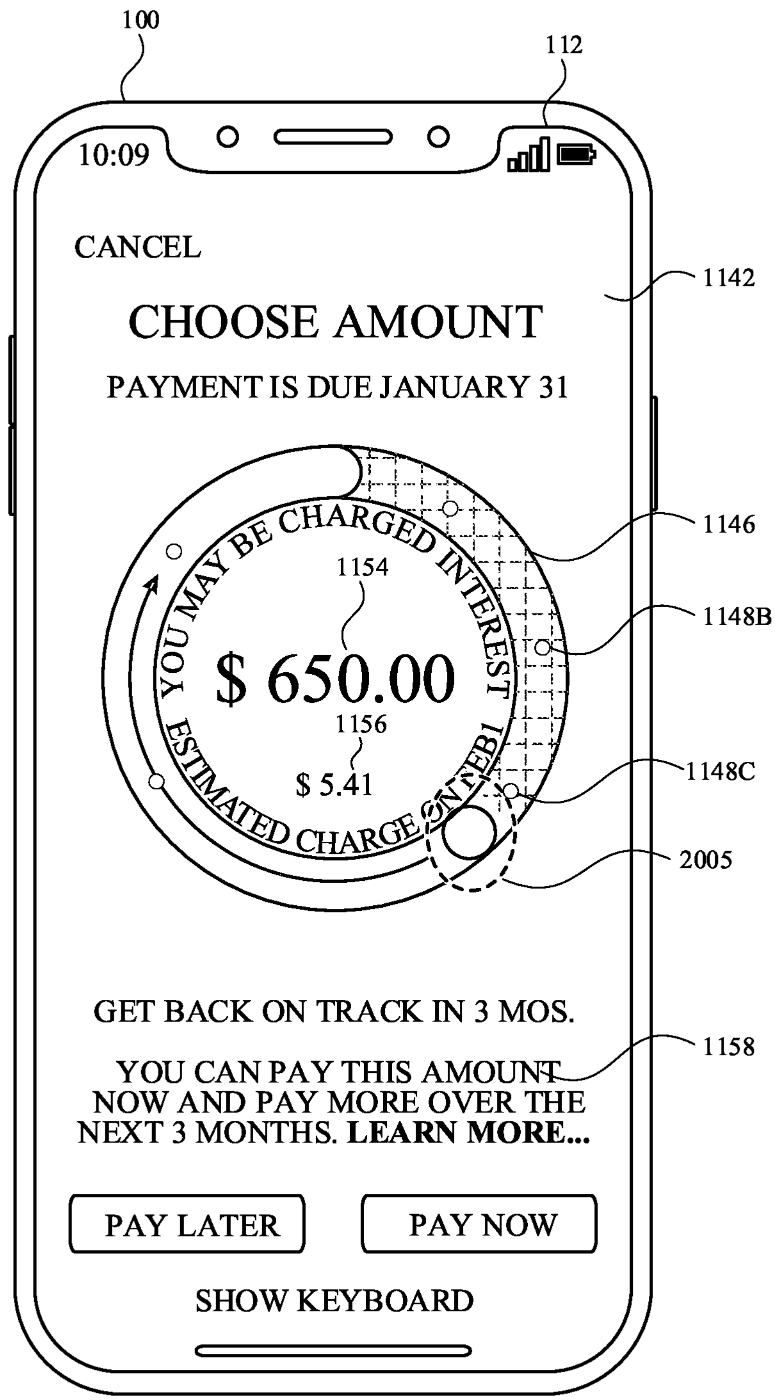
Figure 20H:
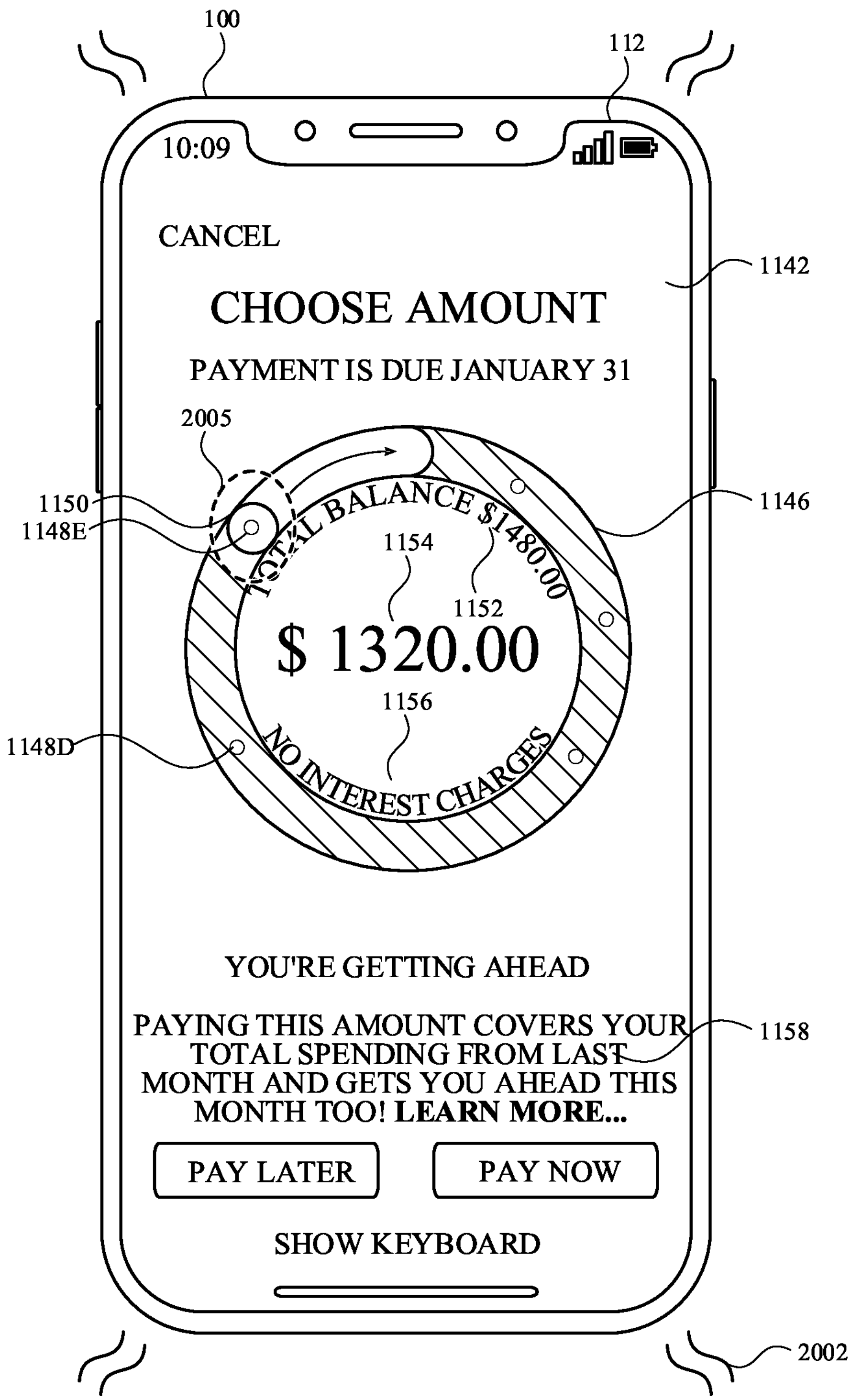
Figure 20I:
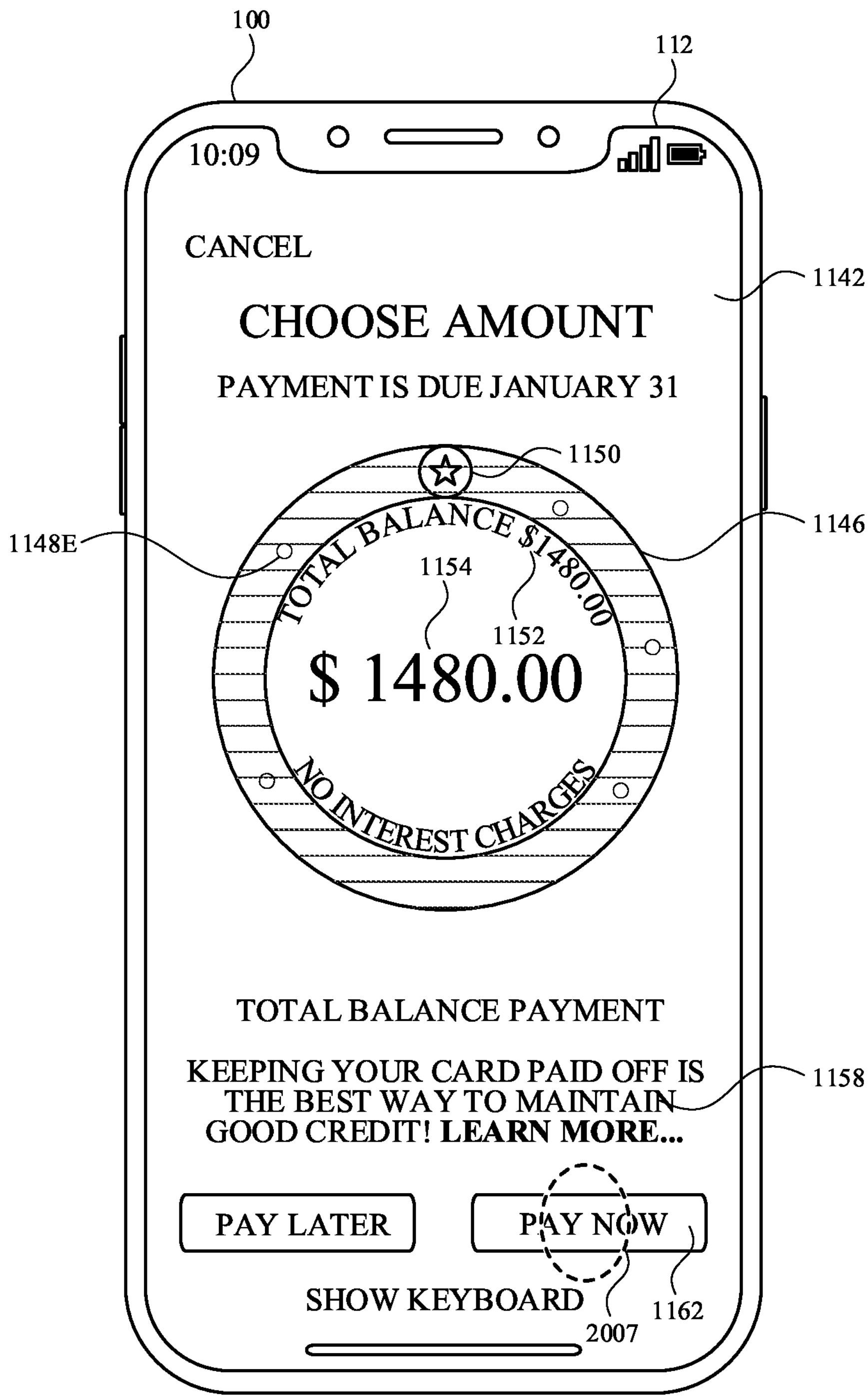

In FIGS. 20E-20I, electronic device 100 detects (e.g., via the touch screen of display 112), a user input 2005 (e.g., a hold-and-drag input) directed to moving (e.g., dragging, sliding) selection indicator 1150 along the defined path of selector user interface element 1146 from its position in FIG. 20E (e.g., corresponding to the minimum value (e.g., the minimum balance payment amount) that would avoid a penalty and the minimum value that is selectable using selector user interface element 1146) to its position in FIG. 20I (e.g., corresponding to the maximum value (e.g., the full balance amount corresponding to all transfers that have been made using the transfer account) that is currently selectable for the transfer account).

In some embodiments, in accordance with detecting that selection indicator 1150 is approaching proposed amount indicator 1148A (e.g., as in FIG. 20E), electronic device 100 displays a "snapping" motion of selection indicator 1150 to the position of proposed amount indicator 1148A. Further, in some embodiments, electronic device 100 displays the portion of the defined path (e.g., and including the selection indicator itself) from the position of selection indicator 1150 to the beginning terminus position of the defined path (e.g., if the defined path is a circular, closed-loop path, the 12 o'clock position of the defined path) with the first color (e.g., a red color). Further, in some embodiments, electronic device displays, in information region 1158, an indication that making selecting a larger transfer amount (e.g., a larger balance payment amount; a larger points transfer amount) would be helpful in more effectively reducing the total balance amount (e.g., by stating "Can you make additional payments? If you pay a little more, you'll be charged less interest."). In some embodiments, electronic device 100 continuously updates display of indication 1154 of the currently-selected balance transfer amount (e.g., balance payment amount; points transfer amount) and indication 1156 of the penalty (e.g., interest) that may be enforced (e.g., charged) on the transfer account based on a currently-selected balance transfer amount in accordance with the position of selection indicator 1150 within the defined path as it is being moved.

In FIG. 20F, selection indicator 1150 is on (e.g., snapped to) the position of proposed amount indicator 1148A. In some embodiments, in response to detecting that selection indicator is on (e.g., snapped to) the position of proposed amount indicator 1148A, electronic device 100 generates (e.g., using haptic feedback controller 161 and/or haptic feedback module 133) a tactile output 2002 indicating that the selection indicator is positioned on a proposed amount indicator. In some embodiments, the selection indicator 1150 snaps to the various amount indicators 1148. In particular, to snap to the amount indicator, the device detects that selection indicator 1150 is within a threshold distance of the respective amount indicator and, in response, automatically moves selection indicator 1150 to the location that corresponds to the respective amount indicator. In this way, the device enables the user to quickly and accurately select the values that correspond to the respective amount indicators.

In some embodiments, in response to detecting that selection indicator 1150 is on (or past (e.g., at a location corresponding to a value greater than the value of)) the position of proposed amount indicator 1148A, electronic device 100 displays, in information region 1158, an indication that the currently-selected amount is higher than an amount of a previous balance transfer (e.g., by stating "Better than last Month! Continue increasing your payments monthly to get back to good financial health.").

In FIG. 20F, electronic device 100 continues detecting user input 2005 directed to moving selection indicator 1150 along the defined path of selector user interface element 1146 towards proposed amount indicators 1148B and 1148C. In some embodiments, in accordance with detecting that selection indicator 1150 is past (e.g., at a location corresponding to a value greater than the value of) proposed amount indicator 1148A (e.g., as in FIG. 20F), electronic device 100 displays the portion of the defined path (e.g., and including the selection indicator itself) from the position of selection indicator 1150 to the beginning terminus position of the defined path (e.g., if the defined path is a circular, closed-loop path, the 12 o'clock position of the defined path) with the second color (e.g., a yellow color). In some embodiments, electronic device 100 continuously updates display of indication 1154 of the currently-selected balance transfer amount (e.g., balance payment amount; points transfer amount) and indication 1156 of the penalty (e.g., interest) that may be enforced (e.g., charged) on the transfer account based on a currently-selected balance transfer amount in accordance with the position of selection indicator 1150 within the defined path as it is being moved.

In some embodiments, in response to detecting that selection indicator is on (e.g., snapped to) the position of proposed amount indicator 1148B, electronic device 100 generates tactile output 2002 indicating that the selection indicator is positioned on a proposed amount indicator. In some embodiments, in accordance with a determination that selection indicator 1150 is on (e.g., snapped to) the position of proposed amount indicator 1148B, electronic device 100 displays, in information region 1158, an indication that the currently-selected amount would enable the user to avoid further penalties on the transfer account (e.g., would enable the user to pay off the current balance such that no more interest will be charged on the transfer account) within a first amount of time (e.g., within 6 months; by stating "Get back on track in 6 months. You can pay this amount now and pay more over the next 6 months.").

In some embodiments, in response to detecting that selection indicator is on (e.g., snapped to) the position of proposed amount indicator 1148C (e.g., as shown in FIG. 20G), electronic device 100 generates tactile output 2002 indicating that the selection indicator is positioned on a proposed amount indicator. In some embodiments, in accordance with a determination that selection indicator 1150 is on the position of proposed amount indicator 1148C, electronic device 100 displays, in information region 1158, an indication that the currently-selected amount would enable the user to avoid further penalties on the transfer account (e.g., would enable the user to pay off the current balance such that no more interest will be charged on the transfer account) within a second amount of time (e.g., within 3 months; by stating "Get back on track in 3 months. You can pay this amount now and pay more over the next 3 months.").

In FIG. 20G, electronic device 100 continues detecting user input 2005 directed to moving selection indicator 1150 along the defined path of selector user interface element 1146 towards proposed amount indicators 1148D and 1148E (e.g., without detecting liftoff of the touch user input 2005 on the touch-sensitive surface). In some embodiments, in accordance with detecting that selection indicator 1150 is on proposed amount indicator 1148D (e.g., corresponding to the full statement balance; corresponding to a balance transfer amount that would fully avoid a penalty (e.g., interest) for the current balance transfer period), electronic device 100 displays the portion of the defined path (e.g., and including the selection indicator itself) from the position of selection indicator 1150 to the beginning terminus position of the defined path (e.g., if the defined path is a circular, closed-loop path, the 12 o'clock position of the defined path) with the third color (e.g., a green color). In some embodiments, electronic device 100 continuously updates display of indication 1154 of the currently-selected balance transfer amount (e.g., balance payment amount; points transfer amount) based on a currently-selected balance transfer amount. In some embodiments, electronic device 100 displays, in indication 1156 of the penalty (e.g., interest) that may be enforced (e.g., charged) on the transfer account, that no penalty will be enforced based on the currently-selected transfer amount.

In some embodiments, in accordance with detecting that selection indicator 1150 is past proposed amount indicator 1148D (e.g., at a location corresponding to a value greater than the value corresponding to indicator 1148D, as shown in FIG. 20H), electronic device 100 displays the portion of the defined path (e.g., and including the selection indicator itself) from the position of selection indicator 1150 to the beginning terminus position of the defined path (e.g., if the defined path is a circular closed-loop path, the 12 o'clock position of the defined path) with the fourth color (e.g., a blue color). In some embodiments, electronic device 100 continuously updates display of indication 1154 of the currently-selected balance transfer amount (e.g., balance payment amount; points transfer amount) based on a currently-selected balance transfer amount in accordance with the position of selection indicator 1150 within the defined path as it is being moved, and maintains display in indication 1156 that no penalty will be enforced based on the currently-selected transfer amount.

In FIG. 20H, selection indicator 1150 is positioned on (e.g., snapped to) proposed amount indicator 1148E. In some embodiments, electronic device 100 generates tactile output 2002 indicating that the selection indicator is positioned on a proposed amount indicator. In some embodiments, in accordance with a determination that selection indicator 1150 is on the position of proposed amount indicator 1148E, electronic device 100 displays, in information region 1158, an indication that the currently-selected amount would enable the user to get ahead on balance transfers (e.g., by stating "You're getting ahead. Paying this amount covers your total spending from last month and gets you ahead this month too!").

In FIG. 20H, electronic device 100 continues detecting user input 2005 directed to moving selection indicator 1150 along the defined path of selector user interface element 1146 towards the second terminus position (e.g., the ending terminus position) of the defined path.

In FIG. 20I, electronic device 100 is displaying, in balance transfer user interface 1142, selector user interface element 1146 with selection indicator 1150 positioned at the second terminus position (e.g., the ending terminus position) of the defined path.

In some embodiments, in response to detecting (or determining) that selection indicator 1150 is at the second terminus position (e.g., the ending terminus position), electronic device 100 displays, in selection indicator 1150, a visual indication (e.g., a symbol, such as a star) indicating that the current location of selection indicator 1150 corresponds to the highest possible balance transfer amount (e.g., the full amount of the current balance) for the transfer account (e.g., the first-party credit account; the points account).

In some embodiments, in response to detecting (or determining) that selection indicator 1150 is at the second terminus position (e.g., the ending terminus position), electronic device 100 displays all of the defined path of selector user interface 1146 with the fourth visual characteristic (e.g., a blue color), as described above with reference to FIG. 20B.

In some embodiments, in response to detecting (or determining) that selection indicator 1150 is at the second terminus position (e.g., the ending terminus position), electronic device 100 displays, in information region 1158, information that includes an encouraging message related to making a balance transfer corresponding to the highest possible balance transfer amount (e.g., paying off the full amount of the balance).

In FIG. 20I, while displaying balance transfer user interface 1142 with selection indicator 1150 positioned at the second terminus position (e.g., the ending terminus position) of the defined path of selector user interface element 1146, electronic device 100 detects a user activation 2007 of transfer now affordance 1162.

Figure 20J:
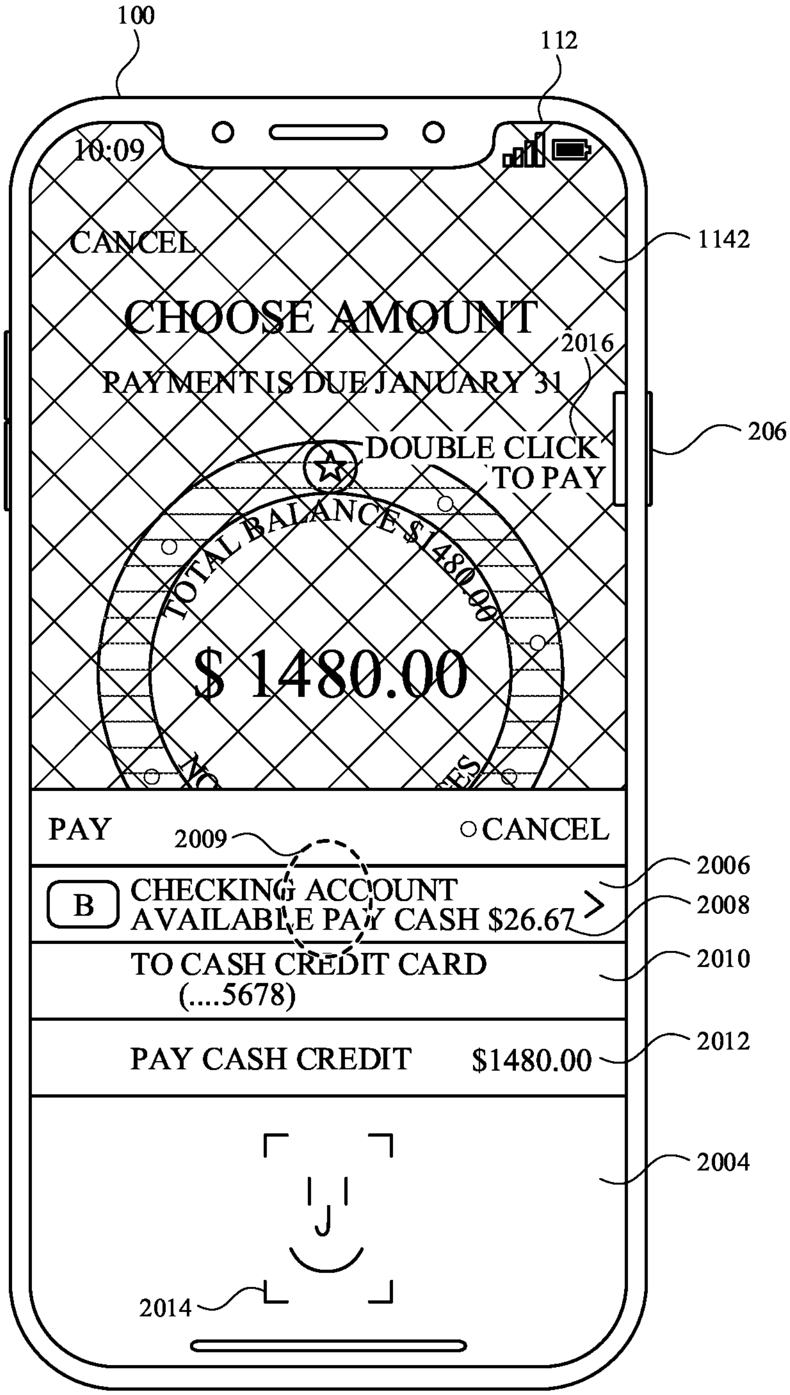

In FIG. 20J, in response to detecting user activation 2007 of transfer now affordance 1162, electronic device 100 displays, on display 112, a transfer sheet user interface 2004 corresponding to the transfer application (e.g., the electronic wallet application). In some embodiments, transfer sheet user interface 2004 is an operating system user interface (e.g., of a first-party, operating system application that is fully controlled by the operating system of the electronic device) that cannot be controlled by a third-party application. In some embodiments transfer sheet user interface 2004 is used to authorize transfers (e.g., payment transactions, points transfers) that are initiated through other applications (e.g., including third-party applications) on the electronic device and/or initiated through a webpage (e.g., displayed in a web browser) displayed on the electronic device. In some embodiments, transfer sheet user interface 2004 is displayed (e.g., slides onto the display from the bottom of the display) over a portion of (but not all of) balance transfer user interface 1142 such that a portion of balance transfer user interface 1142 is still visible on the display.

In some embodiments, transfer sheet user interface 2004 includes a selectable indication 2006 of a second transfer account (e.g., a third-party account, such as a third-party checking account) that is linked to and/or registered on the transfer application (e.g., the electronic wallet application). In some embodiments, transfer sheet user interface 2004 includes (e.g., below selectable indication 2006) a rewards indication 2008 indicating the amount (e.g., $26.67) of available rewards (e.g., the available cash back amount). In some embodiments, transfer sheet user interface 2004 includes an indication 2010 of the transfer account (e.g., the first-party credit account; the points account), thereby indicating that a transfer (e.g., a balance payment) from the second transfer account (e.g., a third-party account, such as a third-party checking account) to the transfer account (e.g., the first-party transfer account) is being prepared (e.g., for a balance payment of $1,480.00). In some embodiments, indication 2010 includes a name of the transfer account (e.g., "Cash Credit Card") and a portion of an identification number (e.g., credit card number) of the transfer account (e.g., the first-party transfer account). In some embodiments, transfer sheet user interface 2004 includes a transfer amount indication 2012 indicating the amount of the transfer being prepared (e.g., a balance payment of $1,480.00 using the second transfer account (e.g., the third-party checking account)), where the amount of the transfer corresponds to the highest possible balance transfer amount detected (or determined) via balance transfer user interface 1142 in FIG. 20I. In some embodiments, transfer sheet user interface 2004 includes an indication 2014 to provide authentication (e.g., biometric authentication, such as facial recognition authentication, fingerprint authentication, iris and/or retina scan authentication, voice recognition authentication; or passcode or password authentication). In some embodiments, electronic device 100 displays a transfer instruction 2016 (e.g., stating "Double Click to Pay") requesting a user action to proceed with the balance transfer (e.g., the balance payment).

In FIG. 20J, while displaying transfer sheet user interface 2004 over a portion of balance transfer user interface 1142, electronic device 100 detects a selection 2009 of selectable indication 2006 of the second transfer account (e.g., a third-party account, such as a third-party checking account) that is linked to and/or registered on the transfer application (e.g., the electronic wallet application).

Figure 20K:
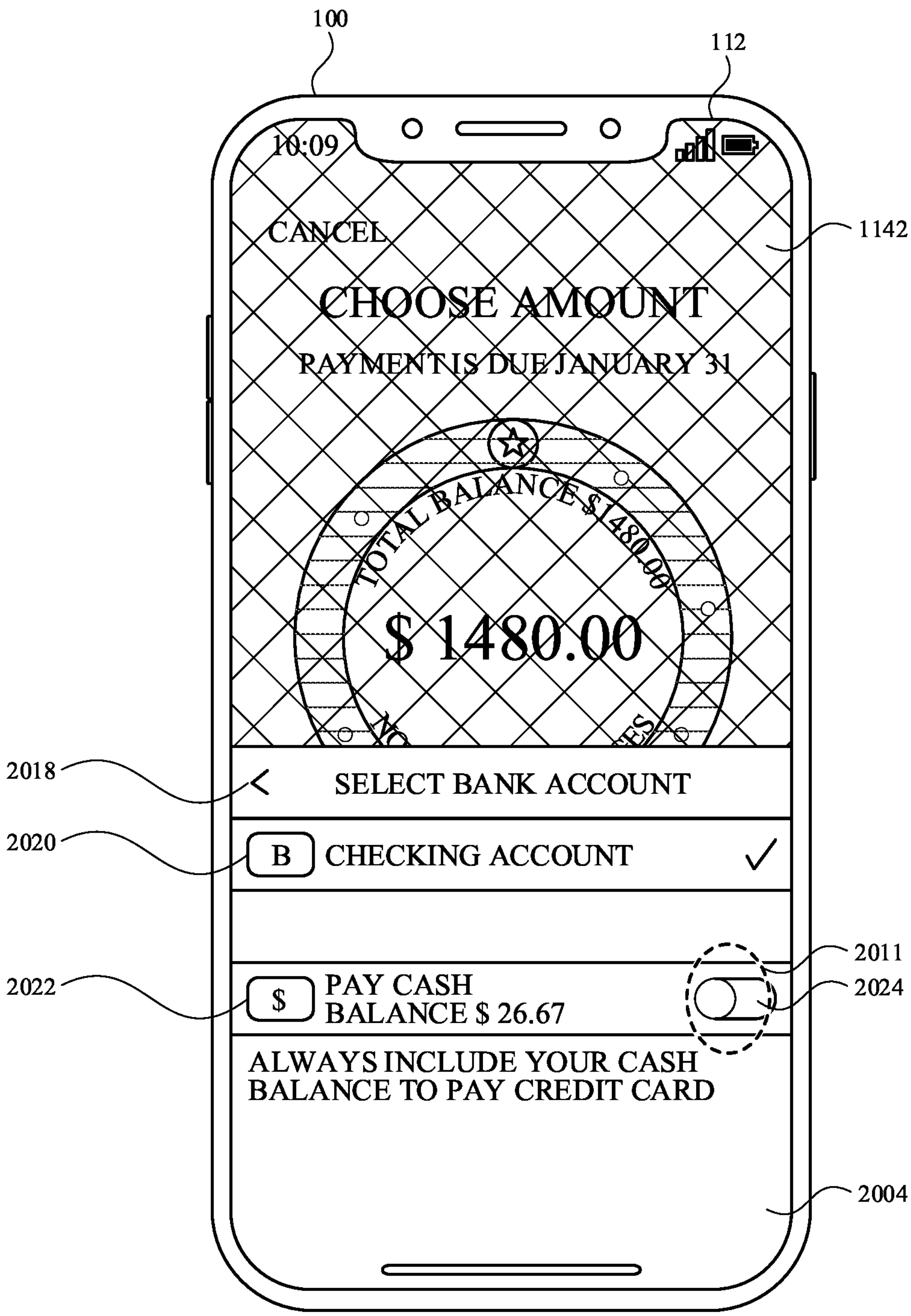

In FIG. 20K, in response to detecting selection 2009 of selectable indication 2006, electronic device 100 displays, in transfer sheet user interface 2004, an indication 2020 that the second transfer account is currently-selected for use in the balance transfer (e.g., for use in the balance payment). In some embodiments, electronic device 100 also displays, in transfer sheet user interface 2004, an indication 2022 of the currently-available rewards amount of the transfer account (e.g., the available cash back amount on the first-party credit account), thereby reminding the user that rewards (e.g., cash back) are available for use in a transfer. In some embodiments, electronic device 100 also displays (e.g., adjacent to indication 2022, a selectable indicator 2024 (e.g., a toggle button) for enabling or disabling automatic use of the available rewards amount in the balance transfer (e.g., automatic use of the available cash back in the balance payment). In FIG. 20K, selectable indicator 2024 is in an off state (e.g., a disabled state).

In FIG. 20K, while displaying transfer sheet user interface 2004 showing indication 2022 of the currently-available rewards amount of the transfer account (e.g., the available cash back amount on the first-party credit account) and selectable indicator 2024 (e.g., a toggle button) for enabling or disabling automatic use of the available rewards amount in balance transfers (e.g., automatic use of the available cash back in balance payments, automatic use of bonus points in points transfers), electronic device 100 detects a user input 2011 directed to selectable indicator, thus turning it from an off state to an on state.

Figure 20L:
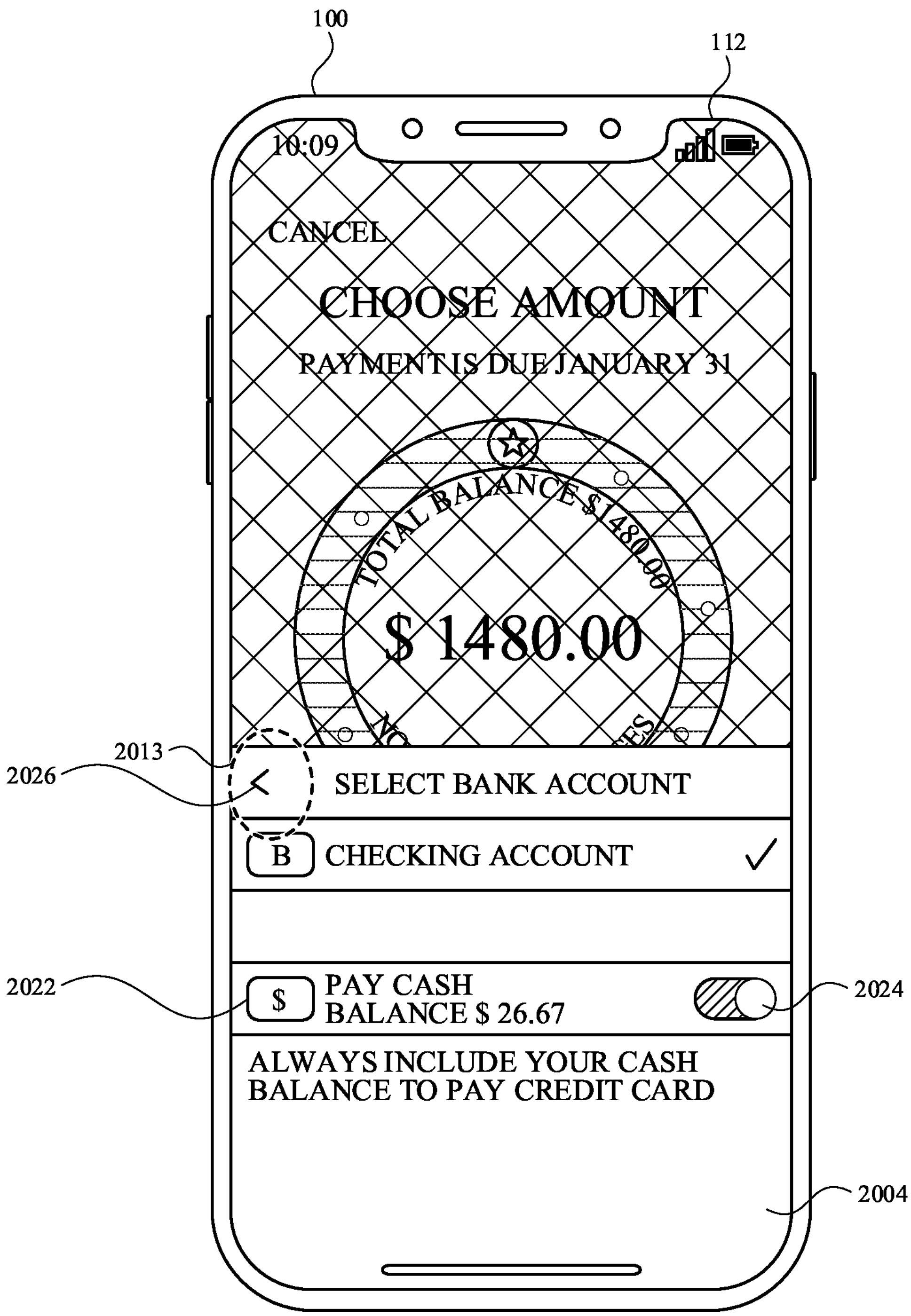

In FIG. 20L, in response to detecting user input 2011 directed to selectable indicator 2024 turning the indicator to an on state, electronic device 100 enables automatic use of the available rewards amount in balance transfers. Then, subsequent to enabling automatic use of the available rewards amount in balance transfers, electronic device 100 detects a selection 2013 of a return affordance 2026.

Figure 20M:
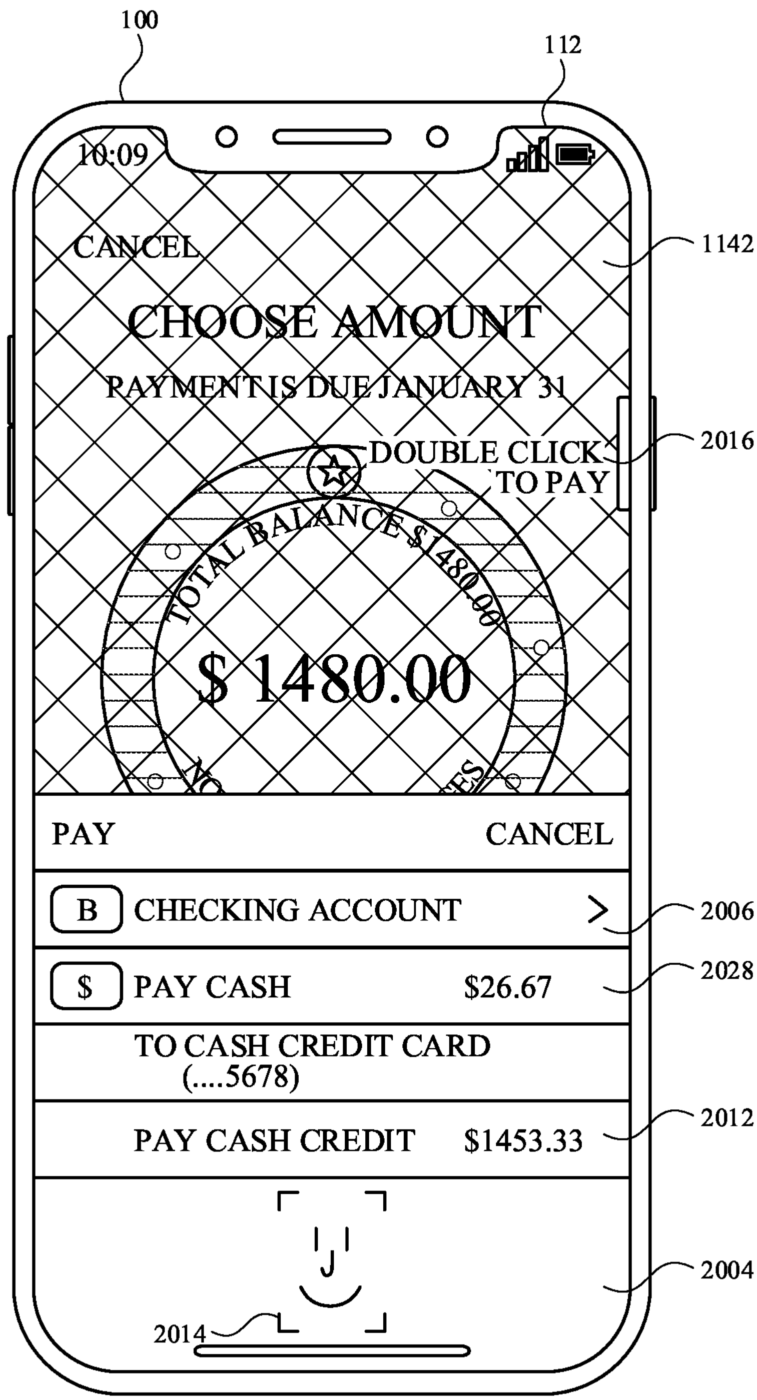

In FIG. 20M, in response to detecting selection 2013 of return affordance 2026, electronic device 100 again displays transfer sheet user interface 2004 as shown in FIG. 20J, but includes, in transfer sheet user interface 2004, an indication 2028 that the available rewards amount (e.g., cash back of $26.67) is set to be used in the balance transfer (e.g., balance payment). In some embodiments, in accordance with a determination that the available rewards amount (e.g., cash back of $26.67) is set to be used in the balance transfer (e.g., balance payment), electronic device 100 updates transfer amount indication 2012 to indicate the remaining balance amount (e.g., a payment of $1,453.33) that will be withdrawn from the second transfer account (e.g., the third-party checking account) after taking into account the use of the available rewards (e.g., cash back of $26.67).

Subsequently, electronic device 100 detects a user input in accordance with transfer instruction 2016 (e.g., a double click or double press of an input button of the electronic device, such as push button 206) and, in response to receiving successful authentication (e.g., successful biometric authentication, such as facial recognition authentication, fingerprint authentication, iris and/or retina scan authentication, voice recognition authentication; or successful passcode or password authentication), electronic device 100 displays, in transfer sheet user interface 2004, an indication 2030 that the balance transfer (e.g., balance payment) has been successfully completed, where the balance transfer first uses the available rewards amount (e.g., the cash back balance) and, if all of the available rewards amount is insufficient to cover the full amount of the balance transfer (e.g., the cash back balance is smaller than the balance payment amount), then uses the second transfer account (e.g., the third-party checking account) for the remaining amount for the balance transfer.

Figure 20N:
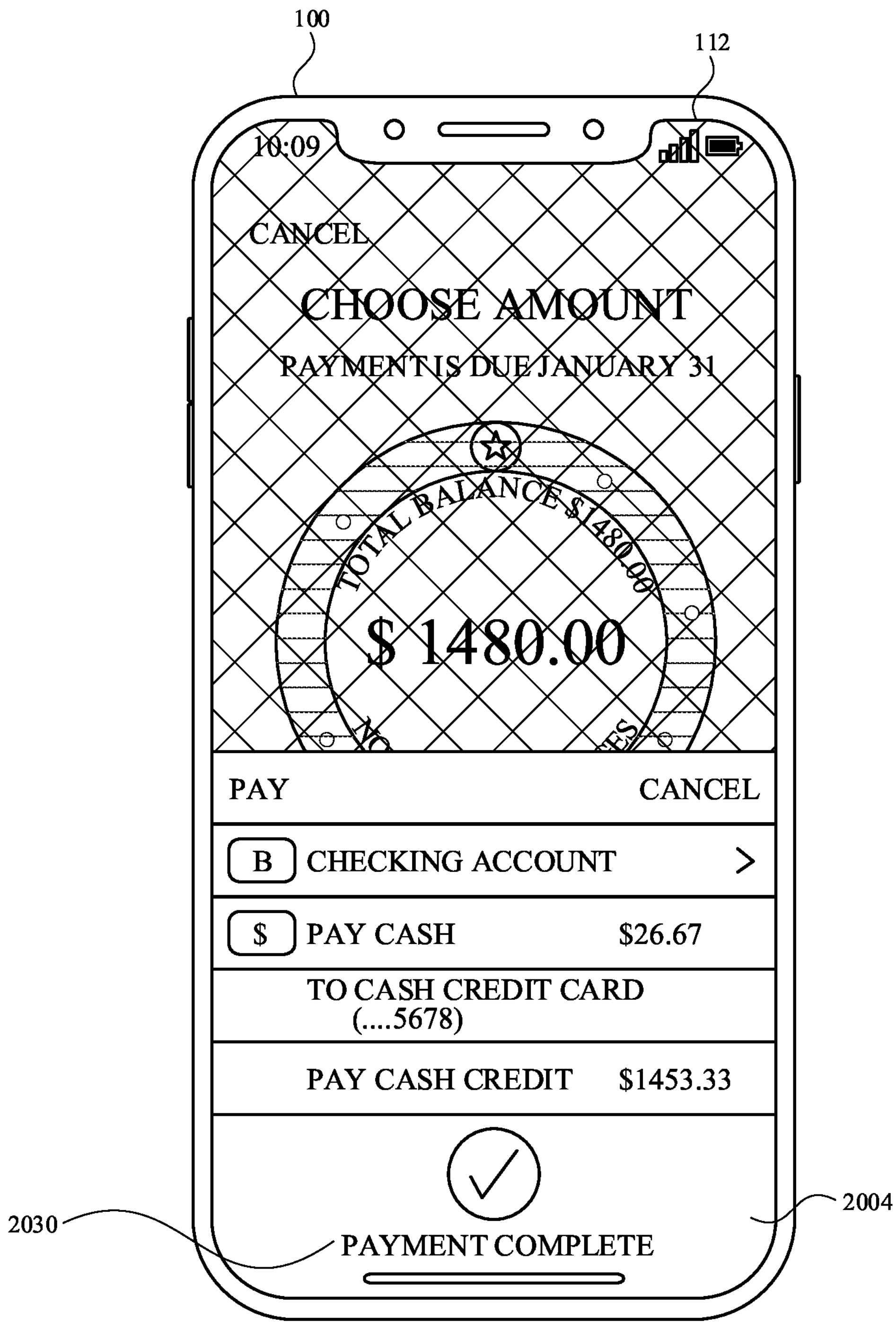

In FIG. 20N, in response to detecting the successful authentication, electronic device 100 displays, in transfer sheet user interface 2004, an indication 2030 that the balance transfer (e.g., balance payment) has been successfully completed (e.g., using the available rewards (e.g., cash back) amount and using the second transfer account (e.g., the third-party checking account)).

Figure 20O:
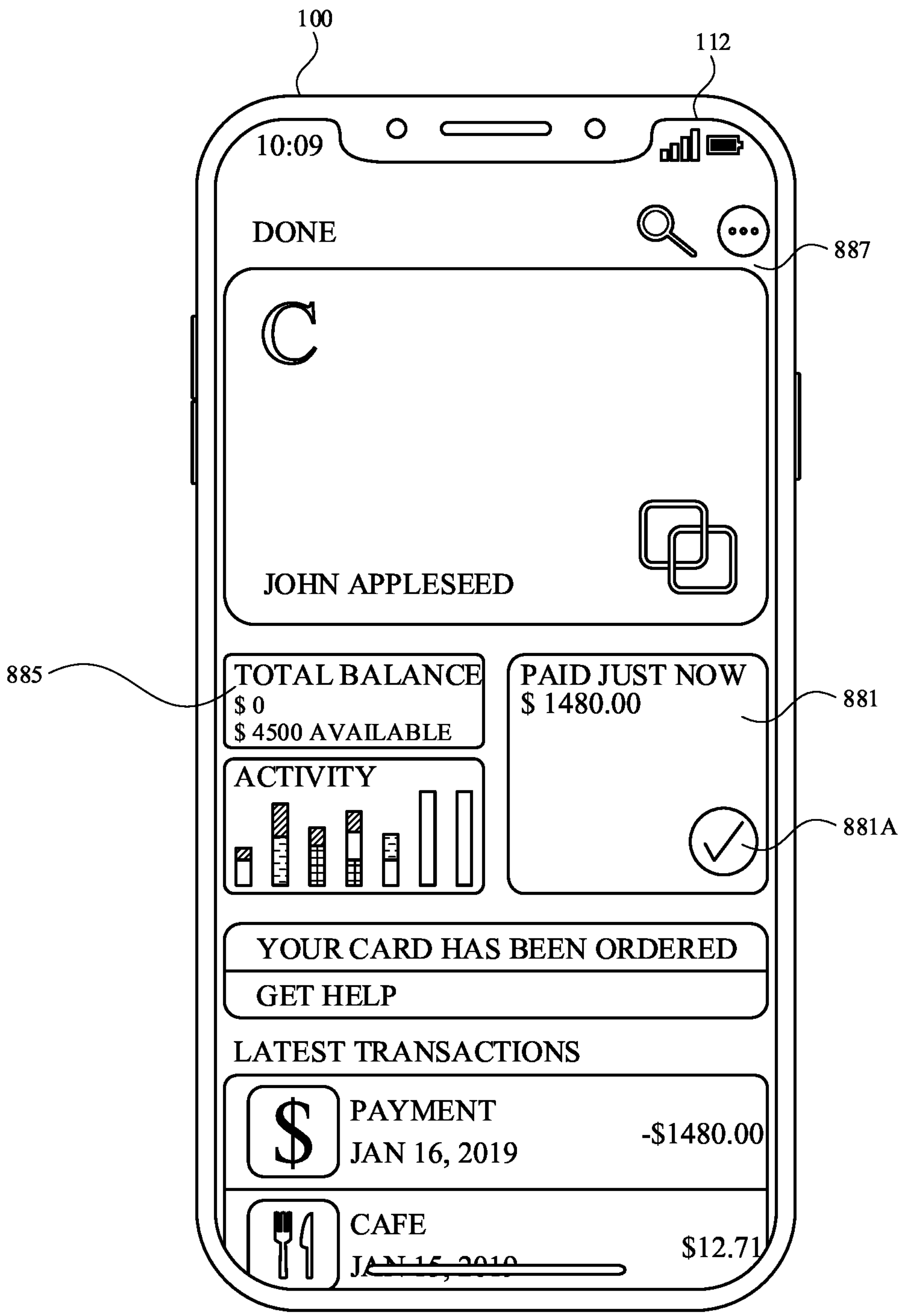

In FIG. 20O, electronic device 100 is displaying, on display 112, summary user interface 887 (e.g., a dashboard user interface) of the transfer account (e.g., the first-party credit account; the points account) after completing the successful balance transfer (e.g., balance payment of $1,480). In some embodiments, subsequent to (or in response to) detecting the successful balance transfer, electronic device 100 updates display of balance indicator user interface element 885 (e.g., a balance module) of summary user interface 887 to indicate the remaining balance amount after the successful balance transfer completed in FIG. 20N (e.g., $0 (no balance), because all of the remaining balance was paid in FIG. 20N). In some embodiments, electronic device 100 updates balance transfer user interface element 881 (e.g., a balance payment module) and/or indicator 881A of element 881 to indicate that a successful balance transfer (e.g., a balance payment of $1,480.00) has been made (e.g., by displaying a time of the successful balance transfer (e.g., stating "Paid Just Now"; by displaying an amount of the successful balance transfer (e.g., $1,480.00; by displaying, in indication 881A, a visual indicator (e.g., a symbol, such as a checkmark) indicative of the successful transfer; by changing a visual characteristic (e.g., a background color) of balance transfer user interface element 881 and/or indicator 881A).

Figure 20P:
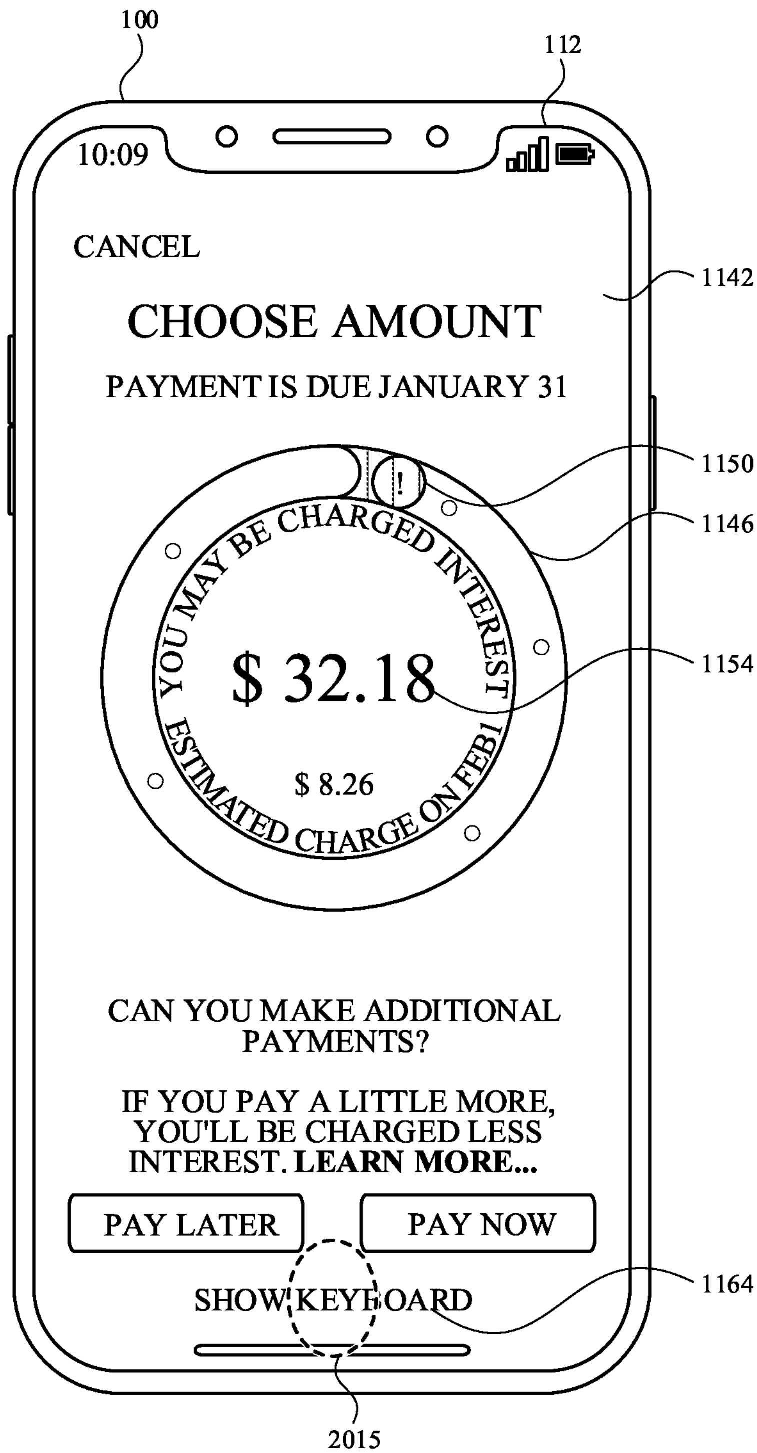

In FIG. 20P, electronic device 100 is displaying, on display 112, balance transfer user interface 1142 corresponding to the transfer account (e.g., the first-party credit account; the points account). In FIG. 20P, electronic device 100 detects (or determines) that selection indicator 1150 is at a position on the defined path of selector user interface element 1146 corresponding to the minimum transfer amount (e.g., the minimum payment that would avoid a penalty, such as a late fee). In FIG. 20P, while selectable indicator 1150 is at the position on the defined path of selector user interface element 1146 corresponding to the minimum transfer amount, electronic device 100 detects a selection 2015 of show keypad affordance 1164 for causing display of a keypad that can be used to manually enter a balance transfer amount (e.g., to manually enter a balance payment amount) without using selector user interface element 1146.

Figure 20Q:
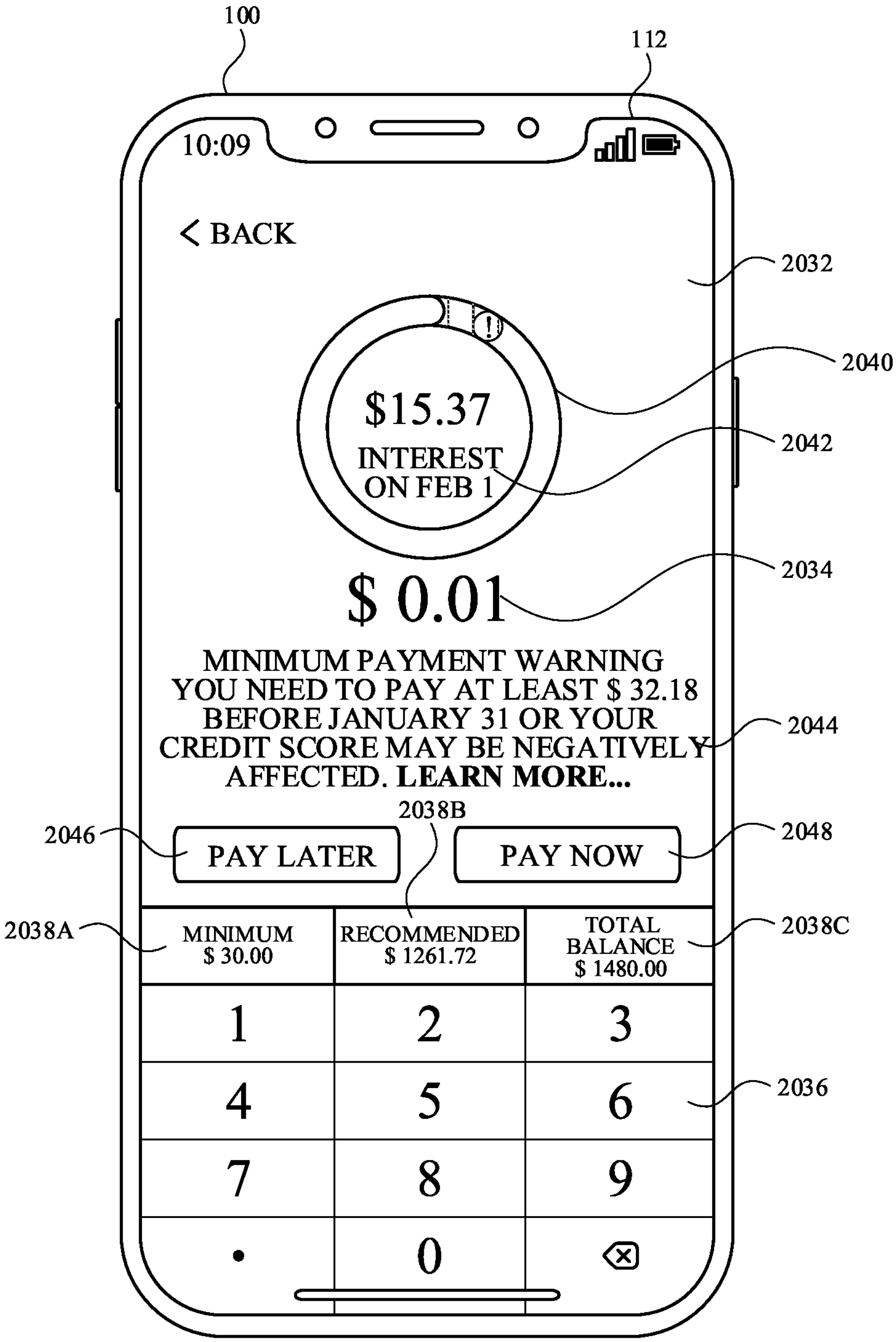

In FIG. 20Q, in response to detecting selection 2015 of show keypad affordance 1164, electronic device displays, on display 112, a keypad user interface 2032. In some embodiments, keypad user interface 2032 includes an indication 2034 of an entered transfer amount (e.g., for entering the user's desired balance payment amount) and a keypad 2036 for entering the transfer amount. In some embodiments, keypad 2036 includes a plurality of keys 2038A-2038C corresponding to recommended transfer amounts (e.g., a first recommendation key 2038A corresponding to the minimum transfer amount; a second recommendation key 2038B corresponding to a transfer amount that would fully avoid a penalty (e.g., interest) for the current balance transfer period (e.g., the full statement amount); and a third recommendation key 2038C corresponding to the maximum balance transfer mount (e.g., all of the current balance)).

In some embodiments, keypad user interface 2032 also includes a selector user interface element representation 2040 corresponding to a reduced depiction of selector user interface element 1146. In some embodiments, electronic device 100 updates (e.g., changes the location of the selection indicator) selector user interface element representation 2040 based on entered transfer amount 2034 (e.g., changes the location of the selection indicator in selector user interface element representation 2040 within the defined path in accordance with the transfer amount entered via keypad 2036). In some embodiments, the minimum transfer amount that can be entered via keypad user interface 2032 is smaller than the minimum transfer amount that can be selected via balance transfer user interface 1142. In some embodiments, selector user interface element representation 2040 also includes a penalty indication 2042 indicating a penalty amount (e.g., interest) that will be imposed on the transfer account (e.g., the first-party credit account; the points account) by a due date (e.g., the current statement date) for the balance transfer based on the currently-entered transfer amount, thereby informing the user of the upcoming penalty based on the currently-entered transfer amount and that an additional balance transfer will be required to avoid the penalty.

In some embodiments, keypad user interface 2032 also includes an information region 2044 corresponding to information region 1158 of balance transfer user interface 1142, which describes an effect or result of making a balance transfer (e.g., a balance payment) based on the currently-entered balance transfer amount.

In some embodiments, keypad user interface 2032 includes a transfer later affordance 2046, corresponding to transfer later affordance 1160 of balance transfer user interface 1142, for scheduling a further balance transfer (e.g., for setting a date and/or time for a future automatic balance payment). In some embodiments, keypad user interface 2032 includes a transfer now affordance 2048, corresponding to transfer now affordance 1162 of balance transfer user interface 1142, for initiating a process for an immediate balance transfer (e.g., for proceeding with an immediate balance payment).

Figure 20R:
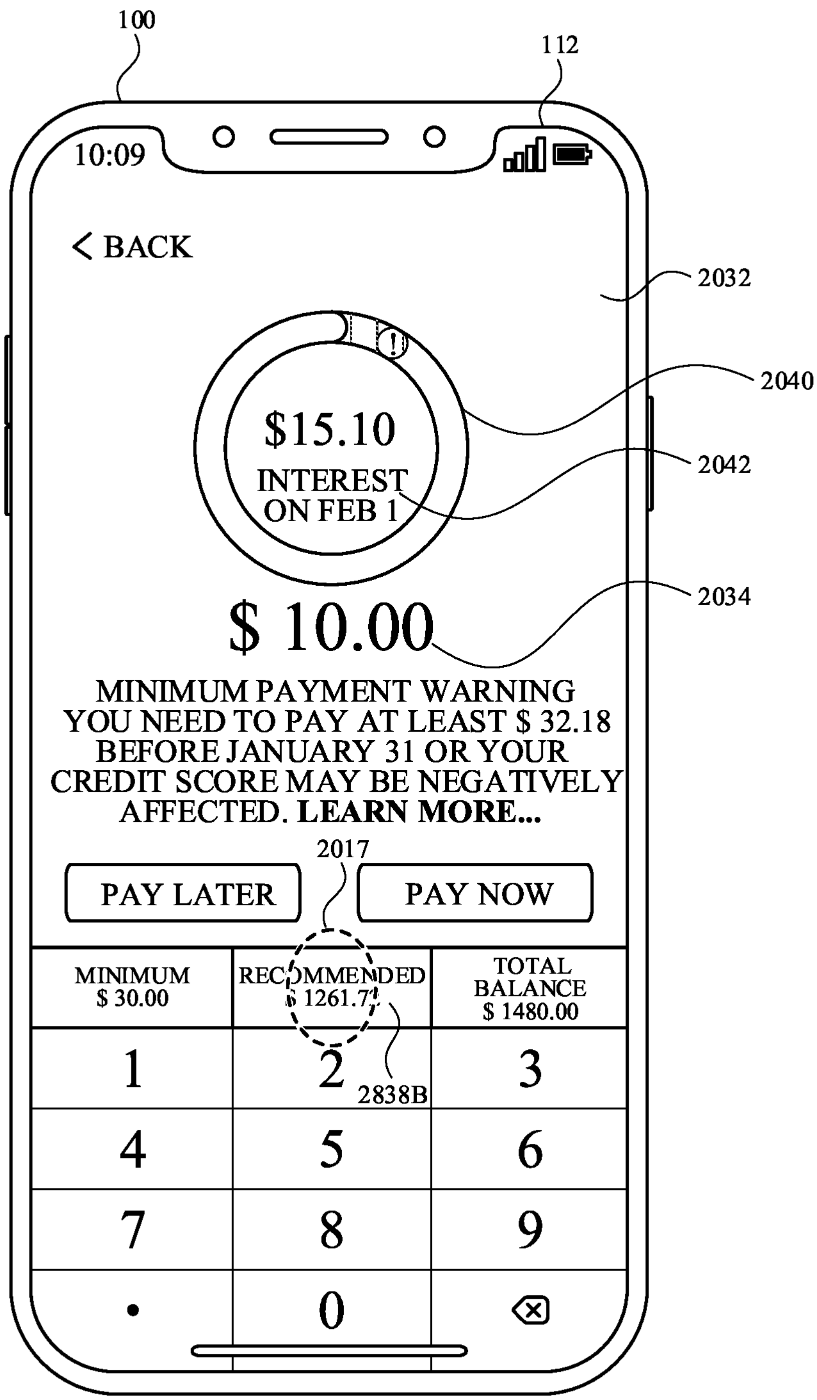

In FIG. 20R, while displaying keypad user interface 2032, electronic device 100 detects a selection 2017 of second recommendation key 2038B corresponding to a transfer amount that would fully avoid a penalty (e.g., interest) for the current balance transfer period (e.g., the full statement amount).

Figure 20S:
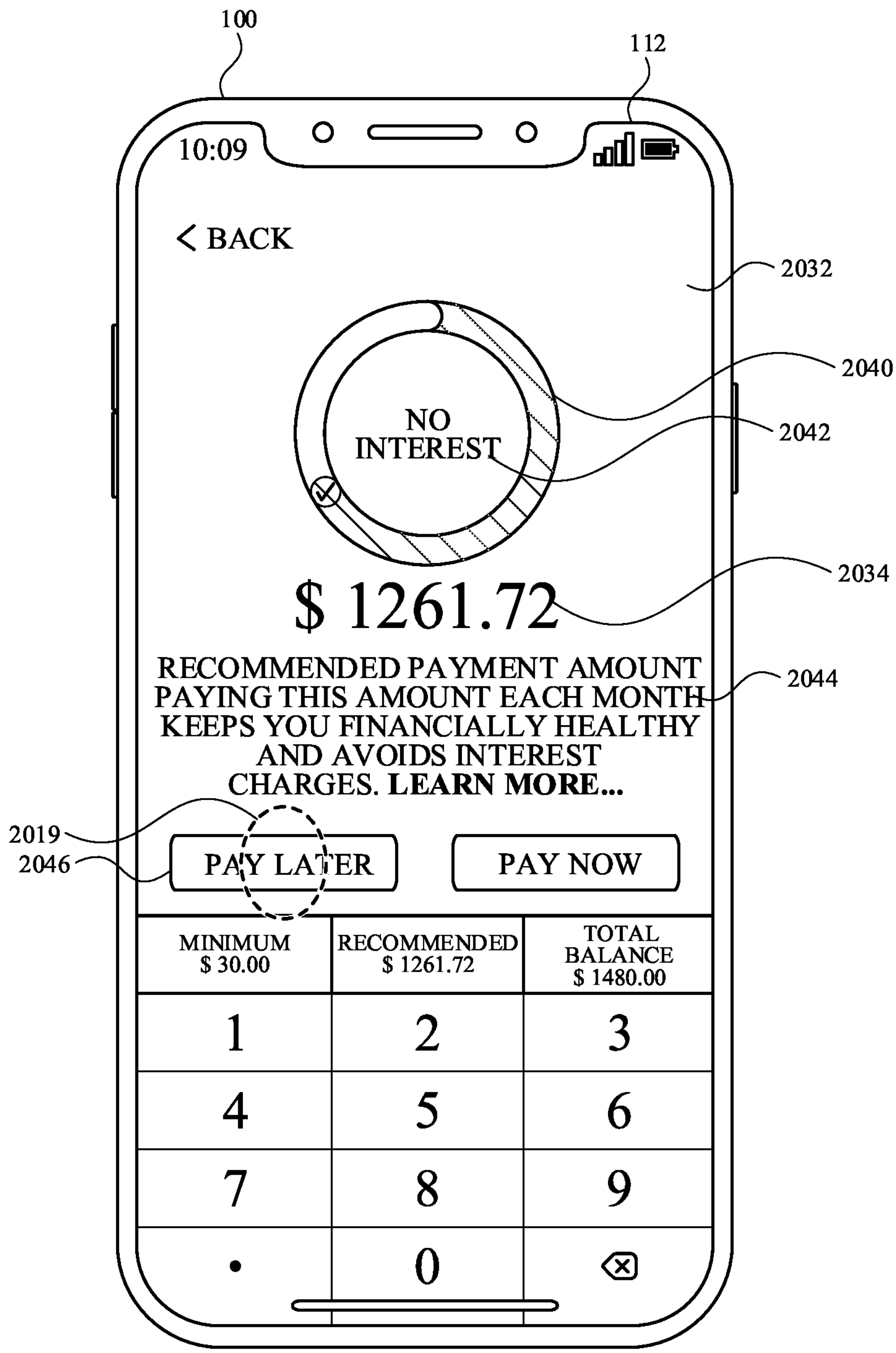

In FIG. 20S, in response to detecting selection 2017 of second recommendation key 2038B, electronic device 100 updates display of indication 2034 to reflect the transfer amount corresponding to the transfer amount that would fully avoid a penalty (e.g., interest) for the current balance transfer period (e.g., the full statement amount). In some embodiments, electronic device 100 further updates display of selector user interface element representation 2040 (e.g., to show the selection indicator at a position on the defined path corresponding to the transfer amount that would fully avoid a penalty (e.g., interest) for the current balance transfer period) and penalty indication 2042 (e.g., showing that no penalty (e.g., interest) will be imposed). In some embodiments, electronic device 100 updates display of information region 2044 to state a benefit of perform a balance transfer (e.g., balance payment) corresponding to a transfer amount (e.g., balance payment amount) corresponding to the transfer amount that would fully avoid a penalty (e.g., interest) for the current balance transfer period (e.g., the full statement amount).

In FIG. 20S, while displaying keypad user interface 2032 with the transfer amount (e.g., balance payment amount) that would fully avoid a penalty (e.g., interest) for the current balance transfer period (e.g., the full statement amount) selected, electronic device 100 detects a user activation 2019 of transfer later affordance 2046.

Figure 20T:
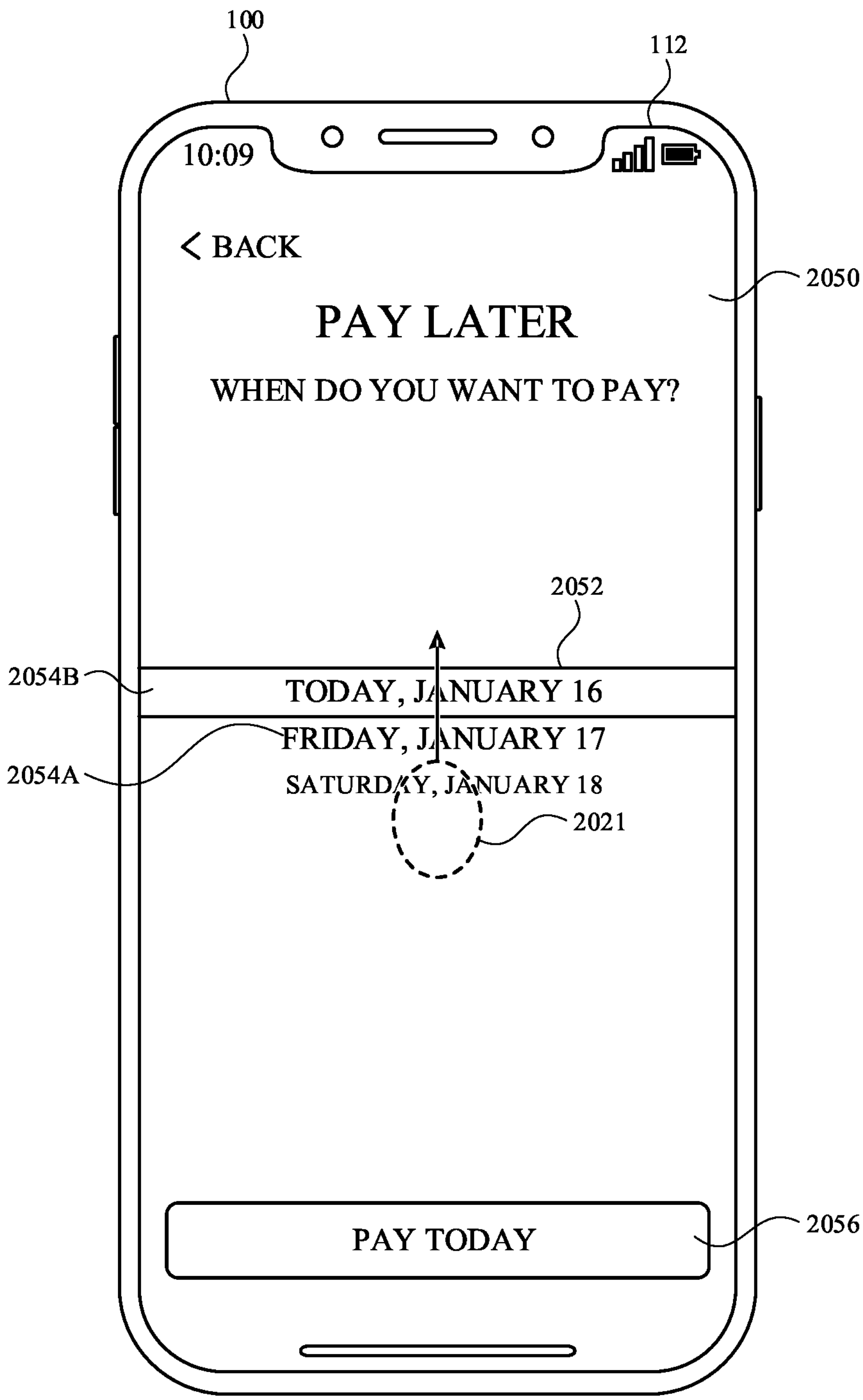

In FIG. 20T, in response to detecting user activation 2019 of transfer later affordance 2046, electronic device 100 displays, on display 112, a transfer later user interface 2050 for setting a date and a transfer amount for a future balance transfer. In some embodiments, transfer later user interface 2050 includes a date selector user interface element 2052 (e.g., a rotating wheel-based date selector module) that includes a (e.g., rotatable) plurality of dates 2054A (e.g., corresponding to dates that include the current day and subsequent dates in chronological order) and a selection indicator 2054B.

In FIG. 20T, electronic device 100 displays, in date selector user interface element 2052, the current day ("Today, January 16") as the currently-selected date for the future balance transfer (e.g., a future balance payment). In some embodiments, electronic device 100 updates display of (e.g., updates text information displayed in) a scheduling confirmation affordance 2056 in accordance with the currently-selected date for the future balance transfer (e.g., a future balance payment). In FIG. 20T, electronic device 100 displays, in scheduling confirmation affordance 2056, that the future balance transfer (e.g., a future balance payment) will be initiated during the current day (e.g., by stating "Pay Today").

In FIG. 20T, while displaying, in transfer later user interface 2050, date selector user interface element 2052 indicating the currently-selected date for the future balance transfer (e.g., a future balance payment) as the current day, electronic device 100 detects a user input 2021 (e.g., a swipe input, a scrolling input) directed to date selector user interface element 2052 (e.g., a scrolling of plurality of dates 2054A of date selector user interface element 2052).

Figure 20U:
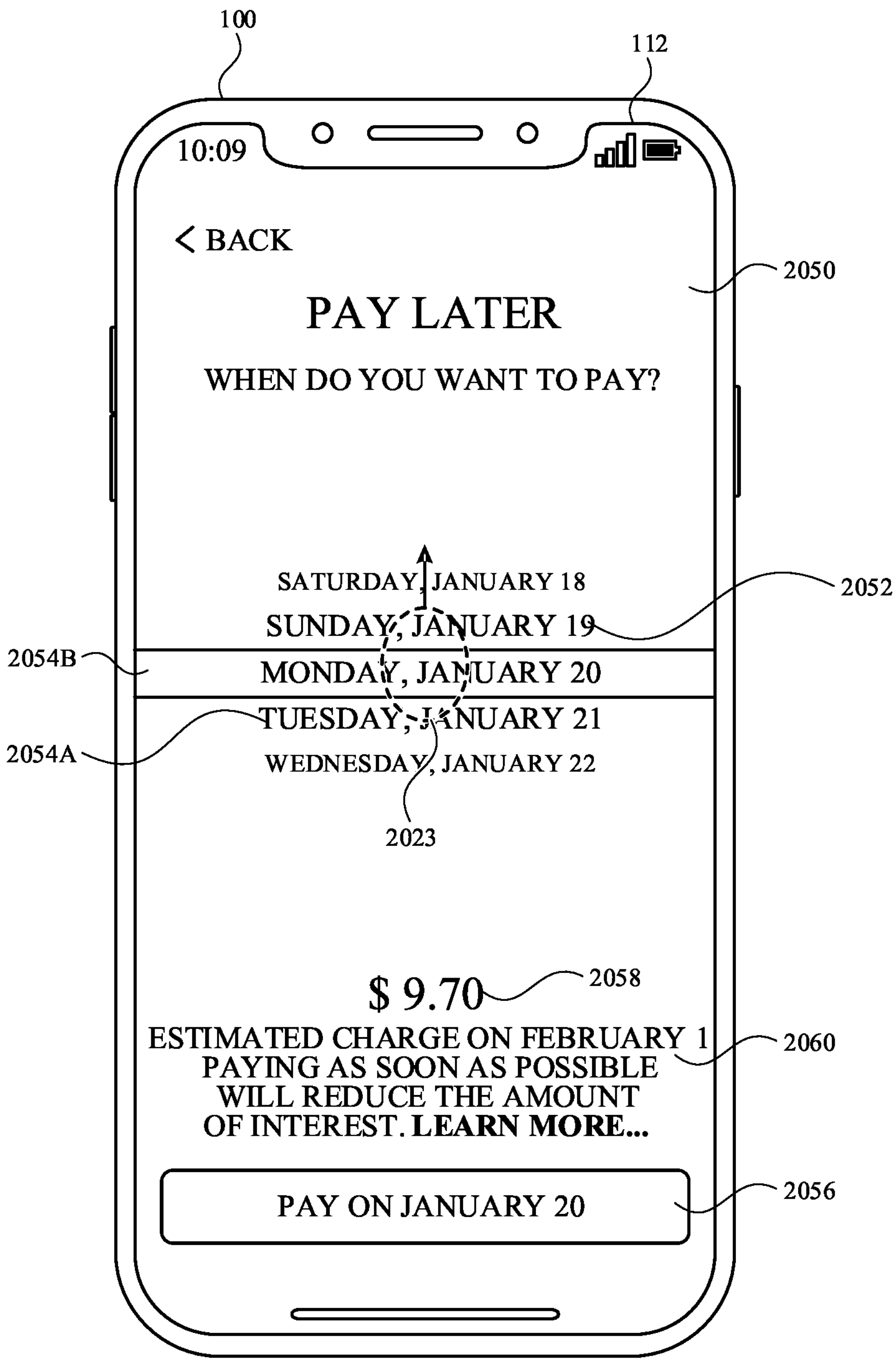

In FIG. 20U, in response to (and/or while) detecting user input 2021 (e.g., a scrolling input) directed to date selector user interface element 2052, electronic device 100 displays a rotation of plurality of dates 2054A within date selector user interface element 2052 from its position in FIG. 20T ("Today, January 16") to its position in FIG. 20U ("Monday, January 20"), as indicated by selection indicator 2054B.

In some embodiments, in response to (and/or while) detecting user input 2021, electronic device 100 displays (or updates), in transfer later user interface 2050, a penalty indication 2058 that indicates an amount of penalty (e.g., interest) that will be imposed on the transfer account (e.g., the first-party credit account; the points account) if the balance transfer (e.g., balance payment) is scheduled for the currently-selected date (e.g., "Monday, January 20"). In some embodiments, in response to (and/or while) detecting user input 2021 electronic device 100 also displays, in transfer later user interface 2050, an information region 2060 (e.g., corresponding to or similar to information region 1158 of balance transfer user interface 1142) which describes an effect or result of making a balance transfer (e.g., a balance payment) based on the currently-selected date and/or on a different date than the currently-selected date.

In some embodiments, in response to (and/or while) detecting user input 2021, electronic device 100 updates display of scheduling confirmation affordance 2056 in accordance with the currently-selected date for the future balance transfer (e.g., a future balance payment). In FIG. 20U, electronic device 100 displays, in scheduling confirmation affordance 2056, that the future balance transfer (e.g., a future balance payment) will be initiated during the selected future date (e.g., by stating "Pay on January 20").

In FIG. 20U, after detecting user input 2021, electronic device 100 detects a user input 2023 (e.g., a continuation of user input 2021) directed to date selector user interface element 2052.

Figure 20V:
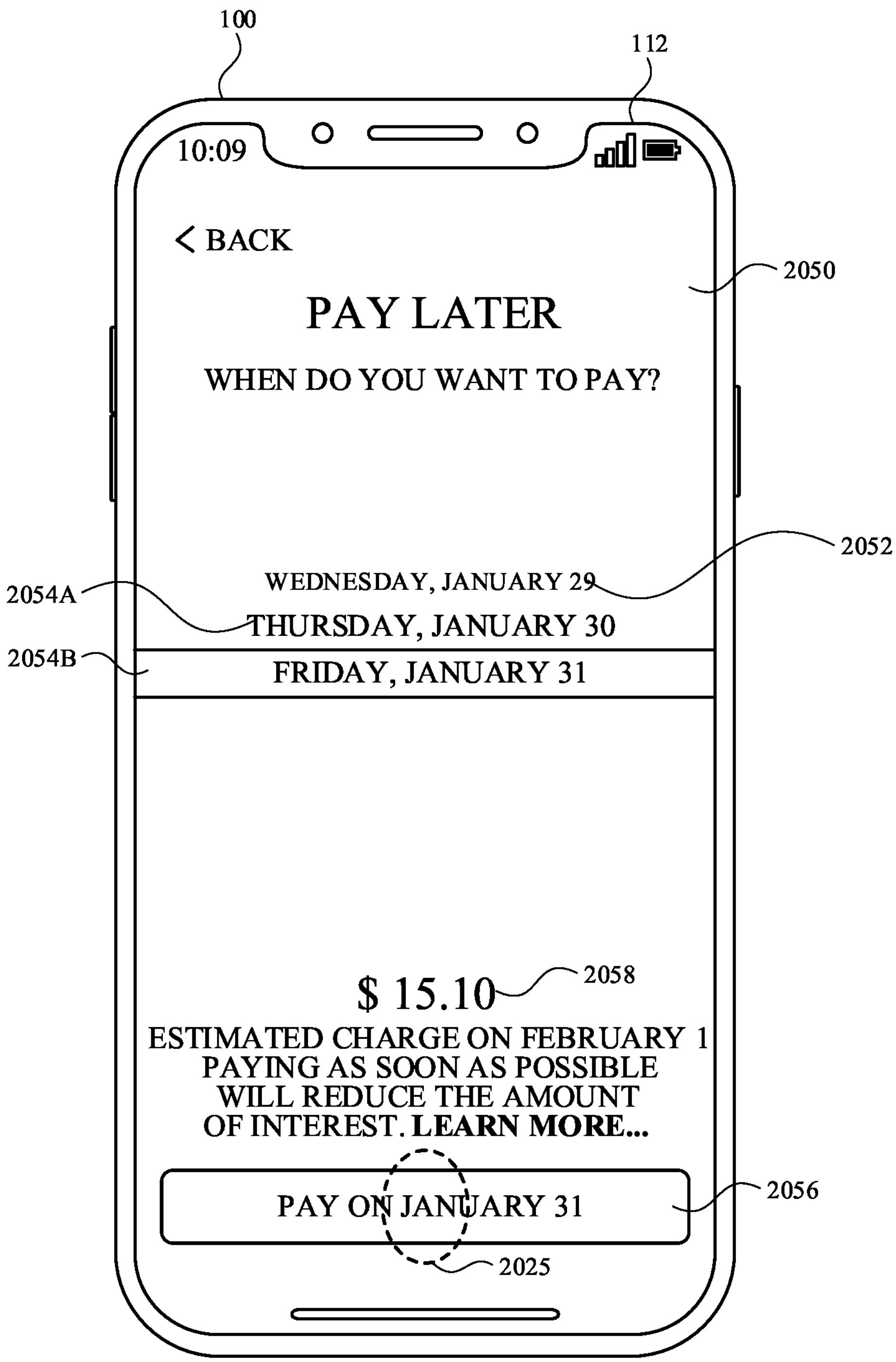

In FIG. 20V, in response to (and/or while) detecting user input 2023 directed to date selector user interface element 2052, electronic device 100 displays a rotation of plurality of dates 2054A within date selector user interface element 2052 from its position in FIG. 20U ("Monday, January 20") to its position in FIG. 20V ("Friday, January 31"), as indicated by selection indicator 2054B. In some embodiments, the currently selected date in FIG. 20V ("Friday, January 31") corresponds to the latest possible selection date for the balance transfer (e.g., the final due date for the current statement balance).

In some embodiments, in response to (and/or while) detecting user input 2023, electronic device 100 updates display of penalty indication 2058 to indicate a correspondingly larger amount of penalty (e.g., interest) that will be imposed on the transfer account (e.g., the first-party credit account; the points account) than in FIG. 20V, as the currently-selected date in FIG. 20V is later in time than the currently-selected date in FIG. 20U.

In some embodiments, in response to (and/or while) detecting user input 2023, electronic device 100 updates display of scheduling confirmation affordance 2056 in accordance with the currently-selected date for the future balance transfer (e.g., a future balance payment). In FIG. 20V, electronic device 100 displays, in scheduling confirmation affordance 2056, that the future balance transfer (e.g., a future balance payment) will be initiated during the selected future date (e.g., by stating "Pay on January 31").

In FIG. 20V, while displaying transfer later user interface 2050 with the latest possible selection date (e.g., the final due date for the current statement balance), electronic device 100 detects a user activation 2025 of scheduling confirmation affordance 2056. In response to detecting user activation 2025 of schedule confirmation affordance 2056, electronic device 100 initiates the scheduling of a future balance transfer (e.g., an automatic future balance payment) based on the selected balance amount in FIG. 20S (e.g., the full statement amount) and the selected balance transfer date in FIG. 20V (e.g., the final due date for the current statement balance).

Figure 20W:
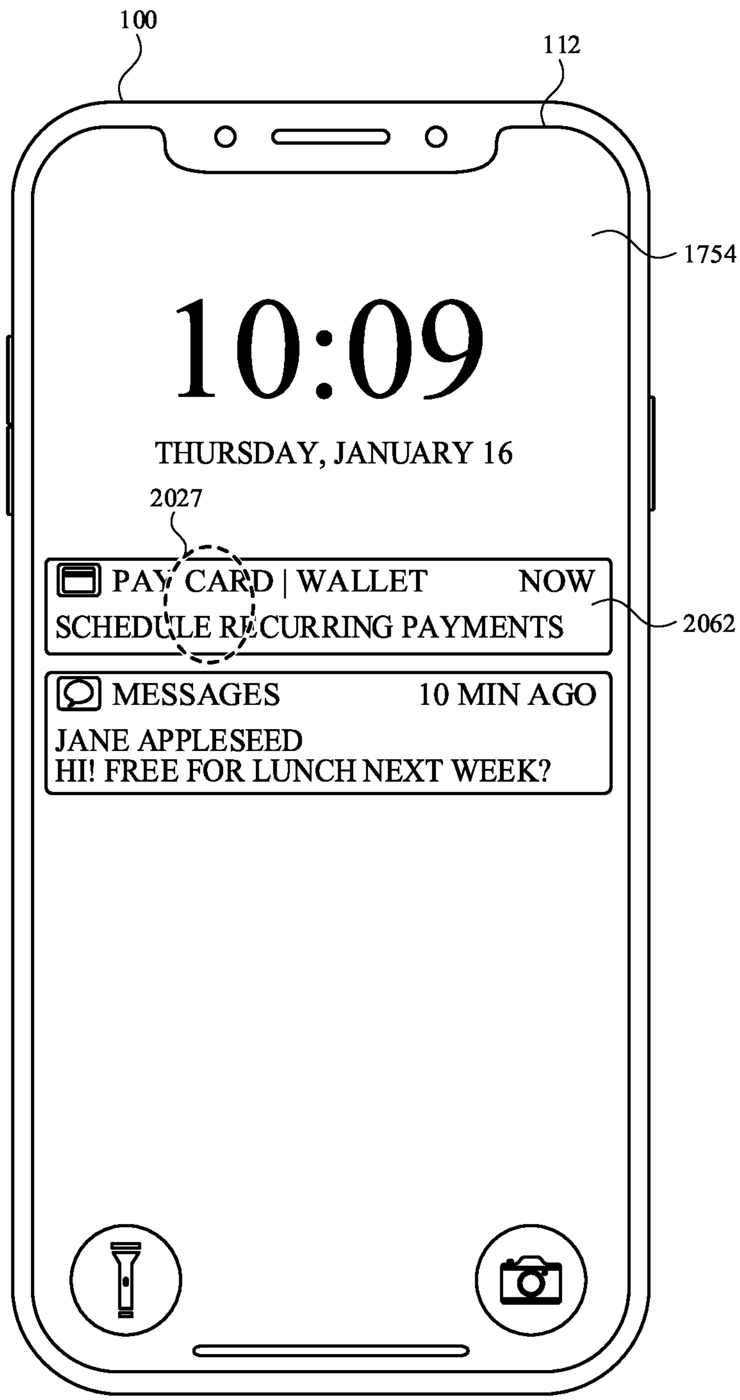

FIG. 20W illustrates electronic device 100 displaying, on display 112, lock user interface 1754 (e.g., a lock screen) of electronic device 100. In some embodiments, electronic device 100 displays, on lock user interface 1754, a notification 2062 corresponding to a request for scheduling recurring transfers for the transfer account (e.g., the first-party credit account; the points account). In FIG. 20W, while displaying notification 2062, electronic device 100 detects a selection 2027 of notification 2062.

Figure 20X:
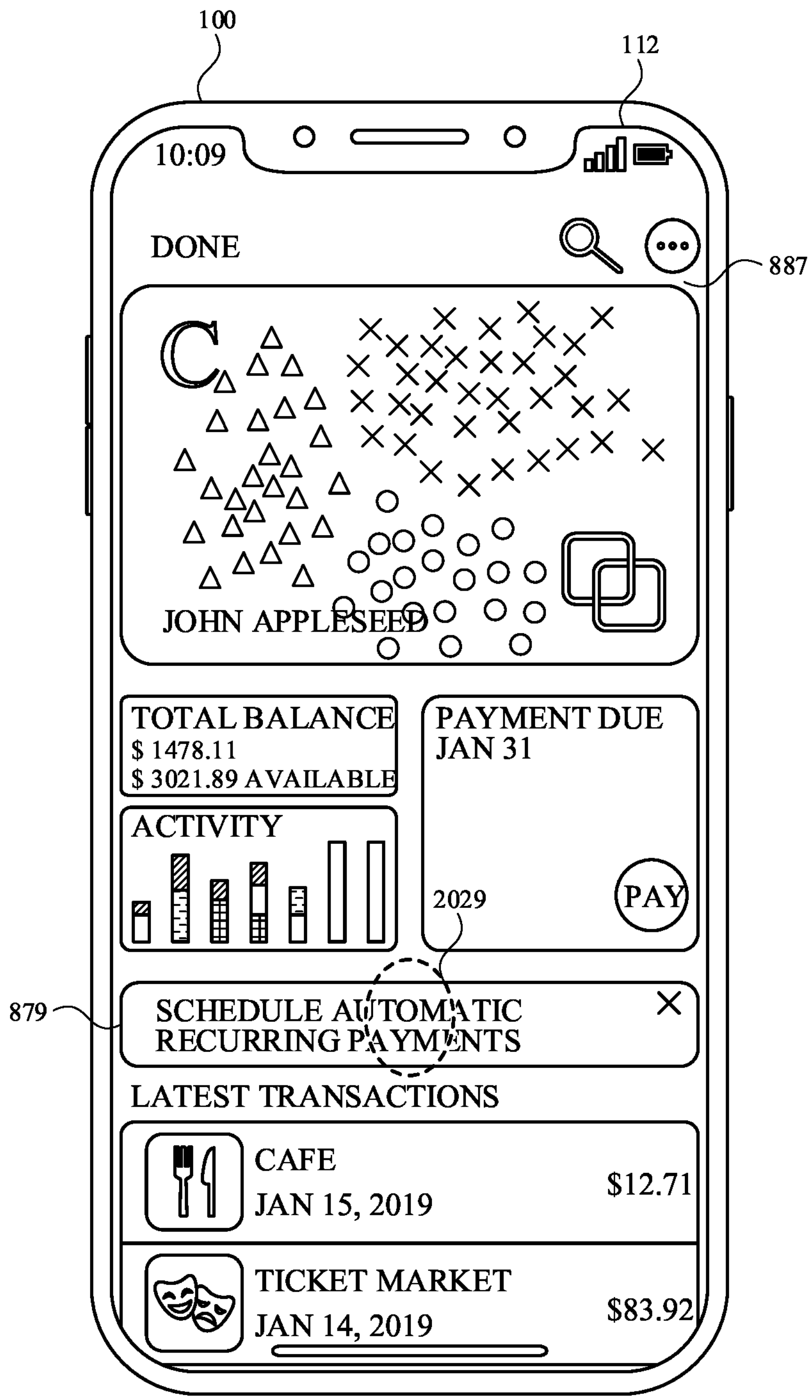

FIG. 20X illustrates electronic device 100 displaying, on display 112, summary user interface 887 (e.g., a dashboard user interface) of the transfer account (e.g., the first-party credit account; the points account). In some embodiments, electronic device 100 displays, in notification user interface element 879 (e.g., a notification module) of summary user interface 887 of the transfer account, the request for scheduling recurring transfers for the transfer account (e.g., the first-party credit account; the points account), as also shown in notification 2062 in FIG. 20W. In FIG. 20X, electronic device 100 detects a selection 2029 of notification user interface element 879.

Figure 20Y:
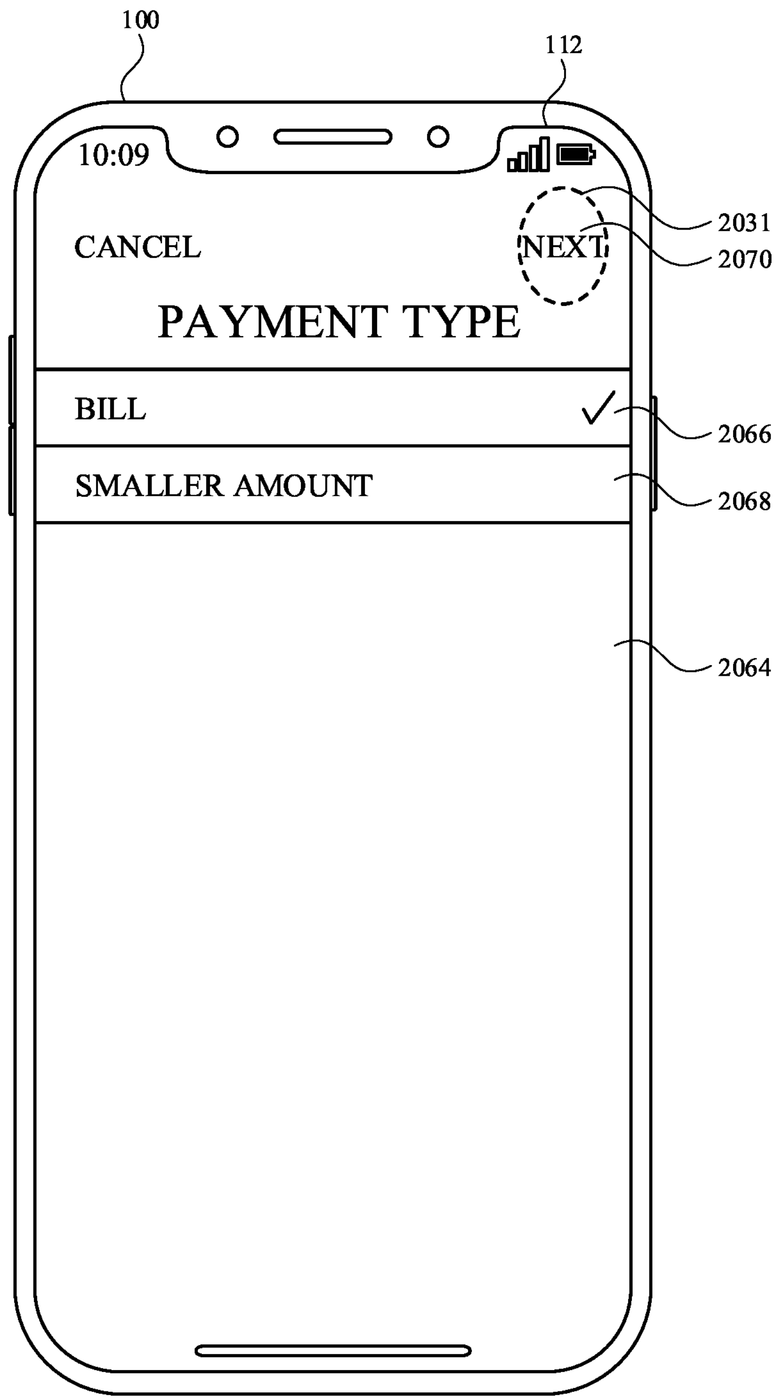

In FIG. 20Y, either in response to detecting selection 2027 of notification 2062 in FIG. 20W or in response to detecting selection 2029 of notification user interface element 879 in FIG. 20X, electronic device 100 displays, on display 112, a first recurring transfer user interface 2064 that includes a first selectable option 2066 for scheduling recurring transfers of a full balance transfer amount for each balance transfer period (e.g., for scheduling recurring balance payments of the full statement amount once every statement period) and a second selectable option 2068 for scheduling recurring transfers of a transfer amount smaller than the full balance transfer amount in time intervals that are different (e.g., smaller) than a balance transfer period (e.g., for scheduling recurring balance payments of amounts that are smaller than the statement amount during every selected time period, such as weekly).

In FIG. 20Y, electronic device 100 displays first selectable option 2066 as the currently-selected option. While displaying first selectable option 2066 as the currently-selected option, electronic device 100 detects a user activation 2031 of a continue affordance 2070.

Figure 20Z:
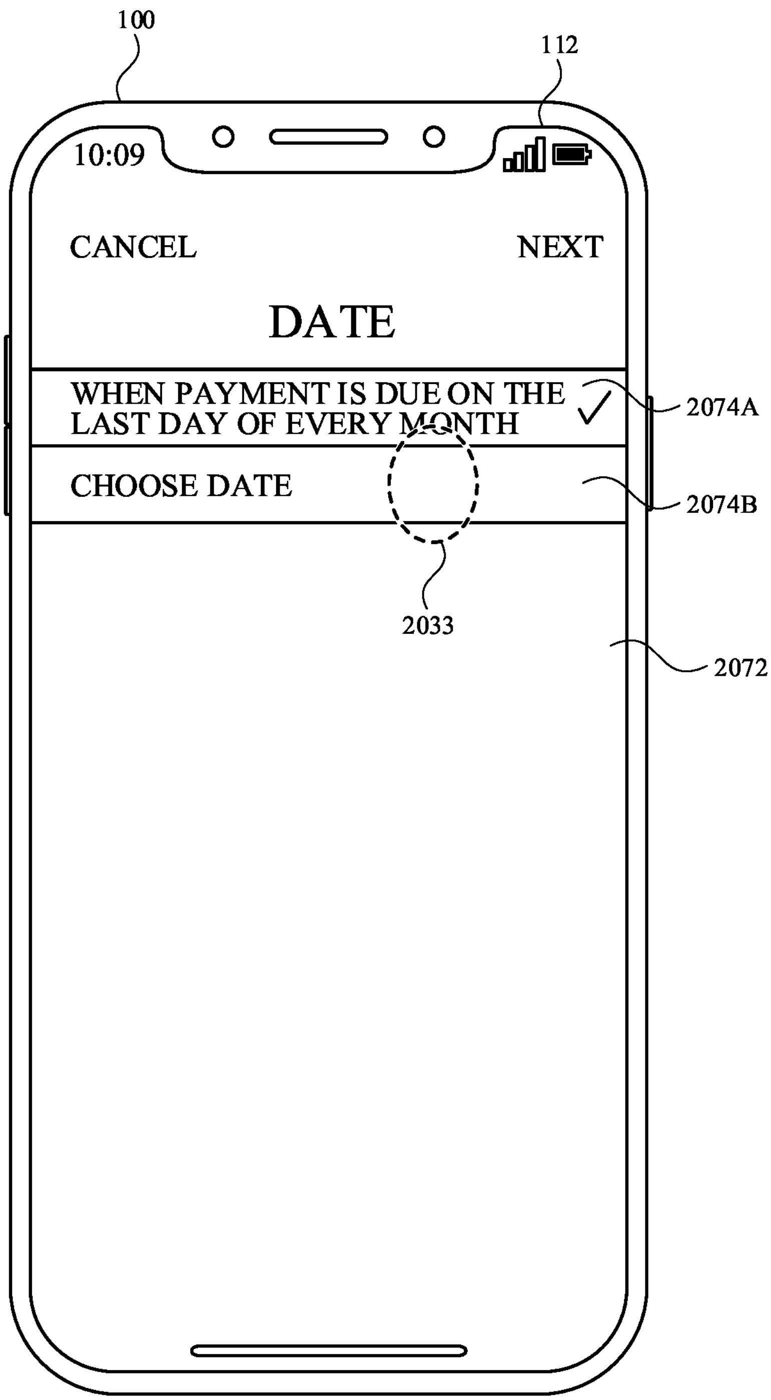
Figure 20A:
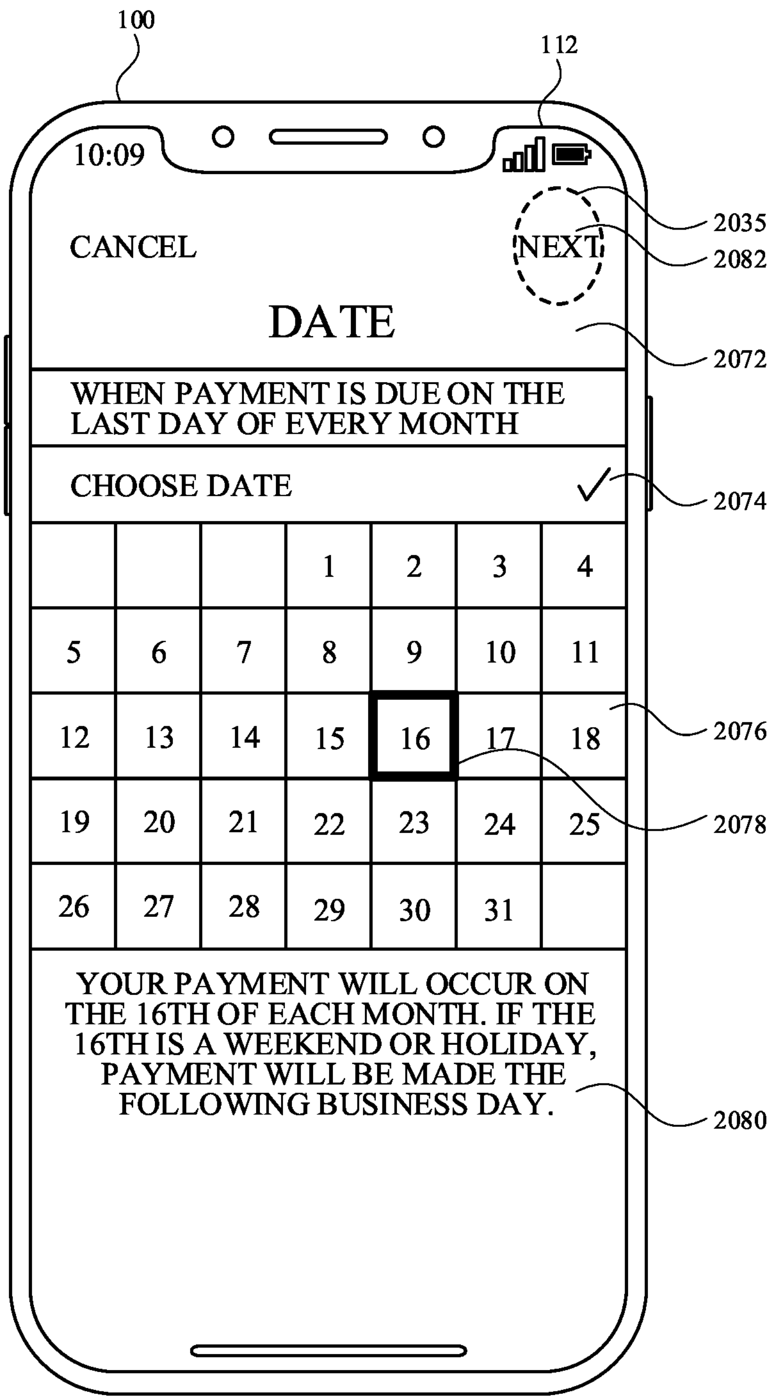
Figure 20A:
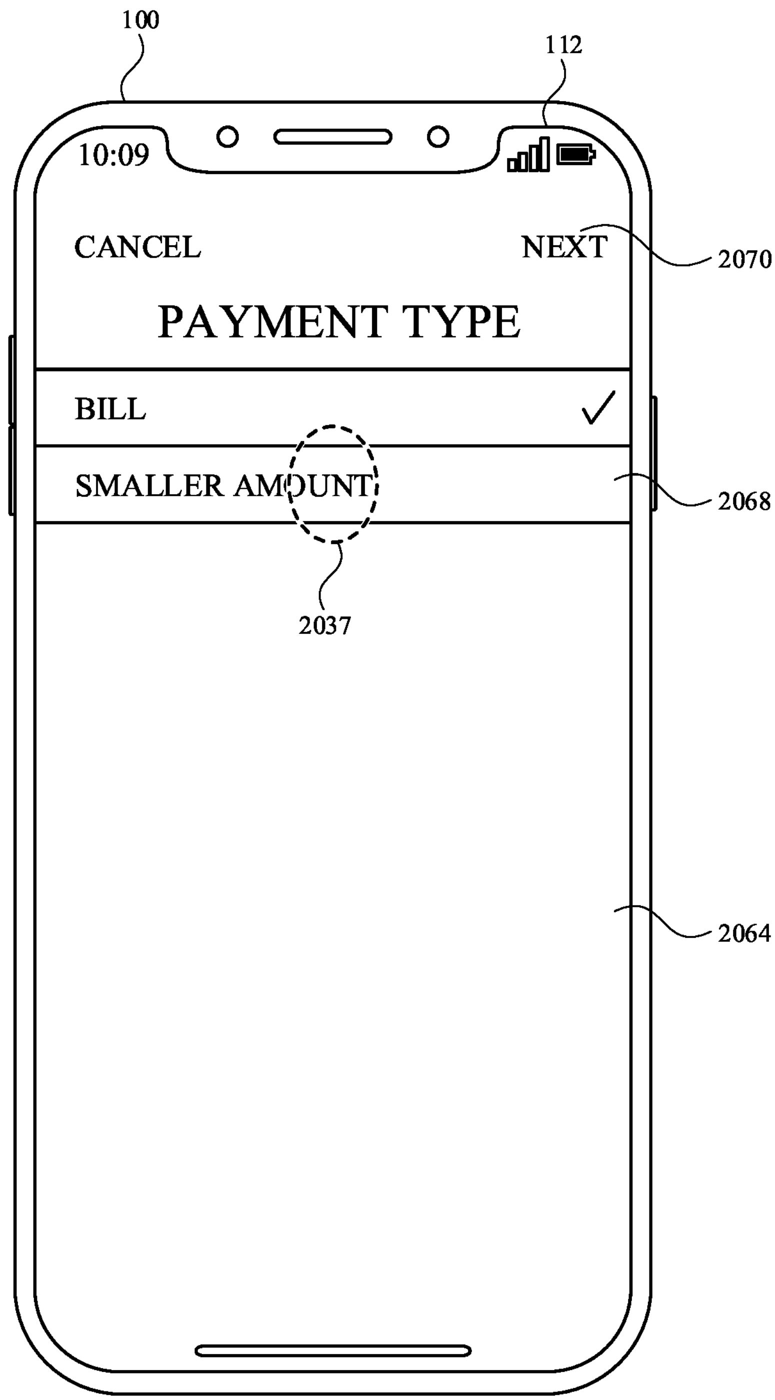
Figure 20A:
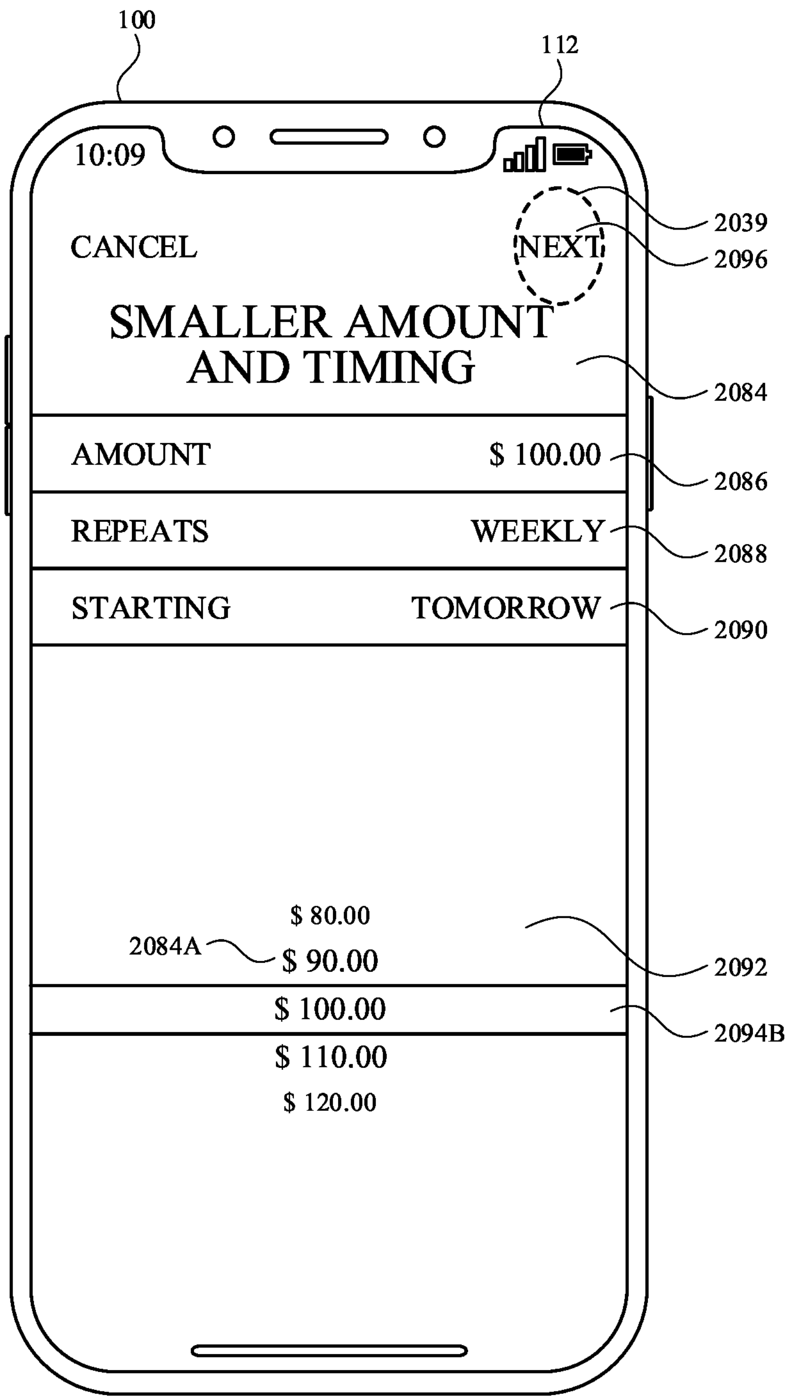
Figure 20A:
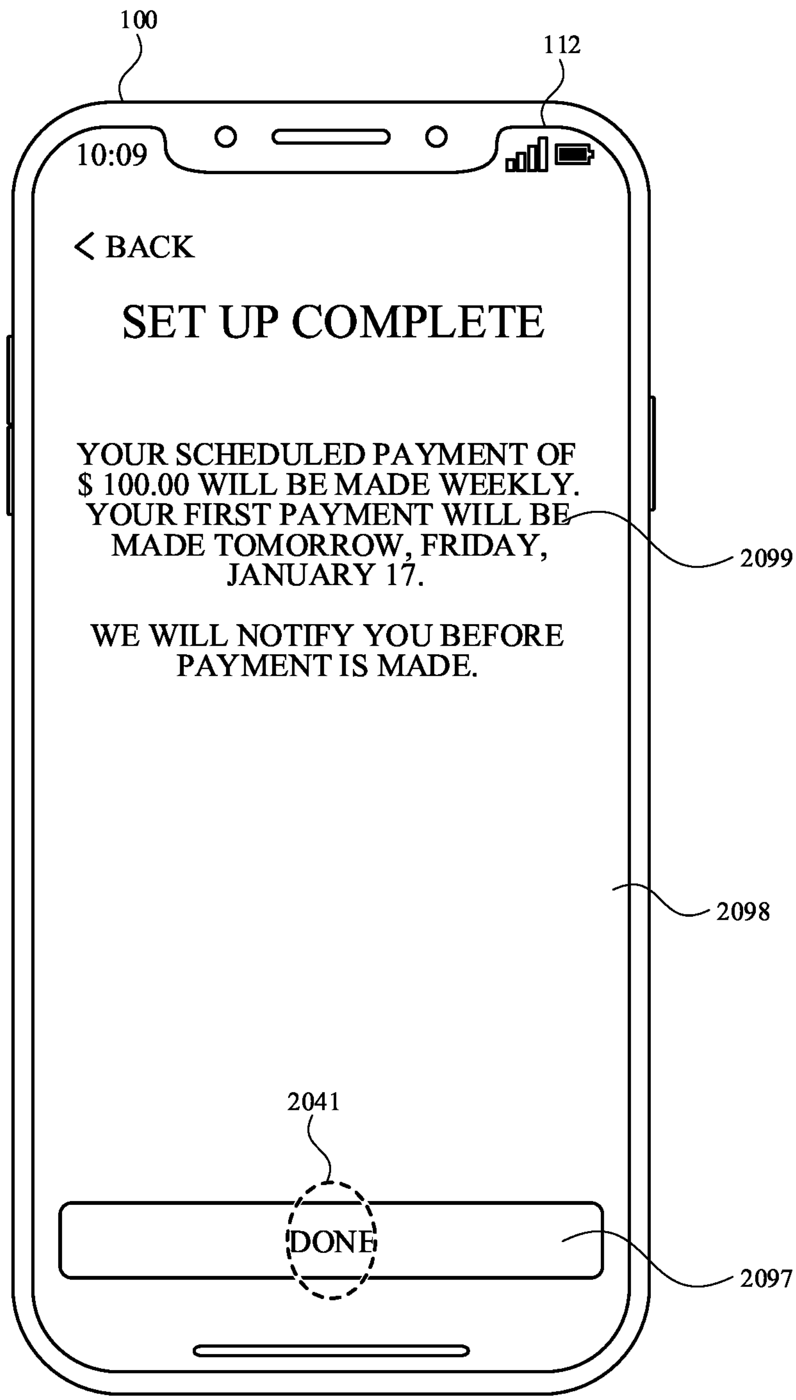
Figure 20A:
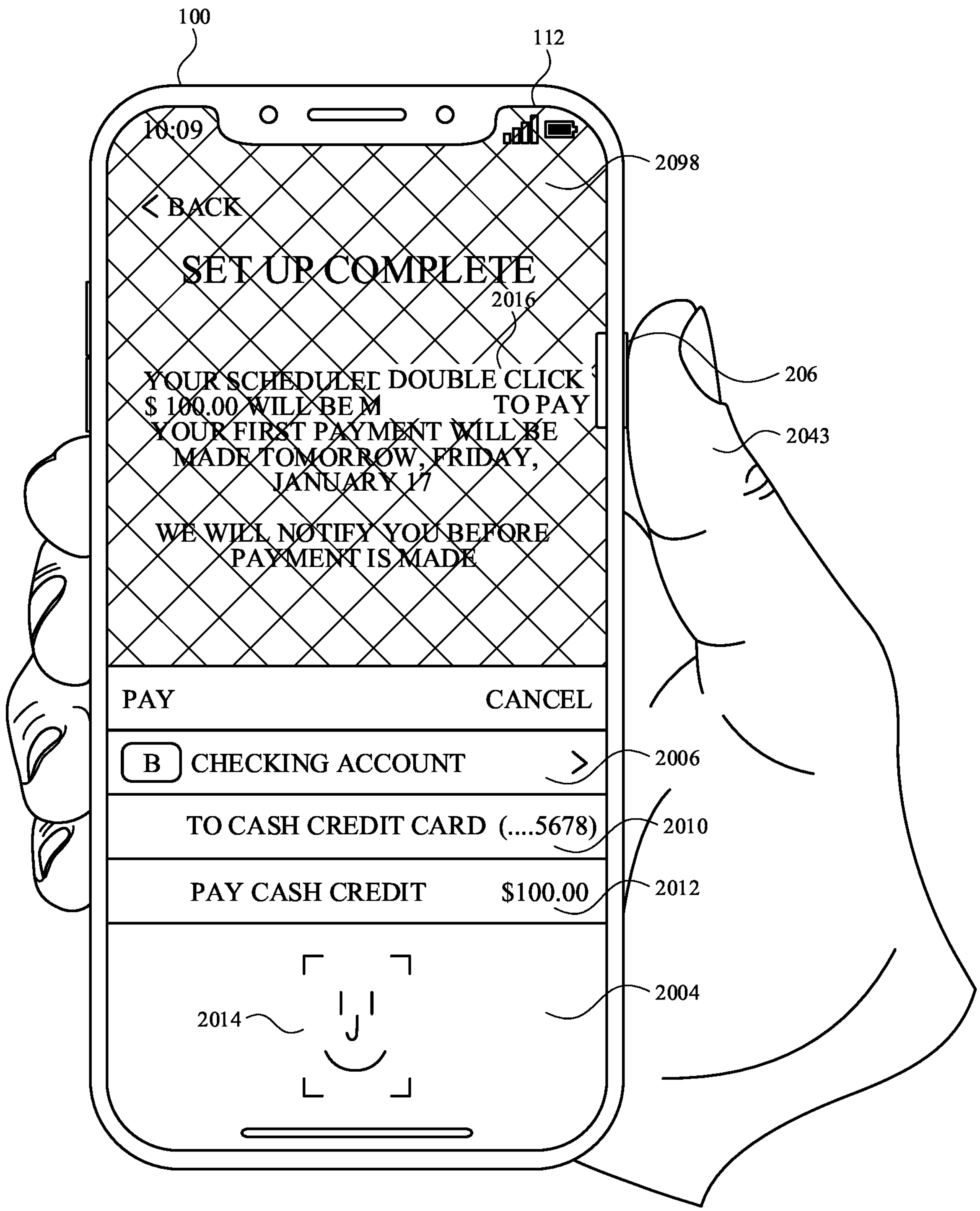
Figure 20A:
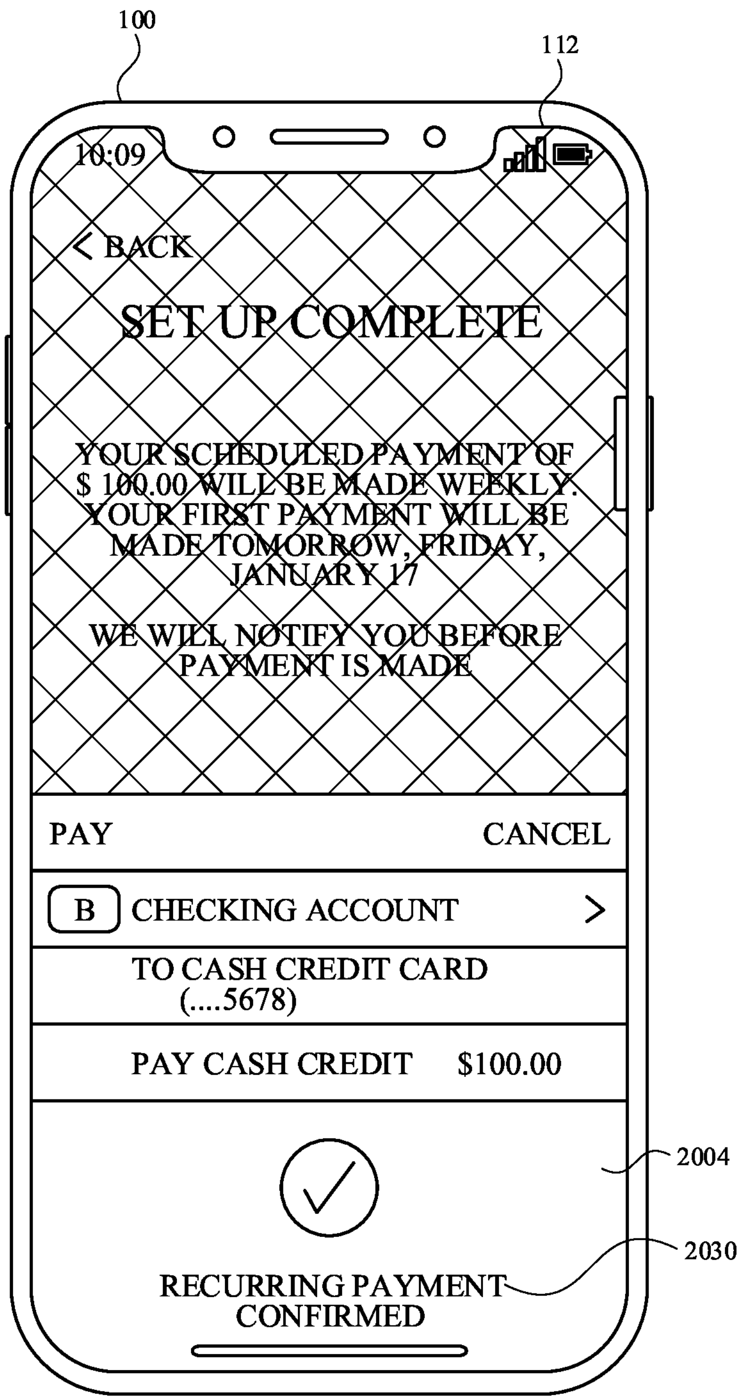
Figure 21A:
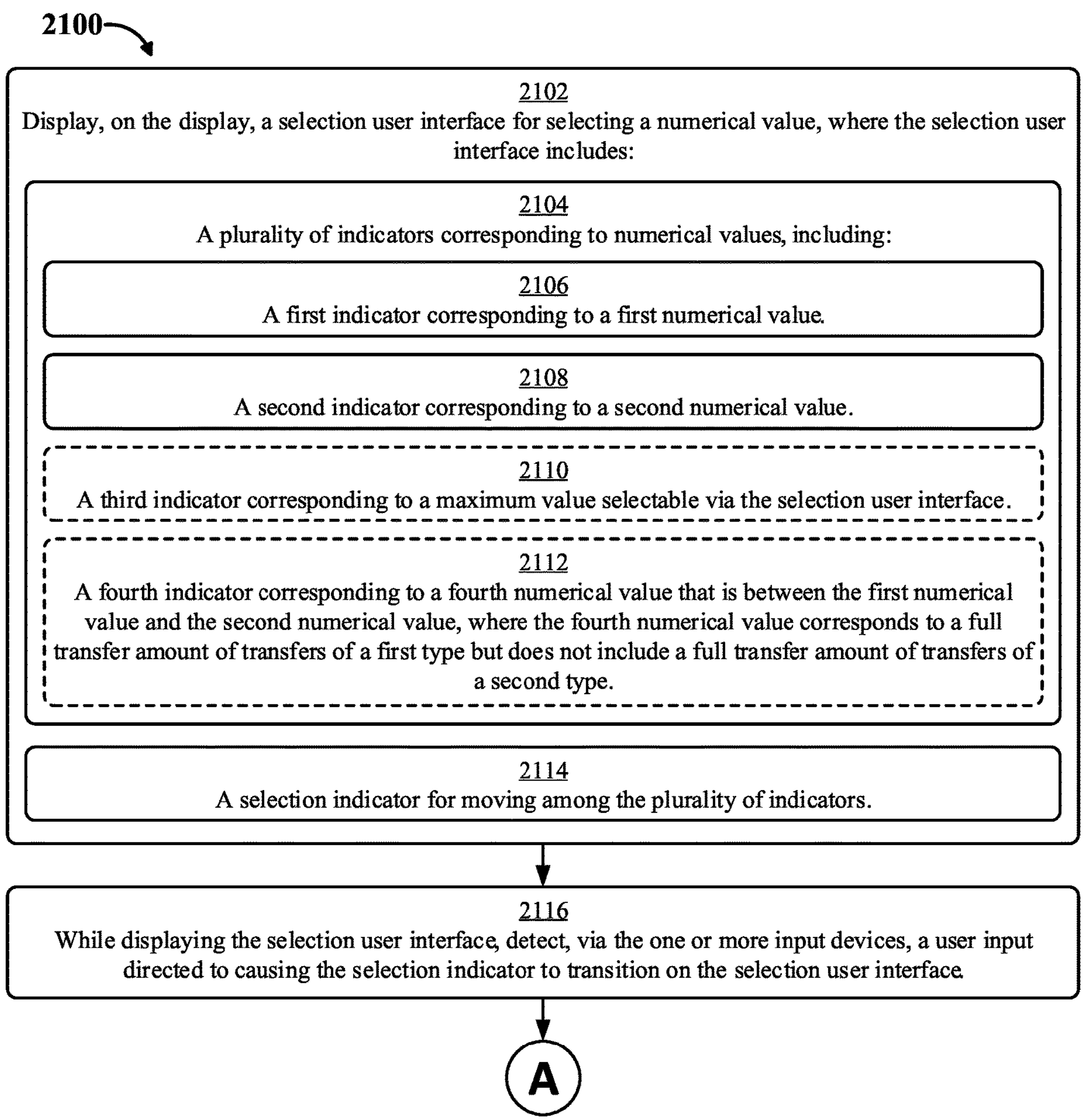
Figure 21F:
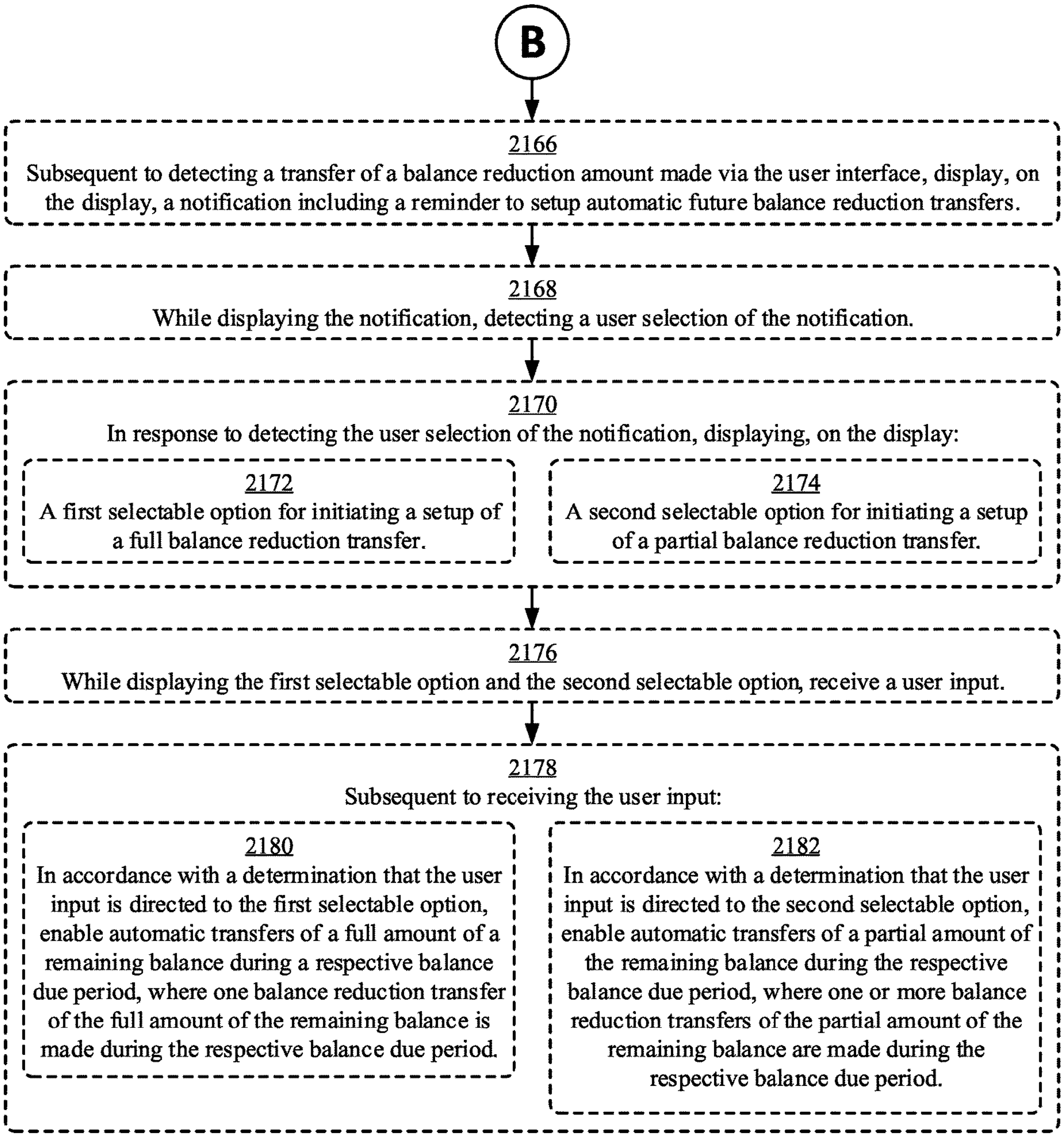

In FIG. 20Z, in response to detecting user activation 2031 of continue affordance 2070, electronic device 100 displays, on display 112, a second recurring transfer user interface 2072 for scheduling recurring transfers of a full balance transfer amount for each balance transfer period (e.g., for scheduling recurring balance payments of the full statement amount once every statement period).

In some embodiments, second recurring transfer user interface 2072 includes a first selectable option 2074A corresponding to an option to schedule a recurring transfer (e.g., a recurring automatic balance payment) on the final due date for each balance period (e.g., on the final due date for each statement balance) and a second selectable option 2074B for selecting a date for a recurring transfer (e.g., to enable the user to manually select a date for each recurring balance payment). In FIG. 20Z, first selectable option 2074B is the currently selected option. While displaying that first selectable option 2074B is the currently-selected option, electronic device 100 detects a selection 2033 of second selectable option 2074B.

In FIG. 20AA, in response to detecting selection 2033 of second selectable option 2074B, electronic device 100 displays, in second recurring transfer user interface 2072, a plurality of selectable dates 2076 (e.g., in a calendar layout) for scheduling the recurring transfer (e.g., recurring automatic balance payments, recurring automatic points transfers). In some embodiments, a selectable date 2078 e.g., the $16^{th}$ of every month) corresponding to the current day is displayed as the default selection. In some embodiments, electronic device 100 also displays (e.g., below plurality of selectable dates 2076, an information region 2080 that includes useful information about scheduling the recurring balance transfer (e.g., recurring automatic balance payments, recurring automatic points transfers) on the currently-selected date.

In FIG. 20AA, while displaying plurality of selectable dates 2076 in second recurring transfer user interface 2072 with selectable date 2078 (e.g., the $16^{th}$ of every month) as the currently-selected date, electronic device 100 detects a user activation 2035 of (e.g., a tap input on) an affordance 2082 (e.g., a continue affordance or a confirmation affordance).

FIG. 20AB illustrates electronic device 100 displaying, on display 112, first recurring transfer user interface 2064, as first depicted in FIG. 20Y. In FIG. 20AB, while displaying first recurring transfer user interface 2064, electronic device 100 detects a selection 2037 of second selectable option 2068 for scheduling recurring transfers of a transfer amount smaller than the full balance transfer amount in time intervals that are different (e.g., smaller) than a balance transfer period (e.g., for scheduling recurring balance payments of amounts that are smaller than the statement amount during every selected time period, such as weekly). In some embodiments, in response to detecting selection 2037 of second selectable option 2068, electronic device 100 displays an indication (e.g., a checkmark) that second selectable option 2068 has been selected. In some embodiments, in some embodiments, subsequent to detecting the selection of second selectable option 2068, electronic device 100 detects a selection (e.g., a selection of confirm affordance 2070) for proceeding with scheduling recurring transfers of a transfer amount smaller than the full balance transfer amount in time intervals that are different (e.g., smaller) than a balance transfer period (e.g., for scheduling recurring balance payments of amounts that are smaller than the statement amount during every selected time period, such as weekly).

In FIG. 20AC, in response to detecting the selection for proceeding with scheduling recurring transfers of a transfer amount smaller than the full balance transfer amount in time intervals that are different (e.g., smaller) than a balance transfer period, electronic device 100 displays, on display, a third recurring transfer user interface 2084 for scheduling recurring transfers of a transfer amount smaller than the full balance transfer amount in time intervals that are different (e.g., smaller) than a balance transfer period.

In some embodiments, third recurring transfer user interface 2084 includes a selectable indication 2086 of a selected balance transfer amount (e.g., the selected balance payment amount), a selectable indication 2088 of a selected frequency for the balance transfer (e.g., daily, weekly, bi-weekly, bi-monthly), and a selectable indication 2090 of selectable dates for the start date of the recurring balance transfers. In some embodiments, in response to detecting a selection of one of selectable indications 2086-2090, electronic device displays (e.g., in a bottom region of third recurring transfer use interface 2084), a selector user interface element 2092 (e.g., a rotating wheel-based date selector module) that includes a (e.g., rotatable) plurality of selectable items 2094A and a selection indicator 2054B. In response to detecting selection of selectable indication 2086, plurality of selectable items 2094A corresponds to selectable amounts for each recurring balance transfer (e.g., the balance payment amount for each recurring balance payment). In response to detecting selection of selectable indication 2088, plurality of selectable items 2094A corresponds to selectable frequencies for the balance transfers (e.g., daily, weekly, bi-weekly, bi-monthly). In response to detecting selection of selectable indication 2090, plurality of selectable items 2094A corresponds to selectable starting dates for the first recurring balance transfer (e.g., the date for the first balance payment of the automatic recurring balance payments, automatic recurring points transfers).

In FIG. 20AC, while displaying selected values or options for each of selectable indications 2086-2090 (e.g., "$100.00," "Weekly," and "Tomorrow"), electronic device 100 detects a user activation 2039 of a continue affordance 2096.

In FIG. 20AD, in response to detecting user activation 2039 of continue affordance 2096, electronic device 100 displays, on display 112, a user interface 2098 for verifying the options selected in third recurring transfer user interface 2084 (e.g., as selected in FIG. 20AC). In some embodiments, user interface 2098 includes text information 2099 summarizing the selections from third recurring transfer user interface 2084 and notifying the user of one or more upcoming scheduled recurring transfers based on the selections. In FIG. 20AD, while displaying user interface 2098, electronic device 100 detects a user activation 2041 of a confirmation affordance 2097.

In FIG. 20AE, in response to detecting user activation of confirmation affordance 2097, electronic device 100 displays, on display 112, transfer sheet user interface 2004 corresponding to the transfer application (e.g., the electronic wallet application), as first described above with reference to FIG. 20J. As mentioned, in some embodiments, transfer sheet user interface 2004 is an operating system user interface (e.g., of a first-party, operating system application that is fully controlled by the operating system of the electronic device) that cannot be controlled by a third-party application. In some embodiments, transfer sheet user interface 2004 is displayed over a portion of (but not all of) user interface 2098 such that a portion of user interface 2098 is still visible on the display. In some embodiments, transfer sheet user interface 2004 includes selectable indication 2006 of the second transfer account (e.g., a third-party account, such as a third-party checking account) to be used as the originating account for the balance transfer from the second transfer account (e.g., a third-party checking account) to the transfer account (e.g., the first-party credit account; the points account). In some embodiments, transfer sheet user interface 2004 includes indication 2010 of the transfer account (e.g., the first-party credit account; the points account), thereby indicating that a transfer (e.g., a balance payment) from the second transfer account (e.g., a third-party account, such as a third-party checking account) to the transfer account (e.g., the first-party transfer account) is being scheduled (e.g., for a balance payment of $100.00). In some embodiments, transfer sheet user interface 2004 includes transfer amount indication 2012 indicating the selected amount for each recurring balance transfer (e.g., a balance payment of $100.00 using the second transfer account (e.g., the third-party checking account) to the transfer account (e.g., the first-party credit account; the points account) for each scheduled recurring balance payment). In some embodiments, an indication 2014 to provide authentication (e.g., biometric authentication, such as facial recognition authentication, fingerprint authentication, iris and/or retina scan authentication, voice recognition authentication; or passcode or password authentication). In some embodiments, electronic device 100 displays a transfer instruction 2016 (e.g., stating "Double Click to Pay") requesting a user action to proceed with the balance transfer (e.g., the balance payment).

In some embodiments, electronic device 100 also displays transfer sheet user interface 2004 corresponding to the transfer application (e.g., the electronic wallet application) in response to detecting user activation 2035 of affordance 2082 in FIG. 20AA. That is, in some embodiments, in response to detecting user activation 2035 of affordance 2082 in FIG. 20AA, electronic device 100 displays transfer sheet user interface 2004 over a portion of (but not all of) user interface 2072 such that a portion of user interface 2072 is still visible on the display.

Subsequently, electronic device 100 detects a user input 2043 in accordance with transfer instruction 2016 (e.g., a double click or double press of an input button of the electronic device, such as push button 206) and, in response to receiving successful authentication (e.g., successful biometric authentication, such as facial recognition authentication, fingerprint authentication, iris and/or retina scan authentication, voice recognition authentication; or successful passcode or password authentication), in FIG. 20AF, electronic device 100 displays, in transfer sheet user interface 2004, an indication 2030 that the recurring balance transfer (e.g., balance payment) has been successfully scheduled.

FIGS. 21A-21F are a flow diagram illustrating a method for managing a transfer of items, in accordance with some embodiments. Method 2100 is performed at an electronic device (e.g., 100, 300, 500) with a display (e.g., 112) and one or more input devices (e.g., the touch screen of display 112, menu button 204, push button 206). Some operations in method 2100 are, optionally, combined, the orders of some operations are, optionally, changed, and some operations are, optionally, omitted.

As described below, method 2100 provides an intuitive way for managing a transfer account. The method reduces the cognitive burden on a user for managing a transfer account, thereby creating a more efficient human-machine interface. For battery-operated computing devices, enabling a user to manage a transfer account faster and more efficiently conserves power and increases the time between battery charges.

The electronic device (e.g., 100) displays (2102), on the display (e.g., 112), a selection user interface (e.g., 1902, 1142) for selecting a numerical value (e.g., corresponding to an amount for a type of operation, such as a transfer (e.g., of funds, credits, points, rewards) or a payment).

The selection user interface (e.g., 1902, 1142) (e.g., concurrently) includes a plurality of indicators (e.g., 1906A-1906E, 1148A-1148E; arranged along a circular, closed-loop user interface element) corresponding to numerical values (2104) (e.g., proposed balance reduction amounts, where the balance is of items of a first type, such as funds, credits, or points), including: a first indicator (e.g., 1906D, 1148D) corresponding to a first numerical value (e.g., a first proposed balance reduction amount, a minimum balance payment amount that avoids a late fee, a balance payment amount that is greater than the minimum payment amount but less than the full statement amount for that period) (2106), and a second indicator (e.g., 1906A-1906C, 1148A-1148C) corresponding to a second numerical value (e.g., a second proposed balance reduction amount, a balance payment amount that is greater than the minimum balance payment amount but less than the full statement amount for that period, or the full statement amount such that additional interest accrual will be avoided) (2108). Displaying the plurality of indicators in the selection user interface provides feedback about recommended transfer amounts and enables the user to quickly and easily select one of the recommended amounts. Providing improved visual feedback to the user enhances the operability of the device and makes the user-device interface more efficient (e.g., by helping the user to provide proper inputs and reducing user mistakes when operating and/or interacting with the device) which, additionally, reduces power usage and improves battery life of the device by enabling the user to use the device more quickly and efficiently.

In some embodiments, the selection user interface (e.g., 1902, 1142) corresponds to a user interface for reducing a balance of a transfer account (e.g., the transfer account as first described above with reference to FIGS. 8A-8V, such as a payment account, a virtual card account, a points account, a rewards account), where the first affordance (e.g., a "pay now" affordance) is for proceeding with a balance reduction transfer (e.g., a partial or full balance payment) in a respective balance reduction amount at the present time, and where the authentication user interface includes an indication of an available redeem balance (e.g., a cash back balance, a points balance, a rewards balance) corresponding to the transfer account that can (e.g., partially or fully) be used towards the respective balance reduction amount.

In some embodiments, the first numerical value (e.g., a first proposed balance reduction amount) corresponds to a minimum value selectable via the selection user interface (e.g., 1902, 1142) (e.g., a minimum balance payment amount that, if paid, avoids a late fee but does not avoid interest accrual for that period). Providing the first numerical value corresponding to a minimum value selectable via the selection user interface provides feedback about the amount of the minimum value. Providing improved visual feedback to the user enhances the operability of the device and makes the user-device interface more efficient (e.g., by helping the user to provide proper inputs and reducing user mistakes when operating and/or interacting with the device) which, additionally, reduces power usage and improves battery life of the device by enabling the user to use the device more quickly and efficiently.

In some embodiments, the second numerical value (e.g., a second proposed balance reduction amount) corresponds to an intermediate value that is less than a maximum value selectable via the selection user interface (e.g., 1902, 1142) (e.g., a full statement balance reduction amount that corresponds to an outstanding statement balance of a transfer account that, if paid, avoids interest accrual on the outstanding balance of the transfer account). Providing the second numerical value corresponding to an intermediate value that is less than a maximum value selectable via the selection user interface (e.g., a full statement balance reduction amount) enables the user to quickly and easily select the an amount corresponding to the intermediate value. Reducing the number of inputs needed to perform an operation enhances the operability of the device and makes the user-device interface more efficient (e.g., by helping the user to provide proper inputs and reducing user mistakes when operating and/or interacting with the device) which, additionally, reduces power usage and improves battery life of the device by enabling the user to use the device more quickly and efficiently.

In some embodiments, the plurality of indicators further includes (e.g., 1906A-1906E, 1148A-1148E) a third indicator corresponding to a maximum value selectable via the selection user interface (e.g., a full current balance reduction amount corresponding to all of a remaining balance of a transfer account (e.g., higher than the full statement balance reduction amount)) (2110). Providing the third indicator corresponding to the maximum value selectable via the selection user interface enables the user to quickly and easily select the amount corresponding to the maximum value. Reducing the number of inputs needed to perform an operation enhances the operability of the device and makes the user-device interface more efficient (e.g., by helping the user to provide proper inputs and reducing user mistakes when operating and/or interacting with the device) which, additionally, reduces power usage and improves battery life of the device by enabling the user to use the device more quickly and efficiently.

In some embodiments, the plurality of indicators (e.g., 1906A-1906E, 1148A-1148E) further includes a fourth indicator (e.g., 1906A-1906C, 1148B-1148C) corresponding to a fourth numerical value (e.g., a fourth proposed balance reduction amount) that is between the first numerical value (e.g., the first proposed balance reduction amount) and the second numerical value (e.g., the second proposed balance reduction amount), where the fourth numerical value (e.g., the fourth proposed balance reduction amount) corresponds to a full transfer amount of transfers of a first type (e.g., made using a transfer account, where the first type is a category such as shopping, groceries, dining, travel) but does not include a full transfer amount of transfers of a second type (e.g., made using the transfer account, where the second type is a different category from the first type) (2112). Thus, in some embodiments, the plurality of indicators proposes an option to pay off all transactions of a first category (e.g., shopping, groceries, travel), leaving payments for other types of categories for future payment periods. Providing the fourth indicator corresponding to a fourth numerical value that is between the first numerical value and the second numerical value, where the fourth numerical value corresponds to a full transfer amount of transfers of a first type but does not include a full transfer amount of transfers of a second type enables the user to quickly and easily select the amount corresponding to the fourth numerical value. Reducing the number of inputs needed to perform an operation enhances the operability of the device and makes the user-device interface more efficient (e.g., by helping the user to provide proper inputs and reducing user mistakes when operating and/or interacting with the device) which, additionally, reduces power usage and improves battery life of the device by enabling the user to use the device more quickly and efficiently.

In some embodiments, the plurality of indicators (e.g., 1906A, 1906E, 1148A-1148E) further includes a fifth indicator corresponding to a fifth numerical value (e.g., a fifth proposed balance reduction amount) that is greater than a minimum value selectable via the selection user interface (e.g., 1902, 1142) (e.g., a minimum balance payment amount that, if paid, avoids a late fee but does not avoid interest accrual for that period) and less than a maximum value selectable via the selection user interface (e.g., a full statement balance reduction amount that corresponds to an outstanding statement balance of a transfer account that, if paid, avoids interest accrual on the outstanding balance of the transfer account), where the fifth numerical value corresponds to a first transfer amount (e.g., for reducing at least a portion of a balance of a transfer account) which, when made over a first duration of time (e.g., 3 months, 6 months), satisfies (e.g., fulfills, reduces, pays off) a maximum transfer amount (e.g., the full balance of the transfer account) within the first duration of time. Providing the fifth indicator corresponding to the fifth numerical value that is greater than a minimum value selectable via the selection user interface and less than a maximum value selectable via the selection user interface, where the fifth numerical value corresponds to a first transfer amount which, when made over a first duration of time, satisfies a maximum transfer amount within the first duration of time enables the user to quickly and easily select the amount corresponding to the fourth numerical value. Reducing the number of inputs needed to perform an operation enhances the operability of the device and makes the user-device interface more efficient (e.g., by helping the user to provide proper inputs and reducing user mistakes when operating and/or interacting with the device) which, additionally, reduces power usage and improves battery life of the device by enabling the user to use the device more quickly and efficiently.

In some embodiments, the plurality of indicators (e.g., 1906A-1906E, 1148A-1148E) further includes a sixth indicator corresponding to a sixth numerical value (e.g., a sixth proposed balance reduction amount) that is greater than the minimum value selectable via the selection user interface (e.g., 1902, 1142) (e.g., a minimum balance payment amount that, if paid, avoids a late fee but does not avoid interest accrual for that period) and less than the fifth numerical value, where the sixth numerical value corresponds to a second transfer amount (e.g., for reducing at least a portion of a balance of a transfer account) which, when made over a second duration of time (e.g., 6 months, 1 year), satisfies (e.g., fulfills, reduces, pays off) a maximum transfer amount (e.g., the full balance of the transfer account) within the second duration of time, where the second duration of time is longer than the first duration of time. Providing the sixth indicator corresponding to the sixth numerical value that is greater than the minimum value selectable via the selection user interface and less than the fifth numerical value, where the sixth numerical value corresponds to a second transfer amount which, when made over a second duration of time, satisfies a maximum transfer amount within the second duration of time, where the second duration of time is longer than the first duration of time enables the user to quickly and easily select the amount corresponding to the fourth numerical value. Reducing the number of inputs needed to perform an operation enhances the operability of the device and makes the user-device interface more efficient (e.g., by helping the user to provide proper inputs and reducing user mistakes when operating and/or interacting with the device) which, additionally, reduces power usage and improves battery life of the device by enabling the user to use the device more quickly and efficiently.

In some embodiments, the second numerical value (the second proposed balance reduction amount; a balance payment amount that is greater than the minimum balance payment amount but less than the full statement amount for that period, or an amount such that additional interest accrual will be avoided) is greater than the first numerical value (e.g., a first proposed balance reduction amount; a minimum balance payment amount that avoids a late fee, a balance payment amount that is greater than the minimum payment amount but less than the full statement amount for that period), where the plurality of indicators (e.g., 1906A-1906E, 1148A-1148E) corresponding to numerical values further includes a third indicator corresponding to a fourth numerical value (e.g., a fourth proposed balance reduction amount; the full statement amount for that period, the full current balance amount) that is greater than the second numerical value and an intermediate indicator corresponding to an intermediate numerical value (e.g., an intermediate proposed balance reduction amount that is between the first proposed balance reduction amount and the second proposed balance reduction amount; a suggested amount that would help to enable the user to reduce the balance amount in an organized, planned manner). In some embodiments, in accordance with a determination that an amount of space between a value corresponding to the first indicator and a value corresponding to the second indicator is above a threshold size (e.g., greater than an amount of space between the value corresponding to the second indicator and a value corresponding to the third indicator) (e.g., based on a comparison of a first distance between the first indicator and the second indicator along a defined path (e.g., a circular path that includes the plurality of indicators along the circular path) and a second distance between the second indicator and the third indicator along the defined path (e.g., the first distance is greater than the second distance)), the electronic device displays the intermediate indicator between the first indicator and the second indicator in the selection user interface along the defined path, where the intermediate numerical value is greater than the first numerical value and less than the second numerical value. In some embodiments, in accordance with a determination that an amount of space between the value corresponding to the first indicator and the value corresponding to the second indicator is below the threshold size (e.g., less than an amount of space between the value corresponding to the second indicator and the value corresponding to the third indicator), the electronic device displays the intermediate indicator between the second indicator and the third indicator in the selection user interface along the defined path, where the intermediate numerical value is greater than the second numerical value and less than the fourth numerical value. In some embodiments, the technique determines whether to place an indicator along a portion of the path (e.g., between first and second indicators, between second and third indicators) when that portion of the path is longer than a threshold amount. Thus, indicators are not placed along portions of path that are less than the threshold amount in length.

In some embodiments, the electronic device (e.g., 100) displays the plurality of indicators (e.g., 1906A-1906E, 1148A-1148E) along a defined path (e.g., 1904, 1146; a circular, closed-loop path) in the selection user interface (e.g., 1142). Displaying the plurality of indicators along the defined path in the selection user interface allows the user to quickly and easily select different amounts, including those corresponding to the indicators, using the selection user interface. Reducing the number of inputs needed to perform an operation enhances the operability of the device and makes the user-device interface more efficient (e.g., by helping the user to provide proper inputs and reducing user mistakes when operating and/or interacting with the device) which, additionally, reduces power usage and improves battery life of the device by enabling the user to use the device more quickly and efficiently.

In some embodiments, the defined path includes a first point corresponding to a minimum numerical value (e.g., a minimum selectable balance reduction or payment amount), a second point corresponding to a maximum numerical value (e.g., the full balance amount), and a plurality of points along the path that correspond to numerical values ranging from the minimum numerical value to the maximum numerical value, and the second point corresponding to the maximum numerical value is the same without regard to the current maximum numerical value. In some embodiments, the maximum numerical value corresponds to a balance (e.g., a current full balance) of a transfer account (e.g., the transfer account as first described above with reference to FIGS. 8A-8V, such as a payment account, a virtual card account, a points account, a rewards account). Thus, in some embodiments, magnitudes of the numerical values corresponding to the plurality of points are based at least in part on a magnitude of the maximum numerical value. In some embodiments, the total magnitude of the numerical values represented by the defined path is based at least in part on the maximum numerical value represented by the defined path. In some embodiments, if the numerical values represented by the defined path corresponds to balance reduction or payment amount for a transfer account (e.g., a payment account), then the maximum numerical value corresponds to the full balance of the account and, as such, the magnitude of the values represented by the defined path is based on the full balance of the account. In some embodiments, in response to detecting the user input directed to the selection user interface snapping the currently selected value to a value selected based on the magnitude of the maximum numerical value and the user input, including: in accordance with a determination that the maximum numerical value is a first value, the electronic device (e.g., 100) selects the currently selected value in increments of a first magnitude (e.g., 50 s or 100 s), and in accordance with a determination that the maximum numerical value is a second value that is different from the first threshold, the electronic device selects the currently selected value in increments of a second magnitude (e.g., 5 s or 10 s) that is different from the first magnitude. In some embodiments, if the first value and the second value are close together, the currently selected value is selected in the same increments. In some embodiments, if the first value is larger than the second value, the first magnitude is larger than the second magnitude. In some embodiments, if the first value is smaller than the second value, the first magnitude is smaller than the second magnitude. In some embodiments, some predefined points along the path are selected without regard to the increments of the first magnitude or the second magnitude (e.g., minimum payment, statement balance, and full payment are selected based on the current values for those metrics and are not selected based on predefined increments).

The selection user interface (e.g., 1142) (e.g., concurrently) includes a selection indicator (e.g., 1908, 1150) for moving among the plurality of indicators (e.g., 1906A-1906E, 1148A-1148E) (2114). The selection indicator allows the user to quickly and easily select different amounts, including those corresponding to the indicators, using the selection user interface. Reducing the number of inputs needed to perform an operation enhances the operability of the device and makes the user-device interface more efficient (e.g., by helping the user to provide proper inputs and reducing user mistakes when operating and/or interacting with the device) which, additionally, reduces power usage and improves battery life of the device by enabling the user to use the device more quickly and efficiently.

While displaying the selection user interface (e.g., 1902, 1142), the electronic device (e.g., 100) detects (2116), via the one or more input devices, a user input (e.g., a touch-and-drag input (e.g., made by a finger of a user of the device) detected via a touch-sensitive surface of the electronic device) directed to causing the selection indicator (e.g., 1908, 1150) to transition on the selection user interface.

In response to detecting the user input directed to causing the selection indicator (e.g., 1150) to transition on the selection user interface (e.g., 1902, 1142) (2118), in accordance with a determination that the user input caused the selection indicator to transition to a location corresponding to the first indicator (e.g., 1906D, 1148D), the electronic device (e.g., 100) displays (2120), on the display (e.g., 112), an amount (e.g., a numerical value, such funds, points, or credits) corresponding to the first numerical value. Displaying the amount corresponding to the first numerical value in accordance with the determination that the user input caused the selection indicator to transition to a location corresponding to the first indicator enables the user to quickly and easily view the amount of the first numerical value. Providing improved visual feedback to the user enhances the operability of the device and makes the user-device interface more efficient (e.g., by helping the user to provide proper inputs and reducing user mistakes when operating and/or interacting with the device) which, additionally, reduces power usage and improves battery life of the device by enabling the user to use the device more quickly and efficiently.

In response to detecting the user input directed to causing the selection indicator (e.g., 1150) to transition on the selection user interface (e.g., 1902, 1142) (2118), in accordance with a determination that the user input caused the selection indicator to transition to a location corresponding to the second indicator, the electronic device (e.g., 100) displays (2122), on the display (e.g., 112), an amount (e.g., a numerical value, such funds, points, or credits) corresponding to the second numerical value. Displaying the amount corresponding to the second numerical value in accordance with a determination that the user input caused the selection indicator to transition to a location corresponding to the second indicator enables the user to quickly and easily view the amount of the second numerical value. Providing improved visual feedback to the user enhances the operability of the device and makes the user-device interface more efficient (e.g., by helping the user to provide proper inputs and reducing user mistakes when operating and/or interacting with the device) which, additionally, reduces power usage and improves battery life of the device by enabling the user to use the device more quickly and efficiently.

In response to detecting the user input directed to causing the selection indicator (e.g., 1150) to transition on the selection user interface (e.g., 1902, 1142) (2118), in accordance with a determination that the user input caused the selection indicator to transition to a location that does not correspond to an indicator of the plurality of indicators (e.g., 1906A-1906E, 1148A-1148E), the electronic device (e.g., 100) displays (2124), on the display (e.g., 112), a third numerical value based on the location of the selection indicator that does not correspond to an indicator of the plurality of indicators. Displaying the amount corresponding to the third numerical value in accordance with the determination that the user input caused the selection indicator to transition to a location that does not correspond to an indicator of the plurality of indicators enables the user to quickly and easily recognize the amount of the third numerical value and to recognize that a value that does not correspond to an indicator is selectable. Providing improved visual feedback to the user enhances the operability of the device and makes the user-device interface more efficient (e.g., by helping the user to provide proper inputs and reducing user mistakes when operating and/or interacting with the device) which, additionally, reduces power usage and improves battery life of the device by enabling the user to use the device more quickly and efficiently.

In some embodiments, in response to detecting the user input causing the selection indicator (e.g., 1908, 1150) to transition on the selection user interface (e.g., 1902, 1142) (2118), in accordance with a determination that the user input caused the selection indicator to transition to a location that is within a predefined threshold distance of a respective indicator of the plurality of indicators (e.g., 1906A-1906E, 1148A-1148E), the electronic device (e.g., 100) selects (2126) a value corresponding to the respective indicator as the selected value. In some embodiments, the electronic device displays a visual indication of snapping (e.g., when the selection indicator is within a threshold distance to the location of a respective indicator when the devices detects a liftoff of the user input, the selection indicator transitions to the location of the respective indicator when the user input lifts off of the touch-sensitive surface) of the selection indicator to the location corresponding to the respective indicator. Displaying the visual indication of snapping of the selection indicator to the location of a respective indicator provides feedback that the indicators correspond to values that are recommended by the device. Providing improved visual feedback to the user enhances the operability of the device and makes the user-device interface more efficient (e.g., by helping the user to provide proper inputs and reducing user mistakes when operating and/or interacting with the device) which, additionally, reduces power usage and improves battery life of the device by enabling the user to use the device more quickly and efficiently.

In some embodiments, in response to detecting the user input causing the selection indicator (e.g., 1908, 1150) to transition on the selection user interface (e.g., 1902, 1142) (2118), in accordance with a determination that the user input caused the selection indicator to transition to a location that is not within the predefined threshold distance of any of the plurality of indicators, the electronic device (e.g., 100) selects (2128) a value that corresponds to the location and does not correspond to any of the plurality of indicators as the selected value. In some embodiments, the electronic device forgoes displaying the visual snapping (e.g., the selection indicator does not transition locations after the device detects a liftoff of the user input) of the selection indicator). Forgoing the visual snapping in accordance with the determination that the user input caused the selection indicator to transition to a location that is not within the predefined threshold distance of any of the plurality of indicators provides feedback that the current location of the selection indicator does not correspond to any recommended values. Providing improved visual feedback to the user enhances the operability of the device and makes the user-device interface more efficient (e.g., by helping the user to provide proper inputs and reducing user mistakes when operating and/or interacting with the device) which, additionally, reduces power usage and improves battery life of the device by enabling the user to use the device more quickly and efficiently.

In some embodiments, the electronic device (e.g., 100) generates non-visual (e.g., tactile and/or audio) output when selecting a value corresponding on the respective indicator and forgoes generating the non-visual output (e.g., 2002) when selecting a value that does not correspond to any of the plurality of indicators (e.g., tactile output corresponding to the visual snapping). Generating non-visual output provides further feedback that the indicators correspond to values that are recommended by the device. Providing improved feedback to the user enhances the operability of the device and makes the user-device interface more efficient (e.g., by helping the user to provide proper inputs and reducing user mistakes when operating and/or interacting with the device) which, additionally, reduces power usage and improves battery life of the device by enabling the user to use the device more quickly and efficiently.

In some embodiments, in response to detecting the user input causing the selection indicator (e.g., 1908, 1150) to transition between the first indicator and the second indicator (and in the direction towards the second indicator along the defined path), the electronic device (e.g., 100) displays (2130), in a first portion of the path (e.g., 1904, 1146) (e.g., and including the selection indicator), visual feedback with a first color (e.g., from the beginning (e.g., top) of a closed-loop (e.g., circular) user interface element towards, in a clockwise direction along the user interface element, the first indicator). Displaying the visual feedback with the first color provides feedback about a state and/or effect of the currently-selected value (e.g., whether the currently-selected value will lead to penalties, lead to an avoidance of penalties, or lead to a reduction of accumulating penalties). Providing improved visual feedback to the user enhances the operability of the device and makes the user-device interface more efficient (e.g., by helping the user to provide proper inputs and reducing user mistakes when operating and/or interacting with the device) which, additionally, reduces power usage and improves battery life of the device by enabling the user to use the device more quickly and efficiently. In some embodiments, in response to detecting the user input causing the selection indicator to transition beyond the second indicator along the path (e.g., from the first indicator on the circular user interface element towards, in a clockwise direction along the user interface element, the second indicator), the electronic device displays (2132), in the first portion and a second portion of the path (e.g., more than the first portion, and including the selection indicator), visual feedback with a second color different from the first color. Displaying the visual feedback with the second color different from the first color provides feedback about a state and/or effect of the currently-selected value (e.g., whether the currently-selected value will lead to penalties, lead to an avoidance of penalties, or lead to a reduction of accumulating penalties). Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while detecting the user input causing the selection indicator (e.g., 1150) to continue transitioning along the defined path (e.g., 1904, 1146) past the second indicator and towards a third indicator (e.g., from the second indicator towards, in a clockwise direction along the circular user interface element, the third indicator), the electronic device (e.g., 100) displays (2134), in the first portion, the second portion, and a third portion of the defined path (e.g., more than the first and second portion, and including the selection indicator), visual feedback with a third color different from the first color and the second color. Displaying the visual feedback with the third color different from the first color and the second color provides feedback about a state and/or effect of the currently-selected value (e.g., whether the currently-selected value will lead to penalties, lead to an avoidance of penalties, or lead to a reduction of accumulating penalties). Providing improved visual feedback to the user enhances the operability of the device and makes the user-device interface more efficient (e.g., by helping the user to provide proper inputs and reducing user mistakes when operating and/or interacting with the device) which, additionally, reduces power usage and improves battery life of the device by enabling the user to use the device more quickly and efficiently.

In some embodiments, in accordance with a determination that the selection indicator (e.g., 1908, 1150) is being moved along the defined path (e.g., 1904, 1146) near the second indicator (e.g., is near the first indicator), the electronic device (e.g., 100) displays (2136) (e.g., a gradual, continuous) a transition of the visual feedback from the first color to the second color.

In some embodiments, in accordance with a determination that the selection indicator (e.g., 1908, 1150) is being moved along the defined path (e.g., 1904, 1146) such that it approaches and then passes the second indicator (e.g., is near the second indicator) and moves towards a third indicator, the electronic device (e.g., 100) displays (2138) (e.g., a gradual, continuous) a transition of the visual feedback from the second color to the third color.

In some embodiments, in response to detecting the user input causing the selection indicator (e.g., 1908, 1150) to transition on the selection user interface (2118), in accordance with the determination that the user input caused the selection indicator to transition to the location corresponding to the first indicator, the electronic device (e.g., 100) displays (2140), in the selection indicator, a first type of graphical indicator (e.g., an exclamation mark). In some embodiments, in response to detecting the user input causing the selection indicator to transition on the selection user interface (2118), in accordance with the determination that the user input caused the selection indicator to transition to the location corresponding to the second indicator, the electronic device (e.g., 100) displays (2142), in the selection indicator, a second type of graphical indicator (e.g., a checkmark) different from the first type. In some embodiments, in accordance with the determination that the user input caused the selection indicator to transition to the location that does not correspond to an indicator of the plurality of indicators, the electronic device forgoes displaying, in the selection indicator, a graphical indicator. In some embodiments, in accordance with a determination that the user input caused the selection indicator to transition to a location corresponding to the third indicator, the electronic device displays, in the selection indicator, a third type of graphical indicator (e.g., a star) different from the first type and the second type. Displaying different types of graphical indicators or forgoing to display the graphical indicator based on the location of the selection indicator provides further feedback about a state and/or effect of the currently-selected value (e.g., whether the currently-selected value will lead to penalties, lead to an avoidance of penalties, or lead to a reduction of accumulating penalties). Providing improved visual feedback to the user enhances the operability of the device and makes the user-device interface more efficient (e.g., by helping the user to provide proper inputs and reducing user mistakes when operating and/or interacting with the device) which, additionally, reduces power usage and improves battery life of the device by enabling the user to use the device more quickly and efficiently.

In some embodiments, the electronic device (e.g., 100) displays (2144), in the selection user interface (e.g., 1902, 1142), an alert (e.g., within a circular user element that defines a path of movement of the selection indicator), that includes information based on a currently selected value (e.g., corresponding to a current location of the selection indicator along a defined path of movement (e.g., a closed-loop (e.g., circular) user interface element) for the selection indicator within the user interface). In some embodiments, in accordance with a determination that the value corresponds to a balance reduction amount that is less than a predetermined threshold amount (e.g., an amount required to avoid interest accrual (e.g., if the selected balance payment amount is less than the statement amount for that period)), the electronic device displays (2146), in the alert, an amount different from the selected amount that is determined based on the selected amount (e.g. an interest accrual amount that will result from the respective balance reduction amount (e.g., the amount of interest that will accrue as a result of not paying off the full statement amount)). Displaying the alert that includes information based on the currently selected value provides further feedback about a state and/or effect of the currently-selected value (e.g., whether the currently-selected value will lead to penalties, lead to an avoidance of penalties, or lead to a reduction of accumulating penalties). Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the selection user interface (e.g., 1902, 1142) includes a (e.g., closed-loop (e.g., circular)) user interface element (e.g., 1146) that is at least partly curved (e.g., and is optionally a closed path such as a circle, ellipse, or oval), the selection indicator (e.g., 1908, 1150) can be dragged along (e.g., at least a portion of) a defined path of the circular user interface element, and the plurality of indicators are displayed along the defined path of circular user interface element. Displaying the user interface element that is at least partly curved and the selection indicator within the defined path of the circular user interface element enables the user to recognize that the selection dictator can be moved along the defined path quickly and easily to change the selected value. Reducing the number of inputs needed to perform an operation enhances the operability of the device and makes the user-device interface more efficient (e.g., by helping the user to provide proper inputs and reducing user mistakes when operating and/or interacting with the device) which, additionally, reduces power usage and improves battery life of the device by enabling the user to use the device more quickly and efficiently. In some embodiments, the selection indicator cannot be dragged to/along a portion of the circular user interface element that would correspond to a balance reduction amount that is below a minimum balance reduction amount.

In some embodiments, the electronic device (e.g., 100) displays, on the display (e.g., 112), an activity history user interface (e.g., showing a balance reduction or payment history for a transfer account) that includes a plurality of representations of past operations of a first type (e.g., past balance reduction transfers, past balance payments, past points balance reduction transfers), where a representation of a past operation of the first type (e.g., past balance reduction transfers, past balance payments, past points balance reduction transfers) includes a respective circular user interface element that includes: a respective selection indicator located within the respective circular user interface based on a numerical value (e.g., an amount) of the corresponding past operation of the first type (e.g., the past balance reduction transfers, the past balance payments, the past points balance reduction transfers), and a visual feedback of a respective color selected based on the numerical value of the corresponding past operation of the first type.

In some embodiments, the electronic device (e.g., 100) displays (2148), in the user interface (e.g., 1902, 1142), a first affordance (e.g., 1916, 1162, 2048; a "pay now" affordance) for proceeding with an operation of a first type (e.g., a balance reduction transfer, a balance payment) at a present time (e.g., proceeding with paying at least a portion of the current balance immediately) and a second affordance (e.g., 1914, 1160, 2046; a "pay later" affordance) for proceeding with the operation of the first type (e.g., the balance reduction or balance payment) at a future time (e.g., setting a future time and/or date for paying off at least a portion of the current balance). Displaying the first affordance and the second affordance in the user interface allows the user to quickly and easily to initiate an immediate or future transfer. Providing additional control options without cluttering the UI with additional displayed controls enhances the operability of the device and makes the user-device interface more efficient (e.g., by helping the user to provide proper inputs and reducing user mistakes when operating and/or interacting with the device) which, additionally, reduces power usage and improves battery life of the device by enabling the user to use the device more quickly and efficiently.

In some embodiments, while displaying the first affordance (e.g., 1916, 1162, 2048) for proceeding with the operation of the first type (e.g., a balance reduction transfer, a balance payment) at the present time, the electronic device (e.g., 100) detects (2150) (e.g., via an input device of the electronic device, such as a touch-sensitive surface) a selection of the first affordance. In some embodiments, in response to detecting the selection of the first affordance, the electronic device (e.g., 100) displays (2152), on the display (e.g., 112), an authentication user interface (e.g., 2004) for authorizing (e.g., via biometric authentication, such as facial recognition authentication, fingerprint authentication, iris and/or retina scan authentication, and/or voice recognition authentication; via passcode or password authentication) the transfer of a respective balance reduction amount. In some embodiments, the authentication user interface corresponds to a secure transfer or payment application that can only be accessed by the operating system of the device and cannot be accessed by a third-party application. In some embodiments, displaying the authentication user interface comprises displaying the authentication user interface over a portion of the user interface corresponding to the transfer account such that at least a portion of the user interface corresponding to the transfer account is still visible on the display. Displaying the authentication user interface that can only be accessed by the operating system of the device and cannot be accessed by a third-party application improves security by blocking access to the authentication user interface from third parties and third-party applications. Enhancing security features of the device enhances the operability of the device by making the device more secure, which in turn enables the user to use the device more efficiently and frequently.

In some embodiments, while displaying the authentication user interface (e.g., 2004), the electronic device (e.g., 100) detects (2154) (e.g., via an input device of the electronic device, such as a touch-sensitive surface) a user selection of an affordance (e.g., 2006) for selecting a default balance transfer account (e.g., a default account used for balance payments, such as a checking account) for use towards the respective balance reduction amount (e.g., used to pay off a balance of the transfer account). In some embodiments, in response to detecting the affordance for selecting the default balance transfer account, the electronic device (e.g., 100) displays (2156), on the display (e.g., 112), a selector (e.g., 2024; a toggle with on/off states) for setting using an available redeem balance (e.g., a cash back balance, a points balance, a rewards balance) corresponding to the transfer account prior to using the default transfer account towards the respective balance reduction amount.

In some embodiments, while displaying the second affordance (e.g., 1914, 1160, 2046) for proceeding with the operation of the first type (e.g., the balance reduction transfer, the balance payment) at the future time, the electronic device (e.g., 100) detects (2158) (e.g., via an input device of the electronic device, such as a touch-sensitive surface) a selection of the second affordance. In some embodiments, in response to detecting the selection of the second affordance, the electronic device (e.g., 100) displays (2160), on the display (e.g., 112), a scheduling user interface (e.g., 2050) for scheduling an automatic future operation of the first type (e.g., an automatic future transfer of a respective balance reduction amount) having a set numerical value.

In some embodiments, while displaying the scheduling user interface (e.g., 2050), the electronic device (e.g., 100) detects (2162) (e.g., via an input device of the electronic device, such as a touch-sensitive surface) a user input directed to changing a future date for proceeding with the operation of the first type (e.g., for proceeding with the transfer of the respective balance reduction amount). In some embodiments, while detecting the user input directed to changing the future date, the electronic device (e.g., 100) updates (2164) a displayed time-based numerical value accumulation amount (e.g., 2058; an interest accrual amount on a remaining balance of a transfer account) based on the selected future date. In some embodiments, the scheduling user interface (e.g., 2050) includes a wheel-of-time user interface element (e.g., 2052) for changing the selected date by scrolling through available dates within the wheel. In some embodiments, the wheel-of-time user interface element includes a plurality of selectable times and/or dates that can be scrolled or rotated (e.g., in a vertical direction) via user input relative to a selection indictor, where the time and/or date that is shown in the selection indicator corresponds to the currently-selected time and/or date. In some embodiments, in the wheel-of-time user interface element, a subset of (but not all of) the plurality of selectable times and/or dates as displayed-selectable times and/or dates can be moved off of and moved in to the user interface element (e.g., from a top and bottom edge of the user interface element) as the times and/or dates are scrolled or rotated in response to the user input. In some embodiments, the electronic device continually updates the displayed interest accrual amount based on or in response to changes in the selected future date. Continually updating the displayed penalty amount (e.g., the interest accrual amount) based on or in response to changes in the selected future date enables the user to quickly and easily view changes in the penalty amount based on the selected date. Providing improved visual feedback to the user enhances the operability of the device and makes the user-device interface more efficient (e.g., by helping the user to provide proper inputs and reducing user mistakes when operating and/or interacting with the device) which, additionally, reduces power usage and improves battery life of the device by enabling the user to use the device more quickly and efficiently.

In some embodiments, the electronic device (e.g., 100) displays, in the user interface (e.g., 1902, 1142), a third affordance (e.g., 1918, 1164; a "use keypad" affordance) for entering a balance reduction amount using a displayed keypad. In some embodiments, while displaying the third affordance for entering a balance reduction amount using a displayed keypad, the electronic device detects (e.g., via an input device of the electronic device, such as a touch-sensitive surface) a user selection of the third affordance. In some embodiments, in response to detecting the user selection of the third affordance, the electronic device displays, a keypad user interface (e.g., 2032) that can be used to enter a balance reduction amount that cannot be selected using the selection indicator (e.g., an amount that is smaller than a minimum payment amount). In some embodiments, the keypad user interface includes a plurality of proposed balance reduction amounts (e.g., 2038A-2038C) corresponding to the proposed balance reduction amounts provided in the user interface corresponding to the transfer account. In some embodiments, the keypad user interface includes an indication (e.g., 2042) of current interest accrual. In some embodiments, the keypad user interface includes a graphical indication (e.g., 2040) of the selected balance reduction amount that is similar to a user interface element corresponding to the selection indicator that is shown in the user interface corresponding to the transfer account.

In some embodiments, subsequent to (or in response to) detecting a transfer of a balance reduction amount made via the user interface (e.g., 1902, 1142), the electronic device (e.g., 100) displays (2166), on the display (e.g., 112), a notification (e.g., 879, 2062) including a reminder to setup automatic future balance reduction transfers (e.g., automatic recurring balance payments, automatic recurring points balance reduction transfers). Displaying the notification including the reminder to setup automatic future balance reduction transfers reminds the user that automatic balance reduction transfers can be setup. Providing improved visual feedback to the user enhances the operability of the device and makes the user-device interface more efficient (e.g., by helping the user to provide proper inputs and reducing user mistakes when operating and/or interacting with the device) which, additionally, reduces power usage and improves battery life of the device by enabling the user to use the device more quickly and efficiently.

In some embodiments, in response to detecting a user selection of the notification, the electronic device (e.g., 100) enables the setup of monthly balance reduction transfers, where the date of the month for the monthly transfers is selectable by a user of the device. In some embodiments, in response to detecting a user selection of the notification, the electronic device (e.g., 100) enables the setup of more frequent repeat balance reduction transfers (e.g., weekly, bi-monthly), where the frequency of the transfers and/or an amount of each transfer is selectable by a user of the device.

In some embodiments, while displaying the notification (e.g., 879, 2062), the electronic device (e.g., 100) detects (2168) a user selection of the notification. In some embodiments, in response to detecting the user selection of the notification, the electronic device (e.g., 100) displays (2170), on the display (e.g., 112): a first selectable option (e.g., 2066) for initiating a setup of a full balance reduction transfer (e.g., a payment of all of the current statement balance) (2172), and a second selectable option (e.g., 2068) for initiating a setup of a partial balance reduction transfer (e.g., a payment of a portion of, but not all of, the current statement balance) (2174). In some embodiments, while displaying the first selectable option and the second selectable option, the electronic device (e.g., 100) receives (2176) a user input. In some embodiments, subsequent to (or in response to) receiving the user input (2178), in accordance with a determination that the user input is directed to the first selectable option, the electronic device (e.g., 100) enables (2180) automatic transfers of a full amount of a remaining balance (e.g., the full statement balance) during a respective balance due period (e.g., a statement period, each month), where one balance reduction transfer of the full amount of the remaining balance is made during the respective balance due period. In some embodiments, subsequent to (or in response to) receiving the user input (2178), in accordance with a determination that the user input is directed to the second selectable option, the electronic device (e.g., 100) enables (2182) automatic transfers of a partial amount of the remaining balance during the respective balance due period, where one or more balance reduction transfers of the partial amount of the remaining balance are made during the respective balance due period.

In some embodiments, the numerical values correspond to an amount of computer storage for which data is stored onto the computer storage.

In some embodiments, the numerical value that is selected via the selection user interface corresponds to a portion of the amount of computer storage for which data is stored onto the computer storage, where data corresponding to the portion of the amount of computer storage is to be deleted from the computer storage.

In some embodiments, the numerical values correspond to an amount of financial resources that have been used to make purchases.

In some embodiments, the numerical value that is selected via the selection user interface corresponds to a portion of the amount of financial resources that have been used to make purchases, where the portion of the amount of financial resources is to be restored to a use quota that is set for using the financial resources.

Note that details of the processes described above with respect to method 2100 (e.g., FIGS. 21A-21F) are also applicable in an analogous manner to the methods described above and below. For example, method 900 optionally includes one or more of the characteristics of the various methods described above with reference to method 2100. For example, the balance transfer user interface described in method 2100 can be used to perform balance reduction transfers for the transfer account activated in method 900. For another example, method 1200 optionally includes one or more of the characteristics of the various methods described above with reference to method 2100. For example, the summary user interface described in method 1200 can include an affordance or selectable user interface element for initiating a balance transfer for the transfer account using the balance transfer user interface described in method 2100. For another example, method 1500 optionally includes one or more of the characteristics of the various methods described above with reference to method 2100. For example, the visual effect and/or feedback provided on a representation of the transfer account as described in method 1500 can include a particular visual effect and/or feedback that is provided in response to a balance transfer made through the balance transfer user interface described in method 2100. For another example, method 1800 optionally includes one or more of the characteristics of the various methods described above with reference to method 2100. For example, the balance amount corresponding to past transfers associated with the common place corresponding to the place summary user interface described in method 1800 can be reduced using the balance transfer user interface described in method 2100. For another example, method 2400 optionally includes one or more of the characteristics of the various methods described above with reference to method 2100. For example, the balance amount corresponding to transfers made using the authentication credential described in method 2400 can be reduced using the balance transfer user interface described in method 2100. For another example, method 2700 optionally includes one or more of the characteristics of the various methods described above with reference to method 2100. For example, the balance amount corresponding to transfers made using the physical account object activated in method 2700 can be reduced using the balance transfer user interface described in method 2100. For another example, method 3000 optionally includes one or more of the characteristics of the various methods described above with reference to method 2100. For example, the balance transfer user interface described in method 2100 can be accessed via the balance transfer user interface element described in method 3000. For brevity, these details are not repeated below.

FIGS. 22A-22B illustrate exemplary user interfaces for managing an authentication credential connected with a user account (e.g., a computer storage account), in accordance with some embodiments. The user interfaces in these figures are used to illustrate the processes described below, including the processes in FIGS. 24A-24D and FIG. 24E.

FIG. 22A illustrates electronic device 100 displaying, on display 112, an authentication credential user interface 2202 (e.g., similar to authentication credential user interface 2306 described below with reference to FIG. 23C) that relates to the user account (e.g., a computer storage account).

In some embodiments, authentication credential user interface 2202 includes an indication 2204 of an enabled authentication credential (e.g., a current, active, and/or enabled virtual account number for the user account), an indication 2206 of an expiry date of the enabled authentication credential, and an indication 2208 of a verification code (e.g., a verification number corresponding to the enabled authentication credential).

In some embodiments, the authentication credential (e.g., virtual account number) can be used (e.g., together with the corresponding expiry date and verification code) to authorize access to the computer storage resources of the user account (e.g., a computer storage account) by entering the authentication credential and, if needed, the expiry date and verification code, to access the computer storage resources associated with the user account (e.g., on a public computer or a third-party device where the user account cannot directly be used to access the computer storage resources associated with the user account).

In some embodiments, authentication credential user interface 2202 includes an affordance 2210 for requesting a new authentication credential (e.g., a new virtual account number) for the user account (e.g., a computer storage account). For example, a new authentication credential may be requested if the current authentication credential is compromised (e.g., is no longer secure).

In some embodiments, authentication credential user interface 2202 includes a selectable option 2212 for updating a local storage account or local archive account (e.g., a local backup account) that is linked to the user account (e.g., a cloud-based computer storage account). In some embodiments, data that is stored on the computer storage resources associated with the user account (e.g., a cloud-based computer storage account) can also be stored and/or archived in or backed-up on a linked local storage account or local archived account.

In some embodiments, authentication credential user interface 2202 includes a selectable option 2214 for requesting an increase in the use quota of the user account (e.g., a computer storage account), thus enabling an increase in the amount of computer storage resources associated with the user account.

In some embodiments, authentication credential user interface 2202 includes options for enabling or disabling different types of notifications concerning the user account (e.g., a computer storage account). In some embodiments, authentication credential user interface 2202 includes a selectable indicator 2216 (e.g., a toggle button) for enabling or disabling general notifications concerning the user account (e.g., new data storage activity, data deletion activity, use quota penalties). In some embodiments, authentication credential user interface 2202 includes a selectable indicator 2218 (e.g., a toggle button) for enabling or disabling promotion notifications concerning the user account (e.g., promotions for use quota bonuses).

In some embodiments, authentication credential user interface 2202 includes an affordance 2220 for reporting that a physical account object (e.g., a physical, real-world card) connected with the user account (e.g., a computer storage account), which is described in greater detail below with reference to FIG. 25, has been lost or stolen. In some embodiments, authentication credential user interface 2202 includes an affordance 2222 for replacing an existing physical account object with a new physical account object connected with the user account (e.g., a computer storage account).

FIG. 22B illustrates electronic device 100 displaying, in indication 2204 of an enabled authentication credential (e.g., a current, active, and/or enabled virtual account number for the user account) of authentication credential user interface 2202, a new authentication credential (e.g., a new virtual account number) for the user account (e.g., a computer storage account) in response to detecting a user activation of affordance 2210. In some embodiments, electronic device 100 also displays, in indication 2206 and indication 2208, a new expiry date and a new verification code, respectively, for the new authentication credential for the user account (e.g., a computer storage account).

In some embodiments, in response to detecting a user activation of affordance 2210 to request the new authentication credential, the new authentication credential for the user account (e.g., a computer storage account) is immediately enabled and available to be used to access the computer storage resources associated with the user account. In some embodiments, in response to detecting a user activation of affordance 2210 to request the new authentication credential, the previous authentication credential (displayed in FIG. 22A) for the user account (e.g., a computer storage account) is immediately disabled and is no longer available to be used to access the computer storage resources associated with the user account.

FIGS. 23A-23G illustrate exemplary user interfaces for managing an authentication credential connected with a transfer account, in accordance with some embodiments. The user interfaces in these figures are used to illustrate the processes described below, including the processes in FIGS. 24A-24D.

Figure 23A:
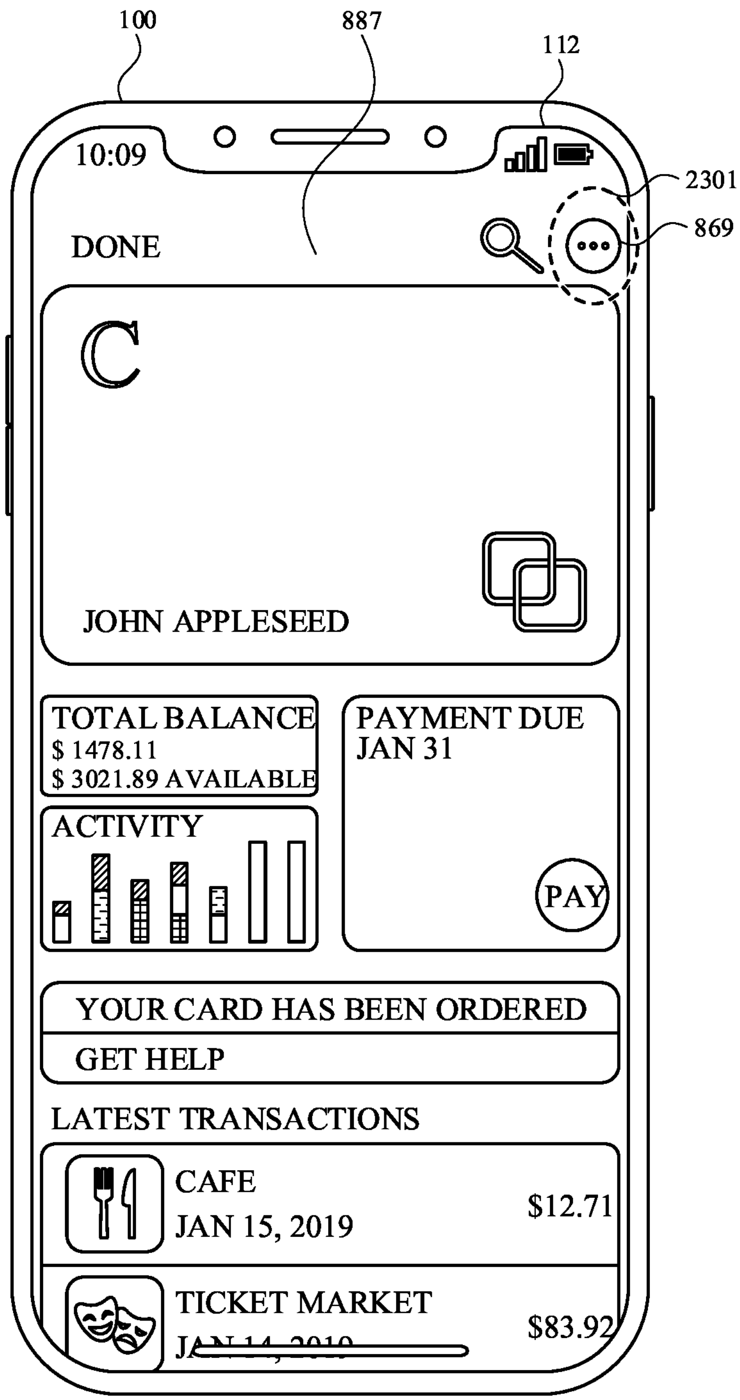
FIGS. 23A-23G illustrate exemplary user interfaces for managing an authentication credential connected with a transfer account, in accordance with some embodiments.

FIG. 23A illustrates electronic device 100 displaying, on display 112, summary user interface 887 including representation 870 of the transfer account (e.g., the first-party credit account; the points account). As mentioned, in some embodiments, the transfer account is a first-party credit account (e.g., a revolving credit account that is issued or branded by the manufacturer of the electronic device), and provides rewards (e.g., cash back rewards) based on the amount of transfers (e.g., payment transactions, points transfers) made using the transfer account (e.g., cash back rewards that are based on a certain percentage of the value of each transition). As also mentioned, in some embodiments, the transfer account is a points account (e.g., for meal points, for printer credits, for membership points) that provides rewards (e.g., points rewards) based on the amount of points used using the transfer account.

In FIG. 23A, while displaying summary user interface 887, electronic device 100 detects a selection 2301 of (e.g., a tap input on) a details affordance 869 for displaying additional and/or more detailed information about the transfer account (e.g., the first-party credit account; the points account).

Figure 23B:
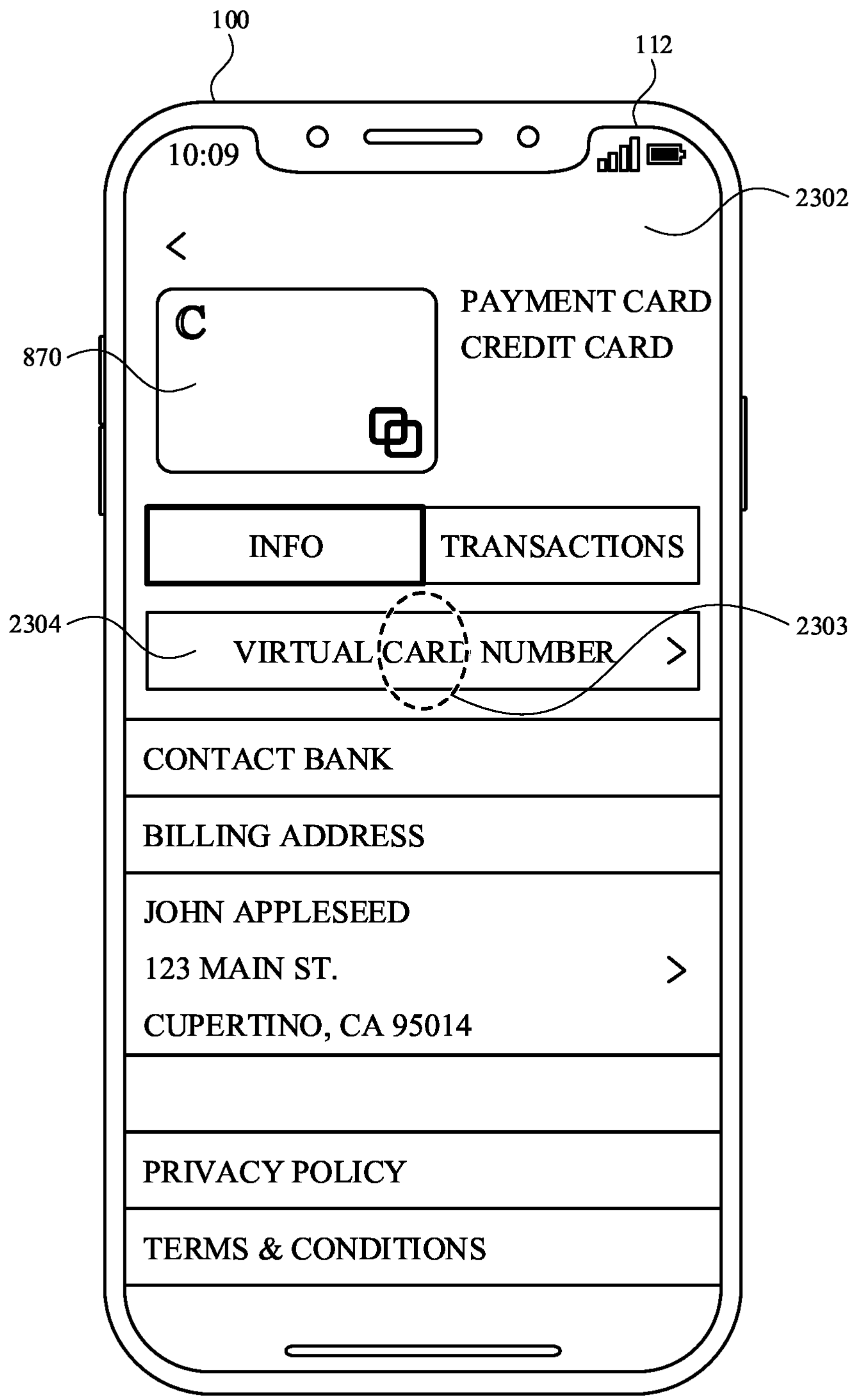

In FIG. 23B, in response to detecting selection 2301 of details affordance 869, electronic device 100 displays, on display 112, an account details user interface 2302 that includes (e.g., a smaller) representation 870 of the transfer account (e.g., the first-party credit account; the points account), additional information (e.g., name of the user connected with the transfer account, billing address of the transfer account) about the transfer account (e.g., the first-party credit account; the points account) and options concerning managing the transfer account (e.g., view transaction history information of the transfer account, contact a financial institution connected to the transfer account, view a privacy policy related to the transfer account, view terms and conditions of the transfer account).

In FIG. 23B, while displaying account details user interface 2302, electronic device 100 detects a selection 2303 of (e.g., a tap input on) an affordance 2304 for displaying information about an authentication credential (e.g., a virtual account number, a virtual card number) connected to the transfer account (e.g., the first-party credit account; the points account).

Figure 23C:
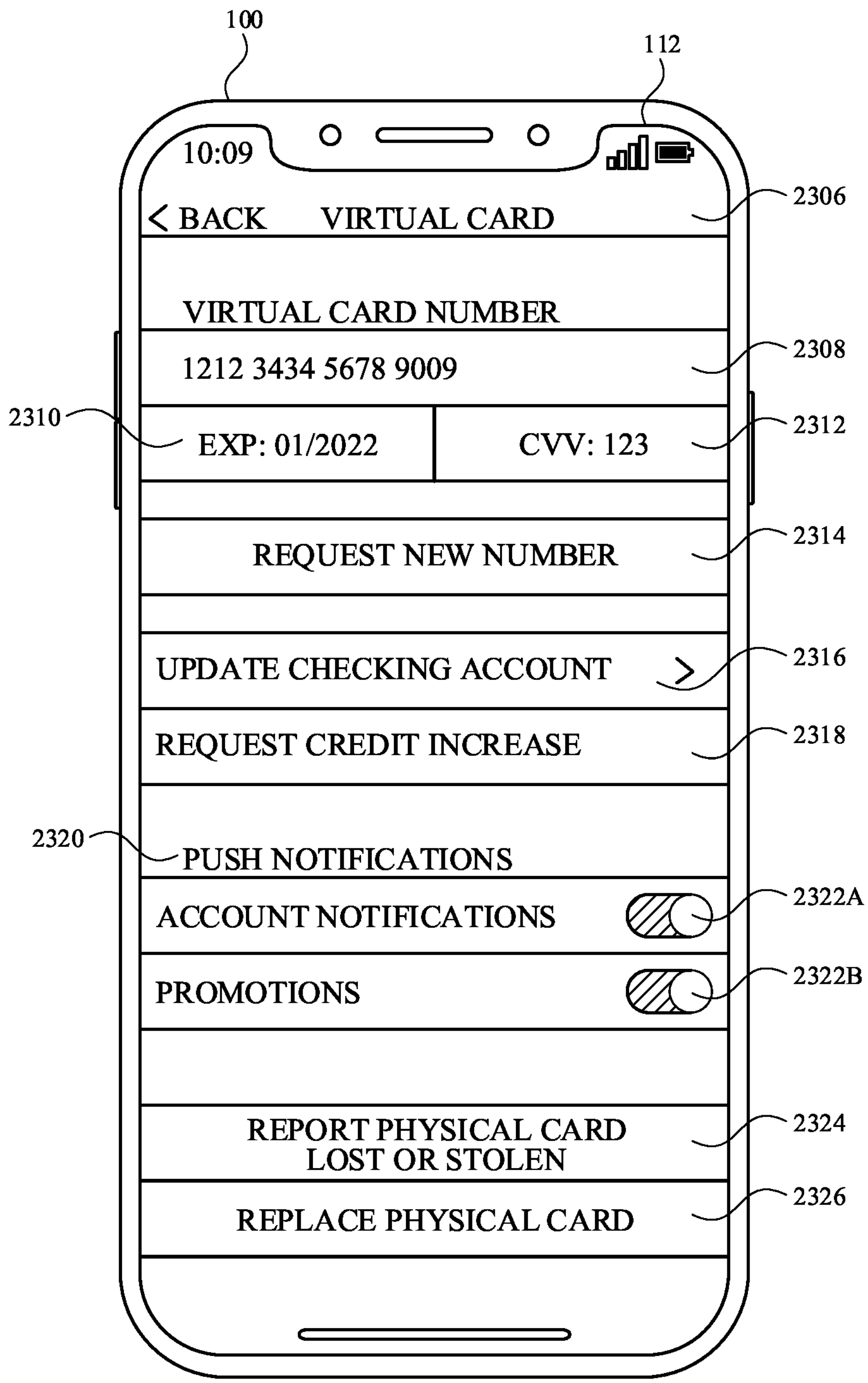

In FIG. 23C, in response to detecting selection 2303 of affordance 2304, electronic device 100 displays, on display 112, an authentication credential user interface 2306 corresponding to the transfer account (e.g., the first-party credit account; the points account). In some embodiments, authentication credential user interface 2306 includes an indication 2308 of an enabled authentication credential (e.g., a current, active, and/or enabled virtual account number or virtual card number of the transfer account), an indication 2310 of an expiry date of the authentication credential (e.g., an expiry date of the virtual account number or virtual card number), and an indication 2312 of a verification number (e.g., a CVV number corresponding to the virtual account number or the virtual card number).

In some embodiments, the authentication credential (e.g., virtual account number, virtual card number) can be used (e.g., together with the associated expiry date and verification number) to authorize transfers (e.g., payment transactions; points transfers) using the transfer account (e.g., the first-party credit account; the points account) by providing the authentication credential (e.g., virtual account number, virtual card number) and, if needed, the expiry date and verification number, to proceed with the transfer. For example, the authentication credential can be provided in response to a request for account information (e.g., credit card information, bank account information) to proceed with an online transfer (e.g., an online payment transaction; an online points transfer) using the transfer account. For another example, the authentication credential can be provided in response to a request for account information (e.g., credit card information, bank account information) to proceed with an offline, paper-based transfer (e.g., payment transactions that involve writing down account information, such as credit card information, to perform the transaction) using the transfer account.

In some embodiments, authentication credential user interface 2306 includes an affordance 2314 for requesting a new authentication credential (e.g., a new virtual account number, a new virtual card number) connected to the transfer account (e.g., the first-party credit account; the points account). For example, a new authentication credential may be requested if the current authentication credential is compromised (e.g., is no longer secure).

In some embodiments, authentication credential user interface 2306 includes a selectable option 2316 for updating second transfer account information (e.g., a third-party account, such as a third-party checking account) that is linked to the transfer account (e.g., the first-party credit account; the points account) for balance transfers (e.g., used to provide funds for balance payments, used to provide points for points balance reduction transfers). In some embodiments, authentication credential user interface 2306 includes a selectable option 2318 for requesting a limit increase (e.g., a credit line increase, a spending limit increase) on the transfer account (e.g., the first-party credit account; the points account).

In some embodiments, authentication credential user interface 2306 includes a notifications region 2320 that includes options for enabling or disabling different types of notifications concerning the transfer account (e.g., the first-party credit account; the points account). In some embodiments, notifications region 2320 includes a selectable indicator 2322A (e.g., a toggle button) for enabling or disabling general notifications concerning the transfer account (e.g., account activity, transfers made using the transfer account). In some embodiments, notifications region 2320 includes a selectable indicator 2322B (e.g., a toggle button) for enabling or disabling promotion notifications concerning the transfer account (e.g., promotions displayed in notification user interface element 879 of summary user interface 887 of the transfer account).

In some embodiments, authentication credential user interface 2306 includes an affordance 2324 for reporting that a physical account object (e.g., a physical, real-world card) connected with the transfer account (e.g., the first-party credit account; the points account), which is described in greater detail below with reference to FIGS. 26A-26N, has been lost or stolen. In some embodiments, authentication credential user interface 2306 includes an affordance 2326 for replacing an existing physical account object with a new physical account object connected with the transfer account (e.g., the first-party credit account; the points account).

Figure 23D:
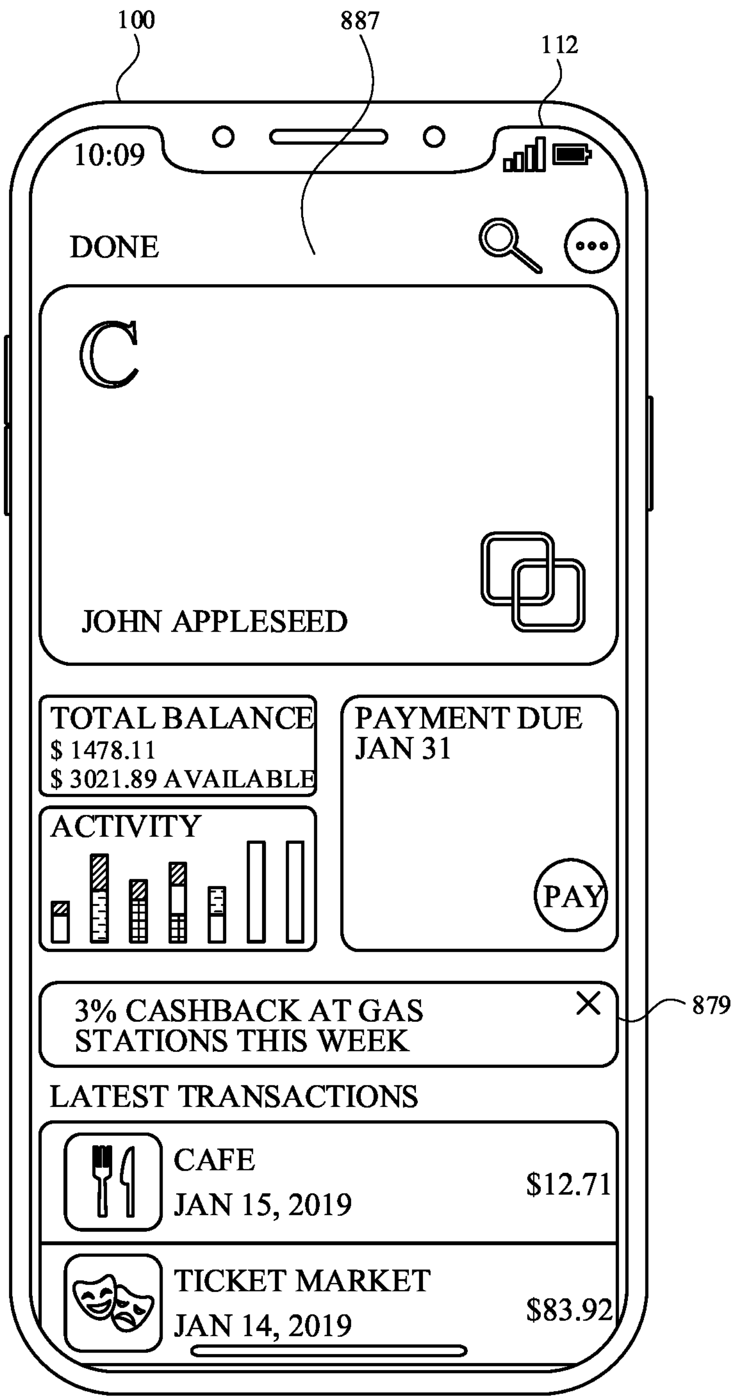

FIG. 23D illustrates electronic device 100 displaying, on display 112, summary user interface 887 of the transfer account (e.g., the first-party credit account; the points account). In accordance with a determination that promotion notifications are enabled (e.g., because selectable indicator 2322B in authentication credential user interface 2306 is enabled), electronic device 100 displays, in notification user interface element 879 (e.g., a notification module) of summary user interface 887, one or more active promotions concerning the transfer account (e.g., the first-party credit account; the points account). In some embodiments, electronic device 100 automatically updates the promotions displayed in notification user interface element 879 based on active promotions, which may be received from a remote server.

Figure 23E:
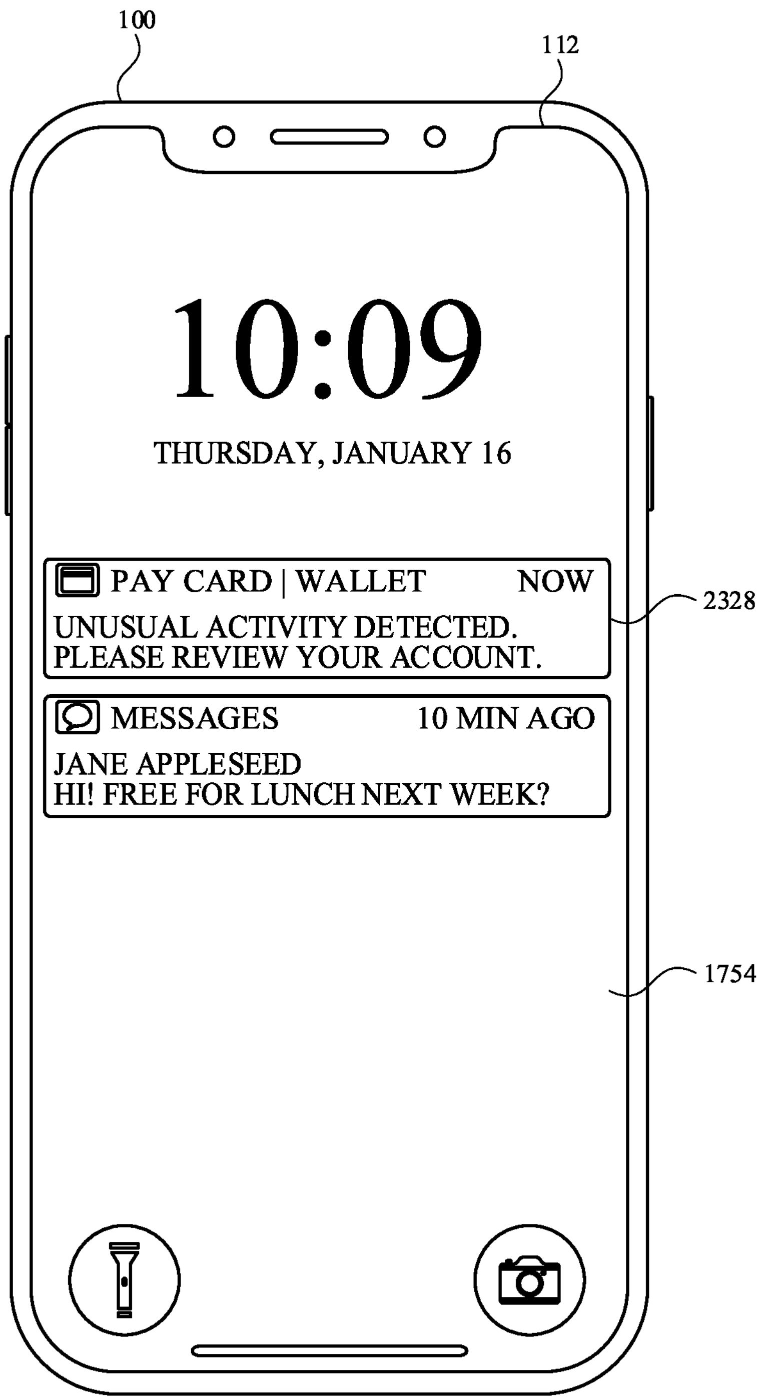

FIG. 23E illustrates electronic device 100 displaying, on display 112, lock user interface 1754 (e.g., a lock screen). In FIG. 23E, electronic device 100 is displaying, in lock user interface 1754, a notification 2328 indicating that unusual activity (e.g., an unusual or suspicious payment transaction or points transfer) has been detected on the transfer account (e.g., the first-party credit account; the points account).

Subsequent to displaying notification 2328 indicating the unusual activity on the transfer account (e.g., the first-party transfer account), electronic device 100 detects user input directed to navigating to authentication credential user interface 2306.

Figure 23F:
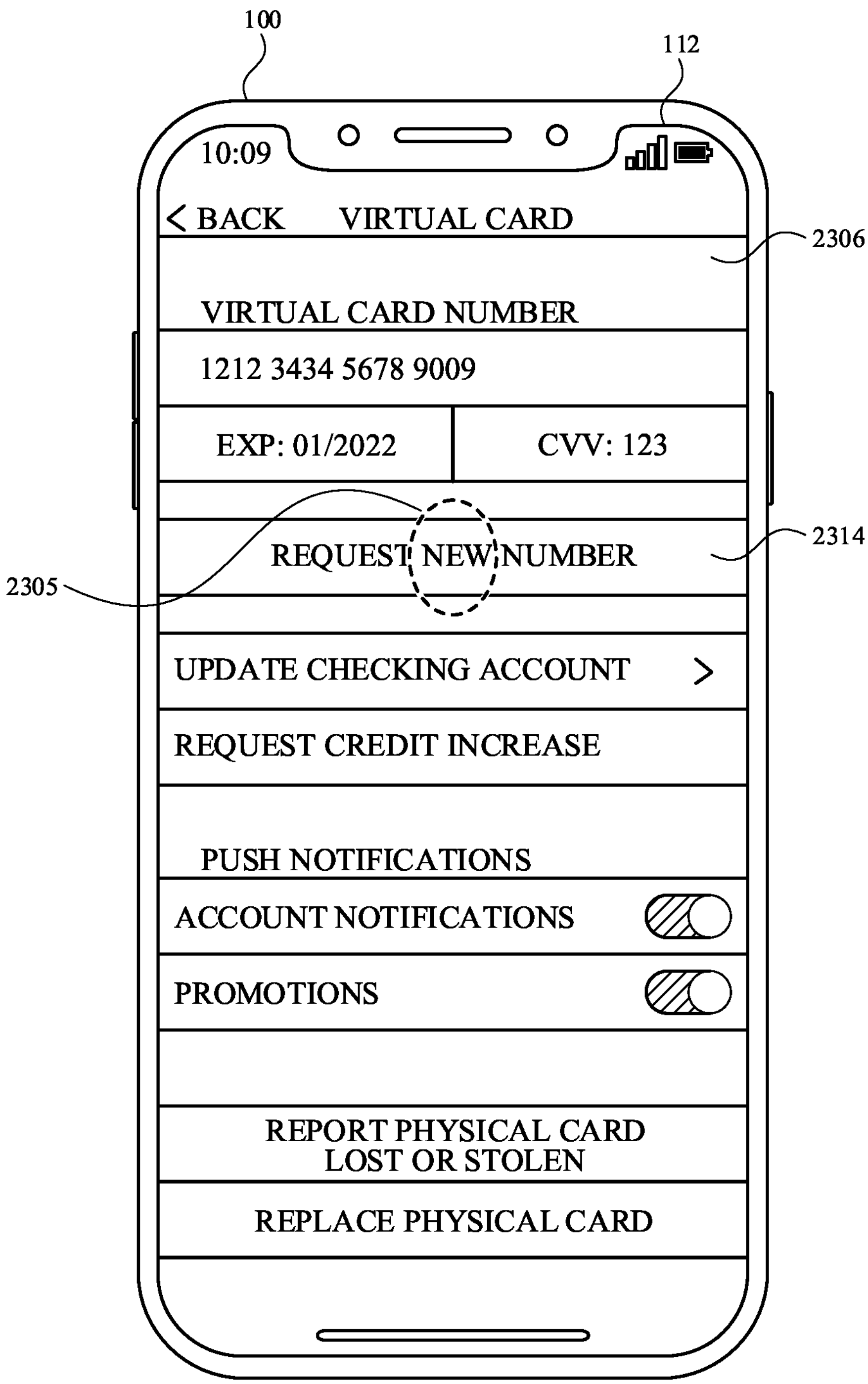

FIG. 23F illustrates electronic device 100 displaying, on display 112, authentication credential user interface 2306 corresponding to the transfer account (e.g., the first-party credit account; the points account), as first depicted in FIG. 23C. In FIG. 23F, while displaying authentication credential user interface 2306, electronic device 100 detects a user activation 2305 of affordance 2314 for requesting a new authentication credential (e.g., a new virtual account number, a new virtual card number) connected to the transfer account (e.g., the first-party credit account; the points account).

Figure 23G:
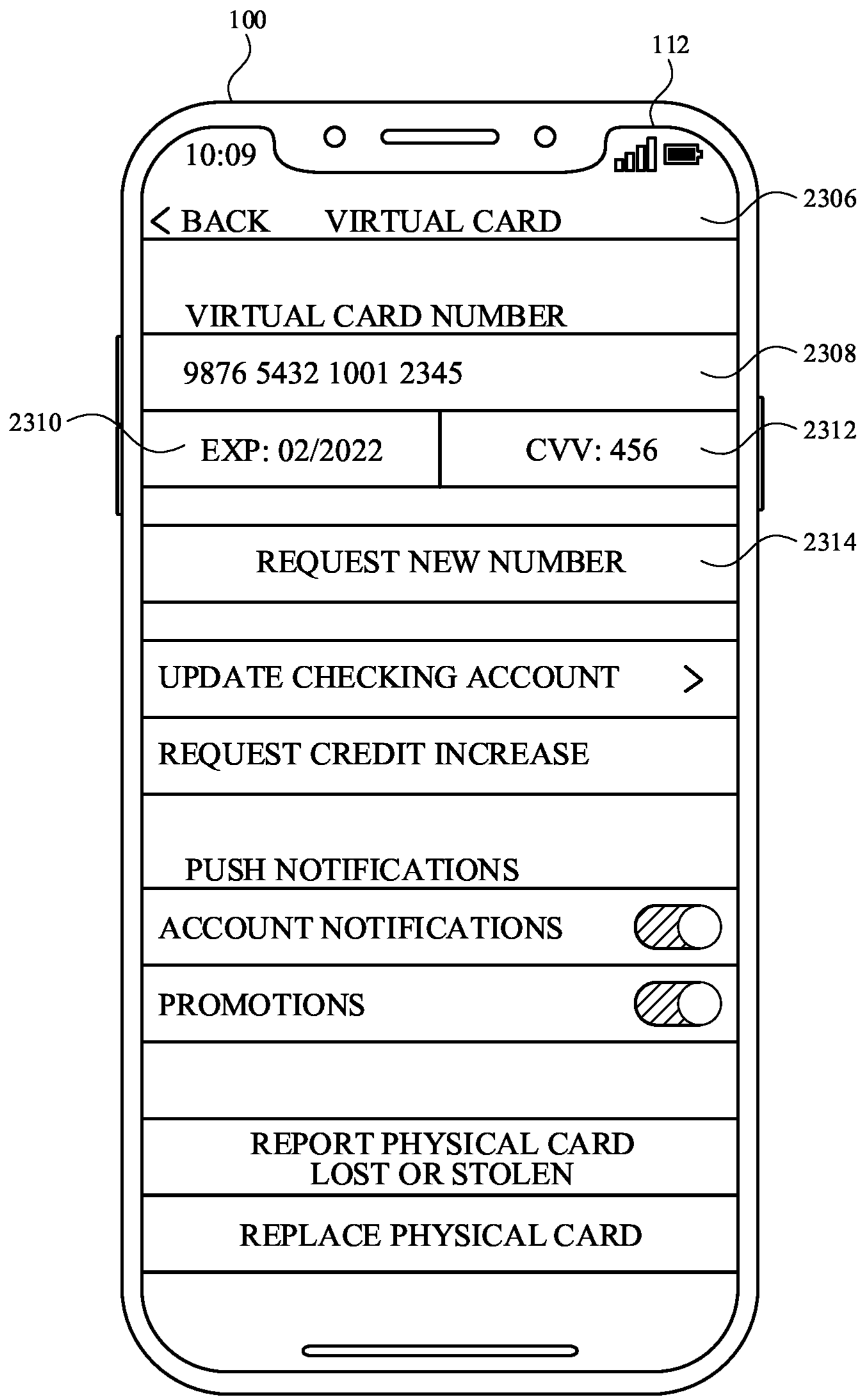

In FIG. 23G, in response to detecting user activation 2305 of affordance 2314 for requesting a new authentication credential (e.g., a new virtual account number or a new virtual card number that is immediately available for use for payment transactions using the transfer account (e.g., the first-party credit account; the points account)) connected to the transfer account (e.g., the first-party credit account; the points account), and in response to receiving new authentication credential information connected with the transfer account (e.g., the first-party credit account; the points account), electronic device 100 updates display of indication 2308 to display a new authentication credential (e.g., a new active and/or enabled virtual account number or virtual card number), and correspondingly updates indications 2310 and 2312 to display the corresponding new expiry date and verification number. Once displayed in authentication credential user interface 2306, the new authentication credential is immediately available for use for transfers using the transfer account (e.g., the first-party credit account; the points account).

In some embodiments, in response to detecting user activation 2305 of affordance 2314 for requesting a new authentication credential (e.g., a new virtual account number, a new virtual card number) connected to the transfer account (e.g., the first-party credit account; the points account), electronic device 100 (e.g., immediately) initiates a process for disabling the previous authentication credential from being authorized to use in transfers (e.g., payment transactions; points transfers) using the transfer account (e.g., the first-party credit account; the points account).

FIGS. 24A-24D are a flow diagram illustrating a method for managing an authentication credential connected with a transfer account, in accordance with some embodiments. Method 2400 is performed at an electronic device (e.g., 100, 300, 500) with a display (e.g., 112) and one or more input devices (e.g., the touch screen of display 112, menu button 204, push button 206). Some operations in method 2400 are, optionally, combined, the orders of some operations are, optionally, changed, and some operations are, optionally, omitted.

As described below, method 2400 provides an intuitive way for managing a transfer account. The method reduces the cognitive burden on a user for managing a transfer account, thereby creating a more efficient human-machine interface. For battery-operated computing devices, enabling a user to manage a transfer account faster and more efficiently conserves power and increases the time between battery charges.

The electronic device (e.g., 100) displays (2402), on the display (e.g., 112), a user interface (e.g., 2302) corresponding to a transfer account (e.g., the transfer account as first described above with reference to FIGS. 8A-8V, such as a payment account, a virtual card account, a points account, a rewards account), where a device-specific authentication process is used to enable transfers (e.g., near-field-communication (NFC)-based payments, first-party electronic wallet-based payments, first-party application-based points transfers) via the transfer account (e.g., that is secured by a secure hardware or a software security procedure that is specific to the device).

While displaying the user interface (e.g., 2302), the electronic device (e.g., 100) detects (2404), via the one or more input devices, input (e.g., 2303) requesting an authentication credential corresponding to the transfer account.

In response to detecting the input (e.g., 2303), the electronic device (e.g., 100) displays (2406), on the display (e.g. 112), a first authentication credential (e.g., 2204, 2308; a first virtual authentication number, a first virtual account number) corresponding to the transfer account, where the first authentication credential is (e.g., only) valid for transfers that do not use the device-specific authentication process. Providing the first authentication credential corresponding to the transfer account, where the first authentication credential is valid for transfers that do not use the device-specific authentication process enables the user to still use the transfer account even for transfers that do not use the device-specific authentication process. Providing additional control options enhances the operability of the device by enabling the user to use the device in more diverse situations, thus allowing the user to use the device more efficiently.

Subsequent to (or in response to) displaying the first authentication credential (e.g., 2204, 2308), the electronic device (e.g., 100) receives (2408), via the one or more input devices, a request (e.g., 2305) for a new authentication credential corresponding to the transfer account. In some embodiments, a user of the electronic device (e.g., 100) makes the request for the new authentication credential because the first authentication credential is no longer secure.

In some embodiments, the device-specific authentication process remains available to be used to enable transfers via the transfer account after receiving the request (e.g., 2305) for the new authentication credential (2410). That is, in some embodiments, the device-specific authentication process is still available to be used to enable transfers via the transfer account even after receiving the request for the new authentication credential and the first authentication credential is no longer valid for transfers. Maintaining the device-specific authentication process available to be used to enable transfers via the transfer account after receiving the request for the new authentication credential enables the user to maintain use of the transfer account without interruption. Providing additional control options enhances the operability of the device by enabling the user to use the device in more diverse situations, thus allowing the user to use the device more efficiently.

In some embodiments, a physical account object (e.g., 2064; the physical account object described below with reference to FIGS. 26A-26N: a physical card) corresponding to the transfer account that can be used to enable transfers (e.g., near-field-communication (NFC)-based payments or points transfers) via the transfer account remains available to be used to enable transfers via the transfer account after receiving the request (e.g., 2305) for the new authentication credential (2412). That is, in some embodiments, the physical account object (e.g., a physical representation of the transfer account, and thus are of the same account) that is used to enable transfers via the transfer account is still available to be used to enable transfers via the transfer account even after receiving the request for the new authentication credential and the first authentication credential is no longer valid for transfers. In some embodiments, the physical account object (e.g., the physical account object described below with reference to FIGS. 26A-26N; a physical card) corresponding to the transfer account that can be used to enable transfers via the transfer account remains available to be used to enable transfers via the transfer account after the new authentication credential (e.g., the second authentication credential) is used and available to enable transfers using the transfer account.

In response to receiving the request (e.g., 2305) for the new authentication credential, the electronic device (e.g., 100) displays (2414) a second authentication credential (e.g., 2204 of FIG. 22B, 2308 of FIG. 23G; a second virtual authentication number, a second virtual account number) that is different from the first authentication credential (e.g., 2204 of FIG. 22A, 2308 of FIG. 23C) and is valid for transfers that do not use the device-specific authentication process, where the first authentication credential is no longer valid for transfers once the second authentication credential is available for use. In some embodiments, displaying the second authentication credential (e.g., 2204 of FIG. 22B, 2308 of FIG. 23G) comprises replacing display of the first authentication credential with display of the second authentication credential. Replacing display of the first authentication credential with display of the second authentication credential provides feedback that the first authentication credential is no longer available to be used and that the second authentication credential is ready to be used. Providing improved visual feedback to the user enhances the operability of the device and makes the user-device interface more efficient (e.g., by helping the user to provide proper inputs and reducing user mistakes when operating and/or interacting with the device) which, additionally, reduces power usage and improves battery life of the device by enabling the user to use the device more quickly and efficiently. In some embodiments, the second authentication credential is valid for physical, paper-based transfers (e.g., payments involving physically writing down the second authentication credential number, such as on a paper bill, for a payment). In some embodiments, the second authentication credential is valid for online transfers (e.g., online payments that involve entering the second authentication credential number to proceed with a payment.

In some embodiments, while displaying the second authentication credential (e.g., 2204 of FIG. 22B, 2308 of FIG. 23G) (2416), the electronic device (e.g., 100) displays (2418), on the display (e.g., 112), a first affordance (e.g., 2212, 2316; for setting a different external account as a default balance reduction or balance payment account). In some embodiments, while displaying the first affordance, the electronic device detects (2420) a selection of the first affordance. In some embodiments, in response to detecting the selection of the first affordance (e.g., 2212, 2316), the electronic device changes (2422) an external account (e.g., a transfer account that does not correspond to the transfer account, a bank account, such as a checking account) from a first external account to a second external account, where the second external account can be used to decrease a balance (e.g., a payment balance, such as a statement balance) of the transfer account.

In some embodiments, while displaying the second authentication credential (e.g., 2204 of FIG. 22B, 2308 of FIG. 23G) (2416), the electronic device (e.g., 100) displays (2424), on the display (e.g., 112), a second affordance (e.g., 2214, 2318; for requesting an increase in a set transfer limit (e.g., a credit limit, a spending limit) corresponding to the transfer account). In some embodiments, while displaying the second affordance (e.g., 2214, 2318), the electronic device detects (2426) a selection of the second affordance. In some embodiments, in response to detecting the selection of the second affordance (e.g., 2214, 2318), the electronic device (e.g., 100) initiates (2428) a request to increase a set transfer limit (e.g., a credit limit, a spending limit) of the transfer account.

In some embodiments, while displaying the second authentication credential (e.g., 2204 of FIG. 22B, 2308 of FIG. 23G) (2416), the electronic device (e.g., 100) displays (2430), on the display (e.g., 112), a first selectable indicator (e.g., 2216, 2322A; a toggle with on/off states for enabling or disabling notifications corresponding to the transfer account). In some embodiments, while displaying the first selectable indicator (e.g., 2216, 2322A), the electronic device (e.g., 100) detects (2432) a user input directed to the first selectable indicator (e.g., changing the toggle from an off state to an on state or from an on state to an off state). In some embodiments, in response to detecting the user input directed to the first selectable indicator (e.g., 2216, 2322A) (2434), in accordance with a determination that the first selectable indicator is changed from a first state (e.g., an on state) to a second state (e.g., an off state), the electronic device (e.g., 100) disables (2436) notifications corresponding to the transfer account from being provided on the electronic device. In some embodiments, in response to detecting the user input directed to the first selectable indicator (e.g., 2216, 2322A) (2434), in accordance with a determination that the first selectable indicator is changed from the second state (e.g., an off state) to the first state (e.g., an on state), the electronic device (e.g., 100) enables (2438) the notifications corresponding to the transfer account to be provided on the electronic device. Providing the first selectable indicator for notifications corresponding to the transfer account enables the user to quickly and easily enable or disable notifications corresponding to the transfer account to be provided on the electronic device. Providing additional control options without cluttering the UI with additional displayed controls enhances the operability of the device and makes the user-device interface more efficient (e.g., by helping the user to provide proper inputs and reducing user mistakes when operating and/or interacting with the device) which, additionally, reduces power usage and improves battery life of the device by enabling the user to use the device more quickly and efficiently.

In some embodiments, while displaying the second authentication credential (e.g., 2204 of FIG. 22B, 2308 of FIG. 23G) (2416), the electronic device (e.g., 100) displays (2440), on the display (e.g., 112), a second selectable indicator (e.g., 2218, 2322B; a toggle with on/off states for enabling or disabling display of promotions (e.g., promotions concerning the transfer account that are created and/or issued by a first-party manufacturer of the device) related to the transfer account). In some embodiments, while displaying the second selectable indicator (e.g., 2218, 2322B), the electronic device (e.g., 100) detects (2442) a user input directed to the second selectable indicator (e.g., changing the toggle from an off state to an on state or from an on state to an off state). In some embodiments, in response to detecting the user input directed to the second selectable indicator (e.g., 2218, 2322B) (2444), in accordance with a determination that the first selectable indicator is changed from a first state (e.g., an on state) to a second state (e.g., an off state), the electronic device (e.g., 100) disables (2446) promotions related to the transfer account (e.g., bonuses, rewards, special events, offers concerning the transfer account that the user can sign up/register for) from being provided on the electronic device (e.g., from being displayed on the user interface corresponding to the transfer account). In some embodiments, in response to detecting the user input directed to the second selectable indicator (e.g., 2218, 2322B) (2444), in accordance with a determination that the first selectable indicator is changed from the second state (e.g., an off state) to the first state (e.g., an on state), the electronic device (e.g., 100) enables (2448) the promotions related to the transfer account to be provided on the electronic device. Providing the second selectable indicator for promotions related to the transfer account enables the user to quickly and easily enable or disable promotions c related to the transfer account to be provided on the electronic device. Providing additional control options without cluttering the UI with additional displayed controls enhances the operability of the device and makes the user-device interface more efficient (e.g., by helping the user to provide proper inputs and reducing user mistakes when operating and/or interacting with the device) which, additionally, reduces power usage and improves battery life of the device by enabling the user to use the device more quickly and efficiently.

In some embodiments, while displaying the second authentication credential (e.g., 2204 of FIG. 22A, 2308 of FIG. 23G) (2416), the electronic device (e.g., 100) displays (2450), on the display (e.g., 112), an affordance (e.g., 2324) for reporting that a physical account object (e.g., the physical account object described below with reference to FIGS. 26A-26N; a physical card) corresponding to the transfer account that can be used to enable transfers (e.g., near-field-communication (NFC)-based payments or points transfers) via the transfer account has been lost (e.g., accidently or stolen). Displaying the affordance for reporting that the physical account object corresponding to the transfer account has been lost enhances security by providing the user with a quick and easy method for reporting the lost object. Enhancing security features of the device enhances the operability of the device by making the device more secure, which in turn enables the user to use the device more efficiently and frequently.

In some embodiments, while displaying the second authentication credential (e.g., 2204 of FIG. 22A, 2308 of FIG. 23G) (2416), the electronic device (e.g., 100) displays (2452), on the display (e.g., 112), an affordance (e.g., 2222, 2326) for requesting a new physical account object (e.g., a new physical account object described below with reference to FIGS. 26A-26N; a new physical card) corresponding to the transfer account that can be used to enable transfers (e.g., near-field-communication (NFC)-based payments or points transfers) via the transfer account to replace an existing physical account object (e.g., the physical account object described below with reference to FIGS. 26A-26N; a physical card) corresponding to the transfer account. Displaying the affordance for requesting a new physical account object corresponding to the transfer account allows the user to quickly and easily order the new physical account object. Reducing the number of inputs needed to perform an operation enhances the operability of the device and makes the user-device interface more efficient (e.g., by helping the user to provide proper inputs and reducing user mistakes when operating and/or interacting with the device) which, additionally, reduces power usage and improves battery life of the device by enabling the user to use the device more quickly and efficiently. In some embodiments, the existing physical account object is no longer available to be used to enable transfers via the transfer account once a request for a new physical account object is received on the device.

Note that details of the processes described above with respect to method 2400 (e.g., FIGS. 24A-24D) are also applicable in an analogous manner to the methods described above and below. For example, method 900 optionally includes one or more of the characteristics of the various methods described above with reference to method 2400. For example, the authentication credential described in method 2400 can be used to authorize transfers using the transfer account activated in method 900. For another example, method 1200 optionally includes one or more of the characteristics of the various methods described above with reference to method 2400. For example, transfers made using the authentication credential described in method 2400 can be included in the information provided in the summary user interface described in method 1200. For another example, method 1500 optionally includes one or more of the characteristics of the various methods described above with reference to method 2400. For example, the visual effect and/or feedback provided on a representation of the transfer account as described in method 1500 can include transfers made using the authentication credential described in method 2400. For another example, method 1800 optionally includes one or more of the characteristics of the various methods described above with reference to method 2400. For example, the authentication credential described in method 2400 can be used to authorize transfers using the transfer account at the common place corresponding to the place summary user interface described in method 1800. For another example, method 2100 optionally includes one or more of the characteristics of the various methods described above with reference to method 2400. For example, the balance transfer user interface described in method 2100 can be used to reduce balance amounts corresponding to transfer made using the authentication credential described in method 2400. For another example, method 2700 optionally includes one or more of the characteristics of the various methods described above with reference to method 2400. For example, the authentication credential user interface described in method 2400 can be used to request the physical account object described in method 2700. For another example, method 3000 optionally includes one or more of the characteristics of the various methods described above with reference to method 2400. For example, the balance transfer use interface element described in method 3000 can be used to initiate a balance transfer for a balance amount corresponding to transfers made using the authentication credential described in method 2400 can be included in the balance information provided. For brevity, these details are not repeated below.

FIG. 24E is a flow diagram illustrating a method for managing an authentication credential connected with a user account, in accordance with some embodiments. Method 2401 is performed at an electronic device (e.g., 100, 300, 500) with a display (e.g., 112) and one or more input devices (e.g., the touch screen of display 112, menu button 204, push button 206). Some operations in method 2401 are, optionally, combined, the orders of some operations are, optionally, changed, and some operations are, optionally, omitted.

As described below, method 2401 provides an intuitive way for managing a user account. The method reduces the cognitive burden on a user for managing a user account, thereby creating a more efficient human-machine interface. For battery-operated computing devices, enabling a user to manage a user account faster and more efficiently conserves power and increases the time between battery charges.

The electronic device (e.g., 100) displays (2402, 2403), on the display (e.g., 112), a user interface (e.g., 2202) corresponding to a user account, where a device-specific authentication process is used to enable use of the user account.

While displaying the user interface (e.g., 2202), the electronic device (e.g., 100) detects (2404, 2405), via the one or more input devices, input requesting an authentication credential corresponding to the user account.

In response to detecting the input, the electronic device (e.g., 100) displays (2406, 2407), on the display (e.g., 112), a first authentication credential (e.g., 2204 of FIG. 22A) corresponding to the user account, where the first authentication credential is valid to use the user account for uses that do not use the device-specific authentication process.

Subsequent to displaying the first authentication credential (e.g., 2204 of FIG. 22A), the electronic device (e.g., 100) receives (2408, 2409), via the one or more input devices, a request for a new authentication credential corresponding to the user account.

In response to receiving the request for the new authentication credential, the electronic device (e.g., 100) displays (2414, 2411) a second authentication credential (e.g., 2204 of FIG. 22B) that is different from the first authentication credential (e.g., 2204 of FIG. 0.22A) and is valid to use the user account for uses that do not use the device-specific authentication process, where the first authentication credential is no longer valid for using the user account once the second authentication credential is available for use.

In some embodiments, the user account corresponds to a computer storage account. In some embodiments, using the user account includes requesting storage of data onto available computer storage resources (e.g., an available MB or GB amount of computer resources) associated with the computer storage account.

In some embodiments, the user account corresponds to a financial account. In some embodiments, using the user account includes making purchases based on financial resources (e.g., credit or money) associated with the financial account.

In some embodiments, the user account is a transfer account, and the technique described with respect to FIG. 24E includes some or all aspects of the technique described above with respect to FIGS. 24A-24D.

FIG. 25 illustrates an exemplary user interface for activating a physical account object, in accordance with some embodiments. The user interfaces in these figures are used to illustrate the processes described below, including the processes in FIGS. 27A-27B and FIG. 27C.

FIG. 25 illustrates electronic device 100 displaying, on display 112, a user interface 2502 of a storage use application (e.g., similar to user interface 802 of the transfer application described below with reference to FIG. 26F). In some embodiments, electronic device 100 displays, in user interface 2502 of the storage use application, representation 704 of the user account (e.g., a computer storage account), where the user account is currently selected for use (e.g., to store and/or archive new data in the computer storage resources associated with the user account; to delete existing data from the computer storage resources associated with the user account). In some embodiments, user interface 2502 includes a representation 2504 of a second user account (e.g., a second computer storage account) that is different from the user account (e.g., a computer storage account). In this example, the second computer storage account corresponds to an office computer storage account. In some embodiments, user interface 2502 includes a representation 2506 of a third user account (e.g., a third computer storage account) that is different from the user account (e.g., a computer storage account). In this example, the third computer storage account corresponds to a library storage account.

In some embodiments (e.g., while displaying user interface 2502), electronic device 100 detects (e.g., via a wireless communication radio of electronic device 100), the presence of a physical account object 2508 linked to the user account and/or a packaging 2510 of physical account object 2508. In some embodiments, prior to being detected by electronic device 100, physical account object 2508 is not activated for use.

In FIG. 25, in response to detecting the presence of physical account object 2508 and/or packing 2510, electronic device 100 initiates a process for activating physical account object 2508 to be enabled to authorize access to the computer storage resources associated with the user account (e.g., a computer storage account) and displays, on display 112 (e.g., in user interface 2502), an activation sheet user interface 2512 (e.g., similar to activation sheet user interface 2608 described below with reference to FIGS. 26A-26N).

In some embodiments, activation sheet user interface 2512 includes a virtual representation 2514 of physical account object 2508, which is similar (or the same as) in appearance to (or the same as) representation 704 of the user account (e.g., a computer storage account). In some embodiments, in response to detecting or in accordance with a determination that the physical account object 2508 has been activated, electronic device 100 displays, in activation sheet user interface 2512, an indication 2516 that the physical account object 2508 has been activated, and thus is enabled to authorize access to the computer storage resources associated with the user account (e.g., a computer storage account). In some embodiments, activation sheet user interface 2512 includes an affordance 2518 for completing the activation process for physical account object 2508 and causing electronic device 100 to cease display of activation sheet user interface 2512.

FIGS. 26A-26N illustrate exemplary user interfaces for activating a physical account object, in accordance with some embodiments. The user interfaces in these figures are used to illustrate the processes described below, including the processes in FIGS. 27A-27B.

Figure 26B:
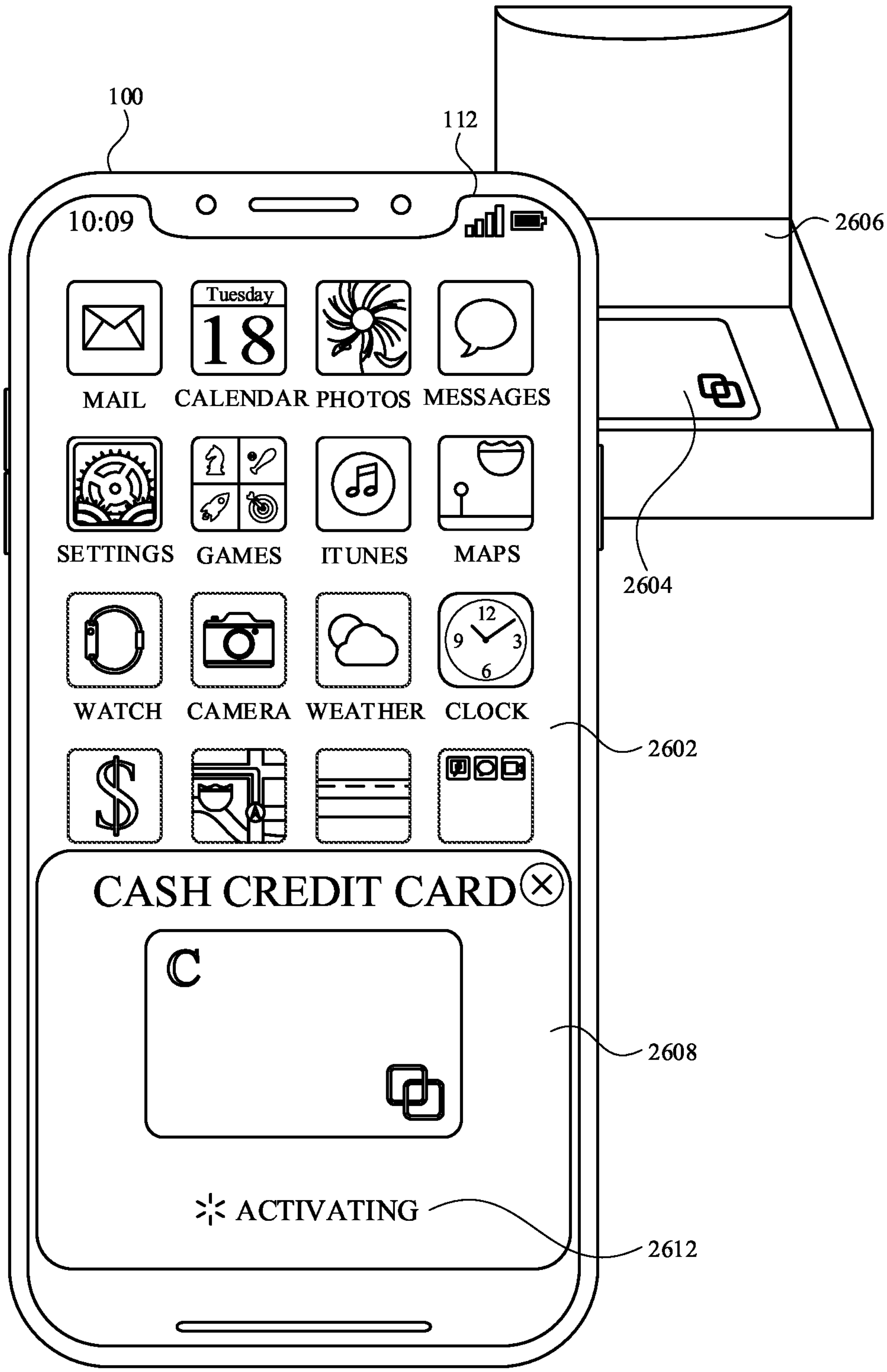
Figure 26C:
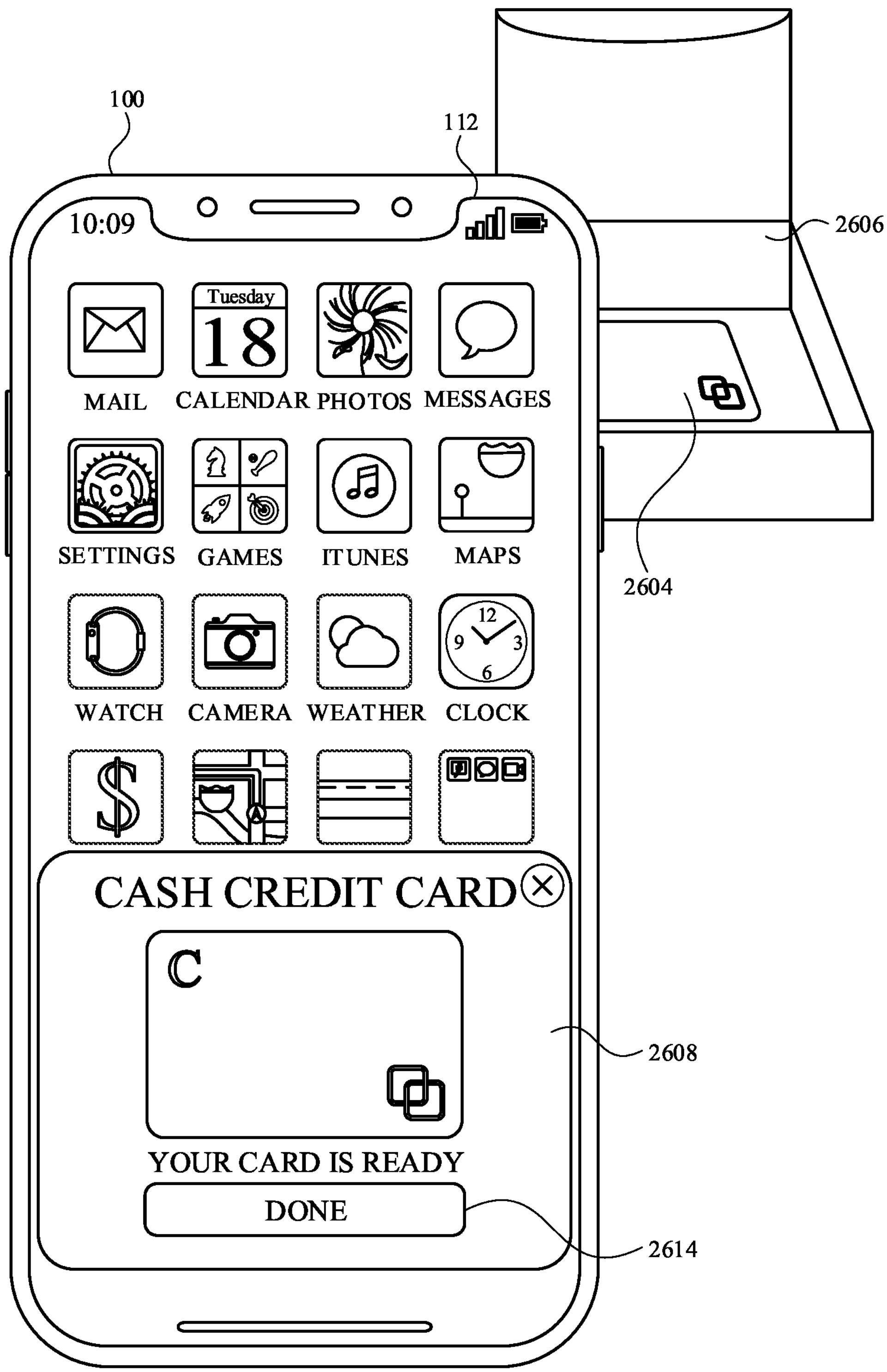

FIGS. 26A-26C illustrate an exemplary embodiment for activating a physical account object corresponding to the transfer account (e.g., the first-party credit account, the points account). FIG. 26A illustrates electronic device 100 displaying, on display 112, a user interface 2602 (e.g., a home user interface, such as a home screen).

In FIG. 26A, while displaying user interface 2602, electronic device 100 detects (e.g., using a wireless communication radio (or a plurality of radios) of the device used for various types of radio communications, such as Bluetooth, NFC, LTE, and/or WiFi-based communications), an un-activated physical account object 2604 (or, alternatively, detects a packaging 2606 encompassing (or of) physical account object 2604) corresponding to the transfer account (e.g., the first-party credit account; the points account). As mentioned, in some embodiments, the transfer account is a first-party credit account (e.g., a revolving credit account that is issued or branded by the manufacturer of the electronic device), and provides rewards (e.g., cash back rewards) based on the amount of transfers (e.g., payment transactions, points transfers) made using the transfer account (e.g., cash back rewards that are based on a certain percentage of the value of each transition). As also mentioned, in some embodiments, the transfer account is a points account (e.g., for meal points, for printer credits, for membership points) that provides rewards (e.g., points rewards) based on the amount of points used using the transfer account.

In some embodiments, physical account object 2604 (e.g., the physical card) was ordered via user interface 894 of FIG. 8O. In some embodiments, physical account object 2604 (e.g., the physical card) was ordered via user interface 898 of FIG. 8P. Prior to being activated, physical account object 2604 is not enabled to authorize transfers (e.g., payment transactions, points transfers) using the transfer account (e.g., the first-party credit account; the points account). Physical account object 2604 requires activation before it can be used to authorize transfers using the transfer account. After physical account object 2604 has been activated, the physical account object can be used to authorize transfers using the transfer account by being physically presented to a transaction terminal (e.g., a card reader). For example, physical account object 2604 can authorize a transfer (e.g., a payment transaction, a points transfer) using the transfer account via short-range wireless communication with the transition terminal. For another example, physical account object 2604 can authorize a transfer (e.g., a payment transaction, a points transfer) using the transfer account by being swiped in a magnetic card reader of the transaction terminal.

In some embodiments, in response to detecting physical account object 2604 (or, alternatively, in response to detecting packaging 2606 of physical account object 2604), electronic device 100 displays (e.g., over a portion of user interface 2602) an activation sheet user interface 2608, as illustrated in FIG. 26A. In some embodiments, activation sheet user interface 2608 includes representation 870 of the transfer account (e.g., the first-party credit account; the points account) and an activate affordance 2610 for activating and/or enabling use of physical account object 2604. In some embodiments, electronic device 100 detects the physical account object 2604 (or, alternatively, detects packaging 2606 of physical account object 2604) when the physical account object 2604 (or, alternatively, packaging 2606 of physical account object 2604 such as a packing box or envelope used to ship the physical account object) is within communication range of the wireless communication radio of electronic device 100. In some examples, detecting the physical account object 2604 includes detecting via radio frequency (and not, for example, using a camera, such as a visible light camera or infrared light camera).

In FIG. 26A, while displaying activation sheet user interface 2608, electronic device 100 detects a selection 2601 of (e.g., tap on) activate affordance 2610. Activation sheet user interface 2608 is a user interface of a different application as compared to user interface 2602 (e.g., home page with icons which, when activated, cause a corresponding application to be displayed).

In some embodiments, electronic device 100 detects (e.g., using a wireless communication radio of the device) physical account object 2604 (or, alternatively, detects packaging 2606 of physical account object 2604) while display 112 of the device is in an off state. In some embodiments, in response to detecting physical account object 2604 (or packaging 2606 of physical account object 2604) while display 112 of the device is in an off state, electronic device 100 activates the display and displays, in display 112, activation sheet user interface 2608.

In FIG. 26B, in response to detecting selection 2601 of activate affordance 2610 of activation sheet user interface 2608, electronic device 100 initiates a process for activating physical account object 2604 to be enabled to authorize transfers (e.g., make payment transactions; make points transfers) using the transfer account (e.g., the first-party credit account; the points account) and displays, in activation sheet user interface 2608, an indication 2612 that the activation of physical account object 2604 is in progress.

In FIG. 26C, in response to detecting that (or in accordance with a determination that) physical account object 2604 has been successfully activated and thus is available to be used to authorize transfers (e.g., authorize payment transactions; authorize points transfers) using the transfer account (e.g., the first-party credit account; the points account), electronic device 100 displays, in activation sheet user interface 2608, an indication 2614 that the physical account object 2604 is available to be used to authorize transfers using the transfer account.

In some embodiments, in accordance with a determination that the transfer account (e.g., the first-party credit account; the points account) is not provisioned on the electronic device 100, electronic device 100 determines that (or receives a communication (e.g., from an associated financial institution) that) the process for activating physical account object was unsuccessful, and thus forgoes displaying, in activation sheet user interface 2608, indication 2614 (e.g., and instead displays an indication that the activation of the physical account object was unsuccessful). In some embodiments, in accordance with a determination that the detected un-activated physical account object (or its corresponding packaging) does not correspond to a transfer account (e.g., the first-party credit account; the points account) that is provisioned on electronic device 100, electronic device 100 determines that (or receives a communication (e.g., from an associated financial institution) that) the process for activating physical account object was unsuccessful, and thus forgoes displaying, in activation sheet user interface 2608, indication 2614 (e.g., and instead displays an indication that the activation of the physical account object was unsuccessful.

Figure 26D:
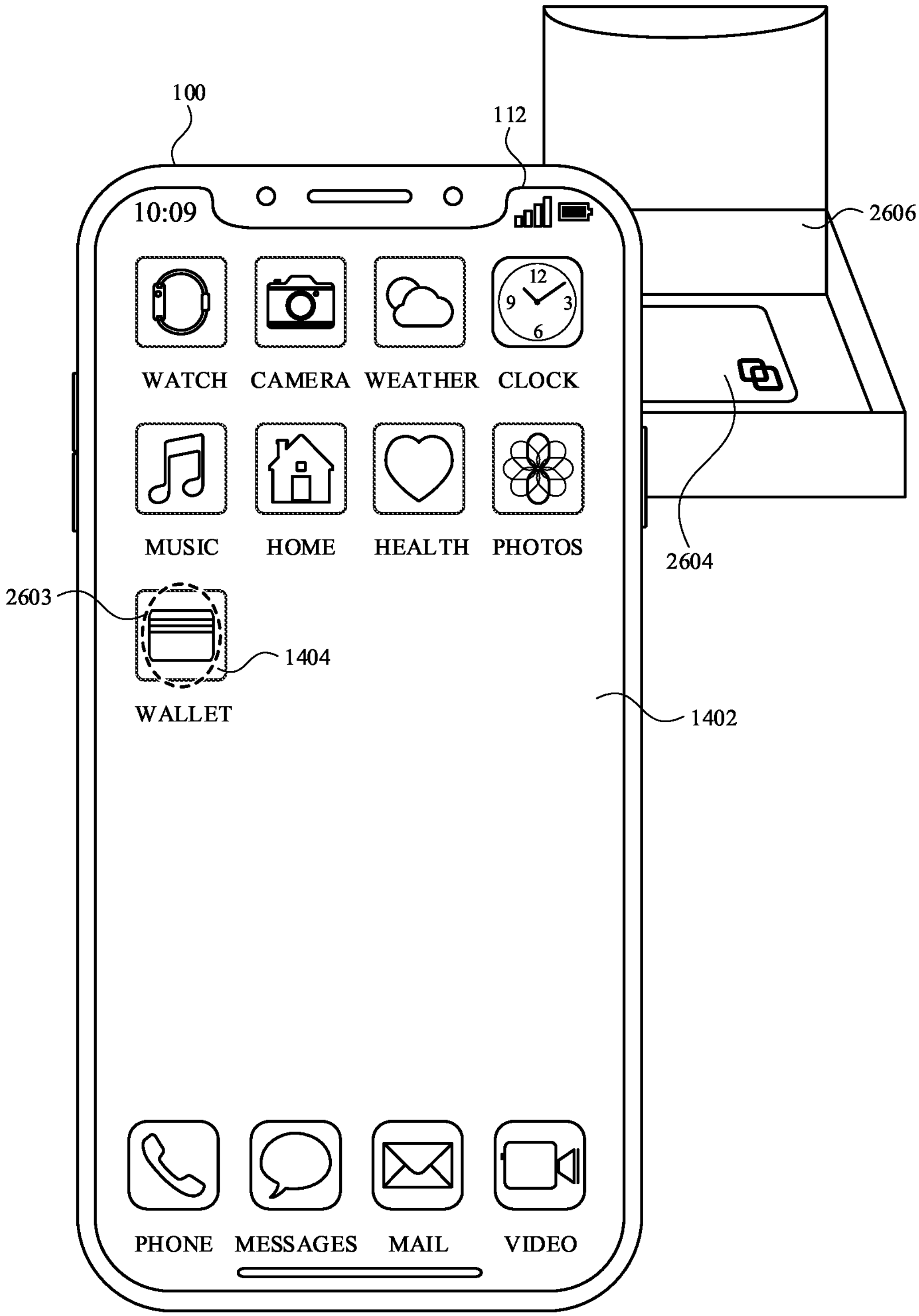

FIGS. 26D-26G illustrate another exemplary embodiment for activating a physical account object (e.g., physical account object 2604) corresponding to the transfer account (e.g., the first-party credit account; the points account). FIG. 26D illustrates electronic device 100 displaying, on display, home user interface 1402 (e.g., a home screen) while an un-activated physical account object 2604 (and its corresponding packaging 2606) is within detectable range of the wireless communication radio (e.g., for Bluetooth, NFC, LTE, and/or WiFi-based communications) of the device. In FIG. 26D, while displaying home user interface 1402 while the un-activated physical account object 2604 (and packaging 2606) is within detectable distance from the device, electronic device 100 does not display (or forgoes displaying) activation sheet user interface 2608.

In FIG. 26D, while displaying home user interface 1402 while the un-activated physical account object 2604 (and packaging 2606) is within detectable distance from the device, electronic device 100 detects a selection 2603 of application icon 1404 corresponding to the transfer application (e.g., the electronic wallet application).

Figure 26E:
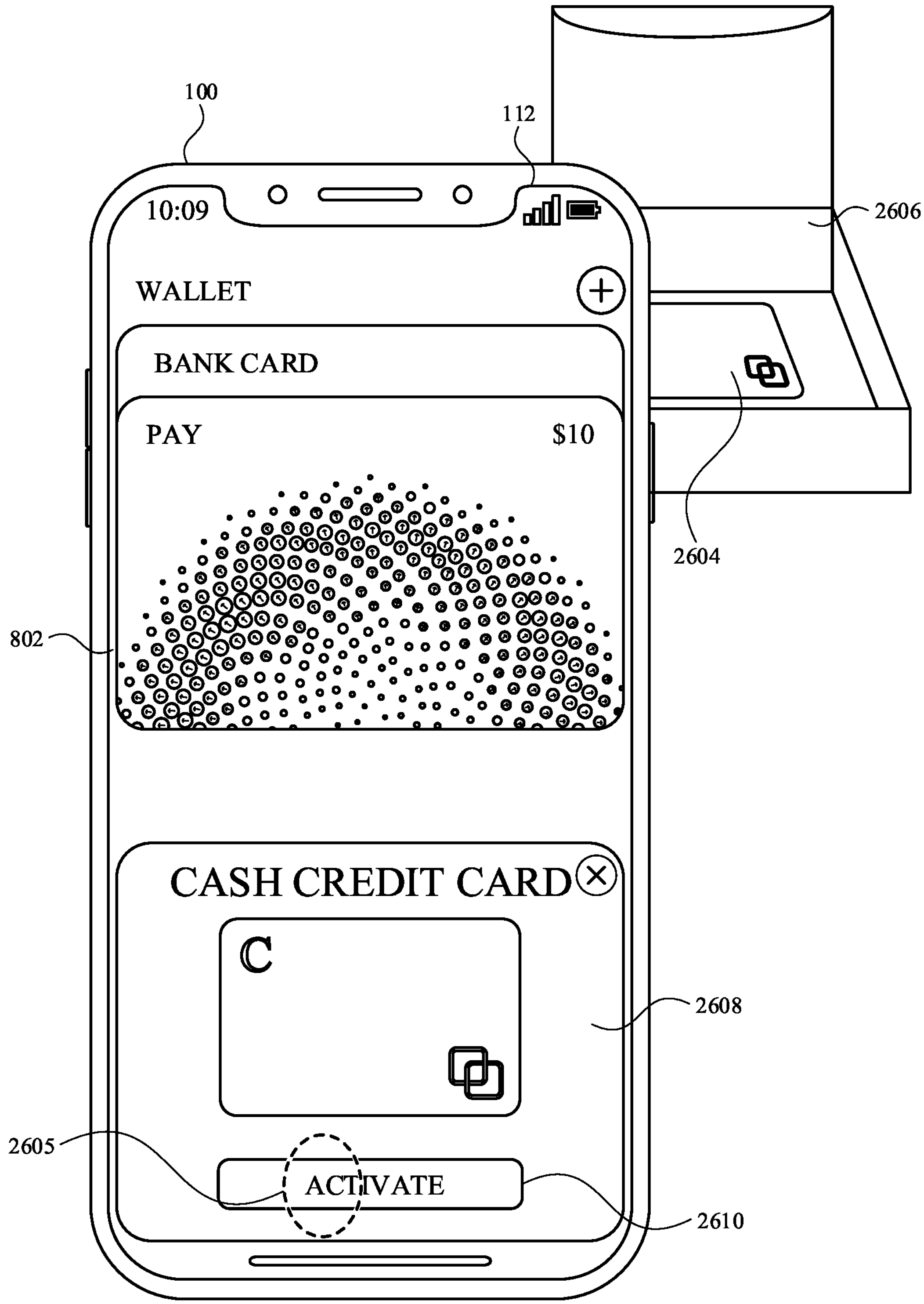

In FIG. 26E, in response to detecting selection 2603 of application icon 1404 corresponding to the transfer application (e.g., the electronic wallet application), electronic device 100 displays, on display 112, user interface 802 of the transfer application (e.g., as first depicted in FIG. 8A). In some embodiments, in response to (or subsequent to) detecting selection 2603 of application icon 1404 and displaying user interface 802 of the transfer application (e.g., the electronic wallet application) on the display, electronic device 100 detects (e.g., via the wireless communication radio of the device) un-activated physical account object 2604 (or its corresponding packaging 2606). In some embodiments, in response to detecting un-activated physical account object 2604 (or its corresponding packaging 2606), electronic device 100 displays (e.g., over a portion of user interface 802 of the transfer application) activation sheet user interface 2608.

In FIG. 26E, while displaying activation sheet user interface 2608, electronic device 100 detects a selection 2605 of activate affordance 2610.

Figure 26F:
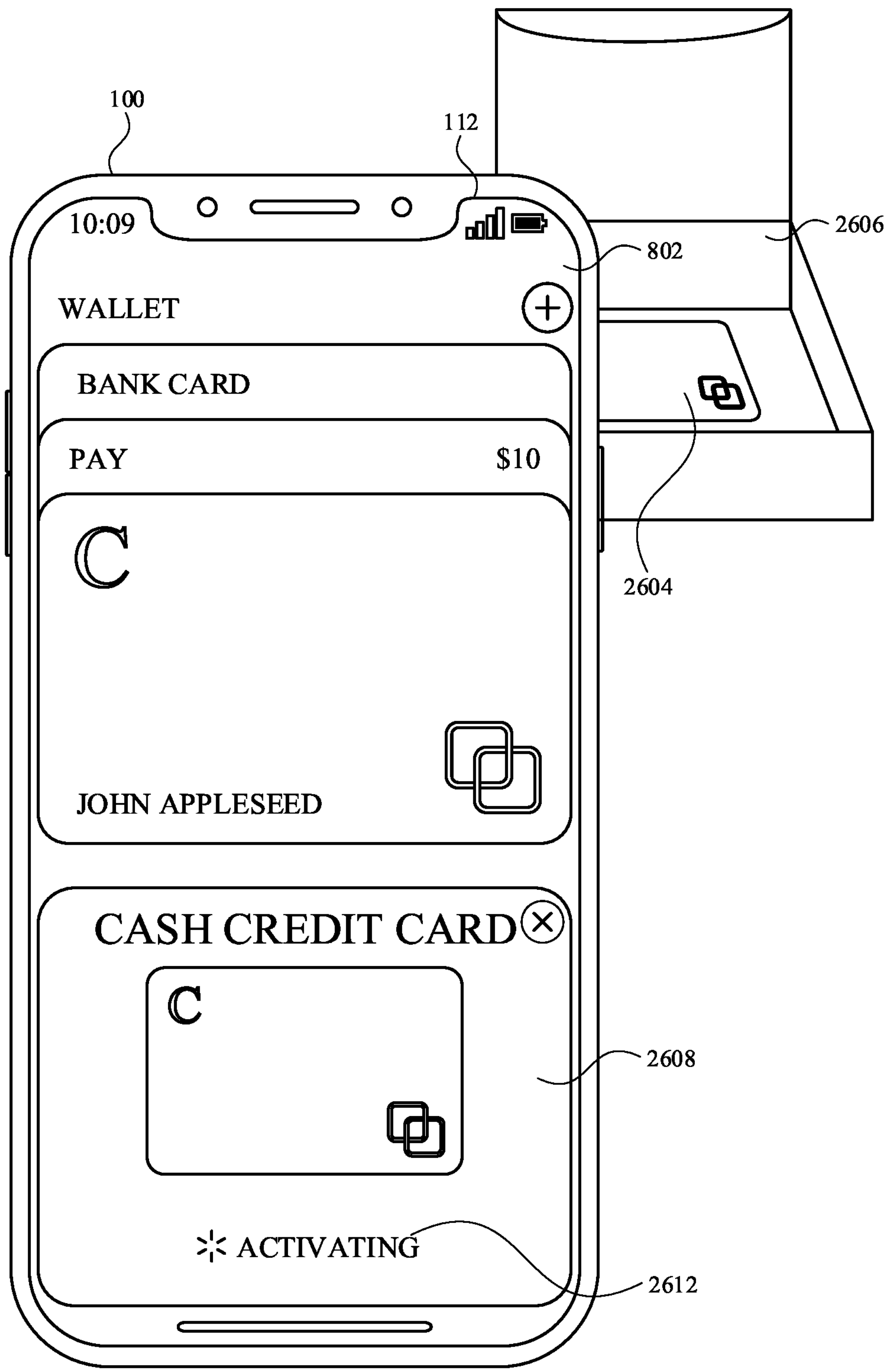

In FIG. 26F, in response to detecting selection 2605 of activate affordance 2610 of activation sheet user interface 2608, electronic device 100 initiates the process for activating physical account object 2604 to be enabled to authorize transfers (e.g., make payment transactions; make points transfers) using the transfer account (e.g., the first-party credit account; the points account) and displays (e.g., while maintaining display of user interface 802 of the transfer application (e.g., the electronic wallet application), in activation sheet user interface 2608, indication 2612 that the activation of physical account object 2604 is in progress.

Figure 26G:
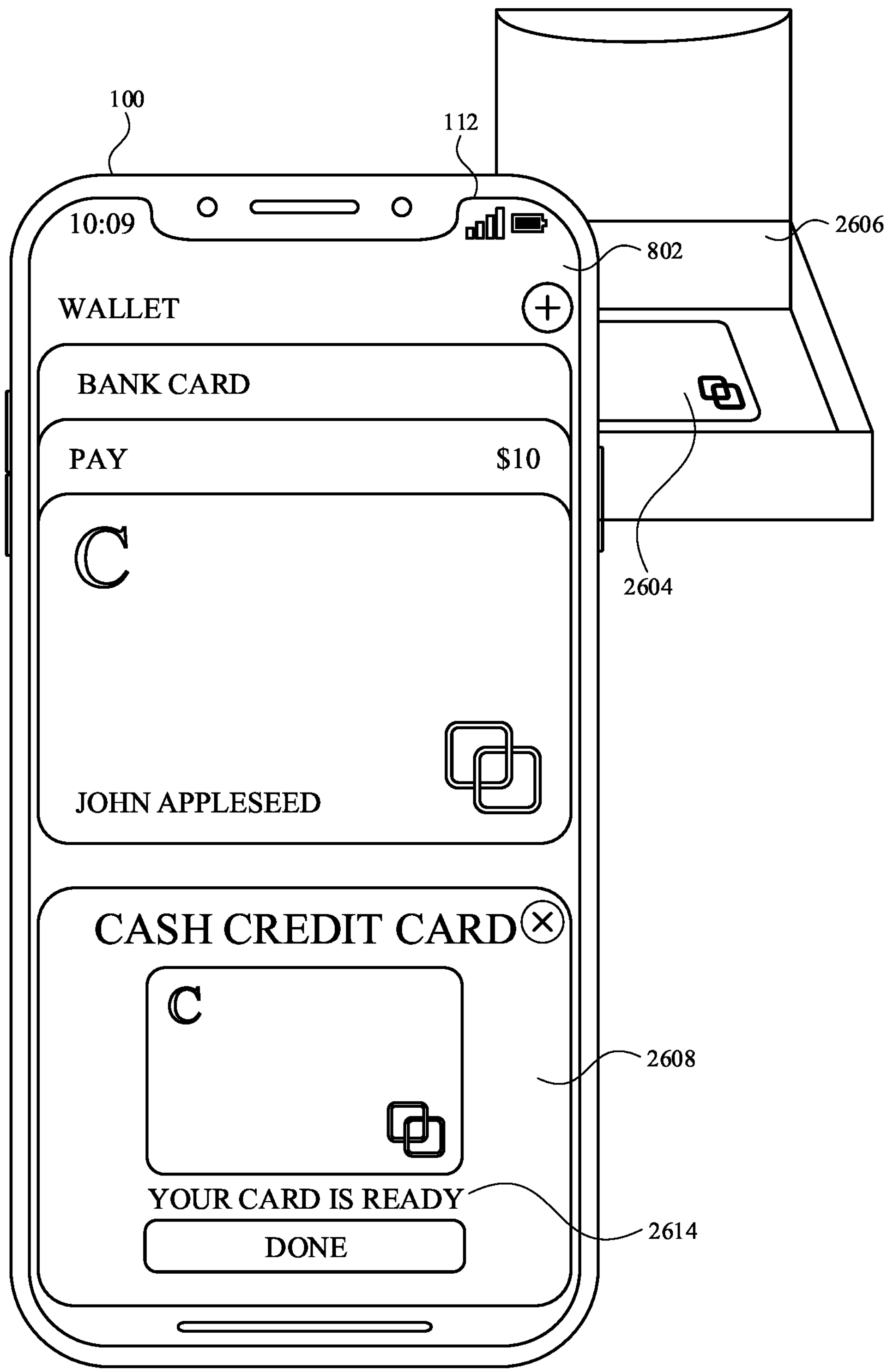

In FIG. 26G, in response to detecting that (or in accordance with a determination that) physical account object 2604 has been successfully activated and thus is available to be used to authorize transfers (e.g., authorize payment transactions; authorize points transfers) using the transfer account (e.g., the first-party credit account; the points account), electronic device 100 displays (e.g., while maintaining display of user interface 802 of the transfer application (e.g., the electronic wallet application), in activation sheet user interface 2608, indication 2614 that the physical account object 2604 is available to be used to authorize transfers using the transfer account.

Figure 26H:
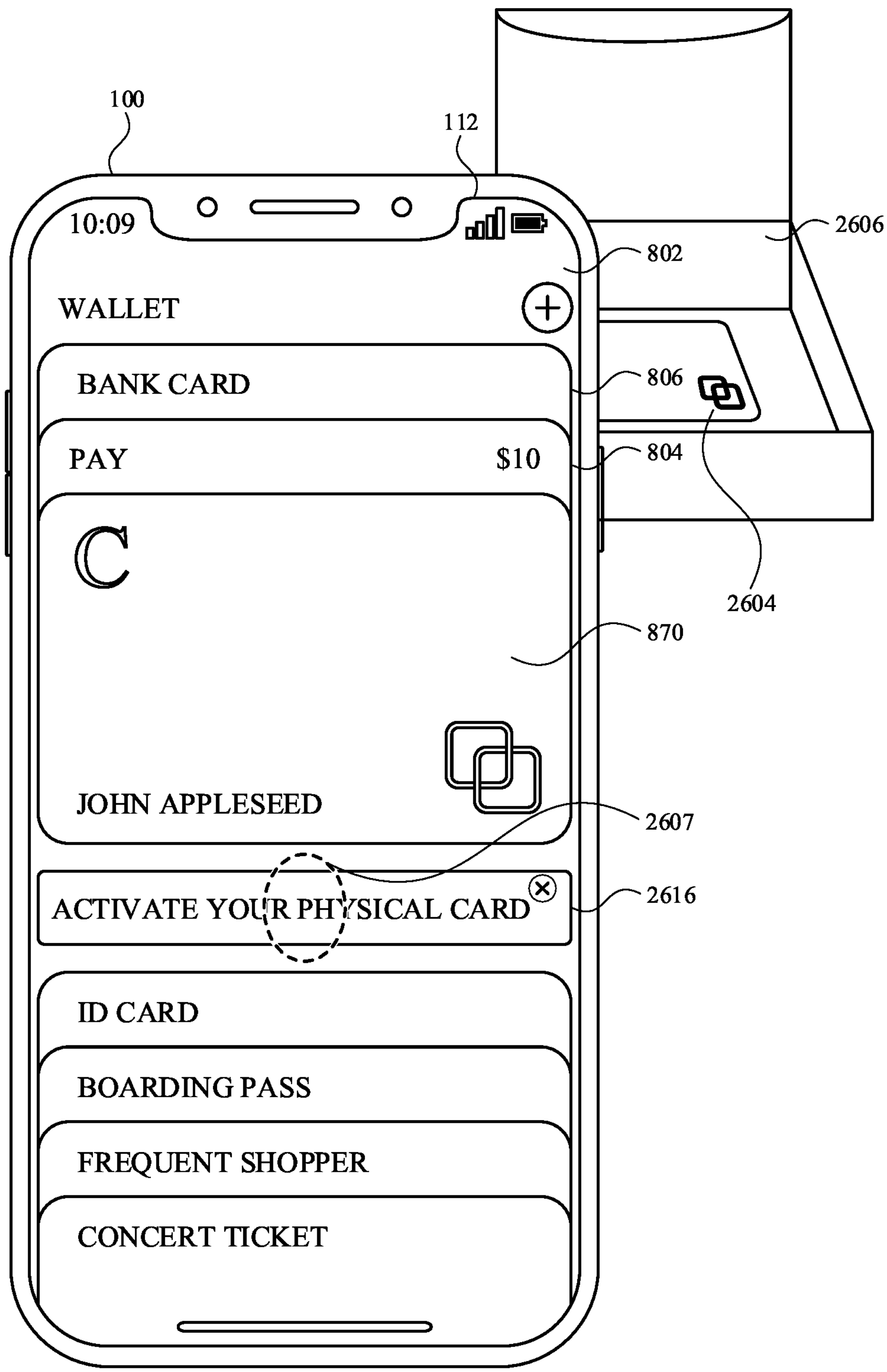

FIGS. 26H-26K illustrate another exemplary embodiment for activating a physical account object (e.g., physical account object 2604) corresponding to the transfer account (e.g., the first-party credit account; the points account). FIG. 26H illustrates electronic device 100 displaying, on display 112, user interface 802 of the transfer application (e.g., electronic wallet application). Electronic device 100 also displays, in user interface 802, representation 870 of the transfer account (e.g., the first-party credit account; the points account), thereby indicating that the transfer account is provisioned on the device. In FIG. 26H, while displaying user interface 802, electronic device 100 displays, in user interface 802, a notification 2616 (e.g., stating "Activate Your Physical Card") requesting that the user perform activation of the physical account object (e.g., physical account object 2604) corresponding to the transfer account.

In FIG. 26H, while displaying notification 2616 in user interface 802 of the transfer application (e.g., the electronic wallet application), electronic device 100 detects a selection 2607 of notification 2616.

Figure 26I:
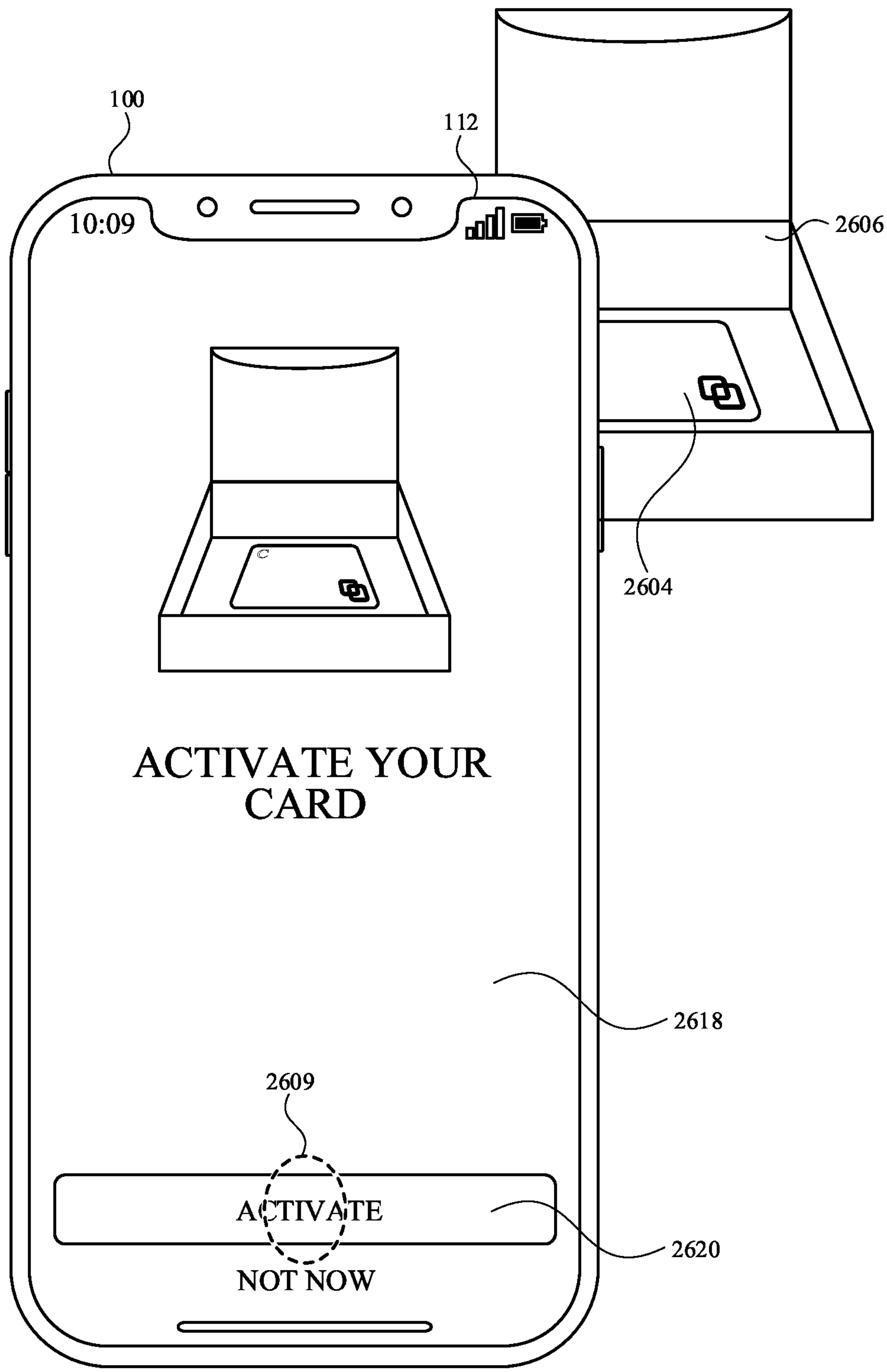

In FIG. 26I, in response to detecting selection 2607 of notification 2616, electronic device 100 displays, on display 112, a first activation user interface 2618. In some embodiments, first activation user interface 2618 includes an indication (e.g., text and/or graphical indication) to activate a physical account object (e.g., a physical card) that was ordered for the transfer account (e.g., the first-party credit account; the points account). In FIG. 26I, while displaying first activation user interface 2618, electronic device 100 detects a selection 2609 of an activate affordance 2620.

Figure 26J:
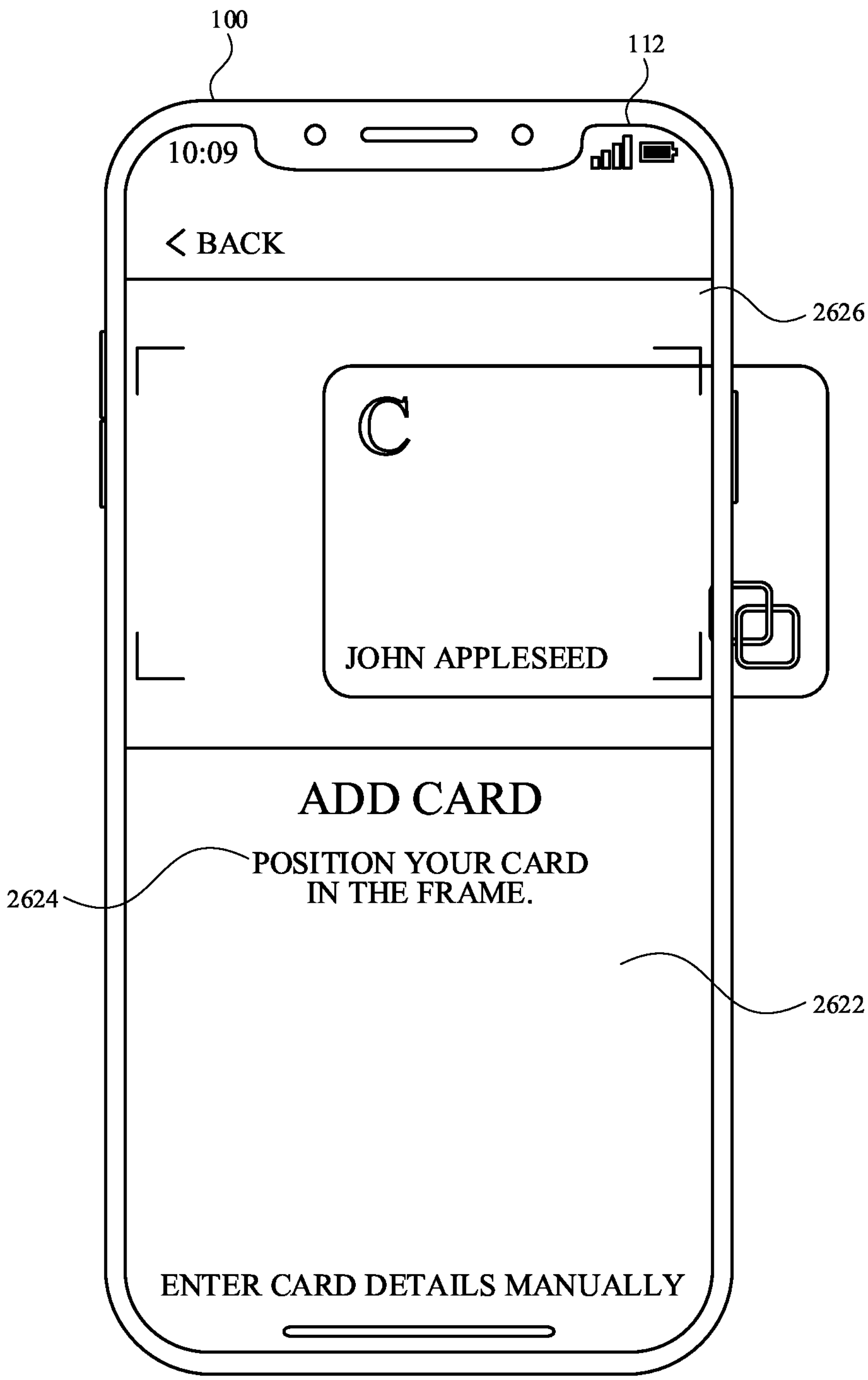

In FIG. 26J, in response to detecting selection 2609 of activate affordance 2620, electronic device 100 displays, on display 112, a second activation user interface 2622 that enables the user to capture an image of un-activated physical account object 2604. In some embodiments, second activation user interface 2622 includes instructions 2624 to capture an image of the un-activated physical account object (e.g., using a camera of the device) such that the physical account object is fully aligned to and displayed within an image capture region 2626 of second activation user interface 2622.

Figure 26K:
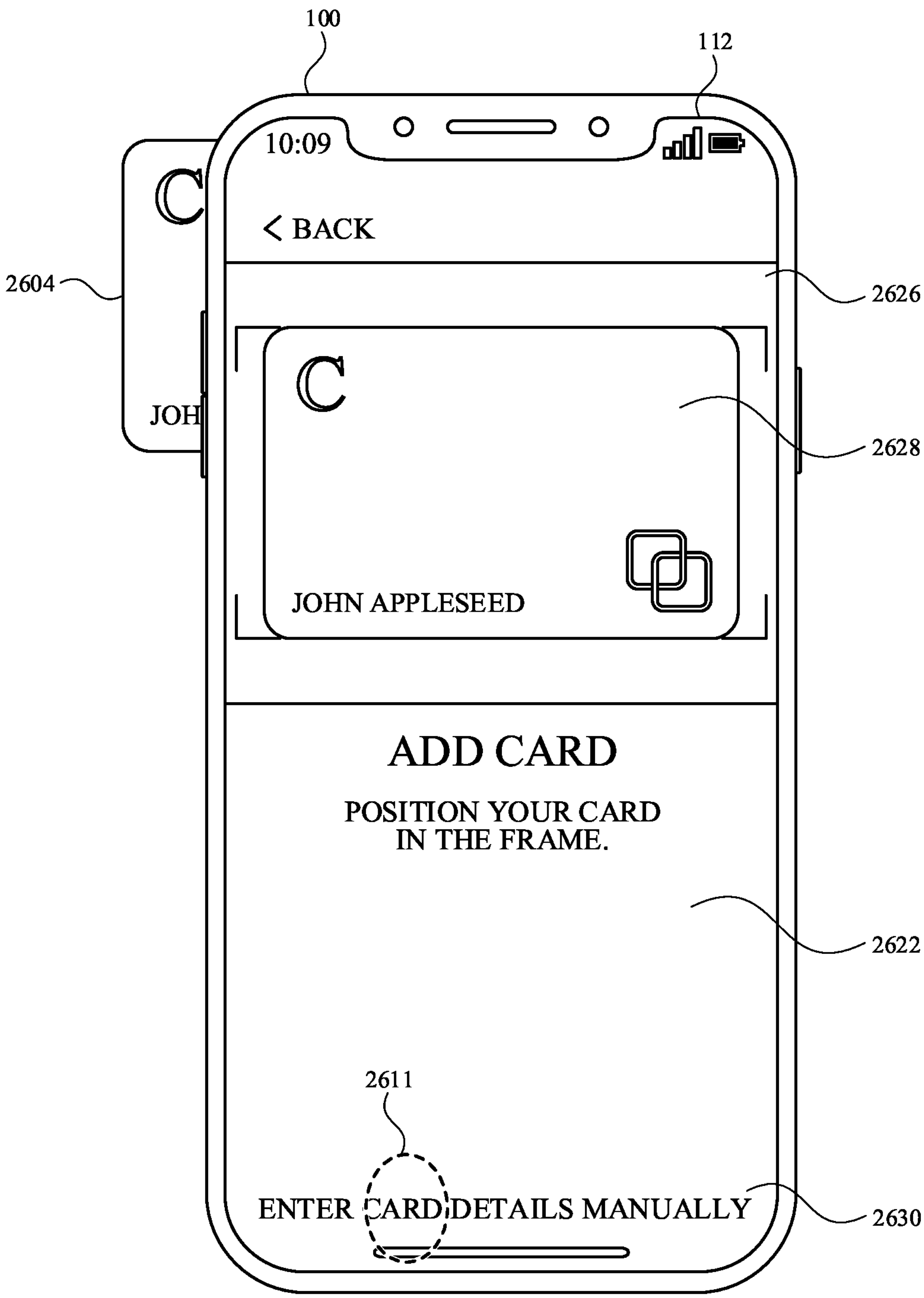

In FIG. 26K, electronic device 100 displays a captured representation 2628 of un-activated physical account object 2604 in image capture region 2626 of second activation user interface 2622 based on an image of the physical account object being captured by a camera (e.g., of camera module 143) of the device.

In some embodiments, in response to or while detecting that un-activated physical account object 2064 is fully aligned to image capture region 2626, electronic device 100 captures an image of and/or detects account information (e.g., name of account holder, card number) from the physical account object 2604. In some embodiments, in response to detecting the account information from un-activated physical account object 2604, electronic device 100 initiates the process for activating physical account object 2604 to be enabled to authorize transfers (e.g., make payment transactions; make points transfers) using the transfer account (e.g., the first-party credit account; the points account).

In some embodiments, in response to detecting that (or in accordance with a determination that) physical account object 2604 has been successfully activated and thus is available to be used to authorize transfers (e.g., authorize payment transactions; authorize points transfers) using the transfer account (e.g., the first-party credit account; the points account), electronic device 100 displays an activation confirmation user interface 2642, as shown in FIG. 26N.

FIGS. 26K-26N illustrate another exemplary embodiment for activating a physical account object (e.g., physical account object 2604) corresponding to the transfer account (e.g., the first-party credit account; the points account). In FIG. 26K, while displaying second activation user interface 2622 and prior to (or in accordance with a determination that the device is unable to) initiates the process for activating physical account object 2604 based on captured representation 2628 of un-activated physical account object 2604, electronic device 100 detects a selection 2611 of (e.g., a tap input on) a selectable option 2630 for manually activating the physical account object.

Figure 26L:
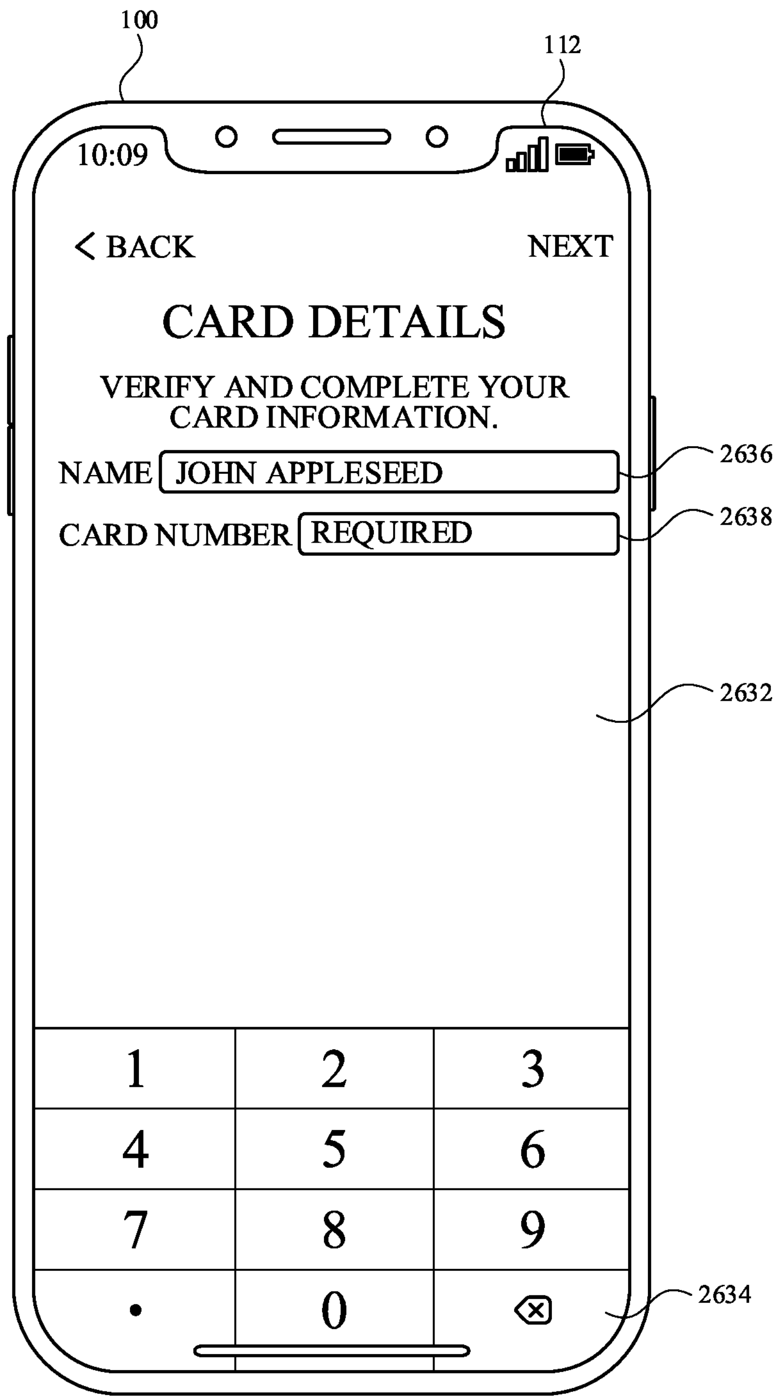

In FIG. 26L, in response to detecting selection 2611 of selectable option 2630, electronic device 100 displays, on display 112, a manual activation user interface 2632. In some embodiments, manual activation user interface 2632 includes an input field 2636 for entering (e.g., via a keypad 2634 displayed in manual activation user interface 2632), a name of the account holder of the transfer account (e.g., the first-party credit account; the points account). In some embodiments, manual activation user interface 2632 includes an input field 2638 for entering an identification number (e.g., a card number, an account number) of the physical account object 2604 corresponding to the transfer account (e.g., the first-party credit account; the points account).

In some embodiments, input field 2636 is automatically (e.g., without user input) pre-populated with the name of the user based on user account information (e.g., used to login to the operating system of the device) accessible by the device and/or account information of the transfer account (e.g., the first-party credit account; the points account) provisioned on the device.

Figure 26M:
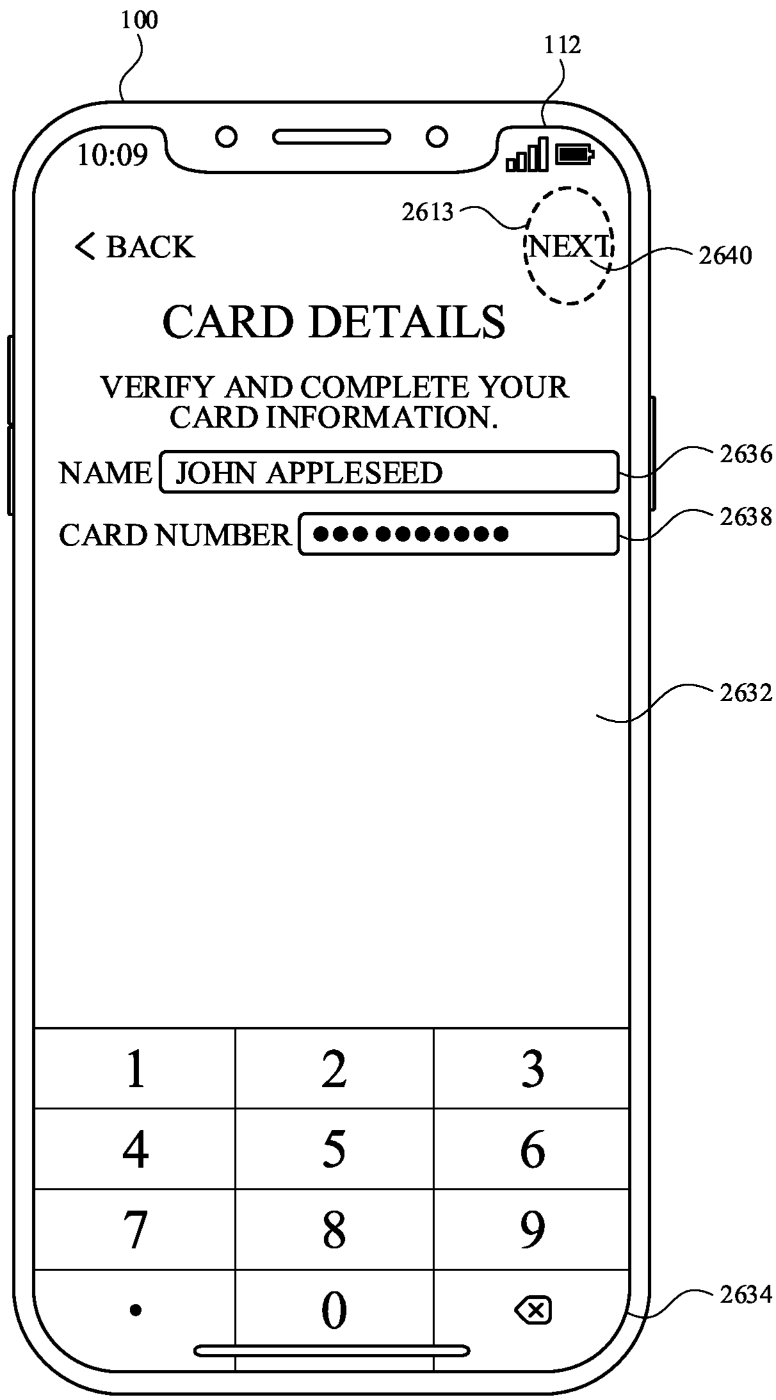

In FIG. 26M, electronic device 100 displays, in input fields 2636 and 2638, detected or received information for the respective input fields. In some embodiments, electronic device 100 forgoes displaying, in input field 2638, the received numerical values corresponding to the identification number (e.g., for enhanced security) of the physical account object. In some embodiments, electronic device 100 only displays a portion of (e.g., the last four digits of) the received numerical values corresponding to the identification number of the physical account object.

In FIG. 26M, after detecting or receiving the requested information in manual activation user interface 2632, electronic device 100 detects a user activation 2613 of a continue affordance 2640.

In FIG. 26N, in response to detecting user activation 2613 of continue affordance 2640, electronic device 100 displays, on display 112, activation confirmation user interface 2642. In some embodiments, activation confirmation user interface 2642 includes representation 870 of the transfer account (e.g., which also corresponds to the physical look of physical count object 2604). In some embodiments, activation confirmation user interface 2642 includes an indication 2644 that physical account object 2604 has been successfully activated and thus is available to be used to authorize transfers (e.g., authorize payment transactions; authorize points transfers) using the transfer account (e.g., the first-party credit account; the points account).

FIGS. 27A-27B are a flow diagram illustrating a method for managing an authentication credential connected with a transfer account, in accordance with some embodiments. Method 2700 is performed at an electronic device (e.g., 100, 300, 500) with a display (e.g., 112) and an input element (e.g., a wireless communication radio of the electronic device, such as for NFC (near-field communication), Bluetooth, LTE, and/or WiFi connections; a camera of the electronic device, such as of camera module 143: touch screen of display 112; menu button 204; push button 206). Some operations in method 2700 are, optionally, combined, the orders of some operations are, optionally, changed, and some operations are, optionally, omitted.

As described below, method 2700 provides an intuitive way for managing a transfer account. The method reduces the cognitive burden on a user for managing a transfer account, thereby creating a more efficient human-machine interface. For battery-operated computing devices, enabling a user to manage a transfer account faster and more efficiently conserves power and increases the time between battery charges.

The electronic device (e.g., 100) detects (2702), via the input element, a property of a physical account object (e.g., 2508, 2604; a physical card) corresponding to a transfer account (e.g., the transfer account as first described above with reference to FIGS. 8A-8V, such as a payment account, a virtual card account, a points account, a rewards account) provisioned onto (e.g., linked to) the electronic device. In some embodiments, the physical account object (e.g., 2508, 2604) is detected by the electronic device (e.g., 100) when the physical account object is placed within a predetermined distance from the electronic device. In some embodiments, the physical account object (e.g., 2508, 2604) is a physical representation of the transfer account, and thus are of the same account. Detecting the property of the physical account object when the physical account object is placed within a predetermined distance from the electronic device enables the user to quickly and easily initiate the process of the device detecting the physical account object, thereby enhancing the operability of the device and making the user-device interface more efficient which, additionally, reduces power usage and improves battery life of the device by enabling the user to use the device more quickly and efficiently. In some embodiments, the transfer account is a "virtual" transfer account because, prior to activation of the physical account object, it does not have a counterpart linked physical account that can be used for transfers (e.g., payment) that do not involve the use of the electronic device.

In some embodiments, the electronic device (e.g., 100) and the physical account object (e.g., 2508, 2604) correspond to a same user account (e.g., a user account belonging to the user of the device used to login to the operating system of the device) (2704).

In some embodiments, the transfer account can be used via the electronic device (e.g., 100) and via the physical account object (e.g., 2508, 2604) to authorize transactions (2706).

The electronic device (e.g., 100) obtains (2708), from the physical account object (e.g., 2508, 2604) via the input element, information identifying the physical account object.

In some embodiments, the electronic device (e.g., 100) obtaining the information identifying the physical account object (e.g., 2508, 2604) includes the electronic device obtaining at least a portion of the information from a packaging (e.g., 2510, 2606) of the physical account objected via the input element (e.g., where the physical account object is wrapped by, covered by, or enclosed by the packaging).

In some embodiments, the electronic device (e.g., 100) obtaining, from the physical account object (e.g., 2508, 2604) via the input element, the information identifying the physical account object comprises the electronic device automatically obtaining (from the physical account object), without further user input, the information identifying the physical account object in response to detecting, via the input element, the property of the physical account object (e.g., a physical card) corresponding to the transfer account. Automatically obtaining without further user input, the information identifying the physical account object in response to detecting, via the input element, the property of the physical account object corresponding to the transfer account enables the user to quickly and easily initiate the process for activating the physical account object. Reducing the number of inputs needed to perform an operation enhances the operability of the device and makes the user-device interface more efficient (e.g., by helping the user to provide proper inputs and reducing user mistakes when operating and/or interacting with the device) which, additionally, reduces power usage and improves battery life of the device by enabling the user to use the device more quickly and efficiently.

In some embodiments, the electronic device (e.g., 100) obtaining, from the physical account object (e.g., 2508, 2604) via the input element, the information identifying the physical account object comprises the electronic device obtaining the information identifying the physical account object in response to detecting, via the input element, a user input directed to obtaining the information identifying the physical account object (e.g., user activation of an affordance for proceeding with obtaining the information) after the property of the physical account object corresponding to the transfer account is detected.

In some embodiments, the input element is a wireless communication radio (e.g., for Bluetooth, near-field-communication (NFC)) (2714). In some embodiments, the electronic device (e.g., 100) detecting the property of the physical account object (e.g., 2508, 2604) comprises the electronic device detecting the property of the physical account object using the wireless communication radio independent of whether an electronic wallet application is running (or is displayed) on the electronic device. Detecting the property of the physical account object using the wireless communication radio independent of whether an electronic wallet application is running (or is displayed) on the electronic device enables the user to quickly and easily initiate the process for activating the physical account object. Reducing the number of inputs needed to perform an operation enhances the operability of the device and makes the user-device interface more efficient (e.g., by helping the user to provide proper inputs and reducing user mistakes when operating and/or interacting with the device) which, additionally, reduces power usage and improves battery life of the device by enabling the user to use the device more quickly and efficiently. In some embodiments, the electronic device obtaining the information identifying the physical account object comprises the electronic device receiving, from the physical account object (e.g., and/or a packaging of the physical account object) via the wireless communication radio, the information identifying the physical account object.

In some embodiments, the input element is a wireless communication radio (e.g., for Bluetooth, near-field-communication (NFC)). In some embodiments, the electronic device (e.g., 100) detecting the property of the physical account object (e.g., 2508, 2604) comprises the electronic device detecting the property of the physical account object using the wireless communication radio in accordance with a determination that an electronic wallet application is running (or is displayed) on the electronic device. Detecting the property of the physical account object using the wireless communication radio in accordance with a determination that an electronic wallet application is running (or is displayed) on the electronic device enables the user to quickly and easily initiate the process for activating the physical account object while also providing control over when the activating of the physical account object is initiated on the device. Providing additional control options without cluttering the UI with additional displayed controls enhances the operability of the device and makes the user-device interface more efficient (e.g., by helping the user to provide proper inputs and reducing user mistakes when operating and/or interacting with the device) which, additionally, reduces power usage and improves battery life of the device by enabling the user to use the device more quickly and efficiently. In some embodiments, in accordance with a determination that the electronic wallet application is not running (or is not displayed) on the electronic device, the electronic device forgoes detecting the property of the physical account object using the wireless communication radio. In some embodiments, the electronic device obtaining the information identifying the physical account object comprises the electronic device receiving, from the physical account object (e.g., and/or a packaging of the physical account object) via the wireless communication radio, the information identifying the physical account object.

In some embodiments, the input element is a camera of the electronic device (e.g., 100) (2712). In some embodiments, the electronic device (e.g., 100) detecting the property of the physical account object (e.g., 2508, 2604) comprises the electronic device detecting the property of the physical account object (e.g., 2604) using the camera (e.g., by capturing an image of the physical account object using the camera). In some embodiments, the electronic device (e.g., 100) obtaining the information identifying the physical account object (e.g., 2508, 2604) comprises the electronic device obtaining, from the physical account object using the camera, the information identifying the physical account object. Obtaining the information identifying the physical account object using the camera provides another method for the user to quickly and easily initiate and/or perform the process of activating the physical account object. Reducing the number of inputs needed to perform an operation enhances the operability of the device and makes the user-device interface more efficient (e.g., by helping the user to provide proper inputs and reducing user mistakes when operating and/or interacting with the device) which, additionally, reduces power usage and improves battery life of the device by enabling the user to use the device more quickly and efficiently.

In some embodiments, the input element is an input device (e.g., a touch-sensitive surface) of the electronic device (e.g., 100) (2710). In some embodiments, the electronic device (e.g., 100) detecting the property of the physical account object (e.g., 2508, 2604) comprises the electronic device receiving, via the input device, user input corresponding to the property of the physical account object (e.g., a user input corresponding to the user manually typing, on the touch-sensitive surface, text (e.g., alphanumerics) corresponding to the property of the physical account object. In some embodiments, the electronic device (e.g., 100) obtaining the information identifying the physical account object (e.g., 2508, 2604) comprises the electronic device obtaining, based on the user input received via the input device, the information identifying the physical account object.

In response to receiving the information identifying the physical account object (e.g., 2508, 2604), the electronic device (e.g., 100) displays (2716), on the display (e.g., 112), an affordance (e.g., 2610 of user interface 2608) for activating the physical account object (e.g., 2508, 2604). Displaying the affordance for activating the physical account object in response to receiving the information identifying the physical account object provides feedback that the physical account object has been detected and is ready to be activated. Providing improved visual feedback to the user enhances the operability of the device and makes the user-device interface more efficient (e.g., by helping the user to provide proper inputs and reducing user mistakes when operating and/or interacting with the device) which, additionally, reduces power usage and improves battery life of the device by enabling the user to use the device more quickly and efficiently.

In some embodiments, the electronic device (e.g., 100) displaying the affordance (e.g., 2610) for activating the physical account object (e.g., 2508, 2604) comprises the electronic device displaying the affordance in accordance with a determination, based on the information identifying the physical account object, that the physical account object can be used to authorize transactions using the transfer account (e.g., because the physical account object is a physical copy or version of the transfer account). In some embodiments, in accordance with a determination, based on the information identifying the physical account object (e.g., 2508, 2604), that the physical account object cannot be used to authorize transactions using the transfer account, the electronic device (e.g., 100) forgoes displaying, on the display (e.g., 112), the affordance for activating the physical account object.

While displaying the affordance (e.g., 2610), the electronic device (e.g., 100) detects (2718) an input corresponding to selection of the affordance (e.g., 2610).

In some embodiments, while displaying the affordance (e.g., 2610) for activating the physical account object (e.g., 2604), the electronic device (e.g., 100) concurrently displays (2720), on the display (e.g., 112), a graphical representation of the physical account object (e.g., 2514, where the graphical representation of the physical account object is a representation of what the physical account object would look like in the real world), where the graphical representation of the physical account object corresponds to (e.g., is similar to, is representative of) a graphical representation (e.g., 704, 870) of the transfer account that is displayed in an electronic wallet application of the electronic device.

In response to detecting the input corresponding to selection of the affordance (e.g., 2610), the electronic device (e.g., 100) automatically, without further user input, initiates (2722) a process for enabling the physical account object (e.g., 2508, 2604) to be used to authorize transfers (e.g., payment transactions; points transfers) using the transfer account. Automatically initiating, without further user input, a process for enabling the physical account object to be used to authorize transfers using the transfer account enables the user to quickly and easily complete the process for enabling the physical account object. Reducing the number of inputs needed to perform an operation enhances the operability of the device and makes the user-device interface more efficient (e.g., by helping the user to provide proper inputs and reducing user mistakes when operating and/or interacting with the device) which, additionally, reduces power usage and improves battery life of the device by enabling the user to use the device more quickly and efficiently.

In some embodiments, prior to initiating the process for enabling the physical account object (e.g., 2508, 2604) to be used to authorize transactions using the transfer account in response to detecting the input corresponding to selection of the affordance (e.g., 2610), the physical account object (e.g., 2508, 2604) is disabled from being used to authorize transactions using the transfer account (2724).

Note that details of the processes described above with respect to method 2700 (e.g., FIGS. 27A-27B) are also applicable in an analogous manner to the methods described above. For example, method 900 optionally includes one or more of the characteristics of the various methods described above with reference to method 2700. For example, the physical account object activated in method 2700 can be used to authorize transfers using the transfer account activated in method 900. For another example, method 1200 optionally includes one or more of the characteristics of the various methods described above with reference to method 2700. For example, transfers made using the physical account object activated in method 2700 can be included in the information provided in the summary user interface described in method 1200. For another example, method 1500 optionally includes one or more of the characteristics of the various methods described above with reference to method 2700. For example, the visual effect and/or feedback provided on a representation of the transfer account as described in method 1500 can correspond to transfers made using the physical account object activated in method 2700. For another example, method 1800 optionally includes one or more of the characteristics of the various methods described above with reference to method 2700. For example, transfers made at the common place as summarized in the place summary user interface described in method 1800 can include transfers made using the physical account object activated in method 2700. For another example, method 2100 optionally includes one or more of the characteristics of the various methods described above with reference to method 2700. For example, transfers made using the physical account object activated in method 2700 can be reduced using the balance transfer user interface described in method 2100. For another example, method 2400 optionally includes one or more of the characteristics of the various methods described above with reference to method 2700. For example, the physical account object activated in method 2700 can be used instead of the authentication credential described in method 2400 for certain transfers using the transfer account. For another example, method 3000 optionally includes one or more of the characteristics of the various methods described above with reference to method 2700. For example, the balance amount corresponding to transfers made using the physical account object activated in method 2700 can be reduced via the balance transfer user interface element described in method 3000. For brevity, these details are not repeated below.

FIG. 27C is a flow diagram illustrating a method for managing an authentication credential connected with the user account, in accordance with some embodiments. Method 2701 is performed at an electronic device (e.g., 100, 300, 500) with a display (e.g., 112) and an input element (e.g., a wireless communication radio of the electronic device, such as for NFC (near-field communication), Bluetooth, LTE, and/or WiFi connections; a camera of the electronic device, such as of camera module 143; touch screen of display 112; menu button 204; push button 206). Some operations in method 2701 are, optionally, combined, the orders of some operations are, optionally, changed, and some operations are, optionally, omitted.

As described below, method 2701 provides an intuitive way for managing a user account. The method reduces the cognitive burden on a user for managing a user account, thereby creating a more efficient human-machine interface. For battery-operated computing devices, enabling a user to manage a user account faster and more efficiently conserves power and increases the time between battery charges.

The electronic device (e.g., 100) detects (2702, 2703), via the input element, a property of a physical account object (e.g., 2508, 2510) corresponding to a user account provisioned onto the electronic device.

The electronic device (e.g., 100) obtains (2708, 2705), from the physical account object (e.g., 2508, 2510) via the input element, information identifying the physical account object.

In response to receiving the information identifying the physical account object (e.g., 2508, 2510), the electronic device (e.g., 100) displays (2716, 2707), on the display (e.g., 112), an affordance (e.g., 2518) for activating the physical account object.

While displaying the affordance (e.g., 2518), the electronic device (e.g., 100) detects (2718, 2709) an input corresponding to selection of the affordance.

In response to detecting the input corresponding to selection of the affordance (e.g., 2518), the electronic device (e.g., 100) automatically, without further user input, initiates (2722, 2711) a process for enabling the physical account object (e.g., 2508) to be used to authorize use of the user account.

In some embodiments, the user account corresponds to a computer storage account. In some embodiments, using the user account includes requesting storage of data onto available computer storage resources (e.g., an available MB or GB amount of computer resources) associated with the computer storage account.

In some embodiments, the user account corresponds to a financial account. In some embodiments, using the user account includes making purchases based on financial resources (e.g., credit or money) associated with the financial account.

In some embodiments, the user account is a transfer account, and the technique described with respect to FIG. 27C includes some or all aspects of the technique described above with respect to FIGS. 27A-27B.

FIGS. 28A-28B illustrate exemplary user interfaces for managing account operations, in accordance with some embodiments. The user interfaces in these figures are used to illustrate the processes described below, including the processes in FIGS. 30A-30B.

FIG. 28A illustrates electronic device 100 displaying, on display 112, summary user interface 710 of the user account (e.g., a computer storage account). As discussed, summary user interface 710 includes representation 704 of the user account (e.g., a computer storage account) and deletion user interface element 716 (e.g., similar to balance transfer user interface element 881 described below with reference to FIGS. 29A-29J).

In FIG. 28A, electronic device 100 is displaying, in deletion user interface element 716 an indication of a date and/or time frame by which a certain amount of data should be deleted from existing stored and/or archived data of the user account (e.g., a computer storage account) in order to avoid use quota reduction penalties. In this example, the time frame for which the certain amount of data should be deleted is one week.

In some embodiments, deletion user interface element 716 includes a selectable indication 716 (e.g., similar to indication 881A described below with reference to FIGS. 29A-29J) which, when activated, initiates a process for selecting a data amount to delete from the user account (e.g., displaying data deletion user interface 1902). In some embodiments, in accordance with a determination that the time frame is within a predetermined time period (e.g., within 15 days, within 10 days, within one week), electronic device 100 displays selectable indication 716A with a first type of visual characteristic (e.g., a first color) that emphasizes that data should be deleted within the time frame.

FIG. 28B illustrates, in response to detecting that the full amount of data that needed to be deleted from existing stored and/or archived data of the user account (e.g., a computer storage account) in order to avoid use quota reduction penalties has been deleted, electronic device 100 displays, in deletion user interface element 716, an indication that the full amount of data has been deleted from the user account. In some embodiments, in response to detecting that the full amount of data has been deleted, electronic device 100 also updates display of selectable indication 716A with a second type of visual characteristic (e.g., a second color, a symbol, such as a checkmark).

In some embodiments, further in response to detecting that the full amount of data that needed to be deleted from existing stored and/or archived data of the user account (e.g., a computer storage account) in order to avoid use quota reduction penalties has been deleted, electronic device 100 displays, in stored data list 720, a new stored data item 720C corresponding to the data that was deleted from the computer storage resources associated with the user account (e.g., a computer storage account).

FIGS. 29A-29J illustrate exemplary user interfaces for managing balance transfers, in accordance with some embodiments. The user interfaces in these figures are used to illustrate the processes described below, including the processes in FIGS. 30A-30B.

Figure 29A:
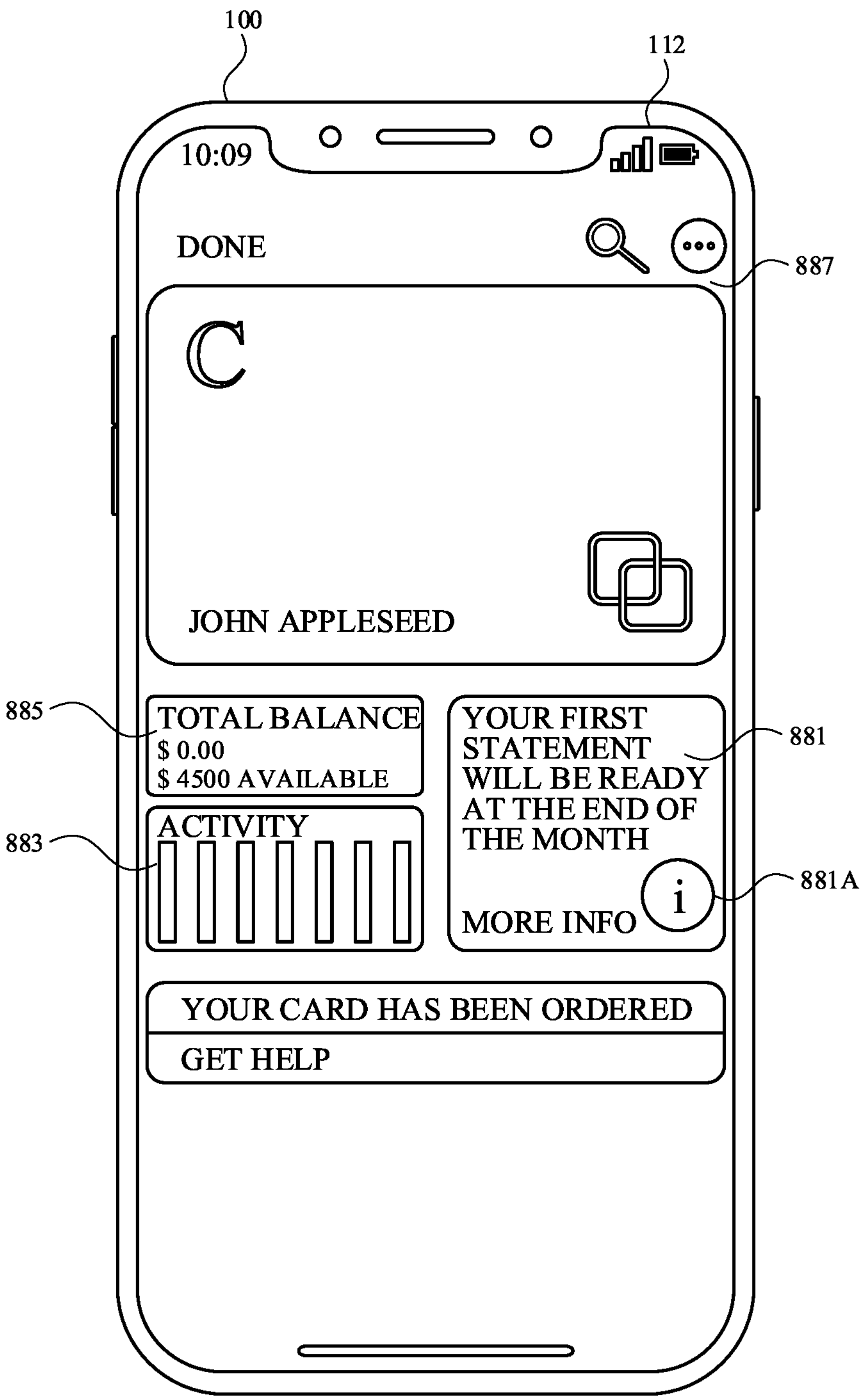
FIGS. 29A-29J illustrate exemplary user interfaces for managing balance transfers, in accordance with some embodiments.

FIG. 29A illustrates electronic device 100 displaying, on display 112, summary user interface 887 of the transfer account (e.g., the first-party credit account; the points account). As mentioned, in some embodiments, the transfer account is a first-party credit account (e.g., a revolving credit account that is issued or branded by the manufacturer of the electronic device), and provides rewards (e.g., cash back rewards) based on the amount of transfers (e.g., payment transactions, points transfers) made using the transfer account (e.g., cash back rewards that are based on a certain percentage of the value of each transition). As also mentioned, in some embodiments, the transfer account is a points account (e.g., for meal points, for printer credits, for membership points) that provides rewards (e.g., points rewards) based on the amount of points used using the transfer account.

In FIG. 29A, the transfer account (e.g., the first-party credit account; the points account) is detected to have been activated and provisioned on the electronic device, but has not yet been used to perform transfer (e.g., has not been used to make payments or points transfers). In some embodiments, electronic device 100 displays, in summary user interface 887, balance indicator user interface element 885 (e.g., a balance module) indicating that there is currently no balance on the transfer account (e.g., by showing a "$0" balance and/or showing that the full amount of credit (e.g., "$4,500") is available on the account). In some embodiments, electronic device 100 displays, in summary user interface 887, activity user interface element 883 (e.g., an activity module) indicating that there has not been any transfer activity (e.g., with an empty bar graph) on the transfer account (e.g., the first-party credit account; the points account).

In some embodiments, electronic device 100 displays, in summary user interface 887, balance transfer user interface element 881 (e.g., a balance payment module) indicating that there is currently no balance transfer due (e.g., by stating that the first statement will be ready at the end of the current statement period (e.g., the end of the month)). In some embodiments, electronic device 100 displays indicator 881A of balance transfer user interface element 881 to indicate (e.g., with an "i" symbol) that more information about the next balance transfer period (e.g., the next statement period) is available via selection of indicator 881A (or selection of balance transfer user interface element 881). In some embodiments, balance transfer user interface element 881 and/or indicator 881A is displayed with a first visual characteristic (e.g., a first background color, such as a white background color).

Figure 29B:
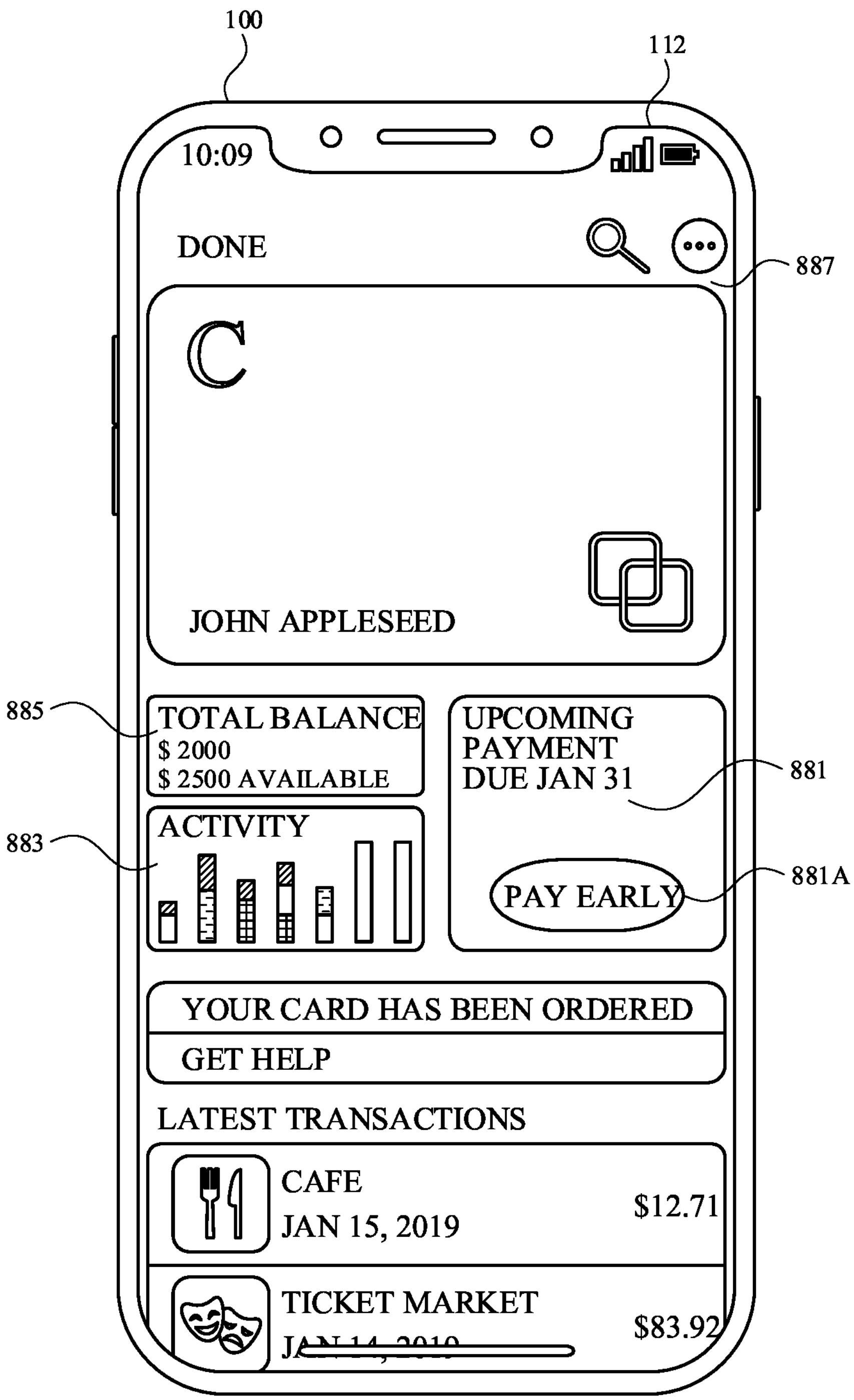

In FIG. 29B, the transfer account (e.g., the first-party credit account; the points account) is detected to have been used to perform transfers for a predetermined time period (e.g., the past week), but the balance transfer due date (e.g., the statement due date) is more than a threshold amount of time away (e.g., more than two weeks away, more than 10 days away, more than one week away). In some embodiments, electronic device 100 updates display of balance indicator user interface element 885 to indicate that a current balance on the transfer account (e.g., a balance of "$2,000") and a remaining balance amount (e.g., a remaining credit line of "$2,500"). In some embodiments, electronic device 100 updates display of activity user interface element 883 to indicate, for example in a bar graph, the transfer activity on the transfer account during a predetermined time period (e.g., the past week). The bar graph of activity user interface element 883 is described in greater detail above with reference to FIG. 8S.

In some embodiments, electronic device 100 updates display of balance transfer user interface element 881 to indicate that the upcoming balance transfer due date (e.g., the next balance payment due date (e.g., stating "Upcoming Payment Due January 31")). In some embodiments, electronic device 100 also updates display of indicator 881A of balance transfer user interface element 881 to indicate (e.g., by stating "Pay Early") that a balance transfer (e.g., a balance payment) for the transfer account is due, but is not urgent, and thus that performing a balance transfer at this time would constitute an early balance transfer well in advance of the due date. In some embodiments, balance transfer user interface element 881 and/or indicator 881A is still displayed with the first visual characteristic (e.g., a first background color, such as a white background color).

Figure 29C:
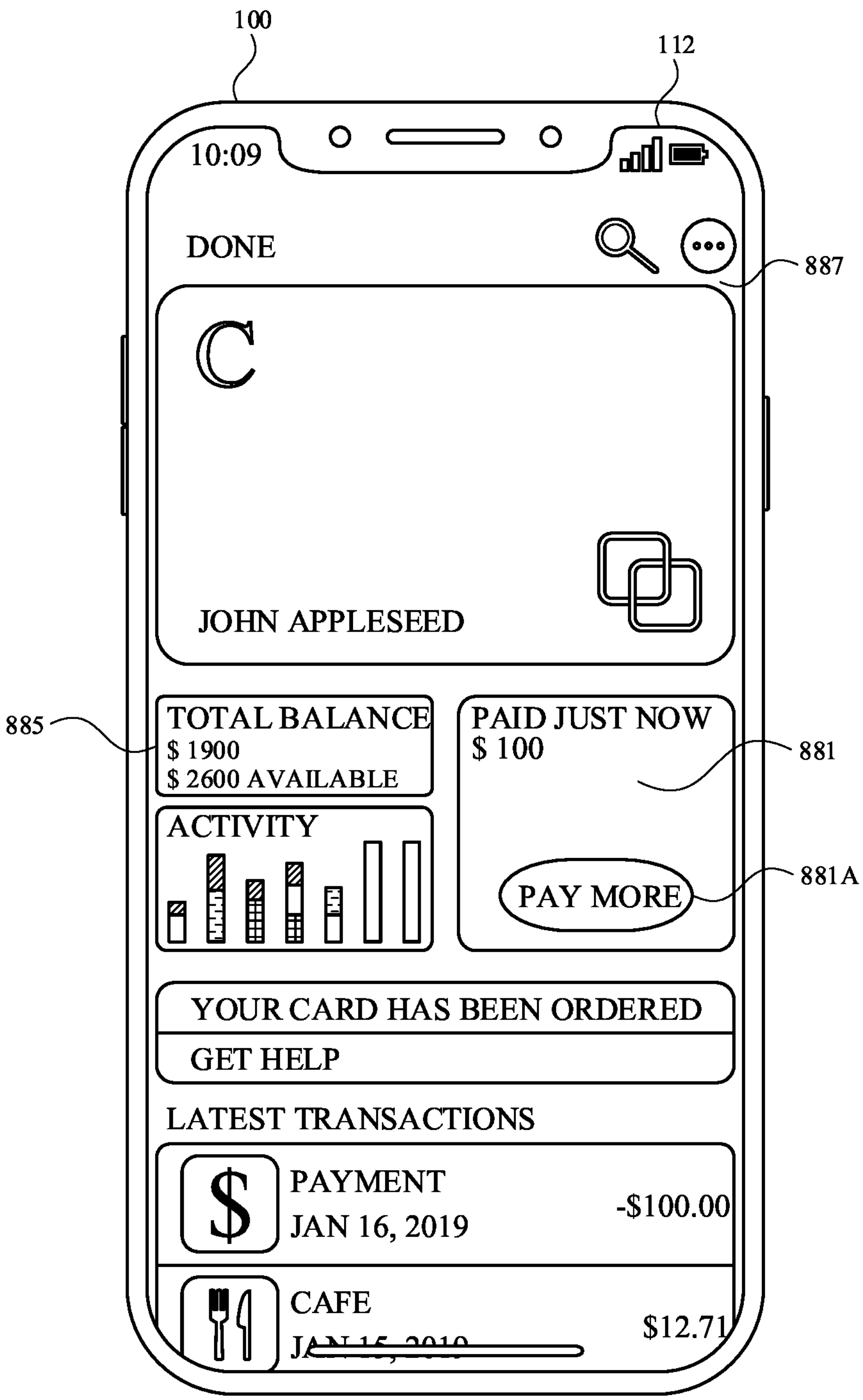

In FIG. 29C, a partial balance transfer (e.g., a balance payment (e.g., of "$100") that is less than the statement balance amount (e.g., of "$2,000") or the full current balance amount) is detected to have been made on the transfer account (e.g., the first-party credit account; the points account). In some embodiments, subsequent to (or in response to) detecting the partial balance transfer, electronic device 100 updates display of balance indicator user interface element 885 to indicate that a current balance on the transfer account (e.g., a balance of "$1,900") after the partial balance transfer and a remaining balance amount (e.g., a remaining credit line of "$2,600") after the partial balance transfer.

In some embodiments, electronic device 100 updates display of balance transfer user interface element 881 to indicate that the partial balance transfer has been made (e.g., that the partial balance payment was received (e.g., by stating 37 Paid Just Now "$100"). In some embodiments, electronic derive 100 also updates display of indicator 881A of balance transfer user interface element 881 to indicate that the partial balance transfer (e.g., the partial balance payment of "$100") does not correspond to the full balance transfer amount that is due (e.g., the full statement amount or the full current balance amount) for the transfer account, and thus that an additional balance transfer (e.g., another balance payment) is needed (e.g., by stating "Pay More"). In some embodiments, balance transfer user interface element 881 and/or indicator 881A is still displayed with the first visual characteristic (e.g., a first background color, such as a white background color).

In some embodiments, balance transfer user interface element 881 indicating that the partial balance transfer has been made (e.g., that the partial balance payment was received (e.g., by stating "Paid Just Now $100") for a predetermined amount of time (e.g., for one hour, for one day, for a week). In some embodiments, in response to detecting that the predetermined amount of time has passed since first displaying the indication of the partial balance transfer in balance transfer user interface element 881, electronic device 100 updates display of balance transfer user interface element 881 to again indicate the upcoming balance transfer due date (e.g., the next balance payment due date (e.g., stating "Upcoming Payment Due January 31")), as depicted in FIG. 29B.

Figure 29D:
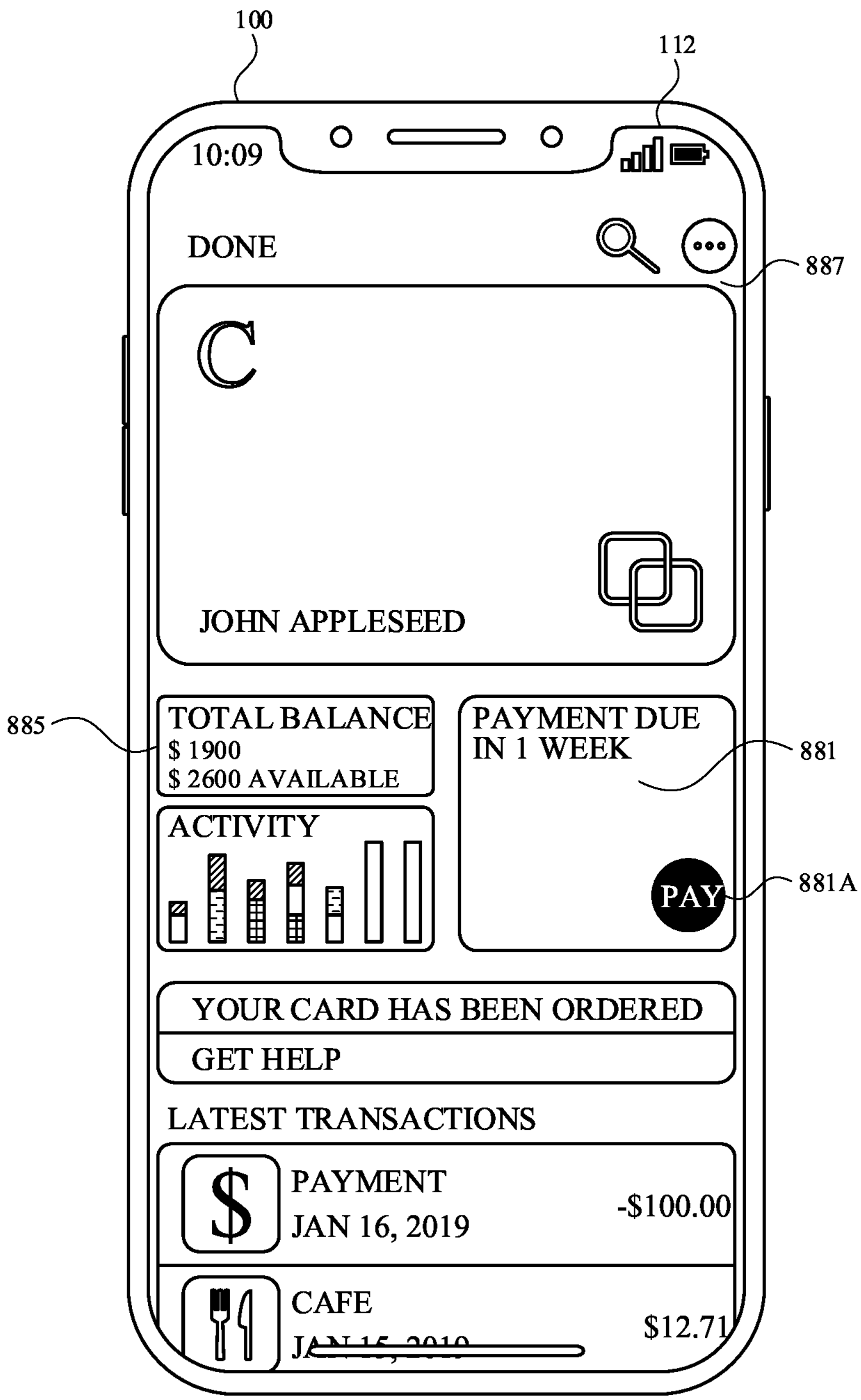

In FIG. 29D, electronic device 100 detects that a first threshold time period (e.g., less than one week, but more than 3 days) is remaining until the due date for the balance transfer (e.g., the statement due date (e.g., "January 31")) but that at least a portion of the due balance (e.g., "$1,900") is still remaining (e.g., the full statement balance has not yet been paid) on the transfer account (e.g., the first-party credit account; the points account).

In some embodiments, in accordance with detecting that the first threshold time period (e.g., less than one week, but more than 3 days) is remaining until the due date for the balance transfer (e.g., the statement due date (e.g., "January 31")) but that at least a portion of the due balance (e.g., "$1,900") is still remaining (e.g., the full statement balance has not yet been paid) on the transfer account, electronic device 100 updates display of balance transfer user interface element 881 to indicate the amount of time that is remaining until the due date (e.g., a countdown until the statement balance due date (e.g., by stating "Payment Due in 1 Week")). In some embodiments, electronic device 100 also updates display of indicator 881A of balance transfer user interface element 881 to indicate that the remaining balance transfer (e.g., a balance payment for the remaining statement balance that has not yet been paid) is urgent (e.g., by stating "PAY"). In some embodiments, balance transfer user interface element 881 and/or indicator 881A is displayed with a second visual characteristic different from the first visual characteristic (e.g., a second background color, such as a black background color).

Figure 29E:
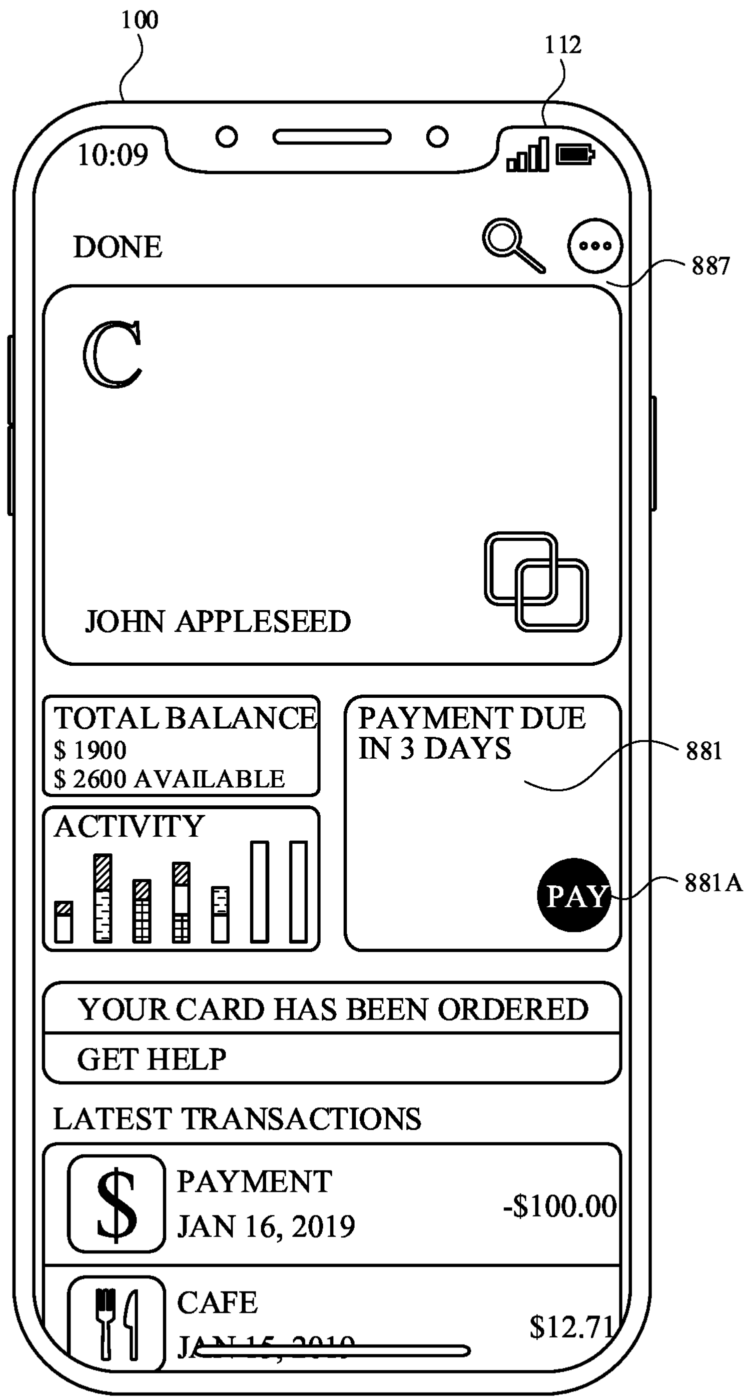

In FIG. 29E, electronic device 100 detects that a second threshold time period (e.g., less than 3 days, but more than 2 days) is remaining until the due date for the balance transfer (e.g., the statement due date (e.g., "January 31")) but that at least a portion of the due balance (e.g., "$1,900") is still remaining (e.g., the full statement balance has not yet been paid) on the transfer account (e.g., the first-party credit account; the points account).

In some embodiments, in accordance with detecting that the second threshold time period (e.g., less than 3 days, but more than 2 days) is remaining until the due date for the balance transfer (e.g., the statement due date (e.g., "January 31")) but that at least a portion of the due balance (e.g., "$1,900") is still remaining (e.g., the full statement balance has not yet been paid) on the transfer account, electronic device 100 continues to update display of balance transfer user interface element 881 to indicate the current amount of time that is remaining until the due date (e.g., continues the displayed countdown until the statement balance due date (e.g., by stating "Payment Due in 3 Days")). In some embodiments, electronic device 100 maintains display of indicator 881A of balance transfer user interface element 881 indicating that the remaining balance transfer (e.g., a balance payment for the remaining statement balance that has not yet been paid) is urgent (e.g., by stating "PAY"). In some embodiments, balance transfer user interface element 881 and/or indicator 881A is still displayed with the second visual characteristic different from the first visual characteristic (e.g., a second background color, such as a black background color).

Figure 29F:
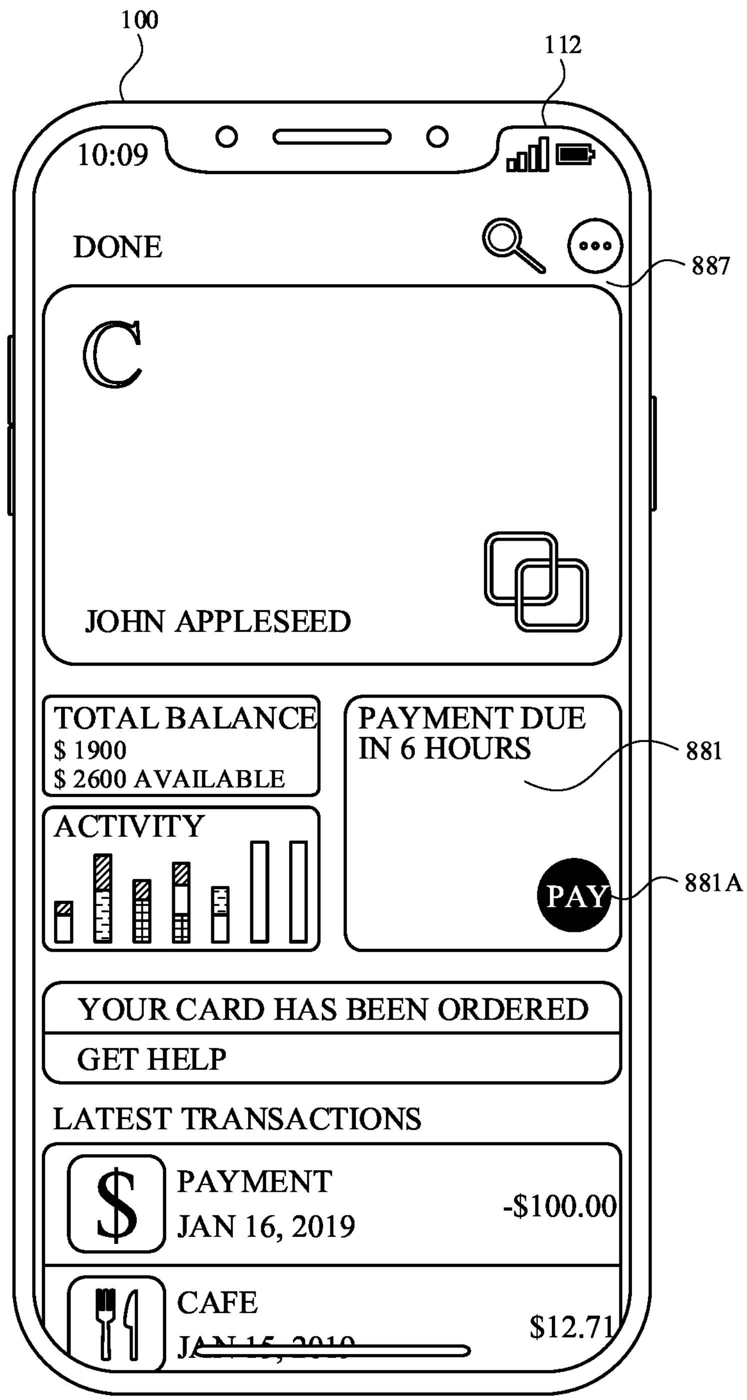

In FIG. 29F, electronic device 100 detects that a third threshold time period (e.g., less than a day, but more than 1 hour, such as 6 hours) is remaining until the due date for the balance transfer (e.g., the statement due date (e.g., "January 31")) but that at least a portion of the due balance (e.g., "$1,900") is still remaining (e.g., the full statement balance has not yet been paid) on the transfer account (e.g., the first-party credit account; the points account).

In some embodiments, in accordance with detecting that the third threshold time period (e.g., less than a day, but more than 1 hour, such as 6 hours) is remaining until the due date for the balance transfer (e.g., the statement due date (e.g., "January 31")) but that at least a portion of the due balance (e.g., "$1,900") is still remaining (e.g., the full statement balance has not yet been paid) on the transfer account, electronic device 100 continues to update display of balance transfer user interface element 881 to indicate the current amount of time that is remaining until the due date (e.g., continues the displayed countdown until the statement balance due date (e.g., by stating "Payment Due in 3 Hours")). In some embodiments, electronic device 100 maintains display of indicator 881A of balance transfer user interface element 881 indicating that the remaining balance transfer (e.g., a balance payment for the remaining statement balance that has not yet been paid) is urgent (e.g., by stating "PAY"). In some embodiments, balance transfer user interface element 881 and/or indicator 881A is still displayed with the second visual characteristic different from the first visual characteristic (e.g., a second background color, such as a black background color). In some embodiments, in accordance with detecting that the third threshold time period (e.g., less than a day) is remaining until the balance due date, electronic device 100 updates display of balance transfer user interface element 881 and/or indicator 881A with a third visual characteristic different from the second visual characteristic and the first visual characteristic (e.g., a third background color different from a white background color or a black background color).

Figure 29G:
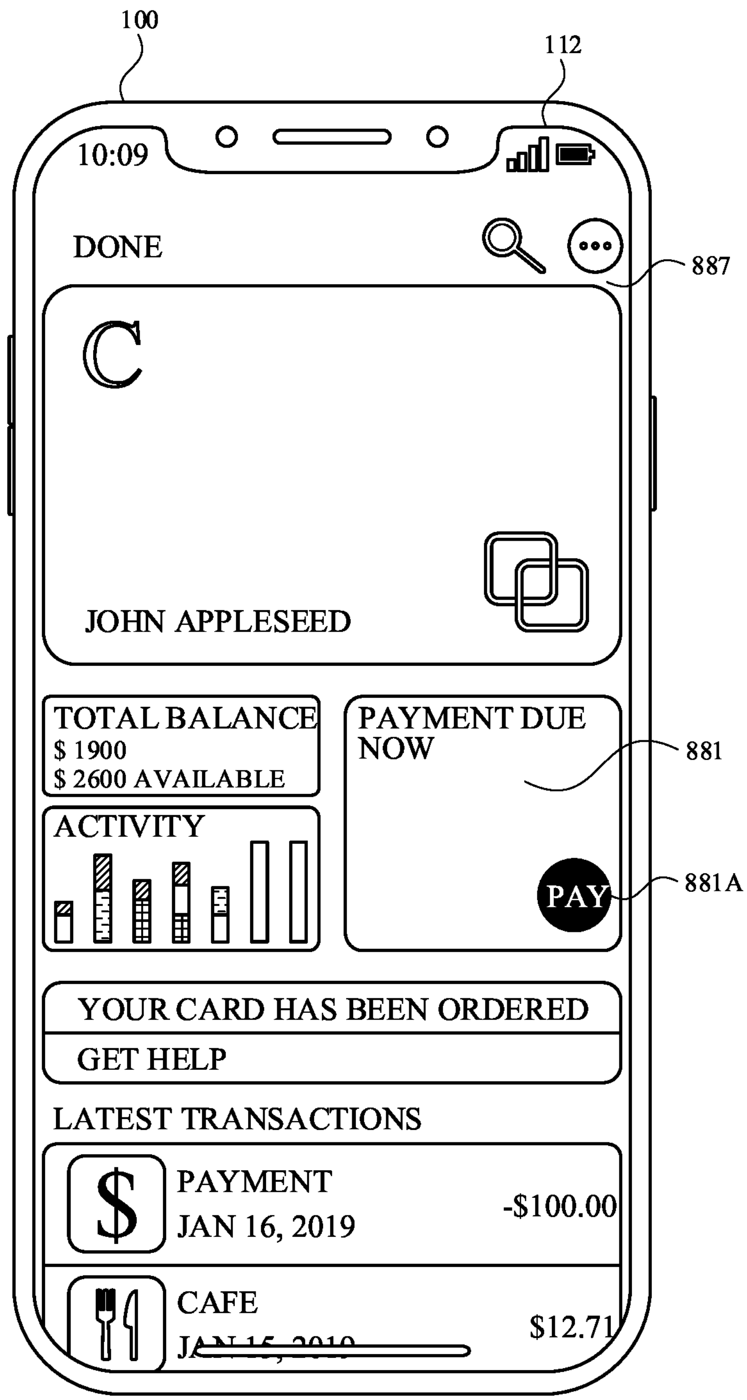

In FIG. 29G, electronic device 100 detects that the balance transfer due at this time (e.g., within an hour, within 30 minutes, within 10 minutes) but that at least a portion of the due balance (e.g., "$1,900") is still remaining (e.g., the full statement balance has not yet been paid) on the transfer account (e.g., the first-party credit account; the points account).

In some embodiments, in accordance with detecting that the balance transfer due at this time (e.g., within an hour, within 30 minutes, within 10 minutes) but that at least a portion of the due balance (e.g., $1,900) is still remaining (e.g., the full statement balance has not yet been paid) on the transfer account, electronic device 100 updates display of balance transfer user interface element 881 to indicate the balance transfer is due at this time (e.g., that the balance payment is due right now (e.g., by stating "Payment Due Now"). In some embodiments, electronic device 100 maintains display of indicator 881A of balance transfer user interface element 881 indicating that the remaining balance transfer (e.g., a balance payment for the remaining statement balance that has not yet been paid) is urgent (e.g., by stating "PAY"). In some embodiments, balance transfer user interface element 881 and/or indicator 881A is still displayed with the second visual characteristic different from the first visual characteristic (e.g., a second background color, such as a black background color). In some embodiments, balance transfer user interface element 881 and/or indicator 881A is displayed with the third visual characteristic different from the second visual characteristic and the first visual characteristic (e.g., a third background color different from a white background color or a black background color).

Figure 29H:
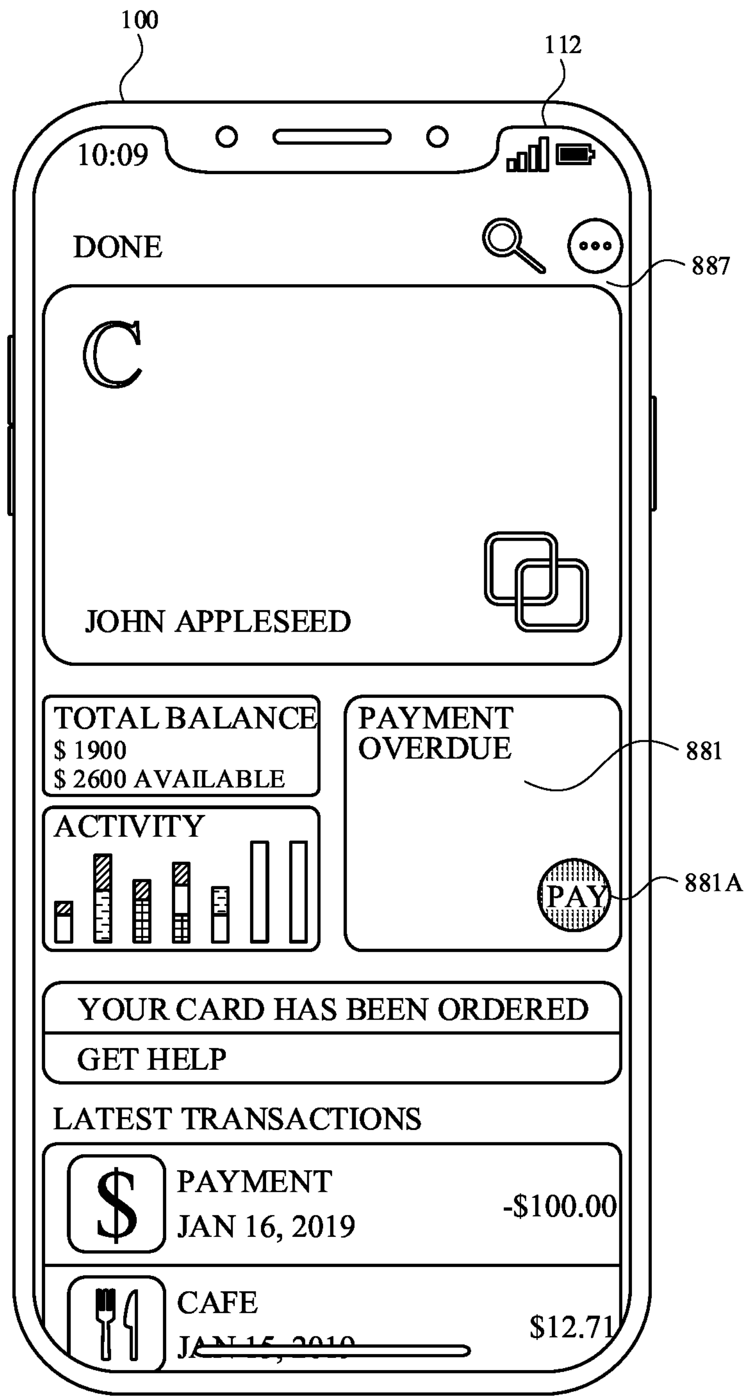

In FIG. 29H, electronic device 100 detects that at least a portion of the balance (e.g., "$1,900") remaining on the transfer account (e.g., the first-party credit account; the points account) is overdue (e.g., the statement balance was not paid in full by the due date).

In some embodiments, in accordance with detecting at least a portion of the balance (e.g., "$1,900") remaining on the transfer account (e.g., the first-party credit account; the points account) is overdue, electronic device 100 updates display of balance transfer user interface element 881 to indicate that a balance transfer for the transfer account is overdue (e.g., that a balance payment on the transfer account has not been made by the statement due date (e.g., by stating "Payment Overdue")). In some embodiments, electronic device 100 maintains display of indicator 881A of balance transfer user interface element 881 indicating that the remaining balance transfer (e.g., a balance payment for the remaining statement balance that has not yet been paid) is urgent (e.g., by stating "PAY"). In some embodiments, electronic device 100 updates display of balance transfer user interface element 881 and/or indicator 881A with a fourth visual characteristic different from the second visual chart eristic and the first visual characteristic (e.g., a fourth background color, such as a red background color).

In some embodiments, electronic device 100 maintains display of balance transfer user interface element 881 and/or indicator 881A of summary user interface 887, as depicted in FIG. 29H, until a balance transfer corresponding to the full remaining balance on the transfer account (e.g., the first-party credit account; the points account) is detected to have been made (e.g., until the full remaining statement balance has been paid).

Figure 29I:
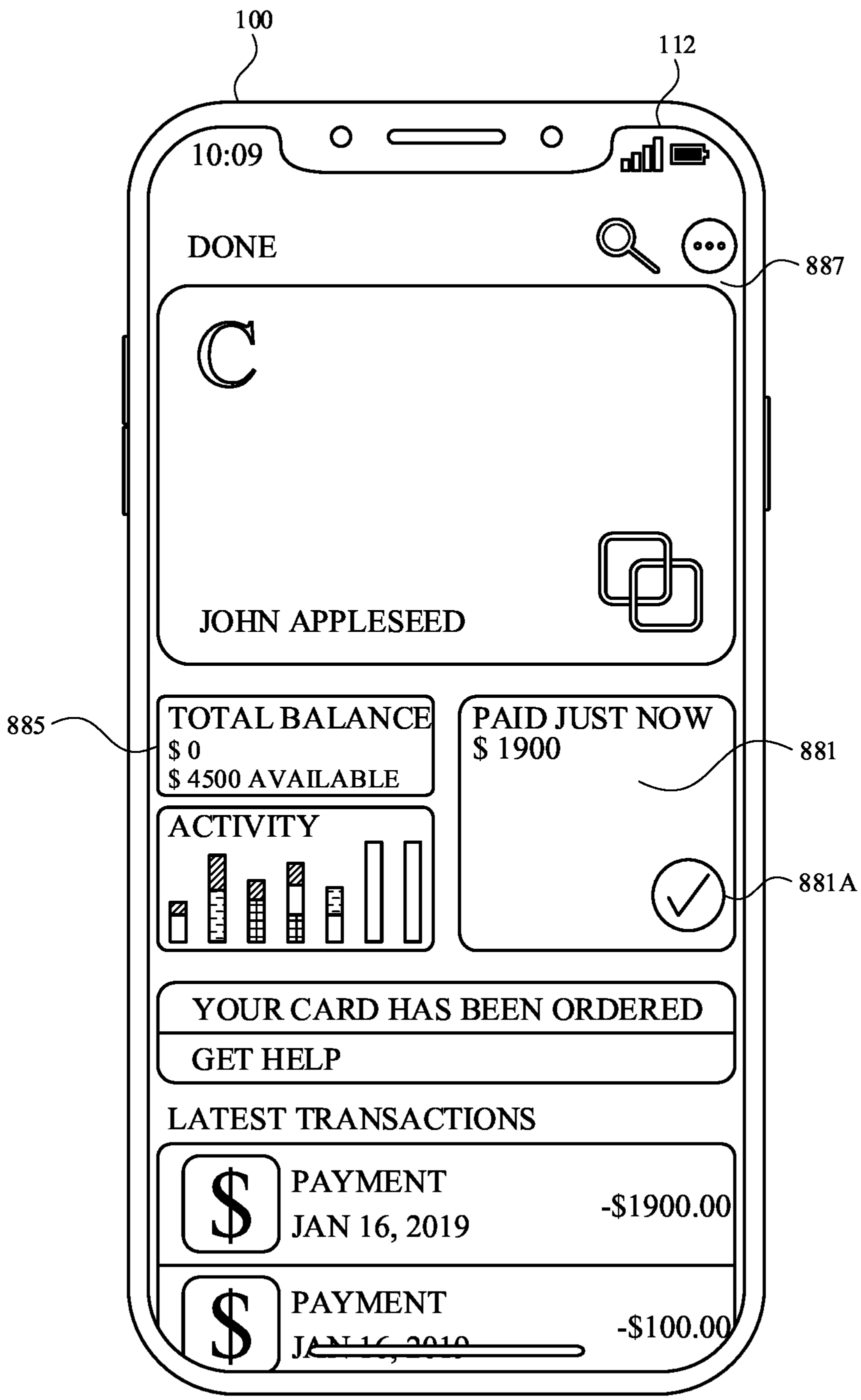

In FIG. 29I, electronic device 100 detects a balance transfer directed to fully reducing the remaining balance of the transfer account (e.g., the first-party credit account; the points account) that was due or overdue (e.g., a balance payment of the remaining overdue balance from the previous statement or a payment of the full current balance).

In some embodiments, in accordance with (or in response to) detecting the balance transfer directed to fully reducing the remaining balance of the transfer account (e.g., the first-party credit account; the points account) that was due or overdue (e.g., a balance payment of the remaining overdue balance from the previous statement or a payment of the full current balance), electronic device 100 updates display of balance indicator user interface element 885 to indicate that an amount was recently paid toward the transfer account and/or that no balance is remaining on the transfer account (or that no balance that is currently due is remaining on the transfer account).

In FIG. 29I, in some embodiments, electronic device 100 updates display of balance transfer user interface element 881 to indicate that a balance transfer (e.g., of $1,900) directed to the transfer account has been made and/or that the remaining balance transfer has been made (e.g., that the remaining balance payment (e.g., $1,900 was paid (e.g., by stating "Paid Just Now $1,900")). In some embodiments, electronic device 100 also updates display of indicator 881A of balance transfer user interface element 881 to indicate (e.g., via a symbol, such as a checkmark) that the balance transfer has been made and/or that a balance transfer is not currently due on the transfer account (e.g., that a balance payment is currently not due). In some embodiments, electronic device 100 updates display of balance transfer user interface element 881 and/or indicator 881A with the first visual characteristic (e.g., the first background color, such as a white background color).

Figure 29J:
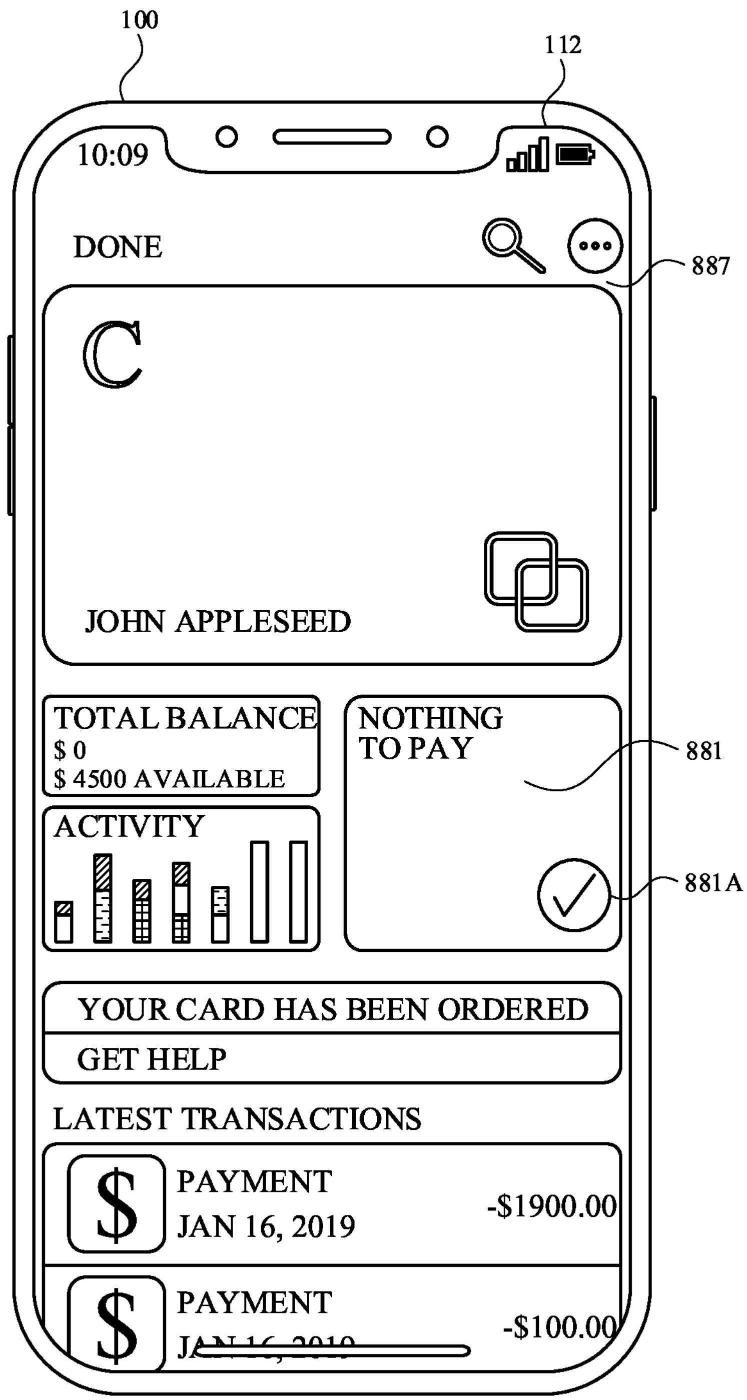

In FIG. 29J, after (e.g., a predetermined amount of time after, such as one hour after, 6 hours after, one day after) updating display of balance transfer user interface element 881 to indicate that the remaining balance transfer has been made (e.g., that the remaining balance payment (e.g., of "$1,900) was received (e.g., by stating "Paid Just Now "$1,900")), electronic device 100 updates display of balance transfer user interface element 881 to indicate that a balance transfer is not due at this time (e.g., that not balance payment is currently due (e.g., by stating "Nothing to Pay")) on the transfer account (e.g., the first-party credit account; the points account). In some embodiments, electronic device 100 maintains display of indicator 881A of balance transfer user interface element 881 indicating (e.g., via a symbol, such as a checkmark) that a balance transfer is not currently due (e.g., that a balance payment is currently not due). In some embodiments, electronic device 100 maintains display of balance transfer user interface element 881 and/or indicator 881A with the first visual characteristic (e.g., the first background color, such as a white background color).

FIGS. 30A-30B are a flow diagram illustrating a method for managing balance transfers, in accordance with some embodiments. Method 3000 is performed at an electronic device (e.g., 100, 300, 500) with a display (e.g., 112). Some operations in method 3000 are, optionally, combined, the orders of some operations are, optionally, changed, and some operations are, optionally, omitted.

As described below, method 3000 provides an intuitive way for managing a transfer account. The method reduces the cognitive burden on a user for managing a transfer account, thereby creating a more efficient human-machine interface. For battery-operated computing devices, enabling a user to manage a transfer account faster and more efficiently conserves power and increases the time between battery charges.

The electronic device (e.g., 100) displays (3002), in a user interface (e.g., 710, 887: a dashboard user interface that is the same as or similar to the user interface described with reference to FIGS. 11A-11O) corresponding to an account (e.g., the transfer account as first described above with reference to FIGS. 8A-8V, such as a payment account, a virtual card account, a points account, a rewards account), a user interface element (e.g., 716, 881; a balance indicator module, a balance payment reminder module) that provides information about account operations of a first type for the account (e.g., if the account is a transfer account, such as a payment account, an operation of the first type is paying at least a portion of a balance of the account).

Displaying the user interface element (e.g., 716, 716A, 881, 881A) includes, in accordance with a determination that an operation of the first type (e.g., a partial or full payment of a balance of the account) is due to be performed within (e.g., a balance payment is due within) a first threshold amount of time (e.g., by a due date, such as a statement due date) and the operation of the first type has not been performed within a second threshold amount of time (e.g., an amount of time that is less than the first threshold amount of time such that a due date has not yet passed; an amount of time that is more than the first threshold amount of time such that the due date has passed), the electronic device (e.g., 100) displaying (3004) the user interface element with a first appearance (e.g., showing a first type of symbol, showing a first type of text, showing a first background color) that indicates the amount of time until the operation of the first type is due. Displaying the user interface element with the first appearance that indicates the amount of time until the operation of the first type is due enables the user to quickly and easily view the due date for the operation of the first type. Providing improved visual feedback to the user enhances the operability of the device and makes the user-device interface more efficient (e.g., by helping the user to provide proper inputs and reducing user mistakes when operating and/or interacting with the device) which, additionally, reduces power usage and improves battery life of the device by enabling the user to use the device more quickly and efficiently.

Displaying the user interface element (e.g., 716, 716A, 881, 881A) includes, in accordance with a determination that the operation of the first type is due to be performed within the first threshold amount of time and the operation of the first type has been performed within the second threshold amount of time, the electronics device (e.g., 100) displaying (3006) the user interface element with a second appearance (e.g., showing a second type of symbol, showing a second type of text, showing a second background color) that includes information about the operation of the first type that has been performed within the second threshold amount of time. Displaying the user interface element with the second appearance that includes information about the operation of the first type that has been performed within the second threshold amount of time enables the user to quickly and easily recognize (and be reminded of) a previous operation of the first type performed for the transfer account. Providing improved visual feedback to the user enhances the operability of the device and makes the user-device interface more efficient (e.g., by helping the user to provide proper inputs and reducing user mistakes when operating and/or interacting with the device) which, additionally, reduces power usage and improves battery life of the device by enabling the user to use the device more quickly and efficiently.

In some embodiments, displaying the user interface element (e.g., 716, 716A, 881, 881A) includes, in accordance with a determination that the operation of the first type is not due to be performed within the first threshold amount of time (e.g., because all of the balance and/or the full statement amount has already been paid, or no transactions using the transfer account have been made during the statement period, and thus there is no balance), the electronic device (e.g., 100) displaying (3008) the user interface element with a third appearance (e.g., showing a third type of symbol, showing a third type of text, showing a third background color) that indicates no operations of the first type are due. Displaying the user interface element with the third appearance that indicates no operations of the first type are due enables the user to quickly and easily recognize that operations of the first type are not due at this time (e.g., for at least a considerable amount of time, such as at least 2 weeks, 3 weeks, or 4 weeks). Providing improved visual feedback to the user enhances the operability of the device and makes the user-device interface more efficient (e.g., by helping the user to provide proper inputs and reducing user mistakes when operating and/or interacting with the device) which, additionally, reduces power usage and improves battery life of the device by enabling the user to use the device more quickly and efficiently.

In some embodiments, the first appearance that indicates the amount of time until the operation of the first type is due includes a visual indicator (e.g., a countdown showing the number of remaining days, hours, minutes, and/or seconds) indicating an amount of time remaining for the first threshold amount of time. Including the visual indicator indicating the amount of time remaining for the first threshold amount of time enables the user to quickly and easily view and recognize that amount of time that is remaining for the operation of the first type. Providing improved visual feedback to the user enhances the operability of the device and makes the user-device interface more efficient (e.g., by helping the user to provide proper inputs and reducing user mistakes when operating and/or interacting with the device) which, additionally, reduces power usage and improves battery life of the device by enabling the user to use the device more quickly and efficiently. In some embodiments, if the first threshold amount of time has passed or expired, the countdown indicator shows a zero or expired value. In some embodiments, if the first threshold amount of time has passed or expired, the countdown indicator is no longer displayed. In some embodiments, as time progresses, the amount of time is updated to reflect the time until the operation of the first type is due.

In some embodiments, in accordance with the determination that the operation of the first type is due to be performed within the first threshold amount of time and the operation of the first type has not been performed within the second threshold amount of time, where the first threshold amount of time is greater than a third threshold amount of time (e.g., an amount of time that is greater than a particular predetermined amount of time, such as greater than 10 days, greater than two weeks, or greater than three weeks), the first appearance includes (3010) an indication that the operation of the first type is not urgent (e.g., is not due for a considerable amount of time, is not due for at least the predetermined amount of time). Including the indication that the that the operation of the first type is not urgent enables the user to quickly and easily recognize that operations of the first type are not due at this time (e.g., for at least a considerable amount of time, such as at least 2 weeks, 3 weeks, or 4 weeks). Providing improved visual feedback to the user enhances the operability of the device and makes the user-device interface more efficient (e.g., by helping the user to provide proper inputs and reducing user mistakes when operating and/or interacting with the device) which, additionally, reduces power usage and improves battery life of the device by enabling the user to use the device more quickly and efficiently. In some embodiments, if the account is a transfer account or a payment account, the electronic device (e.g., 100) indicates that the operation of the first type is not urgently due by indicating (e.g., in 716, in 881; showing "pay early") that an early balance payment can be made at the current time.

In some embodiments, in accordance with the determination that the operation of the first type is due to be performed within the first threshold amount of time and the operation of the first type has not been performed within the second threshold amount of time, where the first threshold amount is less than a third threshold amount of time (e.g., an amount of time that is less than a particular predetermined amount of time, such as less than a week, less than 3 days, less than 24 hours), the first appearance includes (3012) an indication that the operation of the first type is urgent (e.g., it due soon, is due within a short amount of time). Including the indication that the operation of the first type is urgent enables the user to quickly recognize, and thus react to, the urgency for the operation of the first type. Providing improved visual feedback to the user enhances the operability of the device and makes the user-device interface more efficient (e.g., by helping the user to provide proper inputs and reducing user mistakes when operating and/or interacting with the device) which, additionally, reduces power usage and improves battery life of the device by enabling the user to use the device more quickly and efficiently. In some embodiments, if the account is a transfer account or a payment account, the electronic device (e.g., 100) indicates that the operation of the first type is urgently due by indicating (e.g., showing "pay") that a balance payment should be made at the current time or not long after the current time.

In some embodiments, in accordance with the determination that the operation of the first type is due to be performed within the first threshold amount of time and the operation of the first type has been performed within the second threshold amount of time, where, after the operation of the first type has been performed (e.g., a first balance payment has been made), a second operation of the first type is due to be performed within the first threshold amount of time (e.g., because there is still a balance remaining on the account even after a first balance payment, because the first balance payment was less than a statement balance of the account), the second appearance includes (3014) an indication the second operation of the first type (e.g., one or more additional balance payments or points transfers) that is still due to be performed within the first threshold amount of time (e.g., because there is still unpaid balance remaining on the account). Including the indication that the second operation of the first type that is still due to be performed within the first threshold amount of time enables the user to quickly and easily recognize that an operation of the first type is still due for the account. Providing improved visual feedback to the user enhances the operability of the device and makes the user-device interface more efficient (e.g., by helping the user to provide proper inputs and reducing user mistakes when operating and/or interacting with the device) which, additionally, reduces power usage and improves battery life of the device by enabling the user to use the device more quickly and efficiently. In some embodiments, the indication that one or more additional operations of the first type are still due includes indicating that more operations (e.g., more payments, additional points transfers) are due within the first threshold amount of time (e.g., text showing "pay more").

In some embodiments, in accordance with the determination that the operation of the first type is due to be performed within the first threshold amount of time and the operation of the first type has been performed within the second threshold amount of time, where, after the operation of the first type has been performed (e.g., a first balance payment has been made), a second operation of the first type is due to be performed within the first threshold amount of time (e.g., because there is still a balance remaining on the account even after a first balance payment, because the first balance payment was less than a statement balance of the account), the second appearance does not include (3016) (e.g., for a certain period of time after the operation of the first type has been performed) information about the second operation of the first type (e.g., one or more additional balance payments or points transfers) that is still due to be performed (e.g., if the account is a transfer account or a payment account, because there is still balance remaining on the account) within the first threshold amount of time. Not including the information about the second operation of the first type that is still due to be performed within the first threshold amount of time enables the user to quickly and easily recognize that operations of the first type are no longer due. Providing improved visual feedback to the user enhances the operability of the device and makes the user-device interface more efficient (e.g., by helping the user to provide proper inputs and reducing user mistakes when operating and/or interacting with the device) which, additionally, reduces power usage and improves battery life of the device by enabling the user to use the device more quickly and efficiently.

In some embodiments, while displaying the second appearance that does not include (e.g., for a certain period of time after the operation of the first type has been performed) information about the second operation of the first type (e.g., one or more additional balance payments or points transfers) that is still due to be performed (e.g., if the account is a transfer account or a payment account, because there is still balance remaining on the account) within the first threshold amount of time, the electronic device (e.g., 100) detects (3018) (or determines) that a predetermined amount of time has passed. In some embodiments, in response to detecting (or determining) that the predetermined amount of time has passed, the electronic device displays (3020) the second appearance with the information about the second operation of the first type (e.g., one or more additional balance payments or points transfers) that is still due to be performed (e.g., if the account is a transfer account or a payment account, that there is still balance remaining on the account) within the first threshold amount of time. Displaying the second appearance with the information about the second operation of the first type that is still due to be performed within the first threshold amount of time in response to detecting that the predetermined amount of time has passed enables the user to quickly and easily recognize that the an operation of the first type are still due to be performed within the first threshold amount of time. Providing improved visual feedback to the user enhances the operability of the device and makes the user-device interface more efficient (e.g., by helping the user to provide proper inputs and reducing user mistakes when operating and/or interacting with the device) which, additionally, reduces power usage and improves battery life of the device by enabling the user to use the device more quickly and efficiently.

In some embodiments, displaying the user interface element (e.g., 716, 716A, 881, 881A) further includes, in accordance with a determination that recurring operations of the first type are enabled (e.g., in accordance with a determination that recurring automatic payments (e.g., monthly payments) are scheduled) and a recurring operation of the first type is due to be performed within a fourth threshold amount of time (e.g., a scheduled automatic payment date), the electronic device (e.g., 100) displaying the user interface element with a fourth appearance that includes information (e.g., an amount (e.g., payment amount) of the operation, a date at which the operation will be automatically performed) about the recurring operation of the first type.

In some embodiments, in accordance with the determination that recurring operations of the first type are enabled and the recurring operation of the first type is due to be performed within the fourth threshold amount of time, in accordance with a determination that an amount corresponding to the recurring operation of the first type is less than a total amount for operations of the first type due within the first threshold amount of time (e.g., if the scheduled automatic payment is less than a current statement balance or remaining balance during the current statement period), the fourth appearance further includes an indication (e.g., stating "pay more") that one or more additional operations of the first type are due within the first threshold amount of time. Including the indication that one or more additional operations of the first type are due within the first threshold amount of time in accordance with the determination that an amount corresponding to the recurring operation of the first type is less than a total amount for operations of the first type due within the first threshold amount of time enables the user to quickly and easily recognize that further action is still required (e.g., one or more additional operations of the first type) on the balance of the transfer account. Providing improved visual feedback to the user enhances the operability of the device and makes the user-device interface more efficient (e.g., by helping the user to provide proper inputs and reducing user mistakes when operating and/or interacting with the device) which, additionally, reduces power usage and improves battery life of the device by enabling the user to use the device more quickly and efficiently.

In some embodiments, displaying the user interface element (e.g., 716, 716A, 881, 881A) with the second appearance includes the electronic device (e.g., 100) changes display of the user interface element from the first appearance to the second appearance, where changing display of the user interface element from the first appearance to the second appearance includes changing a visual characteristic (e.g., a background color) of the user interface element. That is, in some embodiments, displaying the user interface element with the first appearance includes the electronic device displaying the user interface element with a first visual characteristic (e.g., a first background color) and displaying the user interface element with the second appearance includes displaying the user interface element with a second visual characteristic (e.g., a second background color) different from the first visual characteristic. Changing display of the user interface element from the first appearance to the second appearance, where changing display of the user interface element from the first appearance to the second appearance includes changing a visual characteristic of the user interface element visually emphasizes that an action has been taken with respect to the account corresponding to the user interface element and/or a state (e.g., whether a due date is upcoming or has passed) has changed with respect to the account. Providing improved visual feedback to the user enhances the operability of the device and makes the user-device interface more efficient (e.g., by helping the user to provide proper inputs and reducing user mistakes when operating and/or interacting with the device) which, additionally, reduces power usage and improves battery life of the device by enabling the user to use the device more quickly and efficiently. In some embodiments, in response to determining that the operation of the first type has been performed within the second threshold amount of time, the electronic device changes display of the user interface element from the first appearance to the second appearance, where the change includes changing the visual characteristic of the user interface element from the first visual characteristic to the second visual characteristic.

In some embodiments, while displaying the user interface element (e.g., 716, 716A, 881, 881A) (e.g., whether in the first appearance or in the second appearance), the electronic device (e.g., 100) detects (3022) a selection of the user interface element (e.g., selection of an affordance within the user interface element). In some embodiments, in response to detecting the selection of the user interface element, the electronic device displays (3024), on the display (e.g., 112), a selection user interface (e.g., 1902, 1142) for selecting an amount (e.g., a balance payment amount) for the operation of the first type (e.g., the selection user interface described in greater detail above with reference to FIGS. 20A-20AF). Displaying the selection user interface in response to detecting the selection of the user interface element enables the user to quickly and easily initiate a process for performing a balance transfer for the account. Reducing the number of inputs needed to perform an operation enhances the operability of the device and makes the user-device interface more efficient (e.g., by helping the user to provide proper inputs and reducing user mistakes when operating and/or interacting with the device) which, additionally, reduces power usage and improves battery life of the device by enabling the user to use the device more quickly and efficiently. In some embodiments, while displaying the selection user interface, the electronic device detects (3026) user input directed to a first amount of a plurality of proposed amounts (e.g., 1906A-1906E, 1148A-1148E). In some embodiments, subsequent to (or in response to) detecting the user input directed to the first amount, the electronic device initiates (3028) the operation of the first type (e.g., after going through an authentication process, as described in greater detail above with reference to FIGS. 20I-20N) in the first amount (e.g., a balance payment of the first amount).

In some embodiments, the account corresponds to a computer storage account. In some embodiments, using the account includes requesting storage of data onto available computer storage resources (e.g., an available MB or GB amount of computer resources) associated with the computer storage account.

In some embodiments, the operation of the first type corresponds to deleting at least a portion of the data that is stored onto the available computer storage resources associated with the computer storage account.

In some embodiments, the account corresponds to a financial account. In some embodiments, using the account includes making purchases based on financial resources (e.g., credit or money) associated with the financial account.

In some embodiments, the operation of the first type corresponds to deleting at least a portion of the data that is stored onto the available computer storage resources associated with the computer storage account.

Note that details of the processes described above with respect to method 3000 (e.g., FIGS. 30A-30B) are also applicable in an analogous manner to the methods described above. For example, method 900 optionally includes one or more of the characteristics of the various methods described above with reference to method 3000. For example, the user interface element described in method 3000 can be used to reduce a balance of the transfer account activated in method 900. For another example, method 1200 optionally includes one or more of the characteristics of the various methods described above with reference to method 3000. For example, the summary user interface described in method 1200 can include display of the user interface element described in method 3000. For another example, method 1500 optionally includes one or more of the characteristics of the various methods described above with reference to method 3000. For example, a visual effect and/or feedback on a representation of the transfer account as described in method 1500 can be provided in response to a transfer initiated from the user interface element described in method 3000. For another example, method 1800 optionally includes one or more of the characteristics of the various methods described above with reference to method 3000. For example, the balance amount from transfers made at a common place corresponding to the place summary user interface described in method 1800 can be reduced through the user interface element described in method 3000. For another example, method 2100 optionally includes one or more of the characteristics of the various methods described above with reference to method 3000. For example, selection of the user interface element described in method 3000 can cause display of the balance transfer user interface described in method 2100. For another example, method 2400 optionally includes one or more of the characteristics of the various methods described above with reference to method 3000. For example, transfers made using the authentication credential described in method 2400 can be included in the balance amount about which balance transfer information is provided in the user interface element described in method 3000. For another example, method 900 optionally includes one or more of the characteristics of the various methods described above with reference to method 3000. For example, transfers made using the physical account object activated in method 2700 can be included in the balance amount about which balance transfer information is provided in the user interface element described in method 3000. For brevity, these details are not repeated below.

FIGS. 31A-31F illustrate exemplary user interfaces for initiating activation of a transfer account (e.g., the first-party credit account; the points account) based on a purchase of an item, in accordance with some embodiments.

Figure 31A:
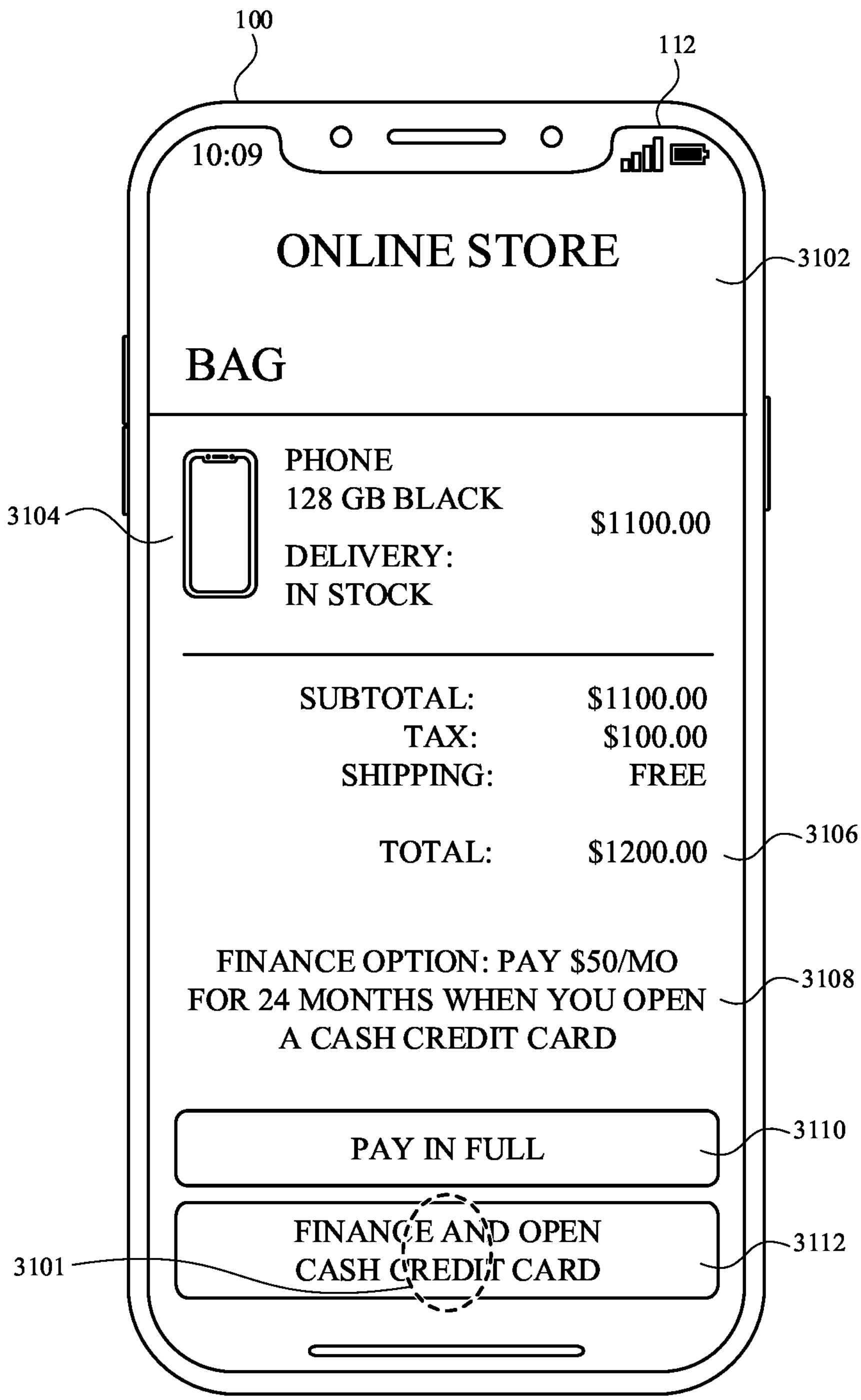
FIGS. 31A-31F illustrate exemplary user interfaces for initiating activation of a transfer account based on a purchase of an item, in accordance with some embodiments.

FIG. 31A illustrates electronic device 100 displaying, on display 112, an item purchase user interface 3102 for initiating a purchase (e.g., an online purchase) of one or more items (e.g., a consumer item, such as a smartphone, a computer, a television). In some embodiments, item purchase user interface 3102 includes an indication 3104 of the one or more items (in this example, a smartphone) to be purchased. In some embodiments, item purchase user interface 3102 includes an indication 3106 of a purchase price of the one or more items (in this example, the price of the smartphone). In some embodiments, item purchase user interface includes information 3108 about an available installment plan that can be used towards the purchase of the one or more items (in this example, the price of the smartphone). In some embodiments, the installment plan is only available upon activating and using the transfer account (e.g., the first-party credit account; the points account).

In some embodiments, item purchase user interface 3102 includes an affordance 3110 which, when activated, initiates a process for purchasing the one or more items via a transfer (e.g., payment) of the full price of the item. In some embodiments, item purchase user interface 3102 includes an affordance 3112 which, when activated, initiates a process for purchasing the one or more items based on an installment plan using a transfer account (e.g., a first-party credit account; a points account), where the transfer account is not yet activated and thus not yet enabled to authorize transfers. In FIG. 31A, while displaying item purchase user interface 3102 with an item (in this example, a smartphone) selected for purchase, electronic device 100 detects a user activation 3101 (e.g., a tap input) of affordance 3112.

Figure 31B:
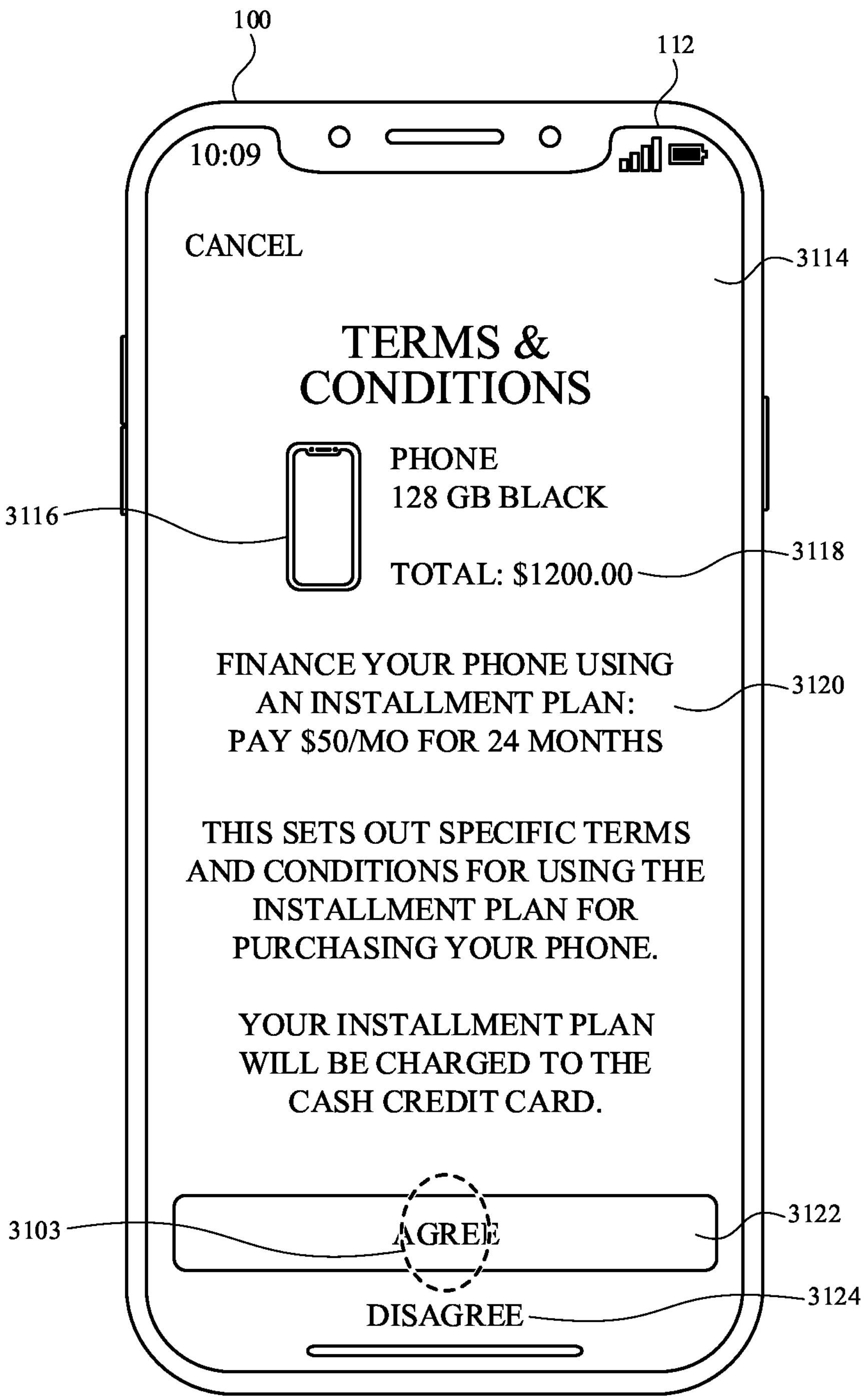

In FIG. 31B, in response to detecting user activation 3101, electronic device 100 displays, on display 112, a terms and conditions user interface 3114. In some embodiments, terms and conditions user interface 3114 includes an indication 3116 of the item (in this example, a smartphone) that is being purchased. In some embodiments, terms and conditions user interface 3114 includes an indication 3118 of the price of the item (in this example, $1,200) being purchased. In some embodiments, terms and conditions user interface 3114 includes information 3120 about the installment plan that can be used to purchase the item.

In some embodiments, terms and conditions user interface 3114 includes an accept affordance 3122 for accepting the terms and conditions of the installment plan and proceeding with purchasing the item (in this example, a smartphone) using the installment plan. In some embodiments, terms and conditions user interface 3114 includes a decline affordance 3124 for forgoing purchasing the item using the installment plan. In FIG. 31B, while displaying terms and conditions user interface 3114, electronic device 100 detects a user activation 3103 (e.g., a tap input) of accept affordance 3122.

Figure 31C:
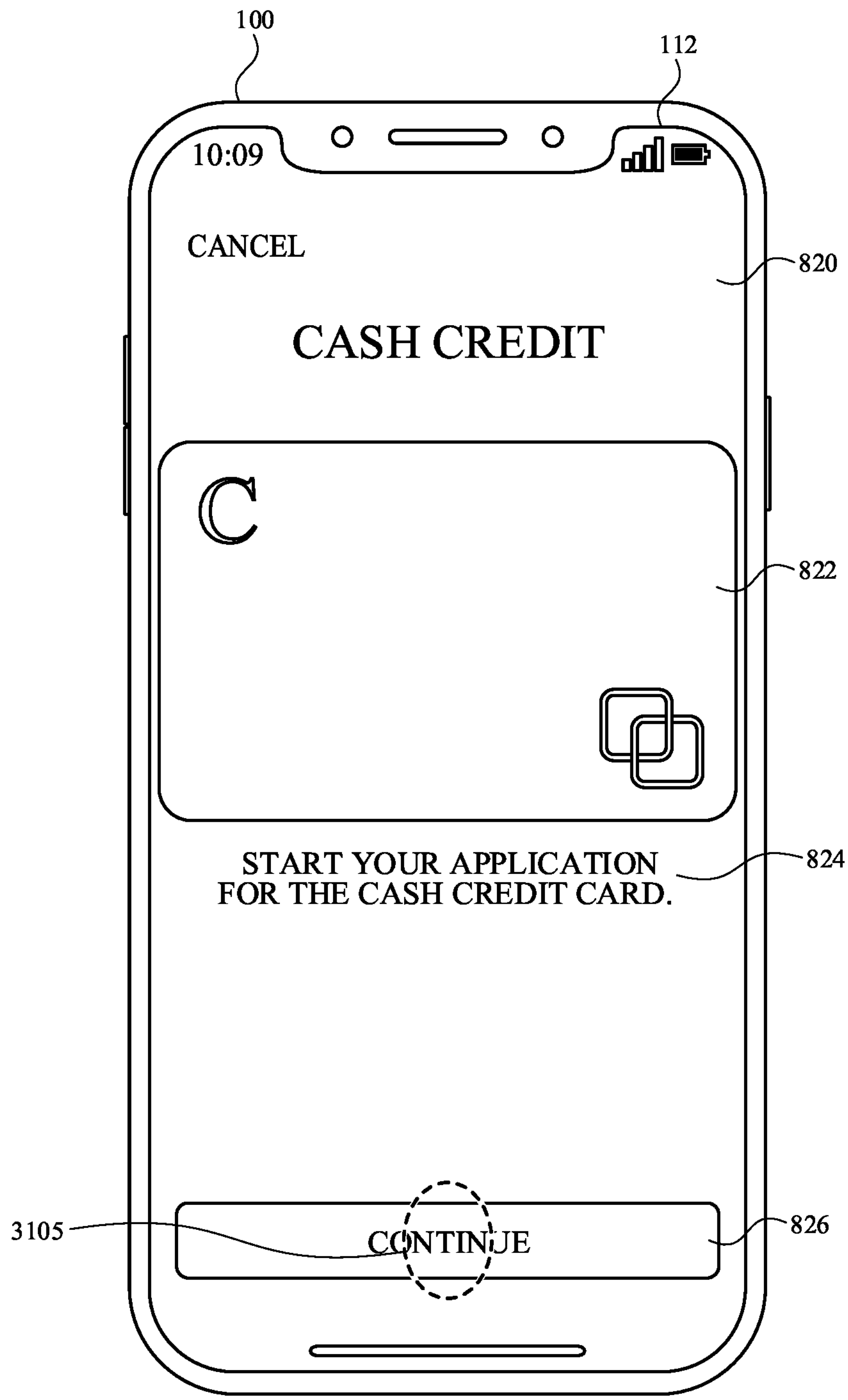

In FIG. 31C, in response to detecting user activation 3103 of accept affordance 3122, electronic device 100 initiates a process for activating the transfer account (e.g., the first-party credit account; the points account). In some embodiments, initiating the process for activating the transfer account (e.g., the first-party credit account; the points account) includes displaying, on display 112, first application user interface 820, as first described above with reference to FIG. 8C. As discussed, in some embodiments, first application user interface 820 includes preview representation 822 of the transfer account (e.g., illustrating what the transfer account would look like on the device once/if it is issued), introductory text 824 indicating that the user can proceed with applying for the transfer account (e.g., the first-party credit account; the points account), and an affordance 826 for proceeding with the application for the transfer account (e.g., the first-party credit account; the points account). In response to detecting user activation 3105 of affordance 826, electronic device 100 proceeds with the process for activating the transfer account (e.g., the first-party credit account; the points account), as described above with reference to FIGS. 8C-8Q.

Figure 31D:
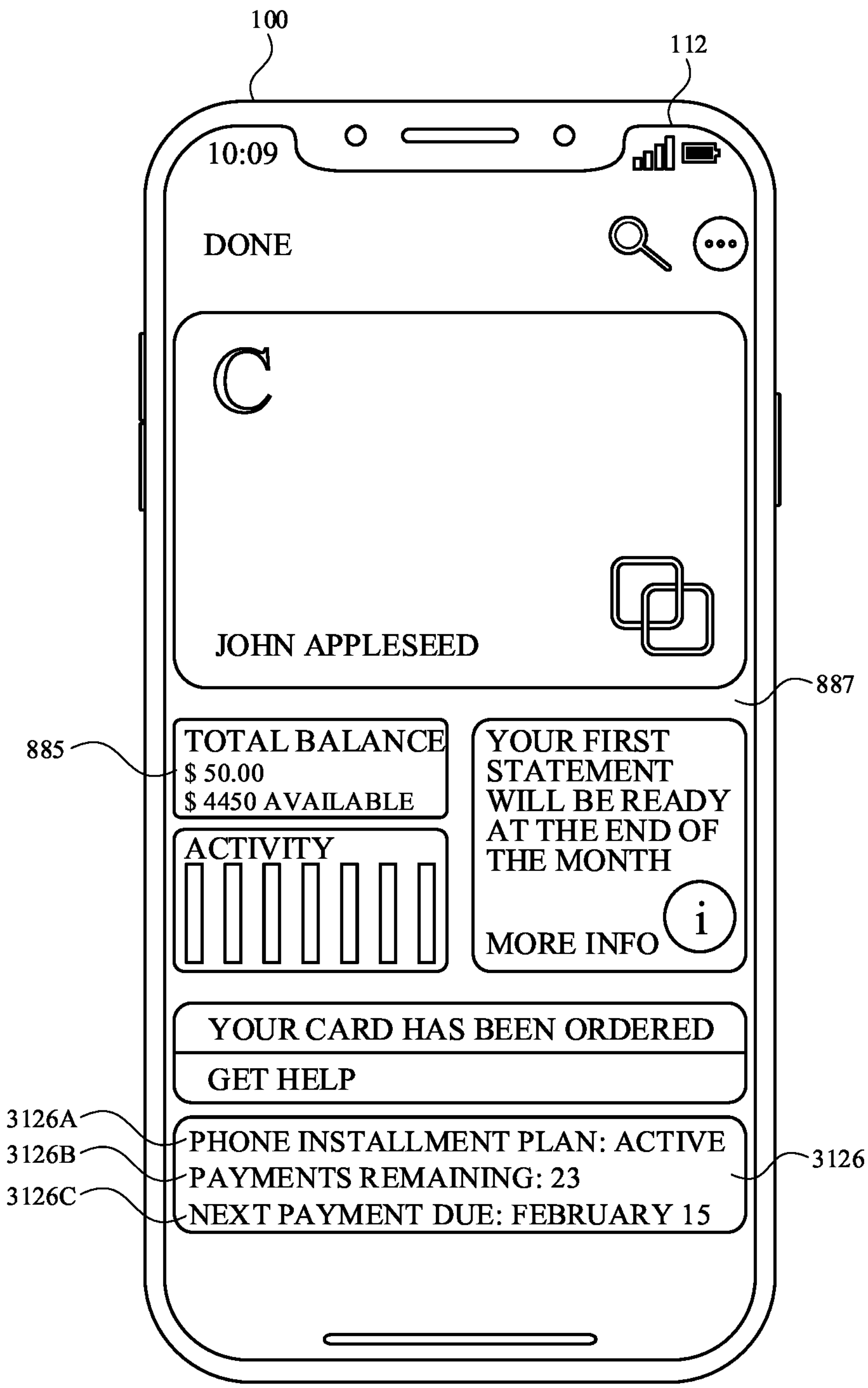

FIG. 31D illustrates electronic device 100 displaying, on display 112, summary user interface 887 of the transfer account (e.g., the first-party credit account; the points account), as first described above with reference to FIG. 8R, upon activating the transfer account through the item purchase process initiated in FIG. 31A.

As discussed, summary user interface 887 of the transfer account (e.g., the first-party credit account; the points account) includes balance indicator user interface element 885 (e.g., the balance module) that shows a current balance of the transfer account (e.g., the first-party credit account; the points account) accumulated as a result of transfers (e.g., payment transactions, points transfers) made using the transfer account, and/or a limit (e.g., a credit limit) set for the transfer account. In FIG. 31D, upon displaying summary user interface 887, electronic device 100 displays, in balance indicator user interface element 885, the current balance of the transfer account (e.g., the first-party credit account; the points account) to include the first installment transfer (e.g., a first installment payment—in this example, $50) for the installment plan. In some embodiments, the first installment transfer (e.g., the first installment payment) for the installment is automatically initiated (e.g., is automatically paid) upon activation of the transfer account (e.g., the first-party credit account; the points account).

In some embodiments, further upon displaying summary user interface 887, electronic device 100 displays, in summary user interface 887, an installment notification 3126 corresponding to the installment plan for the item (in this example, a smartphone) that was initiated in FIG. 31A. In some embodiments, installment notification 3126 includes an indication 3126A of the item (e.g., the smartphone) corresponding to the respective installment plan (e.g., and also indicates whether the installment plan is active). In some embodiments, installment notification 3126 includes an indication 3126B of the number of installment transfers (e.g., installment payments) that are remaining for the respective installment plan. In some embodiments, installment notification 3126 includes an indication 3126C of a due date for the next installment transfer (e.g., the next installment payment) for the respective installment plan.

In some embodiments, in accordance with a determination that the transfer account (e.g., the first-party credit account; the points account) is being used for one or more additional installment plans (e.g., for purchases of other items) that are active, electronic device 100 further displays, in summary user interface 887, respective installment notifications for the one or more additional installment plans.

Figure 31E:
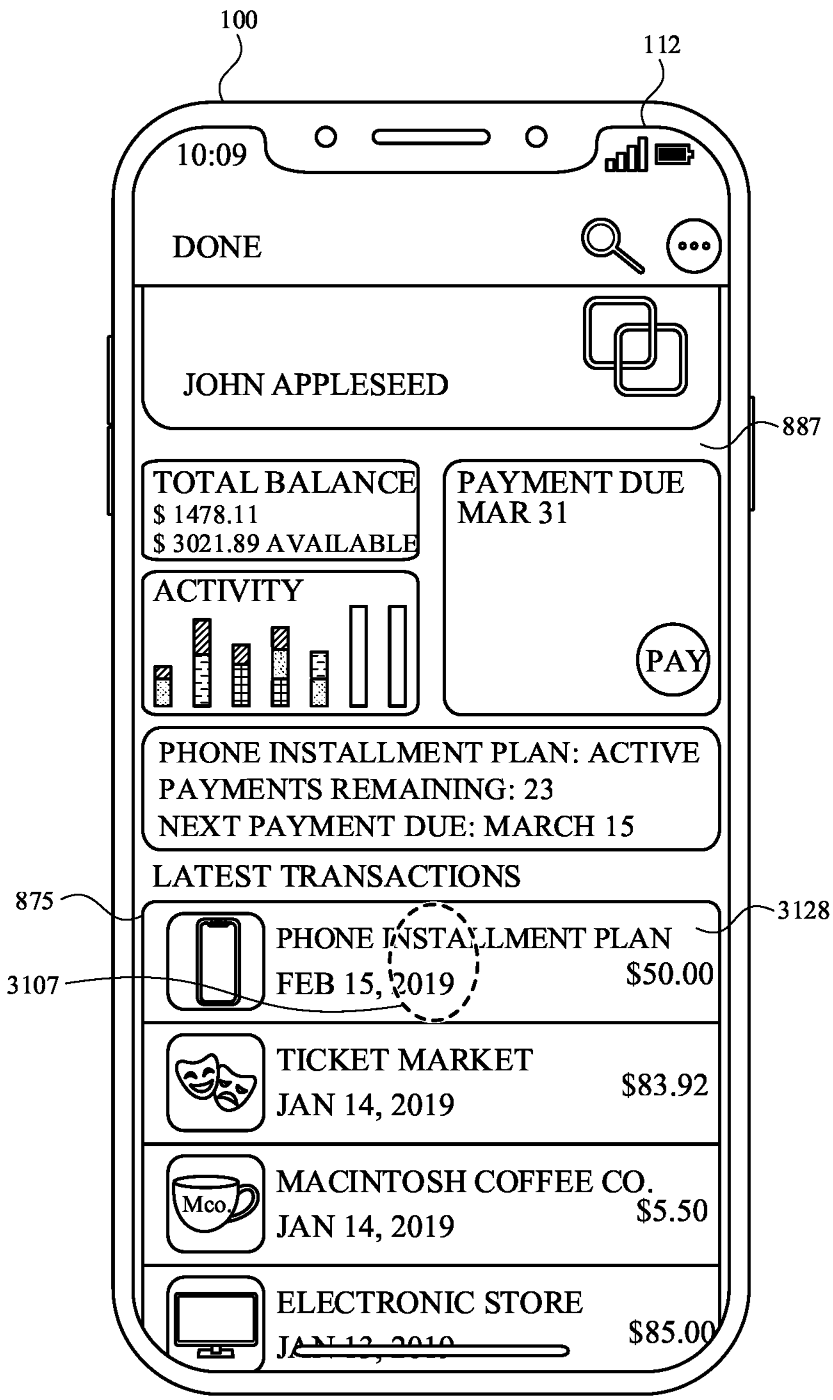

FIG. 31E illustrates electronic device 100 displaying, on display 112, summary user interface 887 of the transfer account (e.g., the first-party credit account; the points account) after a certain amount of time has passed and a plurality of transfers (e.g., payment transactions) have been made using the transfer account. As discussed, in some embodiments, summary user interface 887 includes transfer items list 875 (e.g., a transactions items list) of single transfer items (e.g., single transaction items) and/or group transfer items (e.g., group transaction items) corresponding to plurality of transfers (e.g., payment transactions) made using the transfer account (e.g., the first-party credit account; the points account).

In FIG. 31E, the second installment transfer (e.g., the second installment payment) for the installment plan corresponding to the item (in this example, a smartphone) purchased in FIG. 31A has been made. In response to detecting that the second installment transfer (e.g., the second installment payment) has been successfully completed or in accordance with a determination that the second installment transfer (e.g., the second installment payment) has been successfully completed, electronic device 100 displays, in transfer items list 875, an installment item 3128 corresponding to the second installment transfer (e.g., the second installment payment). In some embodiments, installment item 3128 includes an indication of the date of the respective installment transfer (e.g., the date at which the respective installment payment was made) and an indication of the amount of the respective installment transfers (e.g., the amount of the respective installment payment). In FIG. 31E, while displaying installment item 3128 in transfer items list 875, electronic device 100 detects a user activation 3107 (e.g., a tap input) of installment item 3128.

Figure 31F:
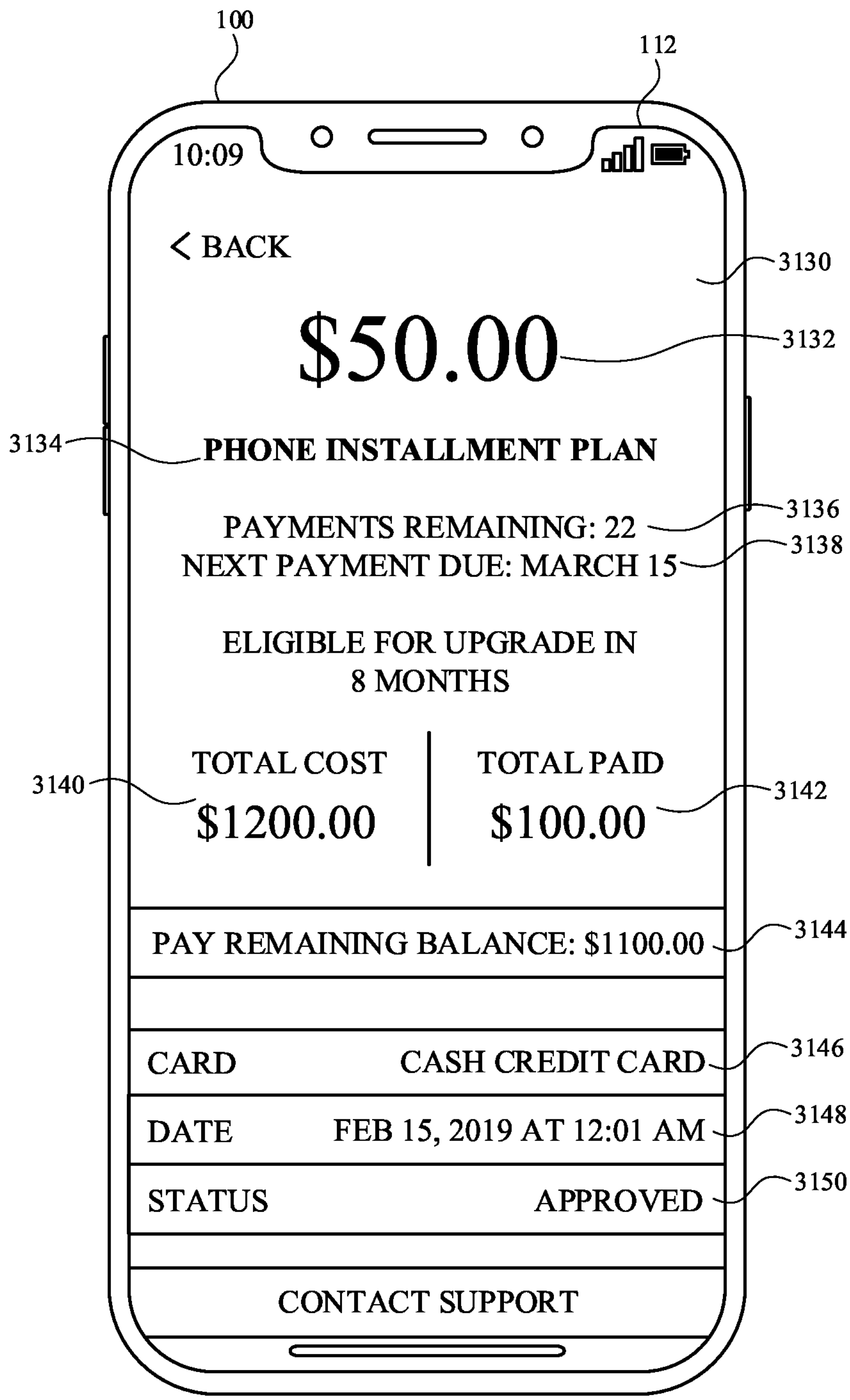

In FIG. 31F, in response to detecting user activation 3107 of installment item 3128, electronic device 100 displays, on display 112, an installment detail user interface 3130 corresponding to the respective installment transfers (e.g., the second installment transfer of the respective installment plan) of installment item 3128.

In some embodiments, installment detail user interface 3130 includes an indication 3132 of the amount (e.g., payment amount) of the respective installment transfer (e.g., the respective installment payment). In some embodiments, installment detail user interface 3130 includes an indication 3134 of the purchased item (in this example, a smartphone) corresponding to the respective installment plan. In some embodiments, installment detail user interface 3130 includes an indication 3136 of the number of installment transfers (e.g., the number of installment payments) remaining in the respective installment plan. In some embodiments, installment detail user interface 3130 includes an indication 3138 of the due date for the next installment transfer (e.g., the due date for the next installment payment) of the respective installment plan. In some embodiments, installment detail user interface 3130 includes an indication 3140 of the total amount (e.g., corresponding to the total purchase price of the respective item of the installment plan) of the respective installment plan. In some embodiments, installment detail user interface 3130 includes an indication 3142 of the total transfer amount that has been made to date (e.g., the amount that has thus far been paid) for the respective installment plan.

In some embodiments, installment detail user interface 3130 includes a selectable indication 3144 indicating the total remaining amount for the respective installment plan (e.g., the remaining balance of the installment plan). In some embodiments, in response to detecting a user activation (e.g., a tap input) of selectable indication 3144, electronic device 100 initiates a process for making a transfer for (e.g., making a payment for) the full remaining amount of the respective installment plan (e.g., the full remaining balance of the installment plan). In some embodiments, the transfer account (e.g., the first-party credit account: the points account) is the default account for making the transfer for (e.g., making the payment for) the full remaining amount of the respective installment plan (e.g., the full remaining balance of the installment plan).

In some embodiments, installment detail user interface 3130 includes an indication 3146 of the transfer account (e.g., the first-party credit account; the points account) that is being used for transfers towards (e.g., to make payments towards) the respective installment plan. In some embodiments, installment detail user interface 3130 includes an indication 3148 of the time stamp of the respective installment transfers (e.g., the respective installment payment). In some embodiments, installment detail user interface 3130 includes an indication 3150 of a status of the respective installment plan (e.g., whether the installment is active or inactive).

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to provide usage information about and provide easier management of a transfer account. The present disclosure contemplates that in some instances, this gathered data may include personal information data that uniquely identifies or can be used to contact or locate a specific person. Such personal information data can include demographic data, location-based data, telephone numbers, email addresses, home addresses, data or records relating to a user's health or level of fitness (e.g., vital signs measurements, medication information, exercise information), date of birth, or any other identifying or personal information.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, when providing proposed transfer amounts for a balance transfer, the present technology can be configured to allow users to select to "opt in" or "opt out" of participation in the collection of personal information data that may be used to determine the recommended amounts. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, recommended or suggested balance transfer amounts can be provided to users by inferring preferences based on non-personal information data or a bare minimum amount of personal information, such as the basic information required to activate an account that can be used to authorize transfers, such as payment transactions.

What is claimed is:

1. An electronic device, comprising:
a display;
one or more processors; and
memory storing one or more programs configured to be executed by the one or more processors, the one or more programs including instructions for:
displaying, on the display; a first user interface corresponding to a user account associated with a use quota, wherein the first user interface includes:
a first user interface element that includes a first graphical representation of a plurality of past uses of the user account, and
a second user interface element that includes information related to restoring at least a portion of the use quota of the user account;
while displaying the first user interface, detecting a user input; and
in response to detecting the user input:
in accordance with a determination that the user input is directed to the first user interface element, displaying, on the display, a second user interface that includes:
a first group item that includes information summarizing a plurality of past uses of the user account related to a first category, and
a second group item that includes information summarizing a plurality of past uses of the user account related to a second category that is different from the first category; and
in accordance with a determination that the user input is directed to the second user interface element, displaying, on the display, a third user interface that includes:
an option to restore the portion of the use quota of the user account.

2. The electronic device of claim 1, wherein:
the user account corresponds to a computer storage account,
the use quota associated with the user account correspond to computer storage accessible via the computer storage account; and
using the user account comprises storing data onto available computer storage of the computer storage account.

3. The electronic device of claim 2, wherein restoring at least a portion of the use quota comprises deleting data stored onto a portion of the computer storage of the computer storage account.

4. The electronic device of claim 1, wherein:
the user account corresponds to a credit account,
the use quota associated with the user account correspond to a credit limit for the credit account, and
using the user account comprises making purchases using the credit account.

5. The electronic device of claim 4, wherein restoring at least a portion of the use quota comprises paying at least a portion of a balance of the credit account.

6. The electronic device of claim 1, wherein:
the user account associated with a use quota is a transfer account associated with making transfers;
the plurality of past uses of the user account comprises a plurality of past transfers made using the transfer account;
the information related to restoring at least a portion of the use quota of the user account comprises information related to reducing a balance of the transfer account;
the information summarizing the plurality of past uses of the user account related to the first category comprises information summarizing a plurality of past transfers of a first category;
the information summarizing the plurality of past uses of the user account related to the second category that is different from the first category comprises information summarizing a plurality of past transfers of a second category that is different from the plurality of past transfers of the first category; and
the option to restore the portion of the use quota of the user account comprises an option to reduce the balance of the transfer account.

7. The electronic device of claim 6, wherein the second user interface further includes:
information indicating a remaining balance of the transfer account, and
a second graphical representation of the plurality of past transfers made using the transfer account, the second graphical representation corresponding to the first graphical representation of the plurality of past transfers displayed in the first user interface element.

8. The electronic device of claim 6, the one or more programs further including instructions for:
while displaying the second user interface, displaying, in a region on the display, an affordance for proceeding with a transfer for reducing a remaining balance of the transfer account; and
in response to detecting a user activation of the affordance for proceeding with the transfer for reducing a remaining balance of the transfer account, displaying, on the display, a user interface that includes a plurality of indicators corresponding to proposed balance reduction amounts.

9. The electronic device of claim 6, wherein the first graphical representation of the plurality of past transfers corresponds to a bar graph arranged based on time, and wherein the bar graph includes:
a first color indicating a first type of transfer of the plurality of past transfers, and
a second color different from the first color indicating a second type of transfer of the plurality of past transfers.

10. The electronic device of claim 9, wherein:
in accordance with a determination that a first bar of the bar graph corresponding to a first time period includes a corresponding past transfer, the first bar is displayed having a respective color of the respective past transfer; and
in accordance with a determination that the first bar of the bar graph does not include a corresponding past transfer, the first bar is displayed having a third color that does not correspond to any type of transfer.

11. The electronic device of claim 6, the one or more programs further including instructions for:
displaying, in the first user interface, an indication of an available transfer limit amount of the transfer account.

12. The electronic device of claim 6, the one or more programs further including instructions for:
subsequent to detecting a transfer corresponding to a balance reduction of the transfer account, displaying, in the second user interface element, an indication of a date that the transfer corresponding to the balance reduction of the transfer account was made.

13. The electronic device of claim 6, the one or more programs further including instructions for:

subsequent to detecting a transfer corresponding to a balance reduction of the transfer account, in accordance with a determination that a balance is remaining on the transfer account, displaying, in the second user interface element, an indication of an amount of the balance that is remaining on the transfer account.

14. The electronic device of claim 6, the one or more programs further including instructions for:

prior to detecting a transfer corresponding to a balance reduction of the transfer account, displaying, in the second user interface element, an indication of a date corresponding to a balance reduction due date and an indication of an amount corresponding to a balance reduction amount that is due by the balance reduction due date.

15. The electronic device of claim 6, the one or more programs further including instructions for:

while displaying the first user interface, in accordance with a determination that an interest is being accrued on the transfer account:

displaying, in the second user interface element, an alert indicating that the interest is being accrued on the transfer account.

16. The electronic device of claim 6, the one or more programs further including instructions for:

while displaying the first user interface, displaying, in the first user interface, a third user interface element; and while displaying the third user interface element, displaying, in the third user interface element, a notification including information related to the transfer account, wherein the notification is periodically updated to display different types of information related to the transfer account.

17. The electronic device of claim 16, the one or more programs further including instructions for:

while displaying the third user interface element, displaying, in the third user interface element, instructions for initiating a process to order a physical account object corresponding to the transfer account that can be used as part of an authentication process to authorize transfers using the transfer account.

18. The electronic device of claim 6, the one or more programs further including instructions for:

while displaying the first user interface, displaying, in the first user interface, a list of transfer items corresponding to past transfers made using the transfer account, wherein the transfer items are arranged in chronological order based on a time of the corresponding past transfers.

19. The electronic device of claim 6, the one or more programs further including instructions for:

while displaying the first user interface, detecting a user activation of a search function;

in response to detecting the user activation of the search function, displaying, on the display, a search bar; value and while displaying the search bar, receiving a user input directed to the search bar that includes a past event; and in response to receiving the user input directed to the search bar that includes the past event, displaying, on the display, one or more categories of respective transfers, wherein the respective transfers correspond to the past event.

20. A non-transitory computer-readable storage medium storing one or more programs configured to be executed by one or more processors of an electronic device with a display, the one or more programs including instructions for:

displaying, on the display, a first user interface corresponding to a user account associated with a use quota, wherein the first user interface includes:

a first user interface element that includes a first graphical representation of a plurality of past uses of the user account, and a second user interface element that includes information related to restoring at least a portion of the use quota of the user account;

while displaying the first user interface, detecting a user input; and in response to detecting the user input:

in accordance with a determination that the user input is directed to the first user interface element, displaying, on the display, a second user interface that includes:

a first group item that includes information summarizing a plurality of past uses of the user account related to a first category, and a second group item that includes information summarizing a plurality of past uses of the user account related to a second category that is different from the first category; and in accordance with a determination that the user input is directed to the second user interface element, displaying, on the display, a third user interface that includes:

an option to restore the portion of the use quota of the user account.

21. The non-transitory computer-readable storage medium of claim 20, wherein:

the user account corresponds to a computer storage account, the use quota associated with the user account correspond to computer storage accessible via the computer storage account, and using the user account comprises storing data onto available computer storage of the computer storage account.

22. The non-transitory computer-readable storage medium of claim 21, wherein restoring at least a portion of the use quota comprises deleting data stored onto a portion. of the computer storage of the computer storage account.

23. The non-transitory computer-readable storage medium of claim 20, Wherein:

the user account corresponds to a credit account, the use quota associated with the user account correspond to a credit limit for the credit account, and using the user account comprises making purchases using the credit account.

24. The non-transitory computer-readable storage medium of claim 23, wherein restoring at least a portion of the use quota comprises paying at least a portion of a balance of the credit account.

25. The non-transitory computer-readable storage medium of claim 20, wherein:

the user account associated with a use quota is a transfer account associated with making transfers;

the plurality of past uses of the user account comprises a plurality of past transfers made using the transfer account;

the information related to restoring at least a portion of the use quota of the user account comprises information related to reducing a balance of the transfer account;

the information summarizing the plurality of past uses of the user account related to the first category comprises information summarizing a plurality of past transfers of a first category the information summarizing the plurality ofpast uses of the user account related to the second category that is different from the first category comprises information summarizing a plurality of past transfers of a second category that is different from the plurality of past transfers of the first category; and the option to restore the portion of the use quota of the user account comprises an option to reduce the balance of the transfer account.

26. The non-transitory computer-readable storage medium of claim 25, wherein the second user interface further includes:

information indicating a remaining balance of the transfer account, and a second graphical representation of the plurality of past transfers made using the transfer account, the second graphical representation corresponding to the first graphical representation of the plurality of past transfers displayed in the first user interlace element.

27. The non-transitory computer-readable storage medium of claim 25, the one or more programs further including instructions for:

while displaying the second user interface, displaying, in a region on the display, an affordance for proceeding with a transfer for reducing a remaining balance of the transfer account; and in response to detecting a user activation of the affordance for proceeding with the transfer for reducing a remaining balance of the transfer account, displaying, on the display, a user interface that includes a plurality of indicators corresponding to proposed balance reduction amounts.

28. The non-transitory computer-readable storage medium of claim 25, wherein the first graphical representation of the plurality of past transfers corresponds to a bar graph arranged based on time, and wherein the bar graph includes:

a first color indicating a first type of transfer of the plurality of past transfers, and a second color different from the first color indicating a second type of transfer of the plurality of past transfers.

29. The non-transitory computer-readable storage medium of claim 28, wherein:

in accordance with a determination that a first bar of the bar graph corresponding to a first time period includes a corresponding past transfer, the first bar is displayed having a respective color of the respective past transfer; and in accordance with a determination that the first bar of the bar graph does not include a corresponding past transfer, the first bar is displayed having a third color that does not correspond to any type of transfer.

30. The non-transitory computer-readable storage medium of claim 25, the one or more programs further including instructions for:

displaying, in the first user interface, an indication of an available transfer limit amount of the transfer account.

31. The non-transitory computer-readable storage medium of claim 25, the one or more programs further including instructions for:

subsequent to detecting a transfer corresponding to a balance reduction. of the transfer account, displaying, in the second user interface element, an indication of a date that the transfer corresponding to the balance reduction of the transfer account was made.

32. The non-transitory computer-readable storage medium of claim 25, the one or more programs further including instructions for:

subsequent to detecting a transfer corresponding to a balance reduction of the transfer account, in accordance with a determination that a balance is remaining on the transfer account, displaying, in the second user interface element, an indication of an amount of the balance that is remaining on the transfer account.

33. The non-transitory computer-readable storage medium of claim 25, the one or more programs further including instructions for:

prior to detecting a transfer corresponding to a balance reduction of the transfer account, displaying, in the second user interface element, an indication of a date corresponding to a balance reduction due date and an indication of an amount corresponding to a balance reduction amount that is due by the balance reduction due date.

34. The non-transitory computer-readable storage medium of claim 25, the one or more programs further including instructions for:

while displaying the first user interface, in accordance with a determination that an interest is being accrued on the transfer account:

displaying, in the second user interlace element, an alert indicating that the interest is being accrued on the transfer account.

35. The non-transitory computer-readable storage medium of claim 25, the one or more programs further including instructions for:

while displaying the first user interface, displaying, in the first user interlace, a third user interface element; and while displaying the third user interface element, displaying, in the third user interface element, a notification including information related to the transfer account, wherein the notification is periodically updated to display different types of information related to the transfer account.

36. The non-transitory computer-readable storage medium of claim 35, the one or more programs further including instructions for:

while displaying the third user interface element, displaying, in the third user interface element, instructions for initiating a process to order a physical account object corresponding to the transfer account that can be used as part of an authentication process to authorize transfers using the transfer account.

37. The non-transitory computer-readable storage medium of claim 25, the one or more programs further including instructions for:

while displaying the first user interface, displaying, in the first user interface, a list of transfer items corresponding to past transfers made using the transfer account, wherein the transfer items are arranged in chronological order based on a time of the corresponding past transfers.

38. The non-transitory computer-readable storage medium of claim 25, the one or more programs further including instructions for:

while displaying the first user interlace, detecting a user activation of a search function;

in response to detecting the user activation of the search function, displaying, on the display, a search bar; value and while displaying the search bar, receiving a user input directed to the search bar that includes a past event; and in response to receiving the user input directed to the search bar that includes the past event, displaying, on the display, one or more categories of respective transfers, wherein the respective transfers correspond to the past event.

39. A method, comprising:

at an electronic device with a display:

displaying, on the display, a first user interface corresponding to a user account associated with a use quota, wherein the first user interface includes:

a first user interface element that includes a first graphical representation of a plurality of past uses of the user account, and a second user interface element that includes information related to restoring at least a portion of the use quota of the user account;

while displaying the first user interface, detecting a user input; and in response to detecting the user input:

in accordance with a determination that the user input is directed to the first user interface element, displaying, on the display, a second user interface that includes:

a first group item that includes information summarizing a plurality of past uses of the user account related to a first category, and a second group item that includes information summarizing a plurality of past uses of the user account related to a second category that is different from the first category; and in accordance with a determination that the user input is directed to the second user interface element, displaying, on the display, a third user interface that includes:

an option to restore the portion of the use quota of the user account.

40. The method of claim 39, wherein:

the user account corresponds to a computer storage account, the use quota associated with the user account correspond to computer storage accessible via the computer storage account, and using the user account comprises storing data onto available computer storage of the computer storage account.

41. The method of claim 40, wherein restoring at least a portion of the use quota comprises deleting data stored onto a portion of the computer storage of the computer storage account.

42. The method of claim 39, wherein:

the user account corresponds to a credit account, the use quota associated with the user account correspond to a credit limit for the credit account, and using the user account comprises making purchases using the credit account.

43. The method of claim 42, wherein restoring at least a portion of the use quota comprises paying at least a portion of a balance of the credit account.

44. The method of claim 39, wherein:

the user account associated with a use quota is a transfer account associated with making transfers;

the plurality of past uses of the user account comprises a plurality of past transfers made using the transfer account;

the information related to restoring at least a portion of the use quota of the user account comprises information related to reducing a balance of the transfer account;

the information summarizing the plurality of past uses of the user account related. to the first category comprises information summarizing a plurality of past transfers of a first category;

the information summarizing the plurality of past uses of the user account related to the second category that is different from the first category comprises information summarizing a plurality of past transfers of a second category that is different from the plurality of past transfers of the first category; and the option to restore the portion of the use quota of the user account comprises an option to reduce the balance of the transfer account.

45. The method of claim 44, the method further comprising:

information indicating a remaining balance of the transfer account, and a second graphical representation of the plurality of past transfers made using the transfer account, the second graphical representation corresponding to the first graphical representation of the plurality of past transfers displayed in the first user interface element.

46. The method of claim 44, the method further comprising:

while displaying the second user interface, displaying, in a region on the display, an affordance for proceeding with a transfer for reducing a remaining balance of the transfer account; and in response to detecting a user activation of the affordance for proceeding with the transfer for reducing a remaining balance of the transfer account, displaying, on the display, a user interface that includes a plurality of indicators corresponding to proposed balance reduction amounts.

47. The method of claim 44, wherein the first graphical representation of the plurality of past transfers corresponds to a bar graph arranged based on time, and wherein the bar graph includes:

a first color indicating a first type of transfer of the plurality of past transfers, and a second color different from the first color indicating a second type of transfer of the plurality of past transfers.

48. The method of claim 47, wherein:

in accordance with a determination that a first bar of the bar graph corresponding to a first time period includes a corresponding past transfer, the first bar is displayed having a respective color of the respective past transfer; and in accordance with a determination that the first bar of the bar graph does not include a corresponding past transfer, the first bar is displayed having a third color that does not correspond to any type of transfer.

49. The method of claim 44, the method further comprising:

displaying, in the first user interface, an indication of an available transfer limit amount of the transfer account.

50. The method of claim 44, the method further comprising:

subsequent to detecting a transfer corresponding to a balance reduction of the transfer account, displaying, in the second user interface element, an indication of a date that the transfer corresponding to the balance reduction of the transfer account was made.

51. The method of claim 44, the method further comprising:

subsequent to detecting a transfer corresponding to a balance reduction of the transfer account, in accordance with a determination that a balance is remaining on the transfer account, displaying, in the second user interface element, an indication of an amount of the balance that is remaining on the transfer account.

52. The method of claim 44, the method further comprising:

prior to detecting a transfer corresponding to a balance reduction of the transfer account, displaying, in the second user interface element, an indication of a date corresponding to a balance reduction due date and an indication. of an amount corresponding to a balance reduction amount that is due by the balance reduction due date.

53. The method of claim 44, the method further comprising:

while displaying the first user interface, in accordance with a determination that an interest is being accrued on the transfer account:

displaying, in the second user interface element, an alert indicating that the interest is being accrued on the transfer account.

54. The method of claim 44, the method further comprising:

while displaying the first user interlace, displaying, in the first user interface, a thii.rd user interface element; and while displaying the third user interface element, displaying, in the third user interface element, a notification including information related to the transfer account, wherein the notification is periodically updated to display different types of information related to the transfer account.

55. The method of claim 54, the method further comprising:

while displaying the third user interface element, displaying, in the third user interface element, instructions for initiating a process to order a physical account object corresponding to the transfer account that can be used as part of an authentication process to authorize transfers using the transfer account.

56. The method of claim 44, the method further comprising:

while displaying the first user interface, displaying, in the first user interface, a list of transfer items corresponding to past transfers made using the transfer account, wherein the transfer items are arranged in chronological order based on a time of the corresponding past transfrs.

57. The method of claim 44, the method further comprising:

while displaying the first user interface, detecting a user activation of a search function;

in response to detecting the user activation of the search function, displaying, on the display, a search bar; value and while displaying the search bar, receiving a user input directed to the search bar that includes a past event; and in response to receiving the user input directed to the search bar that includes the past event, displaying, on the display, one or more categories of respective transfers, wherein the respective transfers correspond to the past event.

* * * * *

UNITED STATES PATENT AND TRADEMARK OFFICE

CERTIFICATE OF CORRECTION

PATENT NO. : 11,669,896 B2
APPLICATION NO. : 17/557655
DATED : June 6, 2023
INVENTOR(S) : Marcel Van Os et al.

It is certified that error appears in the above-identified patent and that said Letters Patent is hereby corrected as shown below:

In the Claims

Column 217, Line 12, Claim 1, delete "display;" and insert --display,--.

Column 217, Line 46, Claim 2, delete "account;" and insert --account,--.

Column 220, Line 44, Claim 22, delete "portion." and insert --portion--.

Column 220, Line 47, Claim 23, delete "Wherein:" and insert --wherein:--.

Column 221, Line 4, Claim 25, delete "category" and insert --category;--.

Column 221, Line 5, Claim 25, delete "ofpast" and insert --of past--.

Column 221, Line 23, Claim 26, delete "interlace" and insert --interface--.

Column 221, Line 66, Claim 31, delete "reduction." and insert --reduction--.

Column 222, Line 28, Claim 34, delete "interlace" and insert --interface--.

Column 222, Line 35, Claim 35, delete "interlace," and insert --interface,--.

Column 222, Line 63, Claim 38, delete "interlace," and insert --interface,--.

Column 224, Line 5, Claim 44, delete "related." and insert --related--.

Column 225, Line 16, Claim 52, delete "indication." and insert --indication--.

Column 225, Line 30, Claim 54, delete "interlace," and insert --interface,--.

Signed and Sealed this
Third Day of September, 2024

Katherine Kelly Vidal

Katherine Kelly Vidal
*Director of the United States Patent and Trademark Office*

Column 225, Line 31, Claim 54, delete “thii.rd” and insert --third--.

Column 226, Line 18, Claim 56, delete “transfrs.” and insert --transfers.--.